(12) United States Patent
Takahara

(10) Patent No.: US 6,628,355 B1
(45) Date of Patent: Sep. 30, 2003

(54) LIQUID CRYSTAL DISPLAY PANEL INCLUDING A LIGHT SHIELDING FILM TO CONTROL INCIDENT LIGHT

(75) Inventor: Hiroshi Takahara, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/697,991

(22) Filed: Oct. 27, 2000

Related U.S. Application Data

(62) Division of application No. 08/993,250, filed on Dec. 17, 1997, now Pat. No. 6,219,113.

(30) Foreign Application Priority Data

| Dec. 17, 1996 | (JP) | 8-336777 |
| Apr. 1, 1997 | (JP) | 9-082595 |
| Jul. 1, 1997 | (JP) | 9-175744 |

(51) Int. Cl.[7] ............... G02F 1/1335; G02F 1/1333; G02F 1/136
(52) U.S. Cl. ............... 349/106; 349/86; 349/42; 349/113; 349/138
(58) Field of Search ............... 349/86, 96, 106, 349/107, 108, 109, 110, 111, 113, 138

(56) References Cited

U.S. PATENT DOCUMENTS

| 4,641,285 A |   | 2/1987 | Sasaki et al. ............... 365/210 |
| 4,688,900 A | * | 8/1987 | Doane et al. ............... 350/347 V |
| 4,818,075 A | * | 4/1989 | Takao et al. ............... 350/339 F |
| 5,109,166 A |   | 4/1992 | Coburn et al. ............... 307/451 |
| 5,194,973 A | * | 3/1993 | Isogai et al. ............... 359/53 |
| 5,253,091 A |   | 10/1993 | Kimura et al. ............... 345/94 |
| 5,469,278 A | * | 11/1995 | Takahara et al. ............... 359/51 |
| 5,477,351 A | * | 12/1995 | Takahara et al. ............... 359/40 |
| 5,485,020 A |   | 1/1996 | Hirai et al. ............... 257/59 |

(List continued on next page.)

FOREIGN PATENT DOCUMENTS

| EP | 2 058 385 A | * | 4/1981 |
| JP | 62-260886 |   | 11/1987 |

(List continued on next page.)

OTHER PUBLICATIONS

H. Kuriyama, "Excimer Laser Crystallization Of Silicon Films For AMLCD's", 95, pp. 87–90.

S.M. Fluxman, "Design and Performance of Digital Polysilicon Thin–Film–Transistor Circuits On Glass", IEE, Proc– Circuits Devices Syst., vol. 141, No. 1, pp. 56–59.

M.J. Edwards, "NMOS and CMOS Polysilicon Drive Circuits for Liquid Crystal Displays", IEE Proc.–Circuits System, vol. 141, No. 1, pp. 50–55.

Birendra Bahadur, "Liquid Crystal Applications and Uses", vol. 1, pp. 397–420.

Primary Examiner—Tarifur R. Chowdhury
(74) Attorney, Agent, or Firm—RatnerPrestia

(57) ABSTRACT

An array substrate 12 is formed with pixel electrodes 14 in the form of a matrix. The pixel electrode 14 is connected to a thin film transistor 155. The thin film transistor 155 is formed with a light shielding film 152 consisting of resin for preventing an entry of light into the thin film transistor 155. A polymer dispersion liquid crystal layer 21 is interposed between a counter electrode 25 and the pixel electrode 14. A substrate 11 is formed with a color filter 151 having red (R), green (G), and blue (B). The color filter 151 is formed from dielectric multilayer film or organic material. The counter electrode 25 is formed above the color filter 155, and the counter electrode 25 and the liquid crystal layer 21 are bonded together by an adhesive layer 371.

2 Claims, 220 Drawing Sheets

11 : COUNTER SUBSTRATE
12 : ARRAY SUBSTRATE
14 : PIXEL ELECTRODE
15 : SOURCE SIGNAL LINE
16 : LOW DIELECTRIC FILM
17 : TRANSVERSE ELECTRIC FIELD WIRE
18 : LIGHT SHIELDING FILM
19 : ELECTRIC FORCE LINE
20 : LIQUID CRYSTAL MOLECULE
21 : LIQUID CRYSTAL LAYER
22 : LIQUID CRYSTAL DISPLAY
25 : COUNTER ELECTRODE

U.S. PATENT DOCUMENTS

| Patent No. | | | Date | Inventor | Class |
|---|---|---|---|---|---|
| 5,499,126 | A | * | 3/1996 | Abileah et al. | 349/106 |
| 5,508,831 | A | * | 4/1996 | Nakamura et al. | 359/51 |
| 5,517,278 | A | * | 5/1996 | Takahara et al. | 354/471 |
| 5,610,414 | A | | 3/1997 | Yoneda et al. | 257/99 |
| 5,610,735 | A | * | 3/1997 | Ohmae et al. | 349/10 |
| 5,620,630 | A | * | 4/1997 | Onishi et al. | 252/299.01 |
| 5,673,127 | A | * | 9/1997 | Takahara et al. | 359/40 |
| 5,712,652 | A | | 1/1998 | Sato et al. | 345/90 |
| 5,724,111 | A | * | 3/1998 | Mizobata et al. | 349/112 |
| 5,748,175 | A | | 5/1998 | Shimada et al. | 345/127 |
| 5,798,742 | A | | 8/1998 | Watatani et al. | 345/98 |
| 5,798,744 | A | | 8/1998 | Tanaka et al. | 345/92 |
| 5,801,673 | A | | 9/1998 | Shimada et al. | 345/100 |
| 5,825,061 | A | | 10/1998 | Chang | 357/309 |
| 5,867,139 | A | | 2/1999 | Tanaka et al. | 345/92 |
| 5,874,934 | A | | 2/1999 | Ito | 345/98 |
| 5,969,702 | A | * | 10/1999 | Bae | 345/92 |
| 6,115,097 | A | * | 9/2000 | Yamazaki | 349/151 |
| 6,181,396 | B1 | * | 1/2001 | Kanoh et al. | 205/477 |
| 6,211,931 | B1 | * | 4/2001 | Fukao et al. | 349/86 |

FOREIGN PATENT DOCUMENTS

| | | | | |
|---|---|---|---|---|
| JP | 4-12328 | A | * | 1/1992 |
| JP | 04-67091 | | | 3/1992 |
| JP | 04-251220 | A | * | 9/1992 |
| JP | 04-309922 | | | 11/1992 |
| JP | 05-011235 | A | * | 1/1993 |
| JP | 05-088158 | A | * | 4/1993 |
| JP | 06-110043 | A | * | 4/1994 |
| JP | 06-308468 | A | * | 11/1994 |
| JP | 07-43736 | | | 2/1995 |
| JP | 07-043701 | | | 2/1995 |
| JP | 07-092443 | | | 4/1995 |
| JP | 07-113998 | | | 5/1995 |
| JP | 07-181460 | A | * | 7/1995 |
| JP | 8-22016 | A | * | 1/1996 |
| JP | 08-018062 | | | 1/1996 |
| JP | 08-027464 | | | 1/1996 |
| JP | 08-46206 | | | 2/1996 |
| JP | 08-029811 | | | 2/1996 |
| JP | 08-191421 | | | 7/1996 |
| JP | 08-194212 | A | * | 7/1996 |
| JP | 08-234240 | | | 9/1996 |
| JP | 08-240815 | | | 9/1996 |
| JP | 09-080401 | | | 3/1997 |
| JP | 10-301540 | | | 11/1998 |

* cited by examiner

11: COUNTER SUBSTRATE
12: ARRAY SUBSTRATE
14: PIXEL ELECTRODE
15: SOURCE SIGNAL LINE
16: LOW DIELECTRIC FILM
17: TRANSVERSE ELECTRIC FIELD WIRE
18: LIGHT SHIELDING FILM
19: ELECTRIC FORCE LINE
20: LIQUID CRYSTAL MOLECULE
21: LIQUID CRYSTAL LAYER
22: LIQUID CRYSTAL DISPLAY
25: COUNTER ELECTRODE

23 : WATERDROP-LIKE LIQUID CRYSTAL
24 : POLYMER

41 : SIGNAL LINE

71 : INSULATING FILM

Fig. 13 (a)
131: POLARIZING PLATE
132: POLARIZATION AXIS
133: TRANSVERSE ELECTRIC FIELD GENERATION DIRECTION
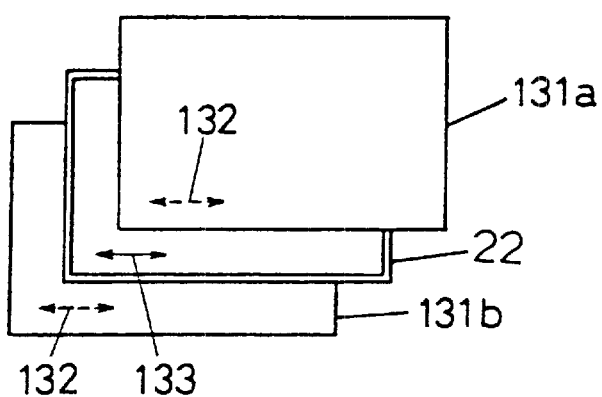
Fig. 13 (b)
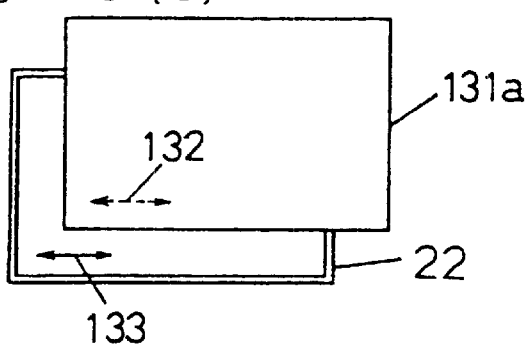
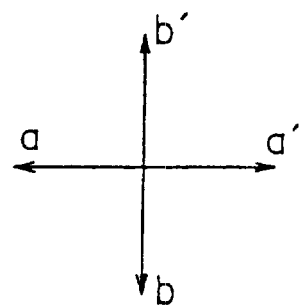
Fig. 13 (c)
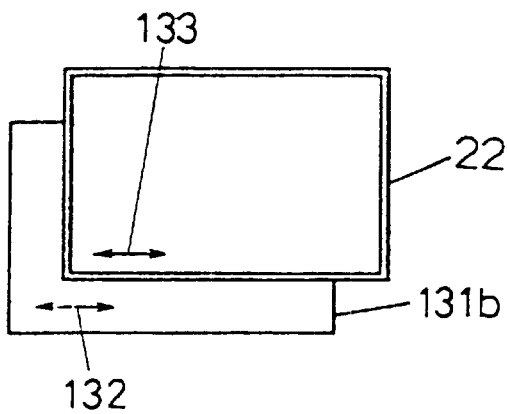

151: COLOR FILTER
152: RESIN LIGHT SHIELDING FILM
153: PROTECTIVE FILM
154: INSULATING FILM
155: TFT

161: BEAD

221: DIELECTRIC THIN FILM

301: RESIN PARTICLE
302: LIQUID CRYSTAL

Fig. 36   361: SEAL RESIN

471 : METAL WIRE
472 : GATE SIGNAL LINE

491: Y DRIVE CIRCUIT
492: X DRIVE CIRCUIT

541: DRIVER CIRCUIT
542: LIGHT SHIELDING FILM

| B | G | R | B | G | R | B | G | R |
|---|---|---|---|---|---|---|---|---|
| B | G | R | B | G | R | B | G | R |
| B | G | R | B | G | R | B | G | R |
| B | G | R | B | G | R | B | G | R |
| B | G | R | B | G | R | B | G | R |
| B | G | R | B | G | R | B | G | R |

671: PRISM

811: SiO₂ LAYER
812: DIELECTRIC FILM

821: IRREGULARITY FILM
822: EMBOSSED SHEET

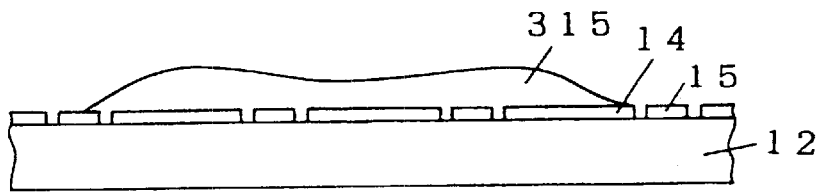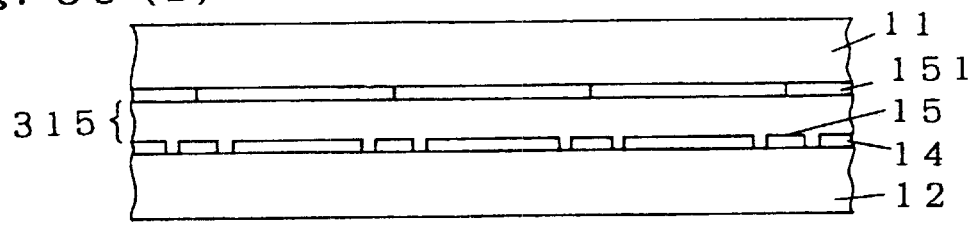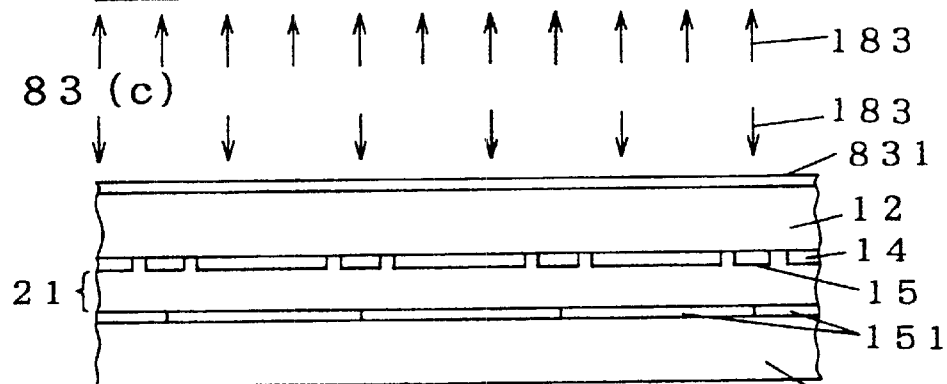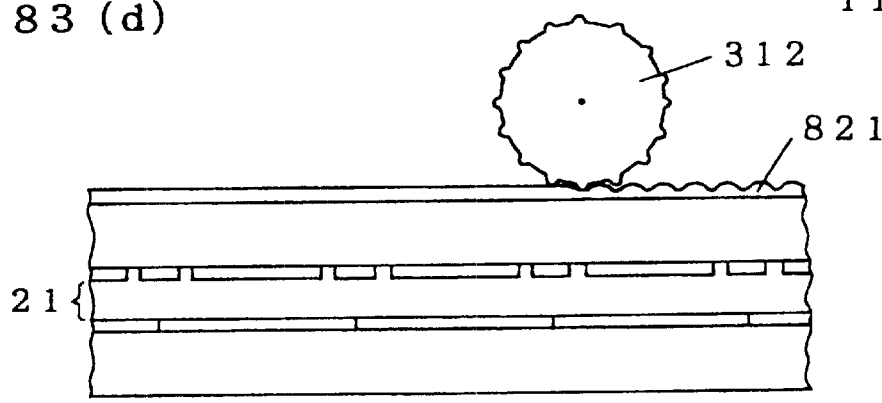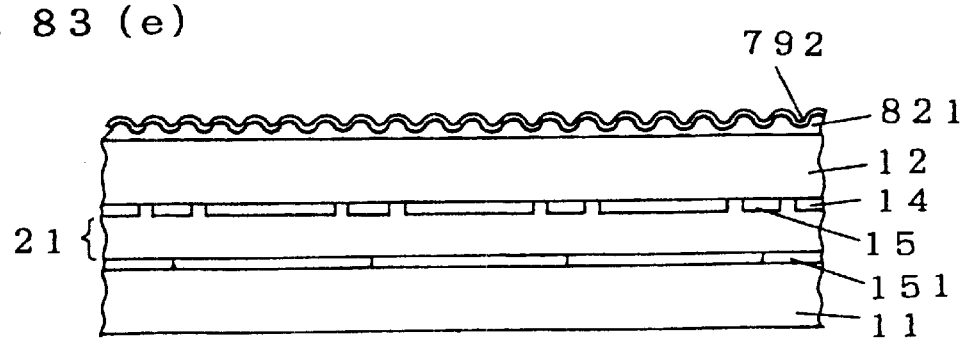

14b: REFLECTING ELECTRODE
861: BUFFER LAYER

891: DIELECTRIC MIRROR

892: PIXEL ELECTRODE (ITO)

901: LASER TRIMMING APPARATUS
902: INFRARED-RAY CAMERA

901a : LASER LIGHT GENERATION APPARATUS

901b : MIRROR

901c : CONDENSER LENS

911 : XY STAGE

912 : LASER LIGHT

921: RADIATING PLATE

922: ADHESIVE AGENT

991: TRANSPARENT THIN FILM
992: METALLIC THIN FILM

1061: PRISM SHEET
1062: MICROLENS SHEET

1131 : TRANSPARENT SUBSTRATE
1132 : LIGHT ABSORBING FILM
1133 : SCATTERED LIGHT

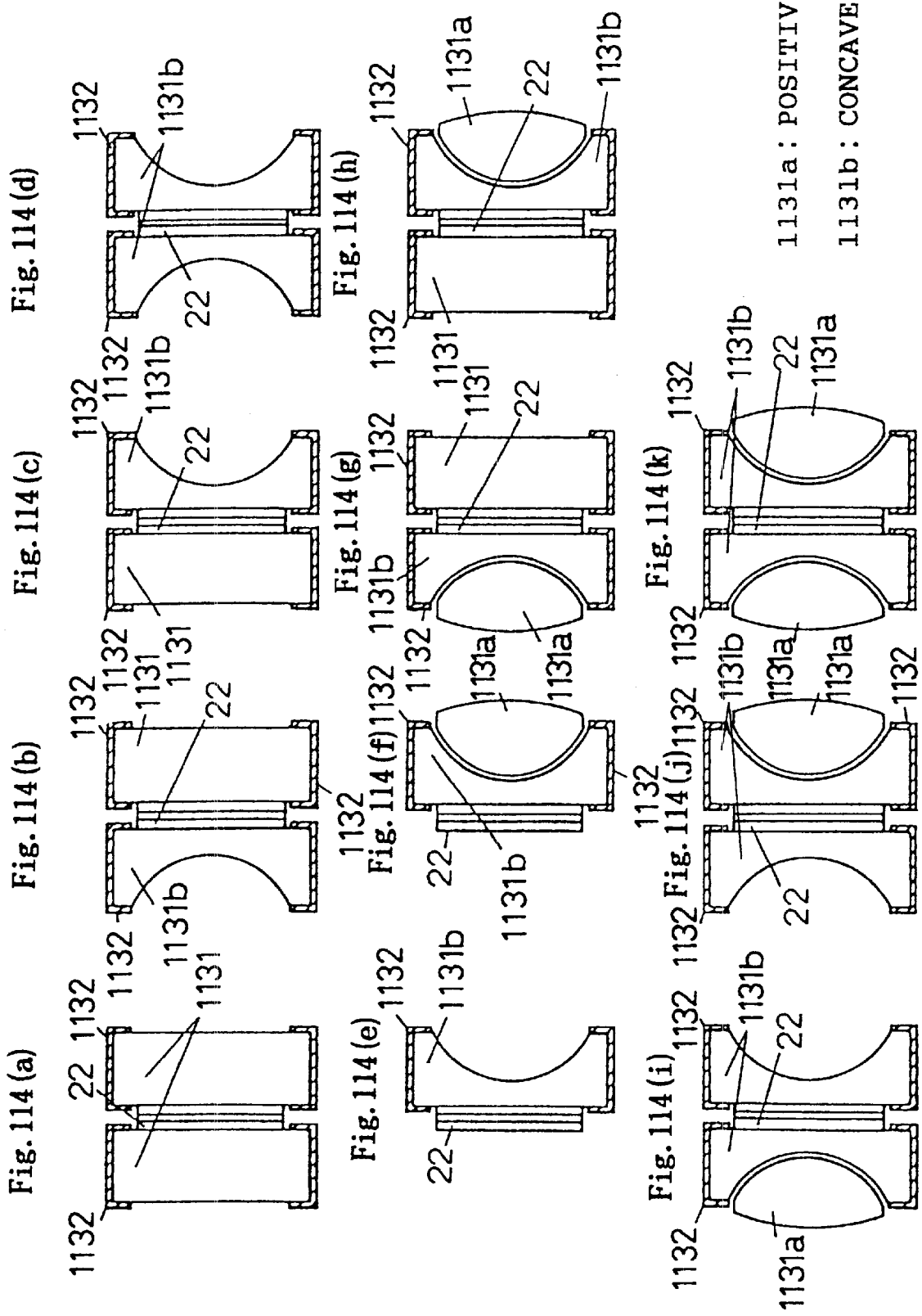

1191 : OR CIRCUIT

1192 : SWITCH CIRCUIT

1193 : SIGNAL LINE CAPACITOR

1194 : ADDITIONAL CAPACITOR

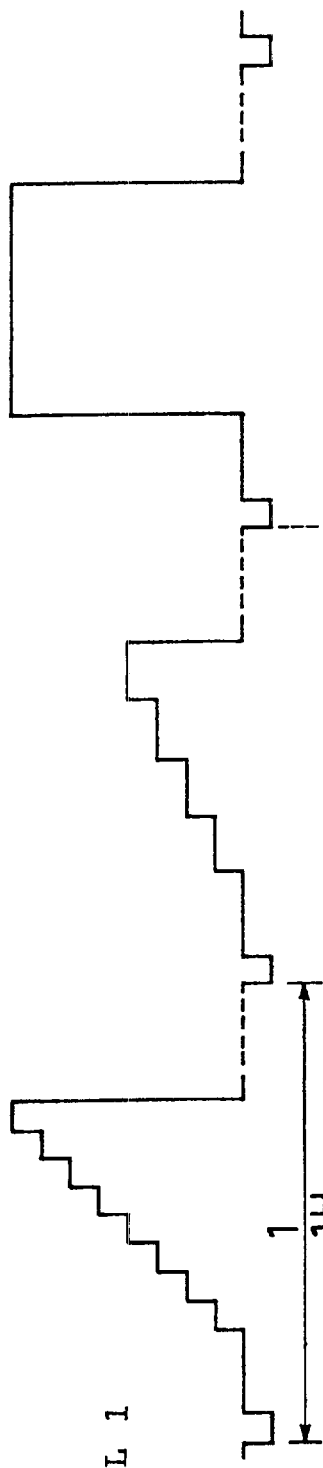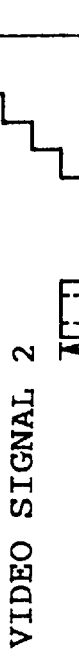
Fig. 120(a) VIDEO SIGNAL 1
Fig. 120(b) VIDEO SIGNAL 2
Fig. 120(c) CNT SIGNAL

1121 : A/D
1212 : LINE MEMORY
1213 : ARITHMETIC CIRCUIT
1214 : D/A

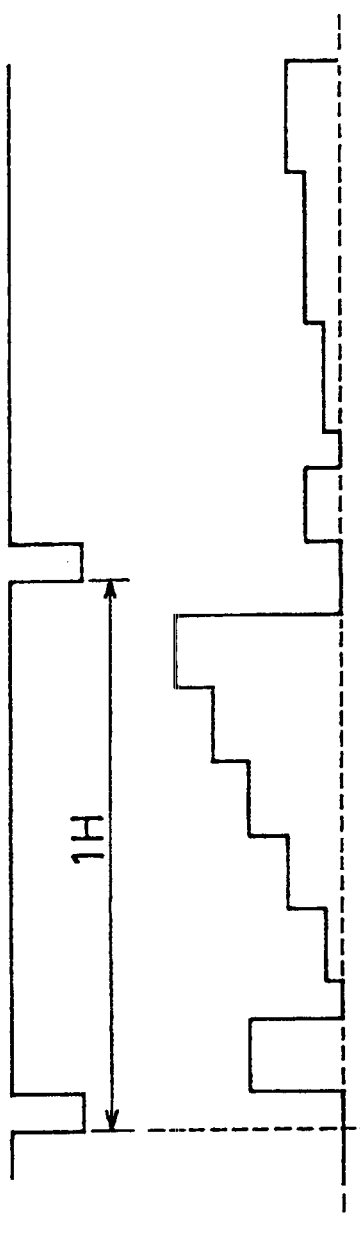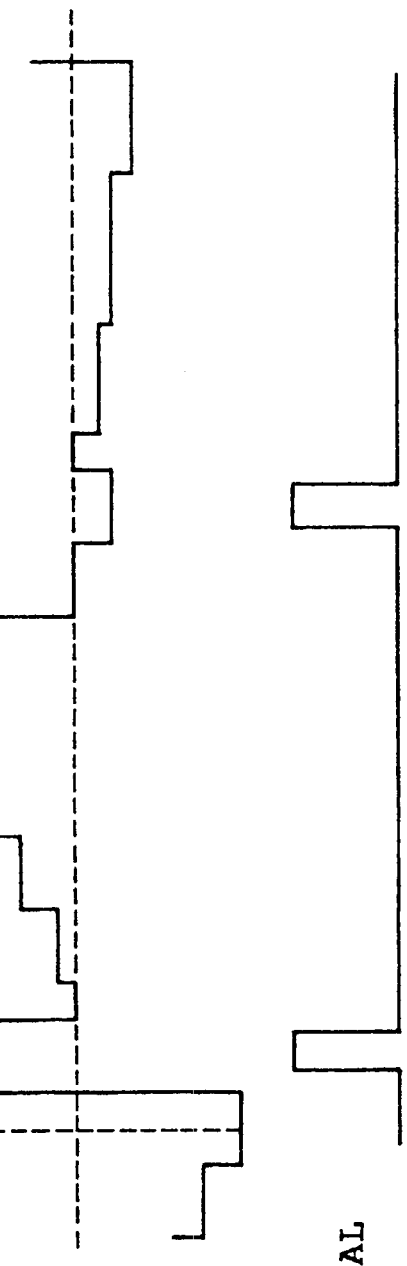
Fig. 123 (a) HD
Fig. 123 (b)
Fig. 123 (c)
Fig. 123 (d) CNT SIGNAL

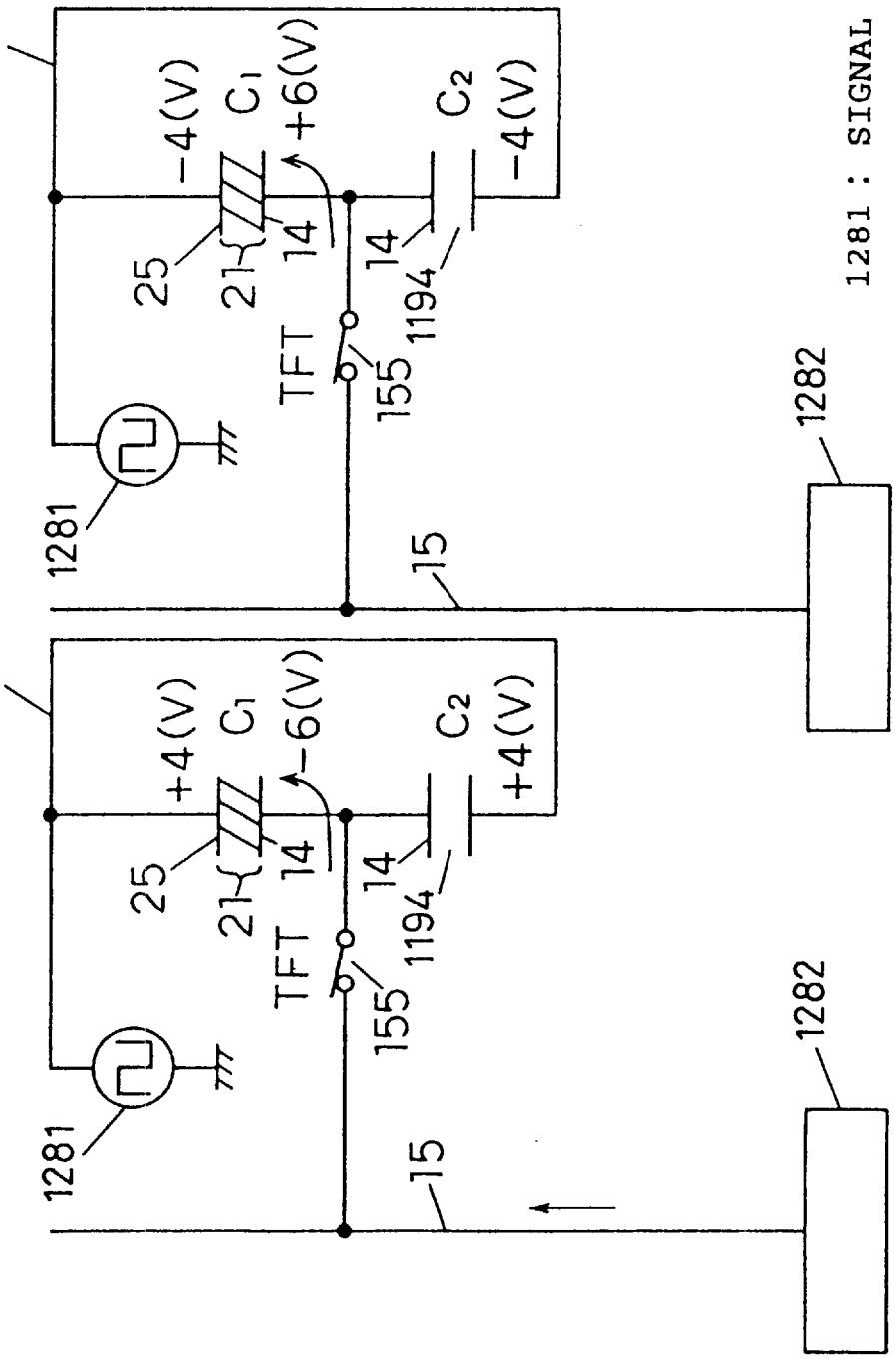
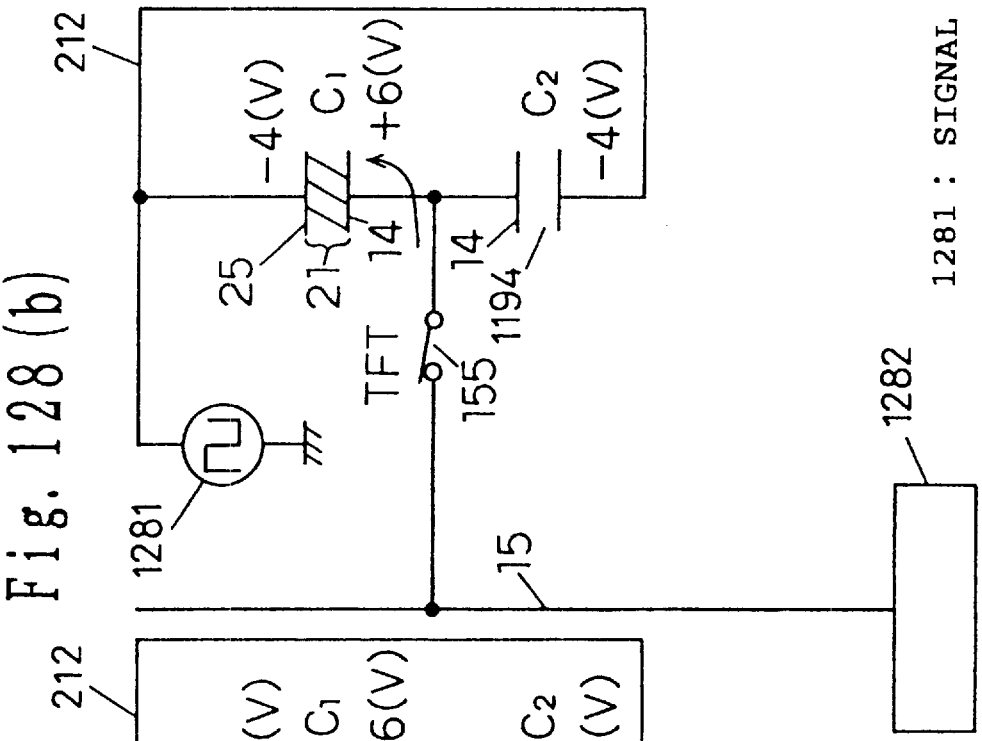
Fig. 128 (a)
Fig. 128 (b)
1281 : SIGNAL SOURCE
1282 : VIDEO SIGNAL CIRCUIT

Fig. 129

1291 : PIXEL

1291c

1291a

1291b

| + | − | + | − | + | − | + | − | + | − |
|---|---|---|---|---|---|---|---|---|---|
| − | + | − | + | − | + | − | + | − | + |
| + | − | + | − | + | − | + | − | + | − |
| − | + | − | + | − | + | − | + | − | + |
| + | − | + | − | + | − | + | − | + | − |
| − | + | − | + | − | + | − | + | − | + |
| + | − | + | − | + | − | + | − | + | − |
| − | + | − | + | − | + | − | + | − | + |

Fig. 130

1311 : DISPLAY IMAGE

SCANNING DIRECTION

1361 : SCANNING DIRECTION

Fig. 139 (a)

| 1291a | | | 1291d | | | | | | |
|---|---|---|---|---|---|---|---|---|---|
| R + | G − | B + | R + | G − | B + | R + | G − | B + | G − |
| R − | G + | B − | R − | G + | B − | R − | G + | B − | G + |
| R + | G − | B + | R + | G − | B + | R + | G − | B + | G − |
| R − | G + | B − | R − | G + | B − | R − | G + | B − | G + |
| R + | G − | B + | R + | G − | B + | R + | G − | B + | G − |
| R − | G + | B − | R − | G + | B − | R − | G + | B − | G + |
| R + | G − | B + | R + | G − | B + | R + | G − | B + | G − |

Fig. 139 (b)

| 1291a | | | 1291e | | | | | | |
|---|---|---|---|---|---|---|---|---|---|
| R − | G + | B − | W + | R − | G + | B − | W + | R − | G + | B − |
| R + | G − | B + | W − | R + | G − | B + | W − | R + | G − | B + |
| R − | G + | B − | W + | R − | G + | B − | W + | R − | G + | B − |
| R + | G − | B + | W − | R + | G − | B + | W − | R + | G − | B + |
| R − | G + | B − | W + | R − | G + | B − | W + | R − | G + | B − |
| R + | G − | B + | W − | R + | G − | B + | W − | R + | G − | B + |
| R − | G + | B − | W + | R − | G + | B − | W + | R − | G + | B − |

| R | G | B | W | R | G | B | W | R | G | B |
|---|---|---|---|---|---|---|---|---|---|---|
|   | R | G | B | W | R | G | B | W | R | G |
| W | R | G | B | W | R | G | B | W | R | G |
|   | W | R | G | B | W | R | G | B | W | R |
| B | W | R | G | B | W | R | G | B | W | R |
|   | B | W | R | G | B | W | R | G | B | W |
| G | B | W | R | G | B | W | R | G | B | W |

| R | G | B | W | R | G | B | W | R | G | B |
|---|---|---|---|---|---|---|---|---|---|---|
| W | R | G | B | W | R | G | B | W | R |   |
| G | B | W | R | G | B | W | R | G | B | W |
| R | G | B | W | R | G | B | W | R | G |   |
| B | W | R | G | B | W | R | G | B | W | R |
| R | G | B | W | R | G | B | W | R | G |   |
| B | W | R | G | B | W | R | G | B | W | R |

Fig. 141

1411 : LIGHT SOURCE  1411c : UVIR CUT FILTER
1411a : LAMP  1412 : COLOR PURITY ENHANCEMENT FILTER
1411b : CONCAVE MIRROR  1413 : LENS
1414 : ROTARY FILTER
1415 : PROJECTION LENS  1416 : OPTICAL AXIS 1422, 1423 : DIELECTRIC MULTILAYER FILM
1424, 1425 : DIELECTRIC THIN FILM 1432, 1433 : DIELECTRIC MULTILAYER FILM 1434, 1435 : DIELECTRIC THIN FILM

1531 : POSITIONING TOOL
1532 : LAMP SOURCE
1533 : CONTROL BUTTON
1534 : COOLING FAN
1535 : CASING
1536 : LENS DRIVE PORTION
1537 : MOUNTING PORTION
1539a-d SWITCH (DETECTION PORTION)

1551 : OPTICAL SYSTEM BLOCK
1552 : MIRROR

1581 : POLARIZATION BEAM SPLITTER (BSP)

1582 : LIGHT SEPARATING SURFACE

1591 : DICHROIC PRISM
1592 : LENS PLATE
1593 : LENS
1594 : BAND CUT FILTER

1611 : DICHROIC MIRROR

1631 : DISPLAY AREA

1651 : CASING

1652 : PELTIER ELEMENT (ELECTRONIC COOLING ELEMENT)

1691 : CURRENT SOURCE  
1692 : SWITCH  
1693 : WIRE  
1694 : CONNECTING POINT  
1695 : LEAD WIRE

1701 : ULTRAVIOLET-RAY CUT FILTER
1702 : INFRARED-RAY CUT FILTER
1703 : INFRARED-RAY ABSORBING FILTER

INCIDENT ANGLE 45°

SPECTRAL TRANSMITTANCE OF DICHROIC MIRROR 523a

INCIDENT ANGLE 45°

SPECTRAL TRANSMITTANCE OF DICHROIC MIRROR 523b

SPECTRAL TRANSMITTANCE OF DICHROIC MIRROR 523a

SPECTRAL TRANSMITTANCE OF DICHROIC MIRROR 523b

1861 : LIGHT INCIDENCE-EXIT SURFACE

2022 : TRANSMISSION RANGE OF PROJECTED LIGHT

2023 : ROTATIONAL CENTER

Fig. 203
2031 : POLARIZATION SCREEN
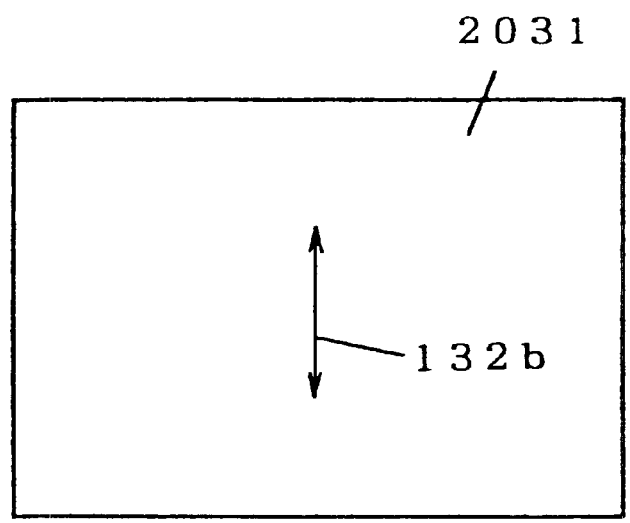
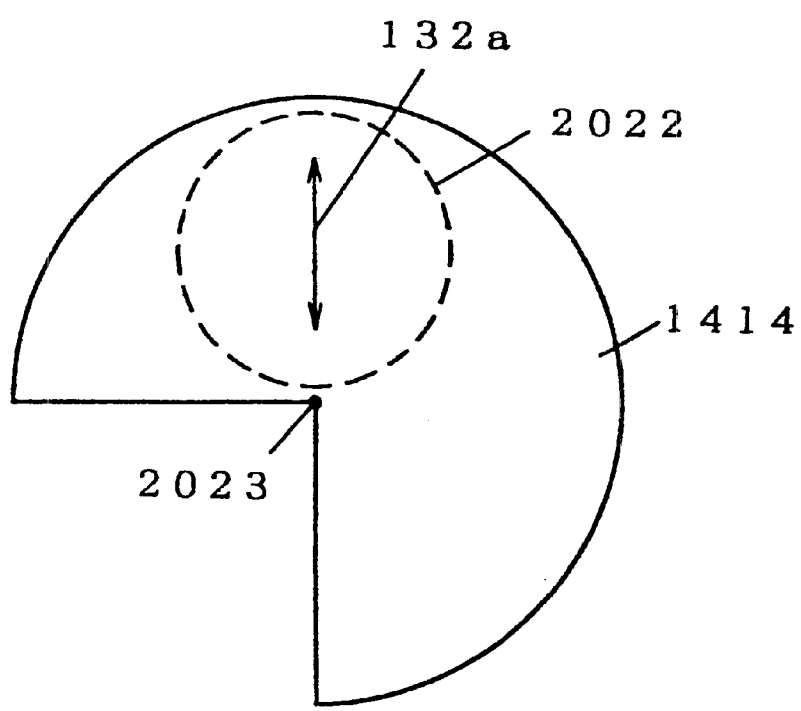

Fig. 204
2031 : POLARIZATION SCREEN
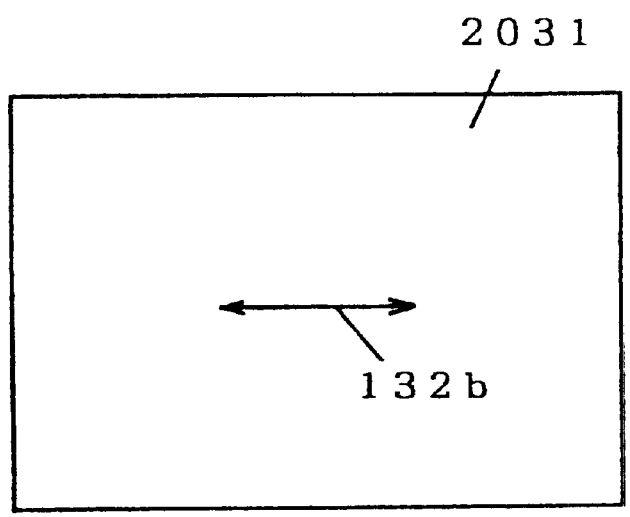
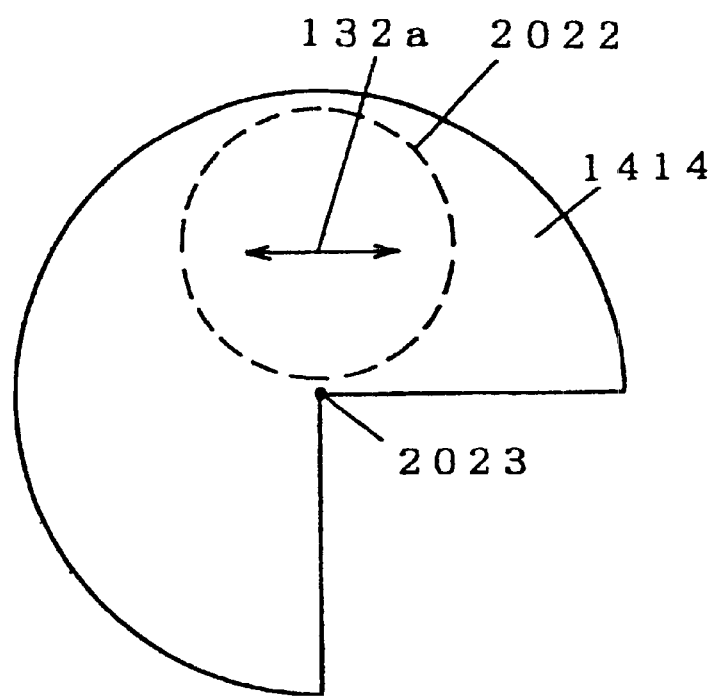

Fig. 205
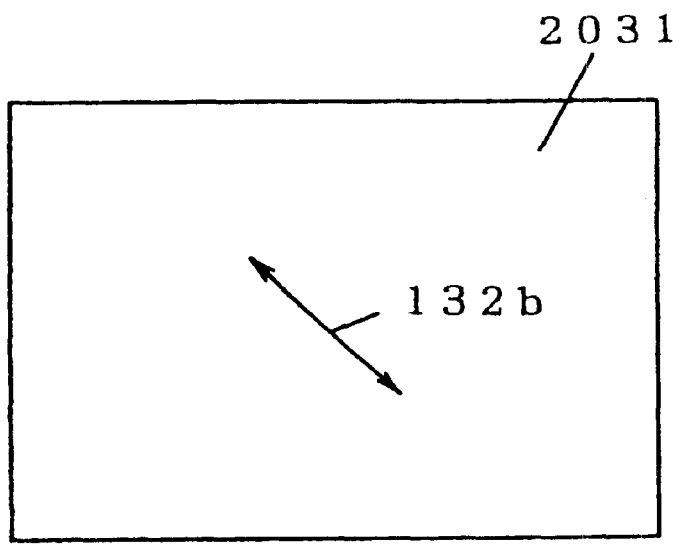
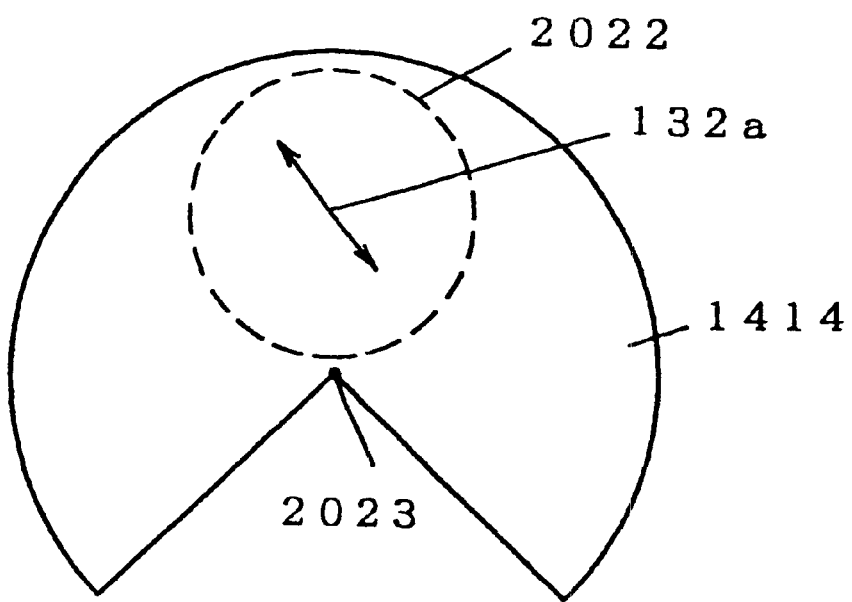

Fig. 206
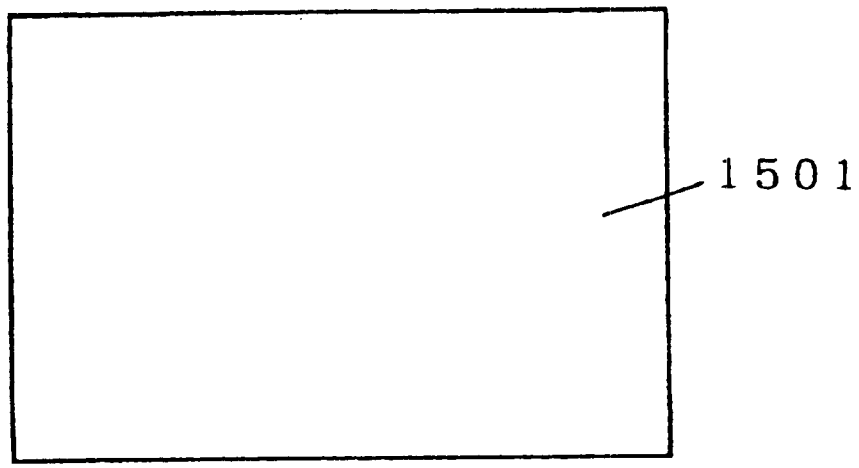
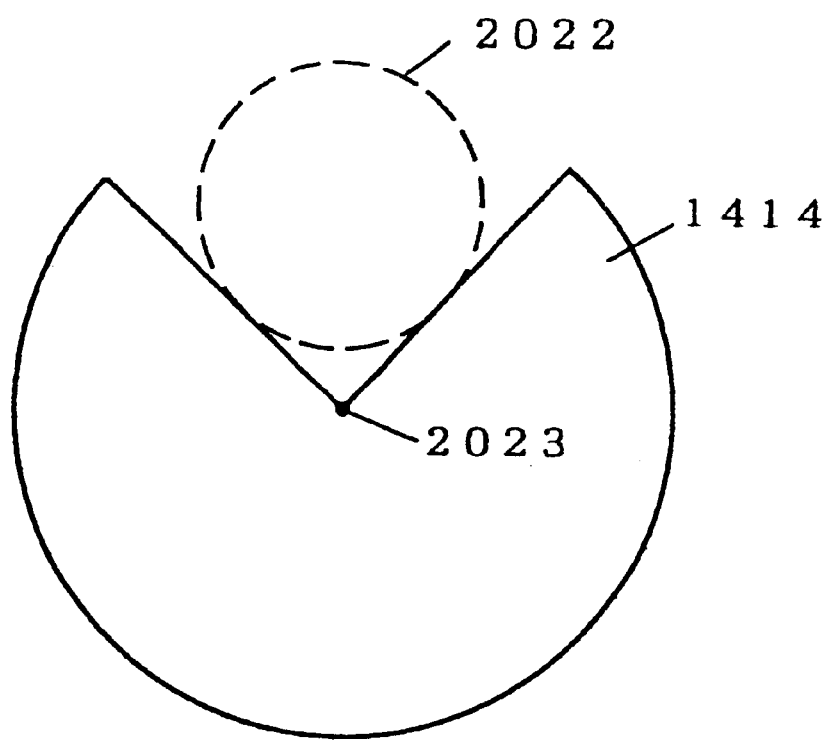

2072 : CORRECTION FILTER

Fig. 208 (b)   2081 : LIGHT SHIELDING FILM
2082 : TRANSPARENT SUBSTRATE
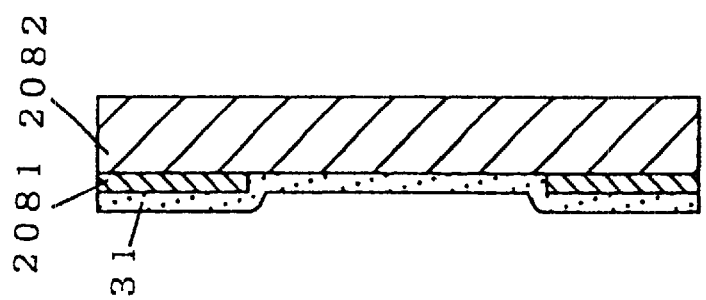
Fig. 208 (a)
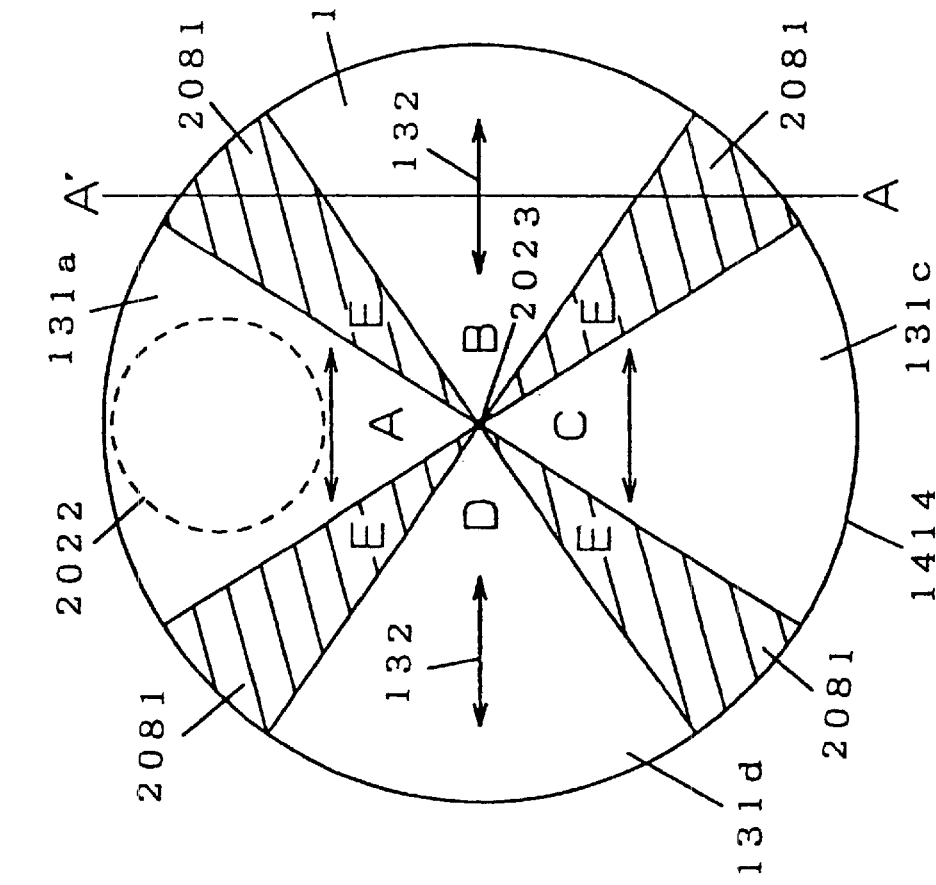

2091 : POLARIZING EYEGLASSES

A

B

2186 : BODY

2187 : EYEPIECE RUBBER

2188 : MOUNTING BRACKET

2181 : LIGHT SOURCE (LIGHT EMITTING LAMP)

2182 : APERTURE

2183 : CONDENSER LENS

2184 : EYEPIECE RING

2185 : EYEPIECE

2189 : HOLE

2201 : CASING

2202 : ILLUMINANT

2203 : FILAMENT

2204 : ANODE

2205 : LIGHT SHIELDING FILM

2201a : INNER CASING
2201b : OUTER CASING
2211 : CIRCUIT SUBSTRATE
2212 : CONNECTOR
2213 : SOLDER

2261 : LIGHT GUIDING PLATE
2262 : FLUORESCENT TUBE
2263 : REFLECTING SHEET

2231 : SIMPLE MATRIX PANEL

LIQUID CRYSTAL DISPLAY PANEL INCLUDING A LIGHT SHIELDING FILM TO CONTROL INCIDENT LIGHT

This application is a division of U.S. patent application Ser. No. 08/993,250, filed Dec. 17, 1997 now U.S. Pat. No. 6,219,113.

BACKGROUND OF THE INVENTION

1. Field of the Invention

The present invention relates to a display panel, a method of fabricating the display panel, a method of driving the display panel, a method of correcting a defect in the display panel, and a display employing the display panel.

2. Description of the Related Art

Twisted nematic (TN) liquid crystals making use of the optical rotation of a liquid crystal have presently been employed in available projection displays (liquid crystal projectors) and view finders.

The TN liquid crystal display panel employing the TN liquid crystal needs to employ a polarizing plate to modulate light.

Conventional units such as the aforementioned, however, have poor light utilization efficiency, because the polarizing plate absorbs approximately 70% of incident light. For this reason, the TN liquid crystal display panel has the problem that high brightness display cannot be realized.

The TN liquid crystal display panel also needs a rubbing process, because there is a need to orient liquid crystal molecules. The conventional rubbing process, however, will easily cause a manufacturing defect because it needs high technology. For this reason, there is a problem of panel cost being increased.

SUMMARY OF THE INVENTION

The objective of the present invention is to provide a display panel, a method of fabricating the display panel, a method of driving the display panel, a method of correcting a defect in the display panel, and a display employing the display panel in consideration of the conventional problems mentioned.

The first liquid crystal display panel of the present invention comprises, for example, a first electrode substrate (11), a second electrode substrate (12), a liquid crystal layer (21) interposed between said first electrode substrate (11) and said second electrode substrate (12) for forming an optical image as the change of a light scattering state, and a plurality of wires (17) formed on at least one or the other of said first electrode substrate (11) and second electrode substrate (12), wherein the liquid crystal molecules (20) in said liquid crystal layer are oriented by an electric field (19) produced between said wires adjacent on the same substrate.

Also, for example, a polarizing plate (131) is arranged on either the incident side or exit side of the liquid crystal display panel (22) or on both sides. An electric force line (19) is produced parallel to the substrate by the aforementioned adjacent wires (called a transverse electric field wire) (17). Along this electric force line (19), the liquid crystal molecules (20) are oriented. If the liquid crystal molecules (20) are oriented, polarization dependency will occur in a specific direction. If the specific direction is aligned with the polarization axis (132) of the polarizing plate, a scattering characteristic will be enhanced.

In the second display panel of the present invention, a liquid crystal layer (21) and a counter electrode (25), for example, are formed. Then, a color filter (151) is filter directly on the counter electrode (25). Irradiation of ultraviolet rays is performed after formation of the counter electrode (25) and before formation of the color filter (151). As an example of the color filter, there is an interference filter consisting of a dielectric multilayer film and a filter colored with gelatin. Also, the color filter (151) is formed with a protective film (153) for preventing mechanical rapture.

In the third display panel of the present invention, a color filter (151) and a black matrix as a light shielding film (202), for example, is formed on an array substrate (12) and then, on the color filter (151) a thin film (201) having a smoothing and insulating function is formed. On m, this thin film (201), a TFT (155) and a signal line (15), etc. are formed. Thereafter, a counter substrate (11) formed with a counter electrode (25) and the array substrate (12) are held with a predetermined space and then, the space is filled with a mixed solution (315) containing liquid crystal and resin. The phase separation of the mixed solution (315) is performed by irradiating ultraviolet rays from the side of the counter substrate (11).

In the fourth display panel of the present invention, a color filter (151) is not formed on a counter electrode (25). The color filter (151) is formed on another substrate (351). The substrate (351) and the counter electrode (25) are held with a predetermined space by beads (161). The space is filled with an inert gas (352), etc., and the peripheral portion is sealed with seal resin (361) for preventing leakage of said gas.

In the fifth display panel of the present invention, a substrate (11), formed with a color filter (151) and a counter electrode (25), is pasted on a PD liquid crystal layer (21) by an adhesive layer (371). It is preferable that the adhesive layer (371) employ the same material as the resin of the liquid crystal layer (21).

In the sixth display panel of the invention, a counter substrate (11), for example, is thinned, and on the counter substrate (11) a color flter (151) is formed. The relation between the thickness t of the counter substrate (11) and the diagonal length d of a pixel needs to meet the following equation. The color filter (151) is formed after ultraviolet rays are irradiated on the liquid crystal layer (21).

$$10d \geq t \qquad \text{[expression 13]}$$

In the seventh display panel of the present invention, a first PD liquid crystal layer is formed between a pixel electrode (14) and a common electrode (212), and a second PD liquid crystal layer is formed between the pixel electrode (14) and a counter electrode (25). If voltage is applied to the pixel electrode, the first and second PD liquid crystal layers will be caused to be in a light transmitting state at the same time. Since the sheet resistance value of the common electrode (212) is reduced, a metal wire (471) is formed along the common electrode (212).

A light shielding film 542 is formed above or below a driver circuit (541), etc. which drives the display panel of the present invention. The light shielding film (542) shuts out light that is incident on the driver circuit (541). Or, instead of the light shielding film (542), the driver circuit (541) is enclosed with a light absorbing resin (541).

In the eighth display panel of the present invention, for example, a light modulating layer (21) is not formed between pixel electrodes (14), but space is assured. Also, on a signal line (15) a BM (202) is formed. Preferably, an inert gas (352) is injected into the aforementioned space. A fabrication method fabricates a mask 181 having a light shielding film (202) formed so as to correspond to the space between pixel electrodes (14), and irradiates ultraviolet rays (183) through the mask (181). The ultraviolet rays (183) irradiated on the light shielding film (202) is reflected or absorbed. For this reason, the resin under the light shielding film (202) is not set. After irradiation of the ultraviolet rays (183), if the unset resin (315) is washed, space can be formed on a signal line.

In the ninth display panel of the invention, a color filter (151), for example, is formed on a pixel electrode (14). A PD liquid crystal layer (21) varies the average particle diameter of a waterdrop-like liquid crystal or the average pore diameter of a polymer network in accordance with the color of the color filter (151). When the color filter (151) is red (R), the average particle diameter or average pore diameter is increased, and when the color filter (151) is blue (B), the average particle diameter or average pore diameter is reduced. The size of the average particle diameter or average pore diameter is adjusted by varying the strength of ultraviolet rays to be irradiated and/or the kind and content of liquid crystal and resin. Also, as shown in FIG. 28, the size is adjusted by irradiating ultraviolet rays with the use of a transparent substrate (642) formed with microlenses (641) different in focal distance. The microlenses (641) may be replaced with prisms, as shown in FIG. 67.

The tenth display panel of the present invention is constituted, for example, so that the content of the resin component on a pixel electrode (14) is increased and also the content of the liquid crystal component of the peripheral portion of the pixel electrode (14) is increased. The refractive index of a liquid crystal is higher than that of resin. For this reason, in the display panel shown in FIG. 70, the refractive index of the central portion on the pixel becomes lower than that of the peripheral portion of the pixel. Therefore, if the refractive index of the liquid crystal component in a mixed solution (315) is higher than that of the resin component, each pixel will serve as a concave lens.

The eleventh display panel of the present invention is provided, for example, with a microlens array (641). By forming a microlens array substrate (642) and a color filter (151), color display is realized without forming the color filter (151) on a liquid crystal layer (21). Also, the microlenses (641) may be colored red (R), green (G), and blue (B).

The microlens (641) has both the function of a microlens and the function of a color filter (151). The microlens may be replaced with a Fresnel lens.

Also, if the microlens (641) is formed between pixel electrodes (14), the same effect as the BM (202) formed between pixel electrodes (14) can be obtained.

In the twelfth display panel of the present invention, thin film or thick film consisting of resin is formed on the lower layer of a counter electrode or a pixel electrode, and the film thickness of a liquid crystal layer (21) is varied according to the color of the pixel electrode (14). A red pixel is made thicker in film thickness than a blue pixel. Preferably, the average particle diameter of the waterdrop-like liquid crystal of the red pixel is made larger than that of the waterdrop-like liquid crystal of the blue pixel.

In the thirteenth display panel of the present invention, a reflecting surface with irregularities, for example, is formed on one side of the substrate of the display panel. Alternatively, irregularities are formed on a surface (counter electrode 25 or pixel electrode 14) contacting a liquid crystal layer, and a color filter (151) is formed on the irregular surface.

In the fourteenth display panel of the present invention, a pixel electrode (14) is formed from ITO, and on the ITO a dielectric mirror (891) is formed. If voltage is applied to the pixel electrode (14), a liquid crystal layer (21) will be caused to be in a light transmitting state. The correction of a pixel defect is performed by (irradiating) laser light from the dielectric mirror side.

In the microlens of the present invention, a microlens array is formed, for example, by forming on a substrate a thin film pattern which becomes a core, coating a resin solution on the substrate, and by setting the resin solution. A microlens array substrate with concave or convex lenses can be formed according to the shape of the thin film pattern. Also, a reflection type microlens array can be fabricated by forming thin metal film on the aforementioned microlenses.

To narrow the directivity of light emerging from the display panel of the present invention, a microlens array or a prism sheet is arranged on a light reflecting surface or the light exit surface of the display panel. Also, a light guiding plate is arranged on the light incidence surface of the display panel.

The display panel of a fifteenth invention is constituted, for example, so that current flows through a counter electrode (25). Wires (1693) are formed on both ends of the counter electrode (25), and if a switch (1692) is closed, current will flow between wires (1693a) and (1693b). When current flows through the counter electrode (25), it is converted to heat and then, a liquid crystal layer (21) is heated and the temperature of the liquid crystal layer is raised to a predetermined value.

The driver circuit of the display panel of the present invention is constituted, for example, by transistors formed with a high-temperature polysilicon technique, a single crystal polysilicon technique, or a low-temperature polysilicon technique. Inverters of multiple stages are connected to the output of the shift register of the driver circuit. The output of the inverter of the last stage is connected to the gate of an analog switch. The analog switch outputs a video signal to a source signal line (15).

The display panel of the present invention needs to meet the following relation:

$$10D \le \frac{W}{L} \le 50D \qquad \text{[expression 14]}$$

where W is the width of the gate of a transistor constituting an inverter, L is the length of the gate, and D is the diagonal length of a display area on the liquid crystal display panel.

Also, the display panel needs to meet the following relation:

$$\frac{200D}{\mu p} \le \frac{W}{L} \le \frac{1200D}{\mu p} \qquad \text{[expression 15]}$$

where $\mu p$ (cm$^2$/V*sec) is the mobility of the P-channel transistor.

In addition, the display panel needs to meet the following relation:

$$0.25 < (W_{n-1}/L_{n-1})/(W_n/L_n) < 0.75 \qquad \text{[expression 16]}$$

where $W_{n-1}$ is the length of the gate of the (n−1) st inverter, $L_{n-1}$ is the length of the gate, $W_n$ is the width of the gate of the nth inverter of the next stage, and $L_n$ is the length of the gate.

Furthermore, the relation between the power source voltage $V_1$ for the inverter connected to the gate of the analog switch (1192) and the power source voltage $V_2$ for outputting a logic signal to the signal input terminal of the inverter needs to meet the following equation. Note that the power voltage for the shift register is $V_2$.

$$V_2 < V_1 \quad \text{[expression 17]}$$

In the display panel of a fifteenth invention, a concave lens-shaped or plate-shaped transparent substrate is mounted on a light incidence surface or light exit surface. The transparent substrate has a radiating plate mounted thereon. Also, the transparent substrate is filled with liquid or gel.

In the sixteenth display panel of the present invention, four color pixels, for example red(R), green(G), blue(B), and brightness (W) pixel are arranged in the form of a mosaic. For the pixels, signals different in polarity for each frame are written.

The defect correction method of the present invention is, for example, a defect correction method for a polymer dispersion liquid crystal display panel. In this method, laser light is irradiated on the liquid crystal layer (21) of the liquid crystal display panel to change the quality of the liquid crystal layer (21).

The defect correction apparatus of the present invention is, for examle, a defect correct apparatus for display panel which comprises observation means for detecting at least either the position of the pixel electrode (14) of a display panel or the position of the switching element (155) by infrared rays, laser light irradiation means (901) for irradiating laser light, and positioning means (911) for positioning the liquid crystal panel so that the position detected by the observation means (902) and the position at which the laser light is irradiated are superimposed with each other.

The display according to the present invention is, for example, provided with video signal processing means for computing an average amplitude value from a video signal during a video signal period in one horizontal period and then computing a first voltage from the computed average amplitude value and source signal application means for applying the first voltage to a plurality of source signal lines during a blacking period in one horizontal period.

In the first display panel drive method of the present invention, for example, an average amplitude value is computed from a video signal period in one horizontal period. Then, voltage is computed from the computed average amplitude value. The computed voltage is applied during a horizontal blanking period so that each pixel of the liquid crystal display panel has a desired transmittance.

In the second display panel drive method of the present invention, for example, the polarity of a video signal which is applied to a counter electrode (25) is inverted for each horizontal scanning period. Then, a video signal is applied from a source driver circuit (491) to a source signal line (15) with the potential of said counter electrode (21) as reference, and also the polarity of said video signal is inverted for each horizontal scanning period.

In the third display panel drive method of the present invention, for example, a video signal is converted to a digital signal and retained in memory as data. Then, the retained data is read out at a double speed and written by the display panel. In the remaining half frame (or half field) period, black display is written to the display panel at the same double speed. In other words, this method performs black display→image display→black display→image display in the recited order.

In the fourth display panel drive method of the present invention, for example, a display panel is arranged within a cylindrical light shielding member formed with slits, and an image on the display panel is gradually shut out from the upper portion of the screen.

The first display panel fabrication apparatus of the present invention is, for example, constituted so that a mixed solution (315) is, supplied to the space between a separation film 182 and a substrate (12) and pressed by a press roller (312). Ultraviolet rays (183) is supplied in the form of lines to the mixed solution 315. After phase separation of the mixed solution, the separation film (182) is wound up by a wind-up roller (314).

The second display panel fabrication apparatus of the present invention is provided, for example, with a mounting table for placing a display panel (22). The mounting table has a heater (739) for heating the panel (22) to a predetermined temperature. Liquid or gel (735) is supplied to the space between a diffusing plate (734) and the display panel (22) through a supply tube (732). The peripheral portion is sealed by seal rubber (736) so that liquid or gel does not leak. Ultraviolet rays (183) are irradiated on the display panel (22) through the light diffusing plate (734). The ultraviolet rays (183) are scattered by the diffusing plate (734) and are irradiated evenly on the entire mixed solution of the display panel.

The third display panel fabrication apparatus of the present invention is constituted, for example, so that ultraviolet rays can be irradiated from the back surface of a display panel (22). The mixed solution of the display panel (22) can be heated to a predetermined temperature by the infrared rays. On the front surface of the display panel (22) an infrared-ray reflecting plate (741) is arranged. The reflecting plate (741) reflects the infrared rays transmitted through the display panel (22) and heats a mixed solution (315) from the front surface of the display panel (22) as well. Liquid or gel (735) is supplied to the space between a diffusing plate (734) and the display panel (22) by a supply tube (732). Ultraviolet rays (183) are irradiated from the side of a counter electrode (25) formed on the front surface of the display panel (22) onto the mixed solution (315) through the diffusing plate (734). On the back surface of the display panel (22) an ultraviolet ray reflecting plate (742) is arranged. The reflecting plate (742) reflects ultraviolet rays (183) and accelerates the phase separation of the mixed solution from the back surface of the display panel as well.

In the fourth display panel fabrication apparatus of the present invention, a display panel (22) is housed within a casing (742) and the periphery of the display panel (22) is filled with liquid or gel (735). On the interior surface of the casing (742) a reflecting plate (742) is formed, and the reflecting plate reflects the ultraviolet rays (183) irradiated through a diffusing plate (734). For this reason, ultraviolet rays (183) are irregularly reflected within the casing (742), and consequently, ultraviolet rays are irradiated from the entire circumference of the display panel (22) on a mixed solution (315).

The first projection type display of the present invention is provided, for example, with a discharge light emitting lamp, a liquid crystal display panel, secondary-illuminant formation means for focusing light emitted from the discharge light emitting lamp to form a secondary illuminant, a projection lens for projecting an optical image formed by the liquid crystal display panel, first lens aperture means arranged on a light incidence side of said liquid crystal display panel, and second lens aperture means arranged on a light exit side of said liquid crystal display panel.

The relation with the effective F number F of the projection lens needs to meet the following equation:

$$\frac{3DG}{2L} \le F \le \frac{4DG}{L} \quad \text{[expression 18]}$$

$$G = \pi B / E$$

where D (inch) is the diagonal length of the display area of the liquid crystal display panel and L (mm) is the arc length of the discharge light emitting lamp.

In the second projection type display of the present invention, a display panel with color filters in the form of a mosaic is employed as a light valve. On the exit side of a light source (1414) a color purity enhancing filter (1412) for enhancing color purity is arranged. Also, on the exit side of the display panel (22) a polarizing plate (131) is arranged, and the polarizing plate (131) is detachable from an optical axis (1416).

The third projection type display of the present invention is constituted so that an infrared-ray cut filter (1702) is detachable from an optical axis (1416). It is preferable that an infrared-ray absorbing filter (1703) be arranged on the light incidence surface of a display panel (22). In the case of low temperature, the infrared-ray cut filter (1703) is not inserted in the optical axis (1416) immediately after the lamp is lit. For this reason, the display panel (22) is heated by radiation heat and the temperature of the liquid crystal layer (21) is quickly raised. The temperature of the liquid crystal layer (21) is detected by a temperature sensor (745). If the temperature of the liquid crystal layer (21) reaches a predetermined value, the infrared-ray cut filter (1702) will be inserted in the optical axis (1416).

In the fourth projection type display of the present invention, for example, a rotary filter (1414) is arranged in an optical axis (1416). The rotary filter 1414 is formed by bonding a polarizing plate (131) to a substrate. However, the quarter area does not have the polarizing plate (131). The rotary filter (1414) is constituted so that it is rotatable on a rotational center (2023). If the rotary filter (1414) is rotated, the direction of the polarization axis (132) of the transmission range (2022) of light which is projected onto a screen (1501) will be changed. The rotary filter 1414 rotates in synchronization with the vertical synchronizing signal (VS) in a video signal. The rotary filter (1414) is rotated 90° for each vertical period. Also, an image for the right eye and an image for the left eye are switched for each frame and displayed on the display panel (22).

In the fifth projection type display of the present invention, for example, at least either the distance between a display panel (22) and a lamp (1411a) or the distance between the display panel (22) and a projection lens (1415) can be contracted. This projection type display is also provided with a mechanism for fine adjustment of lamp position. When the projection type display is carried, the overall length thereof is contracted. When the projection type display is used, the overall length is extended so that an image on the display panel (22) can be projected onto a screen by a projection lens.

BRIEF DESCRIPTION OF THE DRAWINGS

FIG. 13 is an explanatory diagram as polarizing plates are arranged in the light incidence and emergence of the display panel of the present invention;

FIG. 83 is an explanatory diagram of the fabrication method of the liquid crystal display panel of the present invention shown in FIG. 82;

FIG. 114 is an explanatory view of the liquid crystal display panel in another embodiment of the present invention;

FIG. 120 is an explanatory diagram of the drive method of the liquid crystal display panel of the present invention;

FIG. 121 is a block diagram of the drive circuit of the liquid crystal display panel of the present invention;

FIG. 122 is an explanatory diagram explaining the drive method of the liquid crystal display panel of the present invention;

FIG. 123 is an explanatory diagram explaining the drive method of the liquid crystal display panel of the present invention;

FIG. 124 is an equivalent circuit diagram of the drive circuit of the display panel of the present invention;

FIG. 125 is an explanatory diagram of the drive circuit of the display panel of the present invention;

FIG. 126 is an explanatory diagram of the drive circuit of the display panel of the present invention;

FIG. 127 is an explanatory diagram of the drive circuit of the display panel of the present invention;

FIG. 128 is an explanatory diagram of the drive method of the display panel of the present invention;

FIG. 129 is an explanatory diagram of the drive method of the display panel of the present invention;

FIG. 130 is an explanatory diagram of the drive method of the display panel of the present invention;

FIG. 131 is an explanatory diagram of the drive method of the display panel of the present invention;

Figure 132:
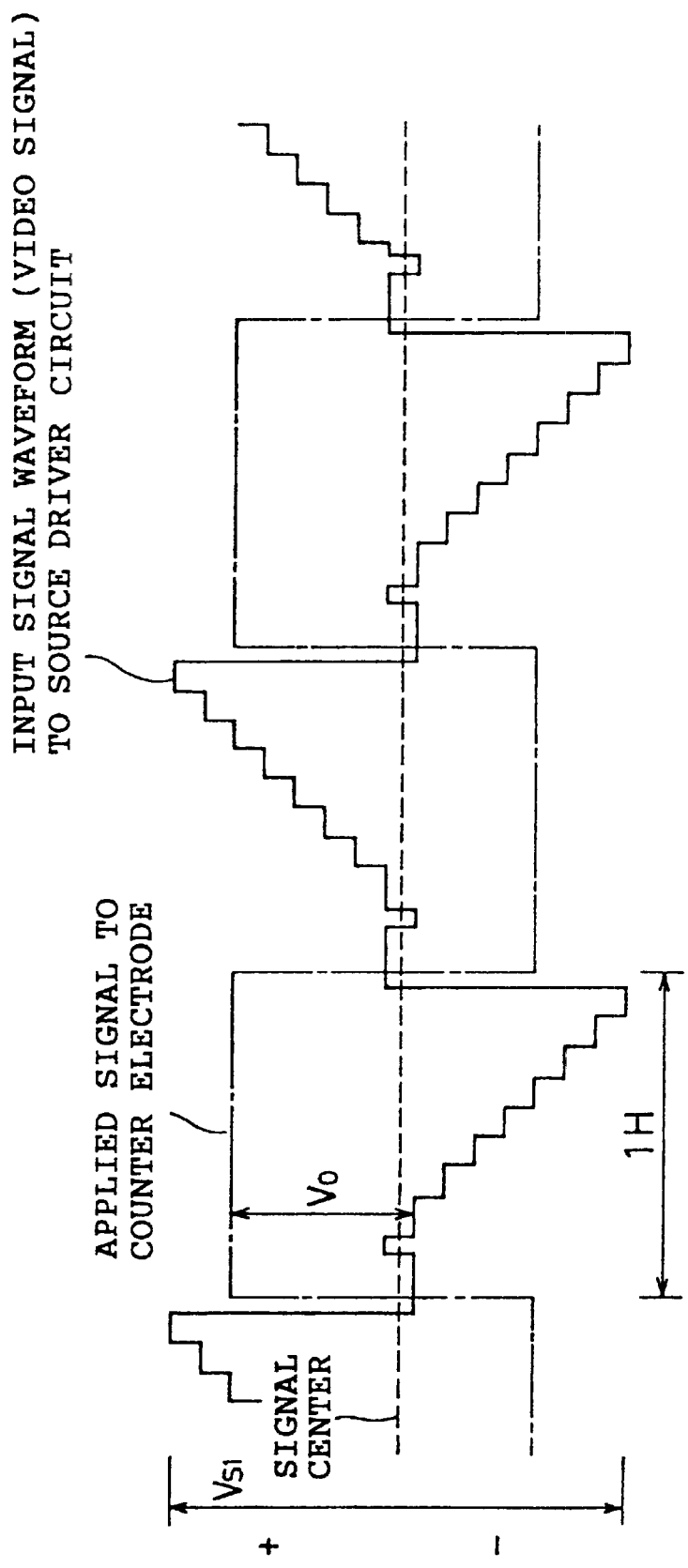
Figure 133:
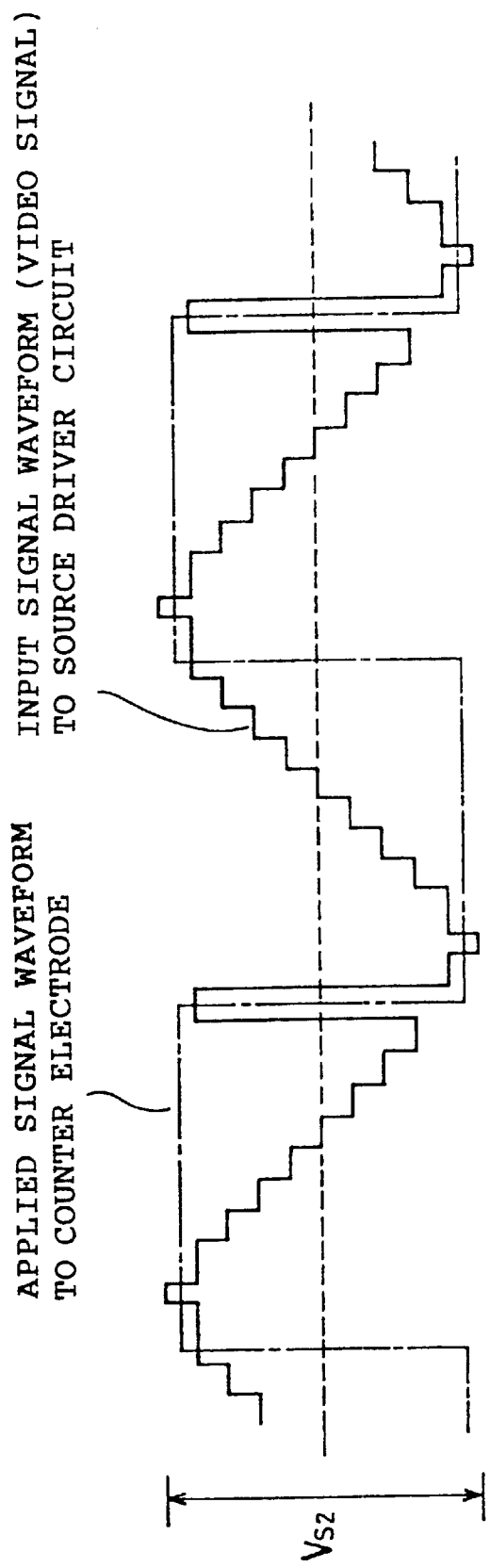
Figure 134:
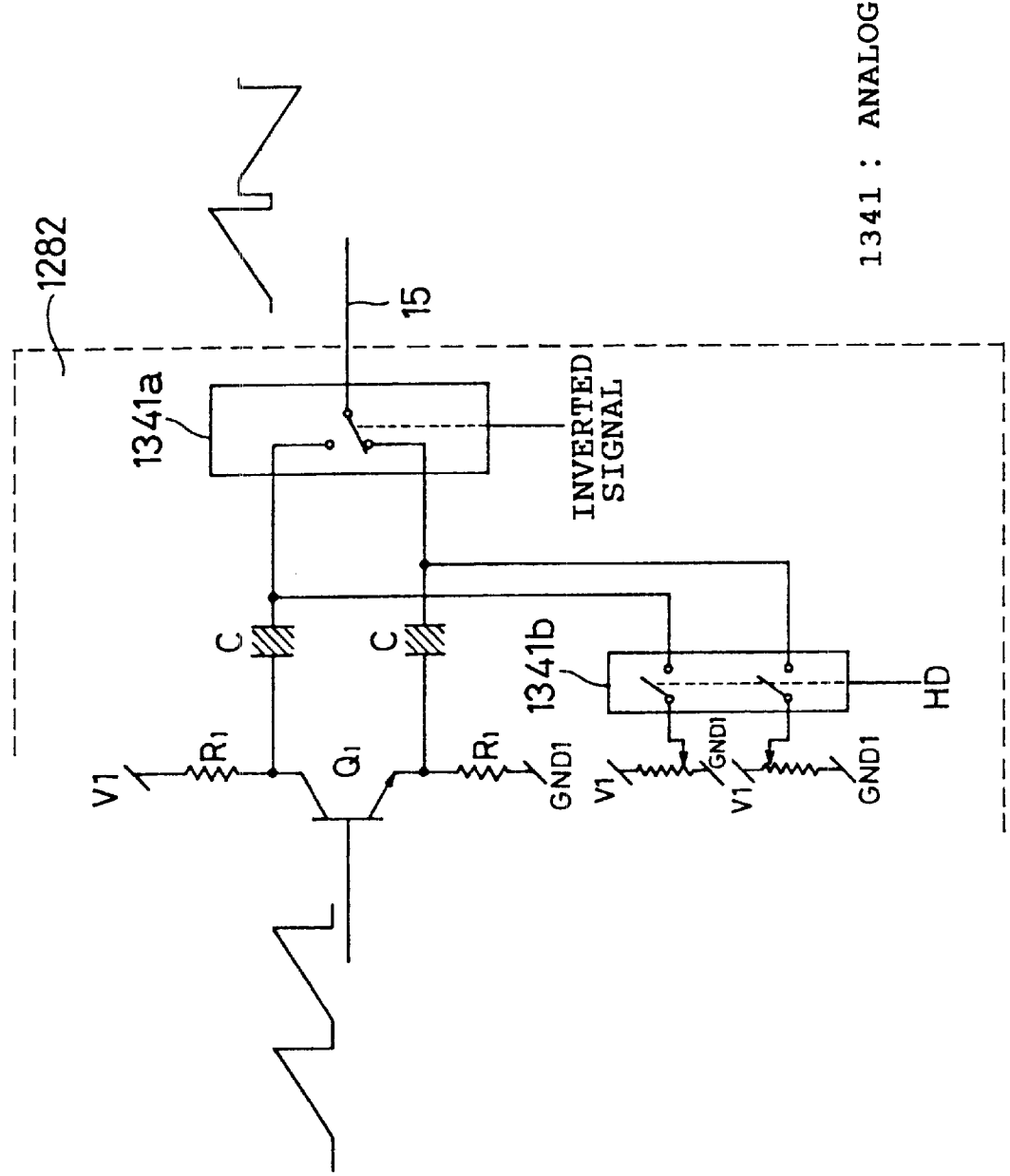
Figure 135:
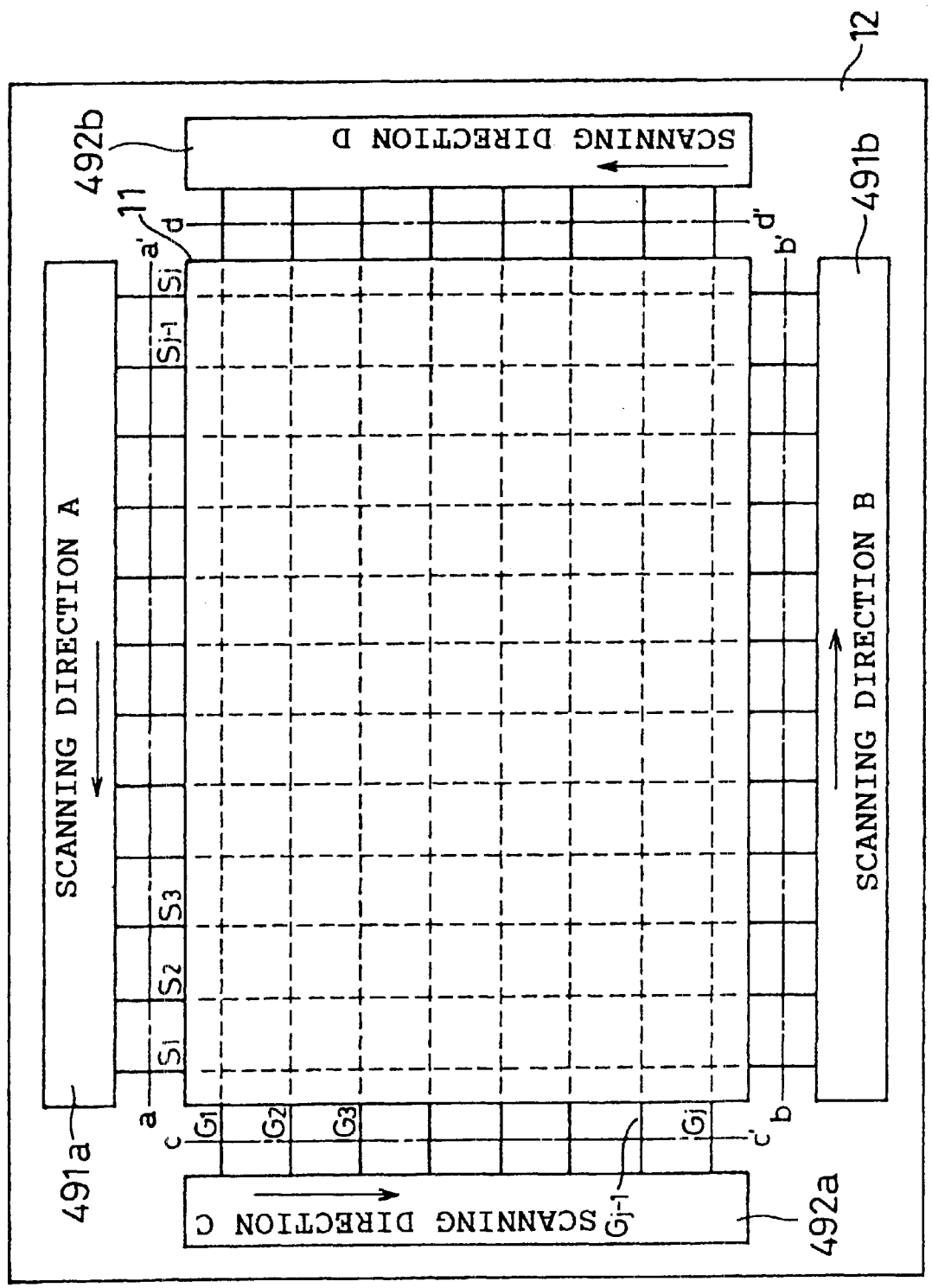
Figure 136:
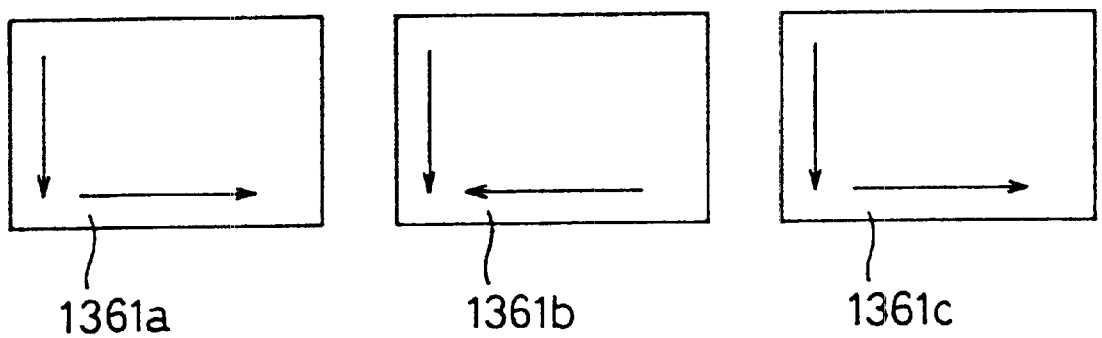
Figure 137:
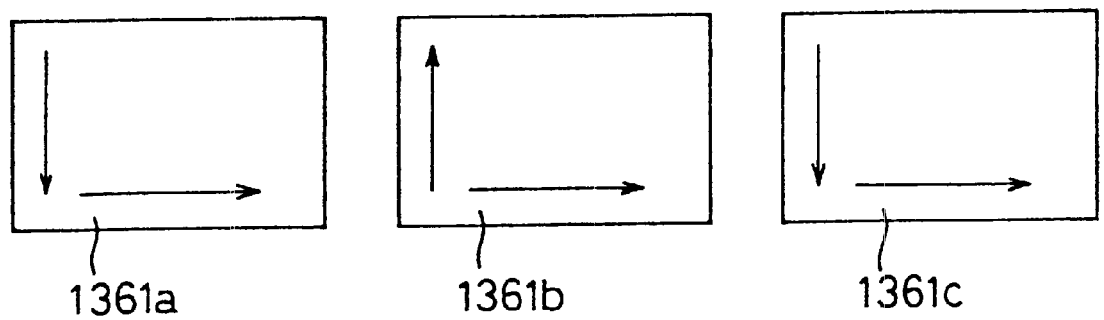
Figure 138:
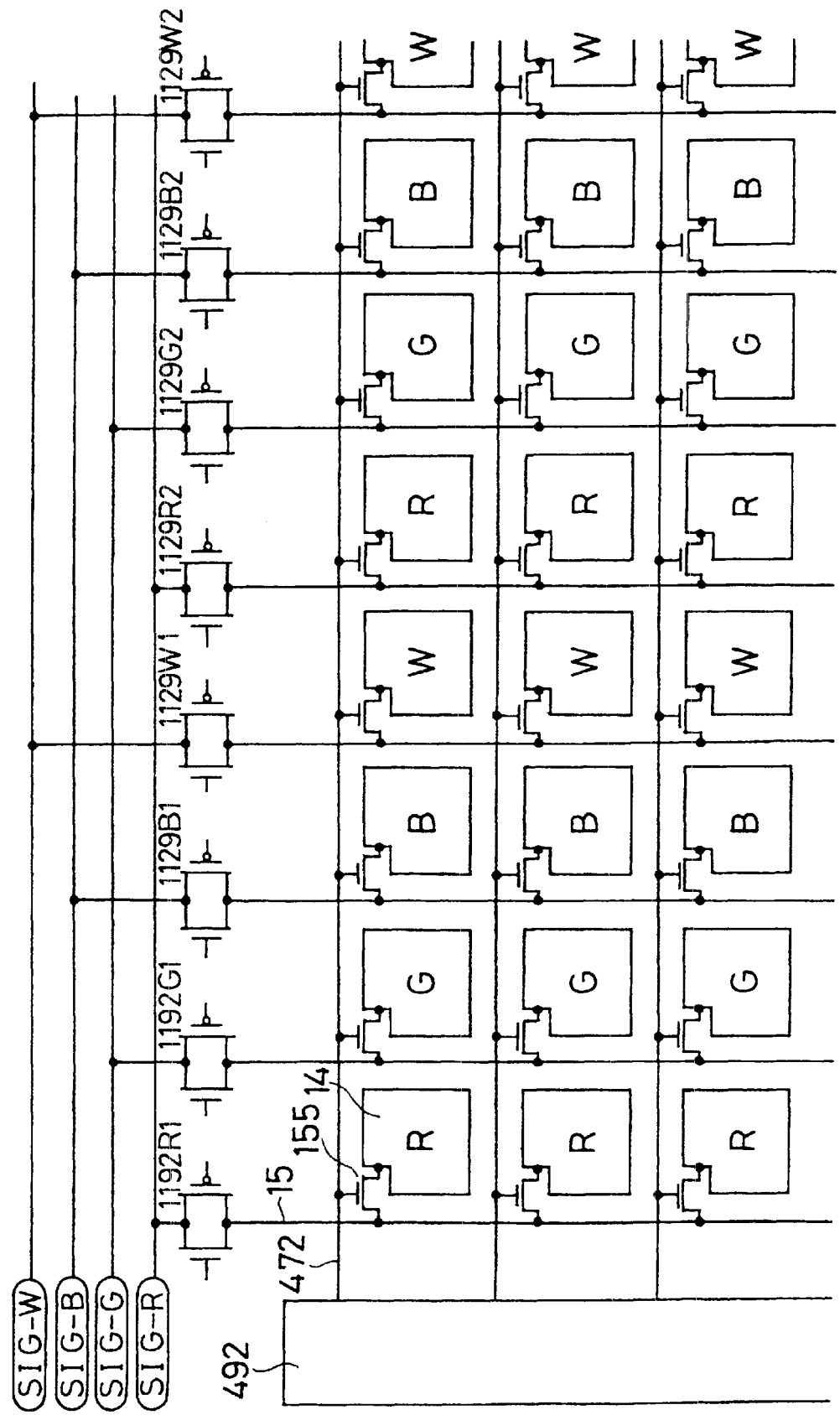
Figure 142:
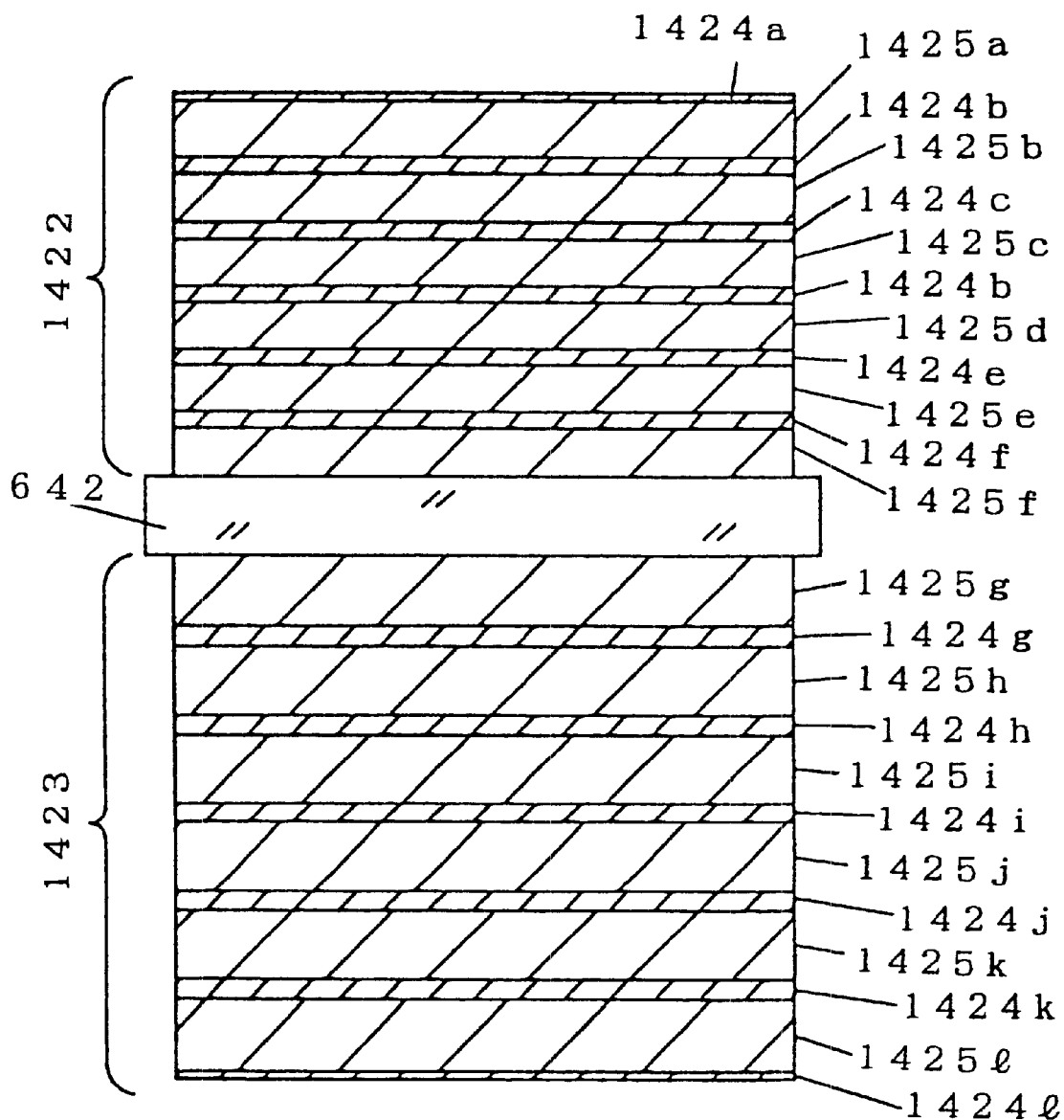

FIG. 132 is an explanatory diagram of the drive method of the display panel of the present invention;

FIG. 133 is an explanatory diagram of the drive method of the display panel of the present invention;

FIG. 134 is an explanatory diagram of the drive method of the display panel of the present invention;

FIG. 135 is an explanatory diagram of the drive method of the display panel in another embodiment of the present invention;

FIG. 136 is an explanatory diagram of the drive method of the display panel in another embodiment of the present invention;

FIG. 137 is an explanatory diagram of the drive method of the display panel in another embodiment of the present invention;

FIG. 138 is an explanatory diagram of the drive method of the display panel in another embodiment of the present invention;

FIG. 139 is an explanatory diagram of the drive method of the display panel in another embodiment of the present invention;

FIG. 140 is an explanatory diagram of the drive method of the display panel in another embodiment of the present invention;

FIG. 141 is a constitution diagram of the projection =display of the present invention;

FIG. 142 is a constitution diagram of the color purity enhancing filter (optical filter)

Figure 143:
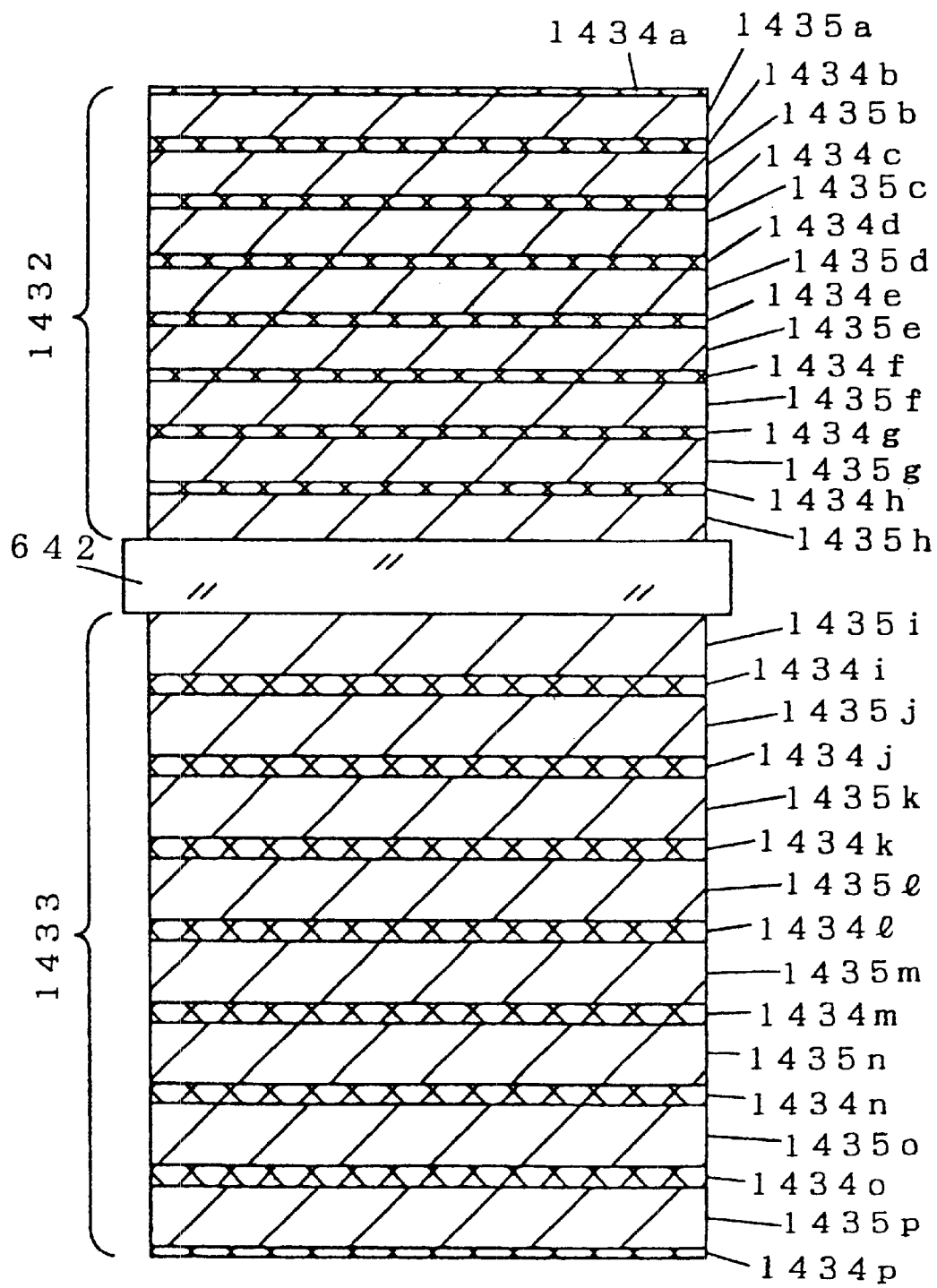
Figure 144:
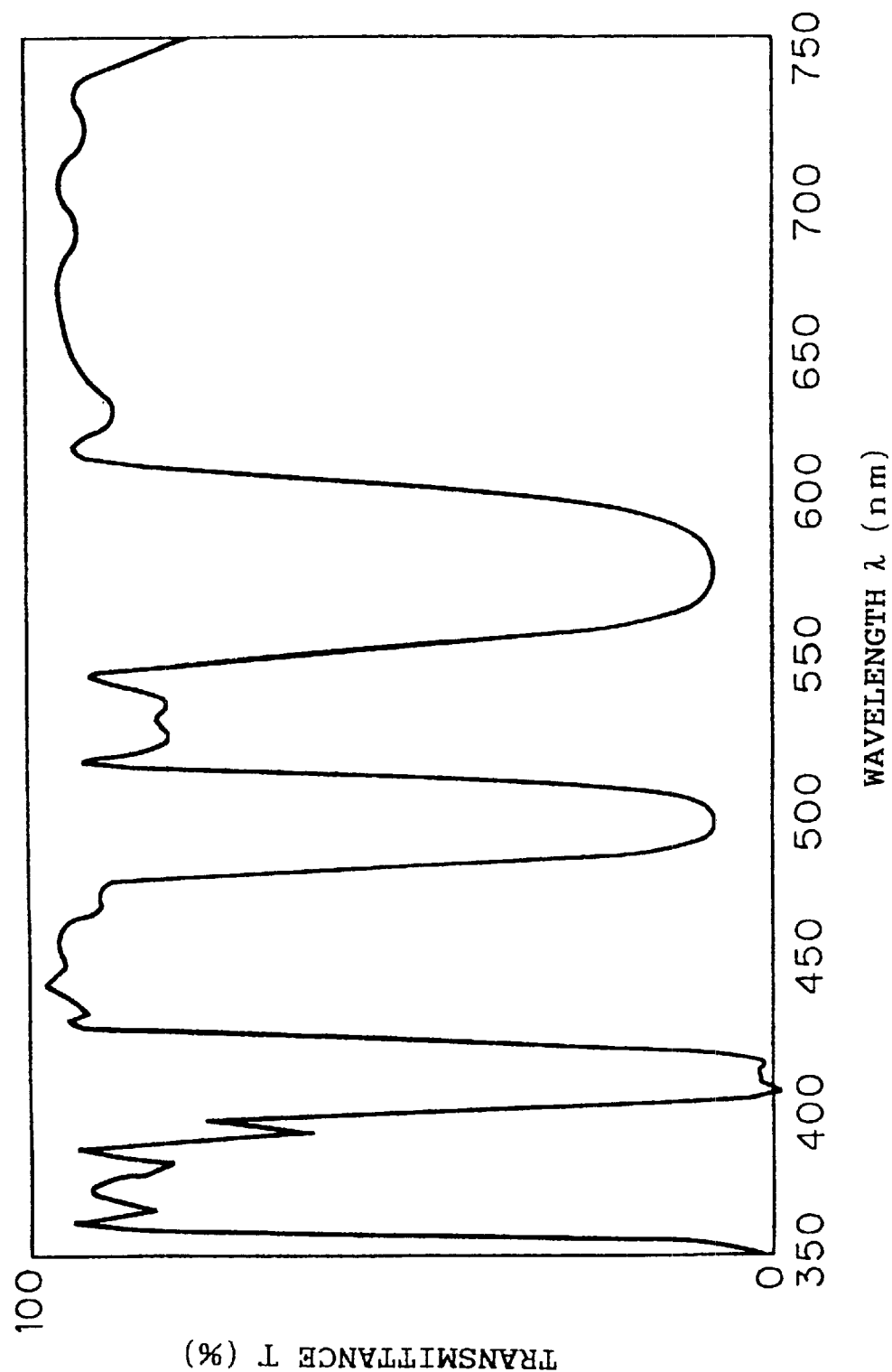
Figure 145:
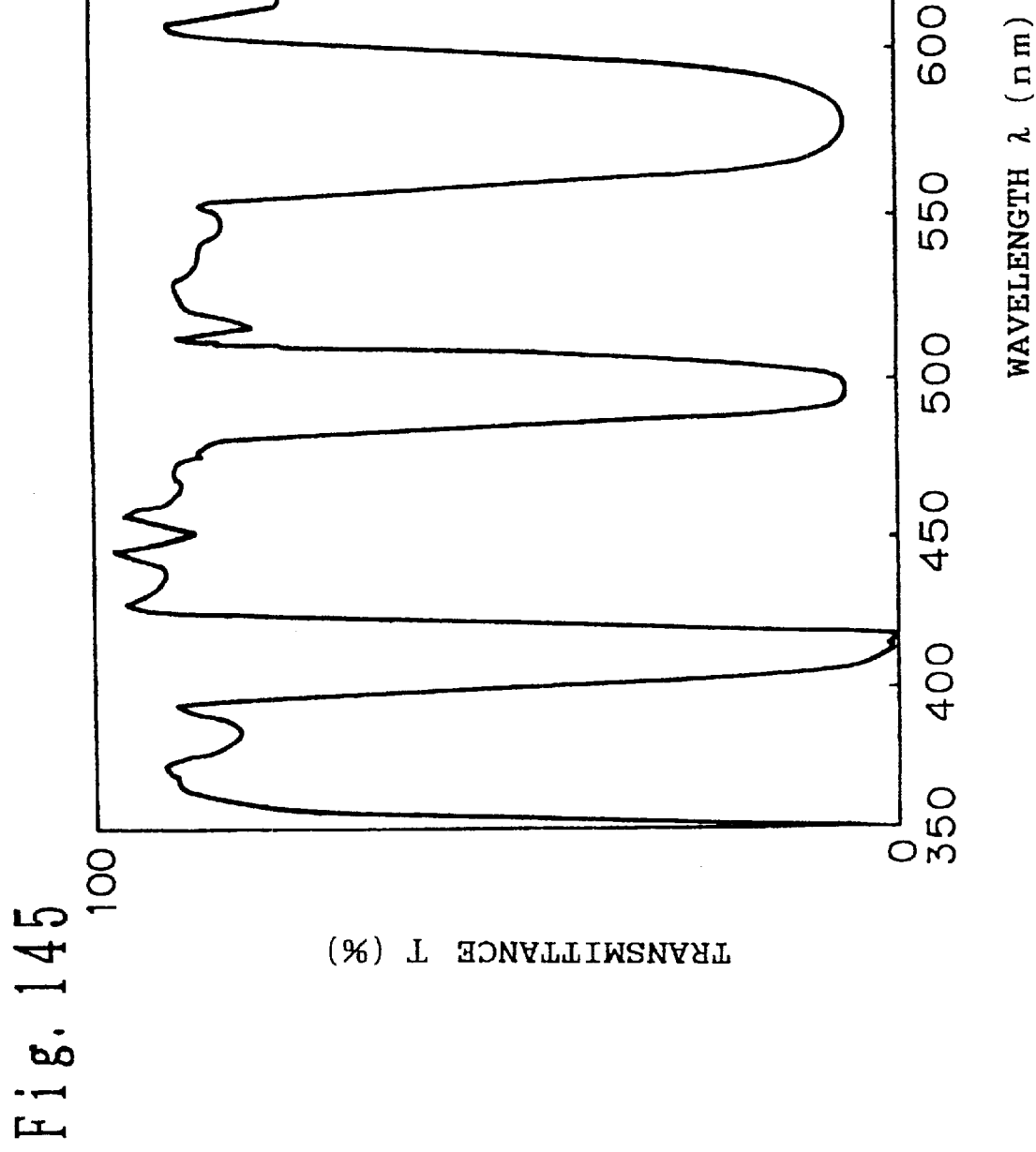
Figure 146:
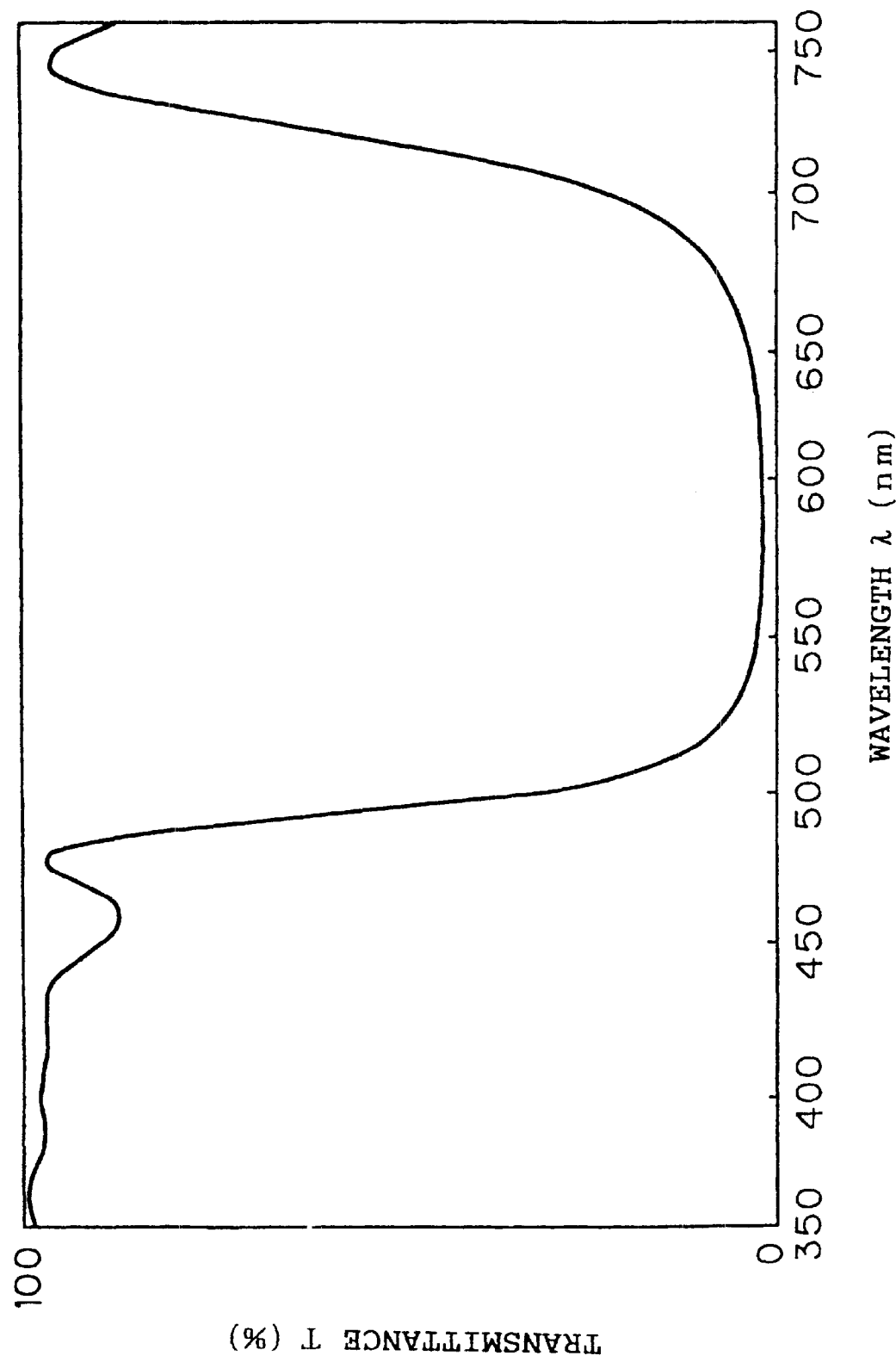
Figure 147:
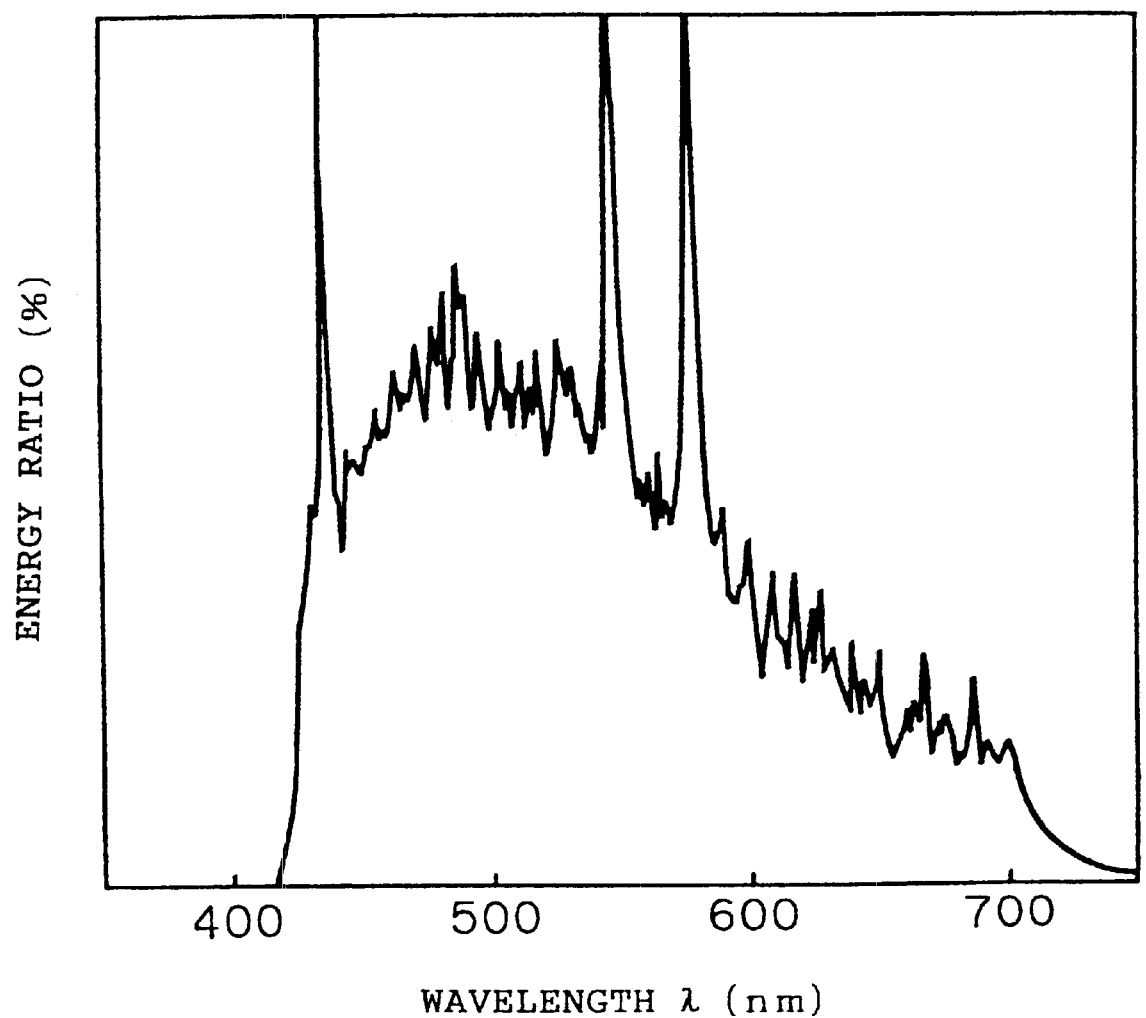
Figure 148:
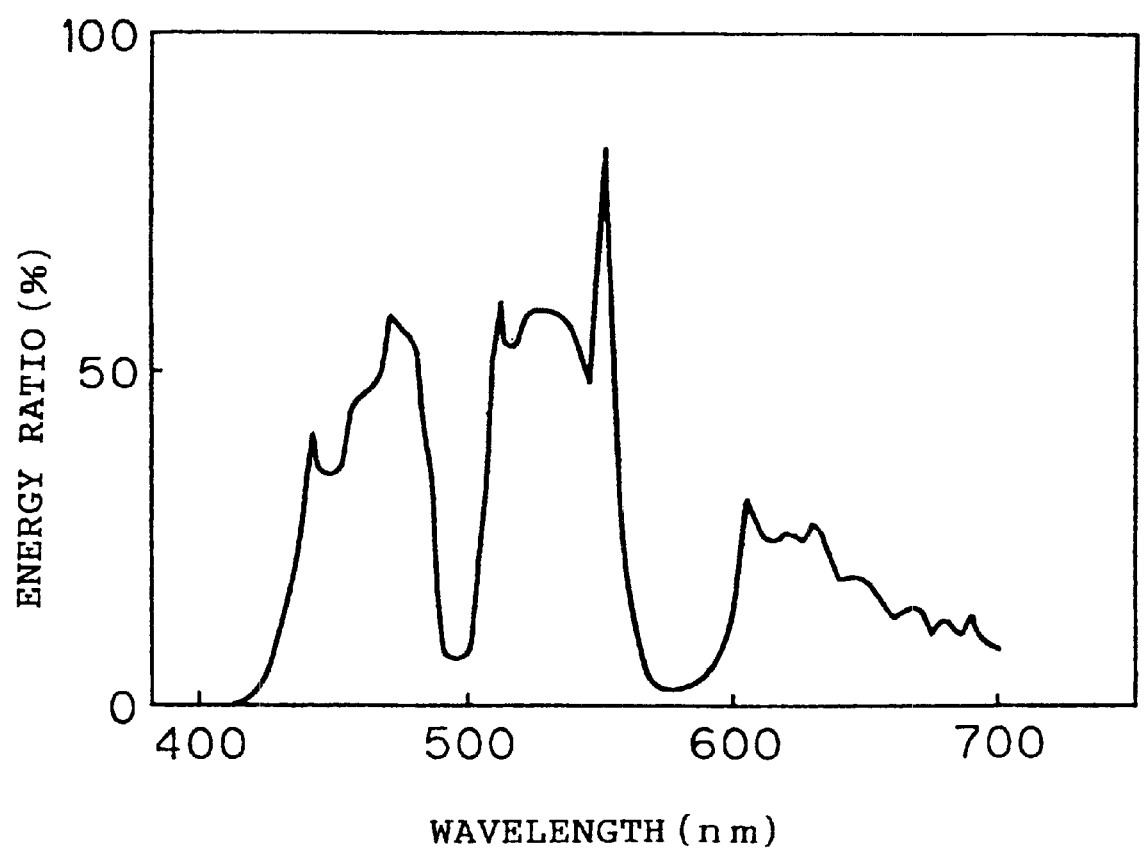
Figure 149:
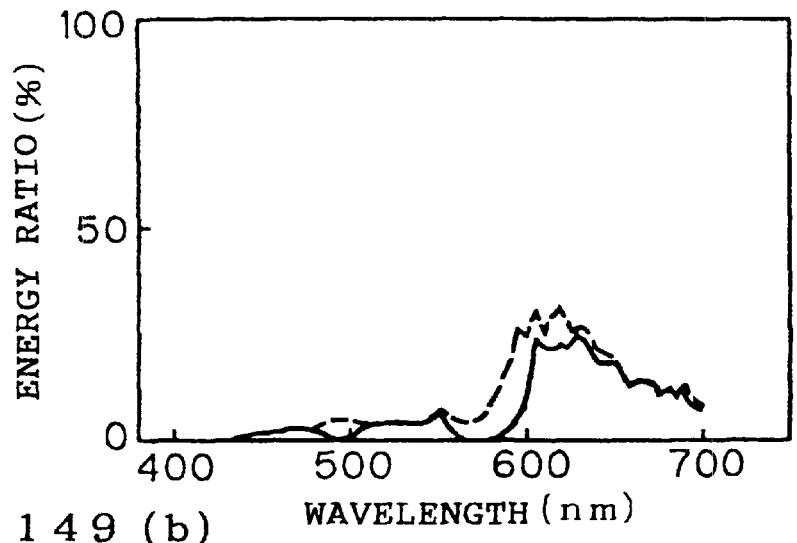
Figure 149:
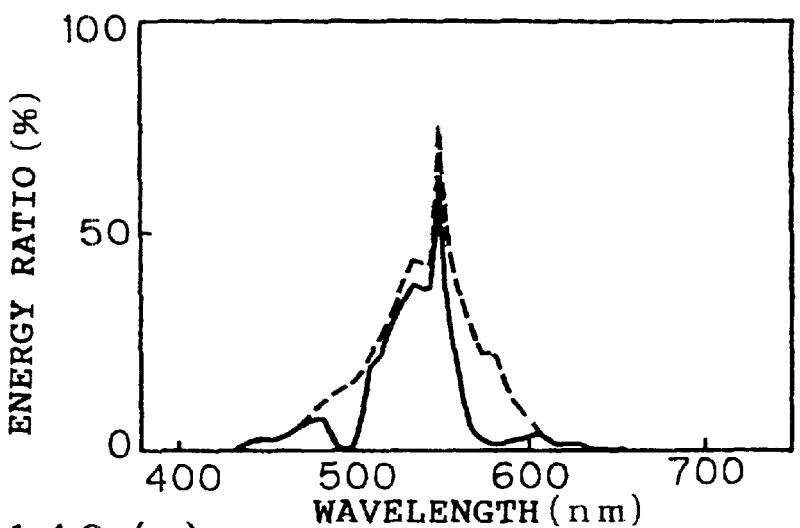
Figure 149:
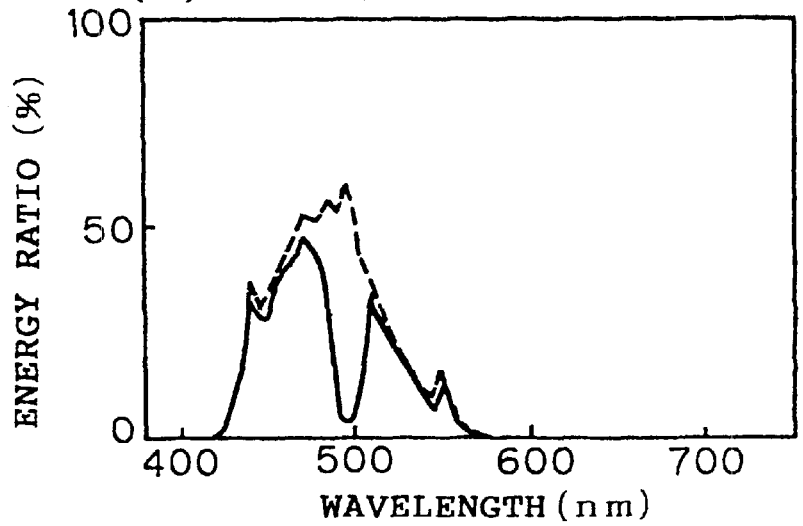
Figure 150:
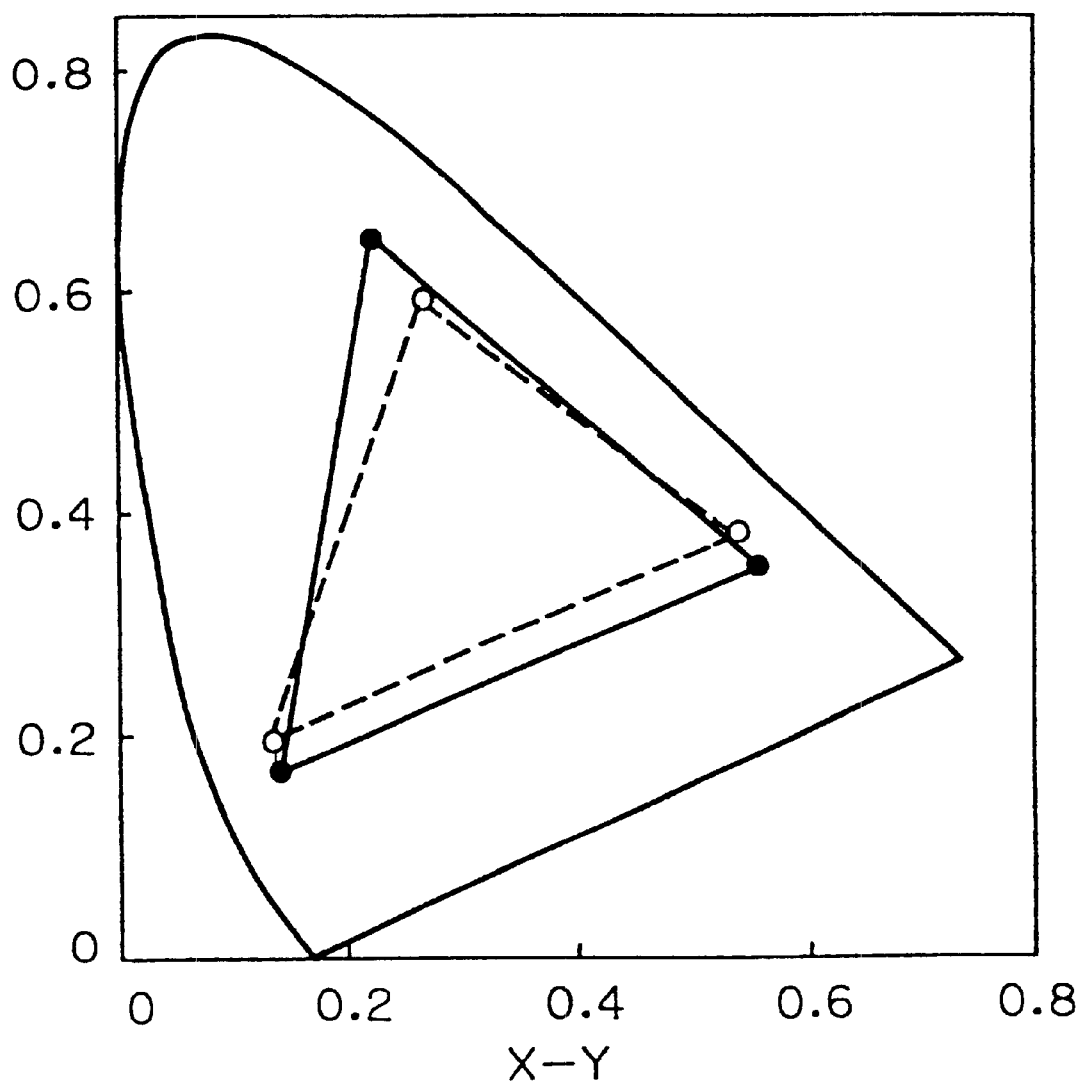
Figure 151:
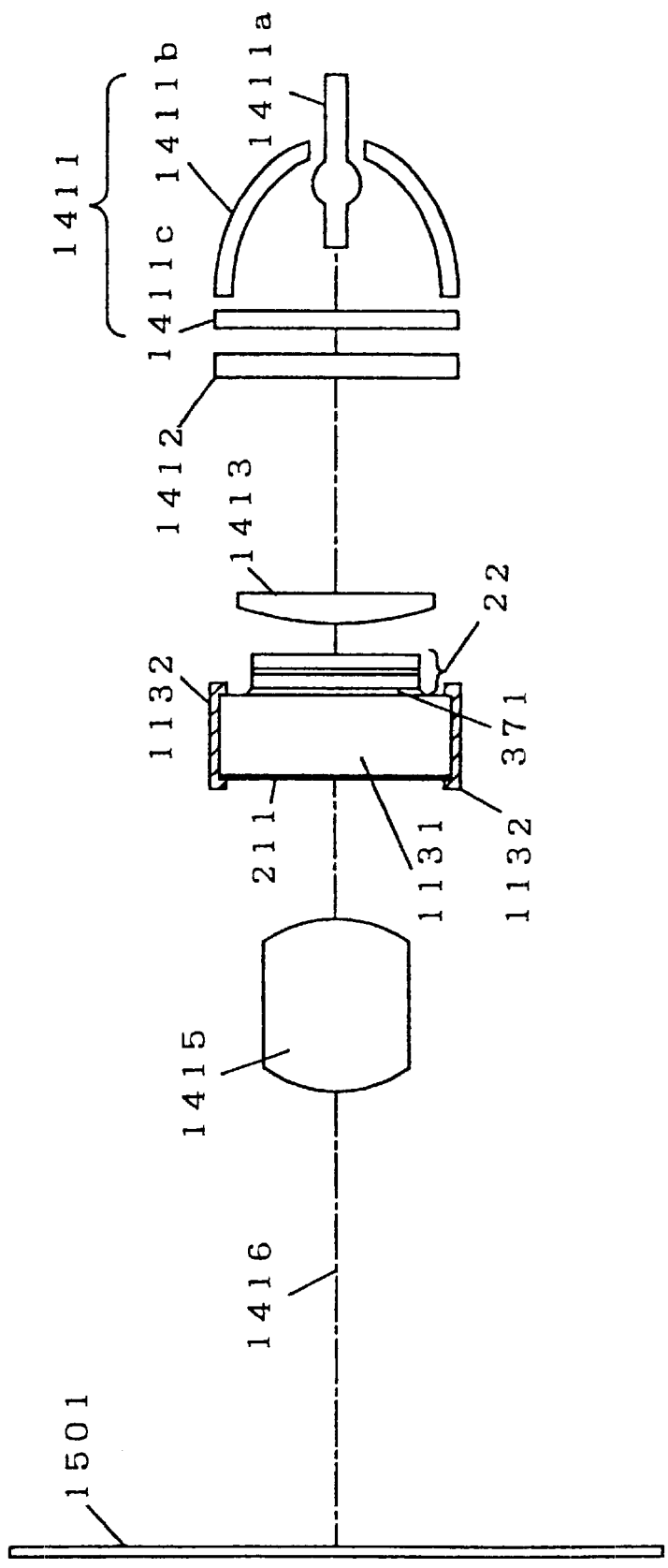
Figure 152:
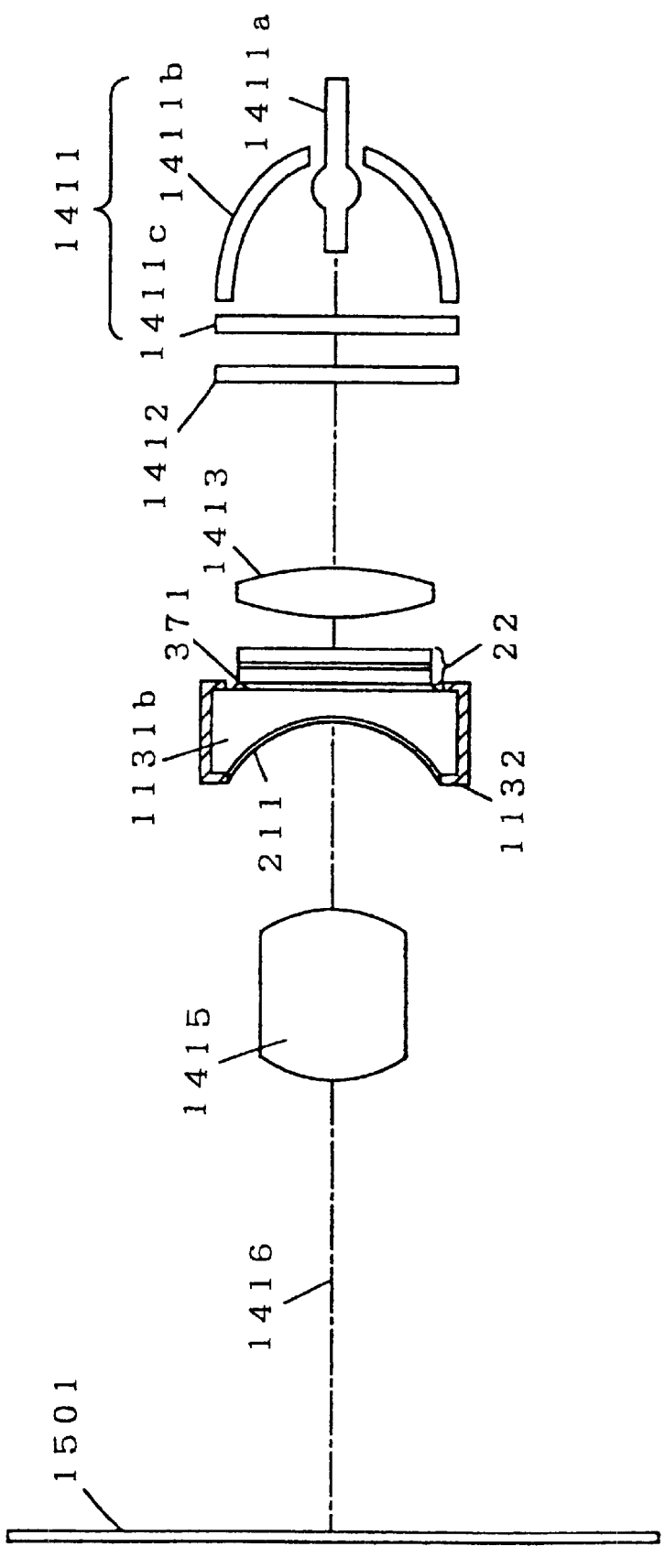
Figure 153:
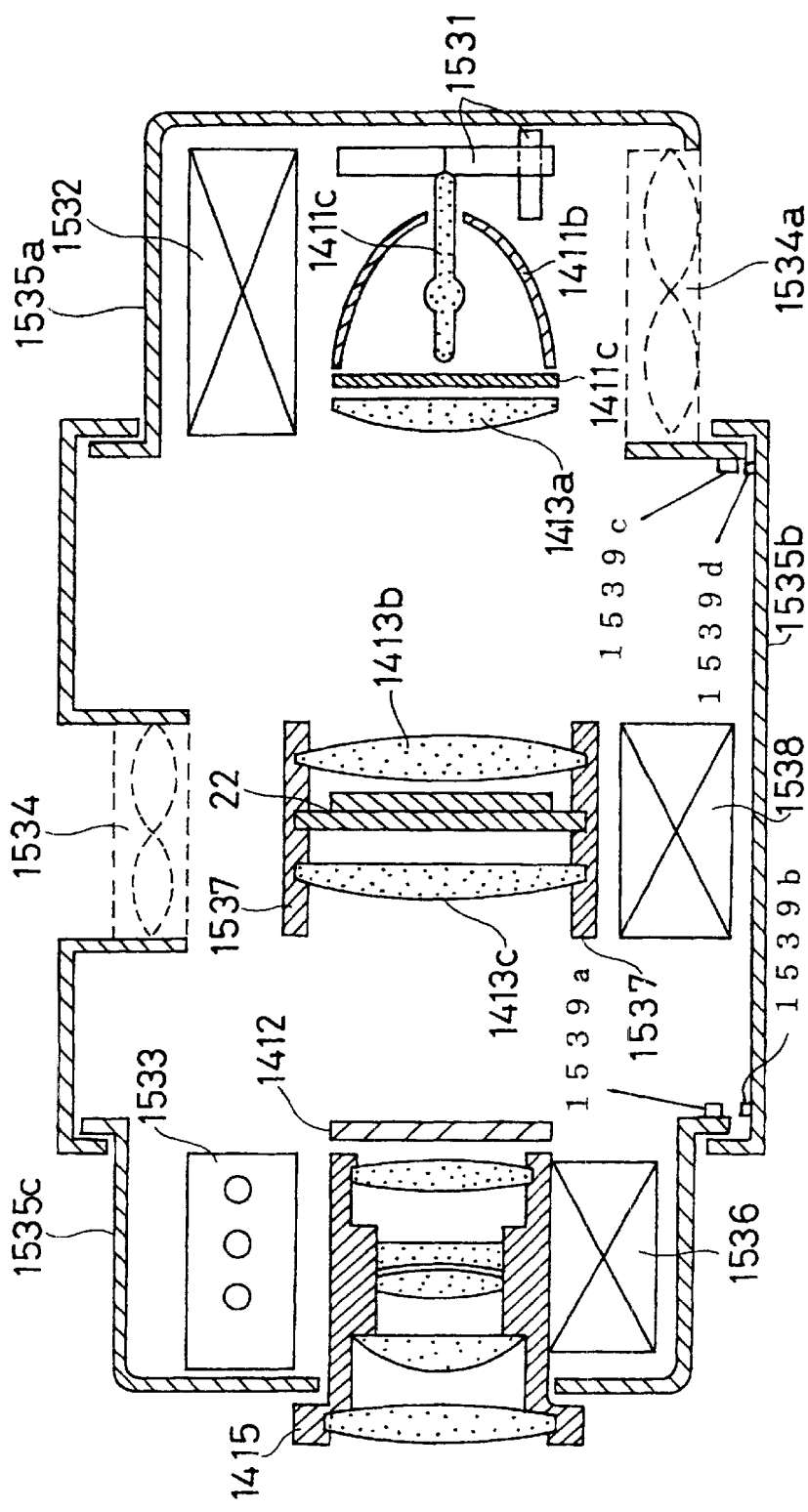
Figure 154:
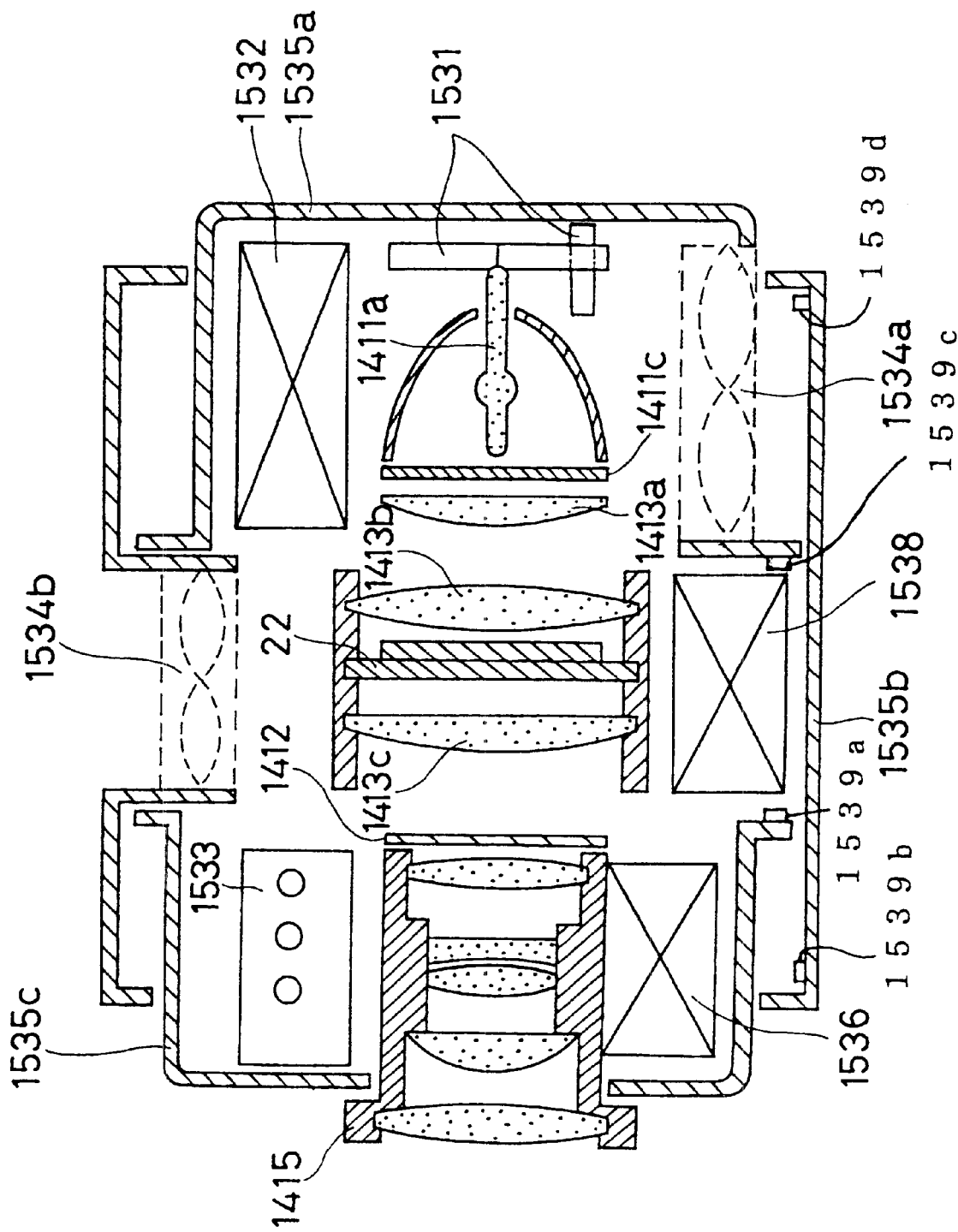
Figure 155:
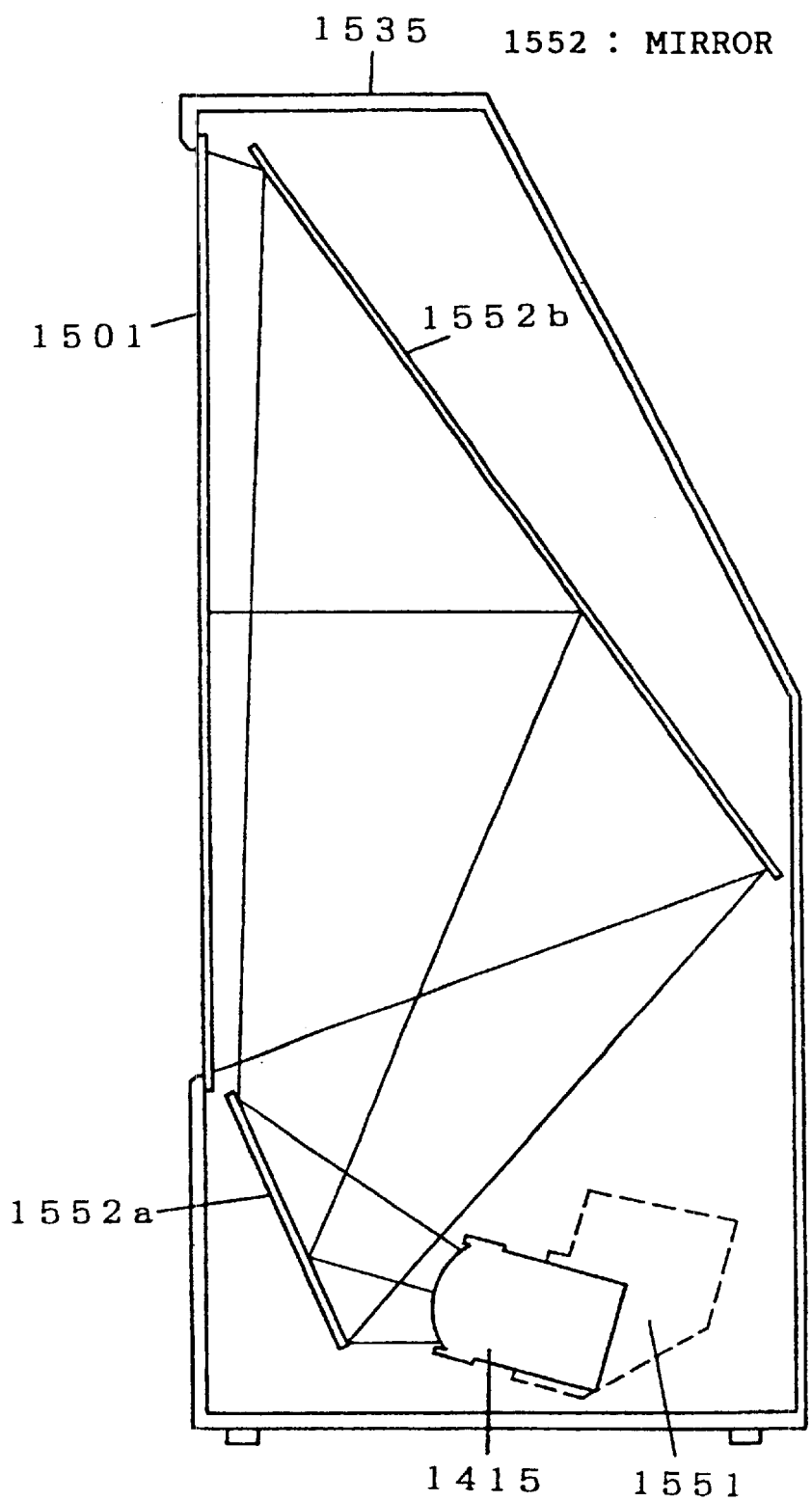
Figure 156:
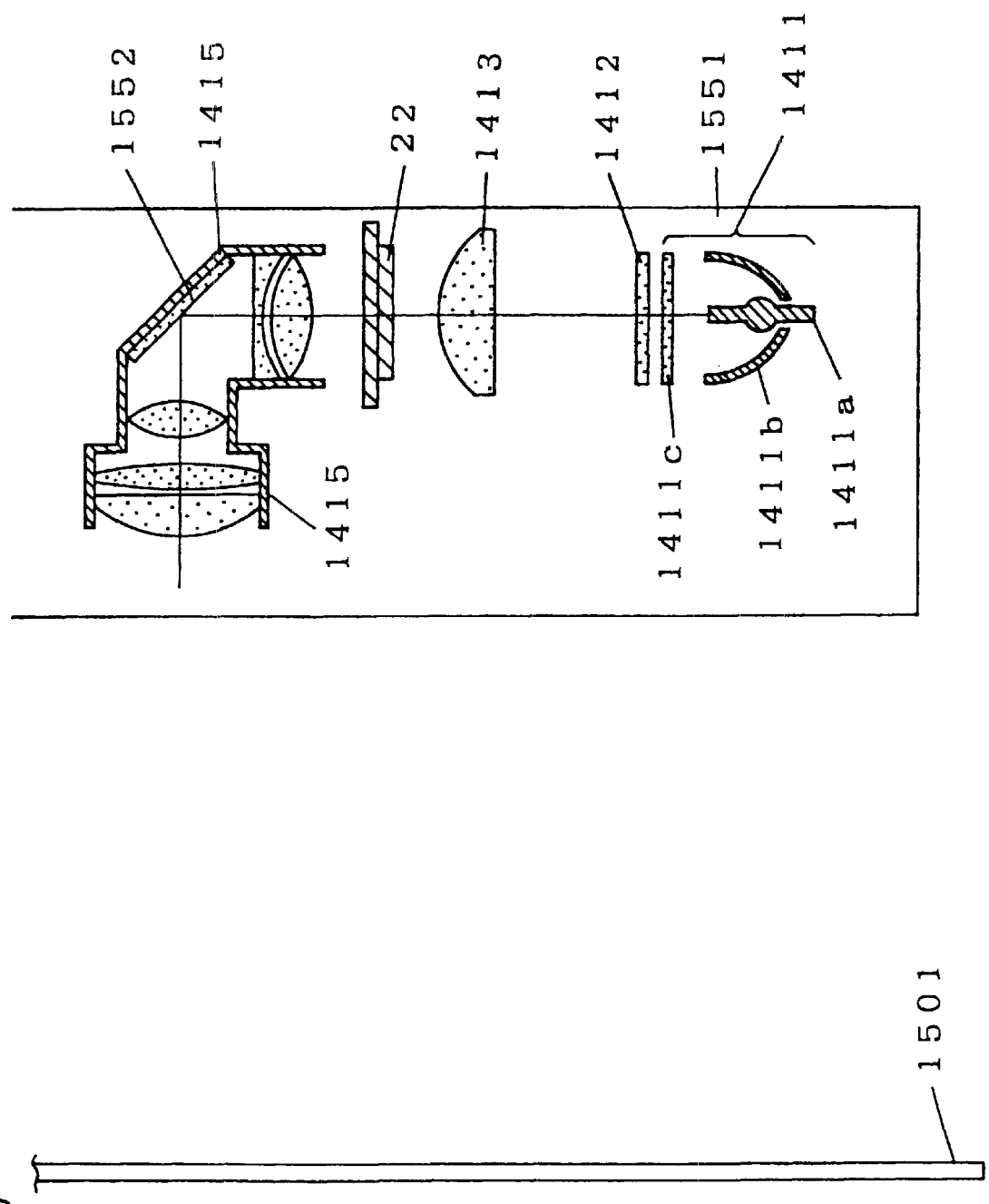
Figure 157:
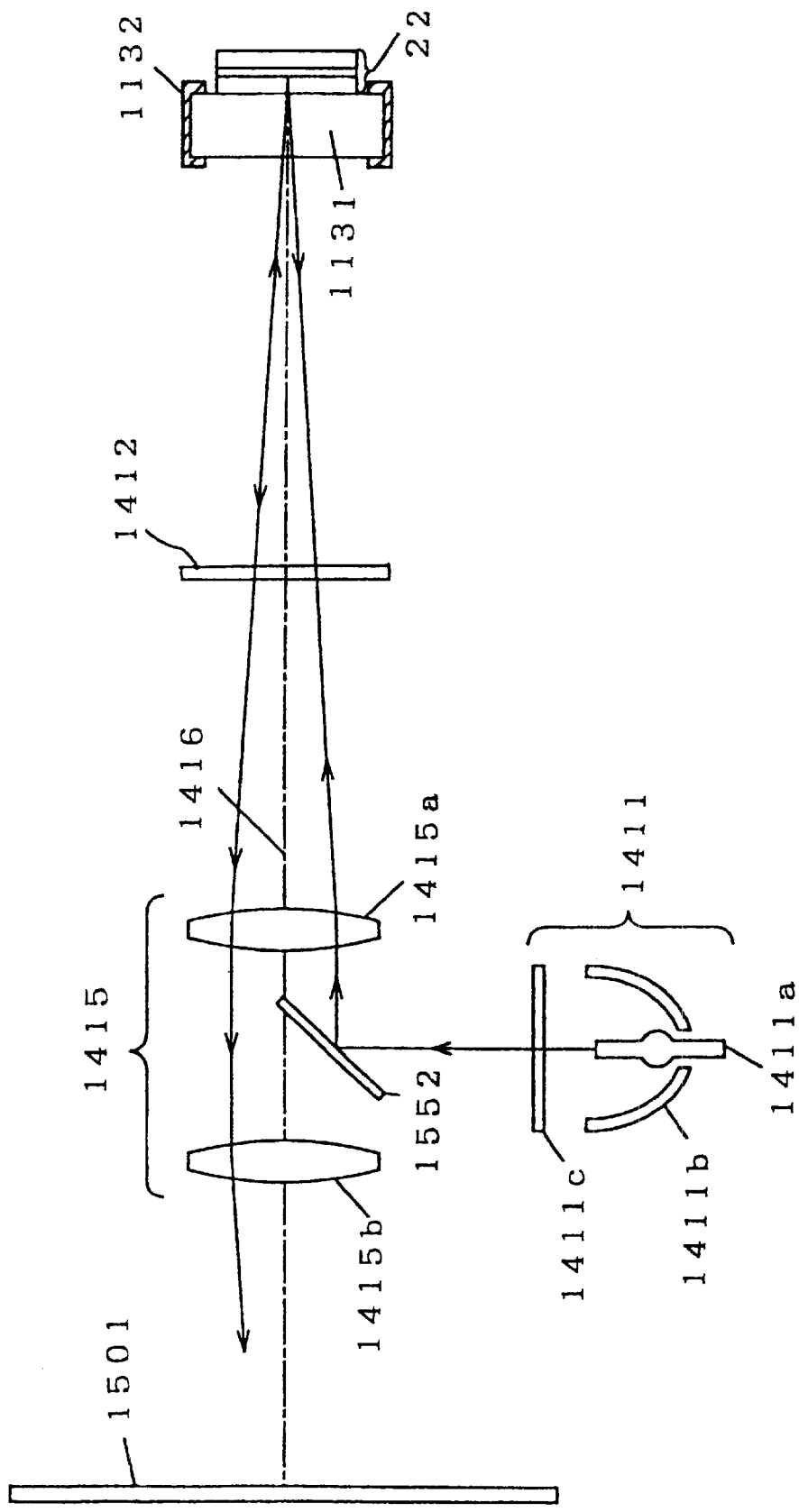
Figure 158:
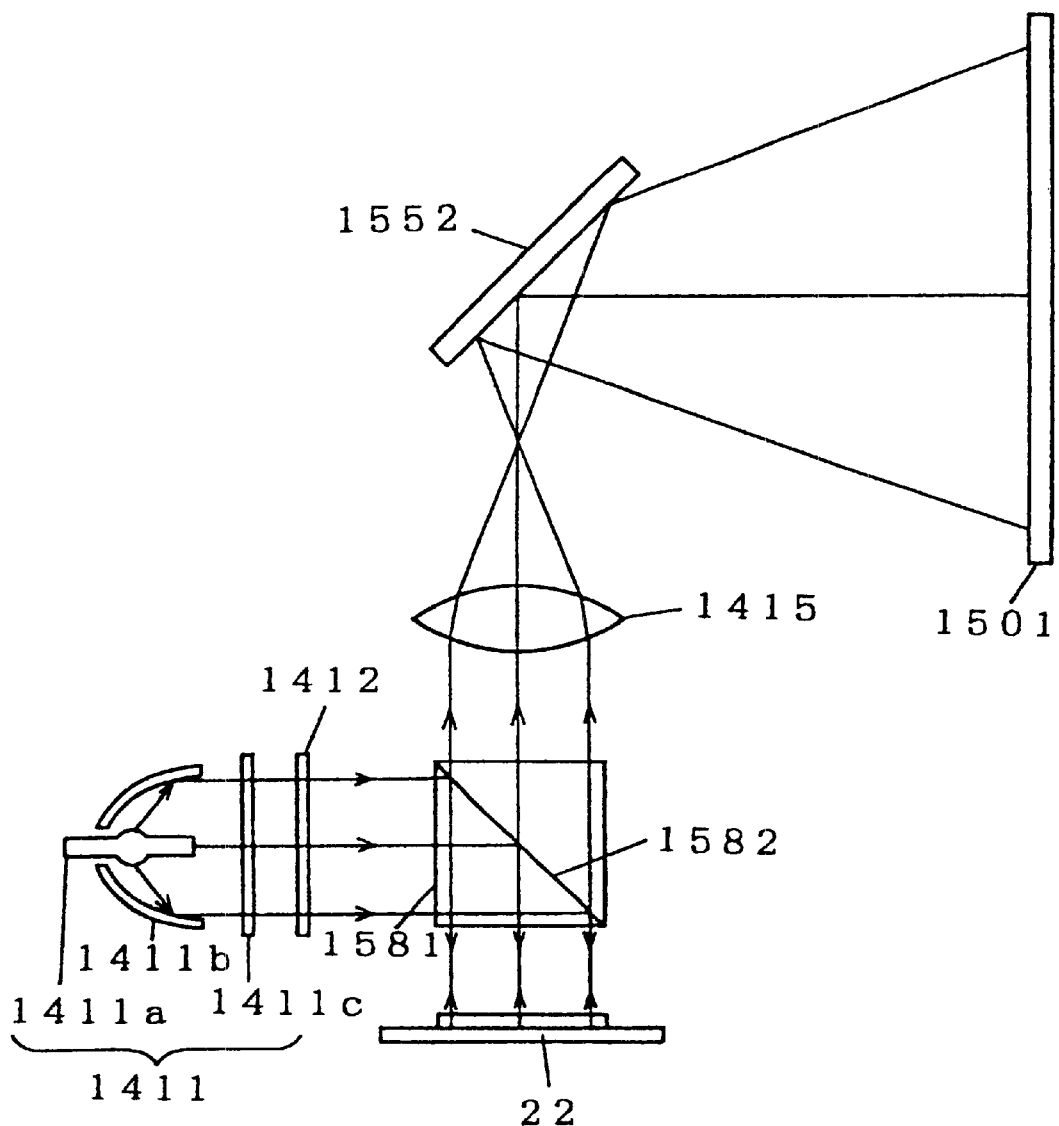
Figure 159:
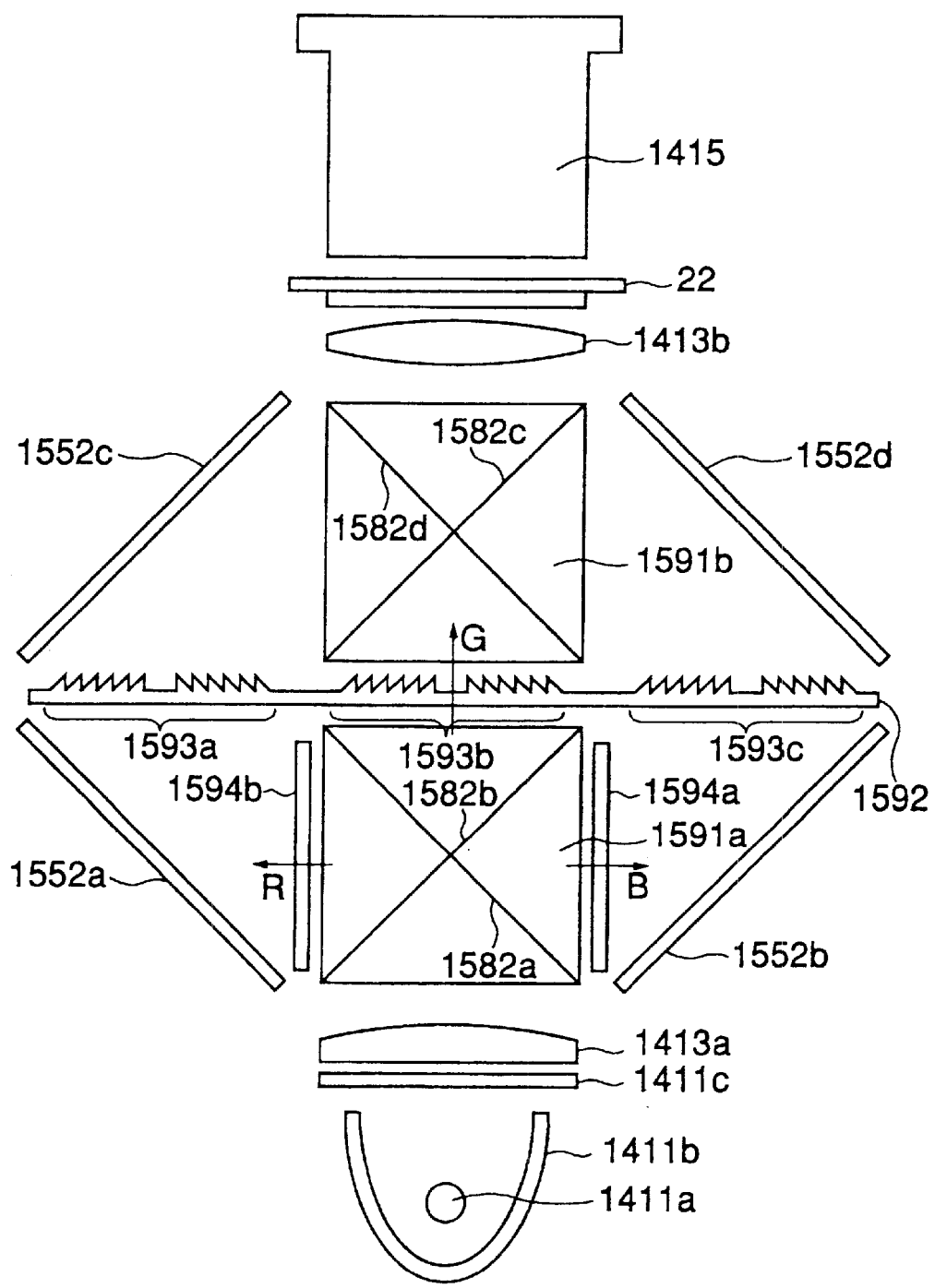
Figure 160:
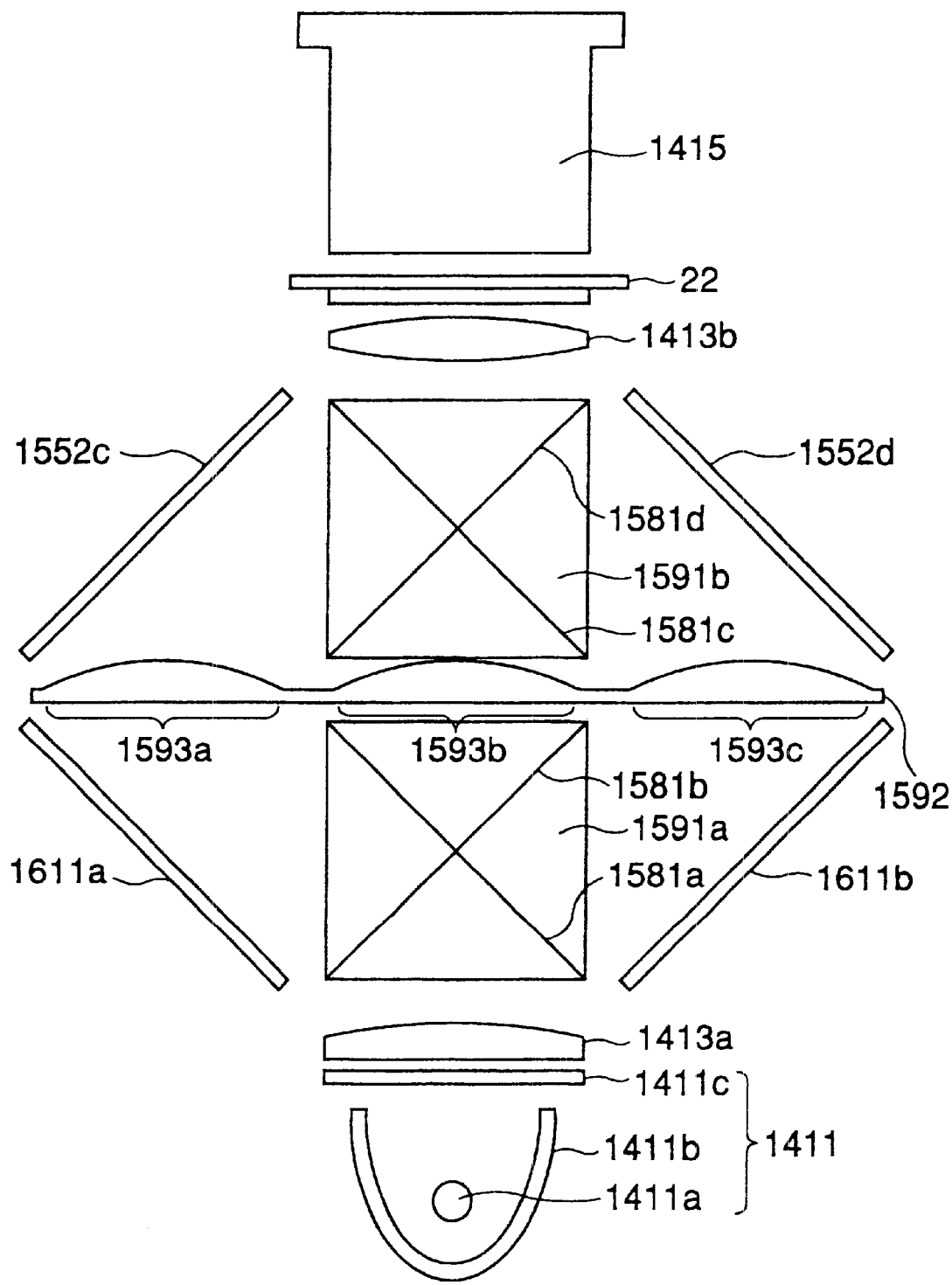
Figure 161:
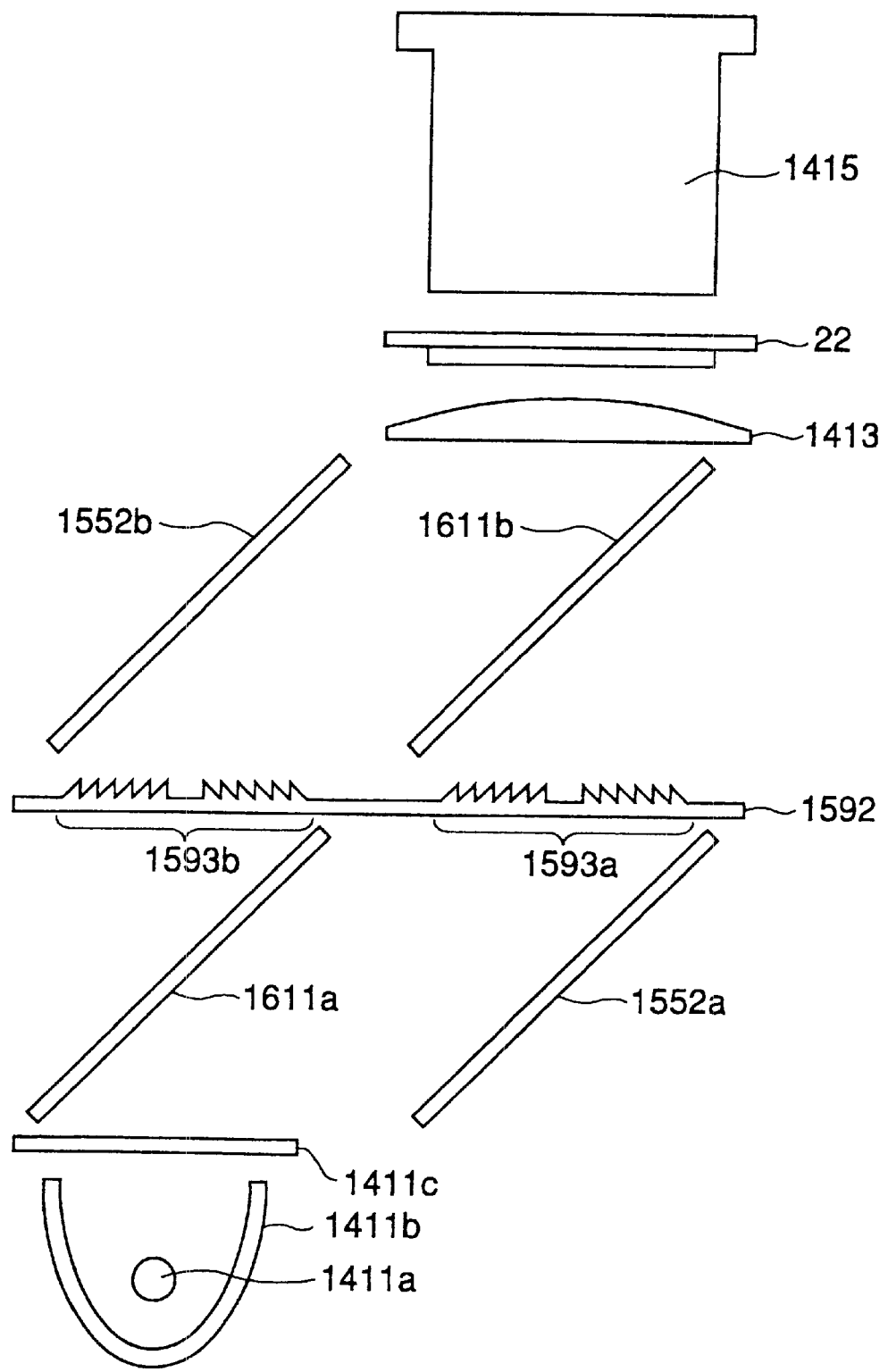
Figure 162:
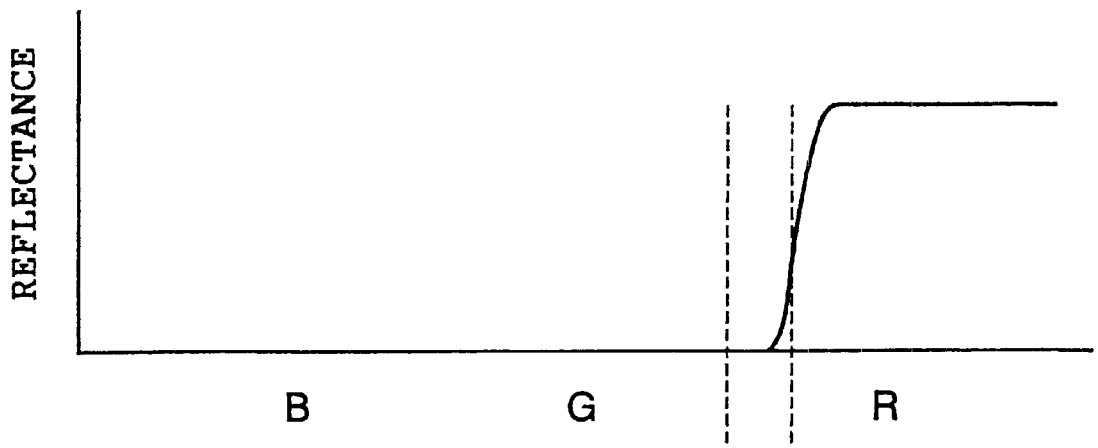
Figure 162:
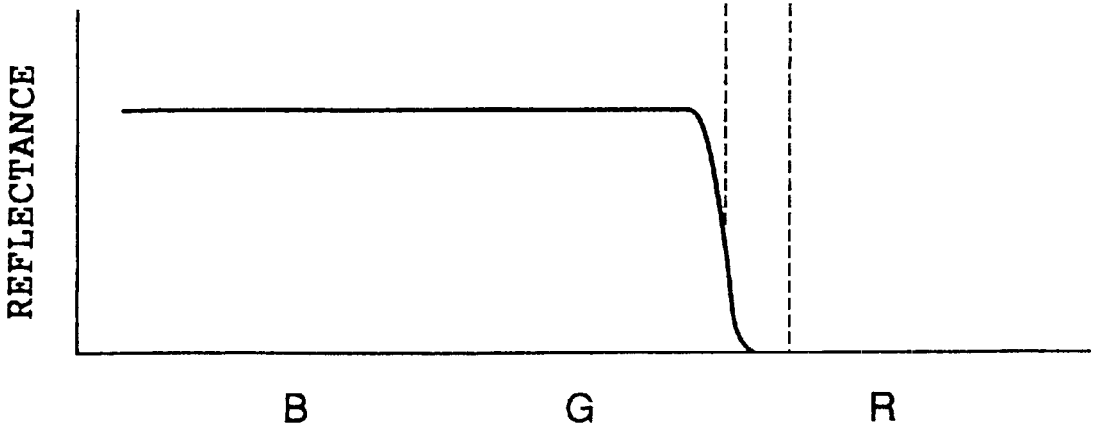
Figure 163:
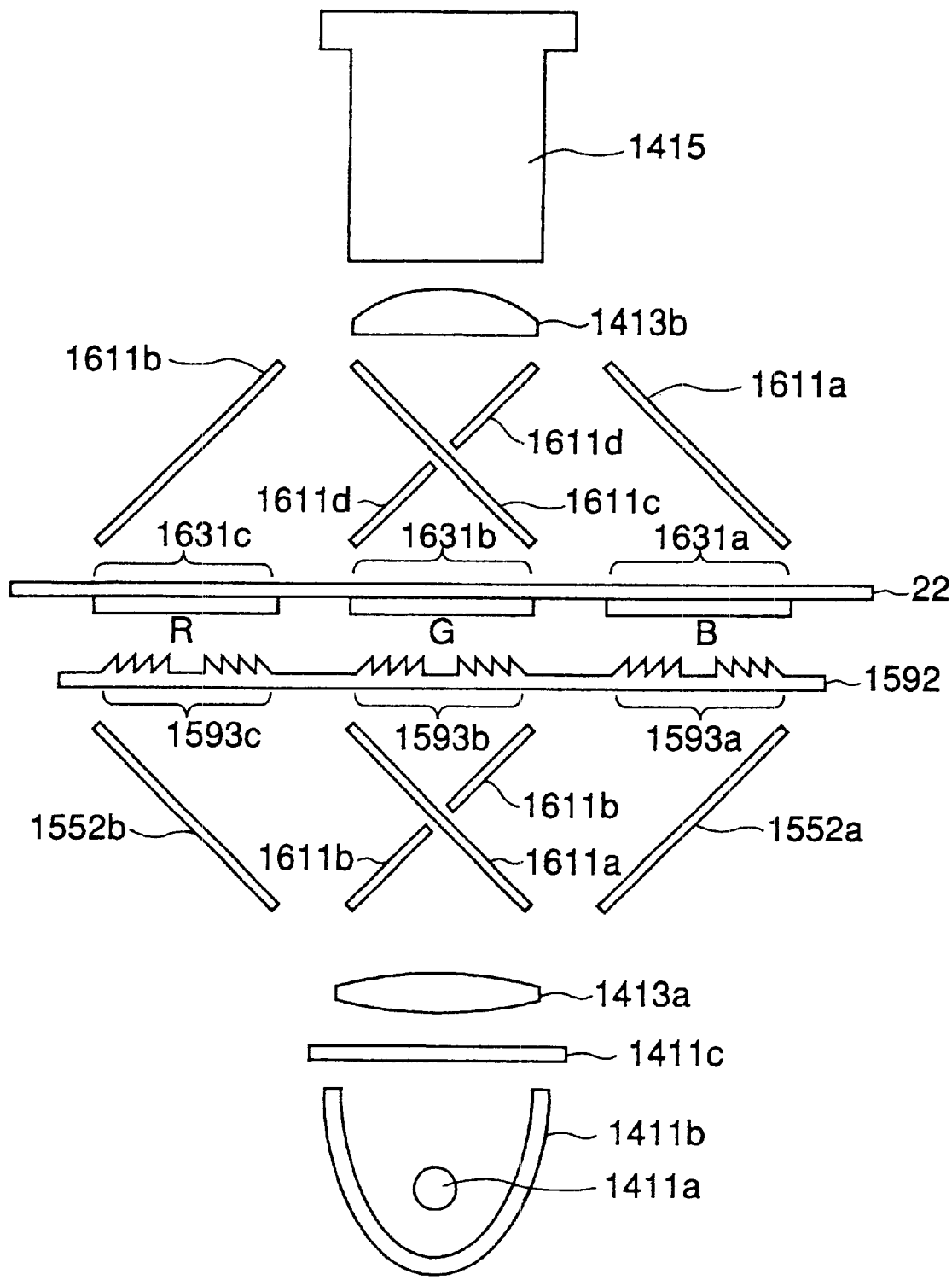
Figure 164:
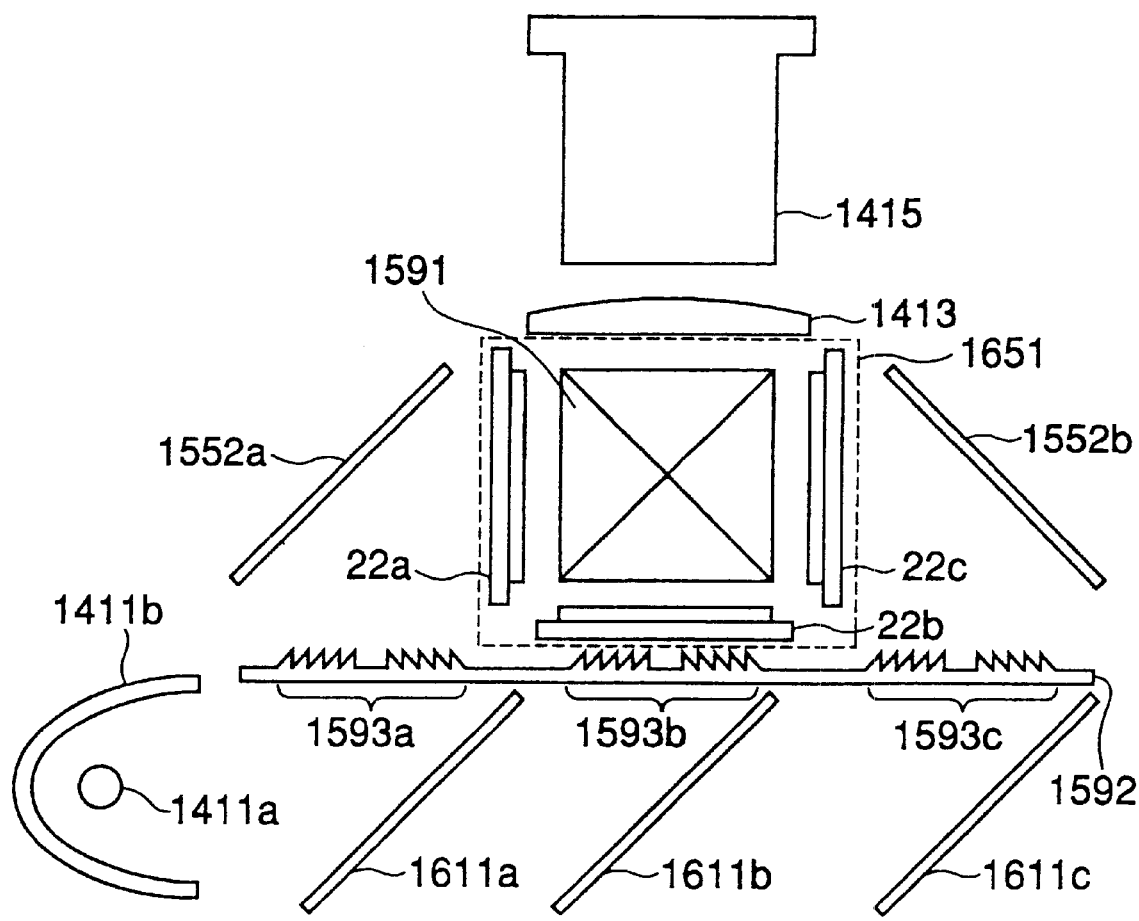
Figure 165:
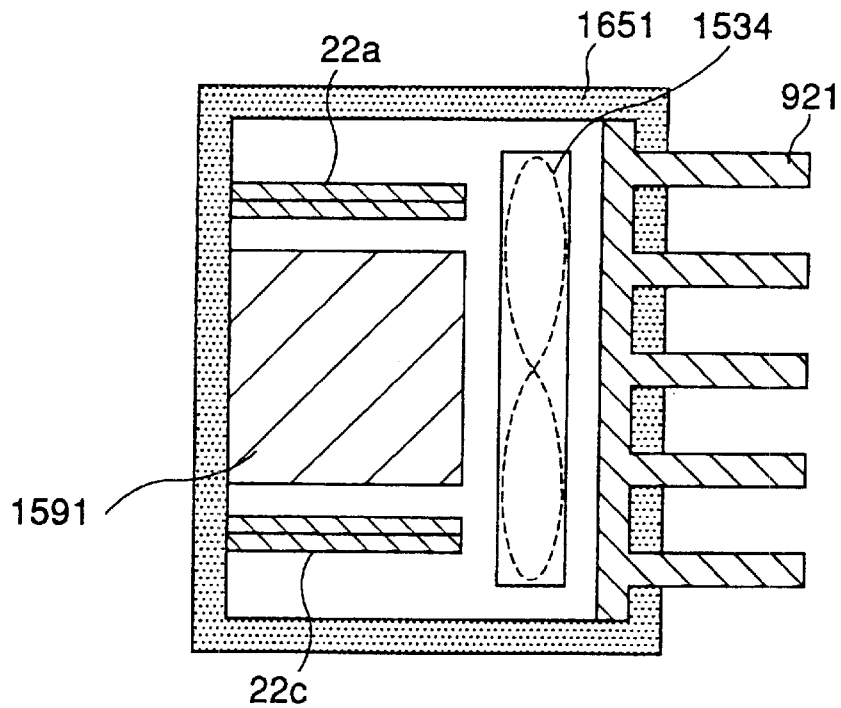
Figure 165:
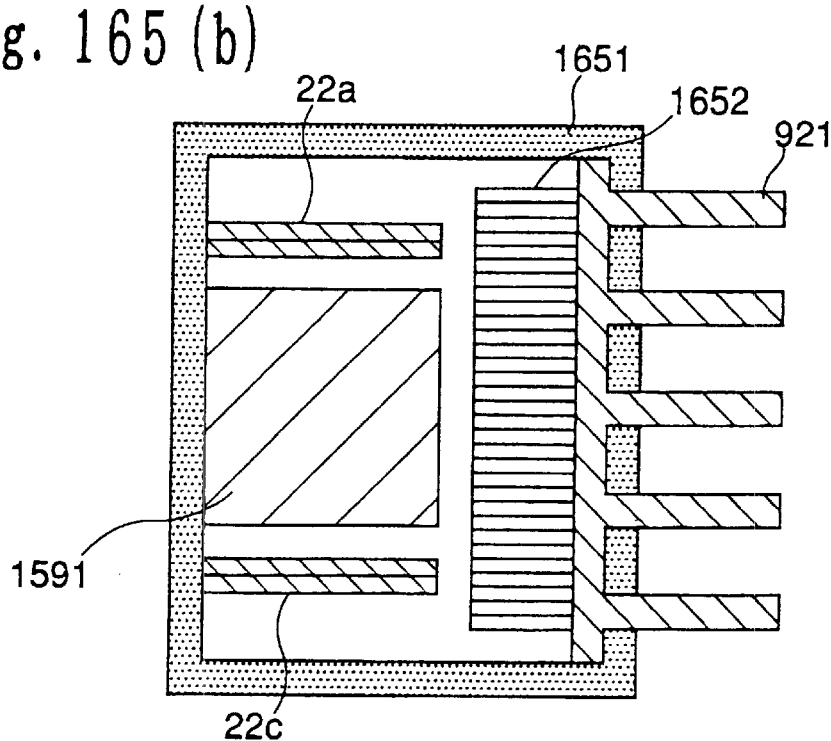
Figure 166:
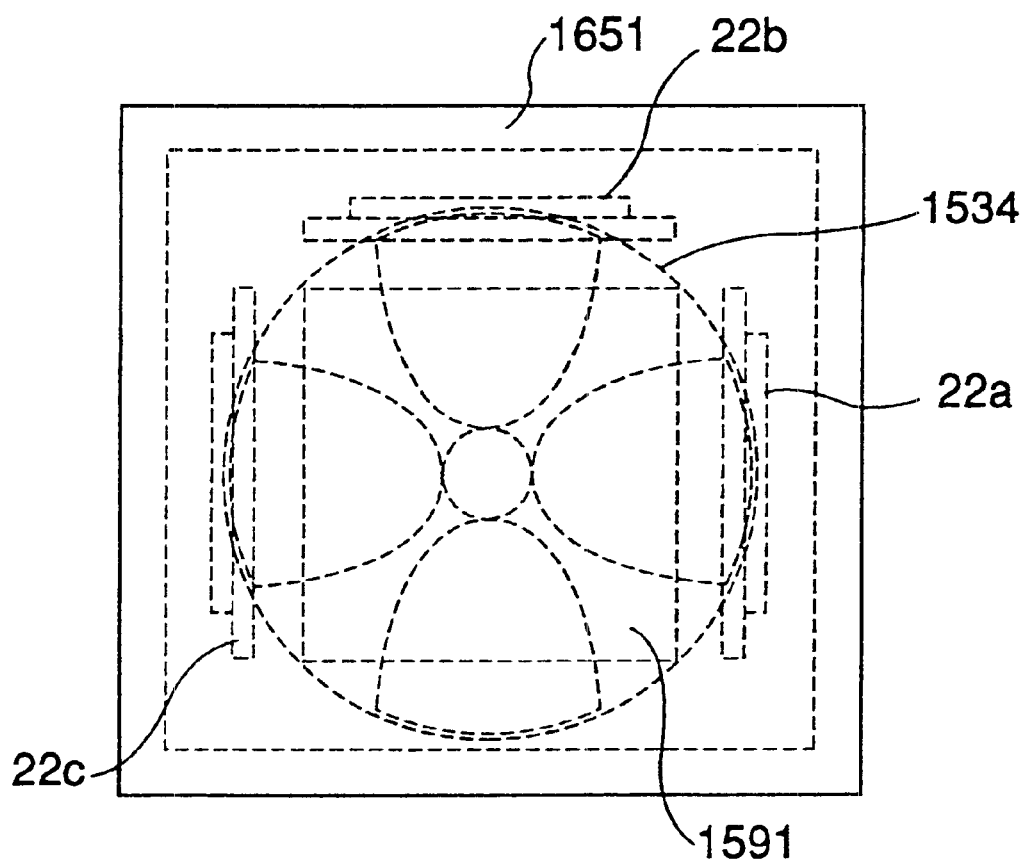
Figure 167:
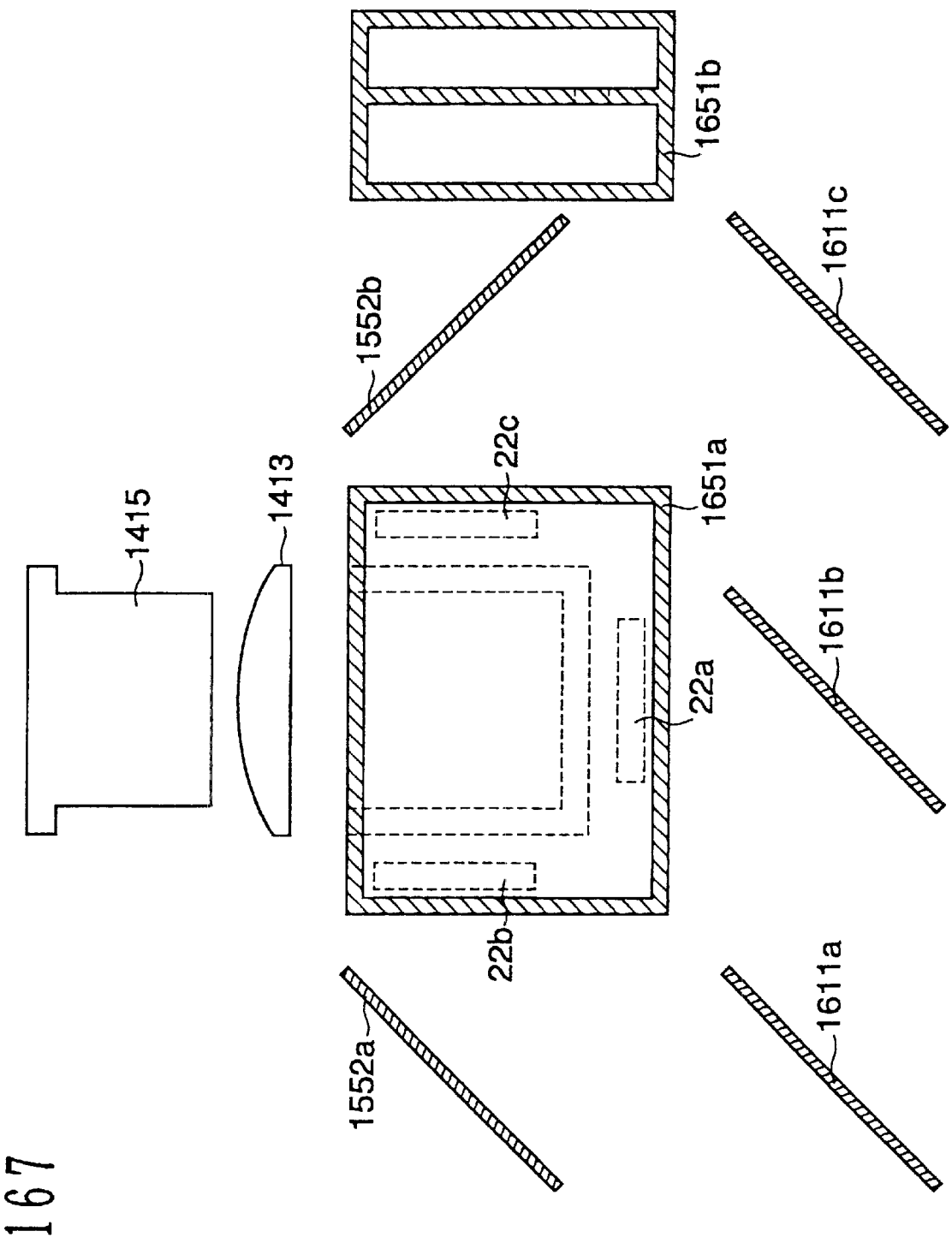
Figure 168:
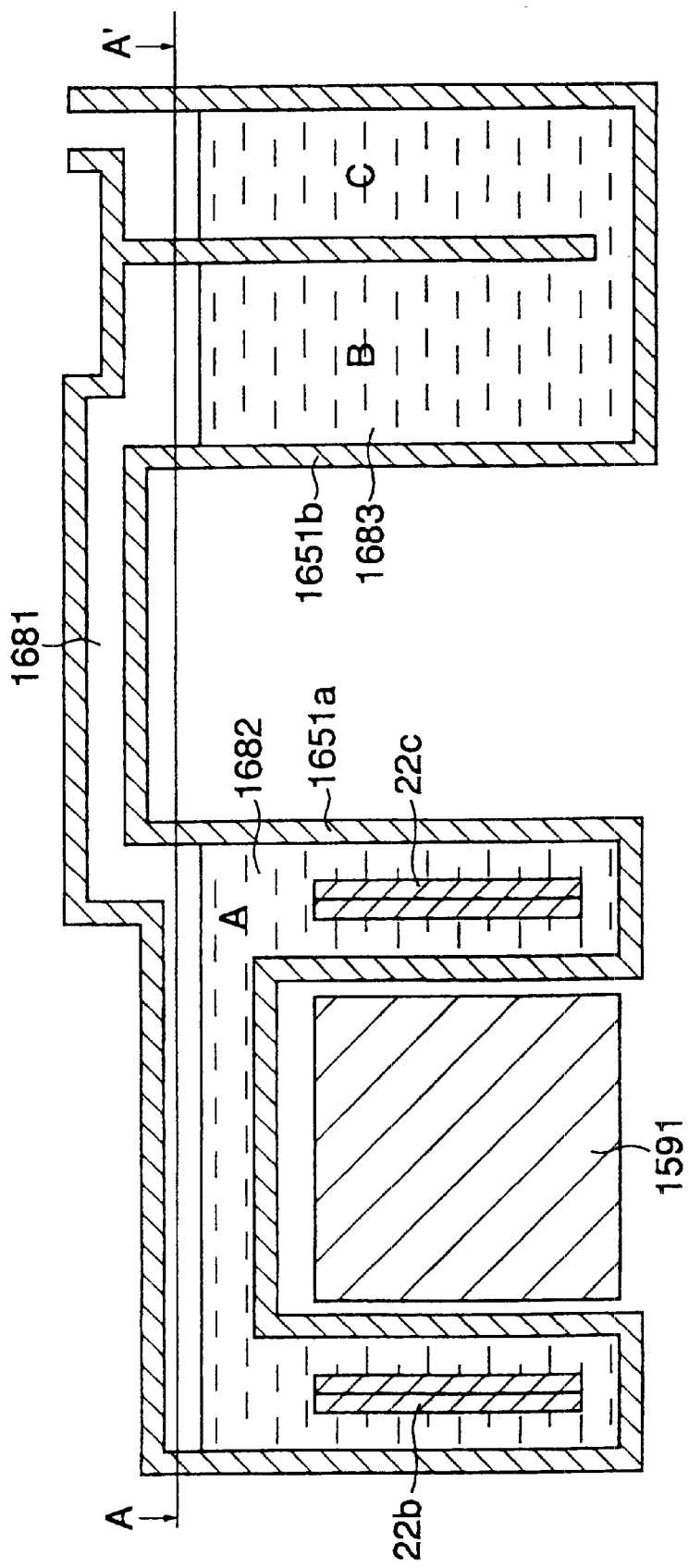
Figure 169:
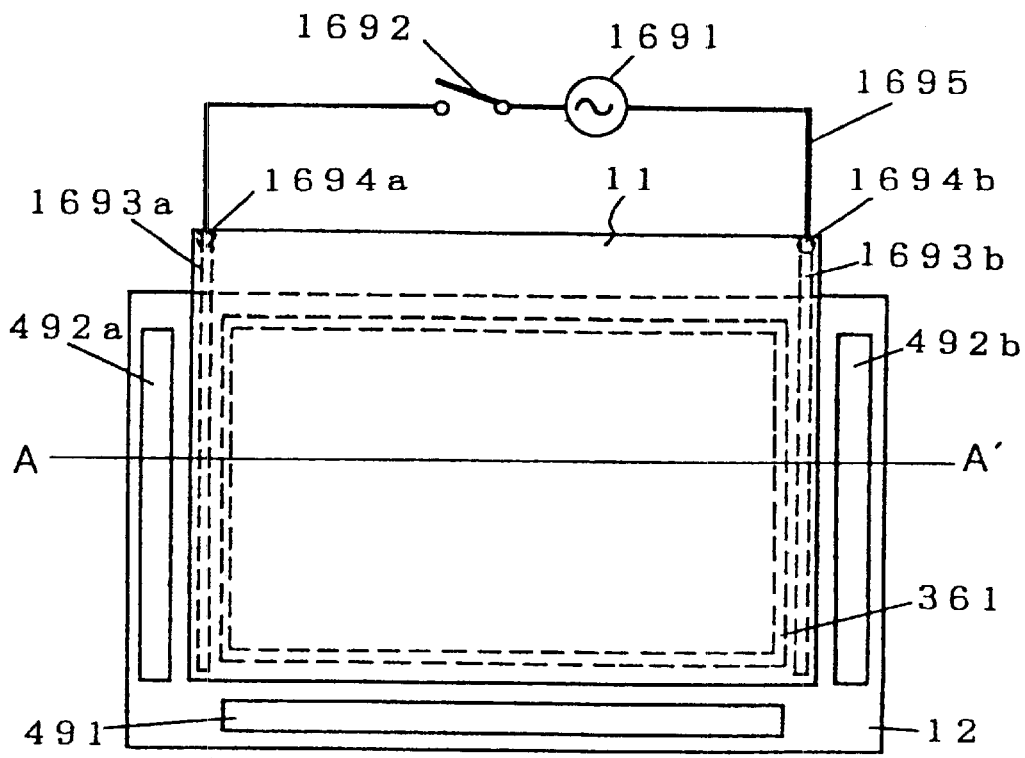
Figure 169:
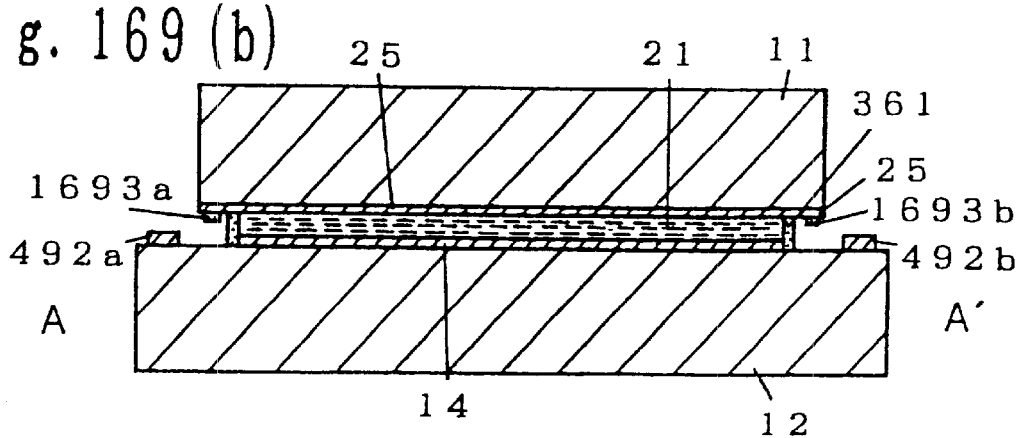
Figure 170:
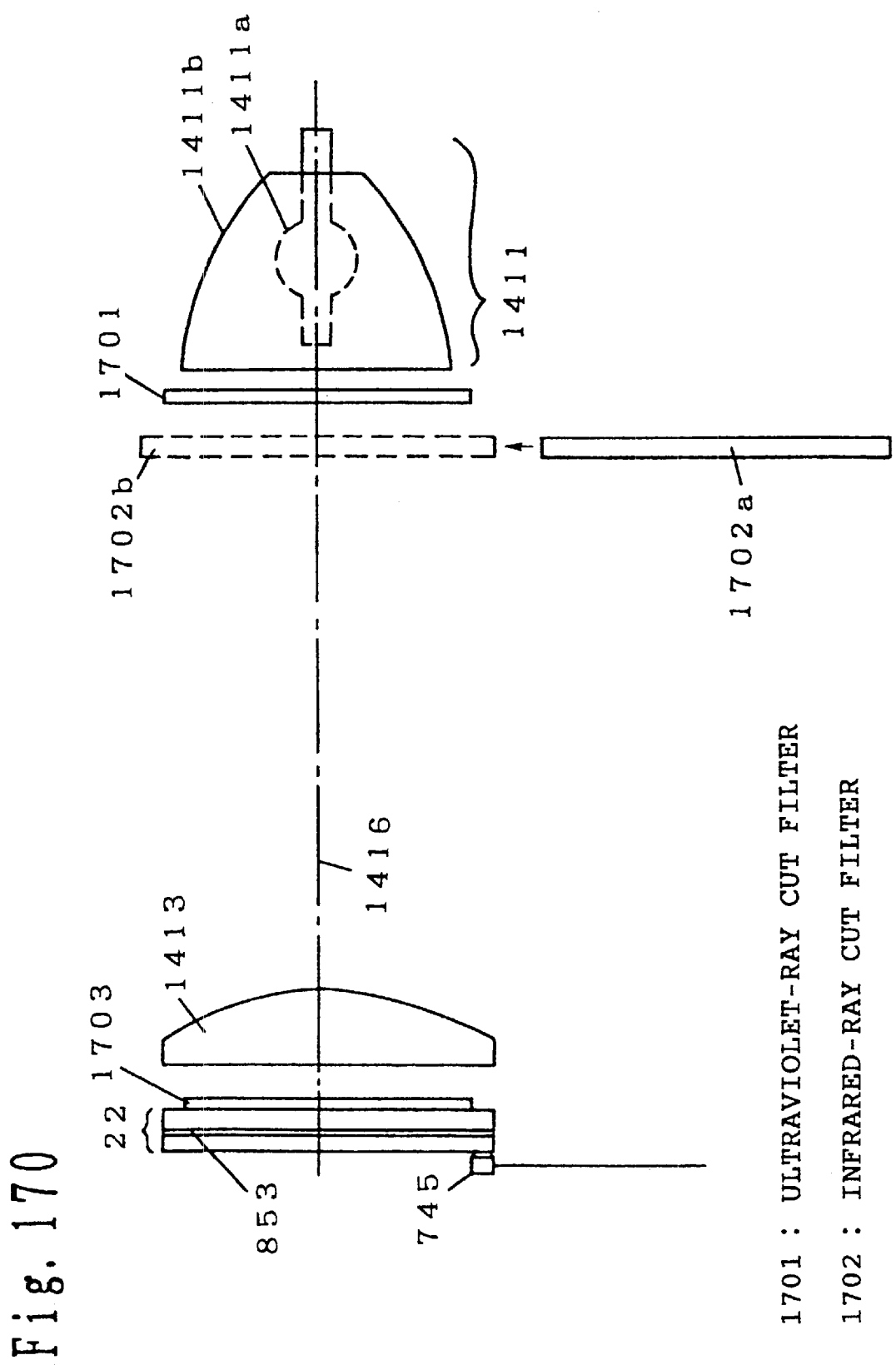
Figure 171:
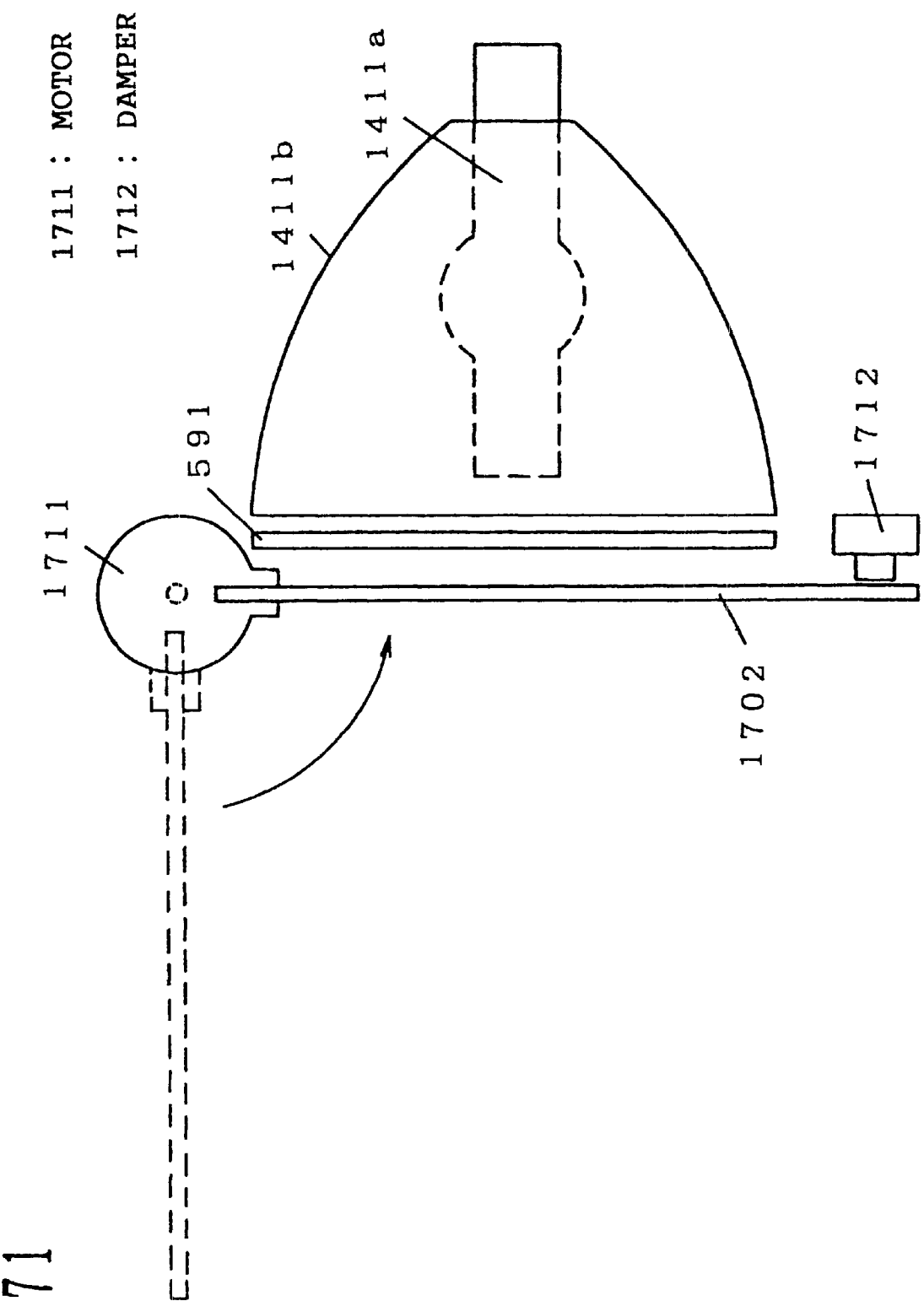
Figure 172:
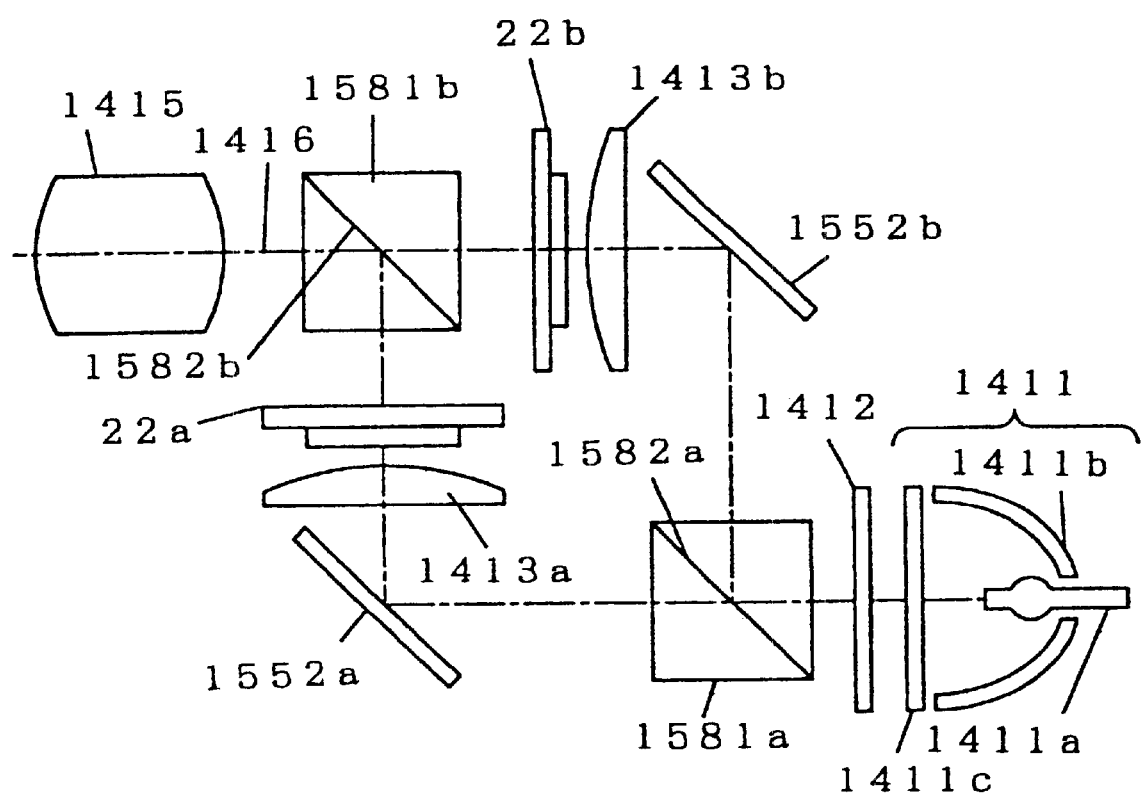
Figure 173:
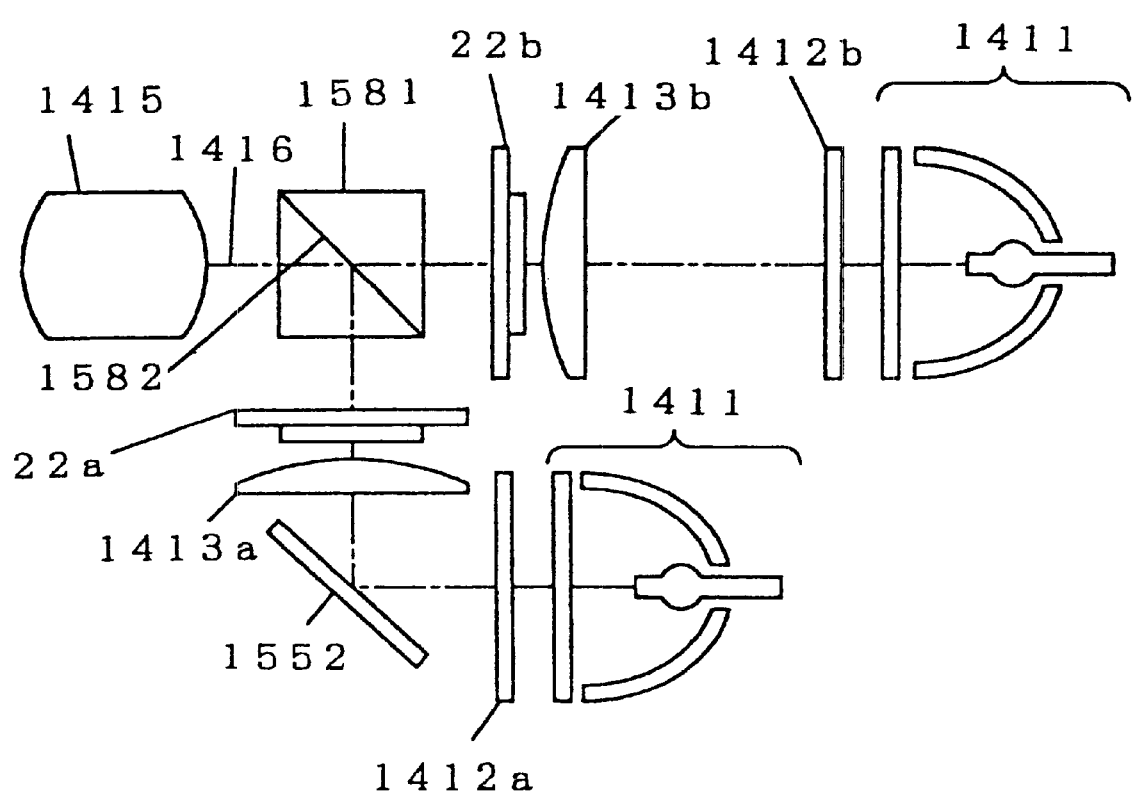
Figure 174:
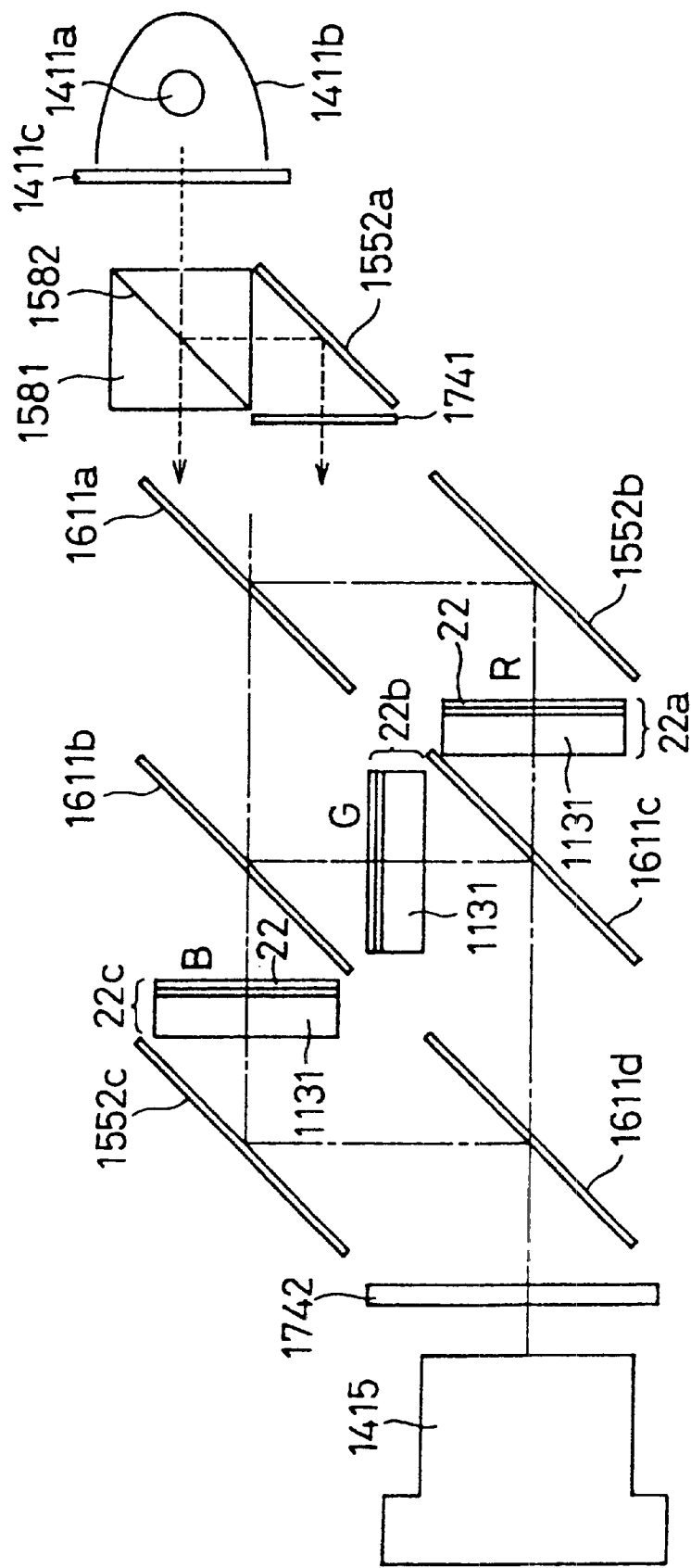
Figure 175:
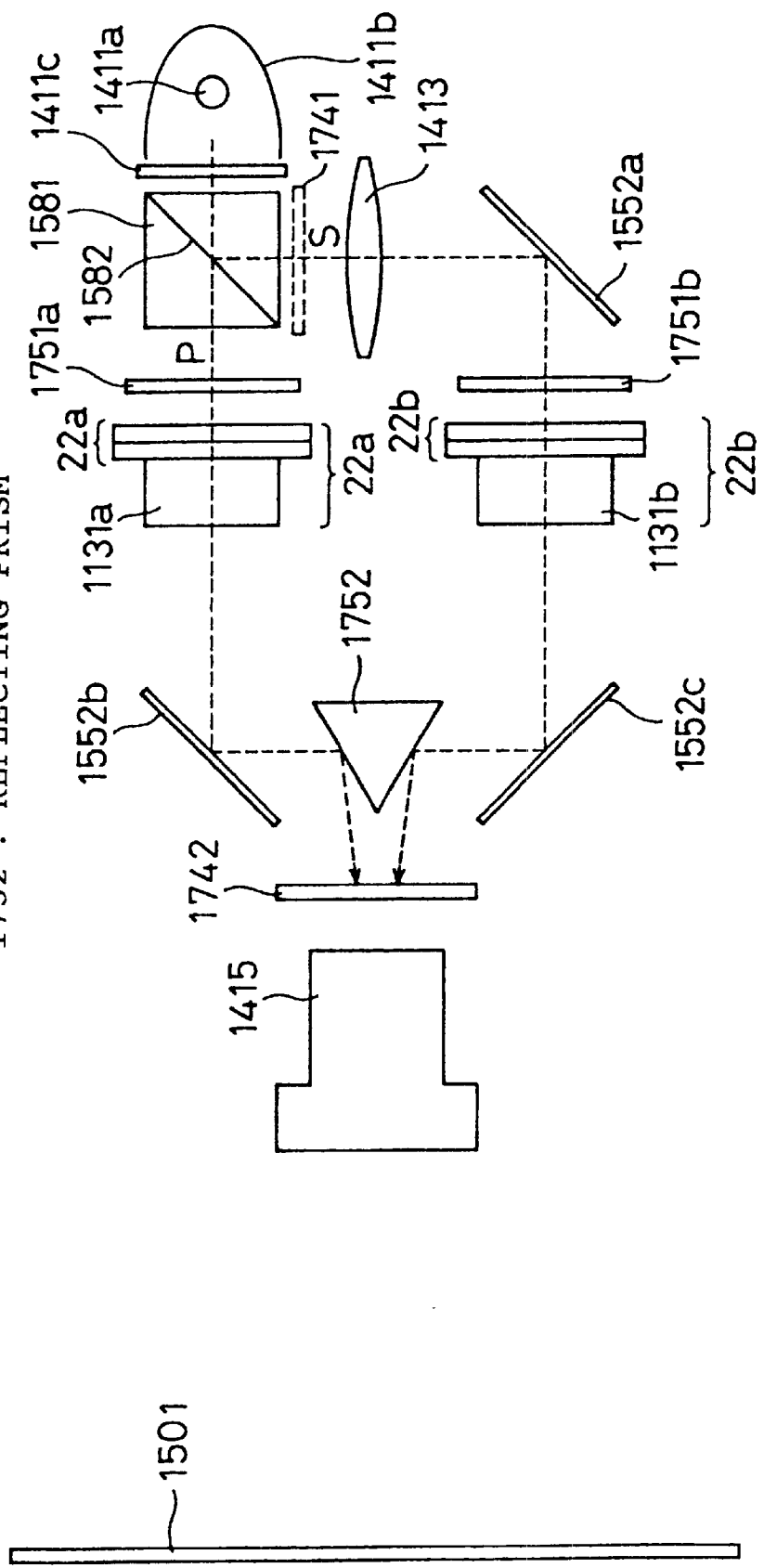
Figure 176:
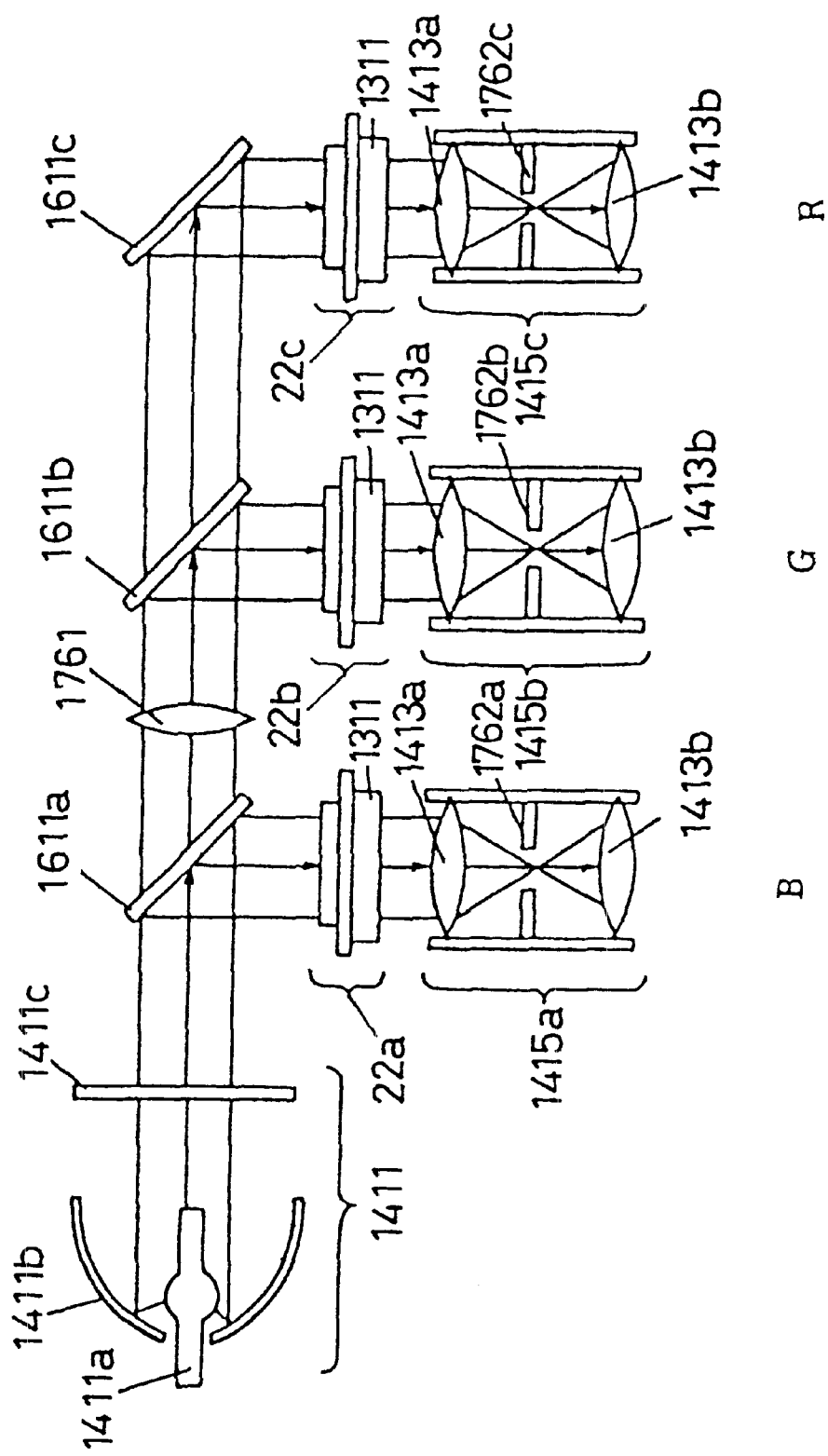
Figure 177:
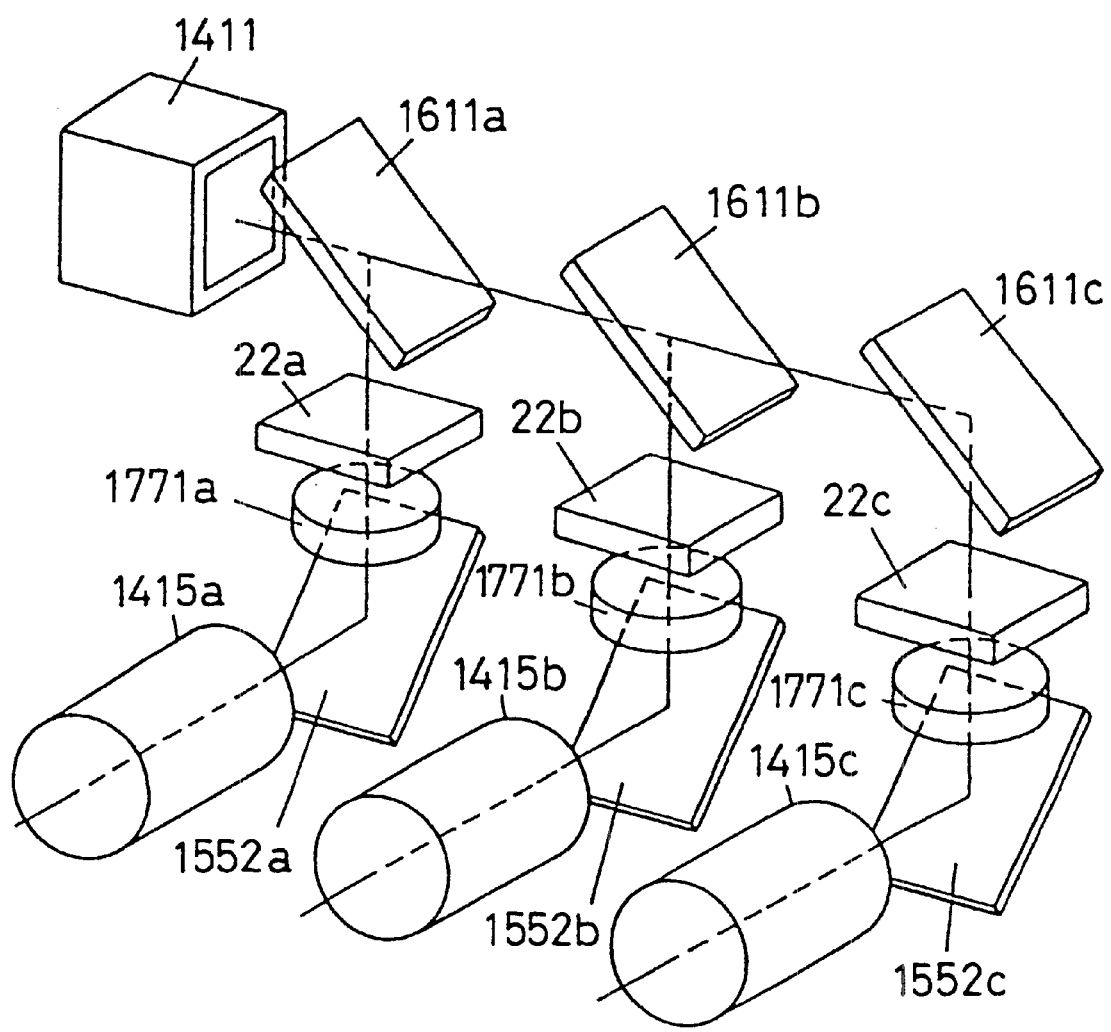
Figure 178:
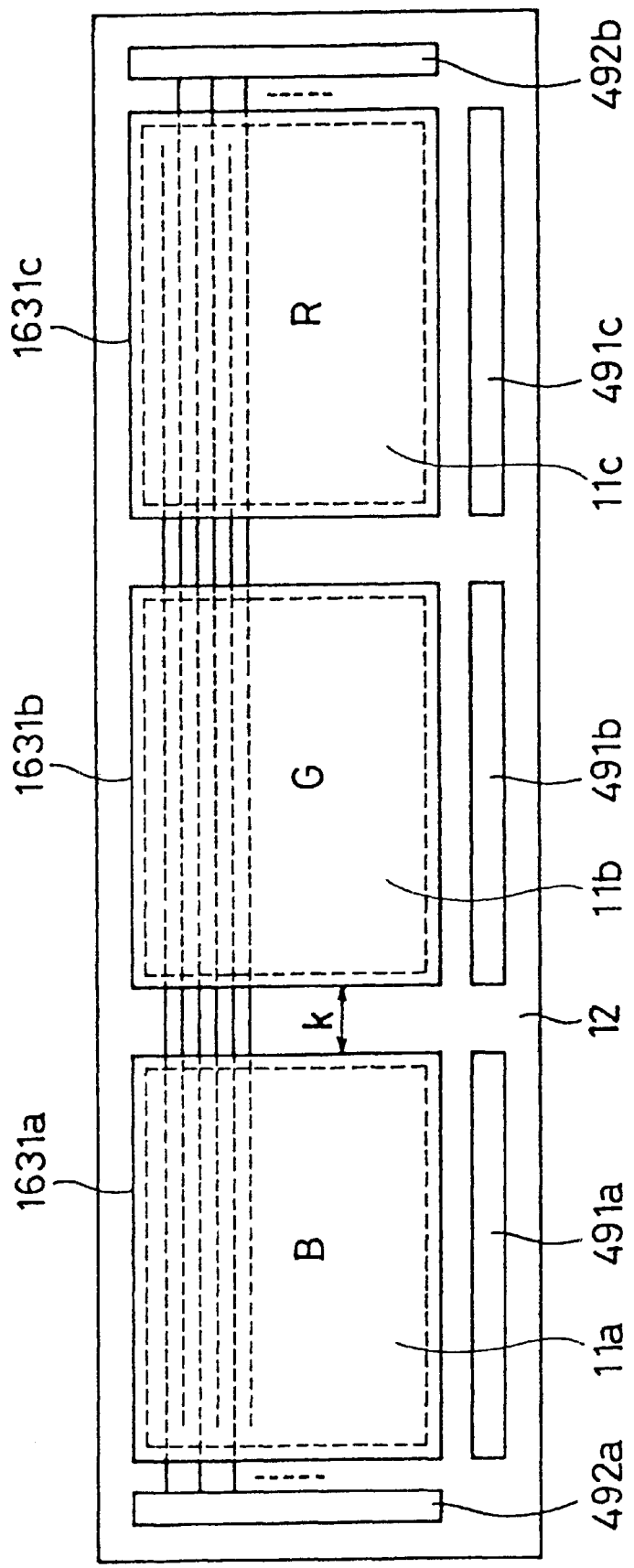
Figure 179:
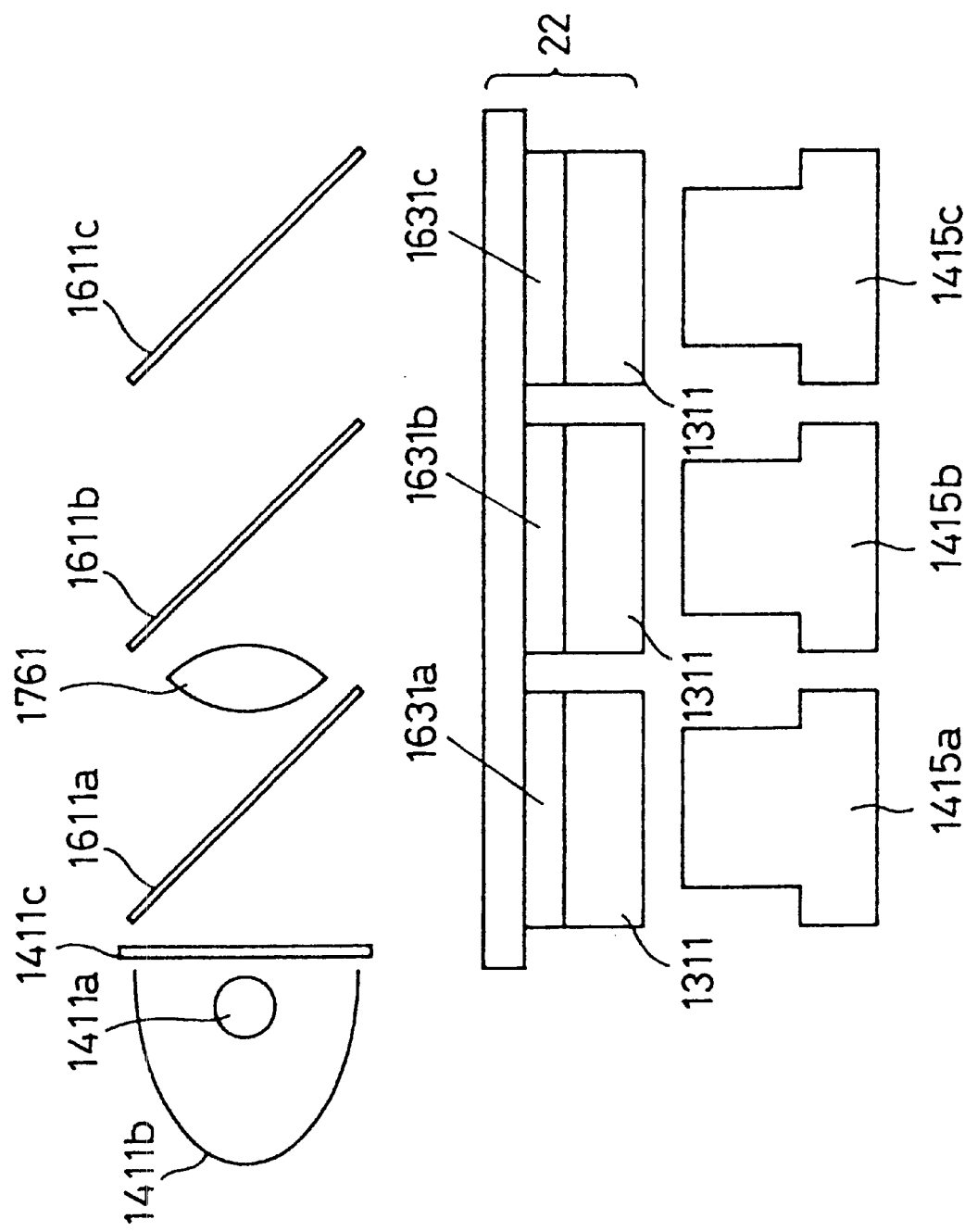
Figure 180:
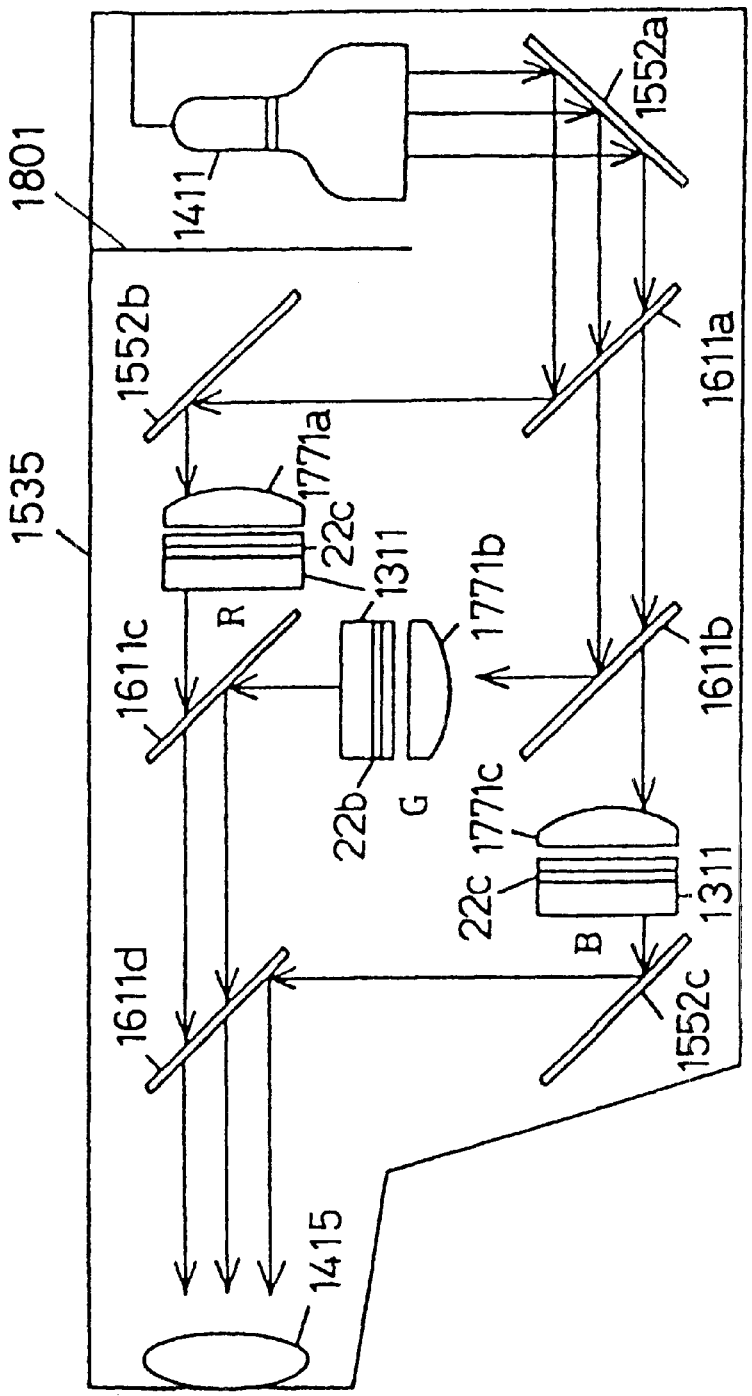
Figure 181:
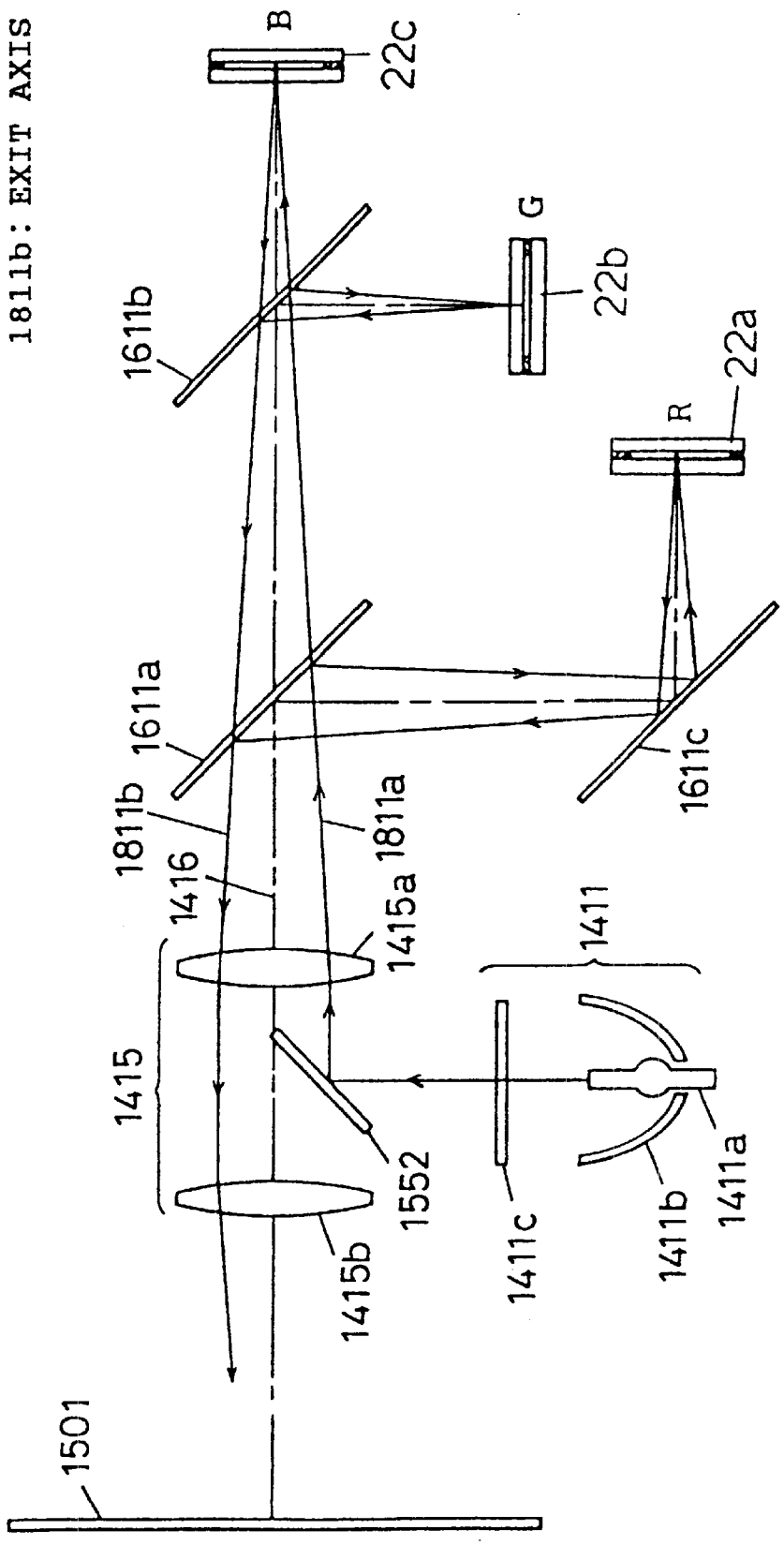
Figure 182:
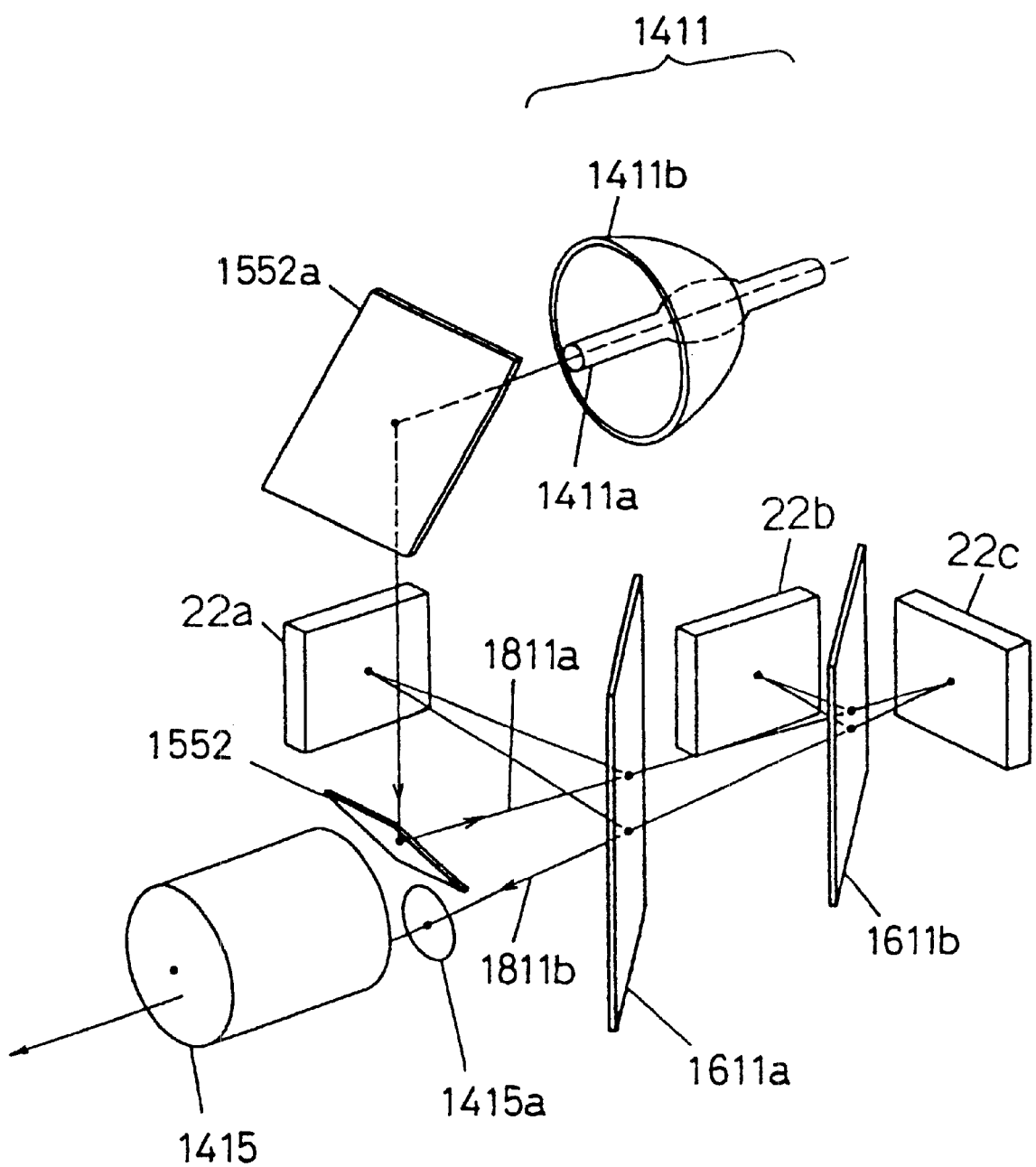
Figure 183:
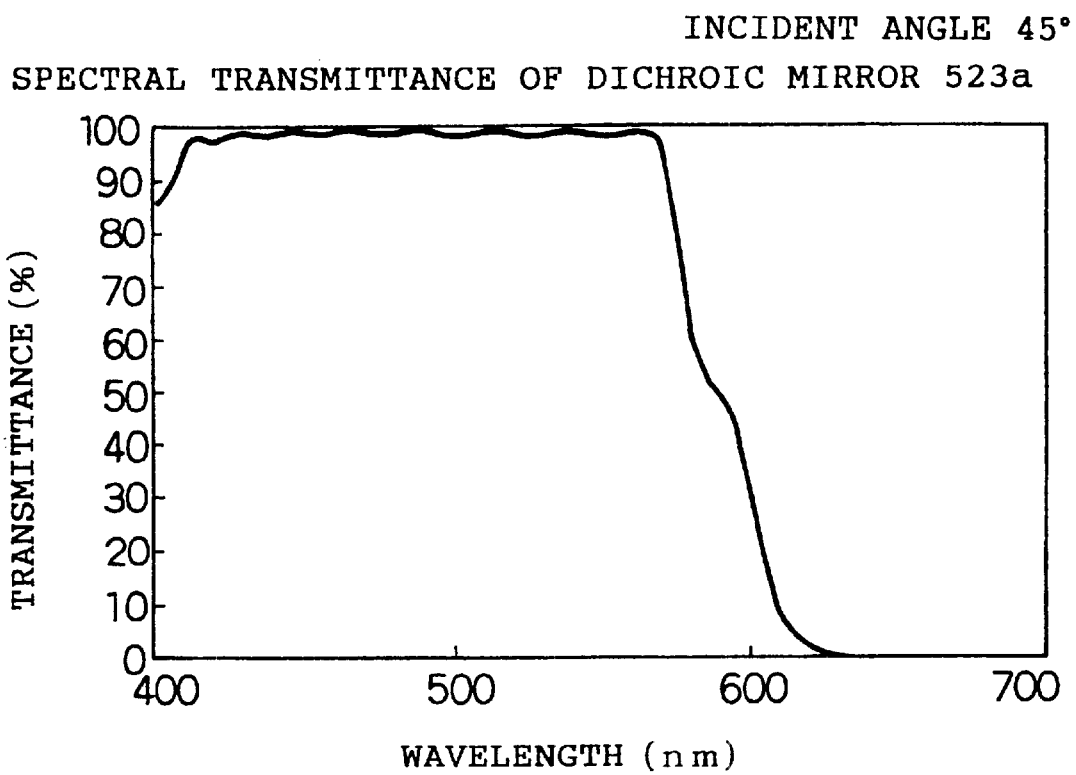
Figure 183:
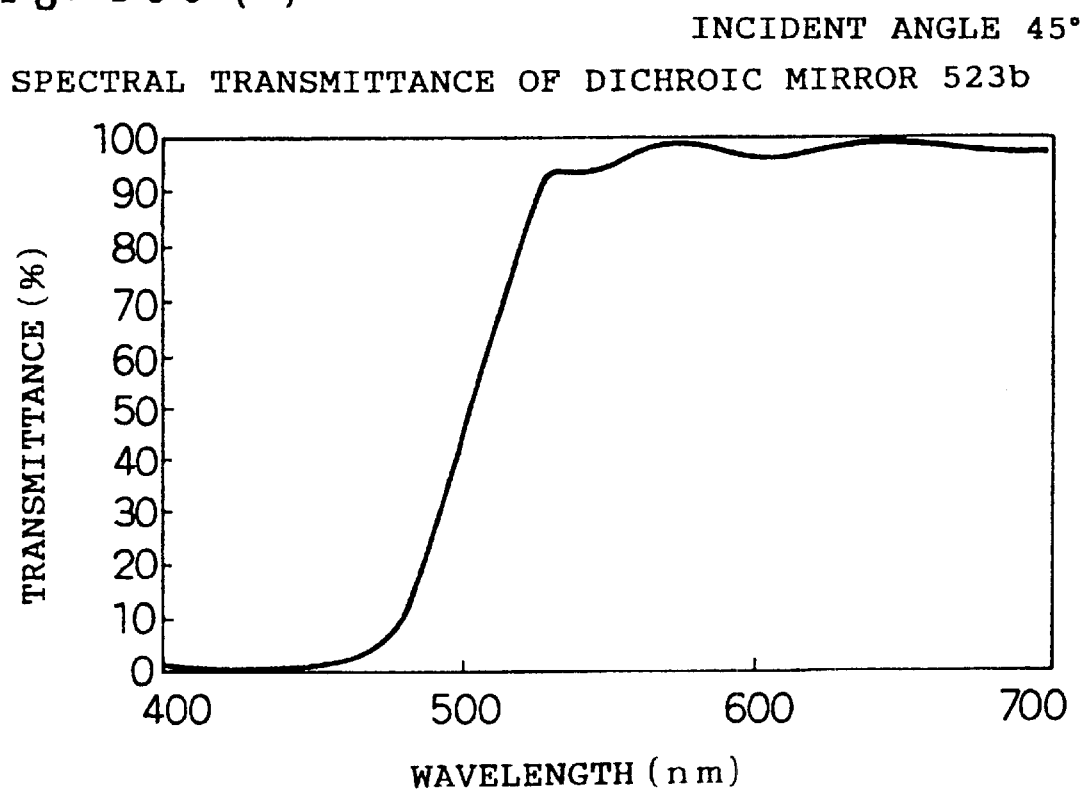
Figure 184:
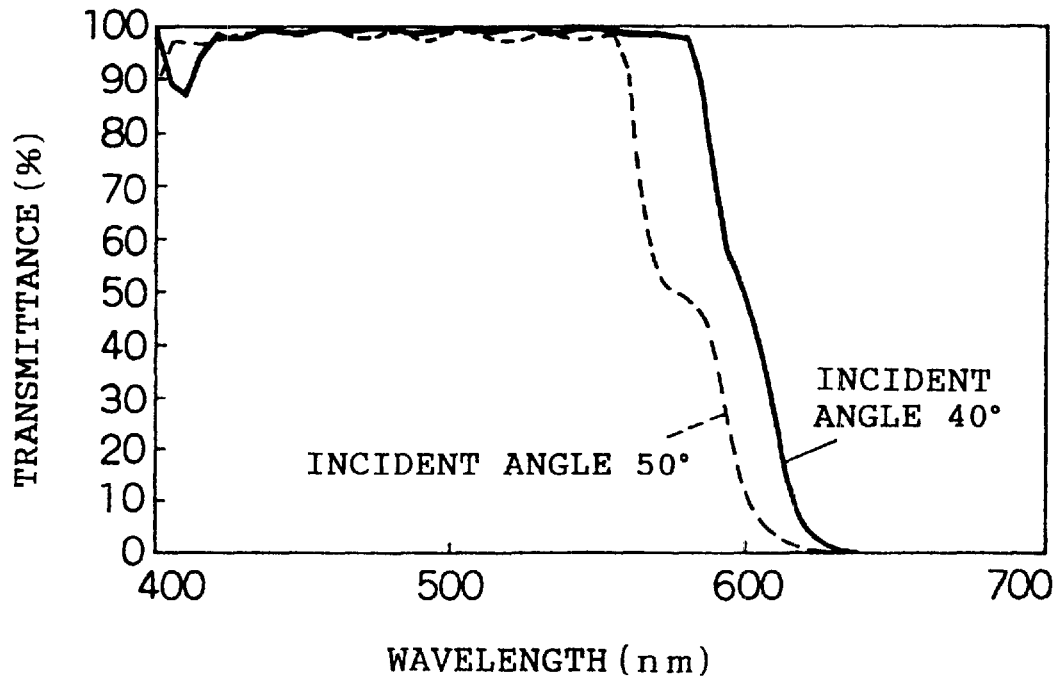
Figure 184:
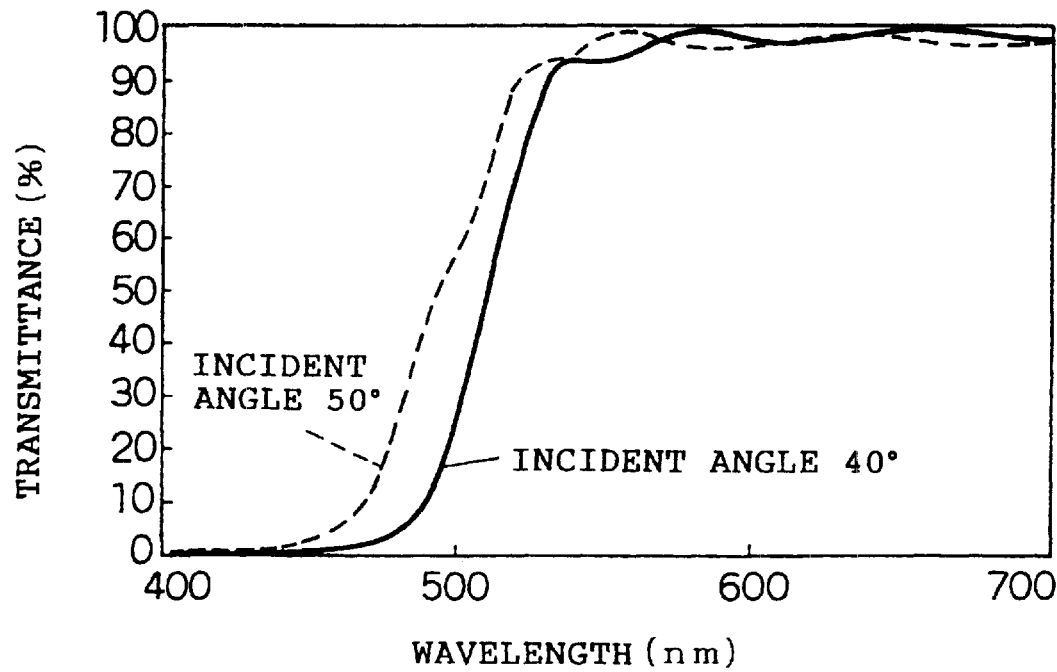
Figure 185:
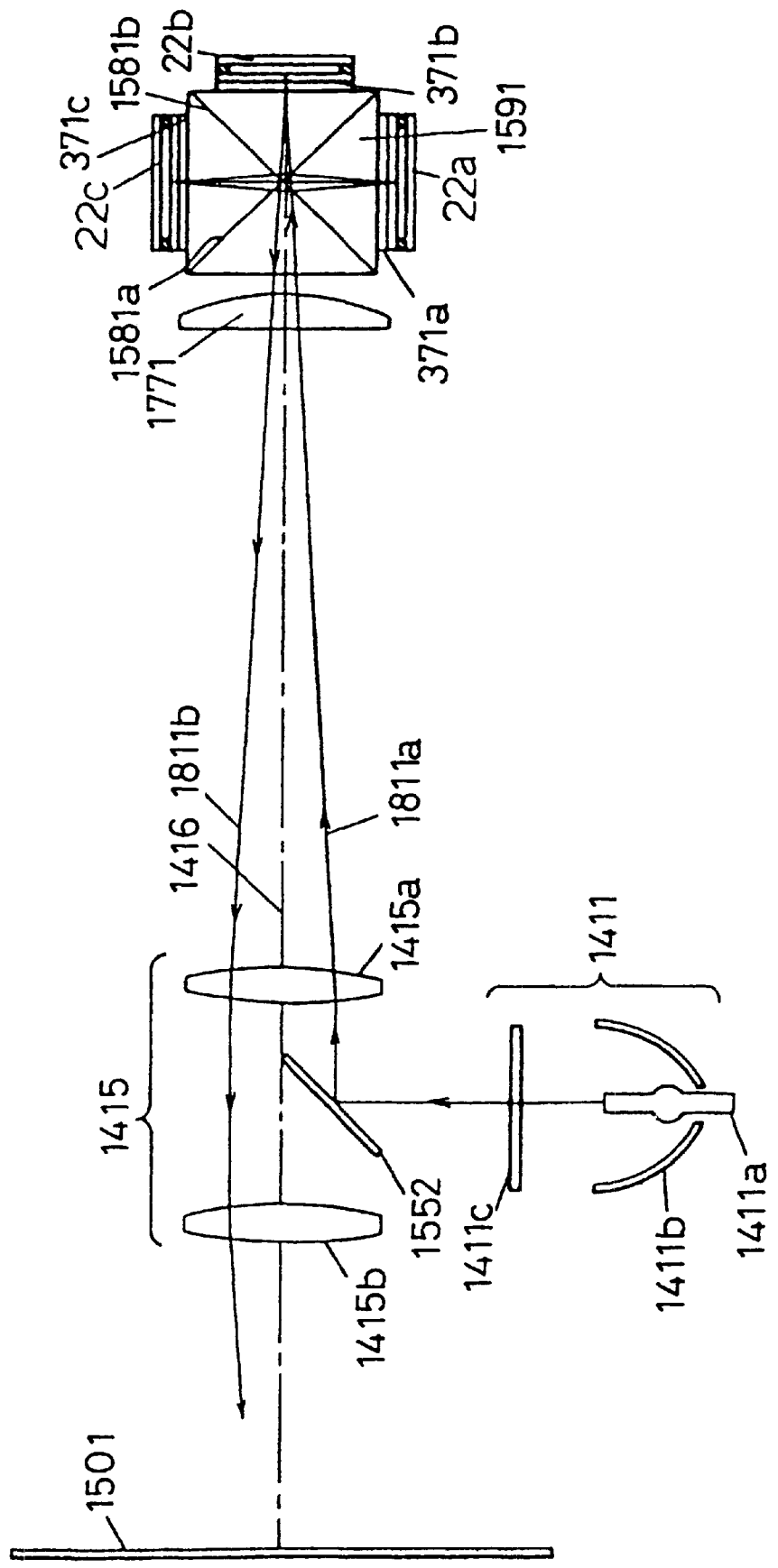
Figure 186:
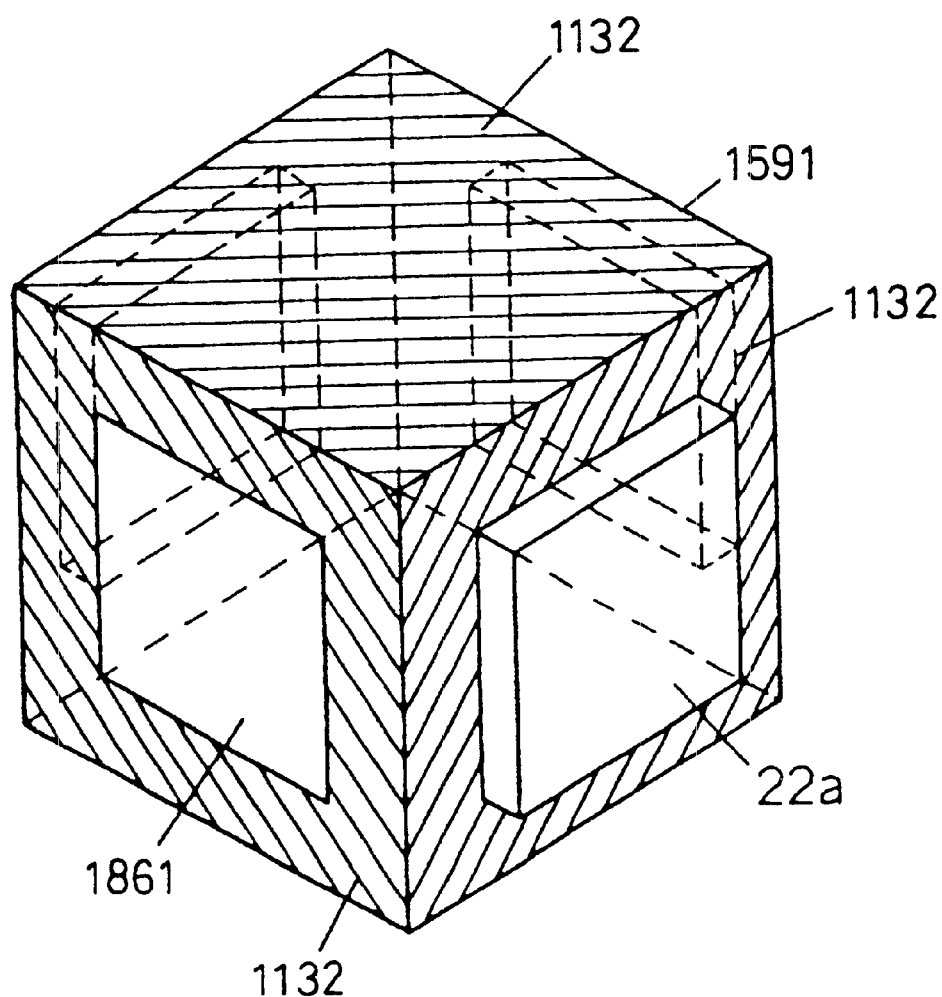
Figure 187:
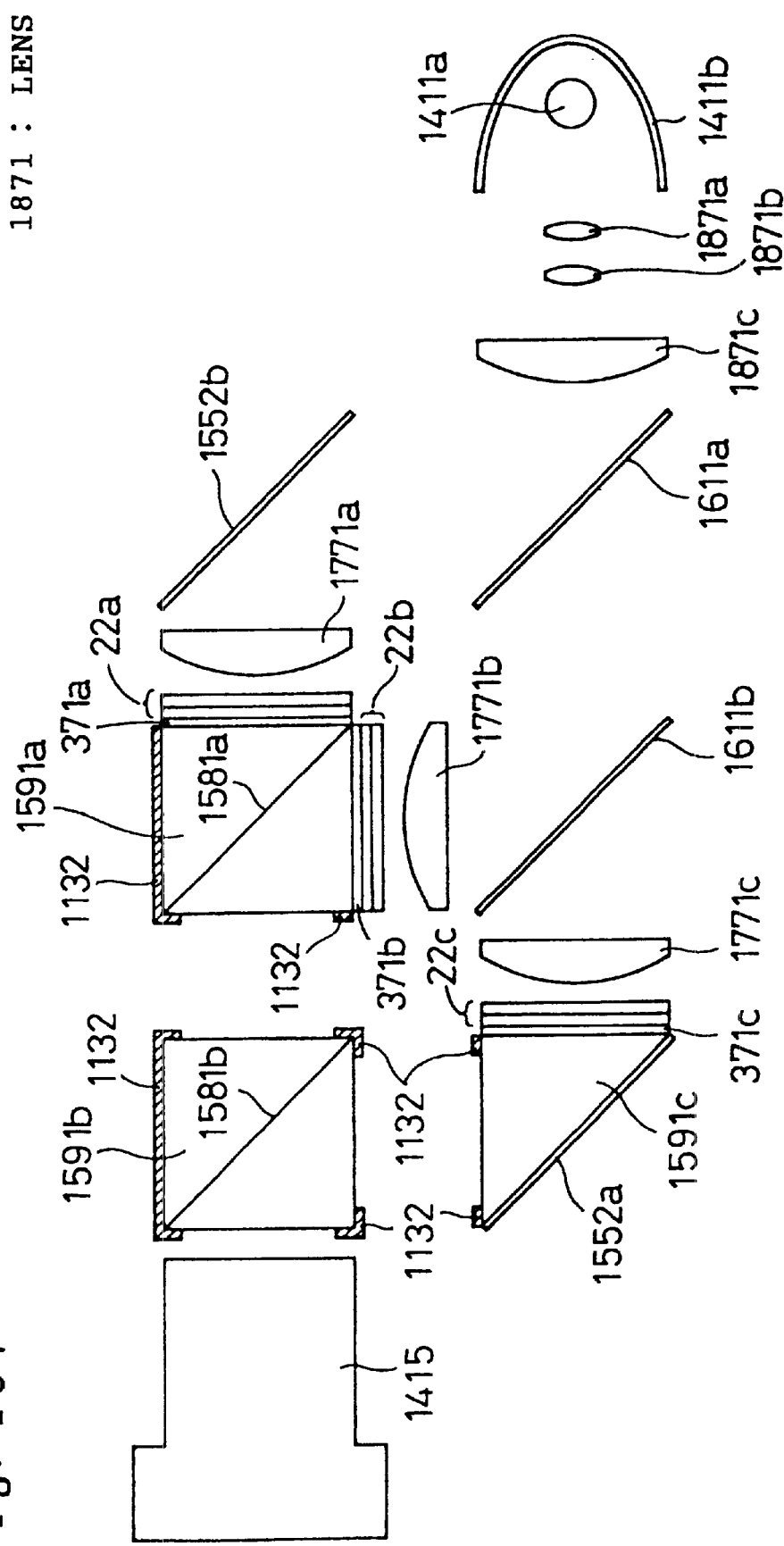
Figure 188:
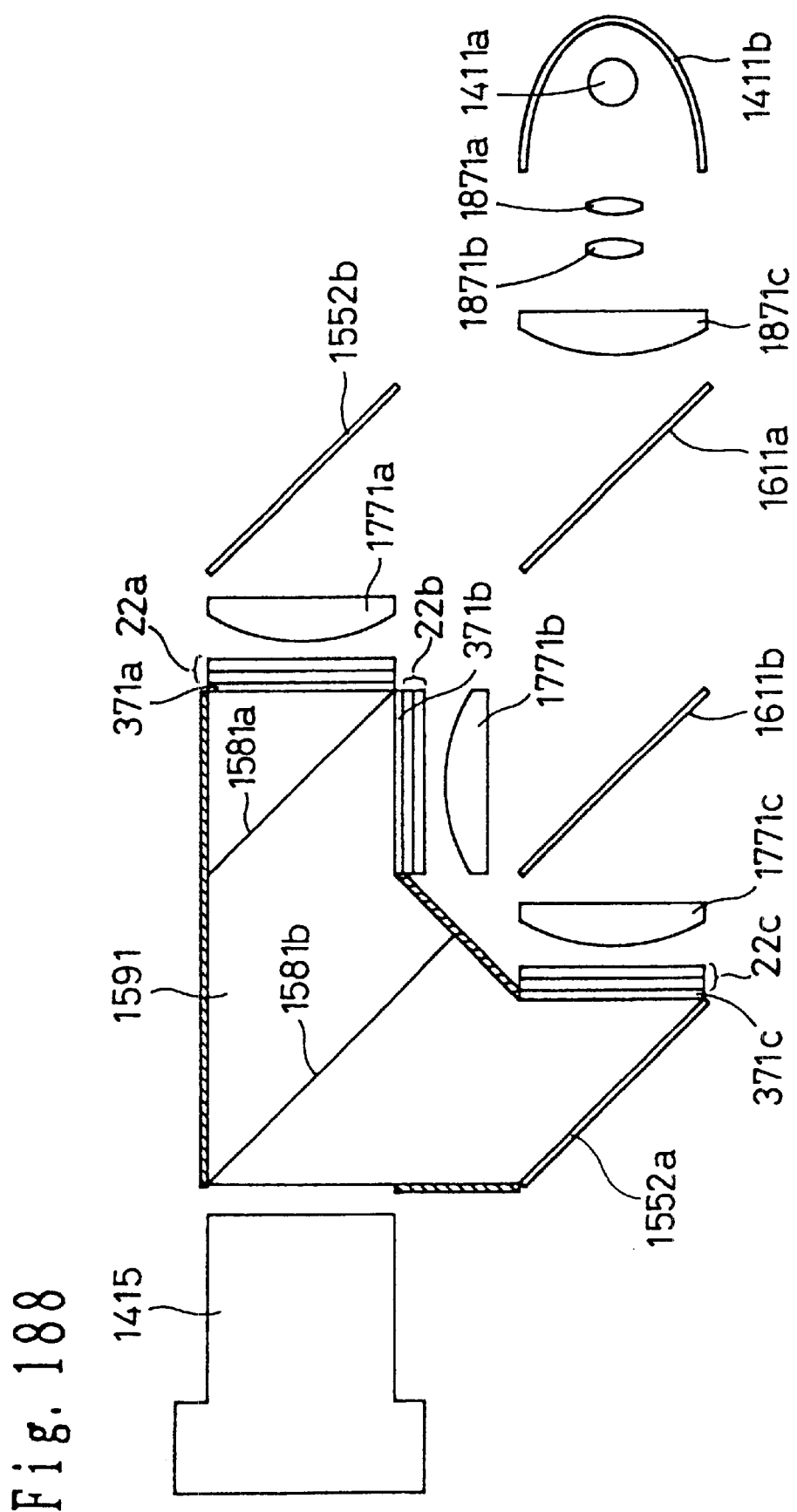
Figure 189:
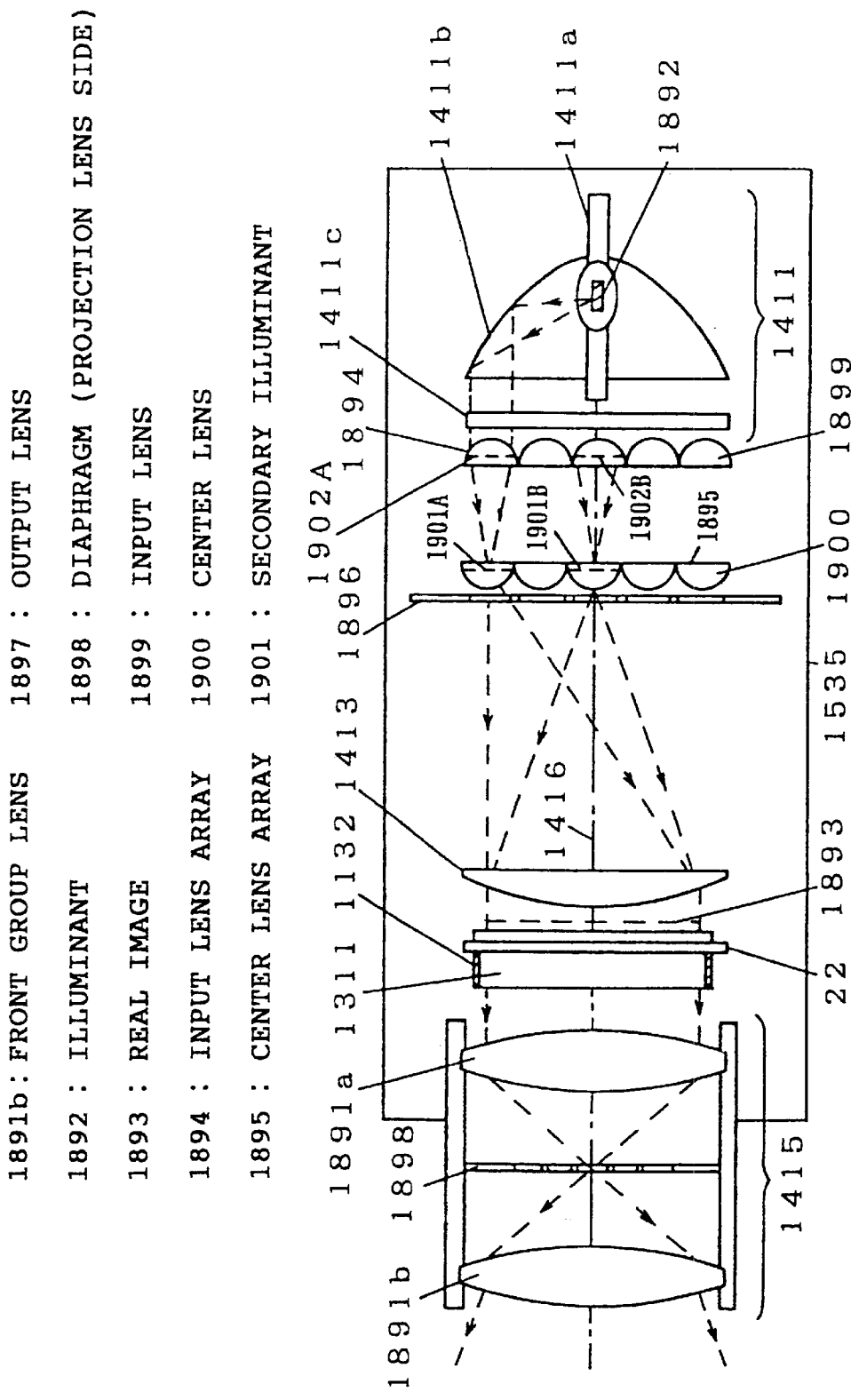
Figure 190:
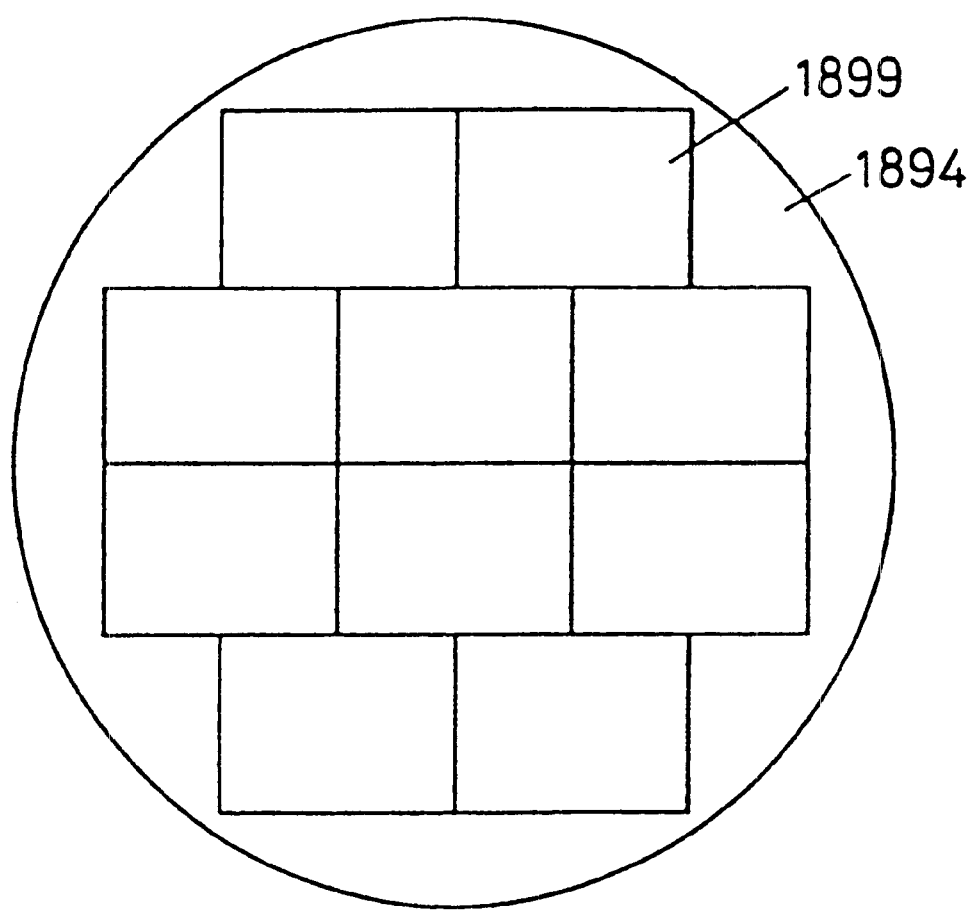
Figure 191:
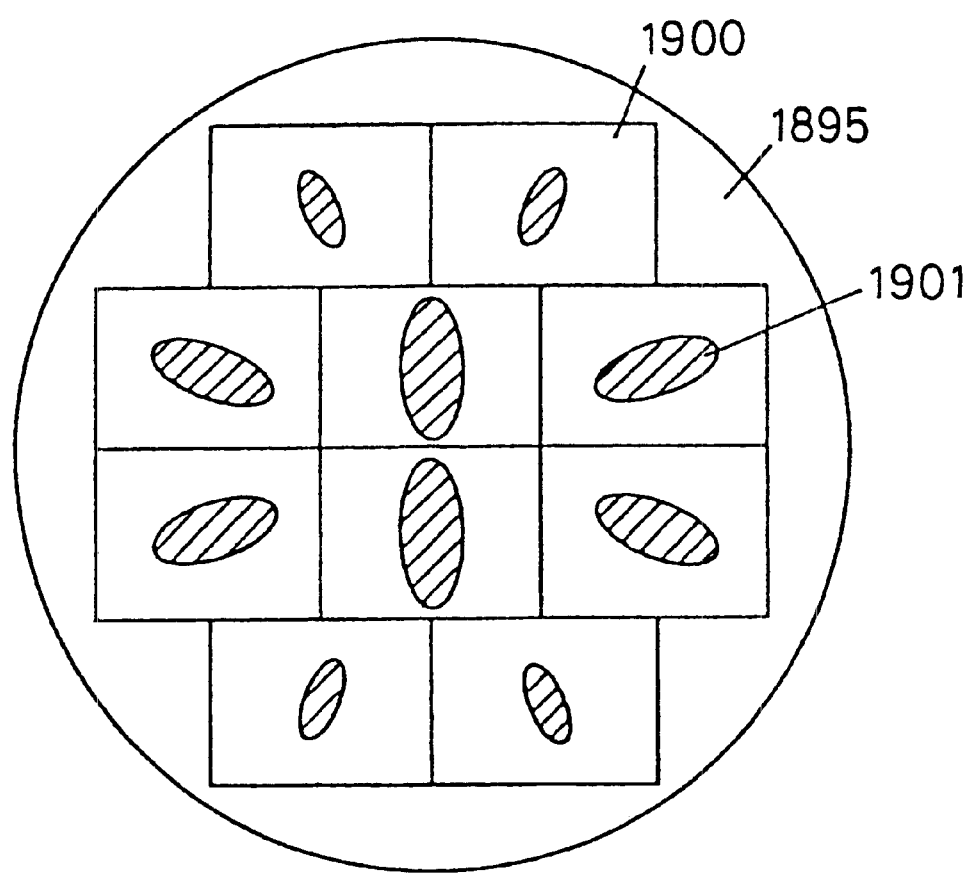
Figure 192:
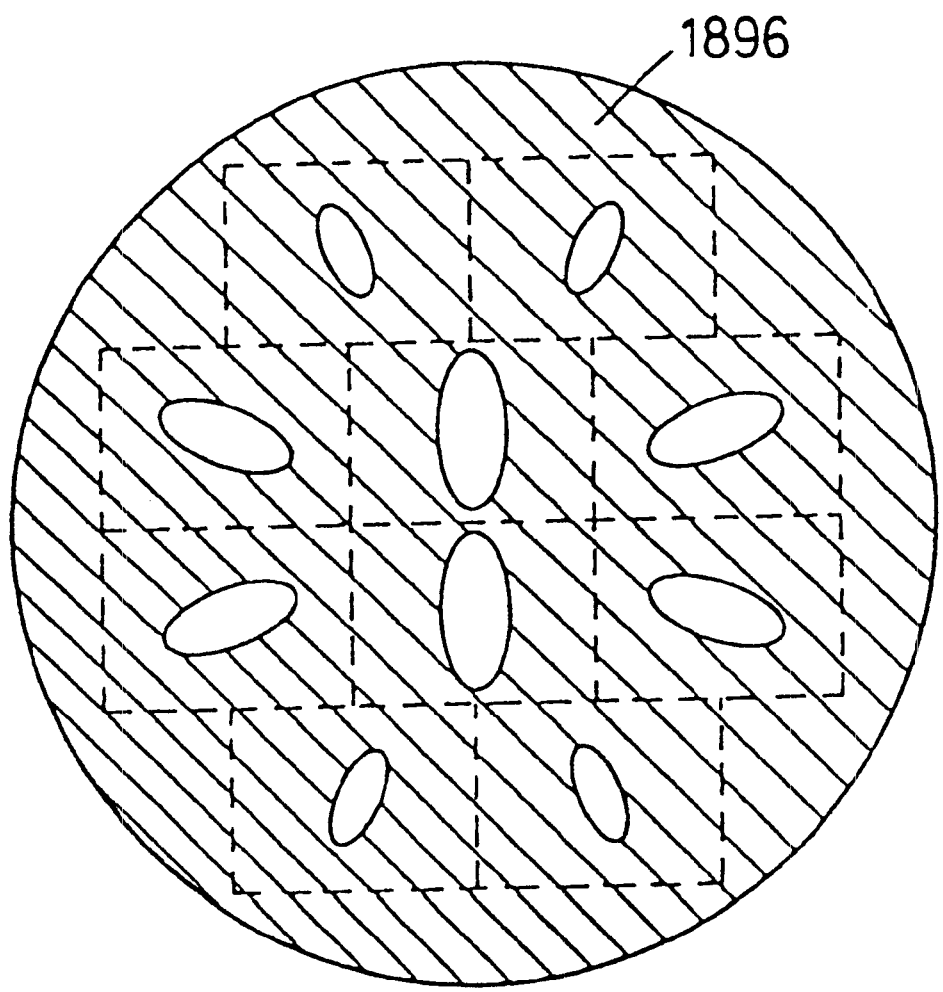
Figure 193:
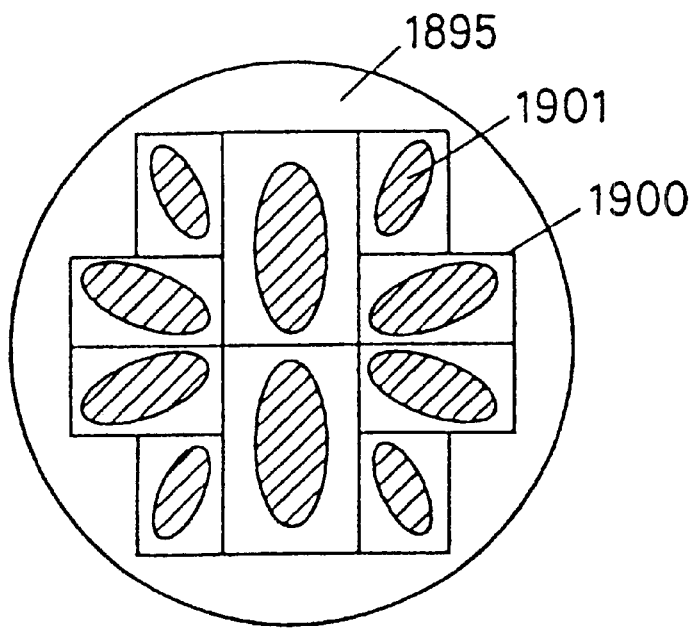
Figure 194:
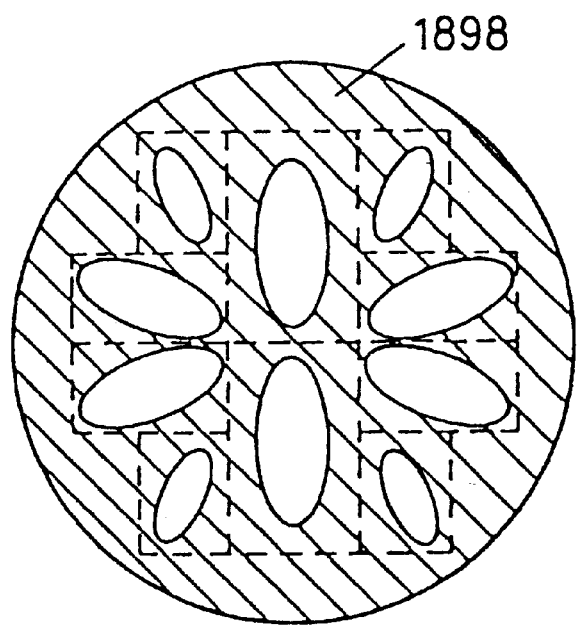
Figure 195:
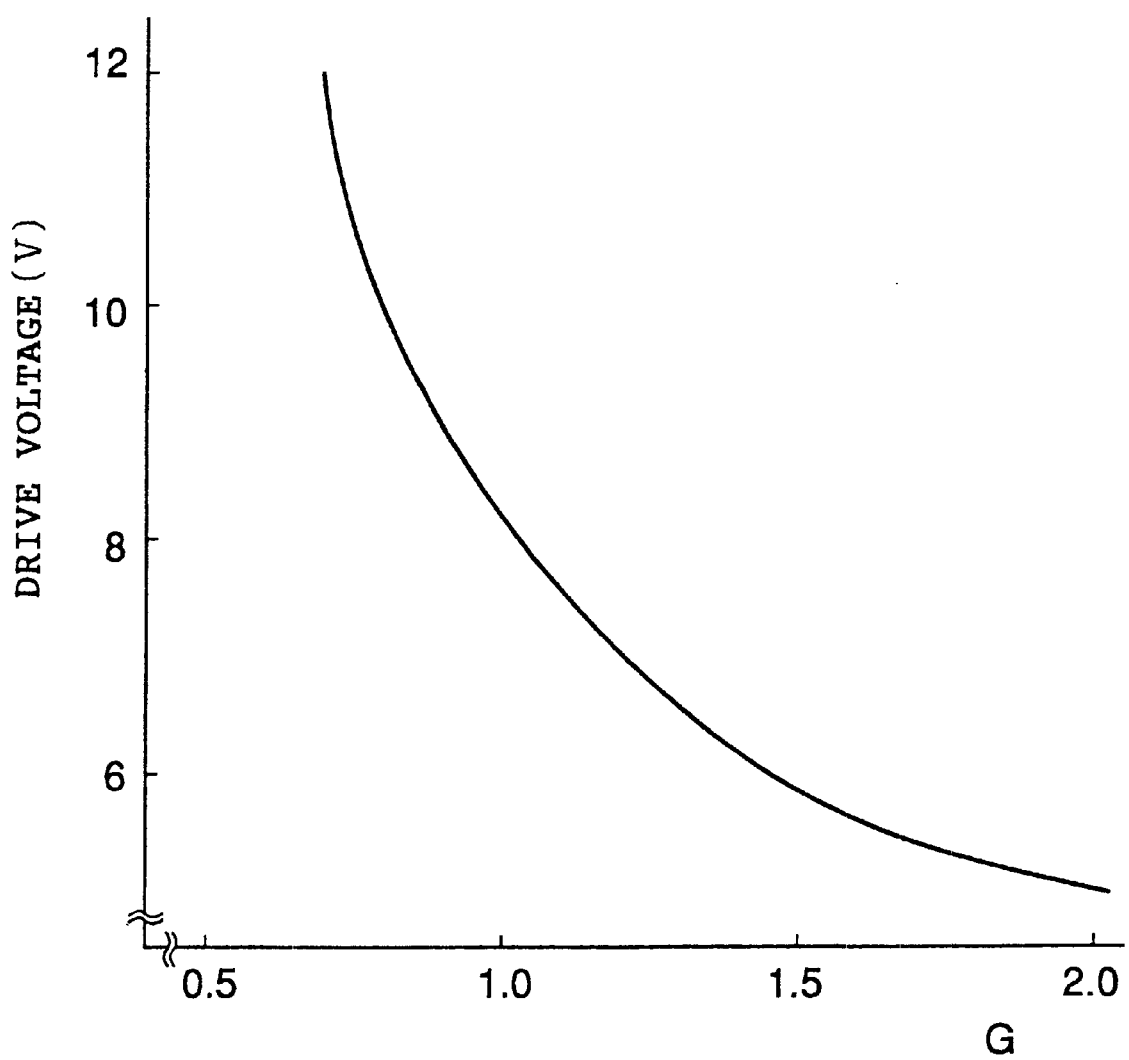
Figure 196:
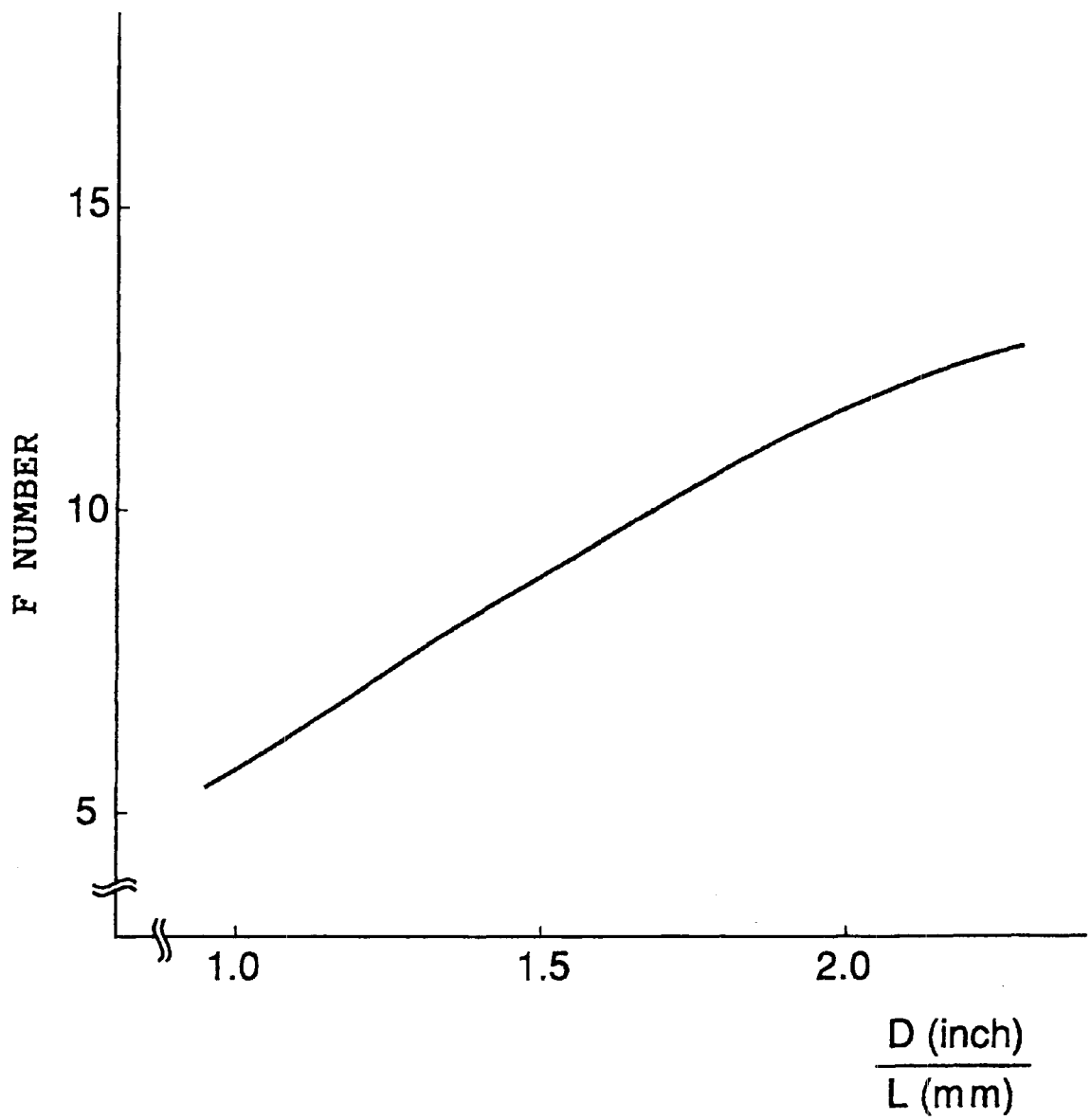
Figure 197:
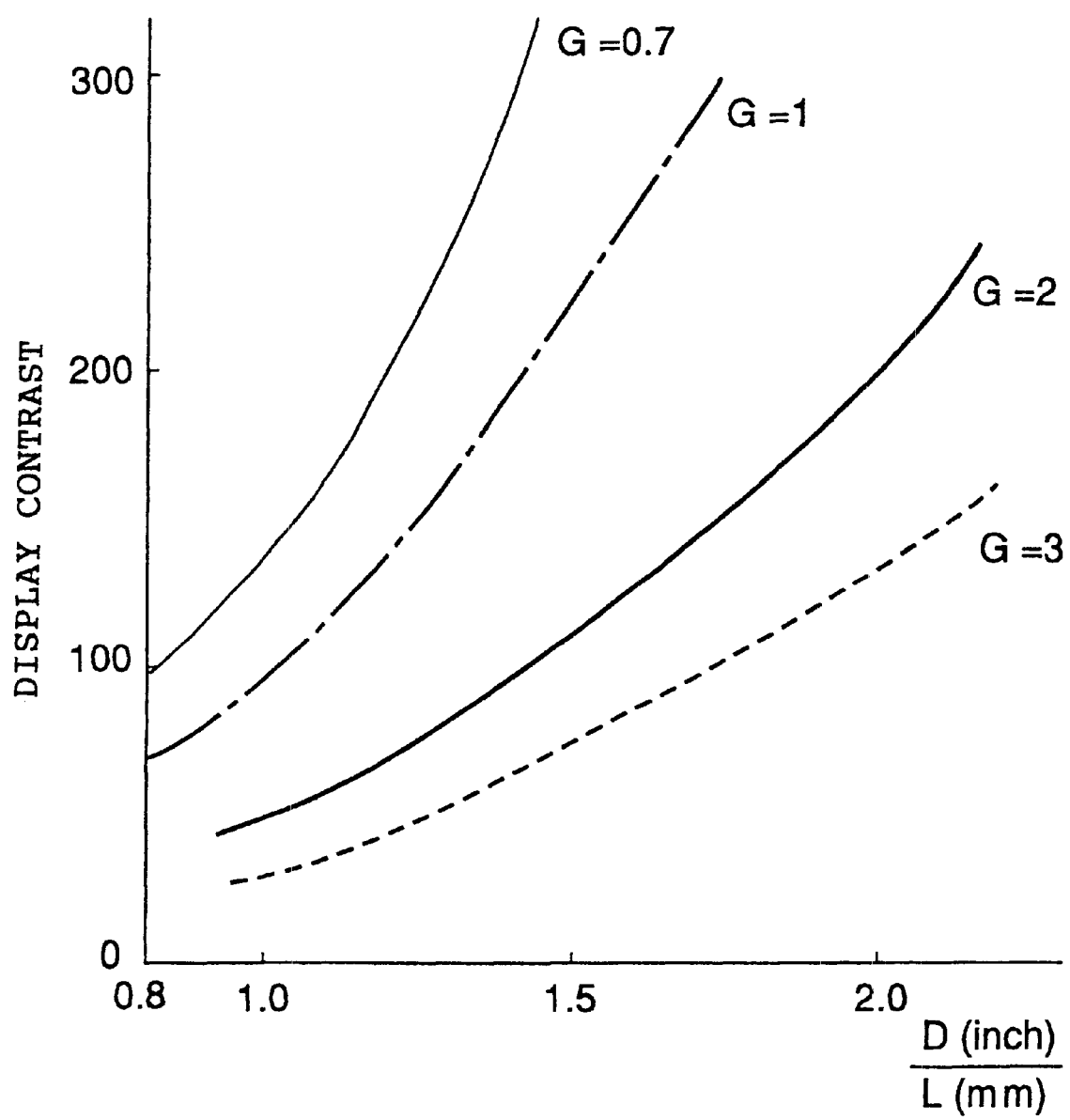
Figure 198:
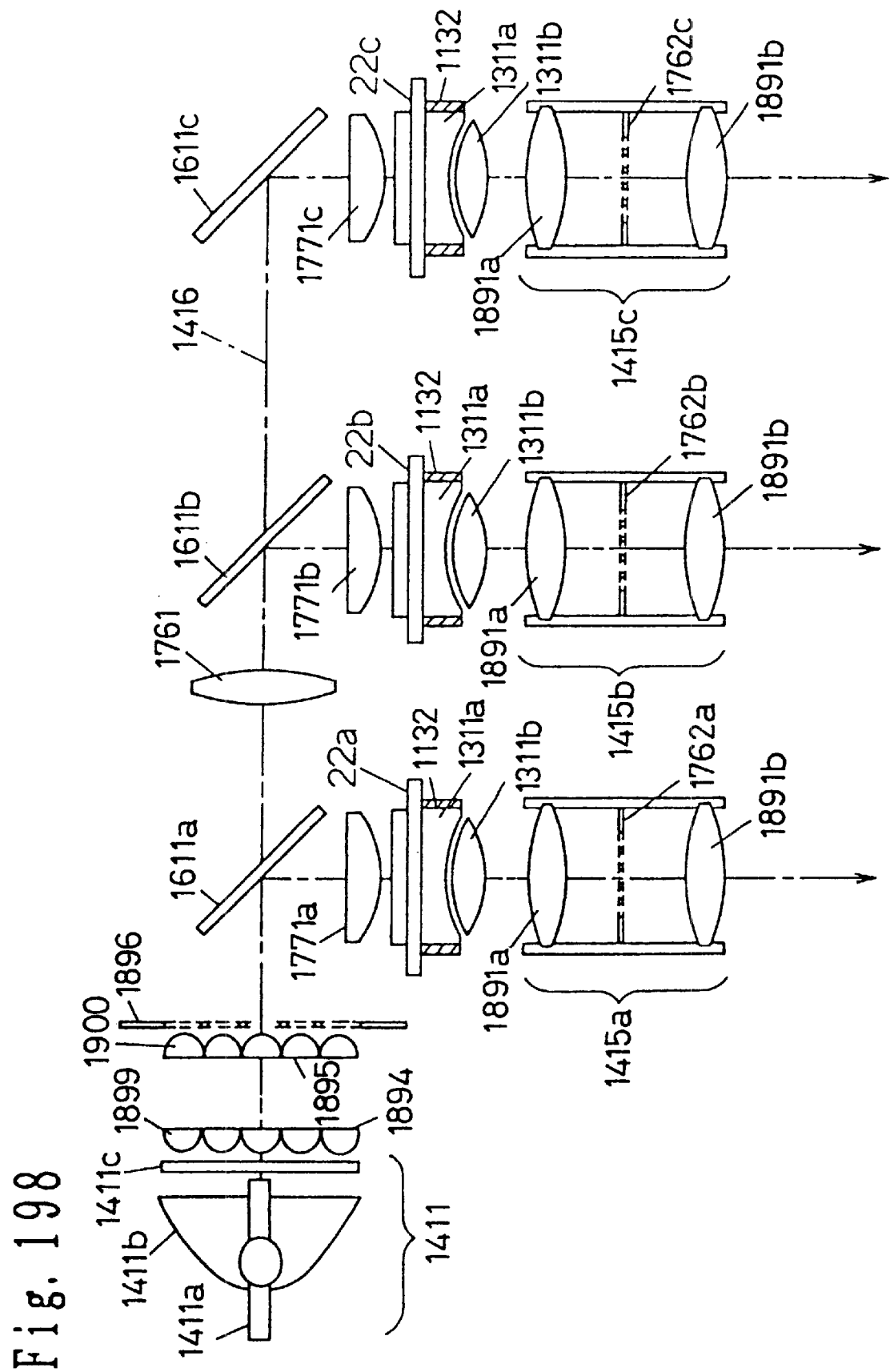
Figure 199:
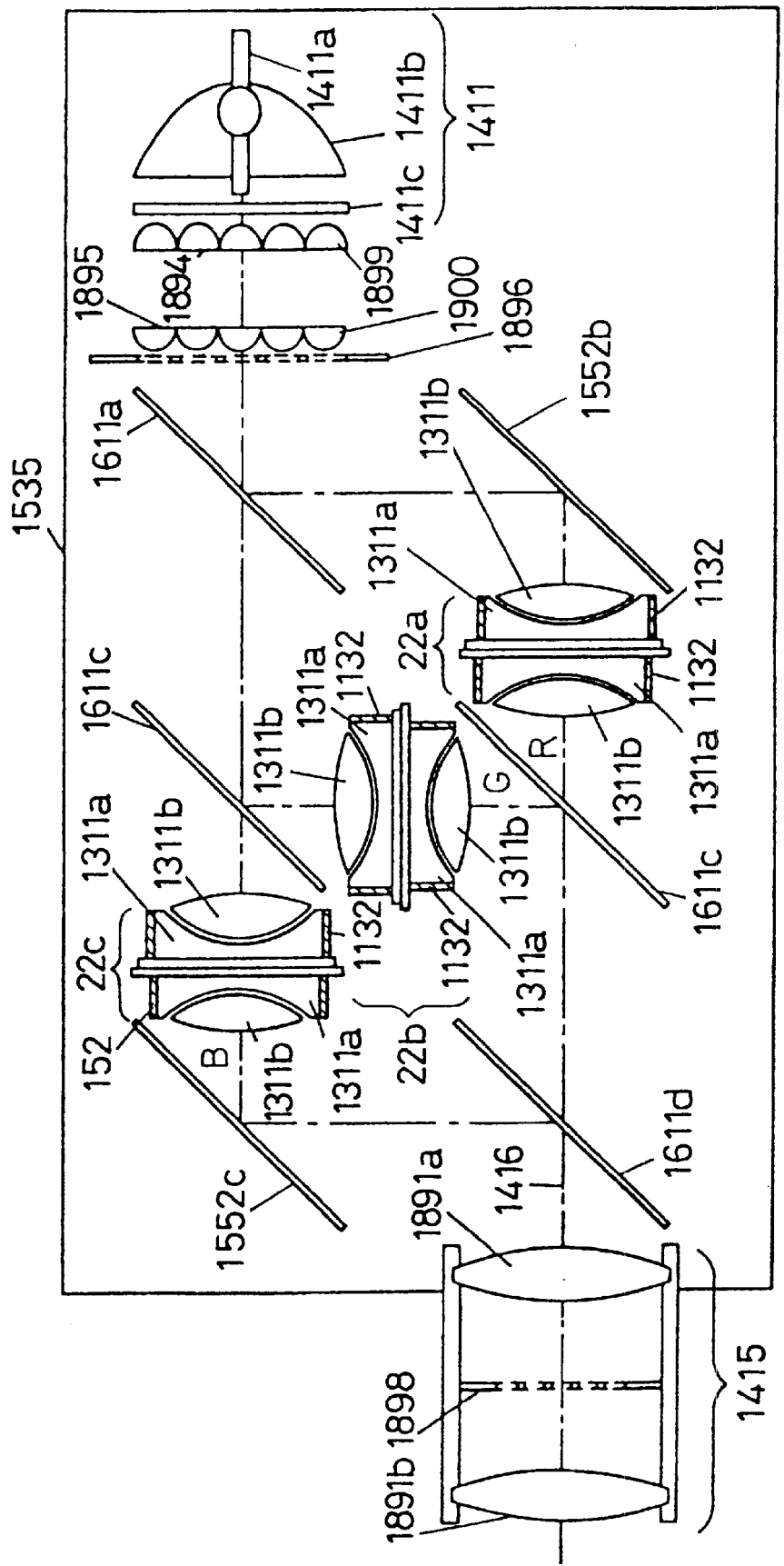
Figure 200:
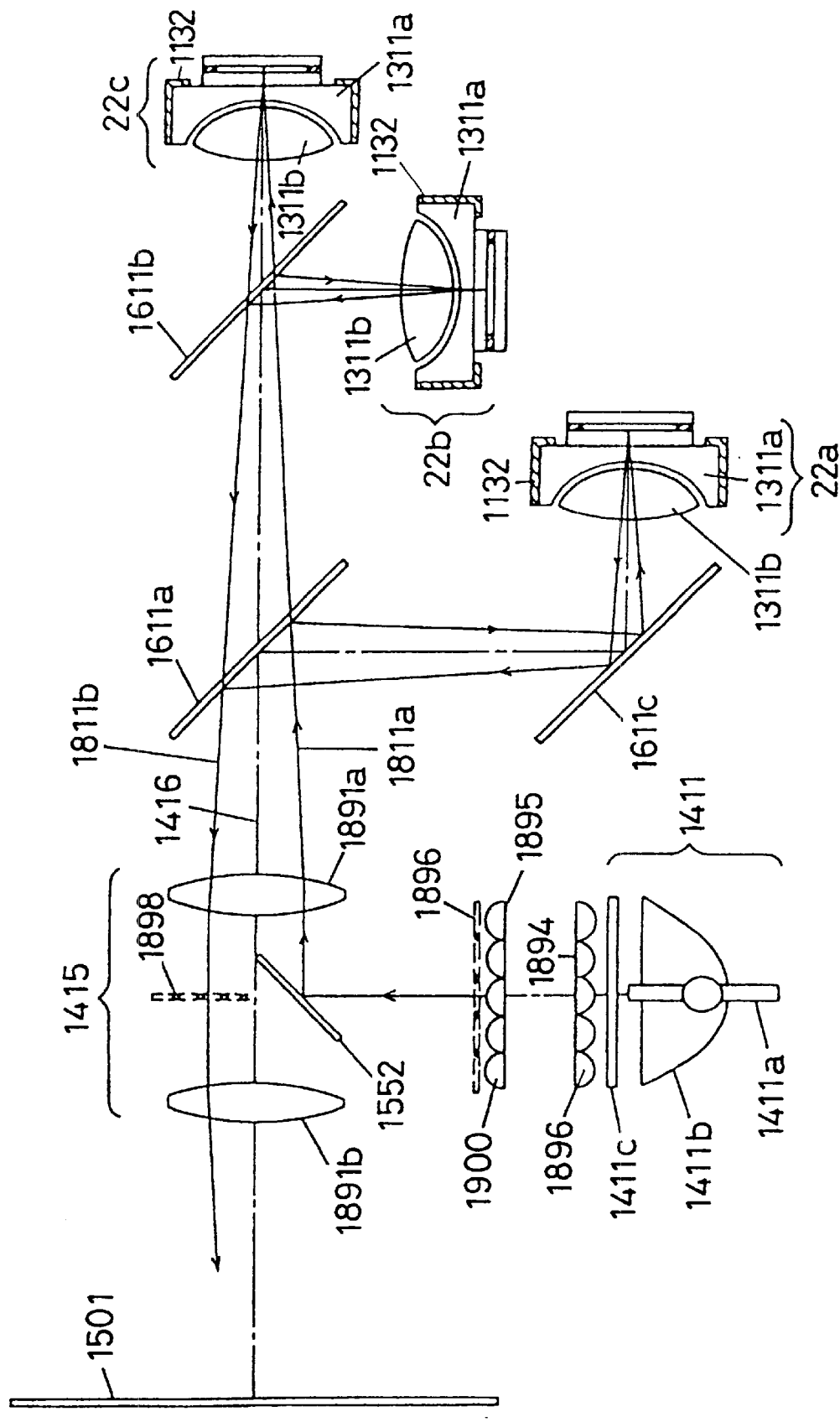
Figure 201:
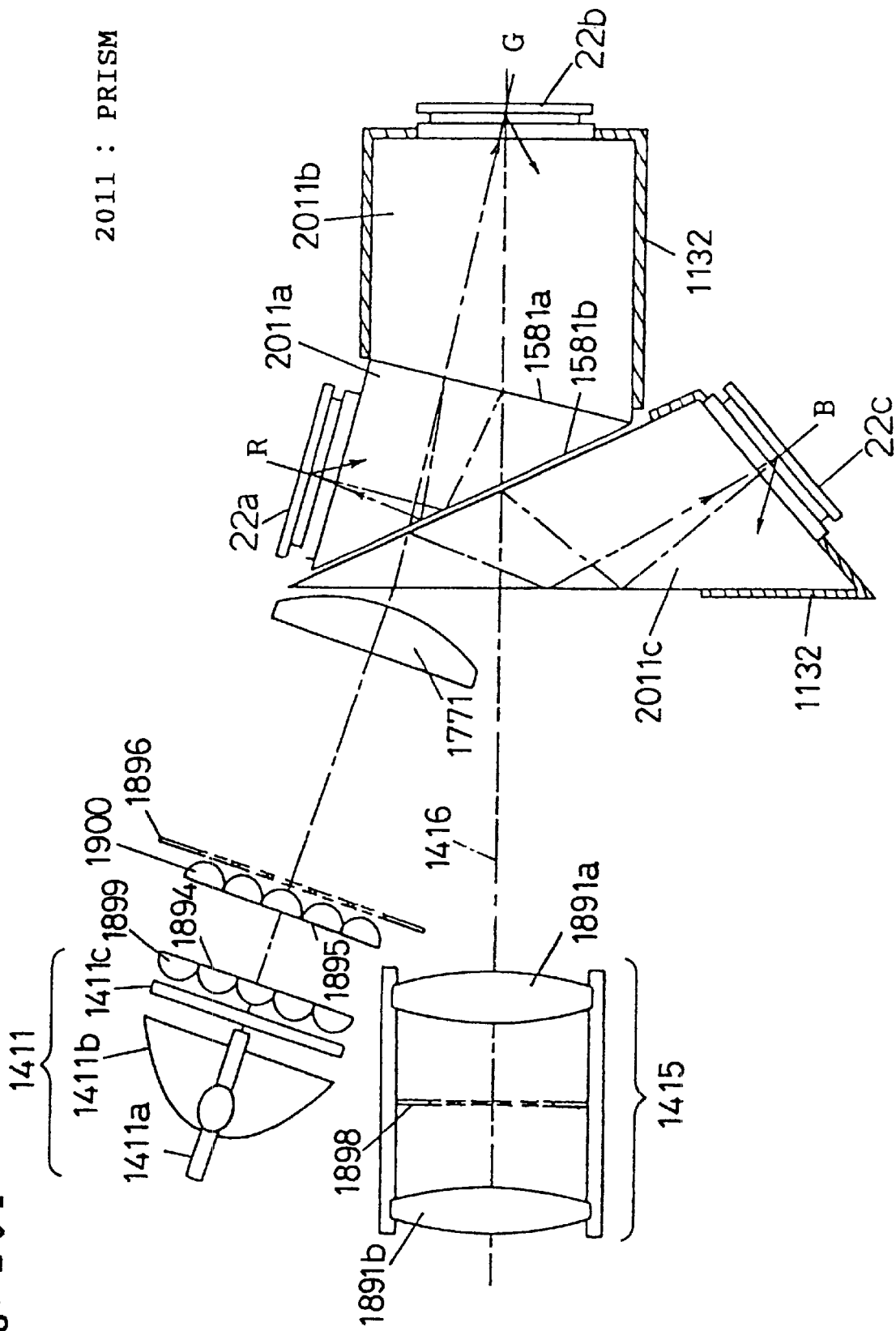
Figure 202:
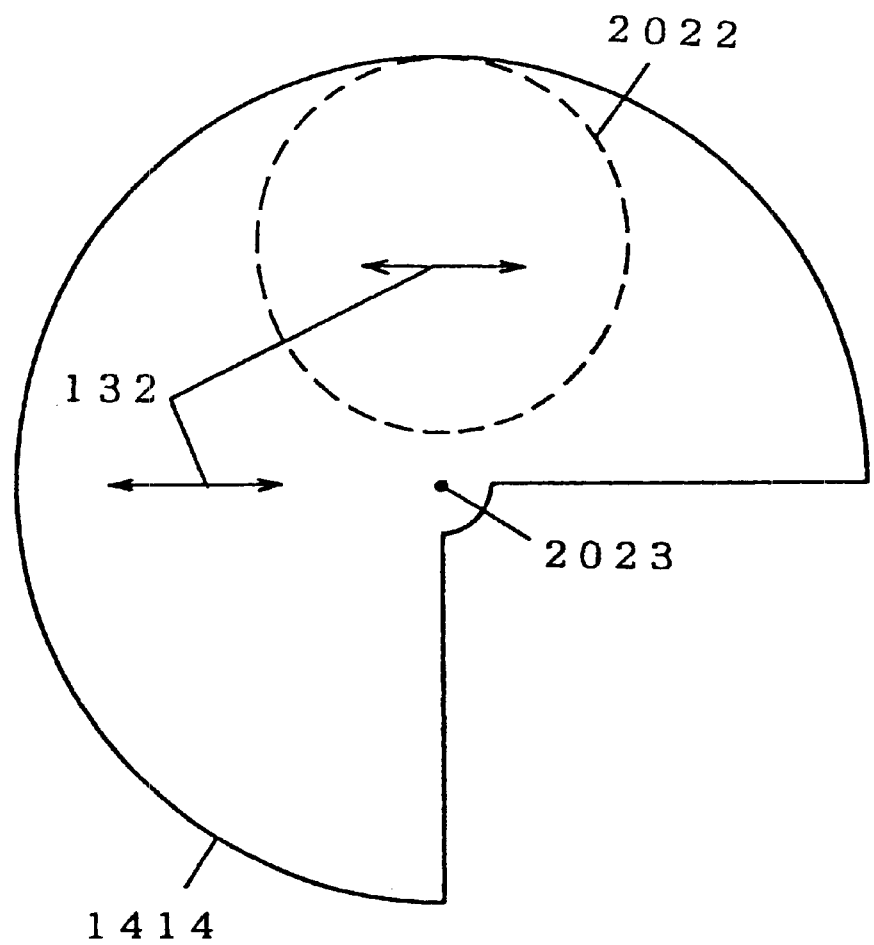
Figure 207:
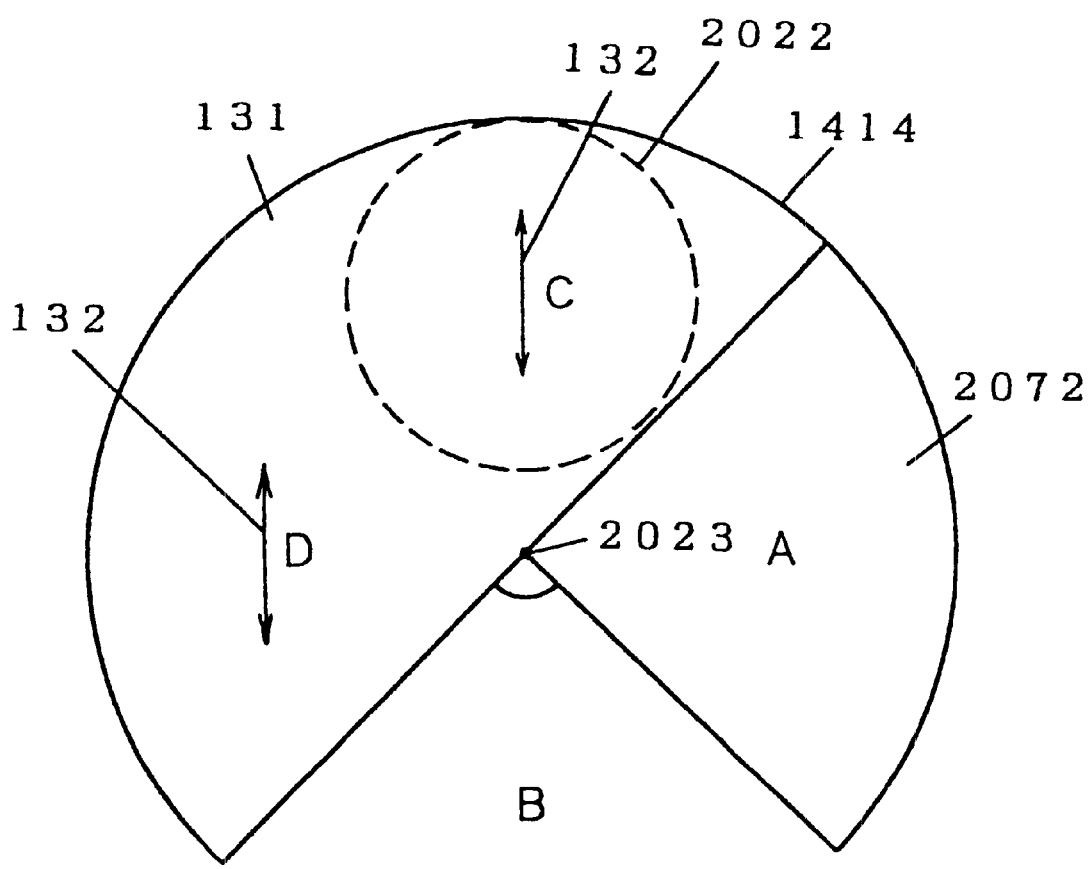
Figure 209:
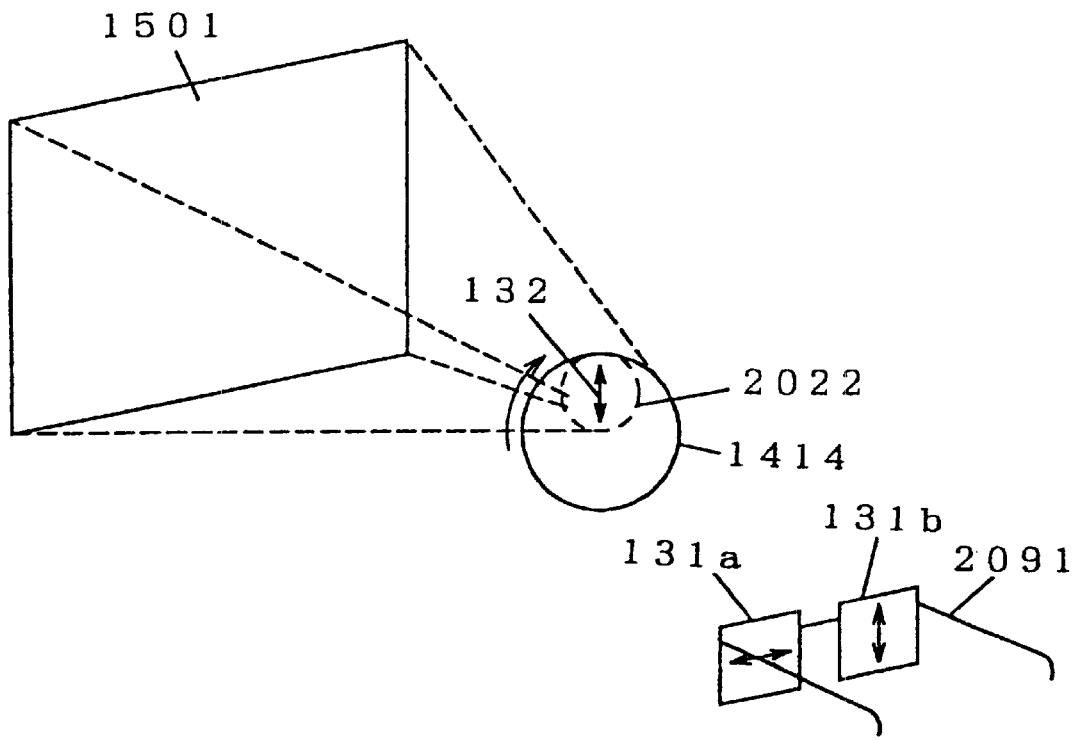
Figure 209:
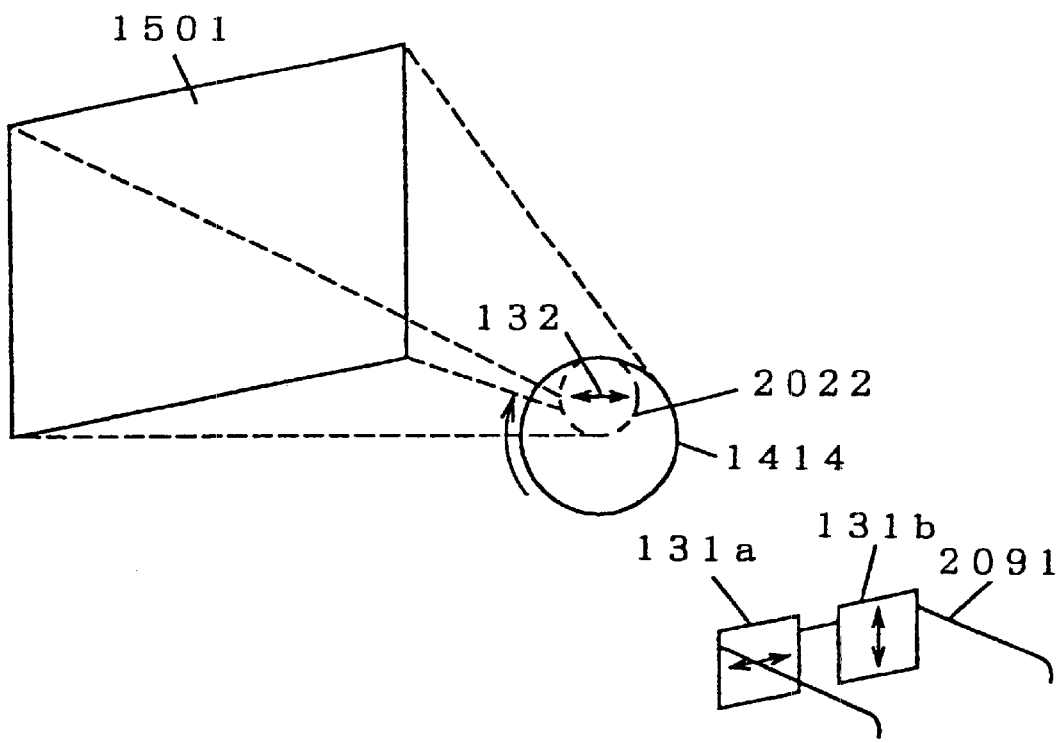
Figure 210:
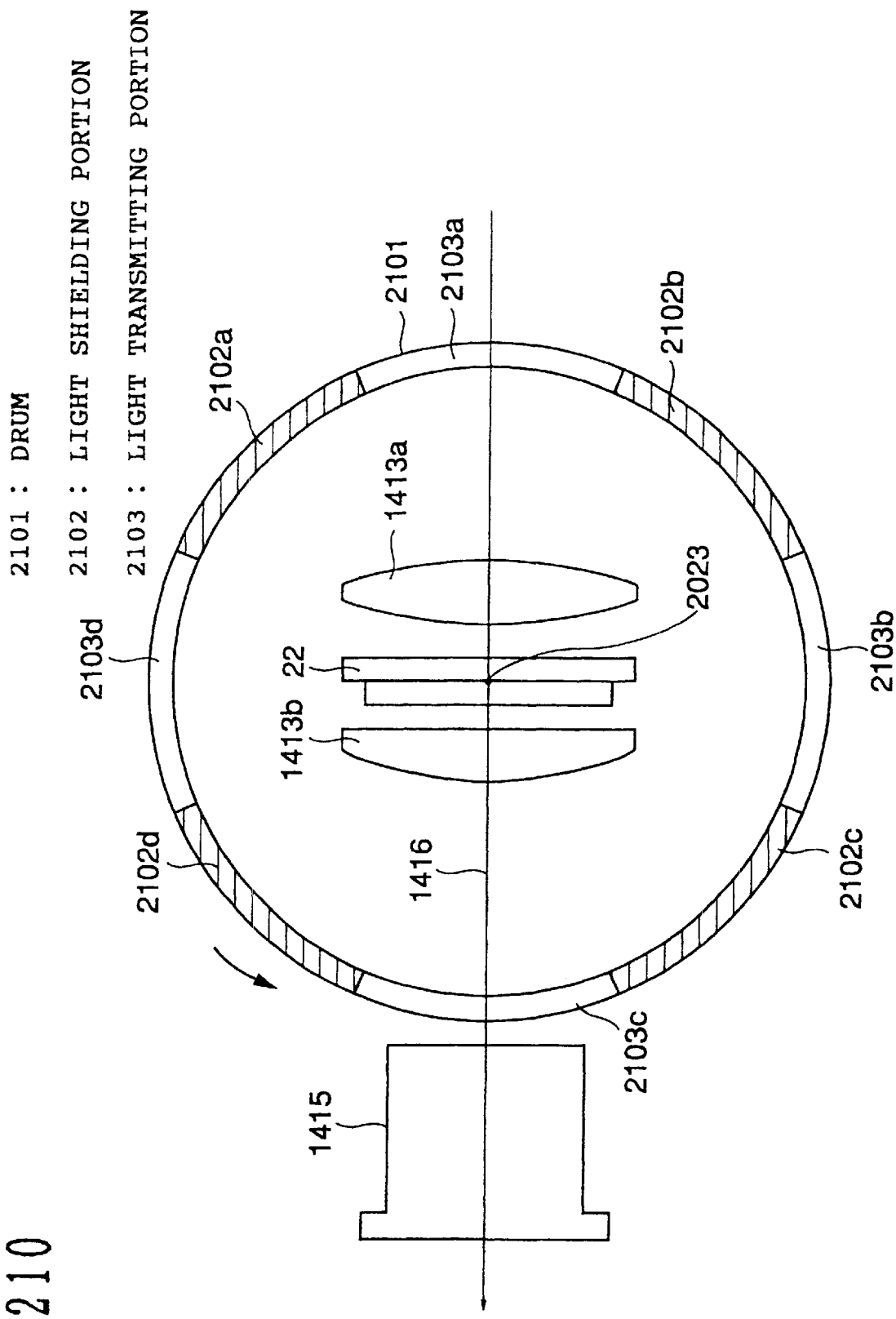
Figure 211:
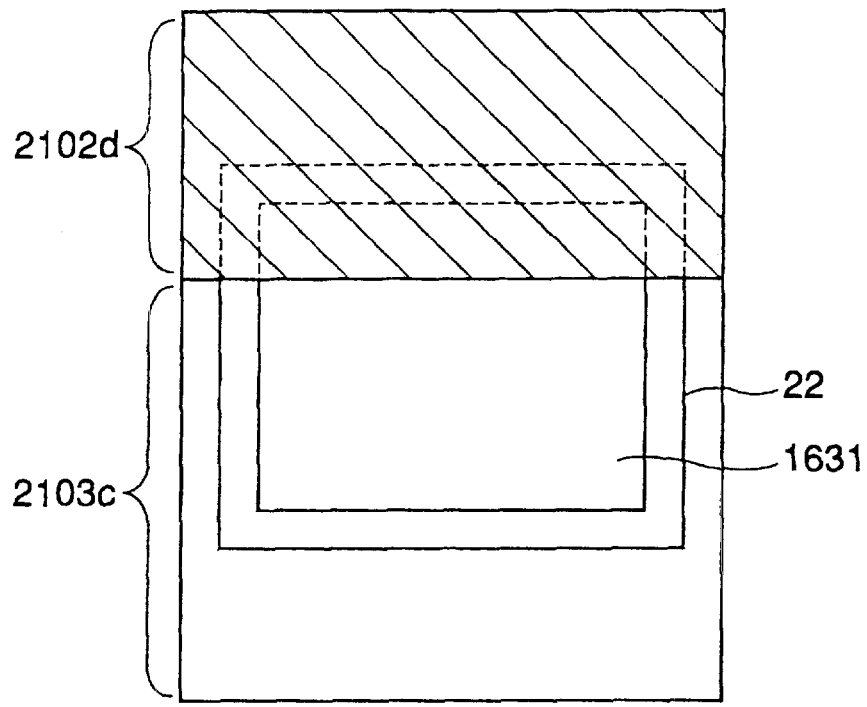
Figure 211:
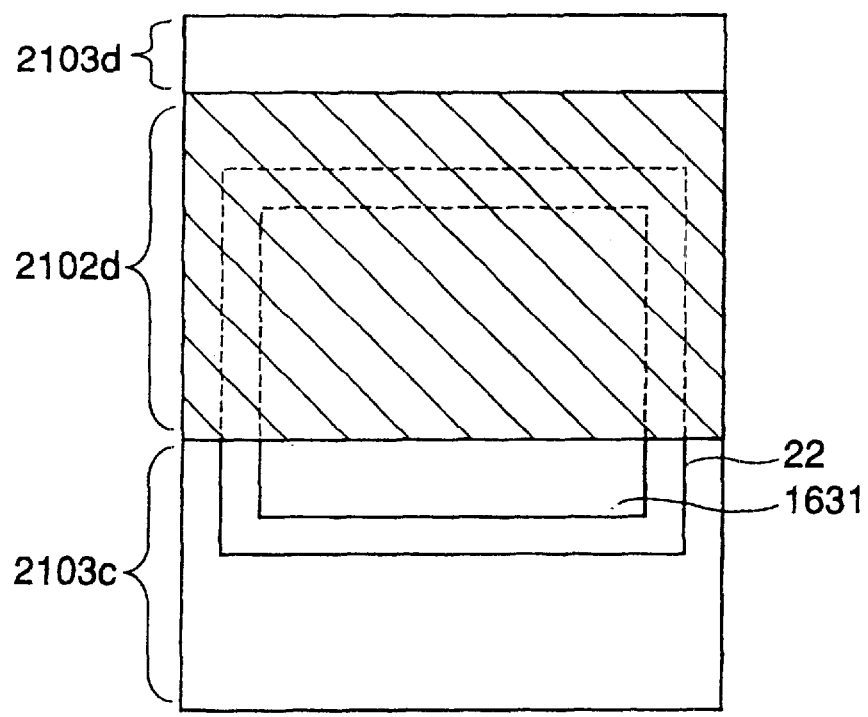
Figure 212:
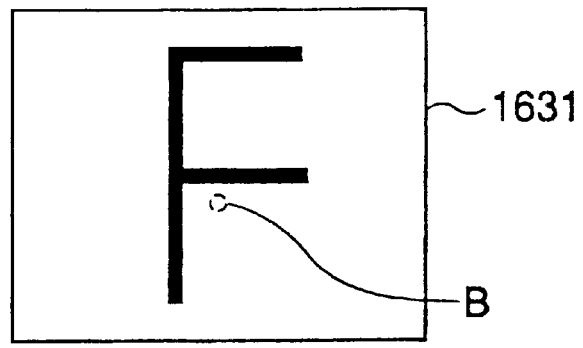
Figure 212:
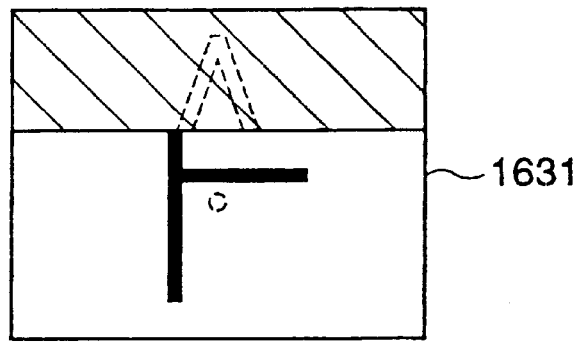
Figure 212:
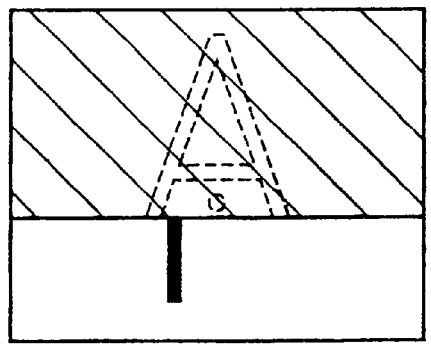
Figure 212:
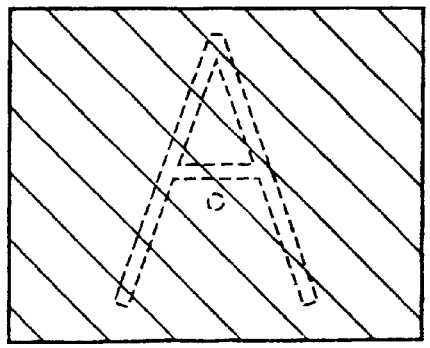
Figure 213:
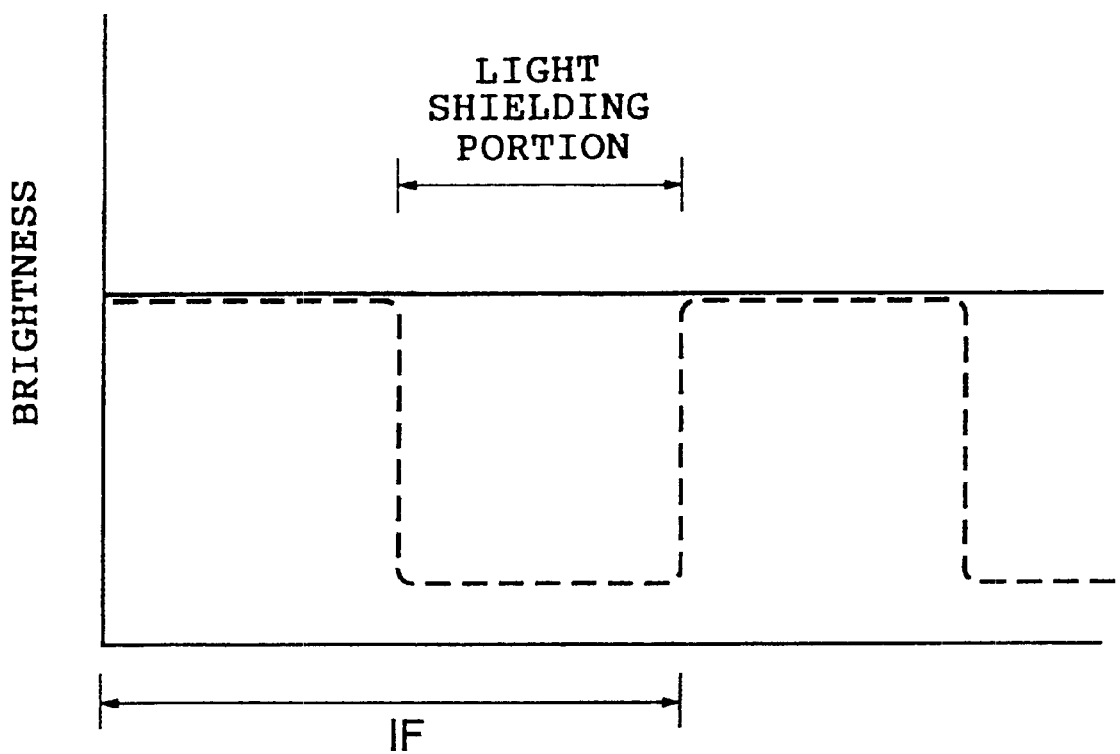
Figure 214:
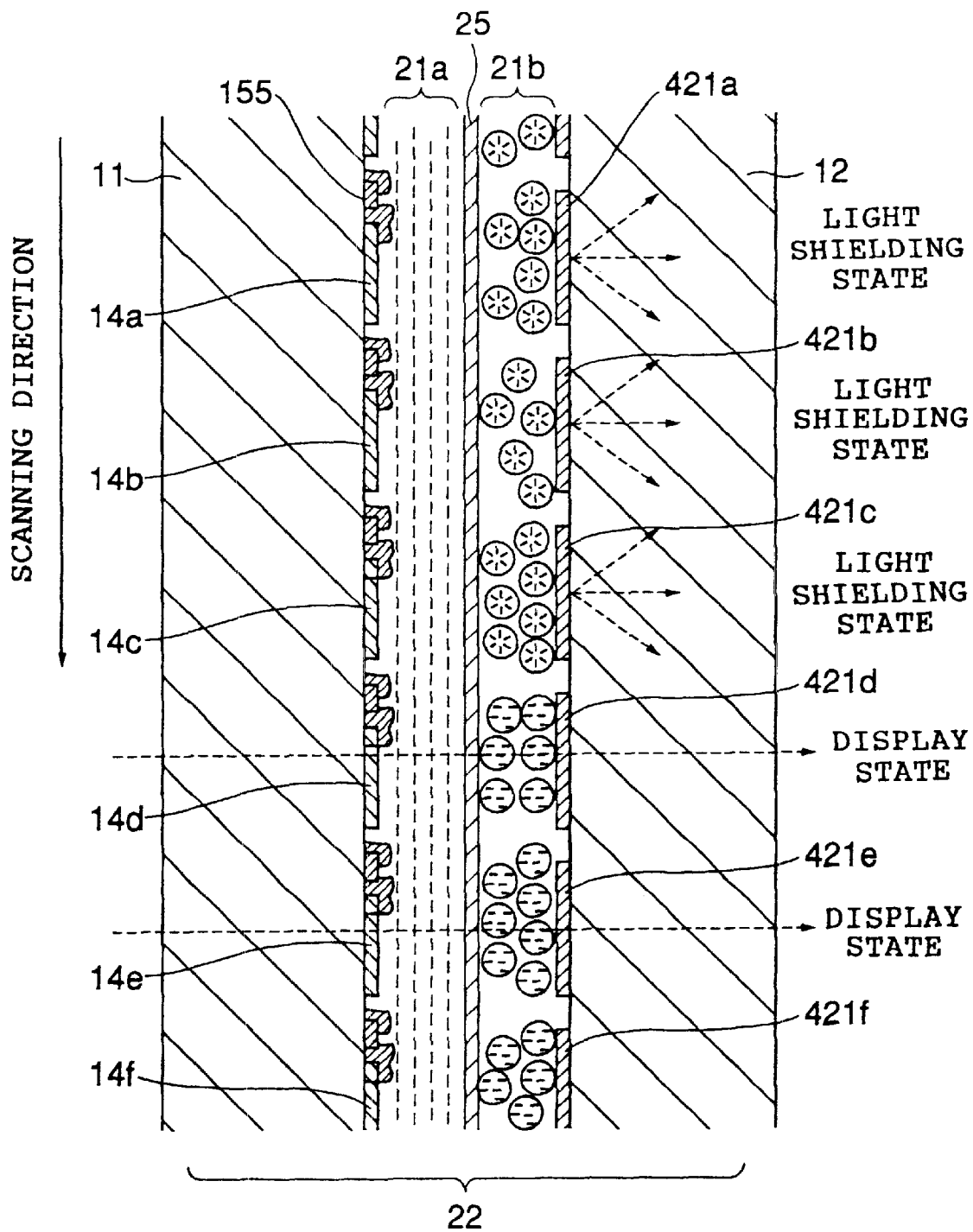
Figure 215:
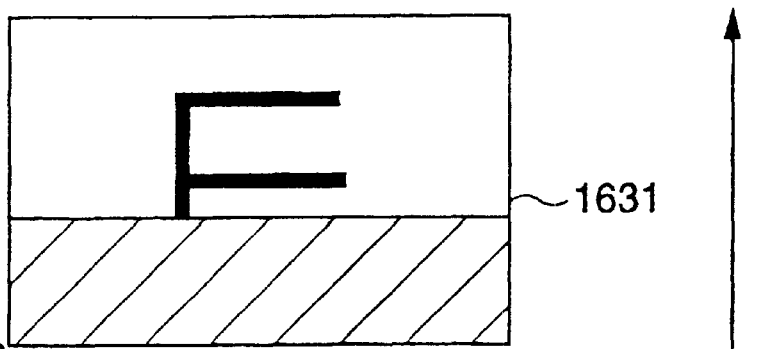
Figure 215:
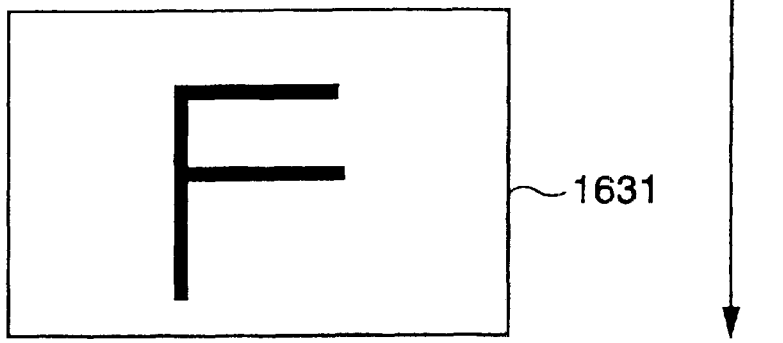
Figure 215:
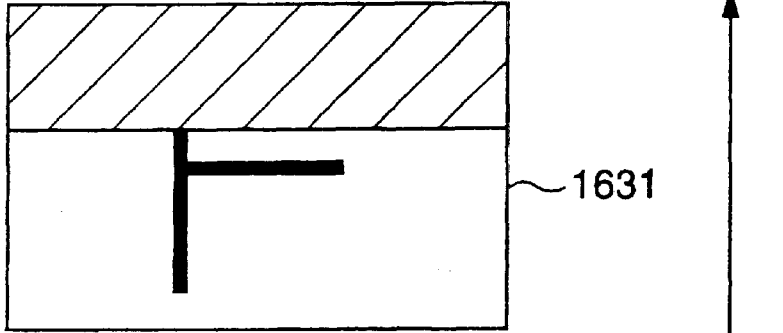
Figure 215:
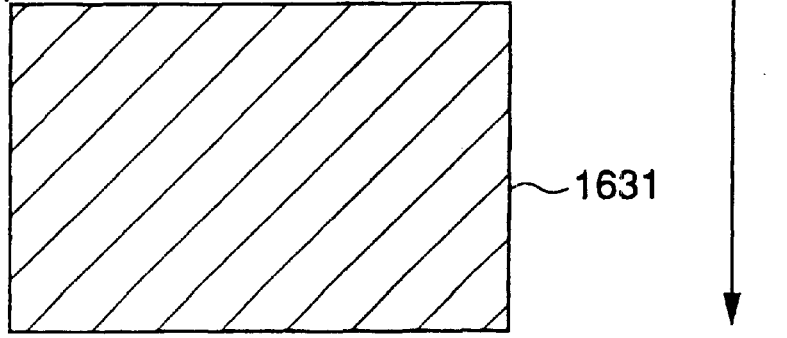
Figure 216:
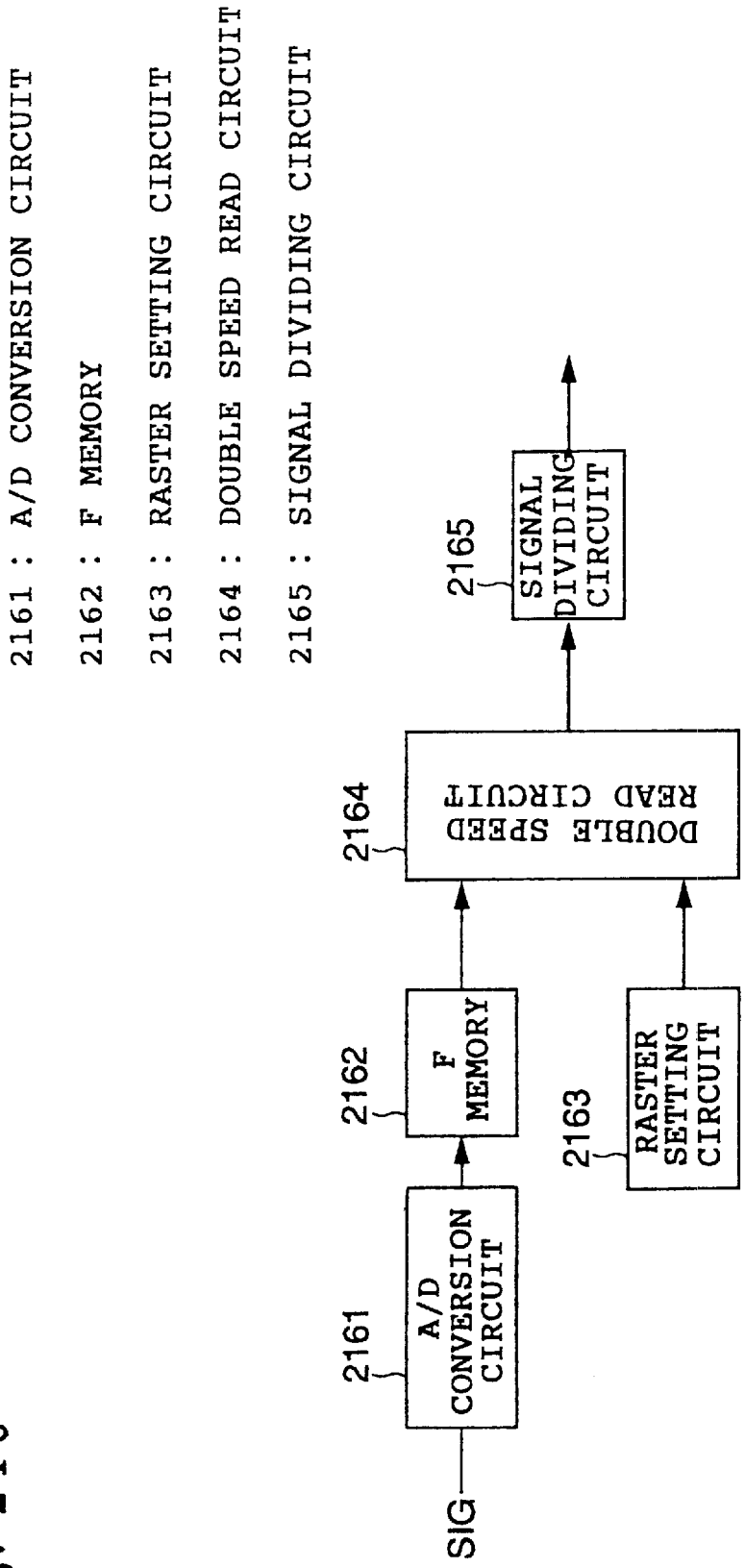
Figure 217:
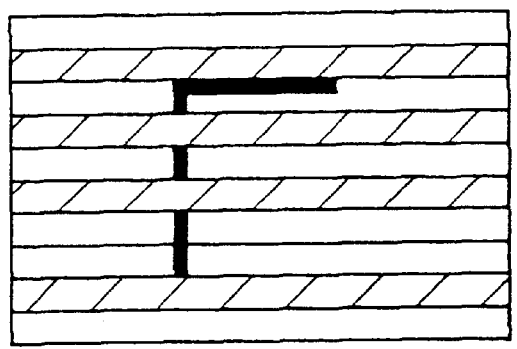
Figure 217:
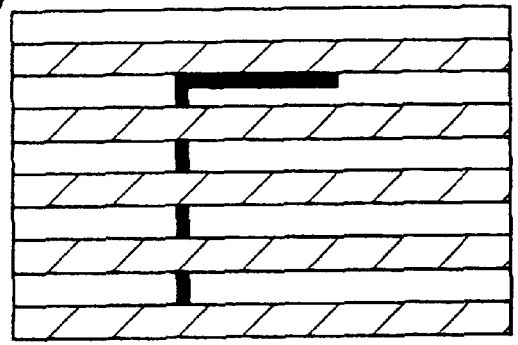
Figure 217:
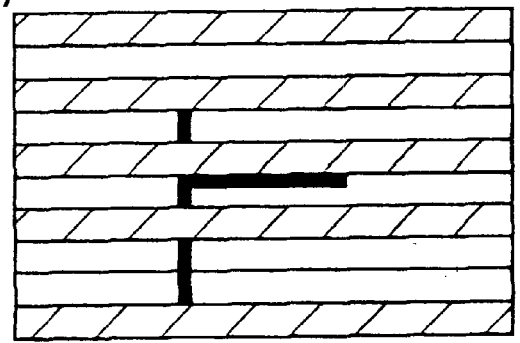
Figure 217:
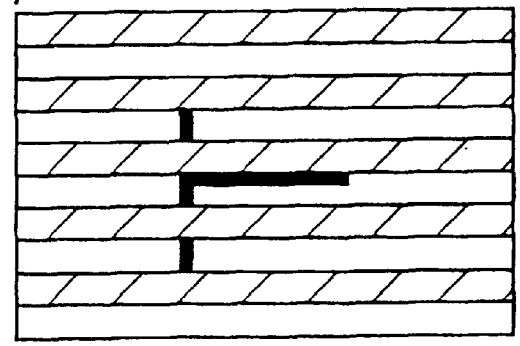
Figure 218:
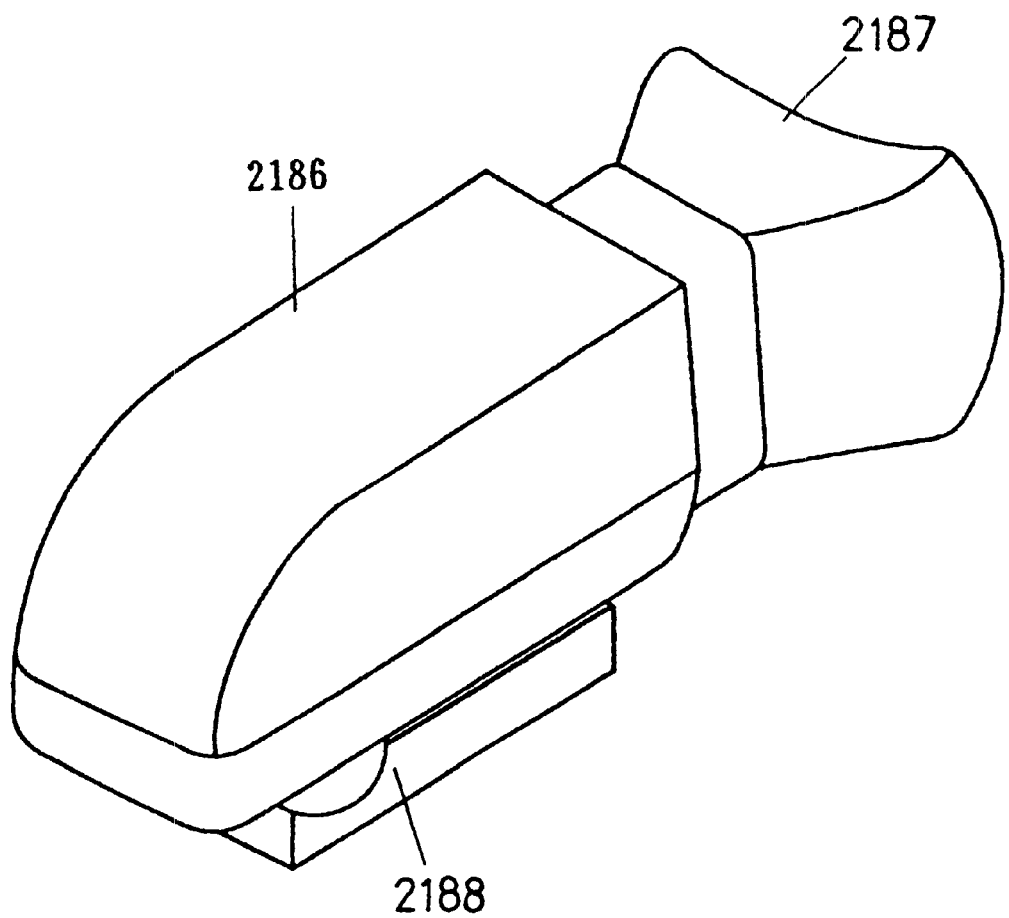
Figure 219:
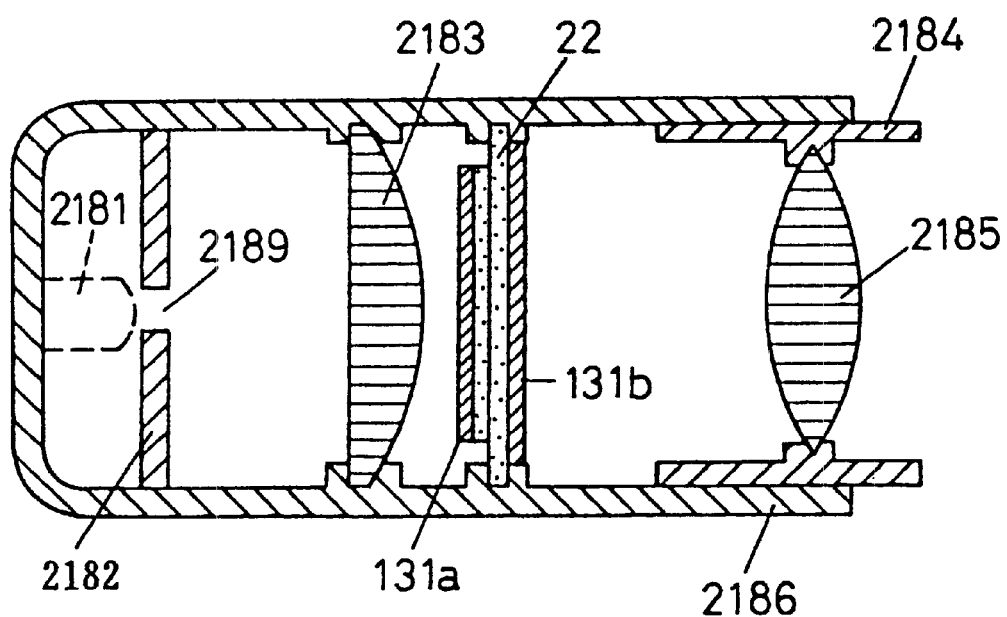
Figure 220:
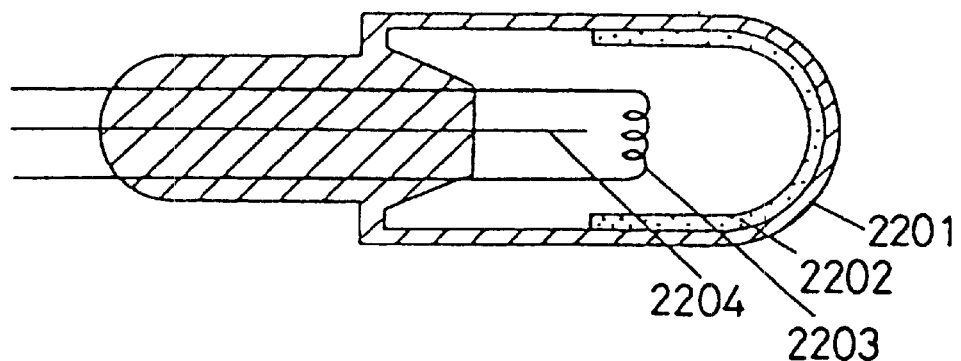
Figure 220:
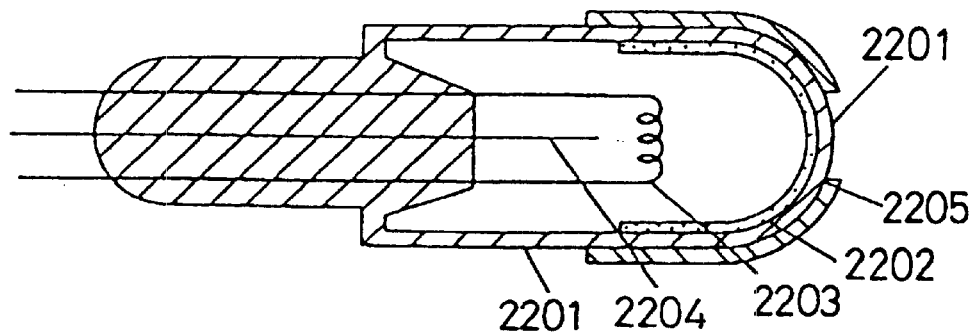
Figure 221:
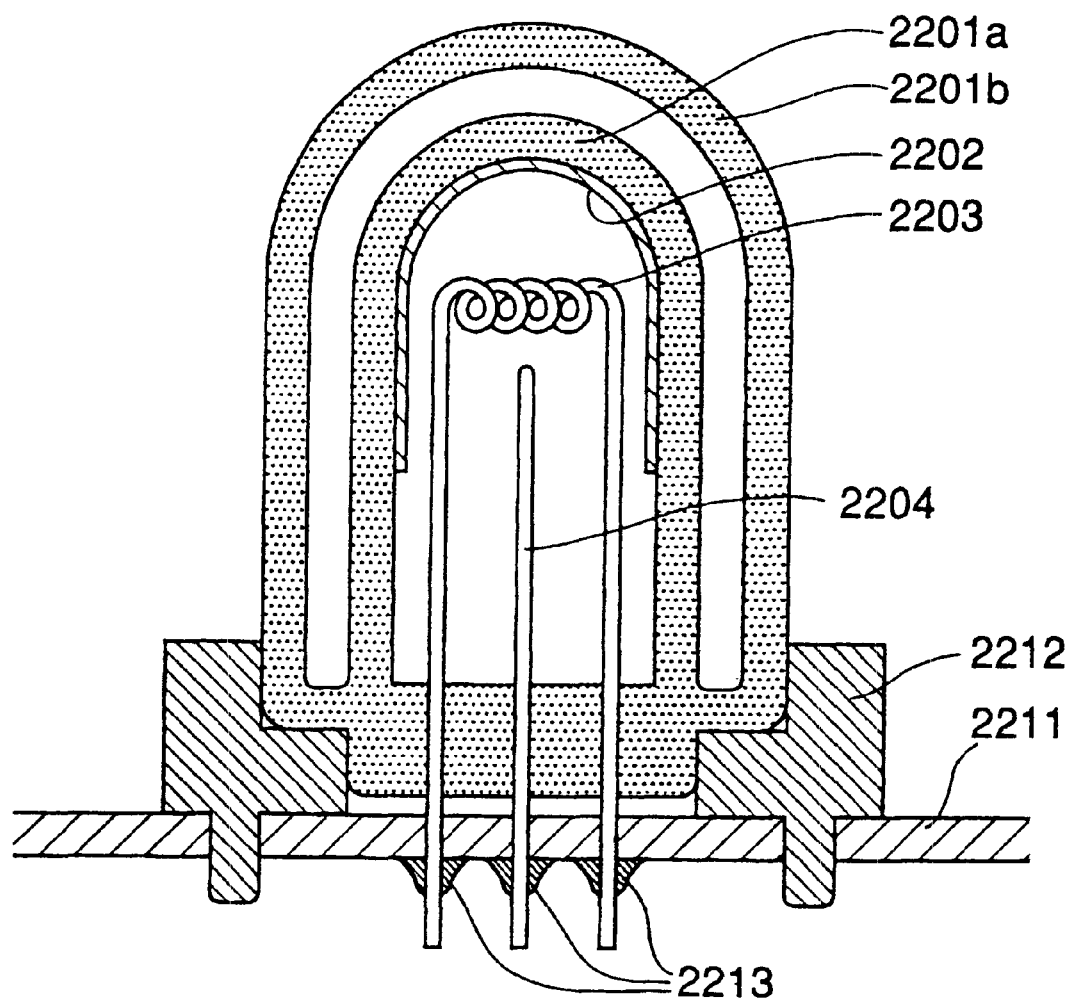
Figure 222:
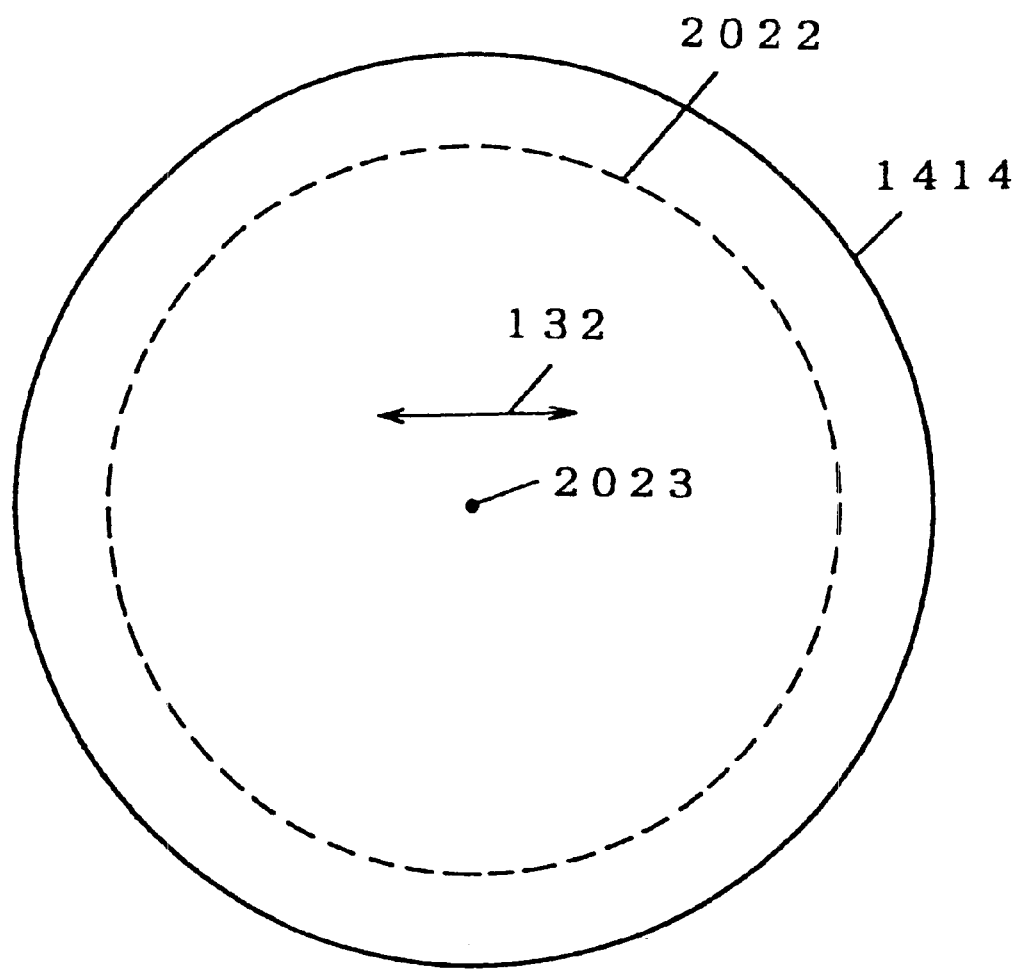
Figure 223:
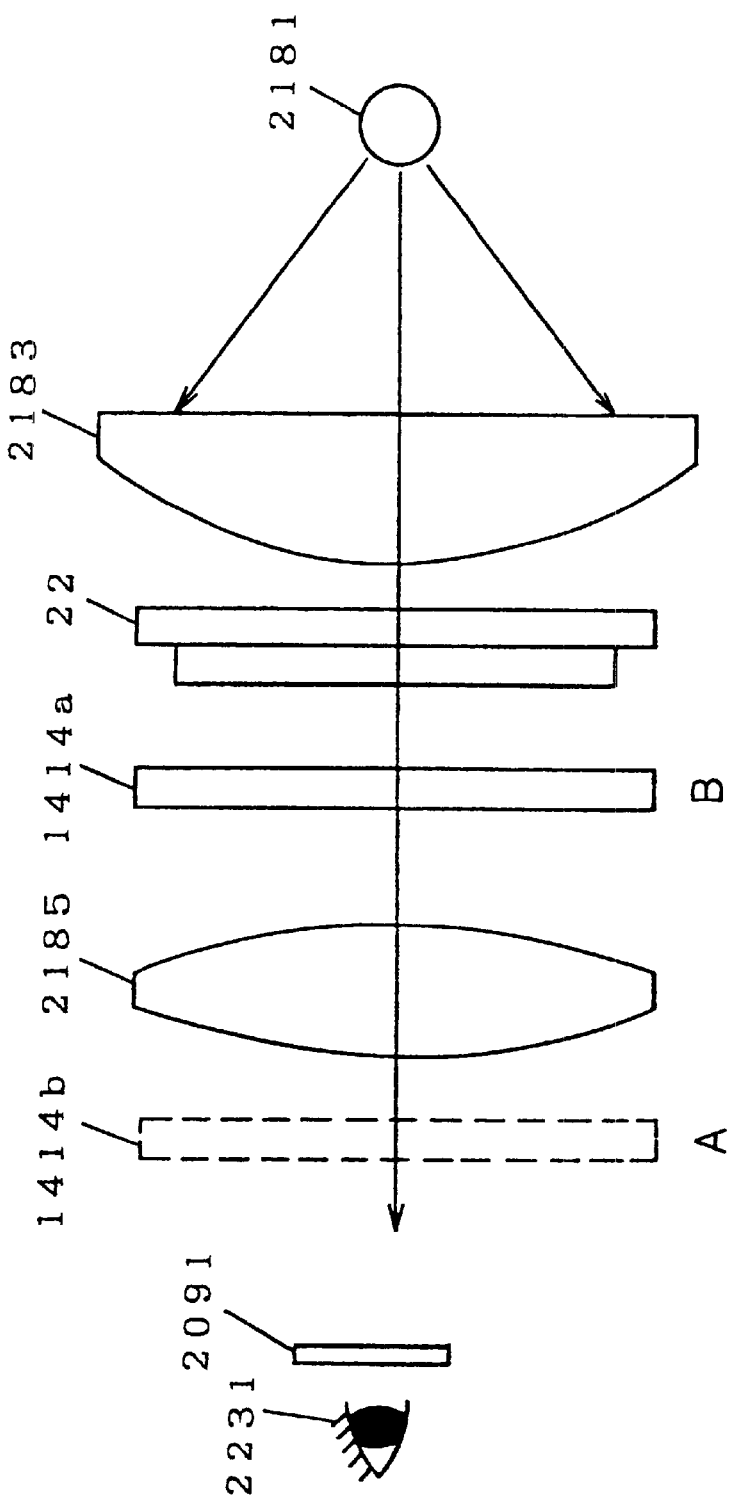
Figure 224:
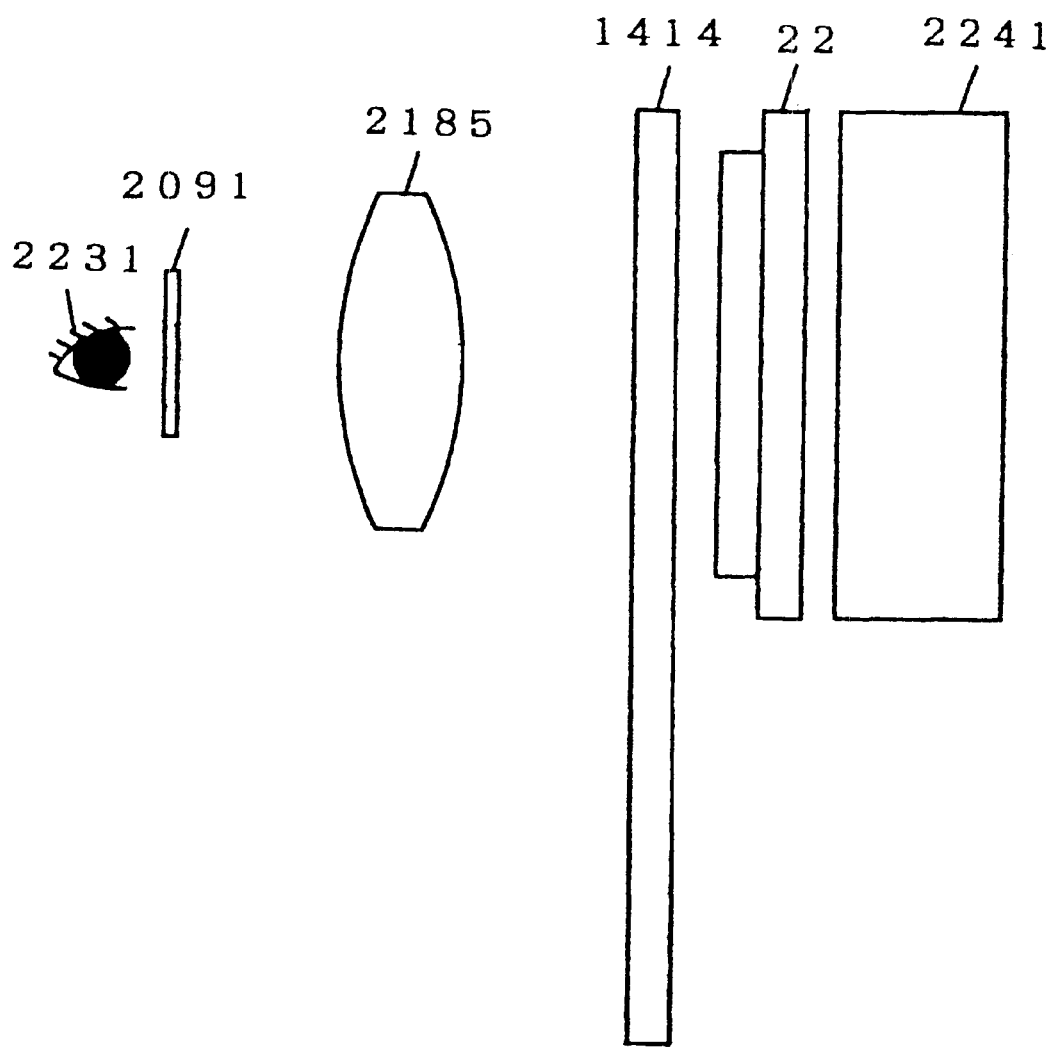
Figure 225:
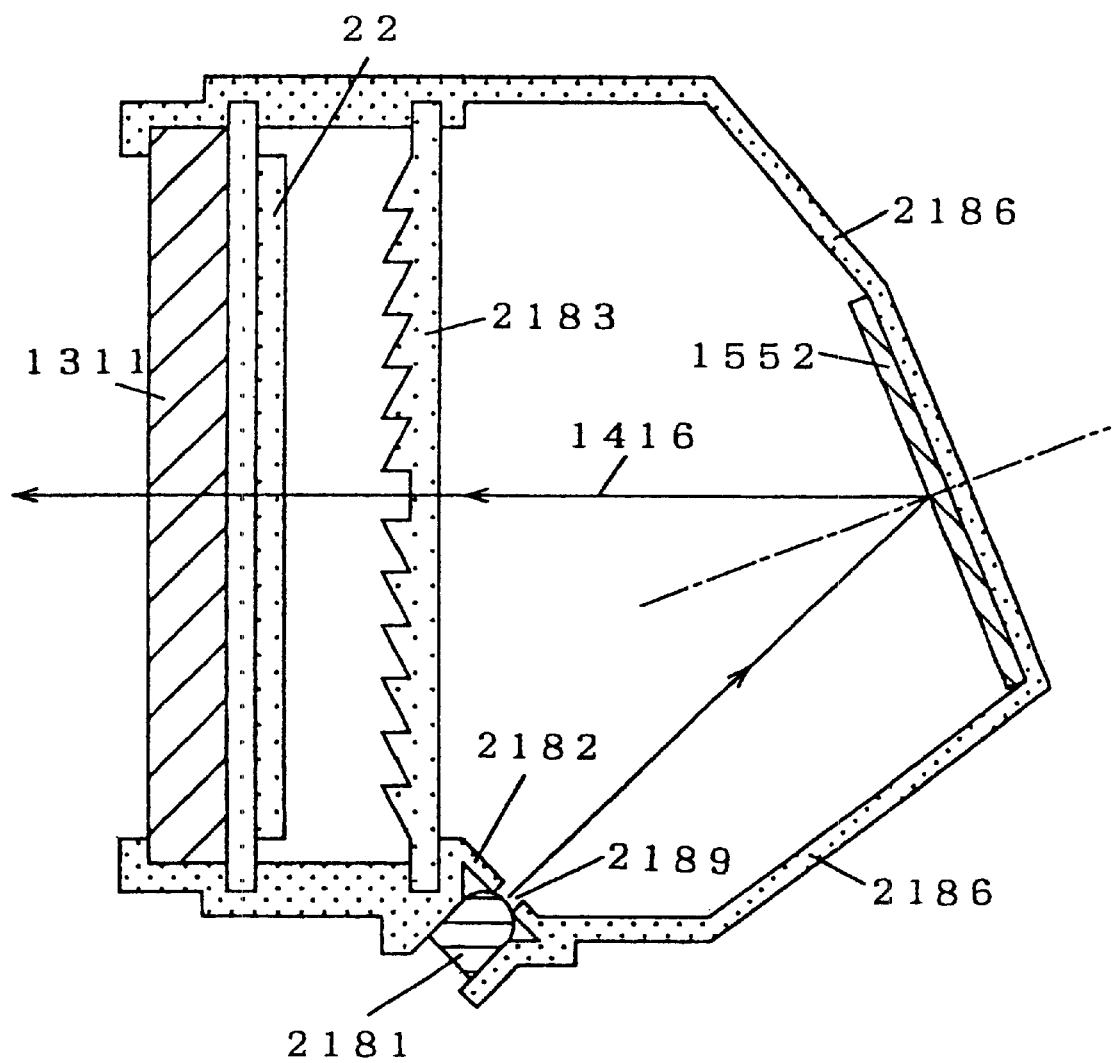
Figure 226:
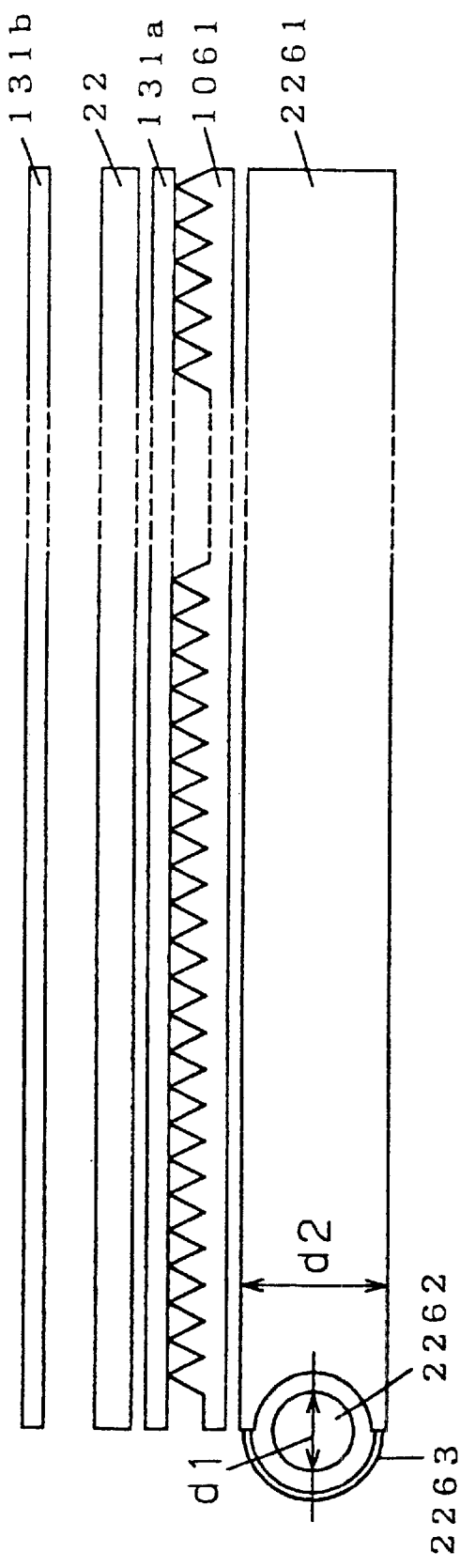
Figure 227:
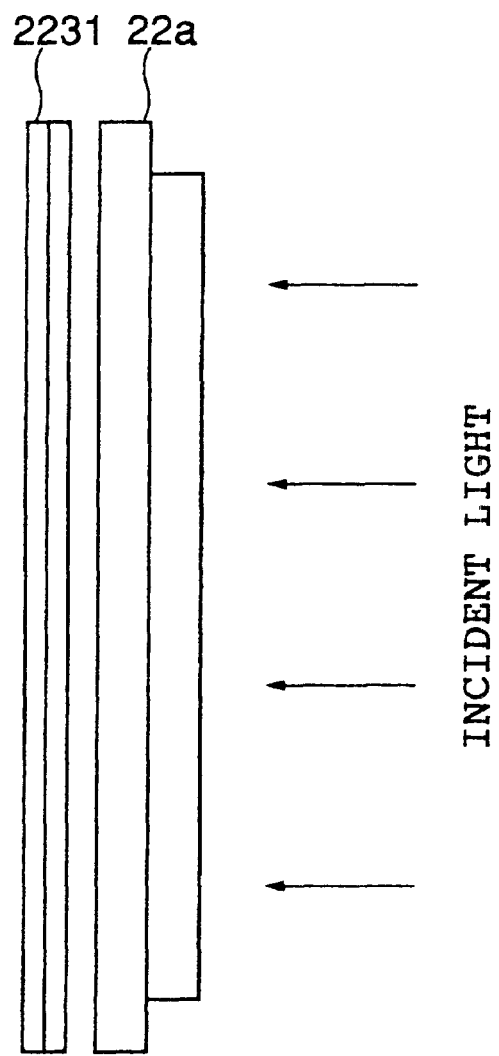
Figure 228:
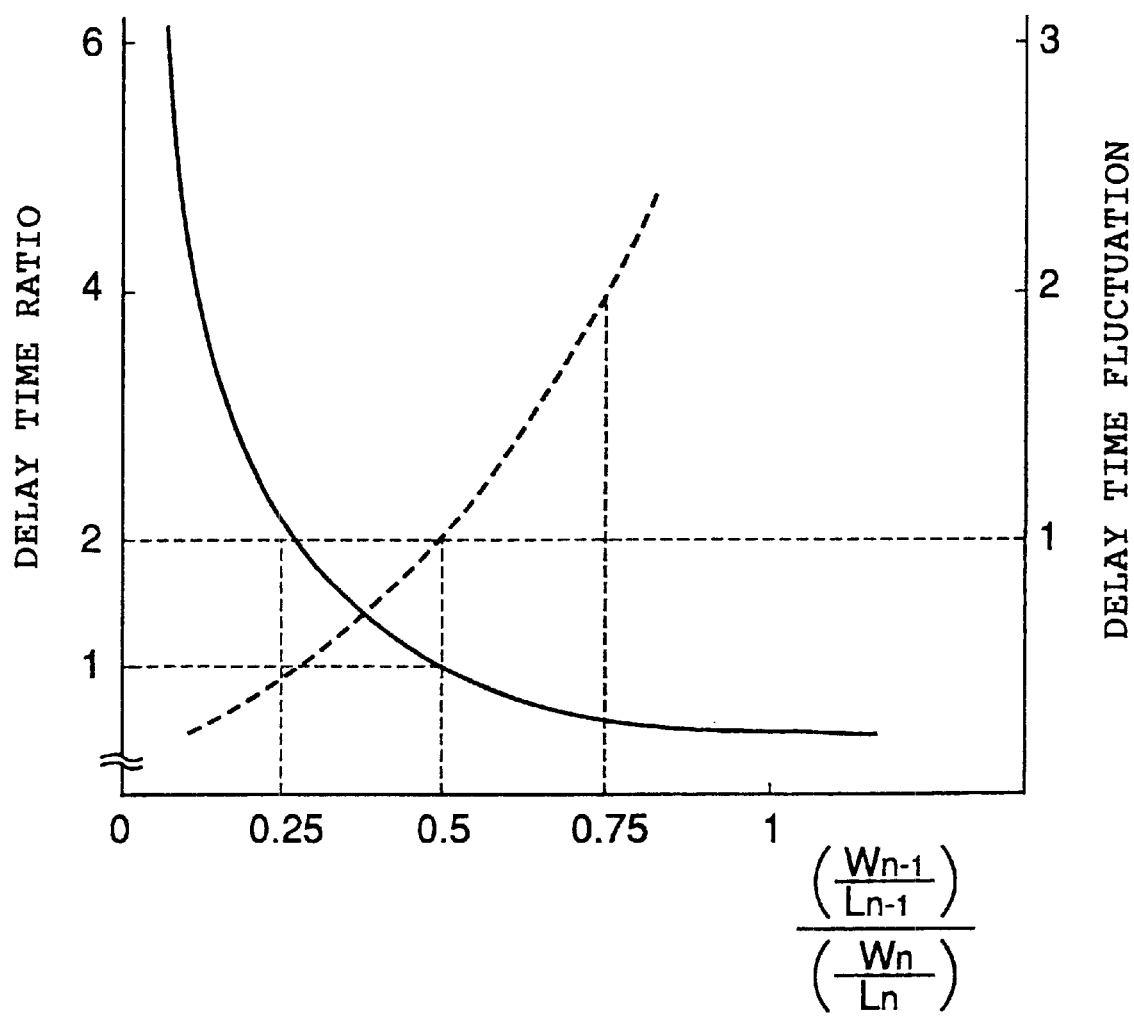

FIG. 143 is a constitution diagram of the color purity enhancing filter (optical filter) in another embodiment of the present invention;

FIG. 144 is a characteristic diagram of the color purity enhancing filter (optical filter);

FIG. 145 is a characteristic diagram of the color purity enhancing filter (optical filter);

FIG. 146 is a characteristic diagram of the color purity enhancing filter (optical filter);

FIG. 147 is a spectral distribution characteristic diagram of a metal halide lamp;

FIG. 148 is a spectral distribution characteristic diagram of the light passed through the color purity enhancing filter (optical filter);

FIG. 149 is a spectral distribution characteristic diagram of the light passed through a color filter;

FIG. 150 is an X-Y chromaticity diagram;

FIG. 151 is a constitution diagram of the projection display in another embodiment of the present invention;

FIG. 152 is a constitution diagram of the projection display in another embodiment of the present invention;

FIG. 153 is a constitution diagram of the portable liquid crystal projector of the present invention, FIG. 154 is a constitution diagram as the liquid crystal projector of FIG. 153 is contracted;

FIG. 155 is a constitution diagram of the projection television of the present invention;

FIG. 156 is a constitution diagram of the optical block of FIG. 155;

FIG. 157 is a constitution diagram of the projection display in another embodiment of the present invention;

FIG. 158 is a constitution diagram of the projection display in another embodiment of the present invention;

FIG. 159 is a constitution diagram of the projection display in another embodiment of the present invention;

FIG. 160 is a constitution diagram of the projection display in another embodiment of the present invention;

FIG. 161 is a constitution diagram of the projection display in another embodiment of the present invention;

FIG. 162 is a spectral distribution characteristic diagram of the dichroic mirror of the projection display of FIG. 161;

FIG. 163 is a constitution diagram of the projection display in another embodiment of the present invention;

FIG. 164 is a constitution diagram of the projection display in another embodiment of the present invention;

FIG. 165 is an explanatory diagram of the cooling structure of the liquid crystal projector of the present invention;

FIG. 166 is an explanatory diagram of the cooling structure of the liquid crystal projector of the present invention;

FIG. 167 is an explanatory diagram of the cooling structure of the liquid crystal projector in another embodiment of the present invention;

FIG. 168 is an explanatory diagram of the cooling structure of the liquid crystal projector in another embodiment of the present invention;

FIG. 169 is an explanatory diagram of the temperature-dependent characteristic compensation method of the liquid crystal display panel of the present invention;

FIG. 170 is an explanatory diagram of the temperature-dependent characteristic compensation method of the liquid crystal display panel of the present invention;

FIG. 171 is an explanatory diagram of the temperature-dependent characteristic compensation method of the liquid crystal display panel of the present invention;

FIG. 172 is a constitution diagram of the liquid crystal display panel in another embodiment of the present invention;

FIG. 173 is a constitution diagram of the liquid crystal display panel in another embodiment of the present invention;

FIG. 174 is a constitution diagram of the liquid crystal display panel in another embodiment of the present invention;

FIG. 175 is a constitution diagram of the liquid crystal display panel in another embodiment of the present invention;

FIG. 176 is a constitution diagram of the liquid crystal display panel in another embodiment of the present invention;

FIG. 177 is a constitution diagram of the liquid crystal display panel in another embodiment of the present invention;

FIG. 178 is a plan view of the liquid crystal display panel in another embodiment of the present invention;

FIG. 179 is a constitution diagram of the projection display in another embodiment of the present invention;

FIG. 180 is a constitution diagram of the projection display in another embodiment of the present invention;

FIG. 181 is a constitution diagram of the projection display in another embodiment of the present invention;

FIG. 182 is a constitution diagram of the projection display in another embodiment of the present invention;

FIG. 183 is a spectral distribution characteristic diagram of the dichroic mirror of the projection display of FIG. 182;

FIG. 184 is a spectral distribution characteristic diagram of the dichroic mirror of a conventional projection display;

FIG. 185 is a constitution diagram of the projection display in another embodiment of the present invention;

FIG. 186 is an explanatory diagram of the dichroic prism of FIG. 185;

FIG. 187 is a constitution diagram of the projection display in another embodiment of the present invention;

FIG. 188 is a constitution diagram of the projection display in another embodiment of the present invention;

FIG. 189 is a constitution diagram of the projection display in another embodiment of the present invention;

FIG. 190 is an explanatory diagram of optical components employed in the projection display of FIG. 189;

FIG. 191 is an explanatory diagram of optical components employed in the projection display of FIG. 189;

FIG. 192 is an explanatory diagram of optical components employed in the projection display of FIG. 189;

FIG. 193 is an explanatory diagram of optical components employed in the projection display of FIG. 189;

FIG. 194 is an explanatory diagram of optical components employed in the projection display of FIG. 189;

FIG. 195 is an explanatory diagram of the characteristic of the liquid crystal display panel of the present invention;

FIG. 196 is an explanatory diagram of the relation between the panel size lamp arc length and the F number of the projection display of the present invention;

FIG. 197 is an explanatory diagram of the relation between the panel size lamp arc length and the display contrast of the projection display of the present invention;

FIG. 198 is a constitution diagram of the projection display in another embodiment of the present invention;

FIG. 199 is a constitution diagram of the projection display in another embodiment of the present invention;

FIG. 200 is a constitution diagram of the projection display in another embodiment of the present invention;

FIG. 201 is a constitution diagram of the projection display in another embodiment of the present invention;

FIG. 202 is an explanatory diagram of the rotary filter of the present invention;

FIG. 203 is an explanatory diagram of the rotary filter of the present invention;

FIG. 204 is an explanatory diagram of the rotary filter of the present invention;

FIG. 205 is an explanatory diagram of the rotary filter of the present invention;

FIG. 206 is an explanatory diagram of the rotary filter of the present invention;

FIG. 207 is an explanatory diagram of the rotary filter in another embodiment of the present invention;

FIG. 208 is an explanatory diagram of the rotary filter in another embodiment of the present invention;

FIG. 209 is an explanatory diagram of the three-dimensional display of the present invention;

FIG. 210 is an explanatory diagram of the projection display of the present invention improving a dynamic image display characteristic;

FIG. 211 is an explanatory diagram of the projection display of the present invention improving a dynamic image display characteristic;

FIG. 212 is an explanatory diagram of the method of driving the liquid crystal display panel of the present invention;

FIG. 213 is an explanatory diagram of the method of driving the liquid crystal display panel of the present invention;

FIG. 214 is an explanatory diagram of the method of driving the liquid crystal display panel of the present invention;

FIG. 215 is an explanatory diagram of the method of driving the liquid crystal display panel of the present invention;

FIG. 216 is an explanatory diagram of the method of driving the liquid crystal display panel of the present invention;

FIG. 217 is an explanatory diagram of the method of driving the liquid crystal display panel of the present invention;

FIG. 218 is an external appearance diagram of the view finder of the present invention;

FIG. 219 is a constitution diagram of the view finder of the present invention;

FIG. 220 is a constitution diagram of the light emitting lamp employed in the view finder;

FIG. 221 is a constitution diagram of the light emitting lamp employed in the view finder of the present invention FIG. 222 is an explanatory diagram of the rotary filter employed in the view finder, etc.;

FIG. 223 is a constitution diagram of the view finder of the present invention;

FIG. 224 is a constitution diagram of the view finder of the present invention;

FIG. 225 is a constitution diagram of the view finder in another embodiment of the present invention;

FIG. 226 is a constitution diagram of the liquid crystal display of the present invention;

FIG. 227 is an explanatory diagram of the projection display in another embodiment of the present invention; and FIG. 228 is an explanatory diagram of the driver circuit of the display of the present invention.

DESCRIPTION OF THE SYMBOLS

11 Counter substrate
12 Array substrate
14 Pixel electrode
15 Source signal line
16 Low dielectric film
17 Transverse electric field wire
18 Light shielding film
19 Electric force line
20 Liquid crystal molecule
21 Liquid crystal layer
22 Liquid crystal display
23 Waterdrop-like liquid crystal
24 Resin
25 Counter electrode
41 Signal line
71 Insulating film
131 Polarizing plate (polarization means)
132 Polarization axis
133 Transverse electric field generation direction
151 Color filter
152 Resin light shielding film (black matrix BM)
153 Protective film
154 Insulating film
155 TFT
161 Bead
15 Source signal line
181 Mask
182 Separation film (substrate) or separation film
183 Ultraviolet ray
201 Insulating film
202 Light shielding film 211 AIR coat
212 Common electrode
213 Antireflection film
214 Smoothing film
221 Dielectric thin film
291 Laser light
301 Resin particle (resin component crowded portion)
302 Liquid crystal component (liquid crystal excess portion)
311 Light irradiation means
312 Press roller
313 Supply roller
314 Wind-up roller
315 Mixed solution
331 Filter
291 Laser light (light beam)
314 Opening
315 Substrate
351 Inert gas layer
361 Seal resin
371 Adhesive layer
381 Light absorbing layer
382 Connecting portion
14a Reflecting electrode (reflection type pixel)
471 Metal wire
472 Gate signal line
491, 492, 541 Driver circuit (drive IC)
542 Light shielding film
571 Space (place with no light modulating layer)
19 Electric force line
231 Light shielding pattern
641 Microlens (light turning means)
671 Prism
691 Optical coupling agent (optical coupling layer)
711 Concave lens
731 Lens
732 Supply tube
733 Exhaust tube
734 Diffusing plate
735 Opitical coupling liquid
736 Seal rubber (buffer object)
737 Reflecting plate (Reflecting sheet)
738 Heater table (mounting table)
739 Heater
741 Infrared-ray reflecting film
742 Ultraviolet-ray reflecting film
743 Transparent substrate
744 Infrared light
745 Temperature sensor
761 Support
762 Casing
791 Light shielding film (BM)
792 Reflecting film (reflection means)
811 Insulating thin film
812 Dielectric film
821 Irregularity film
822 Embossed sheet
831 Photosetting resin
841 Light scattering layer
861 Buffer layer
14b Reflecting electrode (pixel)
891 Dielectric mirror
892 Transparent electrode (ITO)
901 Laser trimming apparatus
902 Infrared ray camera
921 Radiating plate
922 Adhesive agent
901a Laser light generation apparatus
901b Mirror
901c Condenser lens
911 XY stage
912 Laser light
961 Convex portion (protruding portion)
962 Transparent resin film
991 Transparent thin film
992 Thin metal film
1061 Prism sheet
1062 Fresnel lens sheet
1091 Light guiding plate
1092 Reflecting film
1093 Adhesive layer
1094 Opening
1095 Incident light (Outgoing light)
1121 Reflector
1131 Transparent substrate
1132 Light absorbing film
1133 Scattered light
1131a, 1131b Lens (transparent substrate)
1161 Casing
1162 Pawl
1171 Lid
1172 Ethylene glycol (optical coupling liquid)
1191 OR circuit
1192 Switch circuit
1193 Signal line capacitor
1194 Additional capacitor
1211 A/D
1212 Line memory
1213 Arithmetic circuit
1214 D/A
1251 Inverter
1281 Signal source
1282 Image signal circuit
1291 Pixel
1311 Display screen
1341 Analog switch
1361 Scanning direction
1411 Light source
1411a Lamp
1411b Concave mirror
1411c UVIR cut filter
1412 Color filter
1413 Lens
1414 Rotary filter (color separation filter)
1415 Projection lens
1416 Optical axis
1422, 1423, 1432, 1433 Dielectric multilayer film
1424, 1425, 1434, 1435 Dielectric thin film
1501 Screen
1531 Positioning tool
1532 Lamp source
1533 Control button
1534 Cooling fan
1535 Casing
1536 Lens drive portion
1537 4Mounting portion
1538 Panel signal generation source
1551 Optical block
1552 Mirror
1581 Polarization beam splitter (polarization separation means (PBS))
1582 Light separation surface
1591 Dichroic prism (color separation means)
1592 Lens plate
1593 Lens 1594 Band cut filter (band cut mirror)
1611 Dichroic mirror
1631 Display area
1651 Casing
1652 Peltier element (electronic cooling element)
1681 Nitrogen gas (inert gas)
1682 Cooling liquid
1683 Seal liquid
1691 Current source
1692 Switch
1693 Wiring
1694 Connecting point
1701 Ultraviolet-ray cut filter (ultraviolet-ray absorbing filter)
1702 Infrared-ray cut filter (infrared-ray absorbing filter)
1703 Infrared-ray absorbing filter (infrared-ray cut filter)
1711 Motor
1712 Damper (buffer member)
1741 Half-wave plate
1742 Polarizing plate (polarization means)
1751 Filter
1752 Reflecting prism
1761 Relay lens
1762 Aperture
1771 Field lens
1801 Separation wall
1811 Light beam
1861 Light incidence surface
1871 Lens
1891a Rear group lens
1891b Front group lens
1892 Illuminant
1893 Real image
1894 Input lens array
1895 Central lens array
1896 Lens aperture (illumination light side)
1897 Exit lens
1898 Lens aperture (projection lens side)
1899 Input lens
1900 Central lens
1901 Secondary illuminant
2011 Prism (CDD prism)
2021 Rotational center
2022 Area that projected light passes through
2031 Polarization screen
2072 Correction filter (color filter)
2081 Light shielding film
2082 Transparent substrate
2091 Polarizing eyeglasses
2101 Drum (rotary body)
2102 Light shielding portion
2103 Light transmitting portion
2161 A/D conversion circuit
2162 F (field or frame) memory
2163 Raster setting circuit
2164 Double-speed read circuit
2165 Signal dividing circuit
2181 Light emitting lamp
2182 Aperture
2183 Condenser lens
2184 Eyepiece ring
2185 Eyepiece lens
2186 Body
2187 Eyepiece rubber
2188 Mounting bracket
2189 Hole
2201 Casing
2202 Fluorescent substance
2203 Filament
2204 Anode
2205 Light shielding film
2211 Circuit substrate
2212 Connector
2213 Solder
2231 Observer's eye
2241 Surface light source
2261 Light guiding plate
2262 Fluorescent tube
2263 Reflecting sheet
2231 Simple matrix panel

EMBODIMENTS

With regard to embodiments of the present invention according to the display panel, method of fabricating the display panel, method of driving the display panel, method of correcting a defect in the display panel, and a display employing the display panel, a description thereof will hereinafter be made referring to the drawings.

Figure 2:
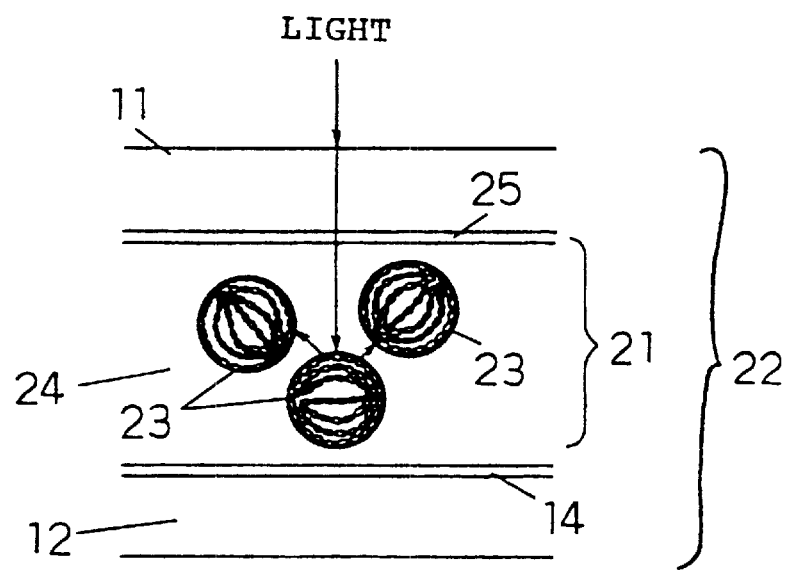
FIG. 2 is an explanatory diagram of the operational principles of a polymer dispersion liquid crystal display panel.
Figure 2:
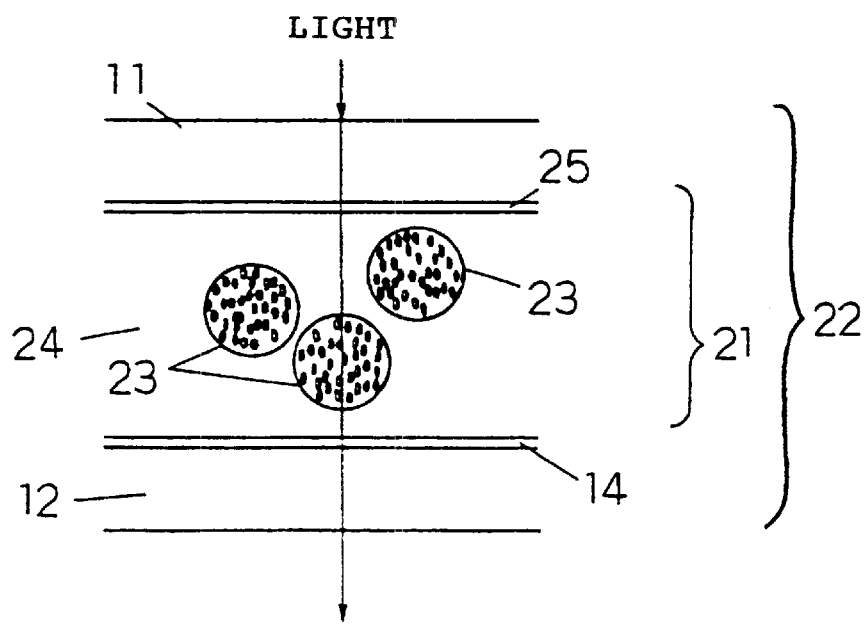

Initially, on the operation of a polymer dispersion liquid crystal (hereinafter referred to as a PD liquid crystal), a description thereof will be simply made with FIGS. 2(a) and (b). FIGS. 2(a) and 2(b) are explanatory diagrams of the operation of the PD liquid crystal. In the figures, liquid crystals in a waterdrop state (hereinafter referred to as waterdrop-like liquid crystals 23) are dispersed into a resin component (polymer) 24. A pixel electrode 14 is connected to a TFT (not shown). If the TFT is turned on and off, voltage will be applied to the pixel electrode 14 and the orientations of liquid crystals on the pixel electrode 14 will be varied, thereby modulating light. In the state in which no voltage is applied, as shown in FIG. 2(a), the liquid crystal molecules in each of the waterdrop-like liquid crystals 23 are oriented in irregular directions. In this state a refractive index difference occurs between the polymer 24 and the waterdrop-like liquid crystals (liquid crystal component) 23, and incident light scatters.

As shown in FIG. 2(b), if voltage is applied to the pixel electrode 14, the liquid crystal molecules will be of the same direction. If the refractive index as the liquid crystal molecules 20 are oriented in a constant direction has previously been matched with the refractive index of the polymer 24, the incident light will not scatter but will emerge from the array substrate 12. Note that as described later, the PD liquid crystal does not represent only a liquid crystal in a state of waterdrop but also represents a liquid crystal whose light modulating layer is constituted by a resin area and a liquid crystal area. The light modulating method is also not limited to changes in scattering and transmission. A display panel employing a polarizing plate is also within the technical range of the present invention.

In the invention of this specification the switching elements for applying voltage to the pixel electrodes 14, in addition to thin film transistors (TFTs), may be ring diodes, 2-terminal elements such as TFDs and MIMs, barrier caps, thyristors, MOS transistors, FETs, etc. Note that they are all called thin film transistors in a wide sense. Furthermore, the switching element is one such as a plasma addressing liquid crystal (PALC) that controls voltage which is applied to a liquid crystal layer by plasma, made on an experimental basis by SONY, SHARP, etc., and an optical write method, a heat write method, and a laser write method are also included. In other words, it represents switchable structure.

Also, since the display panel 22 (corresponding to the liquid crystal display 22 in the figure) of the present invention is one in which a driver circuit and a pixel switching element are mainly formed at the same time, the technical range of the invention includes one formed by a high-temperature polysilicon technique or with a single crystal, such as a silicon wafer, in addition to one formed with a low-temperature polysilicon technique. Of course an amorphous silicon display panel is also included within the technical range. In addition, the pixel electrode 14 includes a reflection type (method) formed with thin metal film and a dielectric mirror in addition to one formed with an ITO transparent electrode.

An counter electrode 25 is formed with a transparent electrode, and the material employs, for example, indium oxide and ITO. Between the aforementioned counter electrode 25 and the pixel electrode 14 the PD liquid crystal (liquid crystal layer) 21 is interposed. It is preferable that the liquid crystal material which is employed in the display panel 22 of the present invention be a nematic liquid crystal, a smectic liquid crystal, and a cholesteric liquid crystal. The liquid crystal material may also be a single kind of liquid crystal compound or two or more kinds of liquid crystal compounds and a mixture containing substances other than a liquid crystal compound.

Note that among the aforementioned liquid crystal materials, the nematic liquid crystal of the cyanobyphenyl system whose difference between an extraordinary refractive index $n_e$ and an ordinary refractive index $n_o$ is relatively high, or the nematic liquid crystal of the tolane or chloride system which is stable against a change with the passage of time is preferable, and among them, the nematic liquid crystal of the tolane system is most preferable, because it has a better scattering characteristic and the change with the passage of time is also difficult to occur.

It is preferable that the resin material be a transparent polymer. The polymer employs a light-setting type of resin from the standpoint of easiness of a fabrication process and separation from a liquid crystal phase. As a specific example, there is ultraviolet setting acrylic resin. Particularly, it is preferable that the resin contain acrylic monomer and acrylic oligomer which are polymerization-set by ultraviolet radiation. Among them, the light-setting acrylic resin with a fluoric group is preferable, because it can produce the PD liquid crystal 21 whose scattering characteristic is satisfactory and the change with the passage of time is also difficult to occur.

Also, it is preferable to employ the aforementioned liquid crystal material having an ordinary refractive index $n_o$ of 1.49 through 1.54, and among them, it is preferable to employ the liquid crystal material whose ordinary refractive index $n_o$ is between 1.50 and 1.53. In addition, it is preferable to employ the liquid crystal material whose refractive index difference $\Delta n$ is 0.20 or more and 0.30 or less. If $n_o$ and $\Delta n$ become high, the heat-resisting property and light-resisting property will become worse and the temperature dependency will become great. If $n_o$ and $\Delta n$ are low, the heat-resisting property and light-resisting property will become better, but the scattering characteristic will become low and the display contrast will become insufficient.

From the aforementioned and the result of the examination it is preferable to employ the nematic liquid crystal of tolane system in which ordinary refractive index $n_o$ is between 1.50 and 1.53 and $\Delta n$ is 0.20 or more and 0.30 or less, as the constitutional material of the liquid crystal material of the PD liquid crystal 21, and it is also preferable to adopt the light-setting acrylic resin having a fluoric group as the resin material.

Such high polymer forming monomers are, for example, 2-ethylhexyl acrylates, 2-hydroxyethyle acrylates, neopentylglycol acrylates, hexanedioar diacrylates, diethylenegylcol diacrylates, tripropyleneglycol diacrylates, polyethylenegycol diacrylates, trimethylolpropane triacrylates, and pentaerythritol acrylates.

For the oligomer and prepolymer, polyester acrylates, epoxy acrylates, and polyurethane acrylates are given as examples.

Also, in order to perform polymerization quickly, polymerization initiator may be employed. As this example, 2-hydroxy-2-methyl-1-phenylpropane-1-on ("Darocure 1173" manufactured by Merck Co.), 1-(4-isopropylphenyl)-2-hydroxy-2-methylpropane-1-on ("Darocure 1116" manufactured by Merck Co.), 1-hydroxycyclohexaphenylketone ("Irgacure 184" manufactured Ciba-Geigy Co.), benzylmethylketal ("Irgacure 651" manufactured by Ciba-Geigy Co.), etc., are given. In addition, a chain transfer agent, a light sensitizing agent, dyes, and a cross linking agent can be properly used as arbitrary components at the same time.

Note that when the resin material is set, the refractive index $n_o$ is made nearly equal to the ordinary refractive index $n_p$ of the liquid crystal material. When an electric field is applied to the liquid crystal layer 21, the liquid crystal molecules 20 are oriented in one direction and the refractive index of the liquid crystal layer 21 becomes $n_o$. Therefore, the refractive index $n_o$ of the liquid crystal layer 21 becomes equal to the refractive index $n_p$ of the resin material, and liquid crystal layer 21 goes to a light transmitting state. If there is a big difference between refractive indexes $n_p$ and $n_o$, the liquid crystal layer 21 will not go to a transparent state completely even if voltage is applied to the liquid crystal layer 21, and the display brightness will be reduced. The difference in refractive index between $n_p$ and $n_o$ is preferable to be within 0.1 and more preferable to be within 0.05.

Although the rate of the liquid crystal material in the PD liquid crystal layer 21 is not prescribed here, generally it is about 40 to 95 wt %, preferably about 60 to 90 wt %. If it is 40 wt % or less, the quantity of the liquid crystal droplet will be insufficient and the scattering effect will be unsatisfactory. Also, if it is 95 wt % or more, there will be a strong tendency that the polymers and the liquid crystal will be separated into upper and lower layers, and the rate of the interface will become small and the scattering characteristic will be reduced.

The average particle diameter of the waterdrop-like liquid crystal 23 or the average pore diameter of the polymer network is preferable to be 0.5 $\mu$m or more and 3.0 $\mu$m or less, and among them, it is more preferable to be 0.8 $\mu$m or more and 2.0 $\mu$m or less. In the case where the light which is modulated by the PD liquid crystal display panel is a short wavelength (B light, for example), the average diameter is made small. In the case of a long wavelength (R light, for example), it is made large. If the average particle diameter of the waterdrop-like liquid crystal 23 or the average pore diameter of the polymer network is large, the voltage for causing the liquid crystal layer to be in a transmitting state will become low, but the scattering characteristic will be reduced. If it is small, the scattering characteristic will be enhanced but the voltage for causing the liquid crystal layer to be in a transmitting state will become high.

The PD liquid crystal in the present invention refers to one in which liquid crystals are scattered in a waterdrop state into resin, rubber, metal particles, or ceramic (barium titanate, etc.), one in which liquid crystals fill the sponge shape (polymer network) of the resin or the like (polymer) 24, etc. In addition, the PD liquid crystal includes one in which resin layers are stacked with each other, such as that shown in Japanese Patent Laid-Open Nos. 6-208126, 6-202085, 6-347818, 6-250600, 5-284542, and 8-179320. Also, it includes one in which liquid crystal components are sealed in a housing medium in the form of a capsule, as shown in Japanese Patent Publication No. 3-52843. Furthermore, it also includes one which dichromatic and polychromatic pigments are contained in a liquid crystal or the resin and the like 24. Also, as similar constitution, there is structure (see FIG. 28) where liquid crystal molecules 20 are oriented along a resin wall and Japanese Patent Laid-Open No. 6-347765. These are also called the PD liquid crystal. Also, the PD liquid crystal includes one in which liquid crystal molecules 20 are oriented and resin particles 301 are contained in liquid crystal layer 21. Also, a liquid crystal employing ceramic such as barium titanate instead of resin is the PD liquid crystal. Furthermore, the PD liquid crystal includes one consisting of a single liquid crystal layer or two or more liquid crystal layers.

In other words, the PD liquid crystal represents all of liquid crystals in which a light modulating layer is constituted by a liquid crystal component and other material components. The light modulating method forms an optical image by mainly employing scattering-transmission, but it is not limited to this. The method may also be one which changes a state of polarization.

Note that in the specification of the present invention, while the liquid crystal layer 21 consists of the PD liquid crystal, it is not necessarily limited to the PD liquid crystal, depending upon the constitution, function, and usage of a display panel. The liquid crystal layer 21 may be a TN liquid crystal layer, a guest-host liquid crystal layer, a homeotropic liquid crystal layer, a ferroelectric liquid crystal layer, an anti-ferroelectric liquid crystal layer, or a cholesteric liquid crystal layer. Also, the drive method of the present invention is applied to a plasma display (PDP) and an organic EL display.

The film thickness of the liquid crystal layer 21 is preferable to be in a range of 5 to 20 μm and more preferable to be in a range of 8 to 15 μm. If the film thickness is thin, the scattering characteristic will become worse and the contrast will not be obtainable. Conversely, if it is thick, high-voltage drive will have to be performed. For this reason, the design of an X driver (also called a gate driver) 492 for generating a signal which turns on and off a TFT 155 and the design of a Y driver (also called a source driver) 491 for applying a video signal to a source signal line 15 will become difficult.

Figure 16:
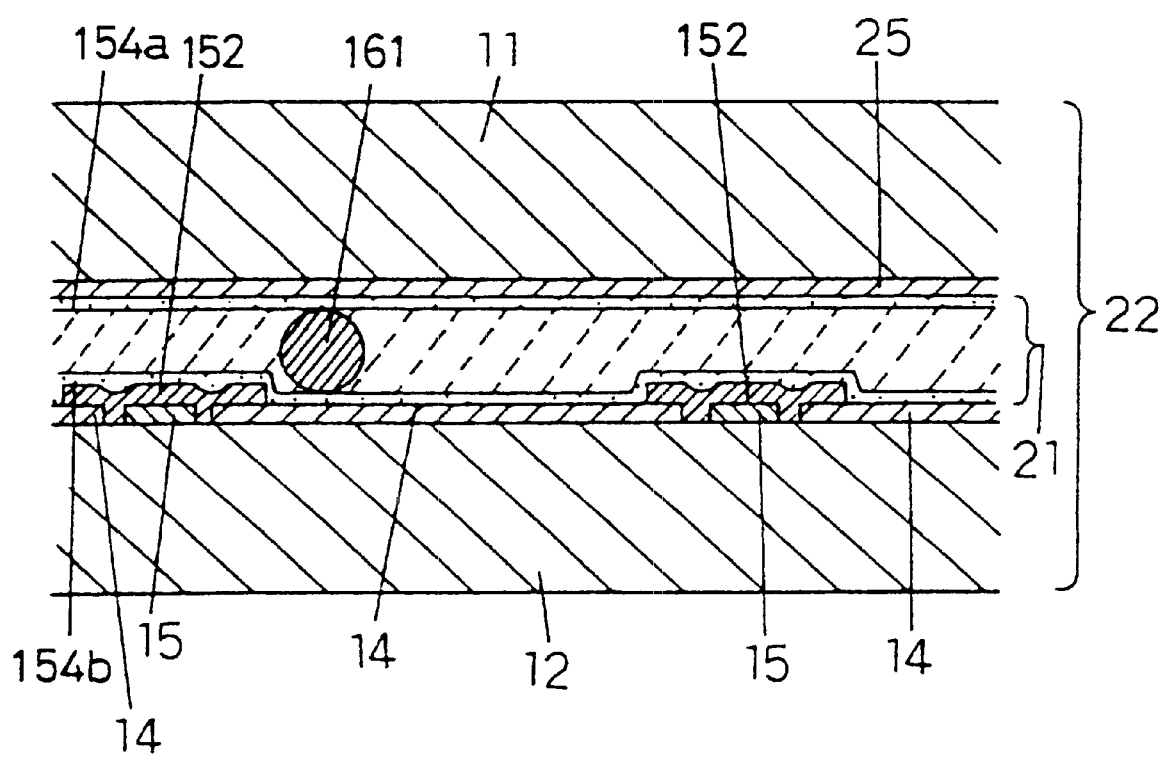
FIG. 16 is a sectional view of the display panel of the present invention arranging an insulating film on a surface which contacts a liquid crystal layer.

The film thickness control of the liquid crystal layer 21 employs black glass beads, black glass fibers, black resin beads, or black resin fibers, as shown in FIG. 16. Particularly, since black glass beads or black glass fibers are very high in light absorption and hard, the number of beads or fibers scattered in the liquid crystal layer 21 is reduced and therefore they are preferable.

Figure 15:
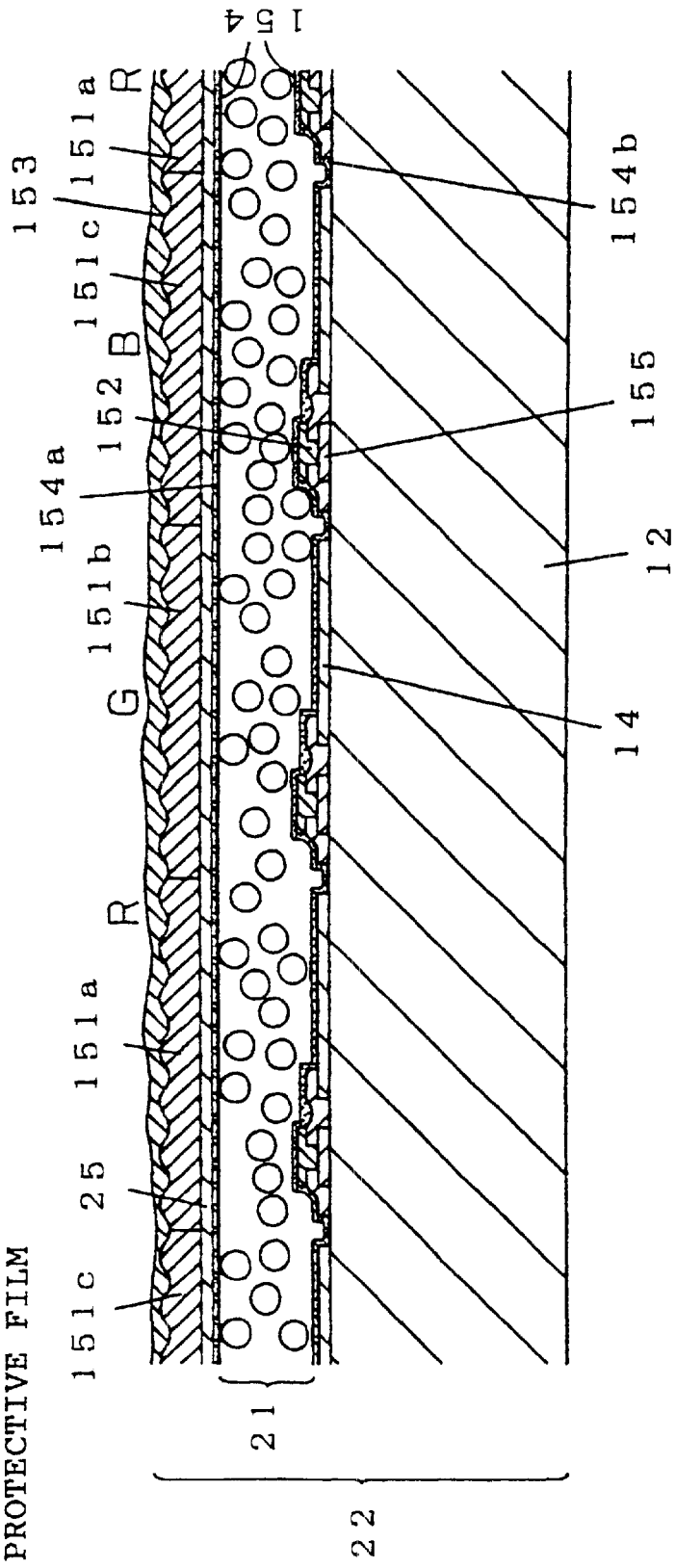
FIG. 15 is a sectional view of the display panel of the present invention arranging a color filter on the counter electrode.

As shown in FIG. 15, it is effective to form insulating films 154 between the pixel electrode 14 and the liquid crystal layer 21 and between the liquid crystal layer 21 and the counter electrode 25. For the insulating film 154, polyimide to be employed in the orienting film of a TN liquid crystal display panel, an organic substance such as polyvinyl alcohol (PVA), and an inorganic substance such as $SiO_2$, $SiN_x$, and $Ta_2O_3$ are exemplified. From the standpoint of adhesion, an organic substance such as polyimide is preferable.

The rate of holding electric charges can be enhanced by forming the insulating film 154 on the electrode. For this reason, high brightness display and high contrast display can be realized.

The insulating film 154 also has an effect of preventing the liquid crystal layer 21 and the electrode from being separated from each other. The aforementioned insulating film 154 fulfills a role as an adhesive layer and a buffering layer.

Also, if the insulating film 154 is formed, there is another advantage that the pore diameters (hole diameter) of the polymer network of the liquid crystal layer 21 or the particle diameters of the waterdrop-like liquid crystals become nearly even. It is believed that this is because even if organic substances remain on the counter electrode 25 and the pixel electrode 14, they will be covered with the insulating film 154. The covering effect is satisfactory in PVA than in polyimide. It is believed that this is because PVA is higher in wettability than polyimide. However, in the result of the reliability (light-resisting property, heat-resisting property, etc.) test of various insulating films 154 formed on the panel, the display panel on which polyimide to be employed in the orienting film of a TN liquid crystal was formed is satisfactory because there is almost no change with the passage of time. In the PVA, the holding rate tends to reduce.

Note that when forming the insulating film 154 with an organic substance, the film thickness is preferable to be in a range of 0.02 μm or more and 0.1 μm or less and, furthermore, more preferable to be 0.03 μm or more and 0.08 μm or less.

The counter substrate 11 and the array substrate 12 employ soda glass and silica glass substrates. In addition, they can also employ metal substrates, ceramic substrates, single crystal silicon substrates, and polycrystal silicon substrates. Also, they can employ resin film such as polyester film and PVA film.

Figure 1:
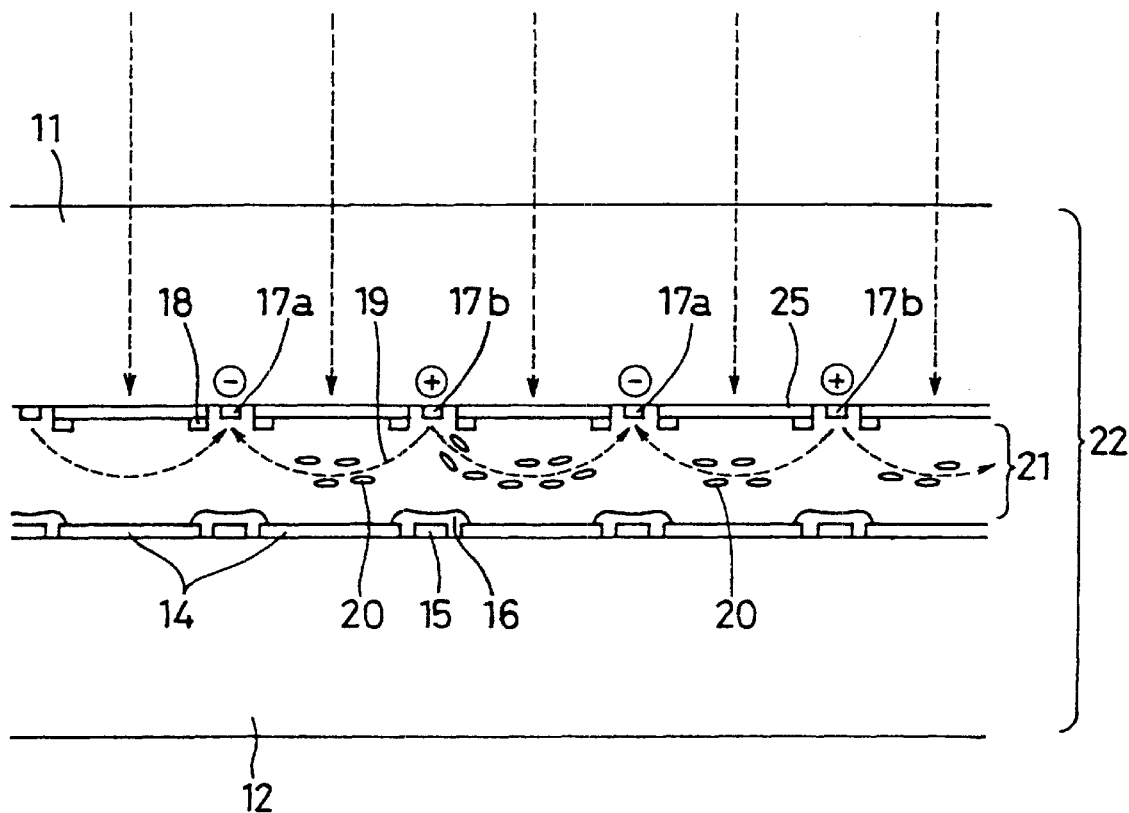
FIG. 1 is an explanatory diagram of the display panel of the present invention forming on a counter electrode substrate the wires for producing a transverse magnetic field.

FIG. 1 is an explanatory diagram of the liquid display panel of the present invention. The array substrate 12 is formed with pixel electrodes 14 consisting of ITO, source signal lines 15, gate signal lines (not shown), TFTS, and so on.

Figure 6:
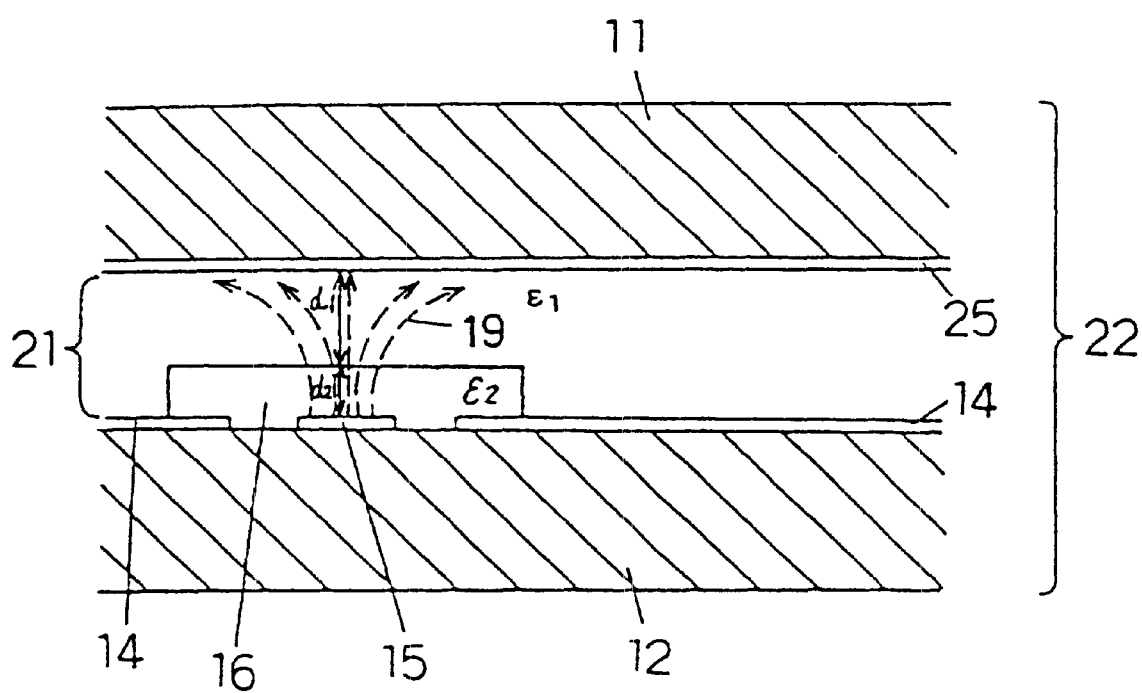
FIG. 6 is an explanatory diagram for explaining the operation of the display panel of the present invention.

A low dielectric film 16 is formed on the source signal line 15, etc. This explanatory diagram is shown in FIG. 6. In the PD liquid crystal display panel 22 it is also important to prevent electromagnetic coupling between the source signal line 15, etc., and the pixel electrode 14. To the source signal line 15 an AC current is applied at all times. Therefore, between the pixel electrode 14 and the source signal line 15 an electric force line 19 is produced. On this electric force line 19 the liquid crystal molecules 20 are oriented, and "light escape" from the peripheral portion of the pixel electrode 14 occurs.

As the countermeasure, the source signal line 15, the gate signal line, and the vicinities of the signal lines are sealed with material (hereinafter referred to as low dielectric material) lower than the dielectric constant of the liquid crystal layer 21. For the low dielectric material, inorganic material such as $SiO_2$ and $SiN_x$, the polymer 24 of the liquid crystal layer 21, resist, and organic material such as polyvinyl alcohol (PVA) are exemplified.

As shown in FIG. 6, if the aforementioned low dielectric material is formed into a thin film shape or a thick film shape, the electromagnetic coupling between the signal line 15 and the pixel electrode 14 can be prevented. Of course, since the electromagnetic coupling between the signal line 15 and the counter electrode 25 can also be prevented, the liquid crystal layer 21 on the low dielectric film 16 will almost always go to a scattering state.

Figure 7:
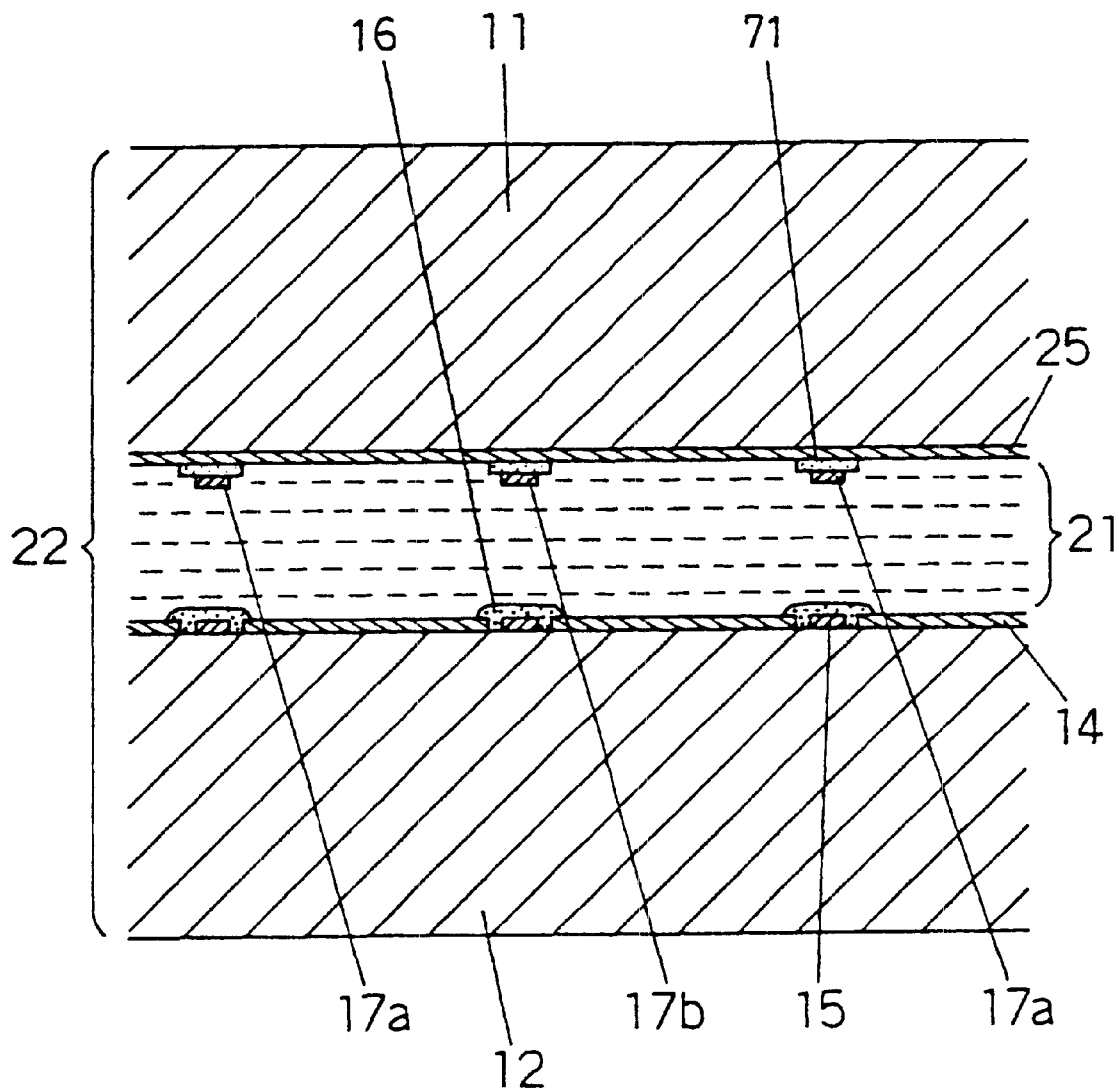
FIG. 7 is a sectional view of the display panel of the present invention.

In FIG. 6, while the low dielectric material has been formed into a film shape, the present invention is not limited to this, but it may be formed into a column shape as shown in FIG. 7. If it is formed into a column shape to make it the same as the film thickness of the liquid crystal layer 21, the film thickness of the liquid crystal can be made a prescribed value without using beads.

The reason that the low dielectric column of the panel and the low dielectric film 16 can be easily formed is that the PD liquid crystal display panel does not need an orienting process such as a rubbing process which is required of the TN liquid crystal display panel. If the low dielectric column and the low dielectric film 16 have been formed, a rubbing cloth will be caught on the low dielectric column and low dielectric film 16 during the rubbing process, and the surfaces of the counter substrate 11 and the array substrate 12 cannot be rubbed well. For this reason a manufacturing defect will easily occur.

The low dielectric film 16 or the low dielectric column may be colored. If it is colored, it can absorb light irregularly reflected within the liquid crystal layer 21 and image quality will be enhanced. Black colors or pigments may be dispersed into resin. Like a color filter, gelatin or casein may also be colored with black acid dyes. As an example of the black colors, a fluorine color which becomes black by itself can be caused to emit a color and employed, and a mixed black consisting of a green color and a red color can also be employed.

On the counter substrate 11 the counter electrodes 25 are formed in the shape of stripes. In FIG. 1, while the aforementioned counter electrodes 25 are formed along the source signal lines 15 by way of an example, the present invention is not limited to this example but they may be formed along the gate signal lines.

The end of the counter electrode 25 is formed with a light shielding film 18 consisting of Cr or Al. The film thickness is 1000 angstroms or more and 5000 angstroms or less. Also, it may be constituted into a multilayer consisting of Ti, Al, and Cr.

The light shielding film 18 is for preventing the light escape which occurs near a transverse electric field wire 17. Near the transverse electric field wire 17 the liquid crystal molecules 20 are oriented at an angle perpendicular or nearly perpendicular to the counter substrate 11. For this reason, the ordinary refractive index of the liquid crystal molecule 20 approaches $n_o$, and the difference between the refractive index of the liquid crystal and the refractive index $n_p$ of the polymer 24 becomes small. In other words, since the liquid crystal layer 21 goes to a light transmitting state, light escape occurs. The light shielding film 18 shuts out light near to the transverse electric field wire 17. The light shielding film 18 also has a role to reduce the resistance value of the counter electrode 25. In the embodiment of FIG. 1, since the counter electrodes 25 are cut in the shape of stripes, the resistance value becomes high. Normally, since the counter electrode 25 consists of ITO, the resistance value is high. If a portion of the light shielding film 18 is formed with metal material, the resistance value of the counter electrode 25 can be reduced.

The transverse electric field wire 17 may be formed with transparent material such as ITO. However, it is preferable that the transverse electric wire 17 be formed from a single kind of metal material or various kinds of stacked metal materials in order to reduce the resistance value, as with the source signal line 15. The thickness is at least 1000 angstroms or more, preferably 0.5 μm or more. Note that since almost no current flows through the transverse electric field wire 17, the resistance value is allowed to be somewhat high. For the forming material, Ti, Al, Cr, molybdenum, tantalum molybdenum, etc., are exemplified.

If positive and negative voltages are applied to the transverse electric field wire 17, electric force lines 19 will be produced in the liquid crystal layer 21, as shown in FIG. 1. The electric force lines 19 are produced parallel to the counter substrate 11 and the array substrate 12. If the electric force lines 19 are produced, the liquid crystal molecules 20 will be oriented along the aforementioned electric force lines.

Figure 3:
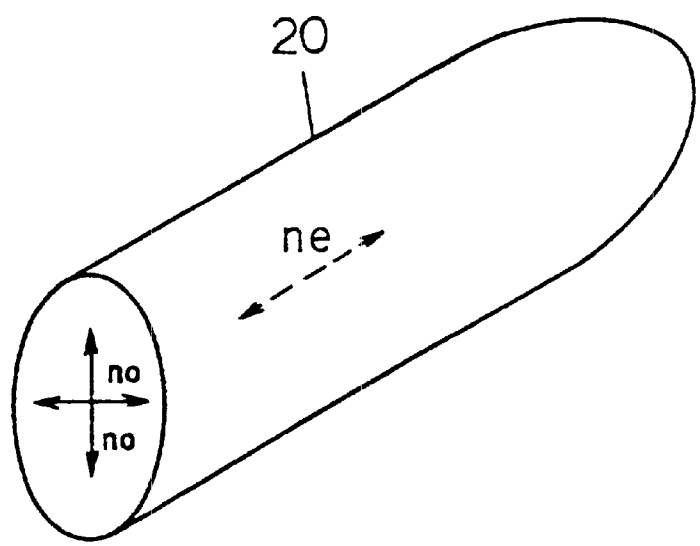
FIG. 3 is an explanatory diagram explaining the polarization dependency of the polymer dispersion liquid crystal display panel.
Figure 3:
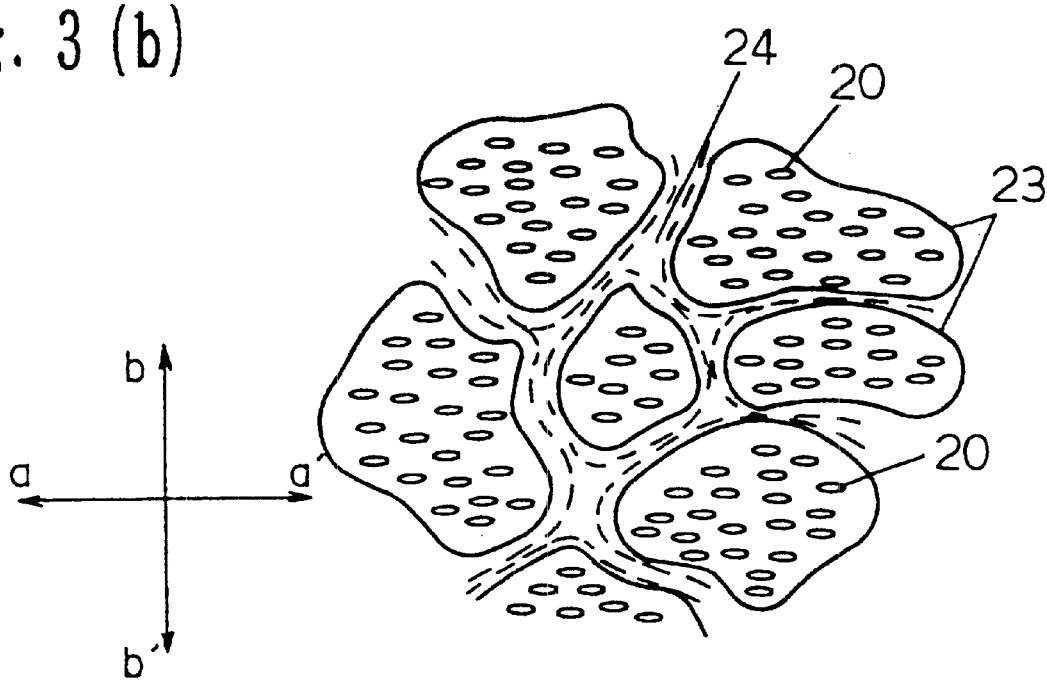

As also shown in FIG. 3(*a*), in the case where the liquid crystal molecule 20 is material with a positive dielectric constant, it shows an extraordinary refractive index $n_e$ in the major axis and an ordinary refractive index $n_o$ in the minor axis. If the electric field (electric force line) 19 is applied to the liquid crystal layer 21, the liquid crystal molecules 20 within the waterdrop-like liquid crystal 23 will be arranged in one direction in accordance with the electric field strength, as shown in FIG. 3(*b*). If the electric field strength is weak, the liquid crystal molecules 20 will be in a randomly oriented state. If it becomes stronger, the liquid crystal molecules 20 will be oriented along the electric force line 19.

In FIG. 3(*b*) electric force lines are produced in a direction of aa'. Therefore, the liquid crystal molecule 20 is arranged with the major axis aligned with in the aa' direction in which the electric force line is produced. Now, if it is assumed that the rate of the polymer material 24 to the liquid crystal material is low and negligible, the refractive index of the liquid crystal layer 21 (as seen in a direction perpendicular to the array substrate 12) will be $n_e$ with respect to the polarization in the aa' direction, and the refractive index of the liquid crystal layer 21 will be $n_o$ with respect to the polarization in the bb' direction. Therefore, ideally a refractive index of $(n_o+n_e)/2$ is obtained with respect to natural light.

In the case where the liquid crystal layer 21 is not oriented as shown in FIG. 3(*b*) and also is in a no-electric field state, the liquid crystal molecules 20 are arranged three-dimensionally and randomly. Ideally, the refractive index at that time becomes $(2n_o+n_e)/3$. If a calculation is made with $n_o$=1.52 and $n_e$=1.6, it is found that the liquid crystal layer 21 in FIG. 3(*b*) is higher in refractive index than the liquid crystal layer 21 in the no-electric field state.

Figure 5:
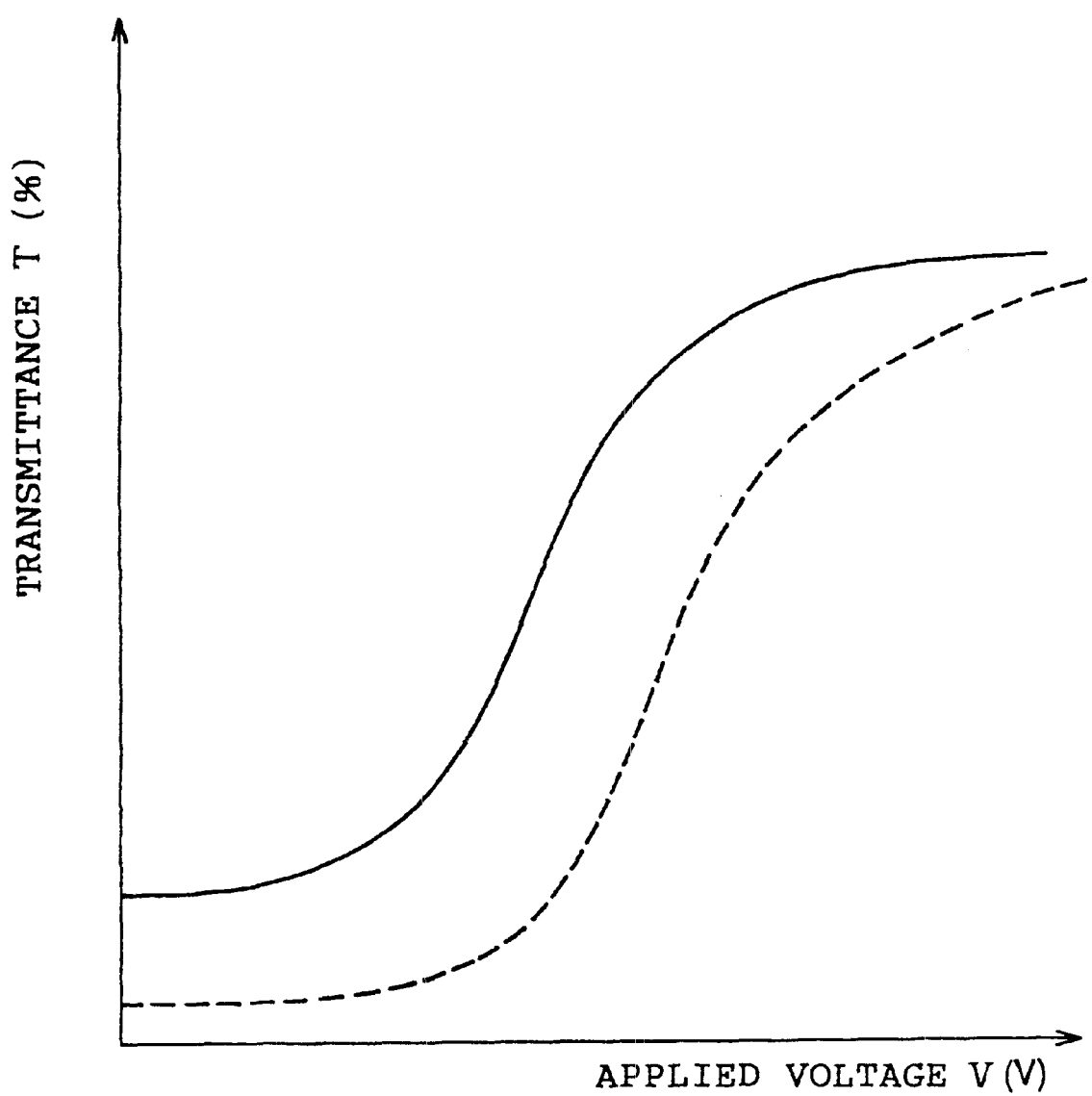
FIG. 5 is an explanatory diagram for explaining the characteristic of the display panel of the present invention.

In the case of the PD liquid crystal display panel, the scattering performance is enhanced as the difference in refractive index between the polymer 24 and the liquid crystal component becomes large. Therefore, the display contrast becomes high. In FIG. 5 the transmittance (T)-voltage (V) curve (called a T-V curve) is conceptually shown. A dotted line represents the case of the PD liquid crystal display panel having the constitution of the transverse electric field wire 17, and a solid line represents the case of the PD liquid crystal display panel having no transverse electric field wire 17. If the PD liquid crystal display panel has the transverse electric field wire 17, the voltage to be applied to the pixel electrode 14 will tend to become somewhat high. However, sinking of a black color (small transmittance) can be realized, and display contrast can be considerably improved.

Figure 4:
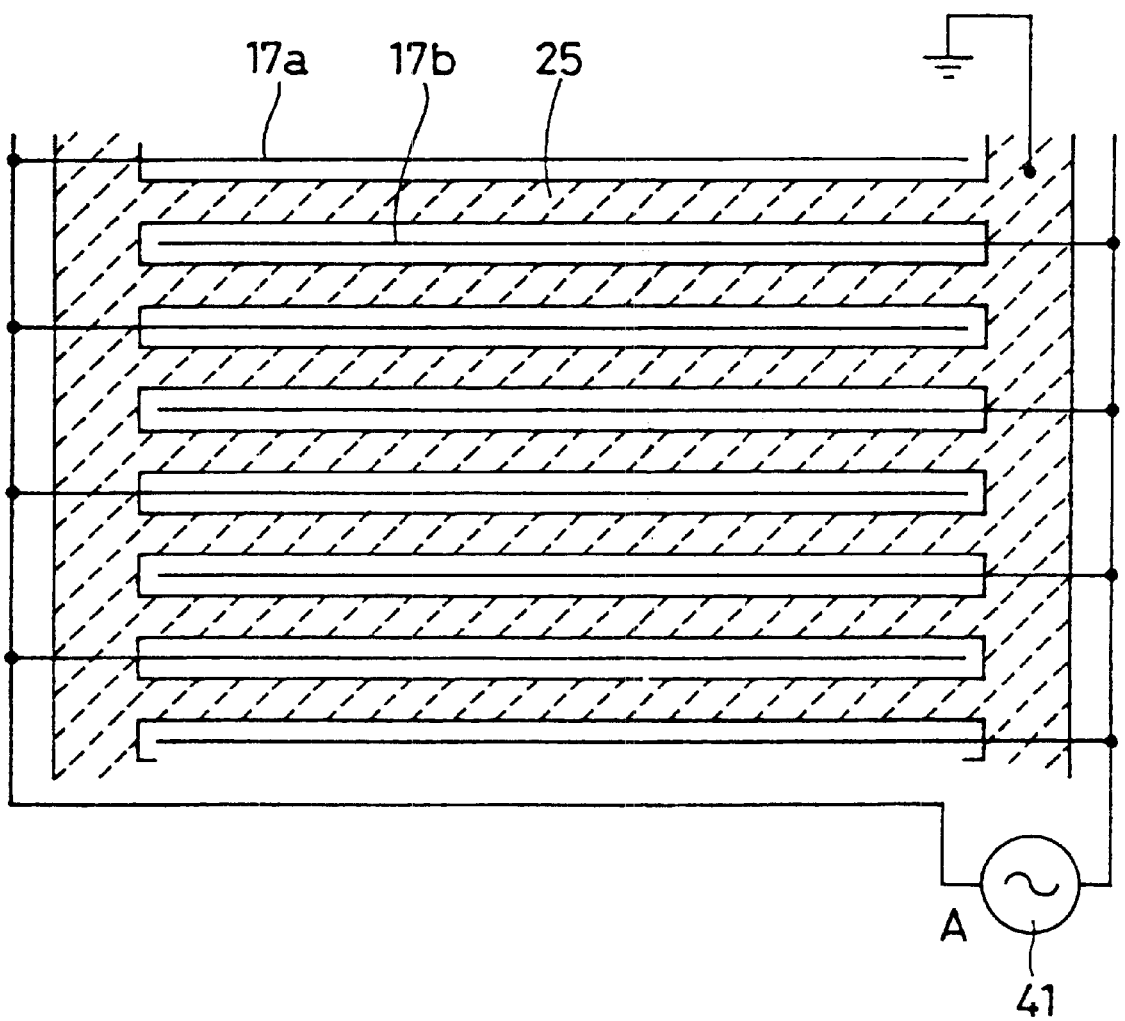
FIG. 4 is an explanatory diagram for explaining the operational principles of the display panel of the present invention.

FIG. 4 is an explanatory diagram for more specifically explaining the operation of the transverse electric field wire 17. The counter electrodes 25 are in the form of a plurality of stripes on the display area of the liquid crystal display panel, but they are connected to one at the peripheral portion. Also, the electric potential of the counter electrode 25 is connected to ground (GND).

The transverse electric field wires 17 alternately extend horizontally. They are made into one and connected to a signal source 41. Therefore, between the transverse electric field wires 17a and 17b an electric force line is produced by the output voltage of the signal source 41. The signal source 41 normally outputs a rectangular wave. The amplitude value of the rectangular wave is increased in proportion to pixel size.

The display of an image on the liquid crystal display panel 22 of the present invention is performed by applying voltage corresponding to a video signal to each pixel electrode 14. As the electric field between the counter electrode 25 and the pixel electrode 14 becomes stronger, the transmittance is enhanced. Conversely, if the electric field is small, the degree of scattering will become strong and black display will be obtained.

FIG. 7 is a sectional view of the liquid crystal display panel 22 in another embodiment of the present invention. A transverse electric field wire 17 is formed on an insulating film 71 so that it does contact a counter electrode 25. The insulating film 71 needs to have a thickness of at least 2000 angstroms or more. This is for preventing a short circuit between the wire 17 and the counter electrode 25. Also, in the case where Al is employed as the transverse electric field wire 17, attention is needed. This is because if the ITO of the counter electrode 25 contacts Al, a "battery" will be produced and cause corrosion. Therefore, in the case where Al is employed, sufficient attention must be paid to the occurrence of a pinhole in the insulating film 71. Preferably, the transverse electric field wire should use Cr or it should be constituted by a multilayer consisting Ti, Al, and Cr.

In the display panel of the present invention of the embodiment shown in FIG. 7, since the counter electrode 25 is a solid electrode (i.e., since the counter electrode 25 is not patterned into a stripe shape as in FIG. 1), the resistance value is sufficiently low. The rest constitution is the same as the embodiment of FIG. 1 and therefore a description thereof is omitted.

Note that in the specification of the present invention, in the case where components are the same or similar, a description thereof is omitted. Also, the same reference numerals denote the same or similar components. Furthermore, the matters described in the specification are applied to all drawings and contents. For example, the contents related to the PD liquid crystal 21 can be all applied to the embodiments of the present invention. The drawings are enlarged, reduced, and deformed for making a description easy.

Figure 8:
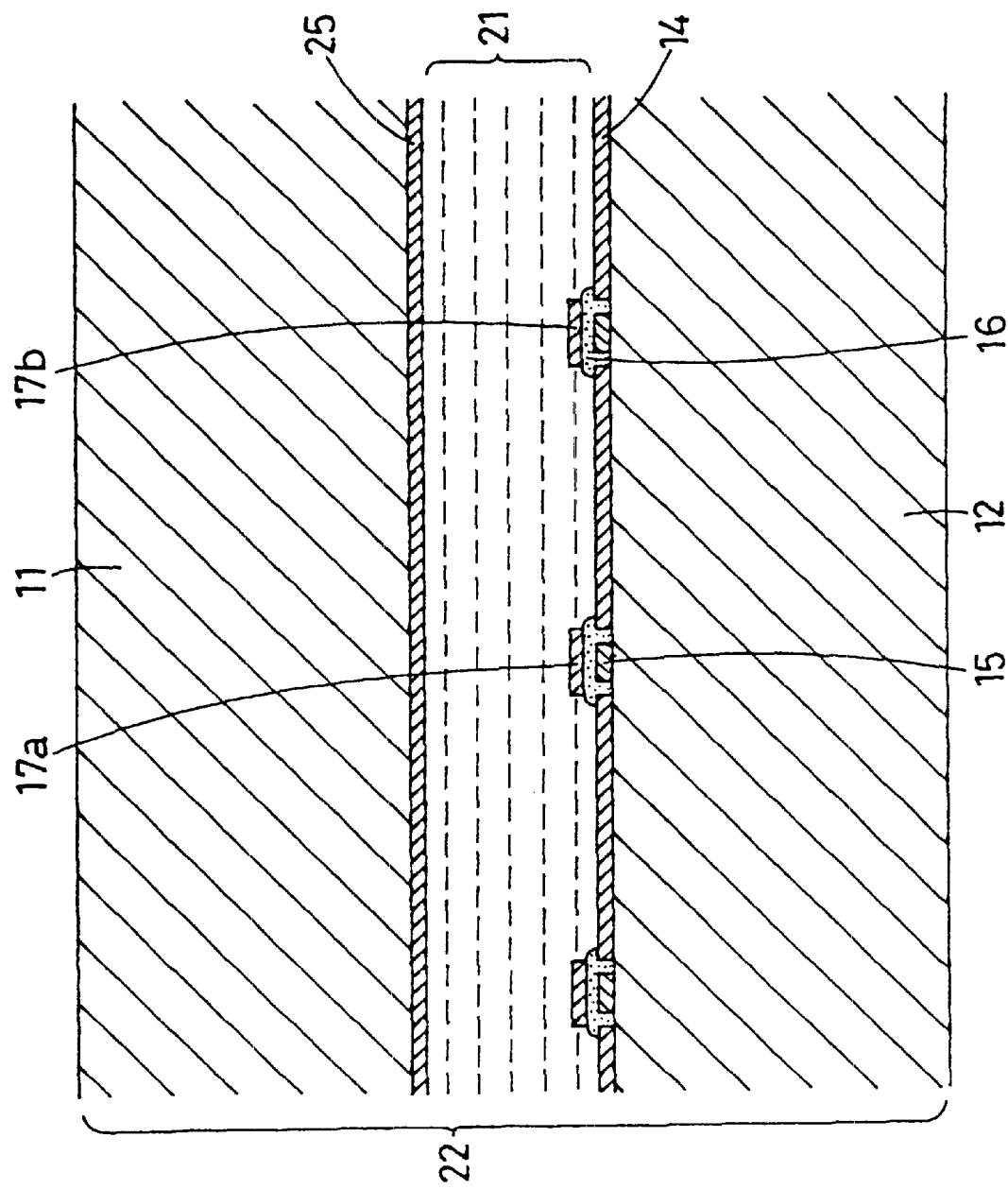
FIG. 8 is a sectional view of the display panel in an embodiment of the present invention.

In the constitution of FIG. 8 a transverse electric field wire 17 is formed on a source signal line 15 through a low dielectric film 16. The transverse electric field wire 17 is formed wider than that of the embodiment shown in FIG. 1. The reason for this is that the transverse electric field wire 17 is caused to have a "shielding effects which prevents the electric field, which occurs from the source signal line 15 to which a video signal is being applied, from reaching the liquid crystal layer 21. To make the "shielding effect" satisfactory, the width of the transverse electric field wire 17 is wider than that of the source signal line 15.

In the constitution of FIG. 8, the transverse electric field wire has the shielding effect and can realize stable display having no image noise. However, the film thickness of the low dielectric film 16 needs to be made as thick as possible. The film thickness is made at least 0.5 $\mu$m or more, preferably 1 $\mu$m or more. This is because if the film thickness is thin, a capacitor will be formed between the source signal line 15 and the transverse electric field wire 17, and consequently, parasitic capacity will become large and load to the source driver circuit will be increased.

Figure 9:
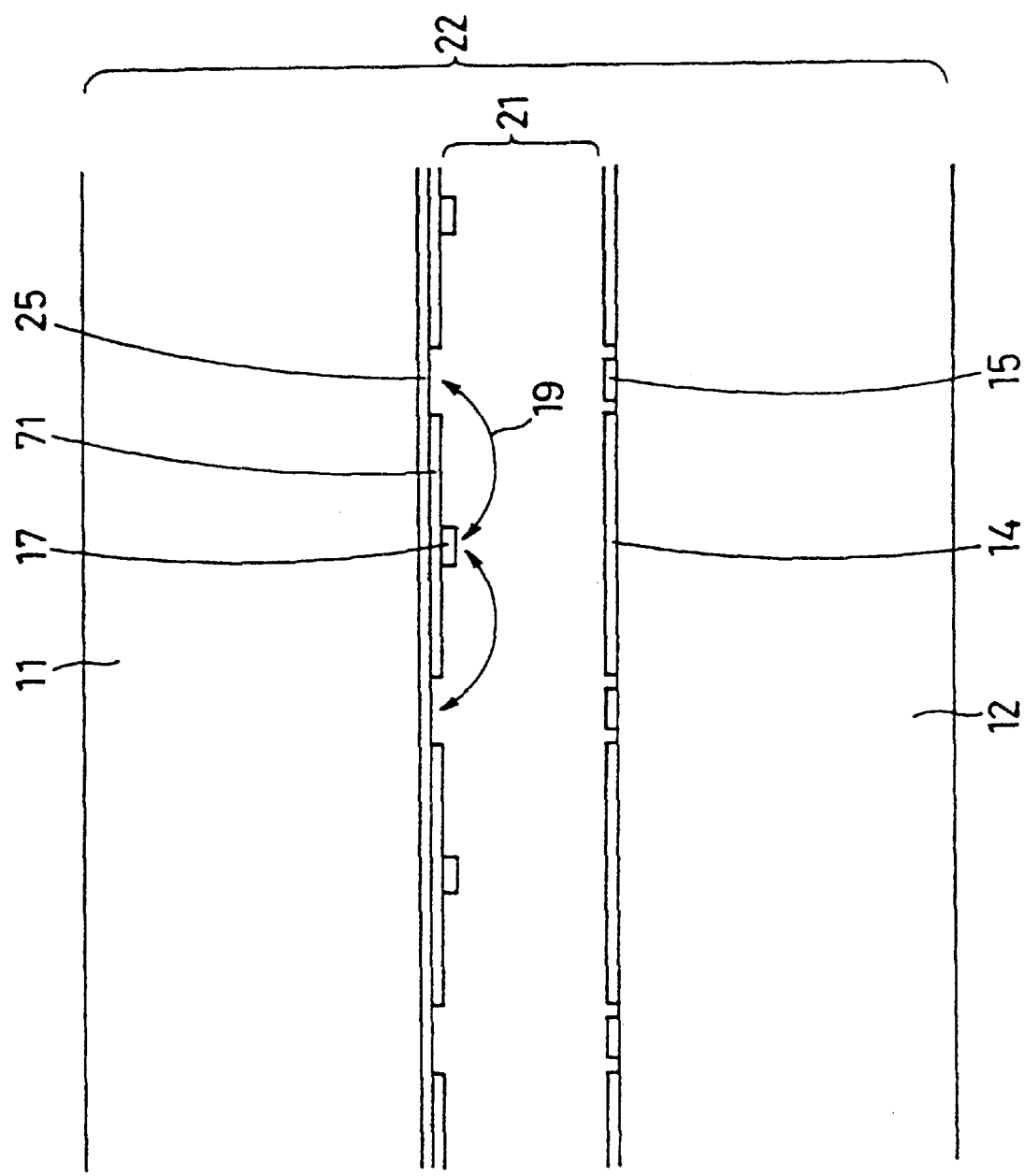
FIG. 9 is an explanatory diagram of the operation of the display panel in another embodiment of the present invention.

FIG. 9 shows the constitution where a transverse electric field wire 17 is formed on approximately the central portion of a pixel electrode 14. As with FIG. 7, an insulating film 71 is interposed between the wire 17 and a counter electrode 25 so that the wire 17 and the counter electrode 25 do not contact each other. The insulating film 71 is made wide as shown in FIG. 9 and formed above the entire area of the pixel electrode 14.

If constituted as described above, an electric force line 19 will occur between the counter electrode 25 and the transverse electric field wire 17, as well. For this reason, the rate of the liquid crystal molecules 20 oriented in a direction parallel to a counter substrate 11 is increased and the display contrast effect can be enhanced.

Figure 10:
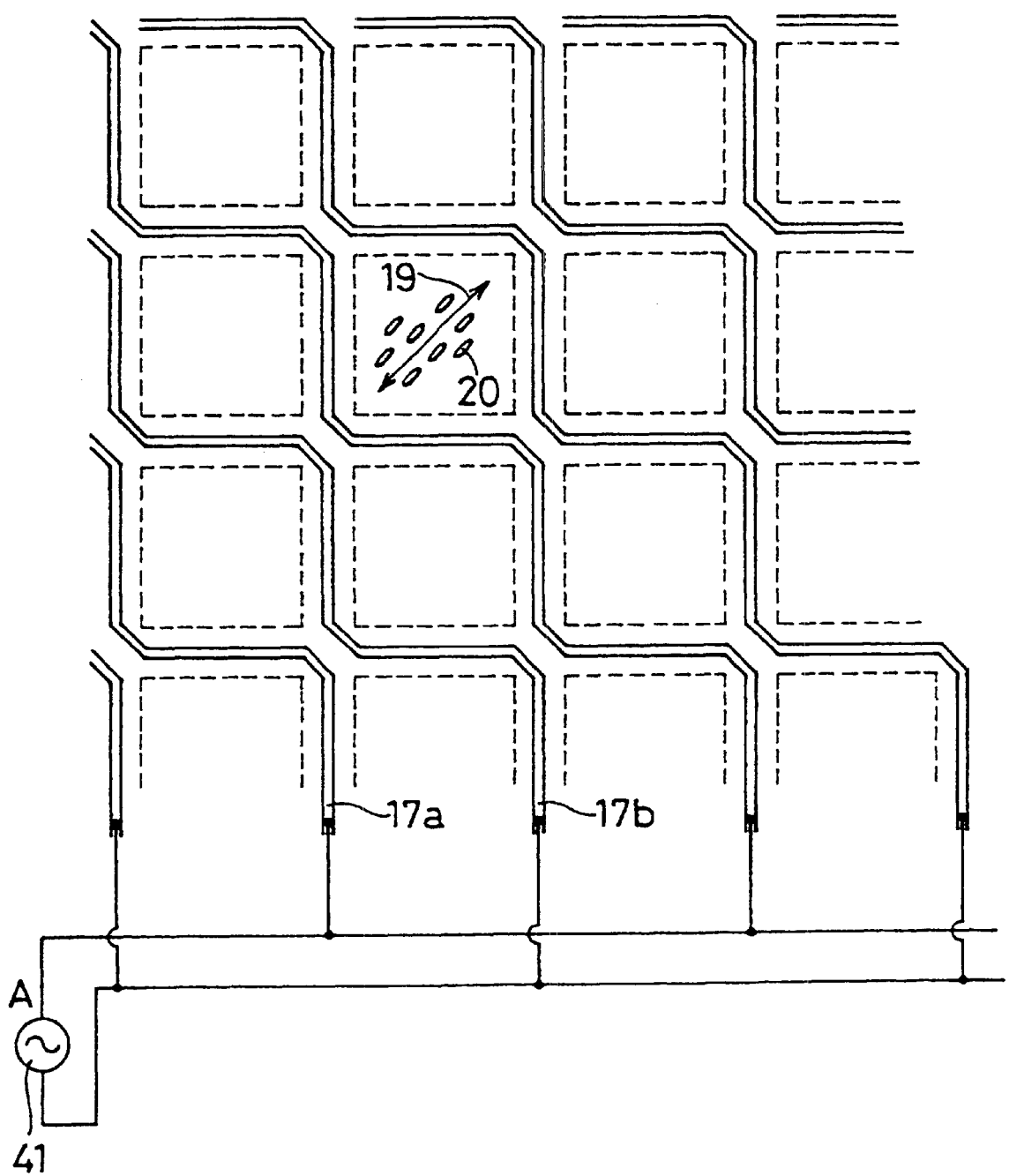
FIG. 10 is an explanatory diagram of the operation of the display panel in another embodiment of the present invention.

FIG. 10 shows the constitution where transverse electric field wires 17 are formed along two edges of a pixel electrode 14 on a counter substrate 11. Note that the transverse electric field wires 17 are not limited only to the counter substrate 11. It is a matter of course that the transverse electric field conductors may be formed on an array substrate 12 or on both the counter substrate 11 and the array substrate 12. The position of the pixel electrode 14 is represented by a dotted line.

As shown in FIG. 10, if the transverse electric field wires 17 are formed, an electric force line 19 will be produced in an oblique direction relative to the pixel electrode 14. Therefore, liquid crystal molecules 20 will also be oriented in an oblique direction. Also, the strength of the occurrence of the transverse electric field becomes strong and satisfactory display contrast can be realized.

Figure 11:
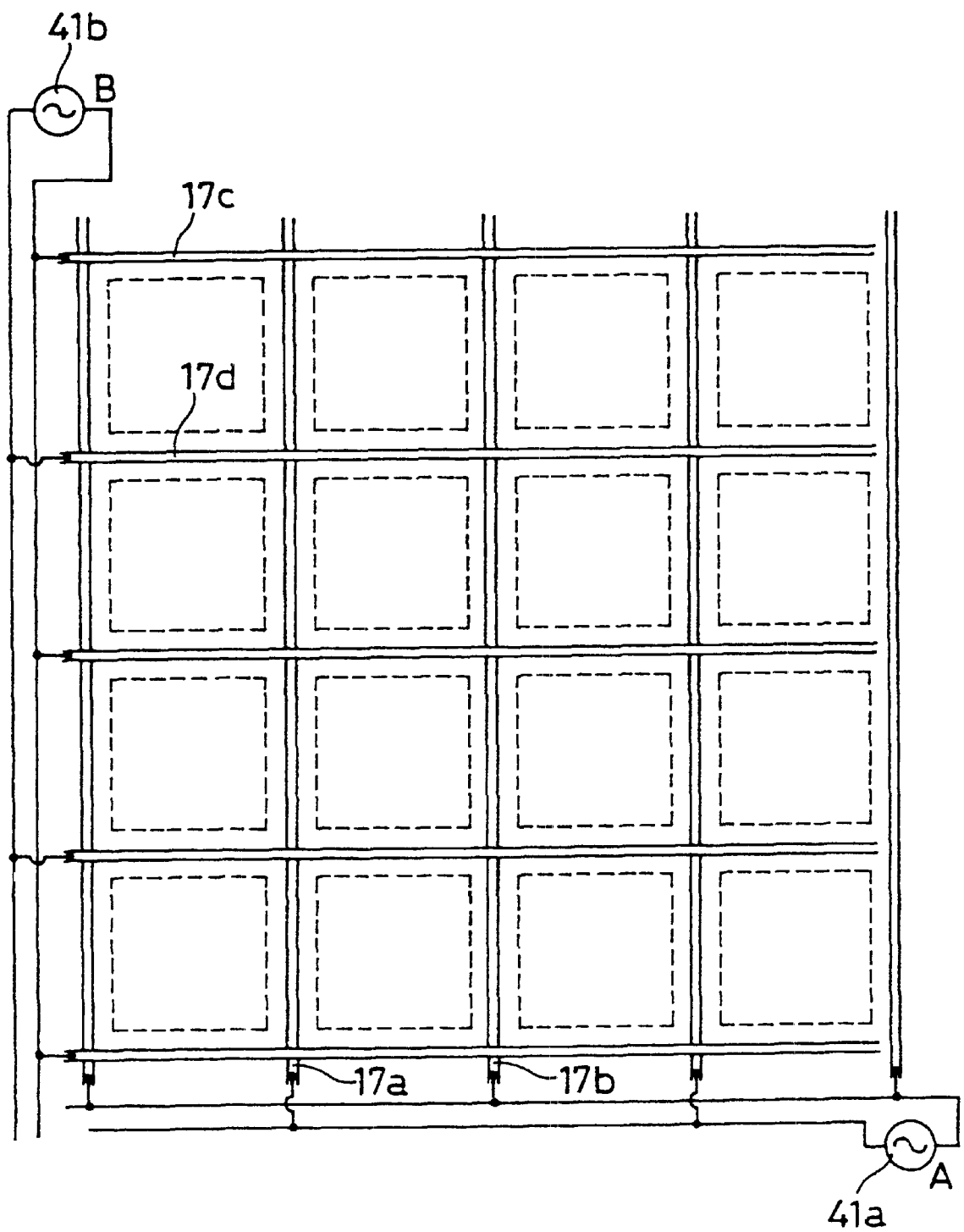
FIG. 11 is an explanatory diagram of the operation of the display panel in another embodiment of the present invention.

FIG. 11 is a constitution diagram in which transverse electric field wires are formed both in the formation directions of gate signal lines and in the formation directions of source signal lines. The formation directions of the gate signal lines are assumed to be directions of 17c and 17d, and the formation directions of the source signal lines are assumed to be directions of 17a and 17b. On the intersections, insulating films are formed so that the transverse electric field wires 17c and 17d do not electrically contact the transverse electric field wires 17a and 17b.

Signal sources 41a and 41b output a rectangular wave or a sine wave. The amplitude of the aforementioned signal is increased in proportion to the space between the transverse electric field wires 17c and 17d and between the transverse electric field wires 17a and 17b. The reason for this is that if the space is wide, a strong electric field will be required to orient liquid crystal molecules 20.

Figure 12:
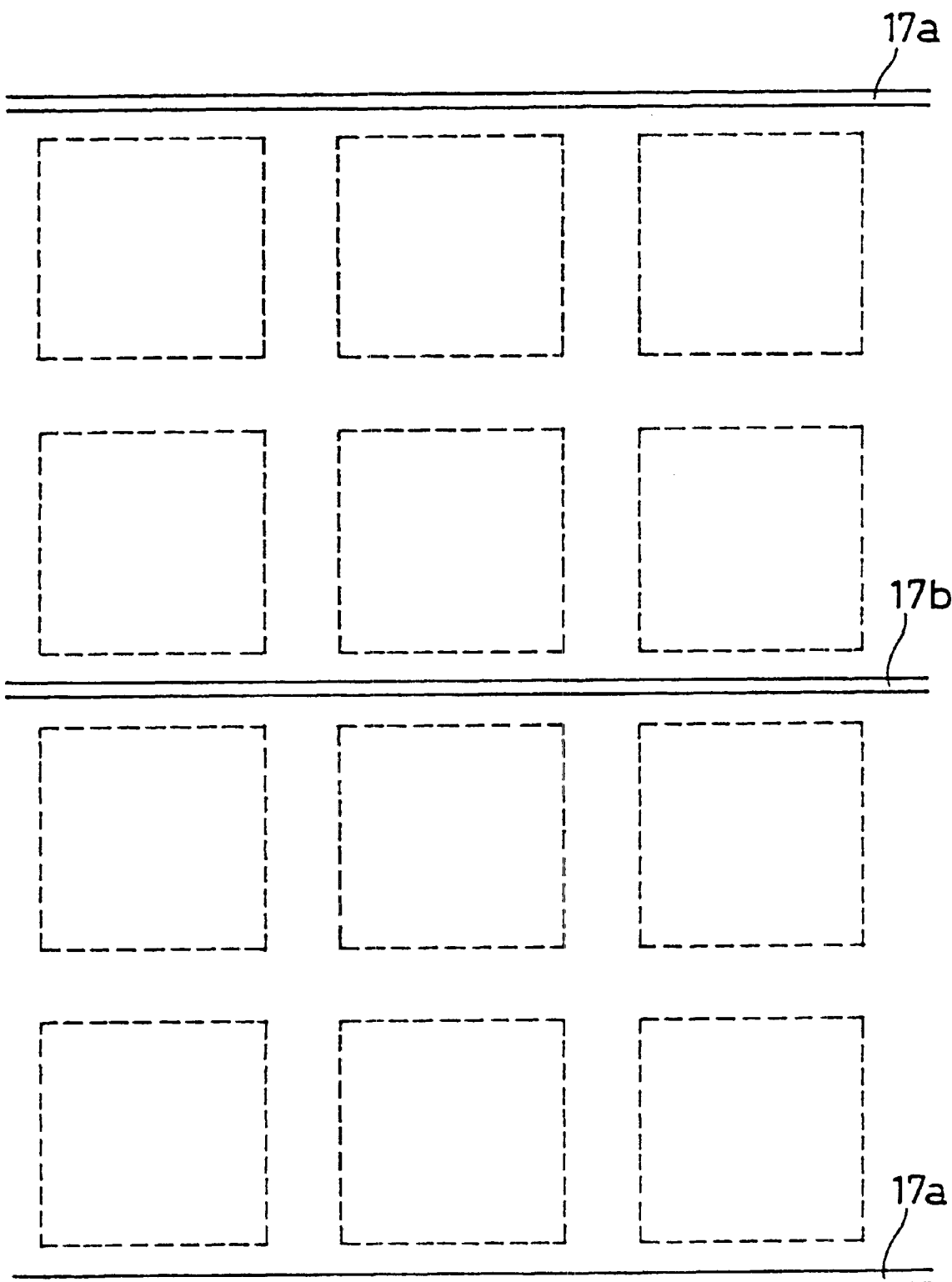
FIG. 12 is an explanatory diagram of the operation of the display panel in another embodiment of the present invention.

Note that in the aforementioned embodiment, while the transverse electric field wire 17 has been formed so as to surround a single pixel, the present invention is not limited to this. As shown in FIG. 12, it is a matter of course that a single transverse electric field wire 17 may be arranged at an interval of 2 pixels or at an interval of 3 or more pixels.

Each pixel electrode 14 is formed with a TFT which serves as a switching device. Also, the TFT is formed with a light shielding film. The light shielding film is mainly for preventing the light scattered at a liquid crystal layer 21 from being incident on the semiconductor layer of the TFT. If light is incident on the semiconductor, it will cause a photoconductor phenomenon due to which the TFT does not go to an OFF state or the OFF resistance of the TFT is reduced. For material for forming the light shielding film, acrylic resin with carbons scattered therein is exemplified. Also, various kinds of prime color pigment(red, green, blue, cyan, magenta, and yellow colors) may be optimally mixed together. Also, there is a method of forming an insulating thin film such as $SiO_2$ film on a TFT and then patterning and forming a thin metal film as a light shielding film on the insulating thin film. In addition, there is a method of depositing amorphous silicon thick to make a light shielding film. Additionally, it is preferable that the TFT adopt the inverted stagger structure in which the semiconductor layer is formed under the gate.

Note that in the PD liquid crystal display panel it is preferable that the switching device, such as a TFT, is formed by a polysilicon technique to prevent the occurrence of the photoconductor phenomenon. The polysilicon technique includes a high-temperature polysilicon technique which is a semiconductor technique for fabricating normal integrated circuits (ICs) and also includes a low-temperature polysilicon technique for forming an amorphous silicon film recently being developed and then crystallizing the amorphous silicon film. Particularly, it is preferable to form TFTs with the low-temperature polysilicon technique which can form a driver circuit directly on the array substrate 12 and also has a possibility of being able to fabricate panels at low cost. In the TFT formed with the aforementioned techniques, the occurrence of the photoconductor phenomenon is considerably reduced as compared with the TFT formed with the amorphous silicon technique which has presently put to practical use in portable televisions. For this reason it is most suitable for the PD liquid crystal display panel which performs light modulation by scattering-transmittance.

A description will hereinafter be made of the display panel of another embodiment of the present invention, referring to the drawings. FIG. 15 is a sectional diagram of the liquid crystal display panel of the present invention. An array substrate 12 is formed with pixel electrodes 14 consisting of ITO, source signal lines (not shown), gate signal lines (not shown), TFTs 155, etc.

On the TFT 155 a light shielding film consisting of resin (resin light shielding film) 152 is formed. The reason why it is formed with resin is for enhancing the adhesion between a liquid crystal layer 21 and the array substrate 12. For the resin, acrylic resin containing carbons and titanium dioxide and acrylic resin colored with colors and dyes are exemplified. Also, the light shielding film 152 may be formed with a composite film (two-layer chrome) consisting of metal chrome and chromium oxide.

Also, the reason that the light shielding film 152 is formed on the switching device such as the TFT 155 is for preventing light from entering the semiconductor layer of the TFT and MIM. If light enters, the photoconductor phenomenon will occur in the switching device such as the TFT 155 and the ON-OFF characteristic of the switching device will be degraded. If the light shielding film 152 is formed, there will be no possibility that light will be incident from the liquid crystal layer 21 on the aforementioned semiconductor layer.

The light shielding film 152 also has an effect of preventing light halation which occurs within the liquid crystal layer 21. The PD liquid crystal display panel scatters incident light, thereby performing light modulation (an optical image is formed). However, the scattered light is reflected at the interface between the panel and air and reflects irregularly within the panel 22. The irregularly reflected light is causative of contrast degradation in the display panel 22.

The light shielding film 152 absorbs the aforementioned irregularly reflected light. For this reason the display contrast is enhanced. Therefore, the light shielding film 152 should be formed with material which absorbs incident light. The light shielding film for absorbing the aforementioned light is easily realizable by mixing carbon with resin. Also, from the standpoint of preventing irregular reflection, the light shielding film 152 should be formed on an area as wide as possible, such as an area (excluding an area present on the pixel electrode 14, i.e., an area between adjacent pixel electrodes and an area on the signal line) through which effective light for image display does not pass.

On the counter electrode 25 a color filter 151 is formed. For the color filter 151, there is exemplified a filter which is colored by employing dyes and colors in gelatin is exemplified. It is called a resin color filter. Also, light-setting type acrylic resin may be colored. In addition, there is exemplified a filter in which dielectric thin films consisting of inorganic materials having low and high refractive indexes are stacked in layers. It is called a dielectric color filter. The low refractive index layer employs either one of $MgF_2$, $SiO_2$, or $Al_2O_3$. The high refractive index layer employs $TiO_2$, ZnS, $CeO_3$, $ZrTiO_4$, $HfO_2$, $Ta_2O_5$, $ZrO_2$, and so on. If the optical film thicknesses of these dielectric films are adjusted according to the red, green, and blue of the color filter, a spectral characteristic which transmits required light will be obtained. This principle is well known and has been applied to dichroic mirrors, etc. In the color filter, attention should be paid to red color purity. If red color purity is insufficient, an image will become whitish and display quality will be reduced. It is preferable that the red color filter 151 employ a dielectric color filter and that the blue and green color filters employ an inexpensive resin color filter. The dielectric color filter is formed in correspondence with the shape of the pixel electrode by etching, and the resin color filter is formed by employing a technique such as printing.

In the case where the liquid crystal display panel 22 is a transmission type, the color filter 151 is constituted so that it selects and transmits a red (R) color, a green (G) color, or a blue (B) color. The same may be said of the case where the liquid crystal display panel 22 is a reflection type (for example, case where the pixel electrode 14 is formed with metal material, case where it is formed with a dielectric mirror, etc.). Note that the color of the color filter 151 is not limited to three colors, red, green, and blue. For example, the color filter 151 may be constituted so that it selects cyanogen, magenta, or yellow colors and then transmits or reflects the selected color.

The method of forming the resin color filter may be any of a coloring method, a printing method, an electrodeposition method, and a colorant method, but, for high photosensitive resin, a colorant method employing photo polymerization type acrylic or optical bridging type PVA is a suitable one.

Note that the display panel of the present invention will be described, taking as an example an active matrix display panel in which pixel electrodes 14 are arranged in the form of a matrix. However, the present invention is not limited to the active matrix display panel. The technical idea of the present invention described in this specification is also applicable to a method which does not have pixel electrodes clearly. For example, it is applicable to a simple matrix type display panel, a light write type display panel and a heat write type display panel with no pixel electrodes, and a laser write type display panel. The display panel of the present invention may not be only a liquid crystal display panel but it may also be a display panel employing PLZT as a light modulating layer, an inorganic EL panel, an organic EL display panel, and a plasma display panel (PDP).

On the color filter 151 a protective film 153 is formed. The protective film 153 is formed for preventing the color filter 151 from being destroyed mechanically. It is also formed for preventing an entry of water to the liquid crystal layer 21. For the material for forming the protective film, phenol resin, epoxy resin, acrylic light setting resin, urethane resin, silicon resin, rubber, etc., are exemplified. It may also be inorganic thin film such as $SiO_2$ film. Among them, acrylic light setting resin is suitable resin, because it can be easily coated by a spinner technique and a roller coater technique and a hardness of 4H or more is also obtained. Setting the resin is also easy because it can be performed only by radiating ultraviolet rays or visible light.

Note that it is preferable that the surface of the color filter 151 be given appropriate irregularities. This is called an embossing process. The reason for this is that light is reflected at the surface of the color filter 151 and the exterior can be prevented from changing. The irregularities on the surface are formed in a range of about 5 to 200 $\mu$m. Also, it is preferable that a thin film (not shown) with a refractive index of 1.55 to 1.85 be formed between the color filter 151 and the counter electrode 25. If the thin film is formed, reflected light can be reduced.

Figure 31:
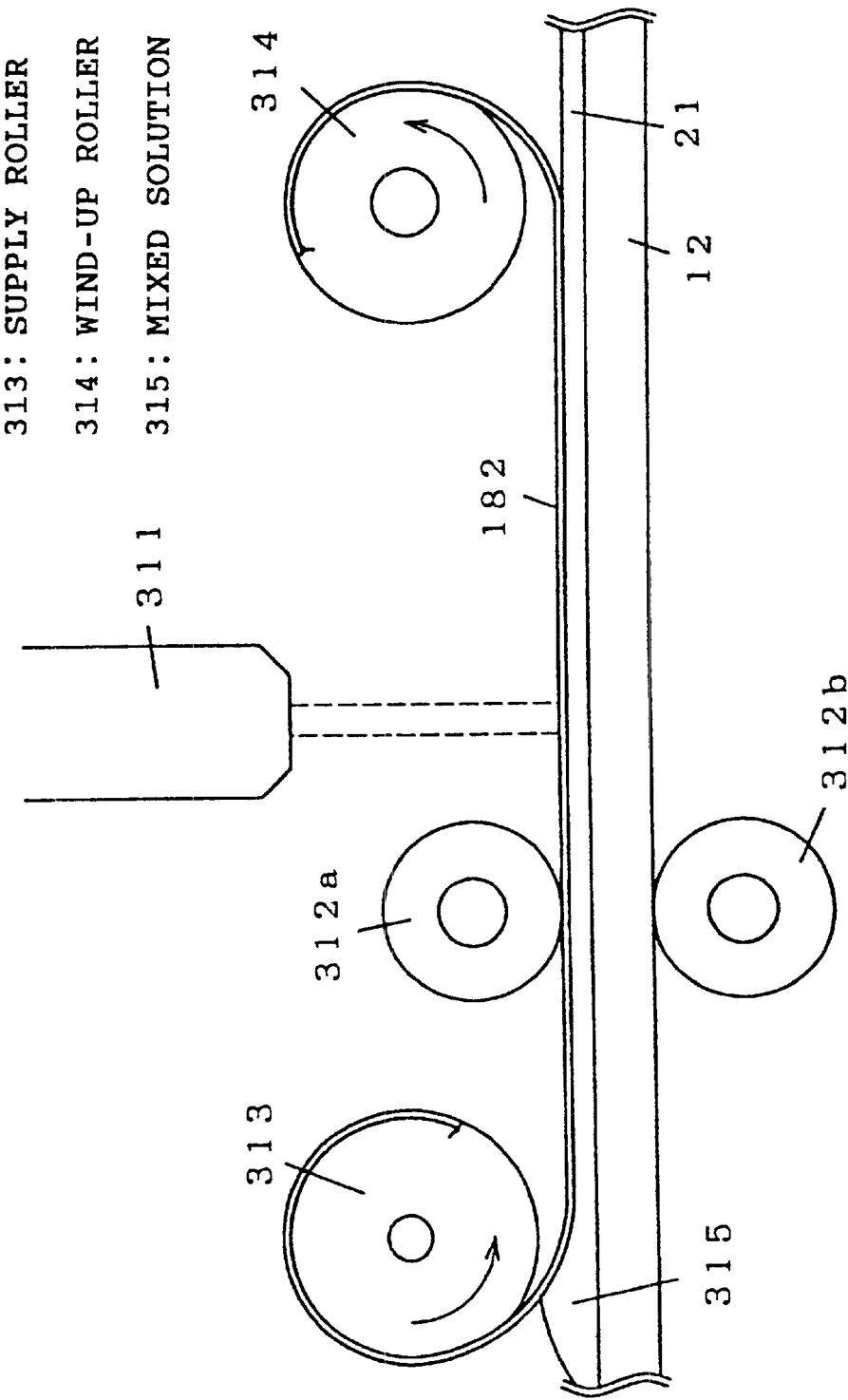
FIG. 31 is an explanatory diagram of the fabrication method of the liquid crystal display panel of the present invention.

A description will hereinafter be made of the fabrication method of the display panel, referring to FIG. 31. FIG. 31 is an explanatory diagram of the fabrication method of the display panel of the present invention. Between the array substrate 12 and a separating film 182 which serves as separation means, a mixed solution 315 consisting of ultraviolet setting resin which is a sort of light setting resin and a liquid crystal component is held. Note that between the separating film 182 and the array substrate 12, spacers and fibers are previously scattered or they are previously mixed with the mixed solution 315. For the separating film 182, silicon resin film, fluororesin film, and olefinic resin film such as polyethylene and polypropylene films are exemplified, and silicon resin and fluororesin, coated on the surface of resin film, are exemplified. Even in the case of the other materials, they can be adopted if they transmit ultraviolet rays and have a certain degree of flexibility. For example, glass substrates can also be employed.

Note that while the resin component of the mixed solution 315 employs ultraviolet setting resin, the present invention is not limited to this resin. The resin component may be a solution containing acrylic resin which is set by visible light, double-fluid setting resin such as epoxy resin, heat setting resin, or rubber resin. In other words, it will be sufficient if it can be phase-separated from a liquid crystal.

As an example, the components of the mixed solution 315 are as follows:

(1) Liquid crystal: E-7 (manufactured by BDH) (80 wt %)
(2) Ultraviolet setting resin: Mixture consisting of polyester acrylate (1.8 wt %) and 2-ethylhexyl acrylate (18 wt %)
(3) Light setting initiator: Darocure 1173 (manufactured by MERCK) (0.2 wt %)

If ultraviolet rays are radiated to the aforementioned mixed solution 315, a bridging reaction will occur within the light setting resin. With this bridging reaction, the liquid crystal component and the light setting resin component are phase-separated from each other, and liquid crystal droplets are scattered into the light setting resin. At the same time, the light setting resin is set.

A description will next be made of tests performed to investigate the relation between the radiation quantity of light to the light setting resin and the average particle diameter of the liquid crystal.

The ultraviolet radiation quantities of the light setting resin are 100, 200, 300, 400, 500, 1000, 2000, and 2500 $mJ/cm^2$.

These liquid crystal display panels have been observed with a microscope, and it has been confirmed that in the liquid crystal display panel radiated only with ultraviolet rays of 400 $mJ/cm^2$ or less in the setting process, the average particle diameter of the liquid crystal has been increased to 5.5 $\mu$m or more and, in the liquid crystal display panel radiated with ultraviolet rays of 500 $mJ/cm^2$ or more in the setting process, the average particle diameter of the liquid crystal has been reduced to 1.0 to 3.0 $\mu$m. The measurement results of the contrasts of these liquid crystal display panels and the average particle diameter of the liquid crystal are shown in Table 1.

TABLE 1

| Ultraviolet ray radiation quantity $(mJ/cm^2)$ | 100 | 200 | 300 | 400 | 500 | 1000 | 2000 | 2500 |
|---|---|---|---|---|---|---|---|---|
| Contrast | 25 | 37 | 46 | 51 | 98 | 108 | 110 | 110 |
| Average particle diameter of a liquid crystal droplet ($\mu$m) | 15.5 | 10.5 | 8.0 | 5.5 | 2.4 | 1.6 | 1.0 | 0.8 |

In the aforementioned embodiments, while a mixture consisting of polyester acrylate and 2-ethylhexyl acrylate has been employed as light setting resin, it may consist of 2-hydroxy-ethyl acrylate and trimethylol-propane triacrylate. Also, instead of light setting resin, heat setting resin may be employed to perform reaction by heat. In that case, when novolak heat setting resin is employed, hexamethylenediamine (hexamine) can be employed as a setting agent.

Also, the liquid crystal may be E-8 (manufactured by BDH), ZLI 4792(manufactured by Merck Co.), or TL 202 (manufactured by Merck Co.), and the polymerization initiator may be IRGACUA 184 (manufactured by Ciba-Geigy) or Irgacure 651 (manufactured by ciba-Geigy).

The aforementioned is the light radiation conditions, and it is a matter of course that the film thickness of the layer of the mixed solution 315 must be made even before light radiation. For this reason, as shown in FIG. 31, after the mixed solution 315 has been held between the array substrate 12 and the separating film 182, it is sandwiched between rollers 312a and 312b and the thickness is made even. Also, it is effective to vibrate the roller 312 with an ultrasonic wave to obtain satisfactory film thickness.

By holding the mixed solution 315 between the separating film 182 and the array substrate 12 and then vibrating the solution between the separating film 182 and the array substrate 12 with an ultrasonic wave, the film thickness of the liquid crystal layer 21 becomes even. In addition, the force that is given between the separating film 182 and the array substrate 12 is reduced.

The separating film 182 is sequentially supplied from a supply roller 313 and collected by a take-up roller 314. After the film thickness of the liquid crystal layer 21 has been formed at a predetermined value with the roller 312, ultraviolet rays are radiated by light radiation means 311 and the mixed solution 315 is phase-separated from the liquid crystal layer 21, thereby obtaining the PD liquid crystal layer 21.

The light radiation means 311 is a high-pressure mercury lamp as an example and is an excimer laser (XeCl, etc.). From the light radiation means 311 light is radiated in the form of a line or a spot on the mixed solution 315.

Figure 32:
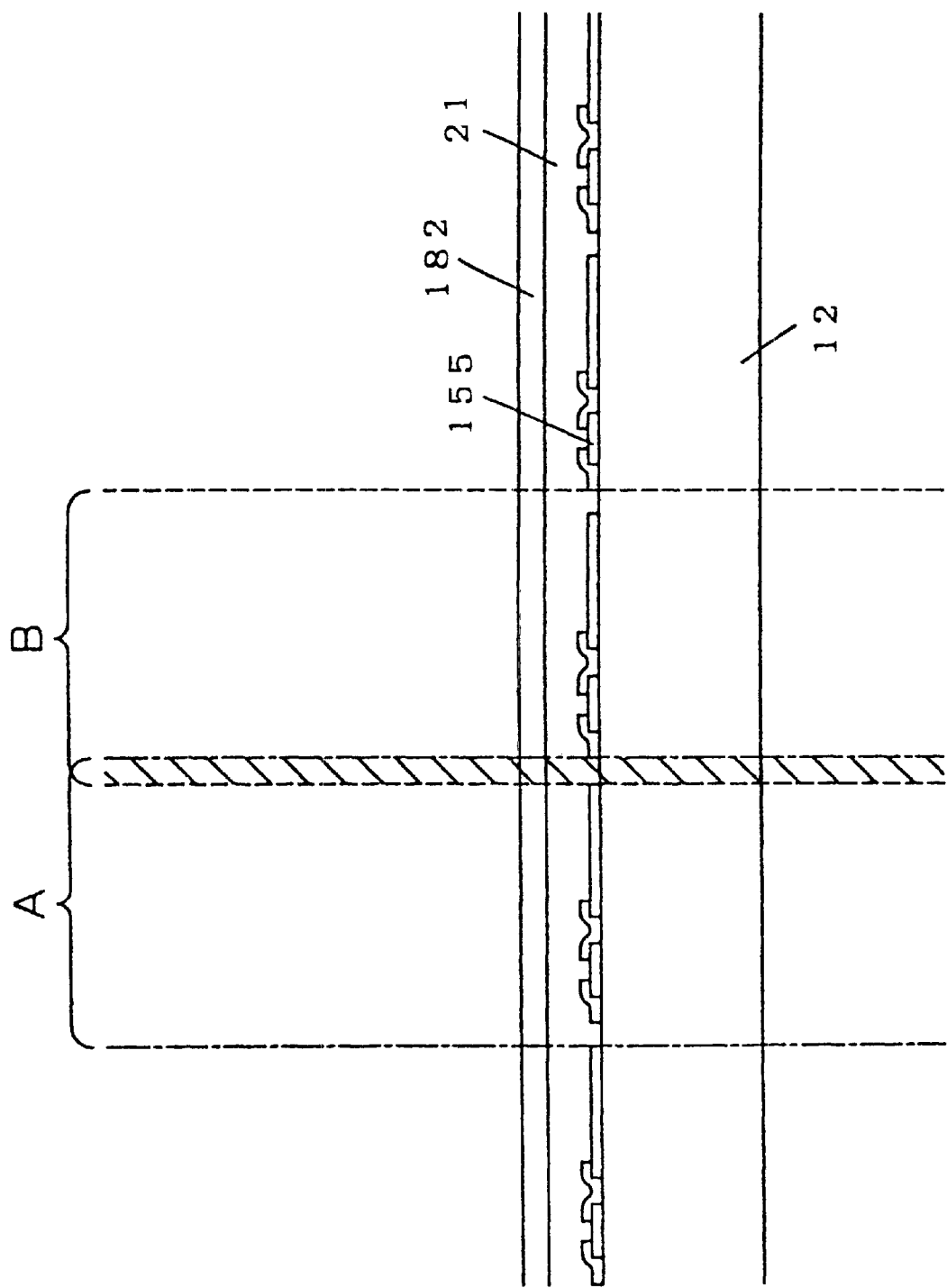
FIG. 32 is an explanatory diagram of the fabrication method of the liquid crystal display panel of the present invention.

The range in which light is radiated by the light radiation means 311 is the size of the pixel and the overlapped portion (indicated by oblique lines) is between the pixel electrodes 14 as shown in FIG. 32. The reason for this is that since light is radiated twice, the phase separation condition is not proper in the range indicated by oblique lines of FIG. 32. Since the portion between the pixel electrodes 14 (i.e., portion on the source signal line 15) makes no contribution to light modulation, the phase separation condition does not need to be proper. Of course the mixed solution 315 may be phase-separated, by employing a sheet of glass substrate or resin substrate instead of the separating film 182 and radiating ultraviolet rays (or visible light) on the entire display range at a time through the aforementioned substrate. In other words, after the film thickness of the mixed solution 315 has been made even over the entire panel 22, it may be phase-separated by radiating ultraviolet rays over the entire panel. For the radiation condition, ultraviolet rays are radiated for 5 minutes at 50 mW/cm$^2$ with an extra-high pressure mercury lamp (trade name: CHM-3000, manufactured by OHKU).

The ultraviolet rays that are radiated are cut at 350 nm or less. This is because a wavelength of 350 nm or less degrades the liquid crystal component. For this reason the light emitted from the mercury lamp is radiated on the mixed solution through an ultraviolet cut filter (trade name: ultraviolet ray-35, manufactured by Toshiba). Also, it is preferable to cut infrared rays (whose wavelength is 0.8 $\mu$m or more) at the time of phase separation. For the infrared cut filter, a trade name of HAF-50S-30H (manufactured by SIGMA KOHKI) is exemplified.

After phase separation of the mixed solution 315, the separating film 182 is removed from the light modulating layer (liquid crystal layer) 21. Thereafter, ITO is deposited, thereby forming a counter electrode 25 on the light modulating layer 21. As occasion demands, an insulating film 154 consisting of PVA is formed on the light modulating layer 21 and then the counter electrode 25 is formed.

Note that in the case of a black-and-white display panel, there is no need to form the color filter 151 on the counter electrode 25. However, it is a matter of course that in the case of color display, there is a need to form the color filter 151 on the counter electrode 25. For the arrangement of the color filters 151, there are three kinds: mosaic form, triangle form, and stripe form. All of them may be applied to the display panel of the present invention. Note that the three kinds, mosaic form, triangle form, and stripe form are generically called mosaic form.

When forming the color filter 151 on the counter electrode 25, it is preferable to form a protective layer (not shown) on the counter electrode 25. As the protective layer, urethane resin, ultraviolet setting resin, acrylic resin, and styrene resin are exemplified. Among them, it is preferable to employ urethane resin.

On the color filter 151 the aforementioned protective layer (protective film) 153 is formed. It is preferable that the protective layer 153 employ acrylic ultraviolet setting resin. The aforementioned color filter 151 prevents the change in quality, degradation, and destruction of the PD liquid crystal layer 21. Acrylic ultraviolet setting resin has a hardness of about 4H. Therefore, there is no possibility that there will be a scratch on the color filter 151.

Figure 18:
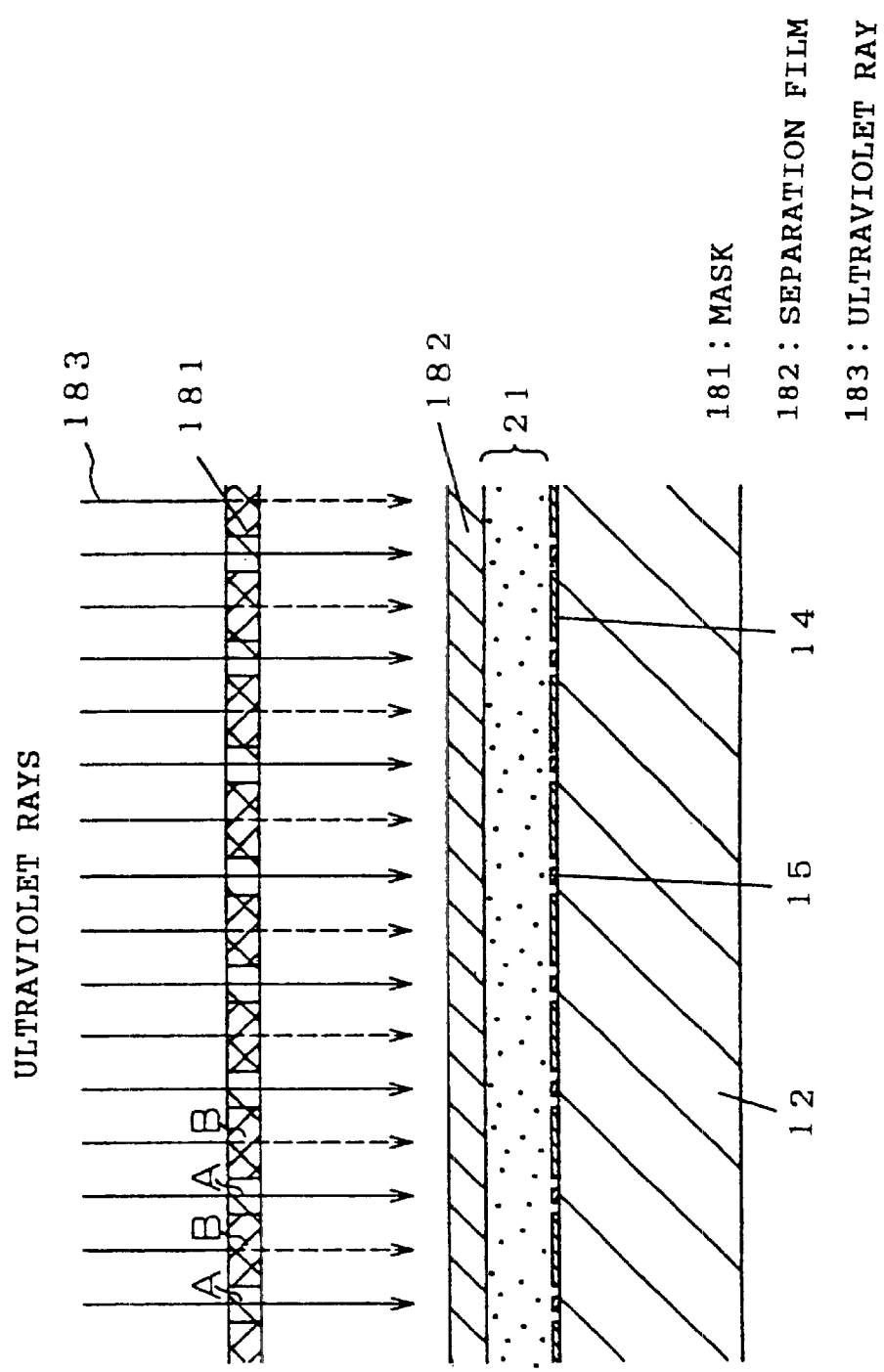
FIG. 18 is an explanatory diagram of the fabrication method of the display panel of the present invention shown in FIG. 17.

In the aforementioned fabrication method, light from the extra-high pressure mercury lamp, as it is, is radiated on the mixed solution 315, and the ultraviolet light and infrared light in an unnecessary range are cut with a filter. FIG. 18 is a diagram showing a method of radiating ultraviolet rays through a mask 181.

The mask 181 is formed with a portion A in which the transmittance of ultraviolet rays is high and a portion B in which the transmittance is low. The portion whose transmittance is low can be easily formed by depositing a film of Cr onto the mask 181 and patterning it. The transmittance of ultraviolet light (visible light) can be freely set by adjusting the film thickness of the deposited film consisting of Cr.

The average particle diameter of the waterdrop-like liquid crystal of the PD liquid crystal or the average pore diameter of the polymer network varies with the radiation strength of ultraviolet rays. Note that the average particle diameter and the average pore diameter will hereinafter be generically referred to as an average diameter. Generally, if the radiation quantity of ultraviolet rays is increased, the average diameter will become smaller. If the radiation quantity of ultraviolet rays is reduced, the average diameter will be increased. If the average diameter becomes smaller, the voltage required to obtain a light transmitting state will become high, and if it is large, the voltage will become low. On the other hand, if the average diameter is small, the scattering characteristic will become high, and if it is large, the scattering characteristic will become low. Therefore, the average diameter has to be set so that the drive voltage and the scattering characteristic are adaptable at a required value.

Figure 17:
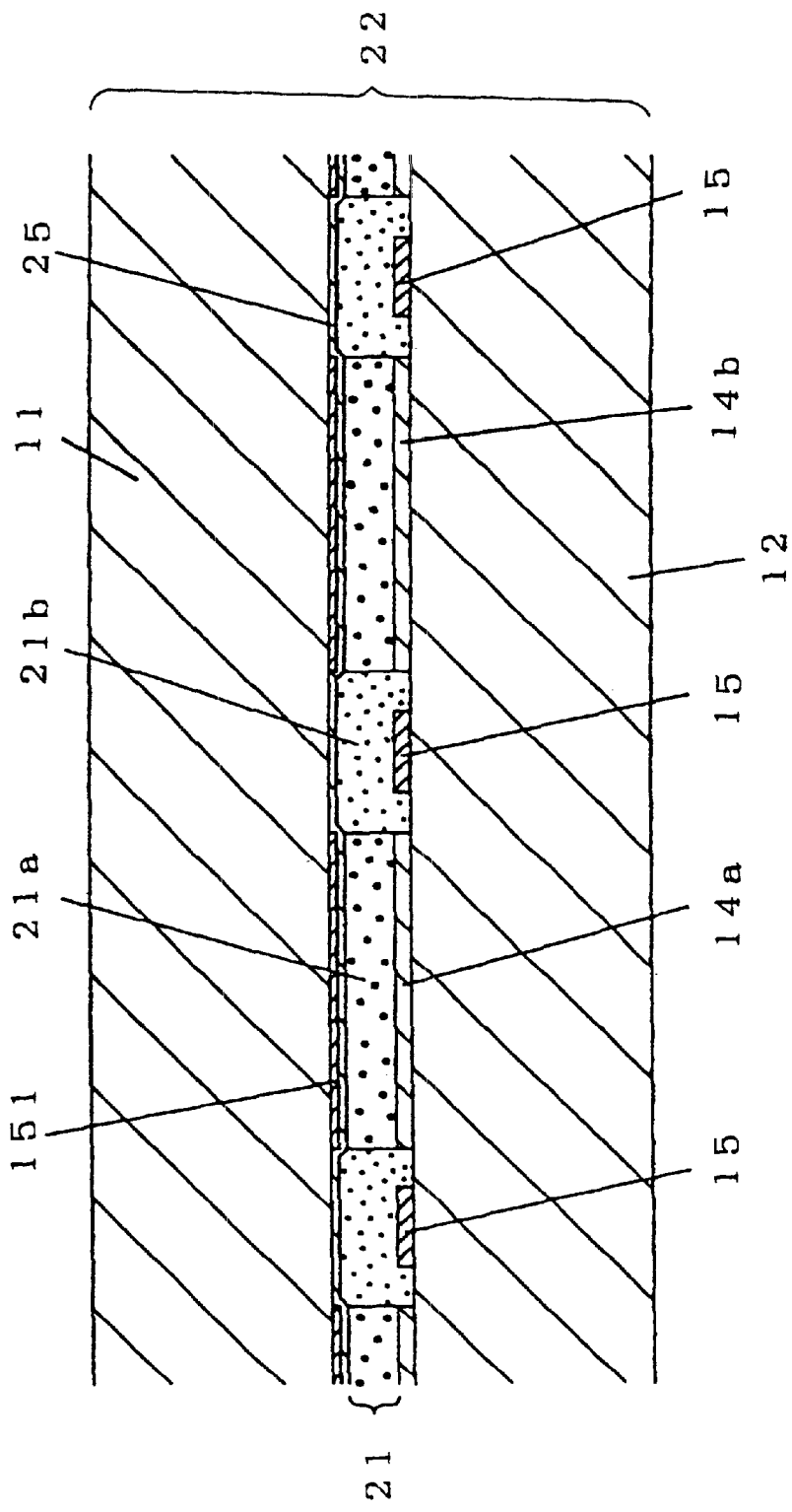
FIG. 17 is a sectional view of the display panel of the present invention forming liquid crystal layers of particle diameters of two kinds.

As shown in FIG. 18, the mask 181 is arranged so that the space between adjacent pixel electrodes 14 is positioned under the A portion of the mask 181 and the pixel electrode 14 is positioned under the B portion of the mask 181. In this state, if ultraviolet rays are radiated, the state shown in FIG. 17 will be obtained. In the liquid crystal layer 21$b$ between the pixel electrodes 14$a$ and 14$b$, the average diameter becomes small (0.8 $\mu$m or less). On the pixel electrode 14 the average diameter reaches a proper value (0.8 $\mu$m to 1.5 $\mu$m). The liquid crystal layer 21$a$ on the pixel electrode 14$a$ goes to a sufficient transparent state by a voltage application of 6 to 8 V. However, the liquid crystal layer 21$b$ will not almost go to a light transmitting state even if a voltage of 6 to 8 V is applied. In other words, the liquid crystal layer 21$b$ is in a scattering state (black display) at all times. This is convenient. The reason for this is that if black display is performed between the pixel electrodes 14, it will function as a light shielding film (BM).

Also, in order to completely prevent leakage of light from the neighborhood of the signal line 15 and the space between the pixel electrodes 14, a resin light shielding film 152 is formed as shown in FIG. 16. The reason that resin is employed is for preventing separation between the PD liquid crystal layer 21 and the array substrate 12.

Figure 28:
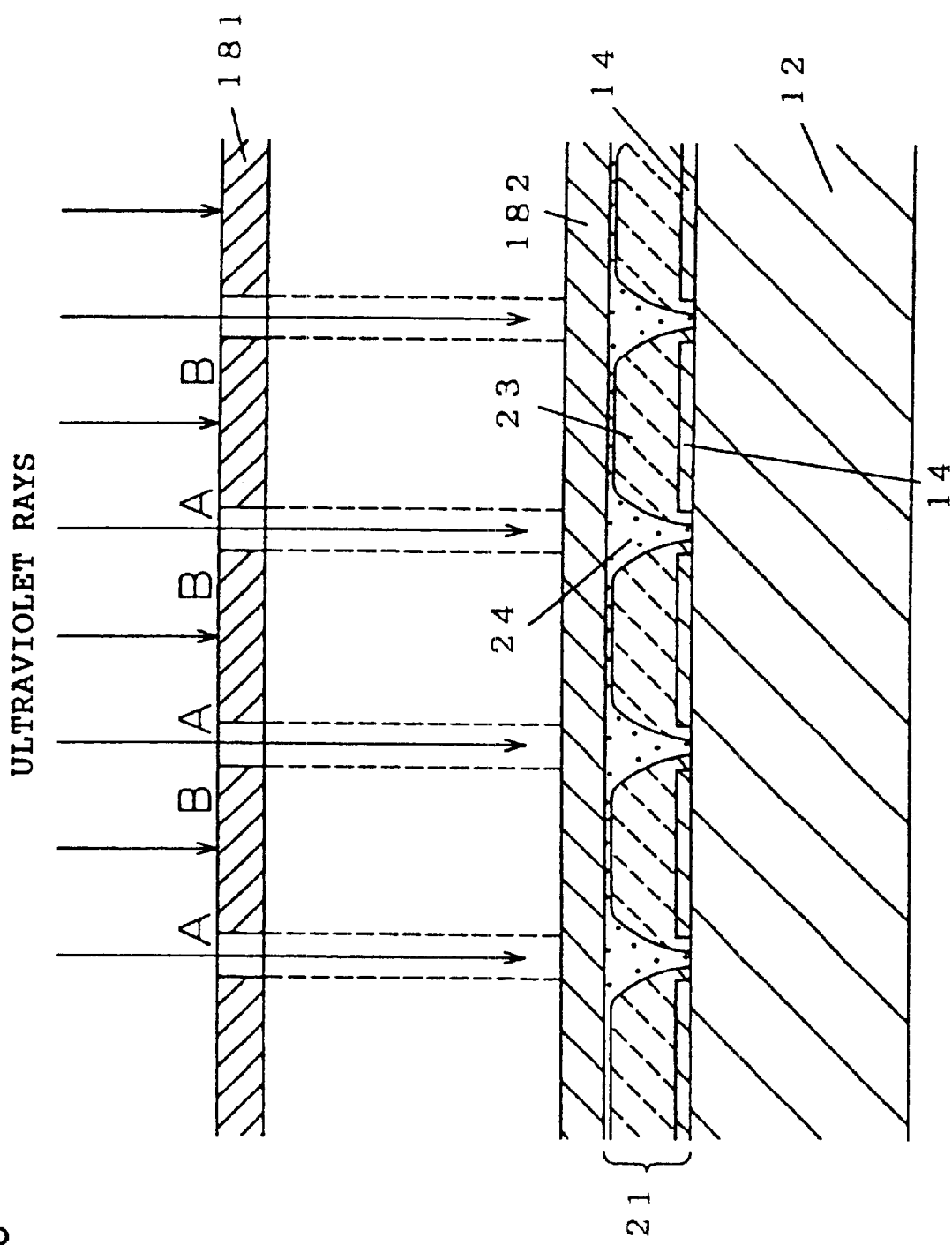
FIG. 28 is an explanatory diagram of the fabrication method of the polymer dispersion liquid crystal display panel, etc.

If the mask 181 is employed, a liquid crystal layer 21 such as that shown in FIG. 28 can also be formed. In FIG. 28, 24 denotes an area containing a great quantity of resin component (or an area including only resin) and 23 an area containing a great quantity of liquid crystal component (or an area including only liquid crystal). The liquid crystal molecules 20 in the liquid crystal component 23 are oriented along the wall surface of the resin 24.

The A portion of the mask 181 transmits ultraviolet rays without considerably attenuating them, while the B portion reduces ultraviolet rays considerably or does not transmit them. For this reason, the resin component of the mixed solution 315 present under the A portion begins to set, pulls in the peripheral resin, and pushes out the liquid crystal component to another portion. For this reason, it is believed that the area 24 containing a large quantity of resin component will form into a dome shape. In other words, the portion on the pixel electrode 14 almost forms a liquid crystal component. Such liquid crystal layer construction is also the PD liquid crystal defined by the present invention.

Figure 29:
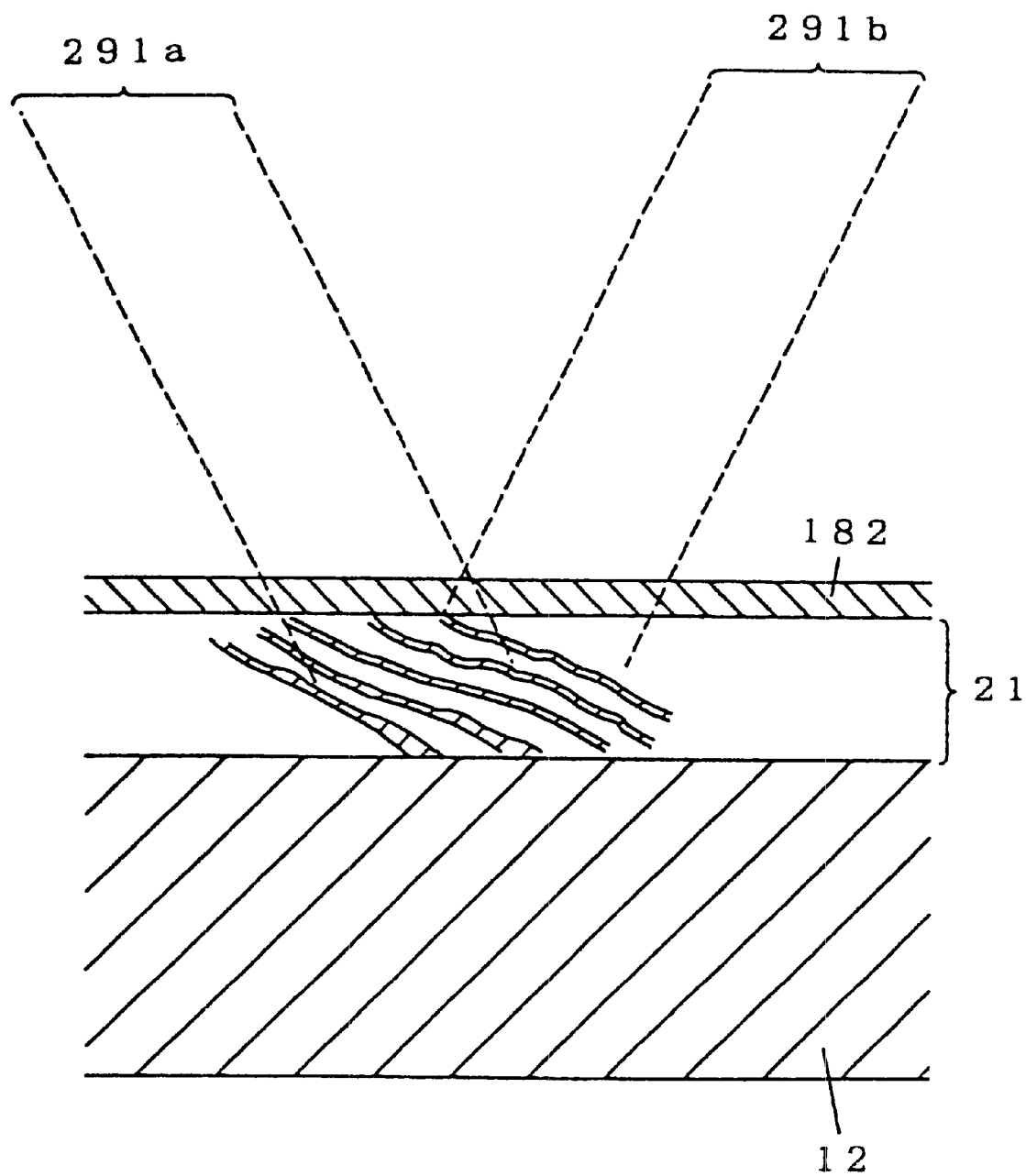
FIG. 29 is an explanatory diagram of the fabrication method of the polymer dispersion liquid crystal display panel, etc.
Figure 33:
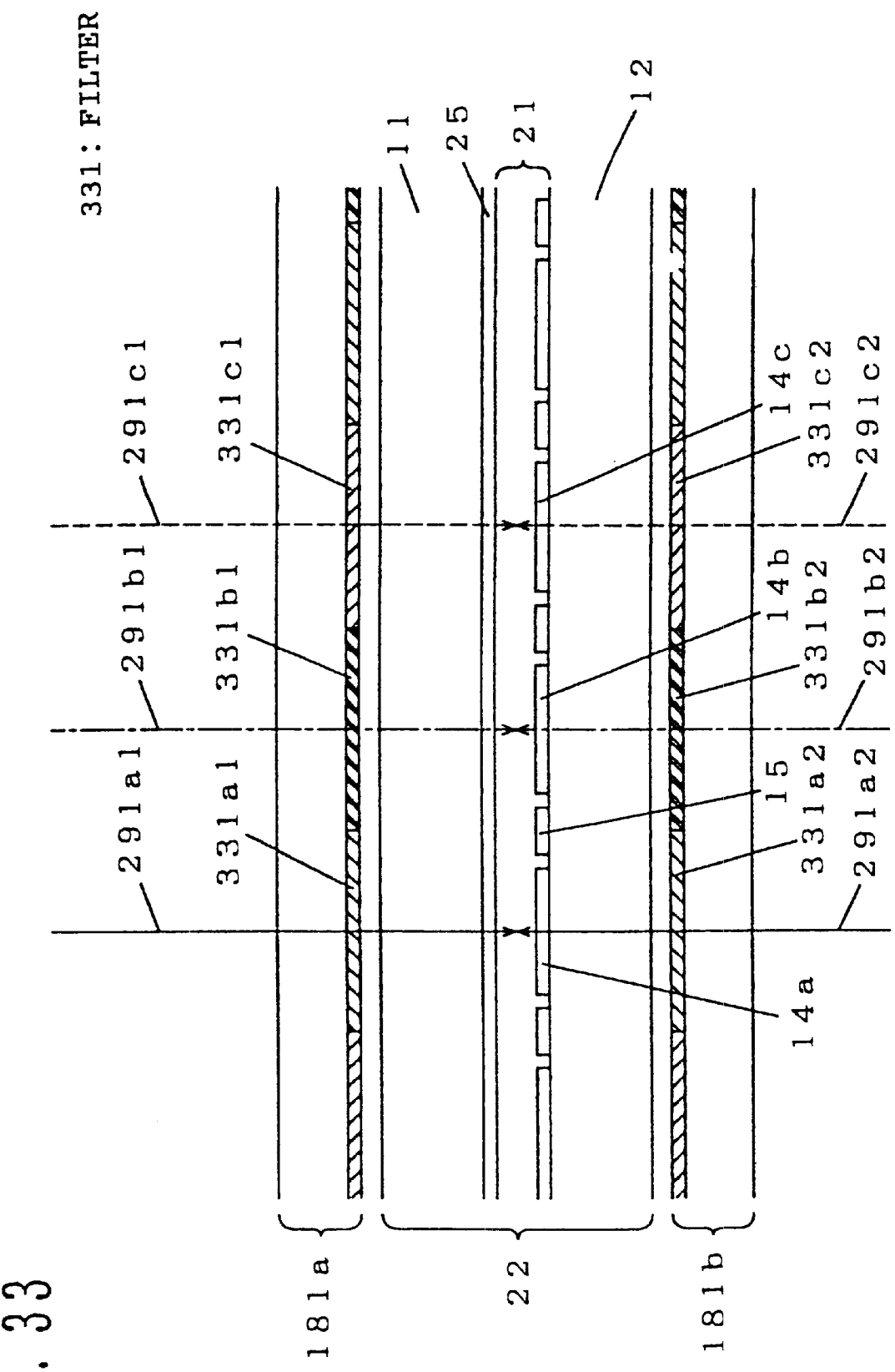
FIG. 33 is an explanatory diagram of the fabrication method of the liquid crystal display panel of the present invention.
Figure 34:
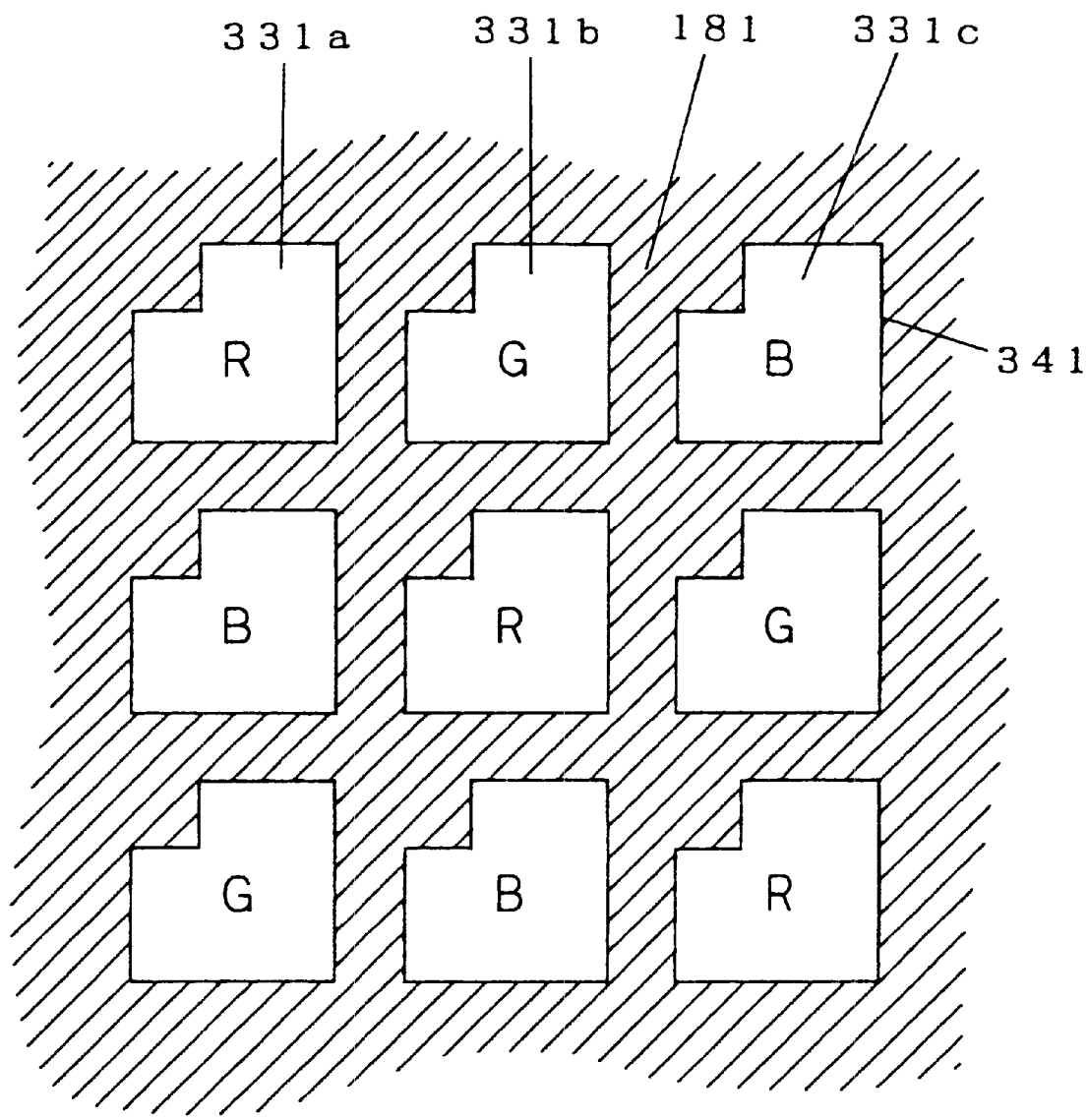
FIG. 34 is an explanatory diagram of a m ask employed in the fabrication method explained in FIG. 35.

In the aforementioned embodiments, while light from the extra-high pressure mercury lamp is radiated on the mixed solution 315, a laser may be employed. FIG. 33 is an explanatory diagram of a method of radiating laser light 291 on the mixed solution 315 to perform phase separation. A mask 181a is formed with red, green, and blue filters 331. The filters 331 are arranged in mosaic form, as shown in FIG. 34. The filters 331 are also arranged so that they correspond to pixels. For the laser light 291, white laser light is exemplified. As shown in FIG. 29 or FIG. 33, if two laser light beams 291 are incident through the front surface or back surface of the display panel, they will interfere with each other and light strength will occur in the form of fringes. In the portion where light is strong, resin sets and the refractive index becomes low. In the portion where light is weak, the liquid crystal component is increased and the refractive index becomes high. Therefore, portions whose refractive index is high and portions whose refractive index is low are alternately arranged in layers. For this reason, an interference effect occurs and the PD liquid crystal layer 21 has the property that light with a specific wavelength is transmitted or reflected. Such a multilayered constitution is also the PD liquid crystal layer.

Even if two argon ion laser light beams of the same wavelength are employed, the PD liquid crystal layer 21 can be formed. One laser light beam is used as an object light beam, while the other is used as a reference light beam. This object light beam is caused to be incident through a first transparent substrate 11, and the reference light beam which is the same laser light beam is caused to be incident through a second transparent substrate 12. The object light beam and the reference light beam produce interference patterns. In the mixed solution 315, photo polymerization is started at a portion whose interference light strength is high, and a high polymer phase with three-dimensional structure is formed. The liquid crystal phases are oriented nearly randomly and present in the three-dimensional structure of the high polymer phase.

At the time a laser light radiation of about 50 mJ/cm$^2$ has been performed and the aforementioned polymerization process has advanced, the laser light radiation is stopped. Then, even ultraviolet rays are radiated on the PD liquid crystal layer at a rate of about 500 mJ/cm$^2$. The entire layer is sufficiently polymerized and then the polymerization process is completed.

The PD liquid crystal layer 21 fabricated by such a method has a function of reflecting and scattering toward the side of an observer the illuminating light incident from the side of the observer with very high efficiency, because the three-dimensional structure of the high polymer phase is controlled as a reflection type hologram. In this embodiment the illuminating light with a wavelength of near 458 nm can be reflected and scattered with an efficiency of 90% or more and observed in a wide angle range. In the pixels to which a voltage of about 30 V is applied, since the liquid crystal molecules 20 are arranged in order, the aforementioned reflecting and scattering function disappears and therefore the liquid crystal layer becomes transparent.

According to this embodiment, as previously described, the structures of the liquid crystal phase and the high polymer phase of the PD liquid crystal layer 21 are controlled as reflection type hologram patterns, so a liquid crystal display panel with high contrast and a wide angle of visibility can be realized by the high backward scattering property.

To make pixels which select and reflect light in three wavelength bands on the same display panel, the following process is carried out.

With a mask, a hologram pattern which reflects light in a first wavelength band is made by laser light having a wavelength of 458 nm. Then, the mask is shifted one pitch, and a hologram pattern which reflects light in a second wavelength band is made by laser light having a wavelength of 514 nm. Finally, the mask is shifted further one pitch, and a hologram pattern which reflects light in a third wavelength band is made by laser light having a wavelength of 648 nm.

Each pattern is aligned with the position of a transparent electrode constituting a pixel, and R, G, and B pixels are arranged in mosaic form, as shown in FIG. 34. The PD liquid crystal layer 21, constituted in this manner, looks to be a white scattering surface to look at it. However, if voltage is applied to each pixel and the transmittance is changed, three colors, red, green, and blue will be observed, whereby a color image can be constituted.

Furthermore, in addition to the fabrication method using photo polymerization by laser light, described in the aforementioned embodiment, the light modulating layer 21 of the display panel of the present invention can be fabricated with various methods. It can be fabricated even by employing photosensitive resin, performing a developing process to make an interference fringe consisting of a resin layer and an air layer in the resin, and filling the interference fringe with a liquid crystal.

The example of an optical switch made by the latter method has been reported by Lawrence Domash ("Active Holographic Interconnects for Interfacing Volume Storage," SPIE Vol. 1662, p 211 (1992)). This is also the PD liquid crystal layer.

The monomer suitable for making the light modulating layer 21 having an interference effect by the aforementioned photo polymerization method can employ a liquid or low-melting-point unsaturated ethylene monomer, particularly acrylic or methacrylic esters. These may be, for example, multifunctional monomers such as trimethylolpropane triacrylates, or oligomers such as polyethylenegylcol diacrylates and urethane acrylates. These may be employed independently of each other or a combination of them can be employed. Furthermore, as occasion demands, other monomers, for example, styrene and carbazole may be employed together with the aforementioned.

The present invention is not limited to these monomers and oligomers. This invention can appropriately select and employ various monomers and oligomers known to those skilled in the art, such as monomers and oligomers usually employed for fabricating a polymer dispersion type liquid crystal or a photo polymerized compound for making a volume hologram such as that proposed in Japanese Patent Laid-Open No. 2-3082.

To perform photo polymerization by coherent light, a sensitizing color corresponding to the wavelength and an appropriate photo polymerization initiator are needed. They can be appropriately selected and employed from cyanide dyes, dyes such as cyclopentanes, diphenyl iodonium salt, a combination of the diphenyl iodonium salt and dyes, various quinones, and various combinations such as a combination of a triphenylimidazole dimer and hydrogen donors.

Figure 30:
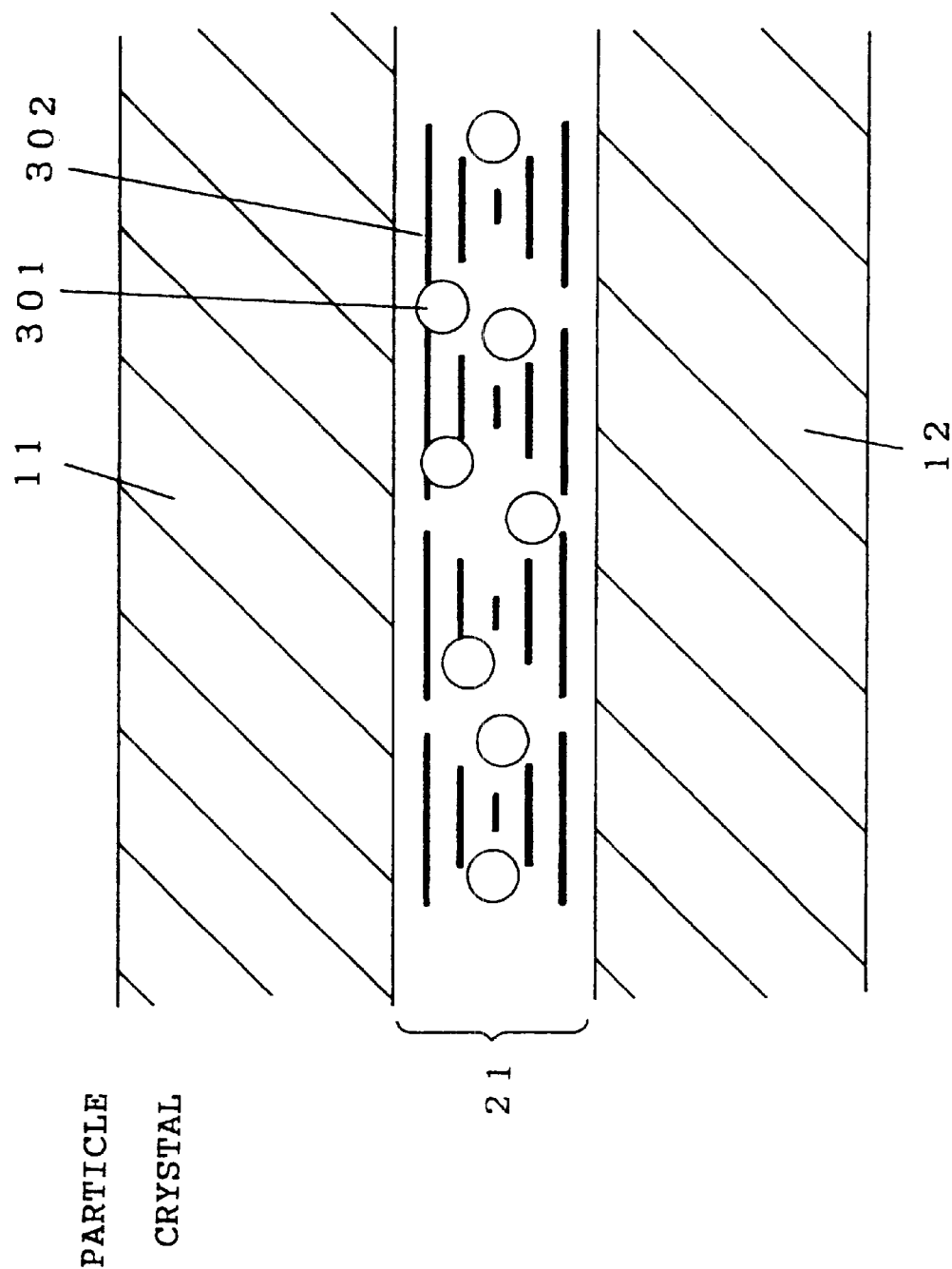
FIG. 30 is an explanatory diagram of the structure of the polymer dispersion liquid crystal display panel.

In addition, as shown in FIG. 30, the PD liquid crystal layer includes one in which resin particles 301 float or are arranged in liquid crystals 302 of a liquid crystal layer 21. The liquid crystals 302 of the liquid crystal layer 21 have been given an orienting process. Instead of the resin particles 301, glass particles and fiber ceramic particles may be employed.

In the resin particles 301 shown in FIG. 30, the resin particles 301 may be connected together by a polymer. If they are connected, the hysteresis will be reduced and the characteristics will be enhanced. The resin particle 301 is not necessarily in the form of a particle. For example, it may be in the form of a polygon, a disc, or a thin film. The resin particles may be arranged in a random state.

Also, it is preferable that the liquid crystal 302 be given an orienting process. The orientation is preferable to be between 150° and 200°. Particularly, the orientation is preferable to be near 180°. If the orienting process is performed, the angle of visibility will be enlarged. The resin particle 301 and the liquid crystal 302 may contain guest-host material. Furthermore, they may contain dyes and colors.

The display panel with the liquid crystal layer 21 shown in FIGS. 29 and 30 is also a polymer dispersion liquid crystal panel (PD liquid crystal panel). The PD liquid crystal panel means all panels in which the light modulating layer 21 has a resin component and a liquid crystal component regardless of whether or not a scattering state caused by light modulation changes, regardless of the use of a polarizing plate, regardless of the orientation of liquid crystal molecules, and regardless of the amount of liquid crystal. The resin component may be replaced with ceramic material. This is also included in the PD liquid crystal.

As shown in FIG. 31, the reason that ultraviolet rays are radiated to phase-separate the mixed solution 315 before forming the color filter 151 is that if ultraviolet rays are evenly radiated on the mixed solution 315 on the display range, the entire surface of the display range will have an even scattering characteristic. The color filter 151 absorbs ultraviolet rays. For this reason, after formation of the color filter 151, the mixed solution 315 cannot be phase-separated. The color filter 151 on which ultraviolet rays were radiated generates heat, and the mixed solution 315 is heated by the generated heat. For this reason, a satisfactory phase separation condition is not obtained. As a countermeasure for solving the aforementioned problems, the color filter 151 is formed after the phase separating process.

The PD liquid crystal is a solid. Therefore, after the separating film 182 is peeled, on that the counter electrode 25 can be easily formed. This method cannot be performed on a TN liquid crystal. This is because the TN liquid crystal is a solid. The technique for depositing ITO which becomes the counter electrode 25 onto a resin substrate in a range of normal temperature to 100° C. is well known in the prior art. Since the surface of the PD liquid crystal layer is of resin, ITO can be easily formed on the PD liquid crystal layer 25. However, when peeling off the separating film 182, a portion of the waterdrop-like liquid crystal groove is destroyed. For this reason, after the separating film 182 has been peeled, the substrate 12 is washed and dried. Then, an insulating film 154 is formed on the PD liquid crystal 21 as a protective film. After the process, the counter electrode 25 is formed.

Forming the color filter 151 onto the ITO does not become a problem. For example, it can be easily formed by coating red, green, and blue gelatins. If screen printing is performed, the irregularities on the surface of the color filter 151 can be easily formed by the meshes of the printing screen.

There is another method of radiating ultraviolet rays through the array substrate 12. Of course, since the color filter 151 is not formed on the side of the array substrate 12, ultraviolet rays can be radiated on the mixed solution 315 without being absorbed considerably.

However, in that case, ultraviolet rays are absorbed by the TFT 155 and the signal line 15. The signal line 15 absorbing ultraviolet rays is heated and also heats the peripheral mixed solution 315. It is also important to control temperature during phase separation to perform satisfactory phase separation (satisfactory scattering characteristic).

If the signal line is heated, the mixed solution 315 near the signal line will also be heated. For this reason the average diameter near the signal line becomes large. If the average diameter becomes large, the scattering characteristic will become worse. Therefore, light escapes from the peripheral portion of the signal line, resulting in a reduction in the display contrast.

Figure 20:
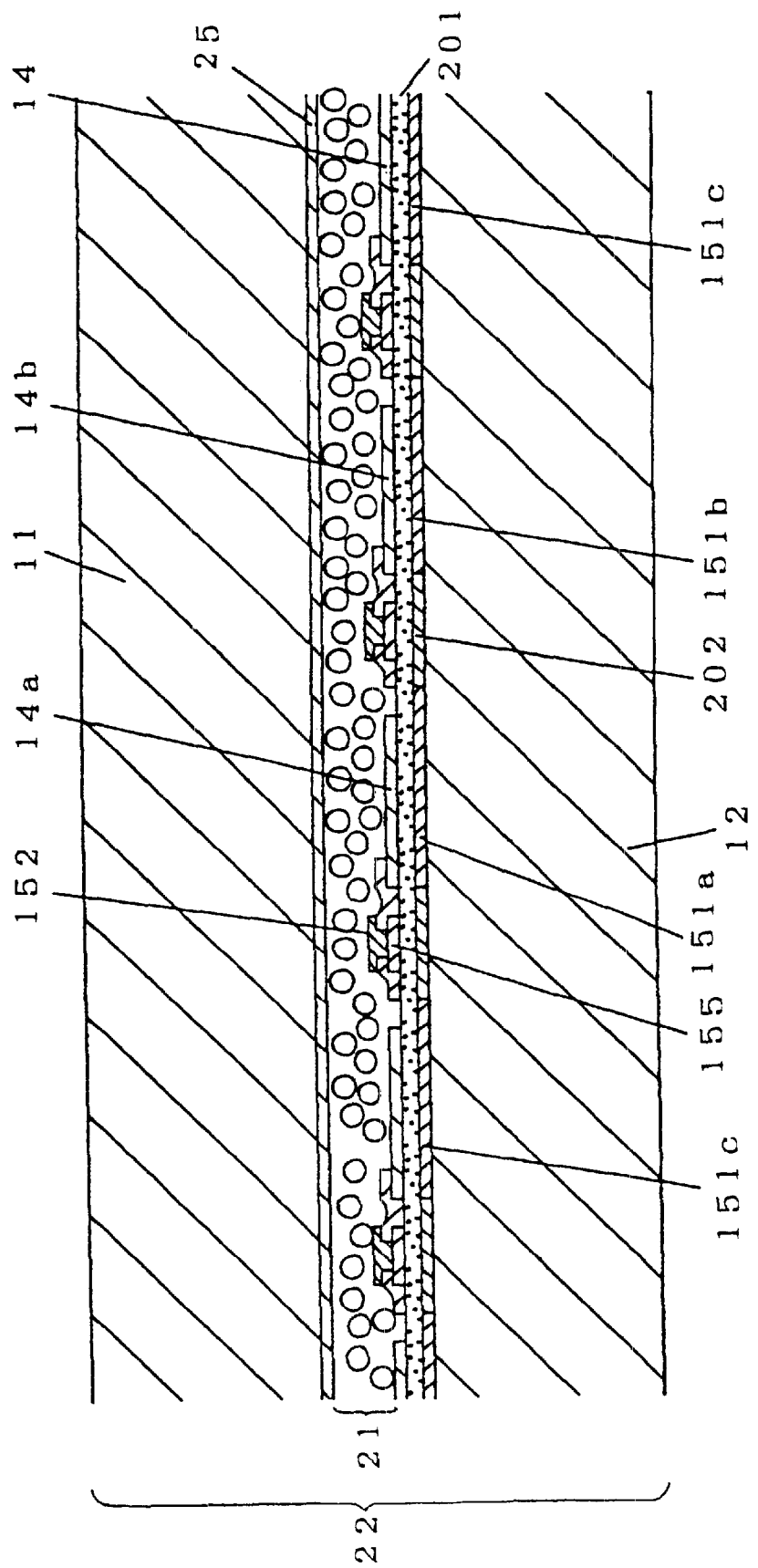
FIG. 20 is a sectional view of the display panel of the present invention forming a color filter and a light shielding film under the pixel electrode.

In FIG. 15, while the color filter 151 is formed on the side of the counter electrode 25, forming the color filter 151 between the array substrate 12 and the pixel electrode 14 as shown in FIG. 20 is also desirable constitution. It is preferable that the color filter 151 be formed from an interference color filter. The reason for this is that the process of forming the TFT 155 includes a high-temperature process which reaches about 450 to 600° C. Resin color filters, such as acrylic and gelatin filters, will be degraded in the aforementioned high-temperature process.

In the construction of FIG. 20, the dielectric R, G, and B color filters having R, G, and B are formed by stacking and patterning a plurality of dielectric films. Of course, in the case of two color filters, they can be formed by performing a patterning process twice. Thereafter, a light shielding film 202 is formed from Cr. The light shielding film 202 is employed for shutting out light which is incident from the back surface of the TFT 155 on the semiconductor layer. Of course, dielectric R, G, and B color filters may be superimposed and formed.

After formation of the color filter 151, the insulating layer 201 is formed. The film thickness of the insulating layer 201 needs to be 5000 angstroms or more. It is formed by depositing a thin film consisting of $SiO_2$ and SxNx a plurality of times. The reason for this is for preventing pinholes and also removing irregularities on the color filter 151 to make it flat. However, if the film thickness is 1.5 $\mu$m or more, cracks will easily come to occur.

On the aforementioned insulating layer 201 the TFT 155 and the signal line 15 are formed in sequence. Thereafter, the mixed solution 315 is held between the counter substrate 11 and the array substrate 12 and ultraviolet rays are radiated through the side of the counter substrate 11, thereby phase-separating the mixed solution 315.

For the method of holding the mixed solution 315 between the array substrate 12 and the counter substrate 11, a vacuum injection method of causing the space of the substrate to be in a vacuum state, then breaking the vacuum state, and injecting the mixed solution, a method of dropping the mixed solution 315 on the array substrate 12 or counter substrate 11 and pasting both substrates together, a roller coater method of coating the mixed solution 315 with a roller coater, and a spinner method of coating the mixed solution with a spinner are exemplified.

As previously described, if a difference in potential occurs between the pixel electrodes and between the pixel electrode and the TFT 155, an electric force line will be produced and liquid crystal molecules will be oriented along the electric force line. If liquid crystal molecules are oriented along the electric force line, polarization dependency will take place in the oriented portion and therefore light will escape. As the countermeasure, a dielectric film (low dielectric film) is formed between adjacent pixel electrodes 14 by material whose dielectric constant is lower than the liquid crystal component of the liquid crystal layer 21. This low dielectric film 152 is shown in FIG. 21.

For the material of the low dielectric film 152, inorganic material such as $SiO_2$, $SiN_x$, parylene N, and SiOF, the polymer material of the liquid crystal layer 21, a resist to be employed in semiconductor fabrication, PVA, and organic material such as plasma carbon fluoride (P-CF) are exemplified. If the aforementioned low dielectric film 152 is formed into a thin or thick film shape as shown in FIG. 20, electromagnetic coupling can be prevented between the signal line 15 and the pixel electrode 14 and between adjacent pixel electrodes 14. Since the electromagnetic coupling between the signal line 15 and the counter electrode 25 can also be prevented, the liquid crystal layer 21 on the low dielectric film 152 is almost always in a scattering state.

Particularly, plasma carbon fluoride (P-CF) or paliren N film can attain a dielectric constant of 3 or less which is lower than SiOF. SiOF film is suitable film because if it is formed by $SiF_2H_2$ gas, the dielectric constant can be reduced to 3.3. $SiO_2$ film containing hydrocarbons is also suitable film because if it is formed by phenyltrimethoxysilane material, degradation due to hygroscopicity can be prevented and the dielectric constant reduced to 3.1. Rokisan containing HSQ or Si—H coupling can be employed in a coating method.

Figure 21:
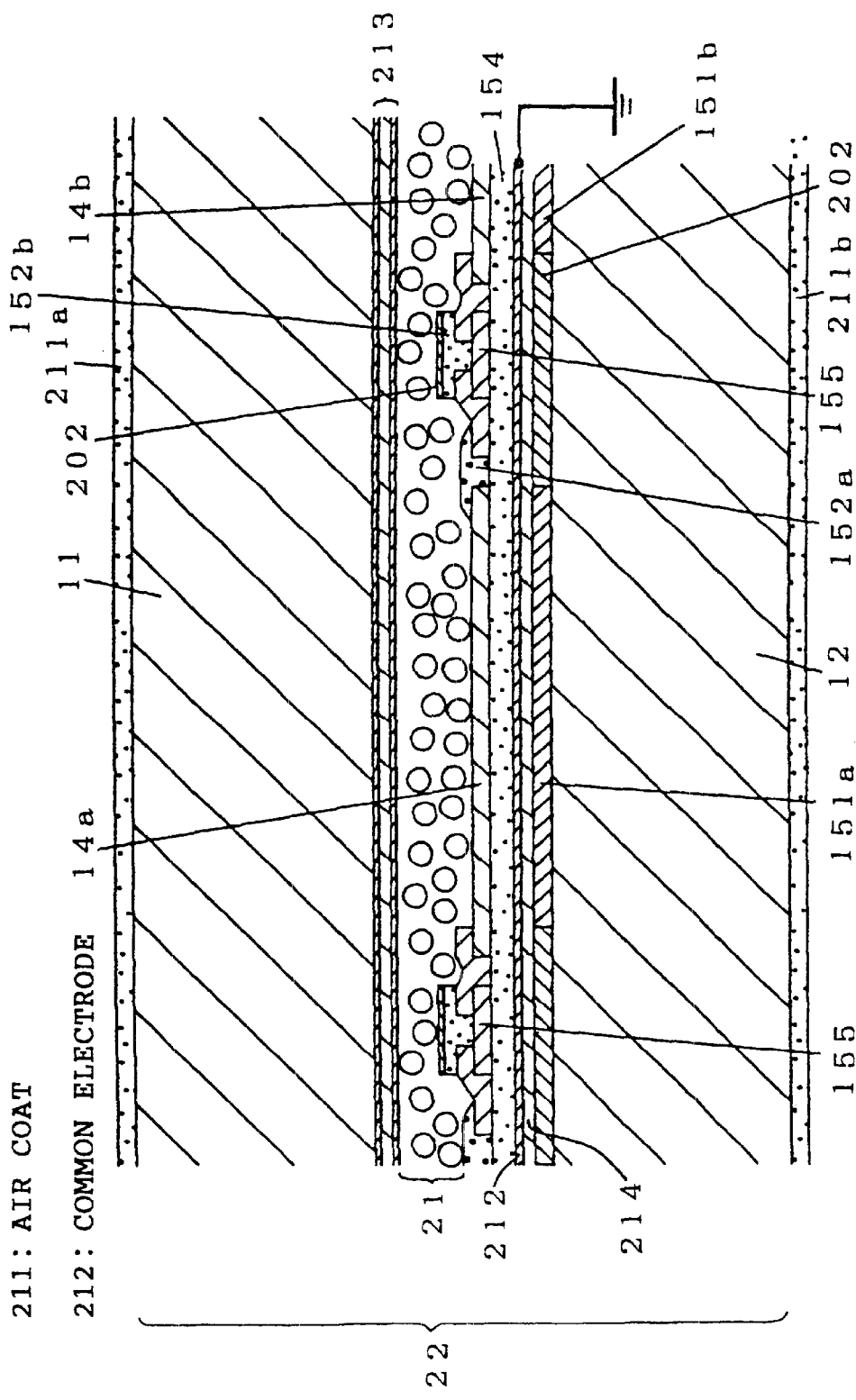
FIG. 21 is a sectional view of the display panel of the present invention forming a common electrode under the pixel electrode.

In FIG. 21, although the low dielectric film is formed into a film shape, the present invention is not limited to this, but it may be formed into a column shape. If the column-shaped dielectric is made the same as the film thickness of the liquid crystal layer 21, beads 161 prescribing the film thickness of the liquid crystal layer can be omitted.

In the case where the low dielectric is formed into a column shape, it is preferable that it be formed on the side of the counter substrate 25. Since there is no need to form the TFT 155, the side of the counter substrate 11 is structurally simple. In addition, since the side of the counter substrate 11 is flat with respect to the substrate surface, the column-shaped low dielectric film 152 can be easily formed.

If the low dielectric film 152 is formed into a column shape, the column can maintain the film thickness of the liquid crystal layer 21 constant. Therefore, there is no need to scatter the beads 161. For this reason the fabrication process of the liquid crystal display panel is simplified. In addition, since obstacles such as the beads 161 on the pixel electrode 14 can be omitted, satisfactory image display can be realized.

The reason that the column-shaped or thick dielectric film 152 can be thus easily formed is that the PD liquid crystal display panel does not need an orienting process such as a rubbing process which is required of the TN liquid crystal display panel. If the low dielectric column 152 is formed in the TN liquid crystal display panel, a rubbing cloth will be caught on the low dielectric column, and the surfaces of the counter substrate 11 and the array substrate 12 cannot be rubbed well.

The low dielectric film 152 may be colored. If it is colored, it can absorb light irregularly reflected within the liquid crystal layer 21 and image quality will be enhanced. Black colors or pigments may be dispersed into resin. Like the color filter 151, gelatin or casein may also be colored with black acid dyes. As an example of the black colors, a fluorine color which becomes black by itself can be caused to emit a color and employed, and a mixed black consisting of a green color and a red color can also be employed.

While the aforementioned materials are all black materials, the present invention is not limited to the black materials when the liquid crystal display panel of the present invention is employed as the light valve of a projection display unit. In the case where material is employed as the low dielectric film 152 of the liquid crystal display panel which modulates R light, it will be sufficient if it can absorb R light. Therefore, natural resin can be dyed with colors, and material with colors dispersed in synthetic resin can be employed. For example, from azoic dyes, anthraquinone dyes, phthalocyanine dyes, and triphenylmethane dyes, one appropriate kind or a combination of two kinds or more can be employed. Particularly, it is preferable that complementary colors be employed. For example, when incident light is blue, resin 152 is colored yellow.

Figure 27:
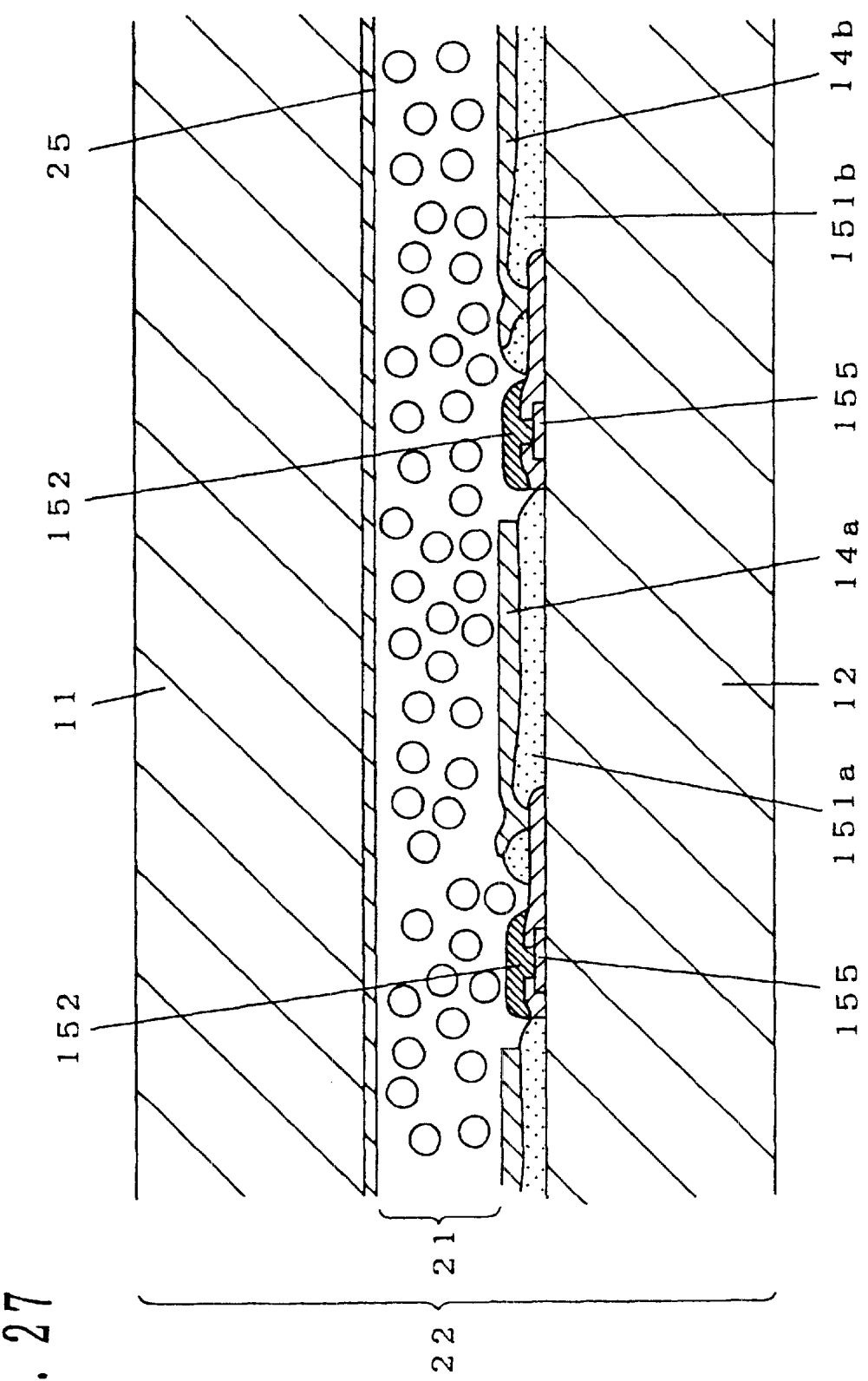
FIG. 27 is a sectional view of the display panel in another embodiment of the present invention.

In FIG. 27 there is shown another construction. The construction shown in FIG. 27 is fabricated by the following process. First, TFTs 155 are formed on a substrate 12. Thereafter, a resin color filter 151 is formed, and it is patterned to make holes. Then, on the color filter 151, ITO which becomes a pixel electrode 14 is deposited. The pixel electrode 14 and the drain terminal of the TFT 155 are connected together through the aforementioned hole.

It is preferable to form a thin $SiO_2$ film (not shown) as an intervening layer to enhance adhesion between the color filter 151 and the pixel electrode 14.

If constructed as described above, the TFT requiring a high-temperature process can be formed before the color filter is formed. Therefore, the color filter 151 can employ an inexpensive resin color filter. The reason is that an etching liquid crystal such as hydrochloric acid, nitric acid, ferrate, or nitride hydracid, which is etched and employed when patterning ITO which becomes the pixel electrode 14 by wet etching, has an adverse effect, such as color fade-out and surface roughness, on a colored resin material constituting the color filter 151. If an intervening layer is formed, this problem will be overcome. In addition to $SiO_2$, the intervening layer may be acrylic photosensitive resin. The photosensitive resin is suitable resin because it also functions as a smoothing layer.

On the surface of the display panel contacting air, an air coat 211 is formed. The air coat serves as an antireflection film. The air coat 211 has three-layer structure or two-layer structure. In the case of three-layer structure, it is employed to prevent reflection in a wide wavelength band of visible light and called a multicoat. In the case of two-layer structure, it is employed to prevent reflection in a specific wavelength band of visible light and called a V coat. The multicoat and the V coat are properly used depending upon the purpose of a liquid crystal display panel. Generally, the V coat is adopted in a projection display unit in which three display panels are employed as light valves. In the case where a liquid crystal display panel is employed as a direct display unit, it is preferable that the multicoat be adopted in a projection display unit in which color display is performed with a single display panel.

In the case of the multicoat, aluminum oxide ($Al_2O_3$) with an optical film thickness of $nd=\lambda/4$, zirconium ($ZrO_2$) with an optical film thickness of $nd_1=\lambda/2$, and magnesium fluoride ($MgF_2$) with an optical film thickness of $nd_1=\lambda/4$ are stacked and formed. Generally, a thin film is formed with $\lambda=520$ nm or a near value. In the case of the V coat, silicon monoxide (SiO) with an optical film thickness of $nd_1=\lambda/4$ and magnesium fluoride ($MgF_2$) with an optical film thickness of $nd_1=\lambda/4$ are stacked and formed, or yttrium oxide ($Y_2O_3$) and magnesium fluoride ($MgF_2$) are stacked and formed with an optical film thickness of $nd_1=\lambda/4$. In the case where blue light is modulated, yttrium oxide ($Y_2O_3$) is preferable to silicon monoxide (SiO), because silicon monoxide has an absorption band on the blue side. From the stability of material, yttrium oxide is also preferable to silicon monoxide. The aforementioned n in $nd_1$ represents the refractive index of each thin film, $d_1$ the physical film thickness of the thin film, and $\lambda$ the designed dominant wavelength.

Figure 22:
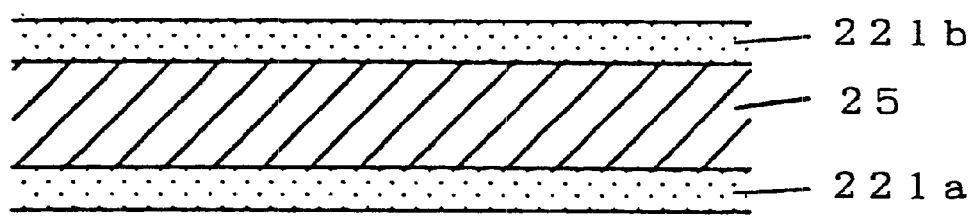
FIG. 22 is an explanatory diagram of the anti-reflection structure in the display panel of FIG. 21.
Figure 22:
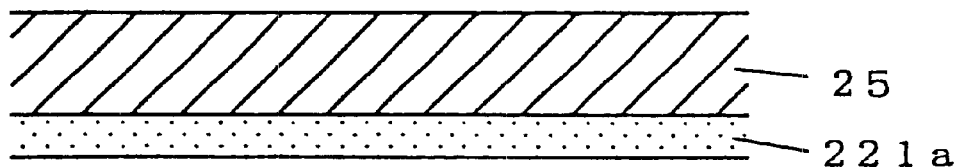
Figure 22:
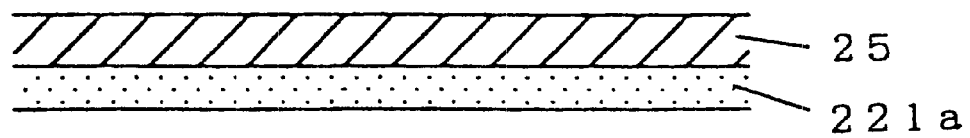

It is preferable that transparent electrodes, such as the counter electrode 25 and pixel electrode 14, be made by three-layer constitution consisting of a first dielectric thin film 221a, an ITO thin film 25, and a second dielectric thin film 221b. The optical film thickness of the ITO thin film 25 as an electrode is $\lambda/2$. The optical film thickness of the first dielectric thin film 221a and the optical film thickness of the second dielectric thin film 221b are $\lambda/4$, respectively. This constitution is shown in FIG. 22(a). In this embodiment, particularly in the case where the counter electrode is formed from ITO, it is described as an ITO thin film.

It is preferable that the refractive index of the first dielectric thin film 221a and the second dielectric thin film 221b be 1.60 or more and 1.80 or less. As an example, the refractive indexes of SiO, $Al_2O_3$, $Y_2O_3$, MgO, $CeF_3$, $WO_3$, and $PbF_2$ are exemplified.

Figure 23:
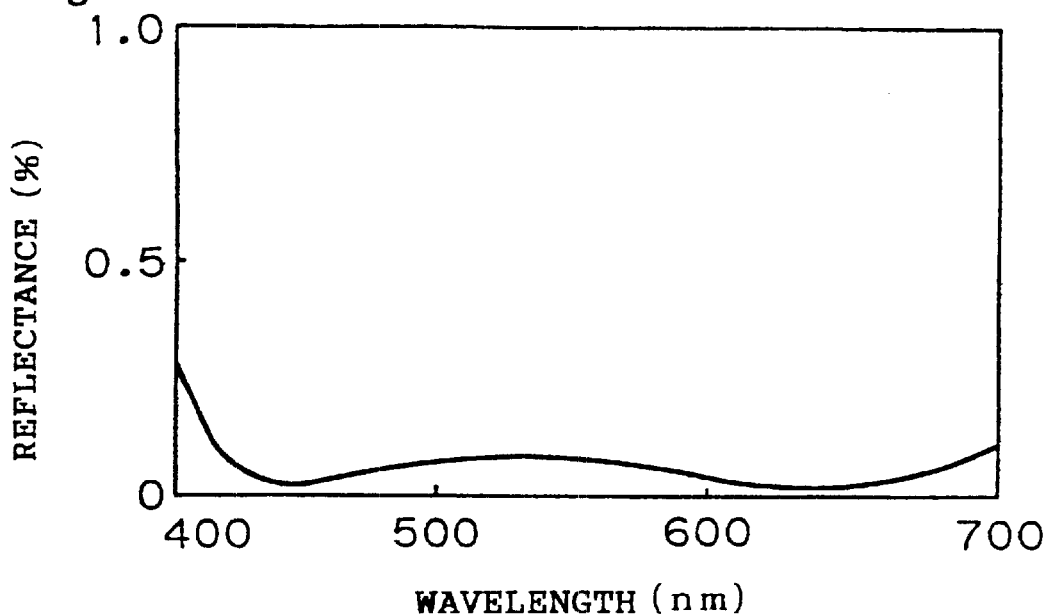
FIG. 23 is a spectral distribution diagram showing the characteristic of the display panel of the present invention.

An embodiment of the specific constitution is shown in Table 2 and the spectral reflectance is shown in FIG. 23. As evident in the figure, the constitution of Table 2 can realize a characteristic of less than reflectance 0.1% over a wavelength band width of 200 nm or more and obtain an extremely high antireflection effect. In Tables of the present invention, while the refractive index of the liquid crystal layer 21 in a scattering state is 1.6, this value will change if the liquid crystal material and the polymer material change. When the refractive index of the liquid crystal layer in a scattering state is $n_x$, the refractive index of the first and second dielectric thin films $n_1$, and the refractive index of the ITO thin film $n_2$, a condition of $n_x<n_1<n_2$ needs to be satisfied.

TABLE 2

Dominant wavelength $\lambda$ = 520 nm

| Material | Refractive index | Optical film thickness (nm) | Physical film thickness (nm) |
| --- | --- | --- | --- |
| Glass substrate | 1.52 | — | — |
| SiO | 1.70 | 130.0 | 76.5 |
| ITO | 2.00 | 260.0 | 130.0 |
| SiO | 1.70 | 130.0 | 76.5 |
| Liquid crystal | 1.60 | — | — |

It is preferable that the refractive index of the first dielectric thin film 221a and the second dielectric thin film 221b be 1.60 or more and 1.80 or less. In the embodiment of Table 2, although both films 221a and 221b employ SiO, either film or both films may employ any of $Al_2O_3$, $Y_2O_3$, MgO, $CeF_3$, $WO_3$, and $PbF_2$.

Figure 24:
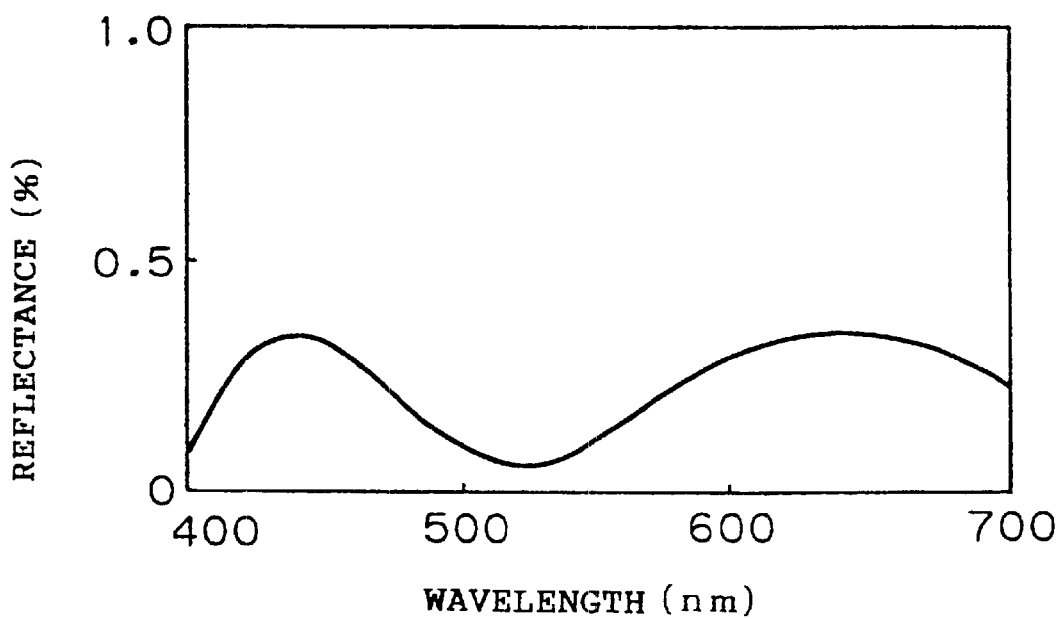
FIG. 24 is a spectral distribution diagram showing the characteristic of the display panel of the present invention.

Table 3 shows the case where the first dielectric thin film 221a and the second dielectric thin film 221b are formed from $Y_2O_3$. The spectral reflectance is shown in FIG. 24.

TABLE 3

Dominant wavelength $\lambda$ = 520 nm

| Material | Refractive index | Optical film thickness (nm) | Physical film thickness (nm) |
| --- | --- | --- | --- |
| Glass substrate | 1.52 | — | — |
| $Y_2O_3$ | 1.78 | 130.0 | 73.0 |
| ITO | 2.00 | 260.0 | 130.0 |
| $Y_2O_3$ | 1.78 | 130.0 | 73.0 |
| Liquid crystal | 1.60 | — | — |

The spectral reflectance of FIG. 24 has the tendency that it becomes slightly high in the areas of B light and R light, as compared with the case of FIG. 23.

Figure 25:
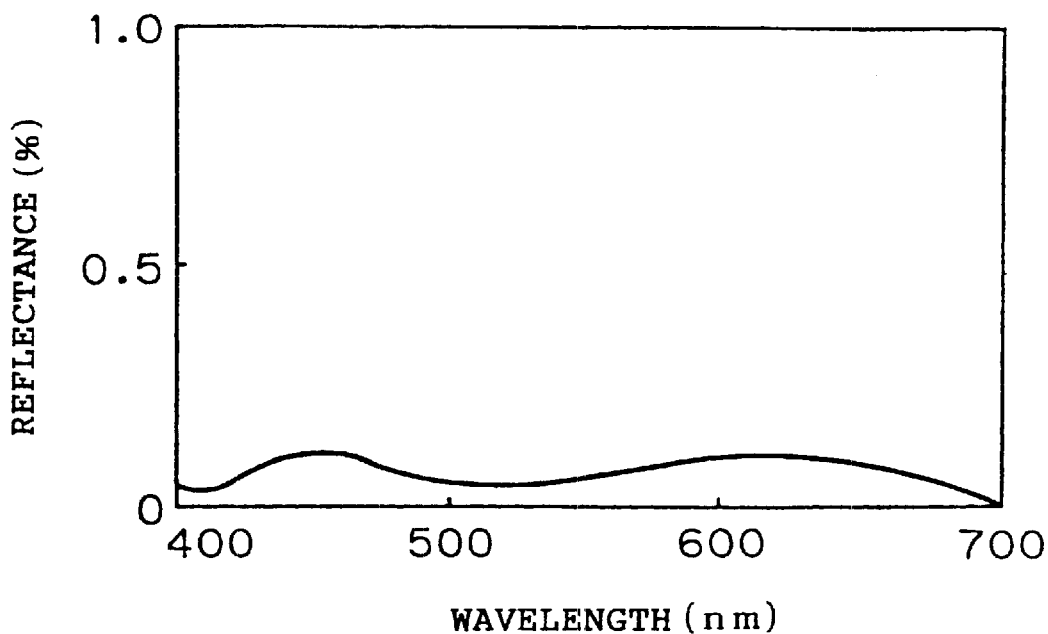
FIG. 25 is a spectral distribution diagram showing the characteristic of the display panel of the present invention.

Similarly, Table 4 shows the case where the first dielectric thin film 221a is formed from SiO and the second dielectric thin film 221b is formed from $Y_2O_3$. The spectral reflectance is shown in FIG. 25. The constitution of Table 4 realizes an extremely high antireflection effect of less than 0.1% over the entire area of visible light.

TABLE 4

Dominant wavelength $\lambda$ = 520 nm

| Material | Refractive index | Optical film thickness (nm) | Physical film thickness (nm) |
| --- | --- | --- | --- |
| Glass substrate | 1.52 | — | — |
| SiO | 1.70 | 130.0 | 76.5 |
| ITO | 2.00 | 260.0 | 130.0 |
| $Y_2O_3$ | 1.78 | 130.0 | 73.0 |
| Liquid crystal | 1.60 | — | — |

Figure 26:
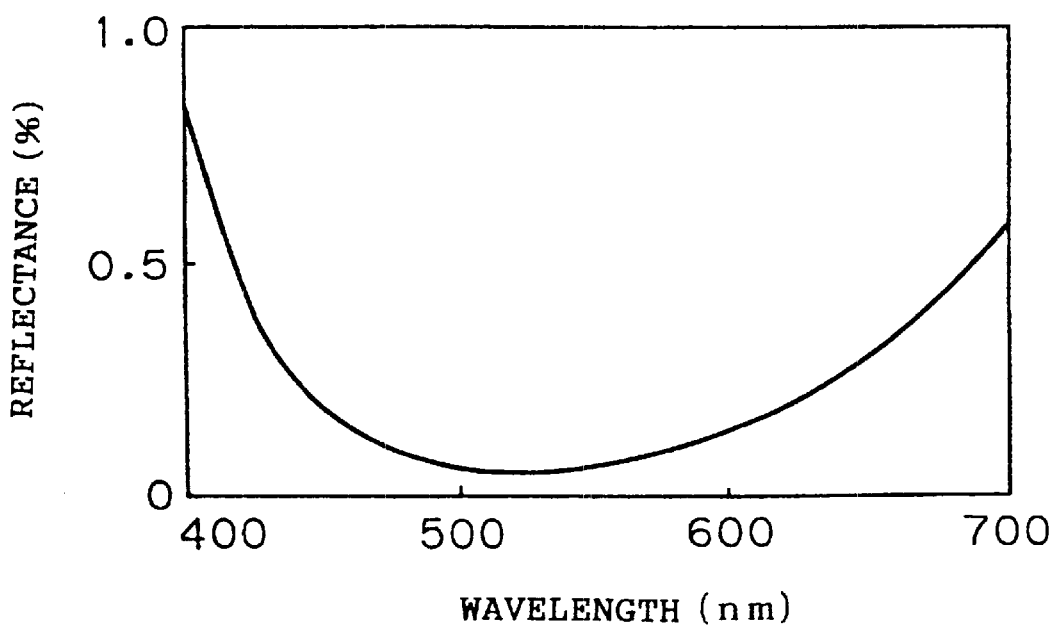
FIG. 26 is a spectral distribution diagram showing the characteristic of the display panel of the present invention.

Table 5 shows the case where the first dielectric thin film 221a is formed from $Al_2O_3$ and the second dielectric thin film 221b is formed from SiO. The spectral =reflectance is shown in FIG. 26. The reflectance exceeds 0.5% in the areas of R light and B light, so it cannot be said that the constitution of Table 5 is a suitable one.

TABLE 5

Dominant wavelength $\lambda$ = 520 nm

| Material | Refractive index | Optical film thickness (nm) | Physical film thickness (nm) |
| --- | --- | --- | --- |
| Glass substrate | 1.52 | — | — |
| $Al_2O_3$ | 1.62 | 130.0 | 80.3 |
| ITO | 2.00 | 260.0 | 130.0 |
| SiO | 1.70 | 130.0 | 76.5 |
| Liquid crystal | 1.60 | | |

As previously described, if the dielectric thin films 221a and 221b are formed on both sides of the ITO thin film 25 to make three-layer constitution, this constitution can have an antireflection effect. Note that the spectral reflectance shown in FIGS. 23 through 26 will change if the refractive index of the liquid crystal layer 21 changes In other words, the reflectance depends upon liquid crystal material, so optimization design is important.

If the liquid crystal layer 21 is in direct contact with the ITO thin film 25 serving as an electrode, the degradation in the liquid crystal layer 21 will be easily accelerated. It is believed that the reason is that impurities in the ITO thin film 25 flow into the liquid crystal layer 21. As in the aforementioned three-layer constitution, if the dielectric thin film 221 is formed between the ITO thin film 25 and the liquid crystal layer 21, there will be no possibility that the liquid crystal layer 21 will be degraded. This is effective particularly when the dielectric thin film 221 is formed from $Al_2O_3$ or $Y_2O_3$.

When the dielectric thin film 221 is formed from silicon monoxide (SiO), there is the tendency that the refractive index of SiO is reduced. It is believed that the reason is that oxygen atom such as a small quantity of $H_2O$ and $O_2$ in the liquid crystal 21 reacts with SiO and therefore SiO changes to $SiO_2$. In that sense, the constitutions of Tables 2 and 5 are unsuitable constitutions. However, there is no possibility that SiO will change to $SiO_2$ in a short time, and in practice, the constitutions can be adopted in many cases.

In the previous embodiment, although the optical film thickness of the first and second dielectric thin films 221 is $\lambda/4$ and the optical film thickness of the pixel electrode and the ITO thin film (counter electrode) 25 is $\lambda/2$, the optical film thickness of the first and second dielectric thin films 221 may be $\lambda/4$ and the optical film thickness of the ITO thin film 25 may be $\lambda/4$.

Furthermore, according to the theory of the antireflection film, when N is an odd number ($\geq 1$) and M an integer ($\geq 1$), the optical film thickness of the first and second dielectric thin films 221 may be $(N*\lambda)/4$ and the optical film thickness of the ITO thin film 25 $(N*\lambda)/4$, or the optical film thickness of the first and second dielectric thin films 221 may be $(N*\lambda)/4$ and the optical film thickness of the ITO thin film 25 $(M*\lambda)/2$.

Furthermore, as shown in FIG. 22(b), either the first dielectric thin film 221a or the second dielectric thin film 221b can be omitted. In that case, the antireflection effect is slightly reduced, but, in practice, the constitution is sufficient in many cases. Moreover, as shown in FIG. 22(c), the film thickness of the electrode 25 and the dielectric thin film 42 may be $\lambda/4$. Even in this case, the aforementioned theory of the antireflection film can be applied. As described above, if the electrode is formed into a layer structure, light reflection can be prevented at each electrode and therefore display contrast can be considerably enhanced.

Figure 73:
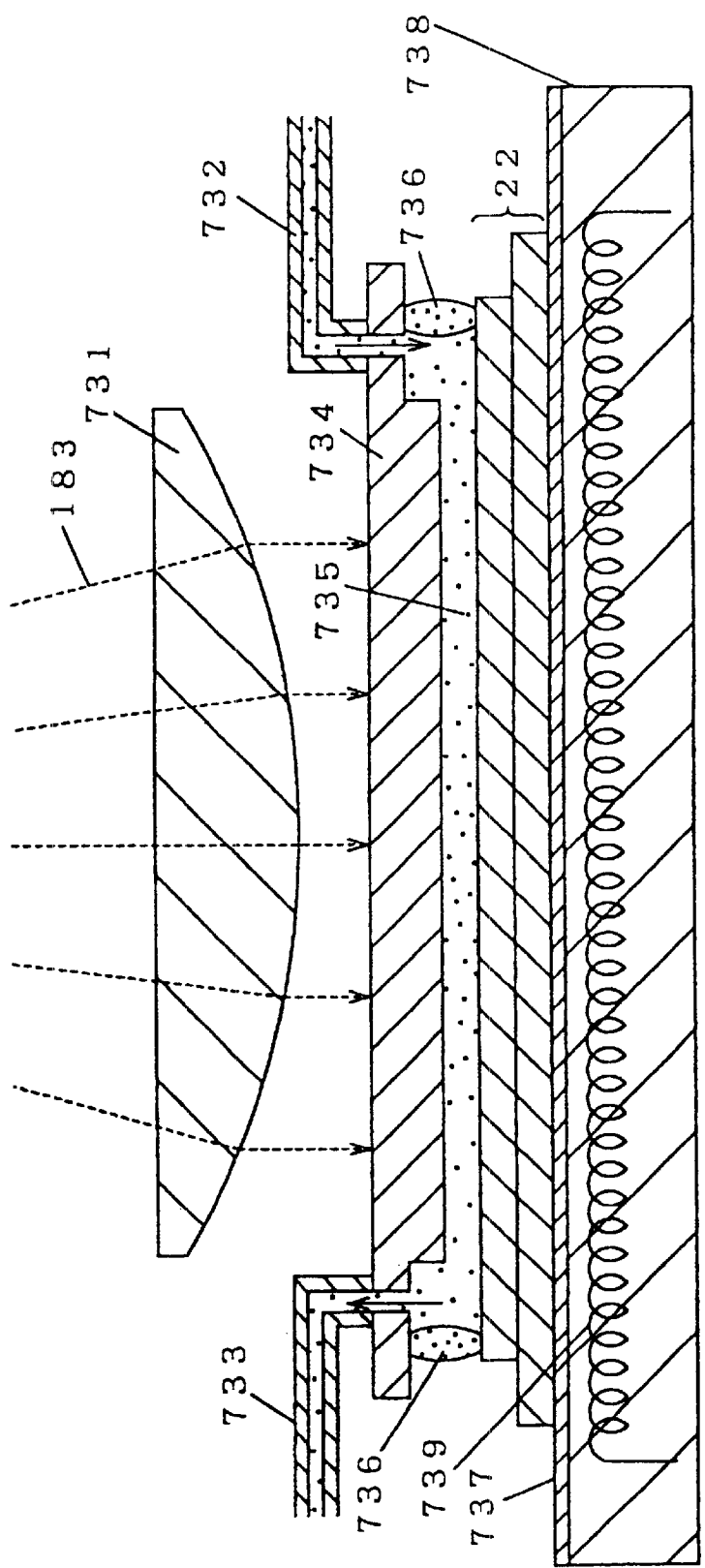
FIG. 73 is an explanatory diagram of the fabrication method of the liquid crystal display panel of the present invention.

Now, a description will be made of the fabrication unit of the display panel of the present invention. FIG. 73 is an explanatory diagram of the fabrication unit of the display panel of the present invention.

A heater 739 is arranged within a mounting base 738. The heater 739 is employed to heat the mixed solution 315 to proper temperature. The surface of the mounting base 738 is smoothed, and a reflecting plate 737 is attached to the smoothed surface. The reflecting plate 737 may be formed directly on the mounting base 738 by employing a technique of depositing metal material such as aluminum (Al). It may also be a stainless plate.

A display panel 22 holding the mixed solution 315 is placed on the mounting base 738. The exterior circumference of the display area of the display panel 22 is surrounded by seal rubber 736. Between a diffusing plate 734 and the mounting base 738 a pressure of about 1 kg/cm² is applied, thereby making the film thickness of the mixed solution 315 even.

For the seal rubber 736, butyl rubber and silicon rubber are exemplified. In addition, the seal rubber 736 may be any material if it has flexibility. For example, it may be silicon resin, a buffer such as styrene foam, a mechanical spring, and phenol resin.

The diffusing plate 734 may be, for example, opal glass. As this opal glass, there is DF0-150S-1 manufactured by SIGMA KOHKI. The opal glass is one in which a milky glass layer containing a light diffusing substance (calcium fluoride) is pasted on the surface of a transparent glass layer. In addition, the opal glass can employ one in which Ti powder is contained in acrylic or polycarbonate resin. A diffusing plate consisting of resin, however, has the disadvantage that it easily absorbs ultraviolet rays which are employed when phase-separating the mixed solution 315.

A supply tube 732 supplies liquid or water close to the refractive index of the substrate of the display panel 22. For example, it supplies gel such as silicon and ethylene glycol, and liquid (called cobinding liquid) such as water, ethyl alcohol, and methyl salicylate. On the other hand, an exhaust tube 733 has a function of exhausting air present in the space between the diffusing plate 734 and the display panel 22 so that gel and liquid are smoothly supplied into the space. The fluid and gel, supplied from the supply tube, function as a Optical coupling layer which reduces or eliminates a difference in refractive index between the diffusing plate 734 and the display panel 22. Note that ultraviolet rays are radiated through the diffusing plate 734.

Figure 75:
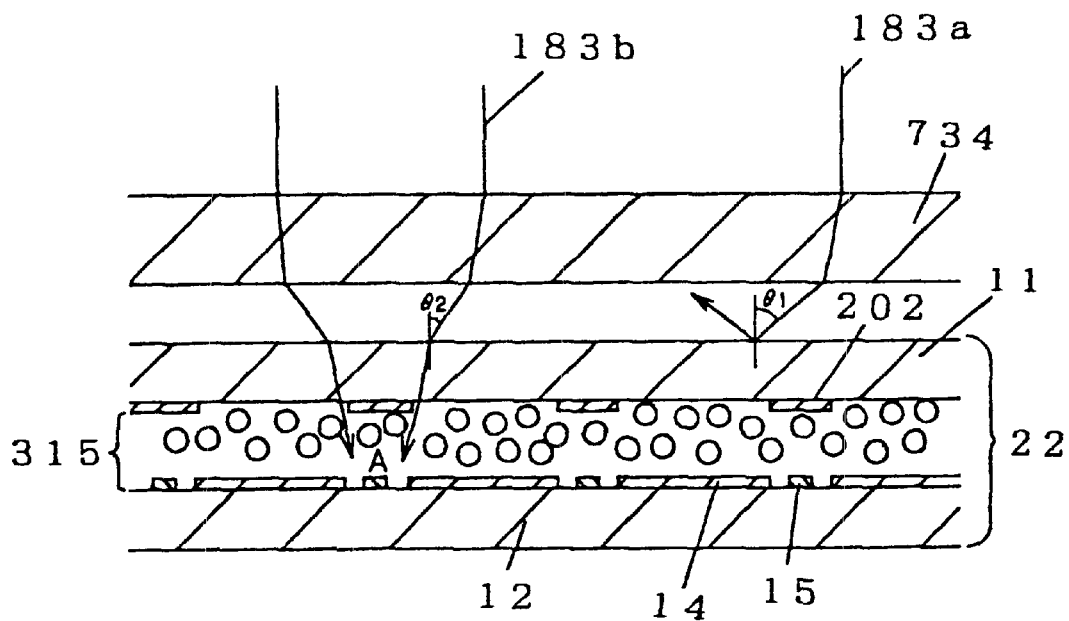
FIG. 75 is an explanatory diagram of the fabrication method of the liquid crystal display panel of the present invention.
Figure 75:
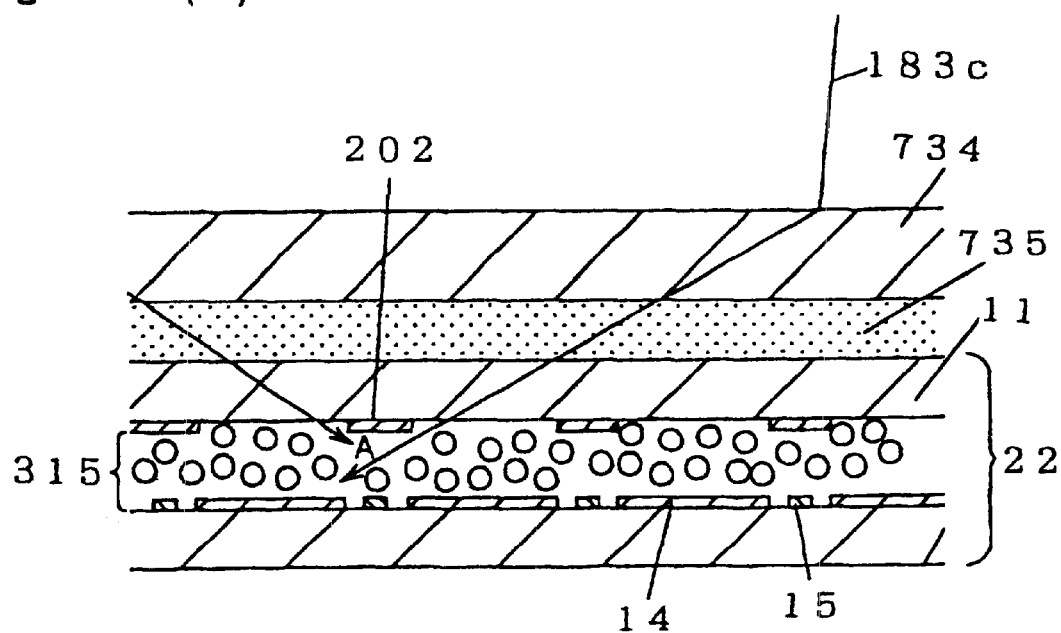

The reason why the diffusing plate 734 and the display panel 22 are bound together through Optical coupling liquid 735 such as gel is as follows: FIG. 75 is an explanatory diagram of the reason. FIG. 75(a) is the case where the Optical coupling liquid 735 is not employed. The ultraviolet rays 183 incident on the diffusing plate 734 are scattered. The scattered rays emerge toward the display panel 22. If the incident angle $\theta_1$ to the display panel 22 is greater than a critical angle, the merging ray will be totally reflected according to Snell's law (ultraviolet ray 183a). Therefore, unless the incident angle of the ultraviolet ray 183 to the display panel 22 is less than a critical angle, the ultraviolet ray will be reflected and make no contribution to phase separation of the mixed solution 315.

On the other hand, as shown in FIG. 75, on the incident surface of the display panel 22 a light shielding film, such as a light shielding film (BM) 202, is often formed. If the incident angle of the ultraviolet ray to the display panel 22 is small, almost no ultraviolet ray will be incident on the A portion present under the light shielding film 202 (ultraviolet ray 202b). If unpolymerized resin remains on the liquid crystal layer 21, reliability in the display panel will be reduced. It is believed that the reason is that resin will be gradually set by the subsequent use of the display panel. In addition, separation between the counter substrate 11 and the liquid crystal layer 21 will be easily caused. It is believed that the reason is that the liquid crystal layer 21 and the counter substrate 11 are sufficiently pasted together by the resin component due to much amount of unpolymerised resin component.

As shown in FIG. 75(b), if the Optical coupling liquid 735 is present, the light diffusing plate 734 and the counter substrate 11 can be regarded as a single substrate. For this reason, as shown by the ultraviolet ray 183c, the critical angle becomes small and the ultraviolet ray can go into the mixed solution 315 at a great angle. Therefore, even if the light shielding film 202 is formed, ultraviolet rays will be incident on the A portion and resin can be polymerized (phase-separated). Note that ultraviolet rays 183 are effectively collected by a lens 731.

In the fabrication unit shown in FIG. 73, the display panel 22 is mounted on the mounting base 738. Also, the display panel 22 is held by the heater 739 at temperature at which a satisfactory phase separation condition is obtained. On the other hand, the space between the display panel 22 and the diffusing plate 734 is filled with the Optical coupling liquid 735. Thereafter, the diffusing plate 734 is pressed from above with a pressure of 0.8 to 1.6 kg/cm², thereby making the film thickness of the mixed solution 315 even. Note that the refractive index of the Optical coupling liquid 735 is 1.35 or more and 1.65 or less. It is preferable that the difference in refractive index between the Optical coupling liquid 735 and the counter substrate 11 be within 0.05. If the refractive index of the counter substrate 11 is 1.53, the refractive index of the Optical coupling liquid 735 is 1.48 or more and 1.58 or less. Ethylene glycol has a nearly proper refractive index, but it has many problems. For example, it needs to be washed later. An alcohol is slightly low in refractive index, but, since it naturally volatizes and evaporates, it is suitable material. Pure water is the desirable material for the Optical coupling liquid 735. The reason for this is that it is inexpensive and only drying is required after ultraviolet rays have been radiated on the display panel 22.

If the supply tube 732 is closed and then air or Optical coupling liquid 735 between the diffusing plate 734 and the display panel 22 is exhausted from the exhaust tube 733, even pressure will be applied to the surface of the display panel 22. If this force for exhaust is set to an appropriate value, a pressure of about 0.8 to 1.6 kg/cm² can be given.

Thereafter, ultraviolet rays 183 are radiated through the lens 731. The lens 731 is a collective lens. The lens 731 also cuts ultraviolet rays having a wavelength of 350 nm or less and cuts infrared rays. The remaining rays are radiated on the display panel 22.

Although ultraviolet rays are diffused (scattered) by the diffusing plate 734, the Optical coupling liquid 735 may contain calcium fluoride powder and titan (Ti) powder to diffuse ultraviolet rays. In this case, the diffusing plate 734 can employ a normal transparent substrate.

If the phase separation of the mixed solution 315 is completed, the supply of the Optical coupling liquid 735 will be stopped and the Optical coupling liquid 735 will be exhausted. In addition, air is fed into the space between the diffusing plate 734 and the display panel 22. Thereafter, the diffusing plate 734 is removed and the display panel 22 is taken out.

Figure 74:
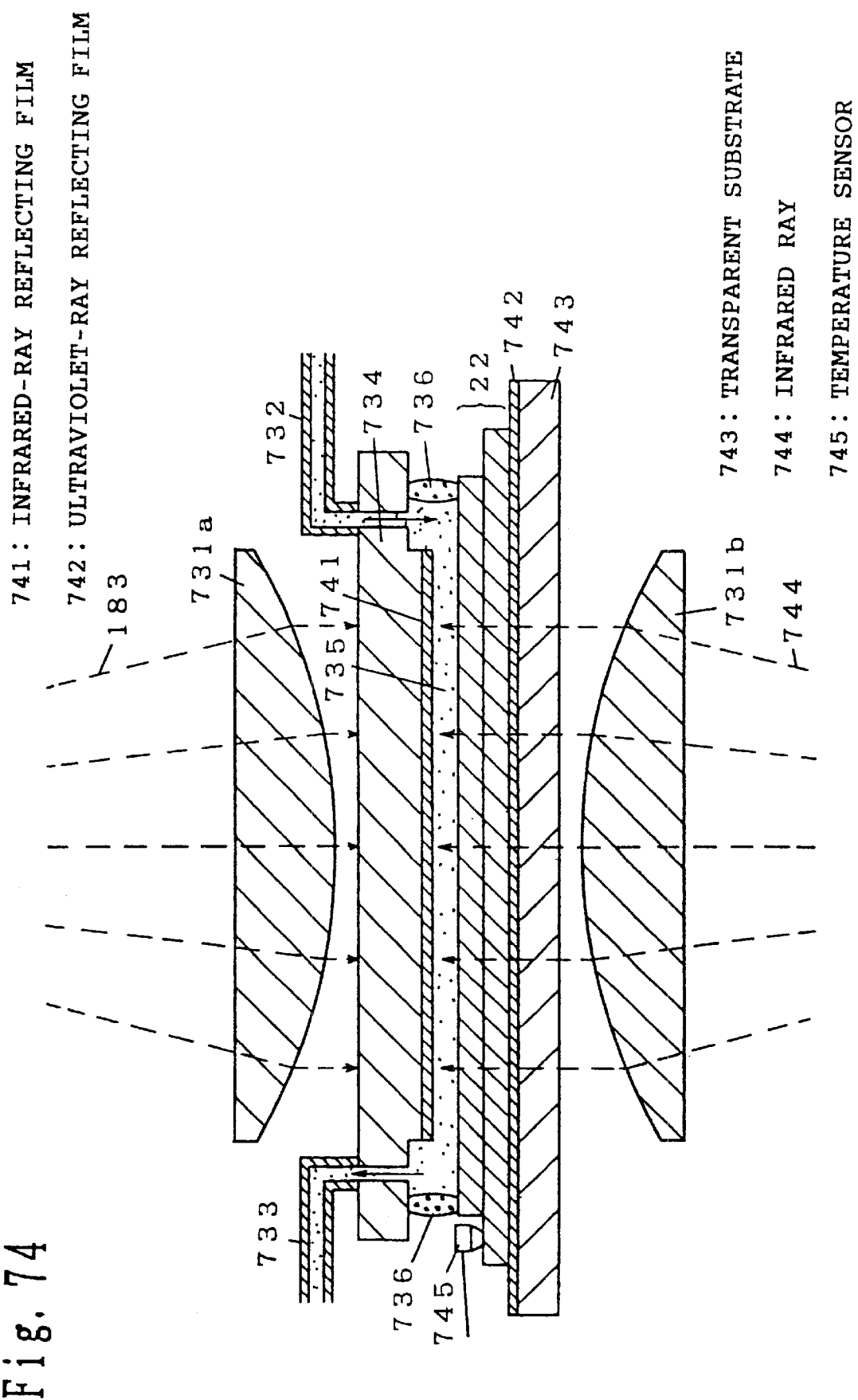
FIG. 74 is an explanatory diagram of the fabrication method of the liquid crystal display panel of the present invention.

FIG. 74 illustrates a method which heats the display panel 22 to a required temperature by infrared rays instead of the heater 739. On the exit side of the diffusing plate 734 an infrared ray reflecting plate or film 741 is arranged or formed.

The aforementioned infrared ray reflecting film 741 is expressed by a general equation M(1)xM(2)yInzO(x+3y/2+3z/2)−d. In the equation, M(1) represents at least either one element or the other of magnesium and zinc. M(2) represents at least either one element or the other of aluminum and gallium. The ratio of x:y is in a range of 0.2 to 1.8:1. The ratio of z:y is in a range of 0.4 to 1.4:1. The oxygen amount of loss d is in a range of $3\times10^{-5}$ to $1\times10-1$ times (x+3y/2+3z/2). Among M(1), M(2) and indium, a portion of at least one kind of element is replaced with another element. For example, the element with which M(1) is replaced consists of an oxide whose valence is trivalence or more, and the elements with which M(2) and indium are replaced consist of an oxide whose valence is trivalence or more. Also, the infrared ray reflecting film 741 may be one which is formed with an interference film consisting of a dielectric multilayer film. On the other hand, on the back surface of the display panel 22 an ultraviolet ray reflecting plate or film 742 is arranged or formed. As an example, there is an interference film consisting of a dielectric multilayer film. However, there is a need to stack and form dielectric thin films consisting of hafnium dioxide ($HfO_2$) and silicon dioxide ($SiO_2$) in order to reduce absorption of ultraviolet rays.

Infrared rays 744 are generated by an infrared lamp and heat the display panel 22. The infrared rays, transmitted through the display panel 22, are reflected by the infrared ray reflecting film 741 and are again incident on the display panel 22, thereby heating the display panel 22. The temperature of the display panel is detected by a temperature sensor 745 attached to one end of the display panel 22. Also, the Optical coupling liquid 735 to be supplied is heated to a proper value and supplied.

As previously described, the display panel 22 is warmed to a required value by infrared rays. Thereafter, the ultraviolet rays 183 are incident on the display panel 22 through the diffusing plate 734. Since the ultraviolet ray reflecting film 742 is arranged on the back surface side of the display panel 22, the ultraviolet rays 183 transmitted through the display panel 22 are again reflected by the aforementioned ultraviolet ray reflecting film 742 and phase-separate the mixed solution 315. The rest constitution is the same as FIG. 73 and therefore a description thereof is omitted.

Figure 76:
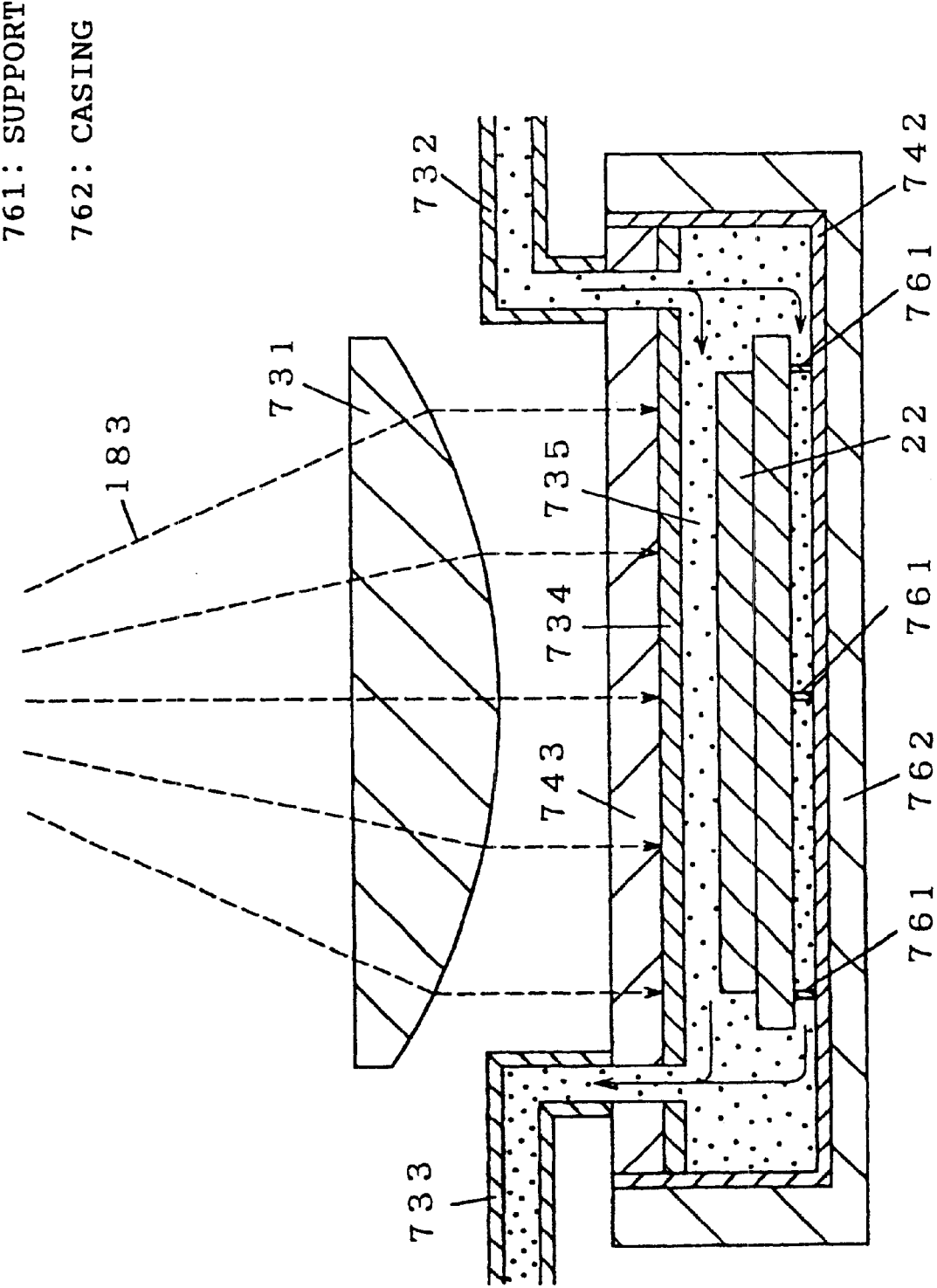
FIG. 76 is an explanatory diagram of the fabrication method of the liquid crystal display panel of the present invention.

In the fabrication unit of the display panel of the present invention shown in FIG. 76, a casing 762 is filled with Optical coupling liquid 735, and a display panel 22 holding the mixed solution 315 is arranged within the Optical coupling liquid 735. The display panel 22 is heated to a required temperature by heating and supplying the Optical coupling liquid 735.

The display panel 22 is held by support members 761 within the casing 762 so that the Optical coupling liquid 735 can pass along the back side of the display panel 22. On the interior surface of the casing 762 a reflecting plate 742 or a diffusing plate is arranged or formed.

At the time the display panel 22 has reached a predetermined temperature, the diffusing plate 743 is depressed, whereby the film thickness of the mixed solution 315 held between the support members 761 and the diffusing plate 743 is made even. The depression of the diffusing plate 743 can be realized by properly controlling the supply quantity of the Optical coupling liquid 315 from the supply tube 732 and the exhaust quantity of the Optical coupling liquid 315 from the exhaust tube 733. If the exhaust quantity of the Optical coupling liquid 315 is greater than the supply quantity, pressure can be increased.

Figure 35:
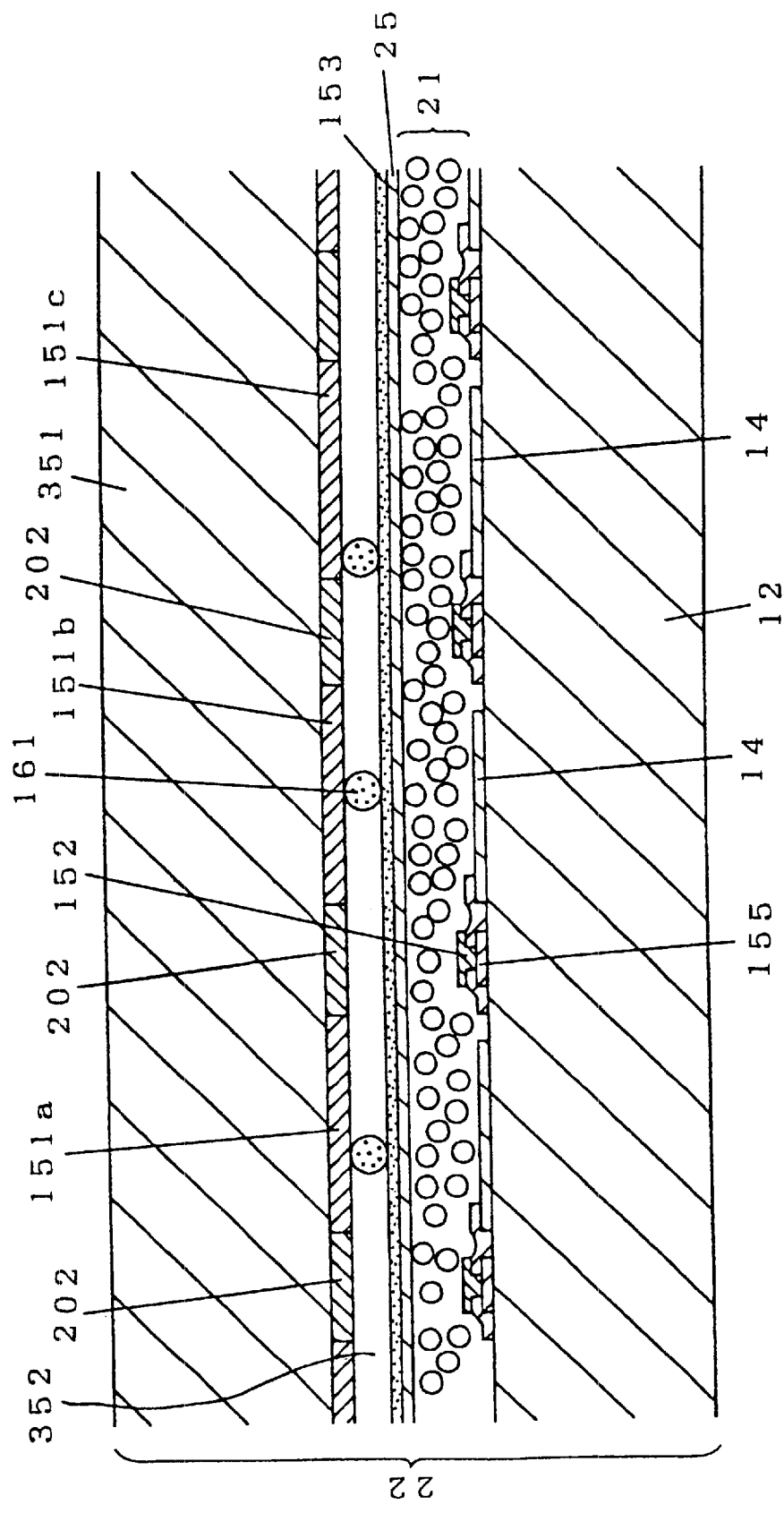
FIG. 35 is a sectional view of the liquid crystal display panel in another embodiment of the present invention.

A description will hereinafter be made sequentially of the display panels in the other embodiments of the present invention. FIG. 35 is a sectional view of the display panel of the present invention. A protective film 153 consisting of an acrylic ultraviolet ray resin film is formed on a counter electrode 25. The point differing from the constitution of FIG. 15 is that while the display panel 22 of FIG. 15 forms the color filter 151 on the counter electrode 25, in the display panel 22 of FIG. 35 a color filter 151 is formed on a substrate 351. In the construction of FIG. 35, even if the color filter 151 consists of a dielectric color filter, it can be easily formed. There is no need to form TFTs 155 on the substrate 351, and only the color filter 151 is formed. The reason for this is that there is no temperature limit of 450 to 600° C. when forming the color filter. A light shielding film 202 consisting of chrome (Cr) can be freely formed. The light shielding film 202 may be formed from sexivalent chrome, aluminum (Al), or titan (Ti) in addition to Cr. Also, it may be a light shielding film consisting of resin.

Of course the color filter may be made from resin material such as gelatin. Between the color filter 151 and the protective film 153, sticking $SiO_3$ beads 161 with a diameter of 5 to 20 μm (trade name: SHINSHI sphere AB-8-13 μm manufactured by SHOKUBAI KASEI) are interposed as spacers 161.

The aforementioned beads 161 can stick if it is let alone at a temperature of 40° C. for 90 minutes. The reason why the beads 161 are thus employed is for preventing the color filter 151 and the protective film 153 from sticking together. Of course, if the color filter 151 and the protective film 153 stick together over the entire display surface, there will be no need to arrange the beads 161. However, generally, if the beads 161 are not arranged, the color filter 151 and the protective film 153 will stick together at one point and be separated from each other at another point. This is because the color filter 151 or the protective film 153 has irregularities on the surface thereof. In addition, the reason is that the substrates 11 and 12 are warped. If a stuck portion and an unstuck portion are present, a refractive index distribution will occur and result in display unevenness.

If the diameter of the beads 161 is 5 $\mu$m or less, the beads 161 will be caught in the irregularities on the protective film 153 and a portion of each bead will be stuck in the irregularities. This will result in display unevenness. If the bead diameter is 20 $\mu$m or more, it will become large with respect to the size of a pixel and refract light. As a result, the beads are recognized as display images. Therefore, it is preferable that the diameter of the beads 161 should be 8 $\mu$m or more and 15 $\mu$m or less.

The protective film 153 is formed from ultraviolet ray resin. The protective film 153 also serves as an anti-reflection film. The reason for this is that the refractive index of ITO constituting the counter electrode 25 is high as 2.0 and the difference between it and the refractive index (1.0) of air (or vacuum) is too large. If the protective film 153 with a refractive index of 1.5 or so is formed on the ITO, inevitably the reflectance can be reduced. Note that the protective film 153 is not necessarily required structurally.

Figure 36:
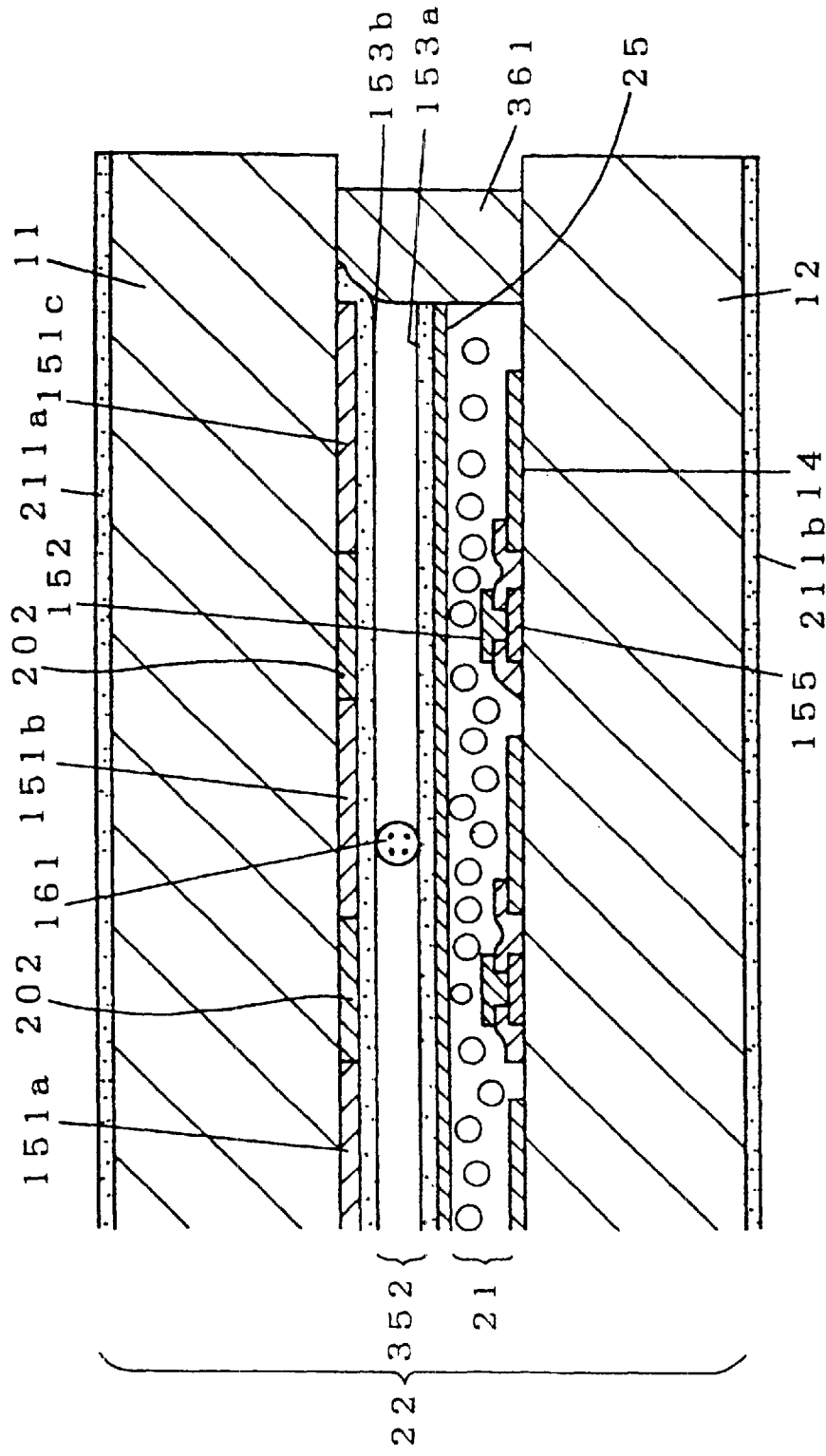
FIG. 36 is a sectional view of the liquid crystal display panel in another embodiment of the present invention.

An inert gas, such as $N_2$, He, Ne, and H gases, is injected into the space between the color filter 151 and the protective film 153. Particularly, nitrogen (N) gas is suitable one because it is stable. In addition, hydrogen (H) gas is suitable one because it has a high cooling effects and therefore can exhale heat out of the display panel. In this case the aforementioned gas is caused to flow. In the case where an inert gas is injected, the circumferential portion is sealed by a seal resin 361 to prevent leakage of the gas, as shown in FIG. 36. There is another method which creates a vacuum state without injecting an inert gas.

As shown in FIG. 36, on the surface of the color filter 151 another protective film 153b may be formed. In addition, an air coat 211 is formed on the interface between the display panel 22 and air. Note that phase separation of the mixed solution 315 is performed before attaching the substrate 11. After phase separation, the beads 161 are scattered in the atmosphere of an inert gas. Then, the substrate 11 and the array substrate 12 are stuck together and the circumferential portion is sealed by the seal resin 361.

Figure 37:
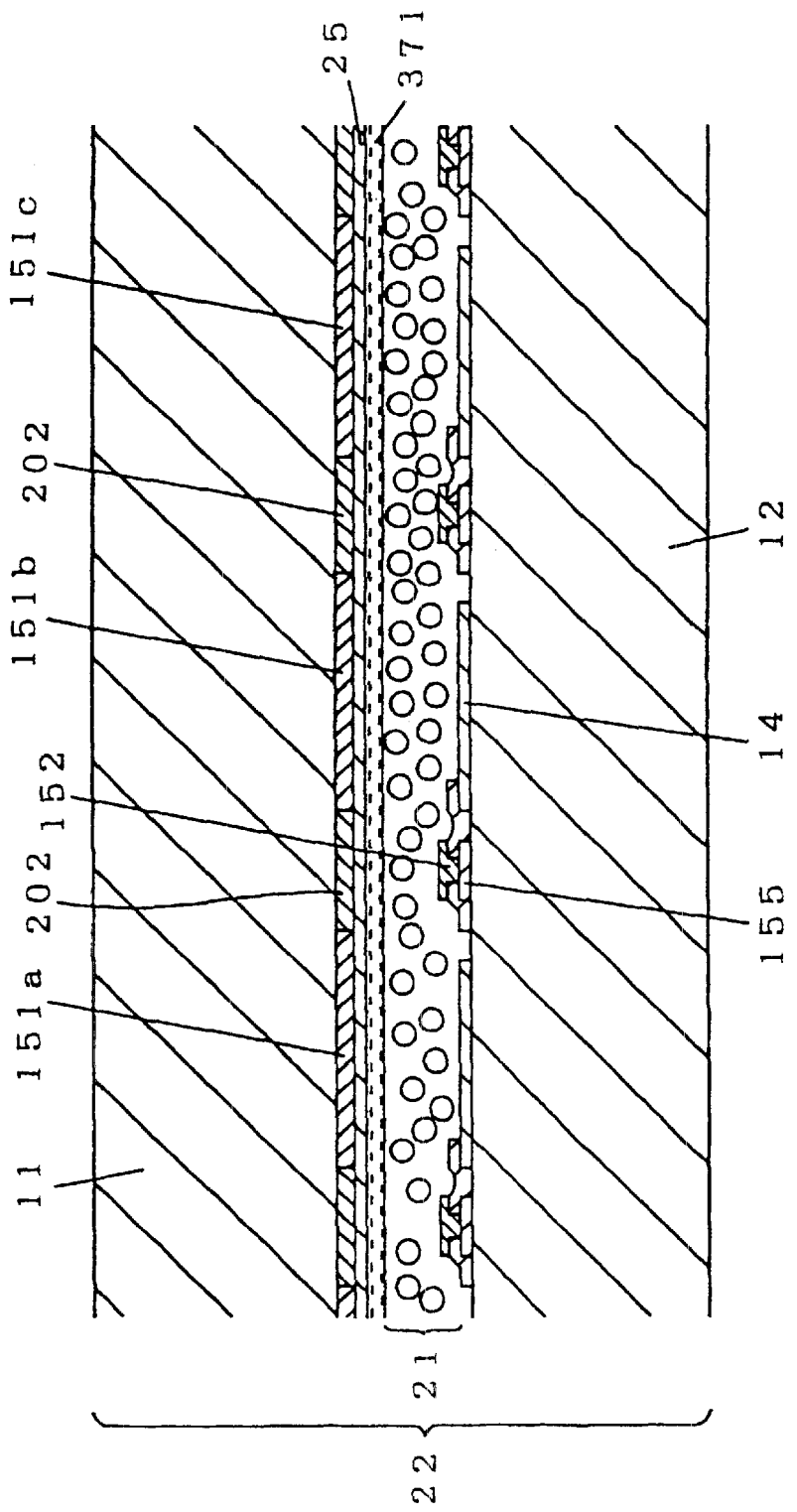
FIG. 37 is a sectional view of the liquid crystal display panel in another embodiment of the present invention.

FIG. 37 is a sectional view of a display panel in another embodiment of the present invention. A color filter 151 and a light shielding film 202 are formed on a substrate 11. On the color filter 151 a counter electrode 25 is formed. The counter electrode 25 and a PD liquid crystal layer 21 are pasted together by a transparent adhesive layer 371.

A description will hereinafter be made of the fabrication method of the display panel of the present invention shown in FIG. 37, referring to FIG. 39. A mixed solution 315 is held between the array substrate 12 and a separation film 182. The method of holding the mixed solution 315 may be either a drop method or a vacuum injection method. Thereafter, a pressure of 1 kg/cm$^2$ is applied to the separation film 182 to make the film thickness of the mixed solution 315 even, and then ultraviolet rays are radiated on the separation film 182. At this time, ultraviolet rays may also be radiated from the side of the array substrate 12. In the case where the separation film 182 consists of resin film, usually it does not easily transmit ultraviolet rays, so a radiation quantity of about 2000 mJ/cm$^2$ is often required. Since this radiation quantity depends considerably upon the thickness of the separation film 182, it is determined by experiment. In the case where the separation film 182 consists of a glass substrate, it transmits ultraviolet rays easily. In the case where the glass substrate consists of silica glass, it transmits ultraviolet rays most easily. In the case of soda glass, it does not easily transmit ultraviolet rays. In the case of a glass substrate, the radiation quantity of the ultraviolet rays also needs to be determined by experiment. In the case of 7059 manufactured by CORNING, the radiation quantity is greater than about 1000 mJ/cm$^2$ and less than 1500 mJ/cm$^2$.

For the ultraviolet rays that are radiated, a wavelength of 350 nm or less is cut. There is a need to completely cut a wavelength of at least 320 nm or less. The reason for this is for preventing the aforementioned liquid crystal from absorbing light having a wavelength of 350 nm or less, being dissolving, and from being degraded. It is a matter of course that radiation of ultraviolet rays may include visible light. The radiation of ultraviolet rays in the specification of the present invention means radiation of light which includes a range of ultraviolet rays. However, it is preferable that infrared rays should be cut. Particularly, it is preferable that a wavelength of 1.5 $\mu$m or more should be cut. If desired, it is preferable that a wavelength of 800 nm or more should be cut. Infrared rays are absorbed by the TFT 151 and the source signal line 15 and heat the signal line. For this reason, infrared rays will move the phase separation condition out of the range of a proper value.

Then, if the separation film 182 is peeled off, the state shown in FIG. 39(b) will be obtained. After the separation film 182 is peeled off, the process of FIG. 39(c) needs to be started immediately. Even if the PD liquid crystal 21 is a solid, there will be possibility that it will absorb water and be degraded, because a portion of the liquid crystal is exposed through the peeled portion. For this reason an unnecessary liquid crystal is washed off.

Then, the substrate 351, formed with the color filter 151 and the counter electrode 25, is pasted on the array substrate 12, as shown in FIG. 39(c). In this case, as shown in FIG. 39(c), the beads 161 may be scattered. However, since the PD liquid crystal layer 21 is soft, there is the possibility that the beads 161 will be caught in the PD liquid crystal layer 21.

In the case where the beads 161 are scattered, the mixed solution 315 is caused to be held in the space between the counter electrode 25 and the PD liquid crystal layer 21 by employing a capillary phenomenon. In this case the diameter of the beads 161 is 2 to 8 $\mu$m. Of course the mixed solution 315 may be held by a drop method. Thereafter, the counter substrate 11 is pressed from above, whereby the film thickness of the adhesive layer 371 becomes even. At this time, the beads 161 are caused to be caught in the PD liquid crystal layer 21, and it is preferable that the adhesive layer 371 be made as thin as possible. Note that even if the beads 161 are not employed, the adhesive layer 371 can be formed extremely thin by a capillary phenomenon or a drop method. However, a sufficient examination on the method is required.

After formation of the adhesive layer 371, a pressure of about 1 to 1.5 kg/cm$^2$ is applied on the counter substrate 11 from above. Therefore, an excess of the mixed solution 315 is exhausted. Thereafter, ultraviolet rays are radiated to phase-separate the mixed solution 315, thereby completing the display panel.

In the aforementioned embodiment, while the material of the adhesive layer 371 has employed the mixed solution 315, the present invention is not limited to this, but it may employ acrylic ultraviolet ray setting resin. The adhesive layer 371 may also be formed from heat setting type epoxy resin.

In the case where the adhesive layer 371 is formed with the mixed solution 315, the film thickness of the adhesive layer 371 does not matter, because the mixed solution 315 makes a contribution to light modulation. However, in the case where it is formed from ultraviolet ray (UV) setting resin, the ultraviolet ray setting resin causes voltage drop. For this reason it is important to make the adhesive layer 371 as thin as possible. In order to make it thin, pressure is applied between the counter substrate 11 and the array substrate 12, and the adhesive layer is let alone for a while.

The film thickness of the adhesive layer 371 should be 5 $\mu$m or less when it is formed from the mixed solution 315. In the case where it is formed from other materials, the film thickness should be at least 3 $\mu$m or less. Preferably, in the case of the mixed solution 315 the film thickness should be less than half of the film thickness of the PD liquid crystal layer 21, and in the case of other materials, it should be less than ⅓. If the distance between the counter electrode 25 and the pixel electrode 14 becomes long, a voltage required for the liquid crystal layer to go to a transmitting state will become high.

Figure 38:
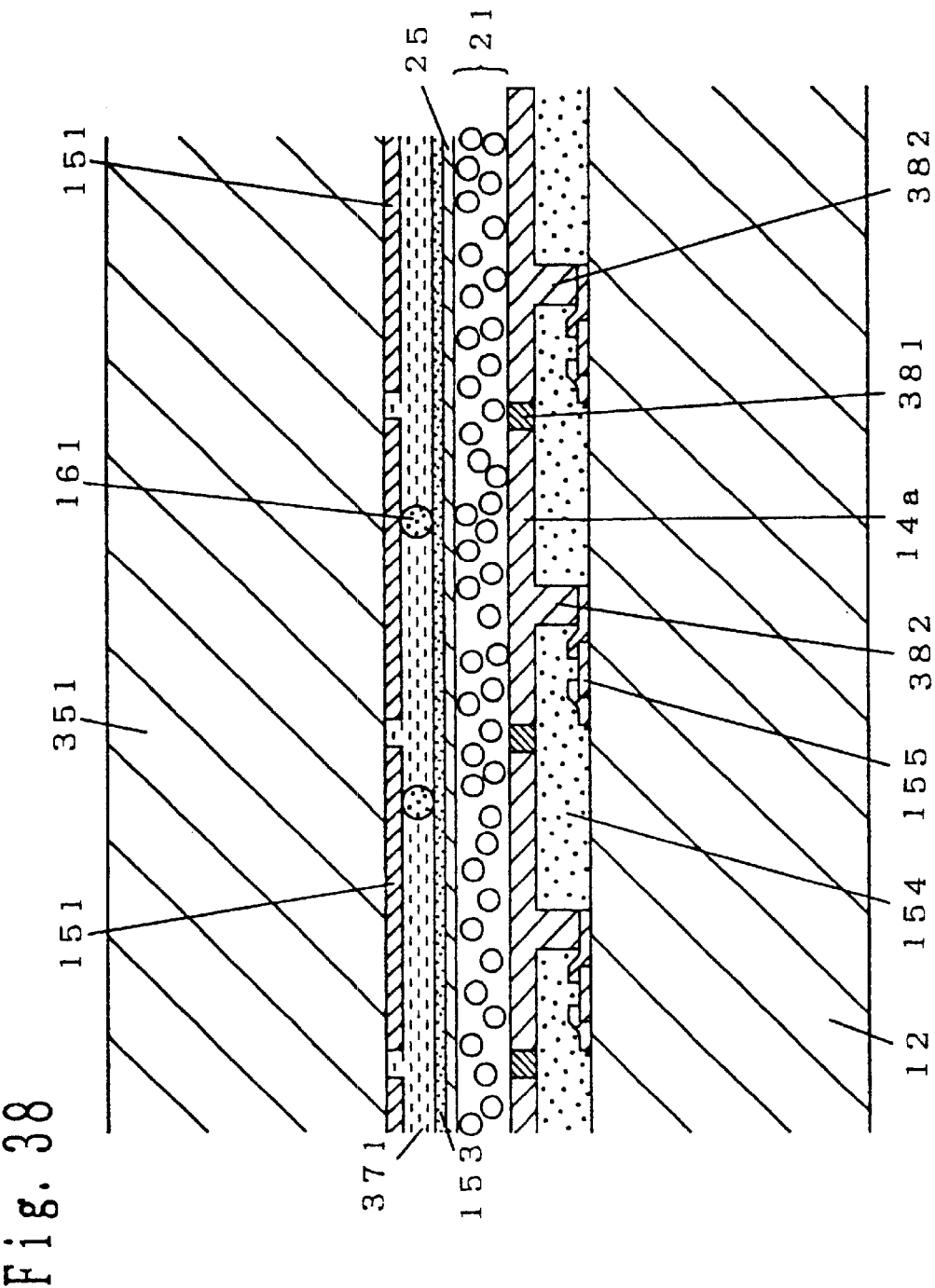
FIG. 38 is a sectional view of the reflection type liquid crystal display panel of the present invention.

FIG. 37 has showed the constitution where the counter substrate 11 having the counter electrode 25 and the color filter 151 formed thereon is pasted on the array substrate 12 having the PD liquid crystal layer 21 formed thereon. FIG. 38 shows the constitution where the substrate 351 having the color filter 151 formed thereon is pasted on the array substrate 12 having the PD liquid crystal layer 21 and the counter electrode 25 formed thereon. Note that the display panel shown in FIG. 38 is a reflection type display panel.

In the present invention it has been described that the display panel is of a transmission type. However, it is a matter of course that the technical idea of the present invention is also applicable to reflection type display panels. For example, if the pixel electrode 14 is formed with thin metal film such as aluminum (Al) film, the transmission type display panel will be a reflection type display panel.

In the display panel 22 shown in FIG. 38, a switching device such as a TFT 155 is formed on the array substrate 12, and a reflecting electrode 14a is formed on the switching device. The reflecting electrode 14a may be formed from metal material such as Al and Cr. Also, on the ITO electrode or metal electrode a dielectric mirror may be formed and constituted.

The aforementioned reflecting electrode 14a and the drain terminal of the TFT 155 are electrically connected by a connecting portion 382. An insulating layer 154 is formed so that the reflecting electrode 14a and the TFT 155 do not short-circuit at a point other than the drain terminal. The insulating layer 154 is formed with inorganic material such as $SiO_2$, SiNx or organic material such as polyimide. In the case of polyimide, there is the advantage that thick film thickness can be formed easily and in a short time by coating it with a spinner. However, there is the disadvantage that a process of boring the connecting portion 382 is difficult to perform.

In the case where the reflecting electrode 14a is formed with metal material, a surface contacting the liquid crystal layer 21 is made so that it becomes an electrode consisting of aluminum (Al). From the standpoint of the drain terminal of the TFT 155 and ohm resistance it is preferable that the reflecting electrode 14a have two-layer constitution consisting of titan (Ti) and aluminum (Al) or three-layer constitution consisting of Ti, Cr, and Al. To enhance the reflectance of the surface such as the Al surface, a thin film consisting of $SiO_2$ is formed on the surface such as the Al surface.

In the case where the reflecting electrode 14a is formed with metal material, a light shielding film (light absorbing film) 381 is formed between adjacent reflecting electrodes 14a to prevent incident light from going into the space between the reflecting electrodes 14a and occuring the photoconductor phenomenon of the TFT 155. The formation material of the light absorbing film is the same constituent material of the light shielding films 202 and 152. In the formation method, the reflecting electrode 14a is patterned and then resin material for the light absorbing film is applied over the entire surface. Thereafter, the surface is polished. This polishing makes the surface of the reflecting electrode 14a as smooth as glass, and at the same time, the light absorbing film 381 remains only between adjacent reflecting electrodes 14a. Note that the surface of the polished reflecting electrode 14a is formed with a protective film, such as $SiO_2$ film, in order to prevent oxidation and the like.

It is not always beneficial to make the surface of the reflecting electrode 14a into a glassy surface. For example, in the case where the display panel 22 is employed as a display for a portable information terminal, it is required to have a wide visual field angle. When a visual field angle is required, there is a need to form irregularities on the surface of the reflecting electrode 14a. As a means of forming irregularities, there is a method of growing the crystal grain of the aluminum (Al) surface large. There is a method of performing a heat process on the Al surface. In addition, a PVA solution is applied to the surface of the reflecting electrode 14a, thereby drying PVA. If done in this manner, microscopic irregularities will be produced on the surface. Thereafter, metal material for the reflecting electrode is deposited on the irregularities.

Figure 39:
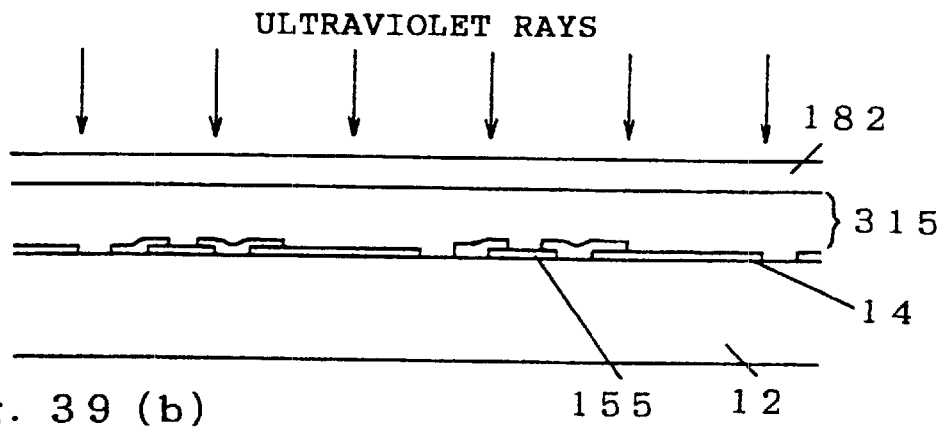
FIG. 39 is an explanatory diagram of the fabrication method of the display panel of the present invention shown in FIG. 37, etc.
Figure 39:
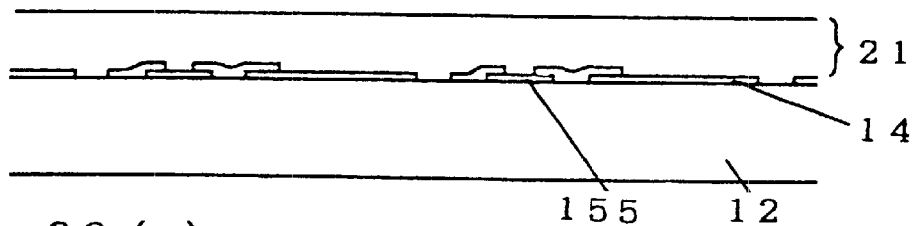
Figure 39:
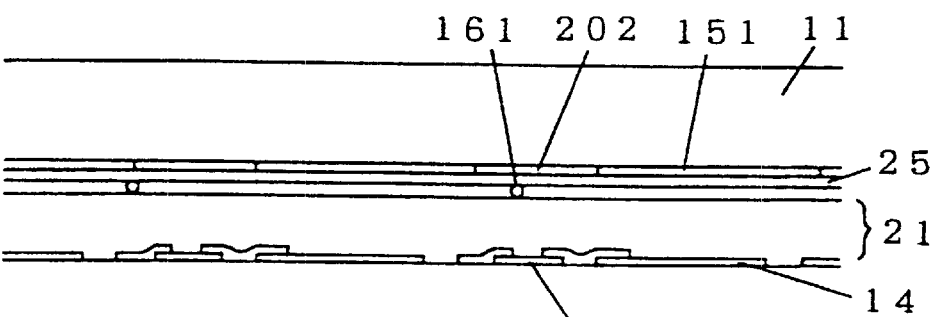
Figure 39:
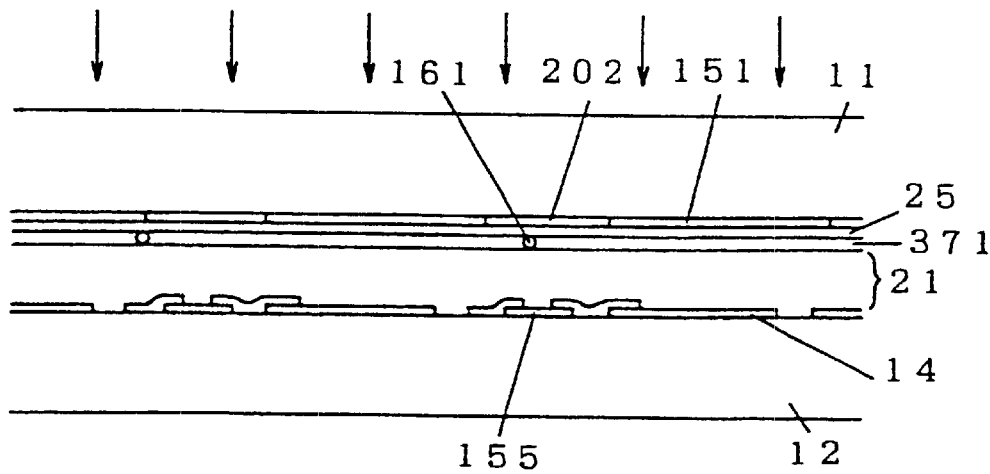

The fabrication method of the display panel of the present invention is similar to FIG. 39. The point of difference is that the counter electrode 25 is formed on the PD liquid crystal layer 21 after formation of the PD liquid crystal layer 21. The protective film 153 does not need to be formed. The array substrate 12 and the substrate 351 having the color filter formed 151 thereon are pasted together with the adhesive layer 371.

Note that since the counter electrode 25 has already been formed on the PD liquid crystal layer 21, the adhesive layer 371 will have no influence on a T-V curve even if the film thickness is thick. The beads 161 may be employed or need not be employed. However, if the beads 161 are employed, an even and proper cap can be made between the color filter 151 and the counter electrode 25. For this reason, injection of the adhesive agent 371 becomes easy.

Figure 19:
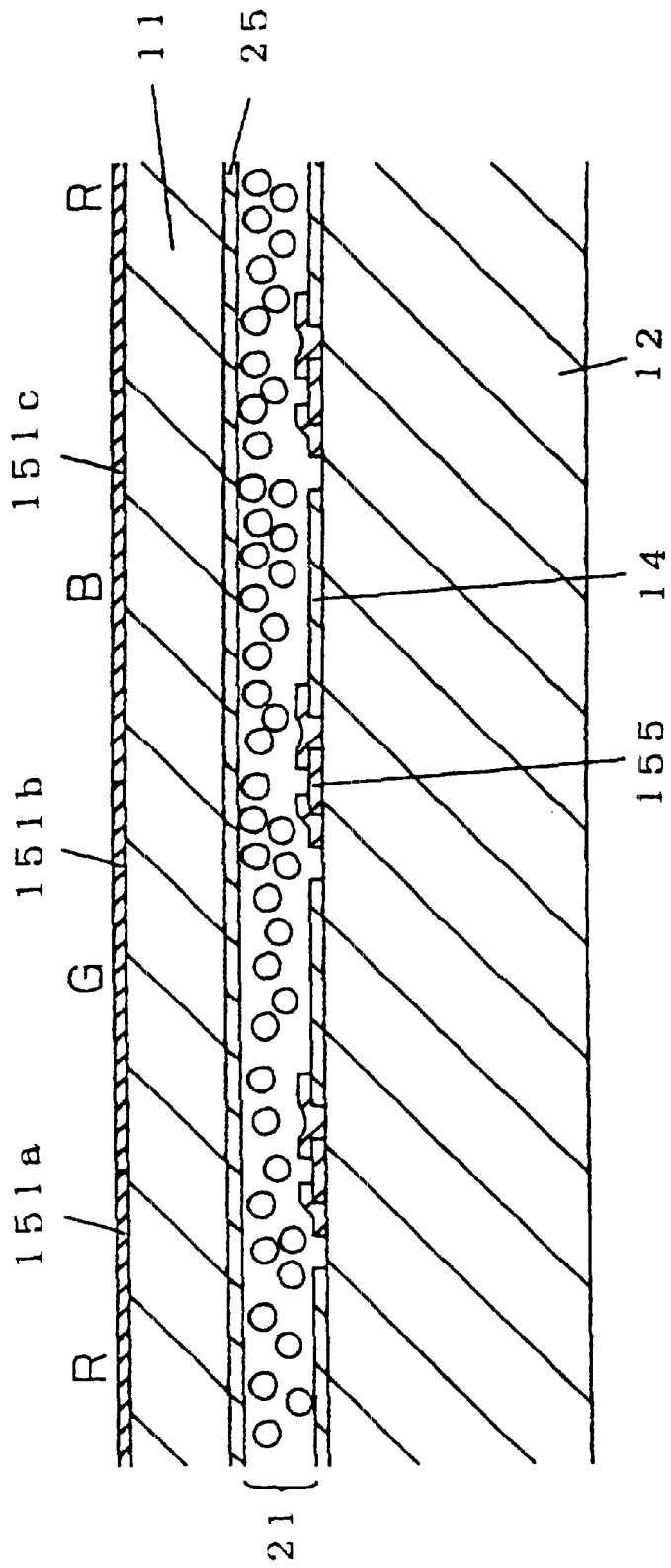
FIG. 19 is a sectional view of the display panel in another embodiment of the present invention.

In the display panel shown in FIG. 19, the color filter 151 is formed directly on the surface of the counter substrate 11. The thickness t (mm) of the counter substrate 11 needs to meet the following equation when the diagonal line of a pixel is represented by d (mm).

$$20d \geq t \qquad \text{[expression 19]}$$

Preferably, $$10d \geq t \qquad \text{[expression 20]}$$

where t is 0.1 mm or more. If thickness is 0.1 mm or less, the counter substrate will easily crack.

The reason for the aforementioned equation is that if the thickness t (mm) of the counter substrate is thick, a difference in diopter will occur and therefore the display screen will become difficult to see. As a result of examination, it has been found that a difference in diopter has influence on the pixel size (diagonal line) (mm). As a result of examination, the aforementioned equation has been obtained. In the case where the color filter 151 is a dielectric color filter, it is mechanically stable (scratches are difficult to occur). However, in the case of a resin color filter, it is not mechanically stable and therefore a protective film (not shown) consisting of acrylic ultraviolet ray setting resin is formed on the surface of the color filter 151. In addition, to prevent reflection of light at the surface of the color filter 151, it is preferable that the surface of the color filter 151 or the surface of the protective film should be formed with irregularities (i.e., the surface should be embossed). Since the reason for this has been described in FIG. 15, it is omitted.

In FIG. 19, although the color filter 151 is formed directly on the counter substrate 11, the present invention is not limited to this arrangement. For example, the color filter 151 may be formed on another substrate, which is arranged or glued so that the surface on which the color filter 151 is formed can contact the counter substrate 11. The array substrate 12 is pasted on the thin counter substrate 11 or the counter film serving as a substitute for the counter substrate 11. After a mixed solution has been held between the substrates 11 and 12, ultraviolet rays are radiated through the substrate 11, thereby phase-separating the mixed solution. Then, the filter substrate having the color filter 151 formed thereon is pasted on the counter substrate with a transparent adhesive agent or gluing agent (ultraviolet ray setting resin, epoxy resin, silicon resin, etc.). If constituted in this manner, ultraviolet rays can be sufficiently radiated on the mixed solution, whereby the mixed solution can be phase-separated satisfactorily. Since the PD liquid crystal layer is a solid, the counter substrate 11 will not be bent even if it is thin. In addition, when pasting the filter substrate and the counter substrate together, there is no possibility that the liquid crystal layer will warp due to pressure.

Note that the filter substrate may be glued or arranged on the side of the array substrate 12. In this constitution there is a need to form the array substrate 12 thin.

It is desirable that the thickness of the counter substrate 11 or array substrate 12 should be 0.6 mm or less. More desirably, it should be 0.3 mm or less. When the display panel shown in FIG. 19 is employed as a light valve for a projection type display, it is desirable that the optical system should be designed so that the F number of light incident on the display panel 22 is F 7 or more and F 15 or less. This design can realize high-contrast display and high-luminance display. The pixel may be of a reflection type.

The F number used herein is expressed as F=1/(2 sin θ). In other words, if the F number is prescribed, it will prescribe the spreading angle of the light which is incident on the liquid crystal display panel. If the spreading angle θ is large, incident light will enter an adjacent pixel. If the F number is too great, the optical length of an optical projection system will be too long and therefore the system size will be too large. If the F number is F 7 or more, light will be shut out by a light shielding film (BM) and there will be no possibility that R light, for example, will enter an adjacent green (G) pixel.

When the display panel of the present invention, such as that shown in FIG. 19, is employed as a light valve for a projection type display, it is preferable that the display panel meet the following relation:

$$Fd/4 \leq t \leq Fd/2 \qquad \text{[expression 21]}$$

where d is the diagonal size (mm) of one pixel, t is the thickness (mm) of the counter substrate 11 or array substrate 12, and F is the F number of incident light. More preferably, the display panel meets the following relation:

$$Fd/3 \leq t \leq Fd/1.8 \qquad \text{[expression 22]}$$

The aforementioned constitution can realize a projection type display which is low in cost and high in luminance.

Figure 58:
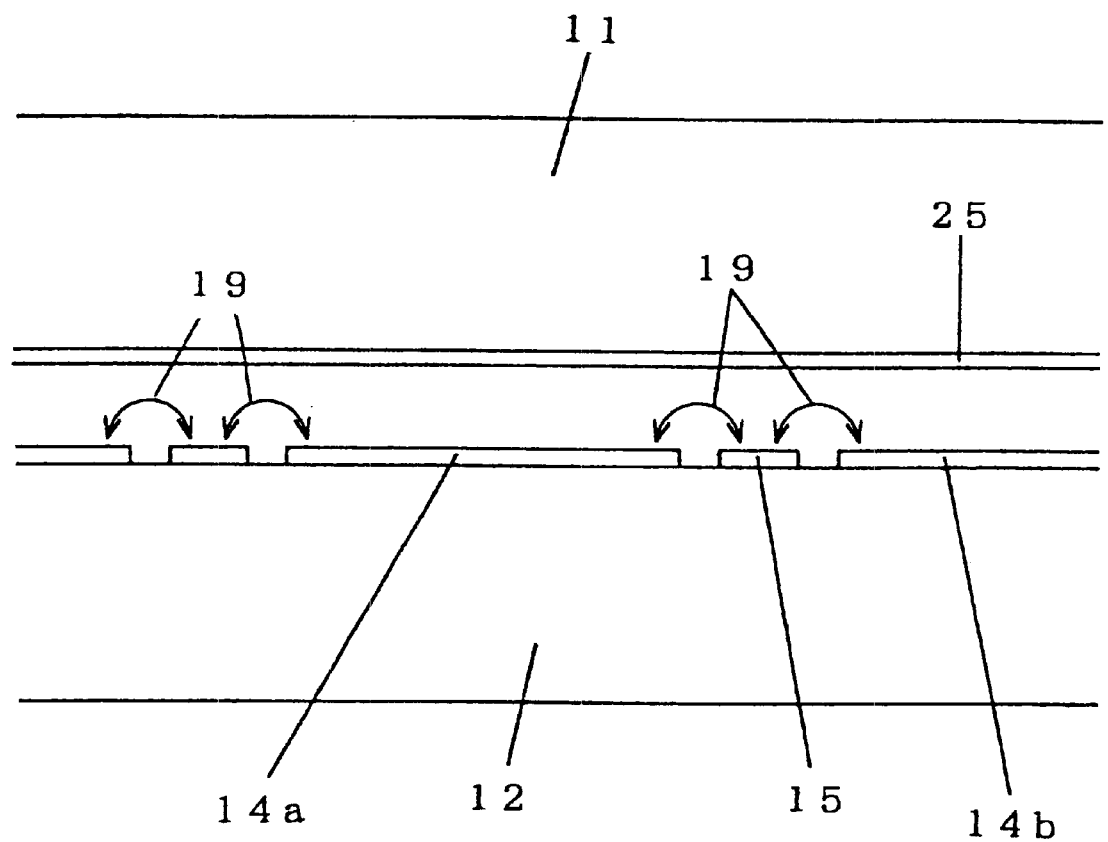
FIG. 58 is an explanatory diagram of the liquid crystal display panel of the present invention shown in FIG. 57.

As shown in FIG. 58, if electromagnetic coupling is produced between the signal line 15 and the pixel electrode 14 and an electric force line 19 is generated, then liquid crystal molecules 20 will be oriented along the electric force line 19. For this reason, light escapes from the vicinity of the signal line 15, resulting in display contrast reduction.

In the embodiments of FIGS. 6 and 16, a low dielectric film is formed to suppress the occurrence of the electric force line 19 in the vicinity of the signal line 15. However, the low dielectric film is also a dielectric substance. For this reason the dielectric constant is 3 or more, so the suppression effect of the electric force line 19 is not perfect.

Figure 57:
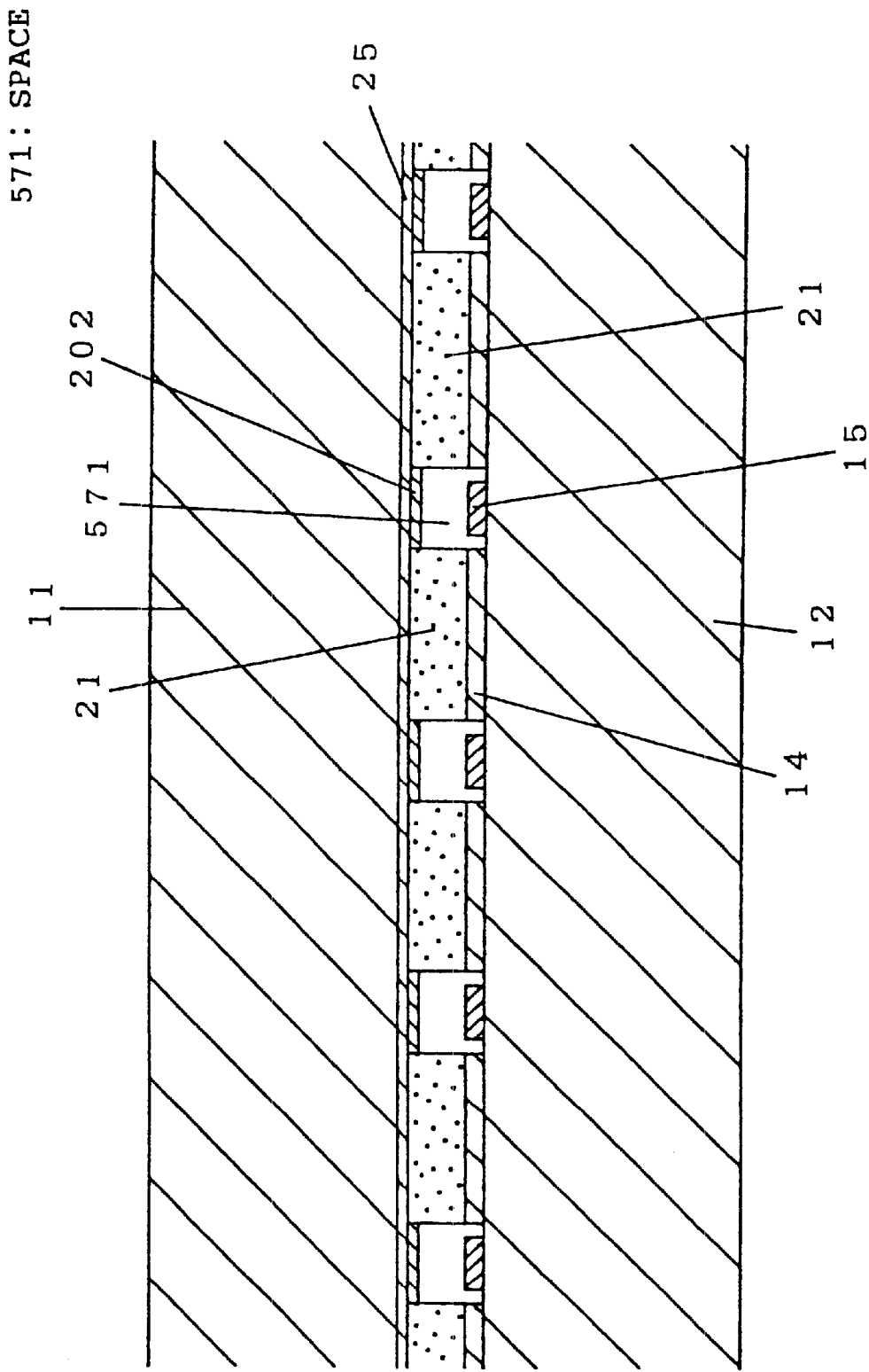
FIG. 57 is a sectional view of the liquid crystal display panel in another embodiment of the present invention.

In FIG. 57 a PD liquid crystal 21 near a signal line 15 is removed. For this reason the dielectric constant of the peripheral portion of the signal line 15 is approximately 1. The PD liquid crystal layer 21 is formed on a pixel electrode 14. On the other hand, on the signal line 15 there is space 571, and a light shielding film 202 is formed on a counter electrode 25. The material for forming the light shielding film 202 employs, for example, Cr. In the space 571 an inert gas such as $N_2$, Ne, and He gases is injected. As an inert gas, particularly nitrogen ($N_2$) gas is preferable to be employed.

Figure 59:
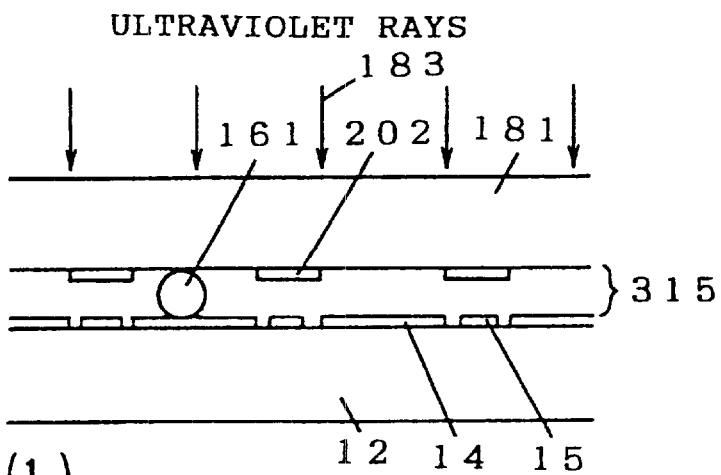
FIG. 59 is an explanatory diagram of the fabrication method of the liquid crystal display panel of the present invention shown in FIG. 57.
Figure 59:
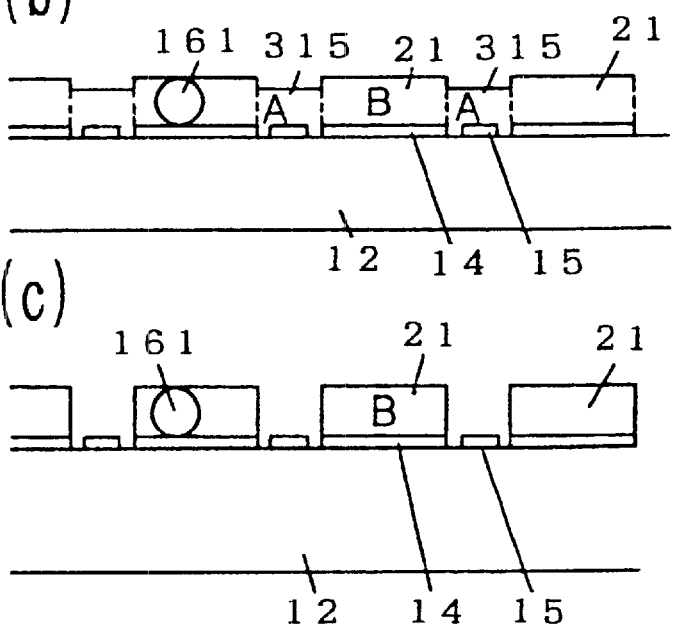
Figure 59:
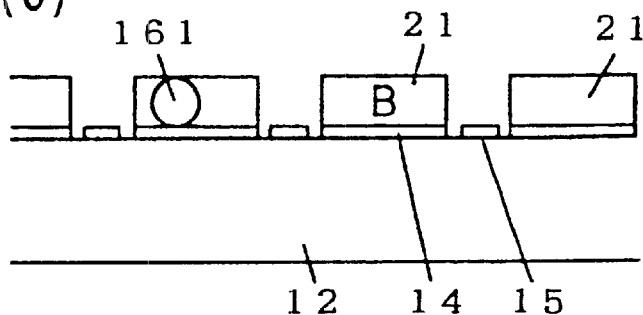
Figure 59:
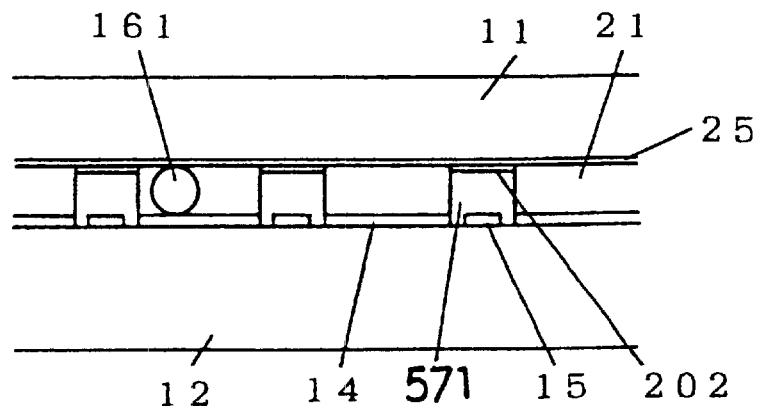

A description will hereinafter be made of the fabrication method of the display panel 22 shown in FIG. 57, referring to FIG. 59. FIG. 59 is an explanatory diagram of the fabrication method of the display panel 22 of the present invention. First, as shown in FIG. 59(*a*), a mixed solution 315 is held between a mask 181 formed with a light shielding film (light shielding pattern) 202 and an array substrate 12. The light shielding film (light shielding pattern) 202 is formed on a source signal line 15, a gate signal line, and a TFT 155. It is desirable that the light shielding film (light shielding pattern) 202 should be formed with aluminum (Al) or chrome (Cr). This is because the rate that it absorbs ultraviolet rays is small. Beads 161 are previously mixed with the mixed solution 315 so that a PD liquid crystal layer 21 has a predetermined film thickness. The beads 161 may be scattered. Thereafter, ultraviolet rays 183 are radiated through the mask 181.

Figure 60:
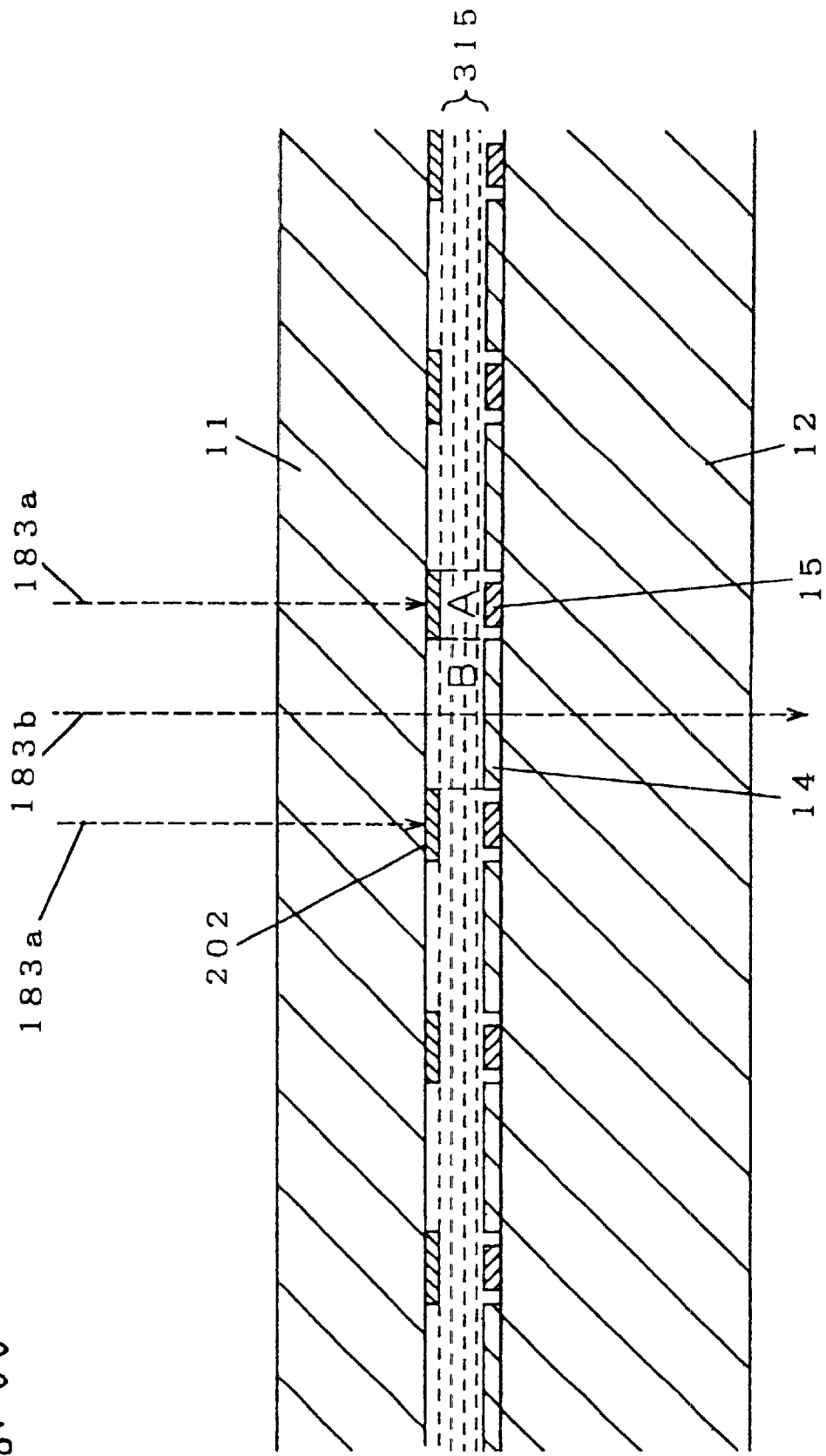
FIG. 60 is an explanatory diagram of the fabrication method of the liquid crystal display panel of the present invention.

The state after the process of FIG. 59(*a*) is shown in FIG. 60. Ultraviolet rays 183*a* are incident on the light shielding film (light shielding pattern) 202. For this reason the ultraviolet rays 183*a* are not incident on the mixed solution 315 but are reflected. An ultraviolet ray 183*b* is incident on the mixed solution 315. Therefore, the resin in the A portion of the mixed solution 315 does not polymerize and the resin in the B portion polymerizes, whereby the liquid crystal component and the resin component are phase-separated.

After ultraviolet rays 183 are radiated and then the mixed solution 315 is phase-separated, the mask 181 is removed. This state is shown in FIG. 59(*c*). Thereafter, unpolymerized mixed solution 315 is washed off. This is easily done by employing pure water. The unpolymerized portions A are washed off as shown in FIG. 59(*c*). For this reason, in the area where the light shielding film (light shielding pattern) 202 is formed above the signal line 15 and a TFT (not shown), space 571 is produced. Since the space 571 is air, the dielectric constant is approximately 1. Therefore, the dielectric constant is low and an electric force line is difficult to occur.

Then, as shown in FIG. 59(d), the counter substrate 11 having the light shielding film 202 formed thereon is pasted on the array substrate 21 in the presence of an inert gas. The adhesion is performed with ultraviolet ray setting resin.

In the fabrication method of FIG. 59, the PD liquid crystal layer 21 is formed by employing the mask 181 which has the light shielding film (light shielding pattern) 202 formed thereon. This mask is also applicable to other fabrication methods. For example, the mask can be employed when light shielding films 202a are formed on a counter electrode 25, as shown in FIG. 61.

If ultraviolet rays are radiated to phase-separate the mixed solution 315, the light shielding film 202a will absorb ultraviolet rays and generate heat, because it is usually formed from chrome (Cr). For this reason the mixed solution 315 in the peripheral portion of the light shielding film 202a is heated, and the average diameter of the PD liquid crystal layer 21 near the light shielding film (BM) is increased.

Then, ultraviolet rays are radiated on the mixed solution 315 by employing the mask 181 formed with the light shielding film (light shielding pattern) 202b having the same shape as the light shielding film 202a. The ultraviolet ray 183a is incident on the light shielding film (light shielding pattern) 202b. For this reason it is not incident on the light shielding film 202a. On the other hand, the ultraviolet ray 183b is incident on the mixed solution 315 without being shut out, and phase-separates the mixed solution 315 present on the pixel electrode 14.

Figure 61:
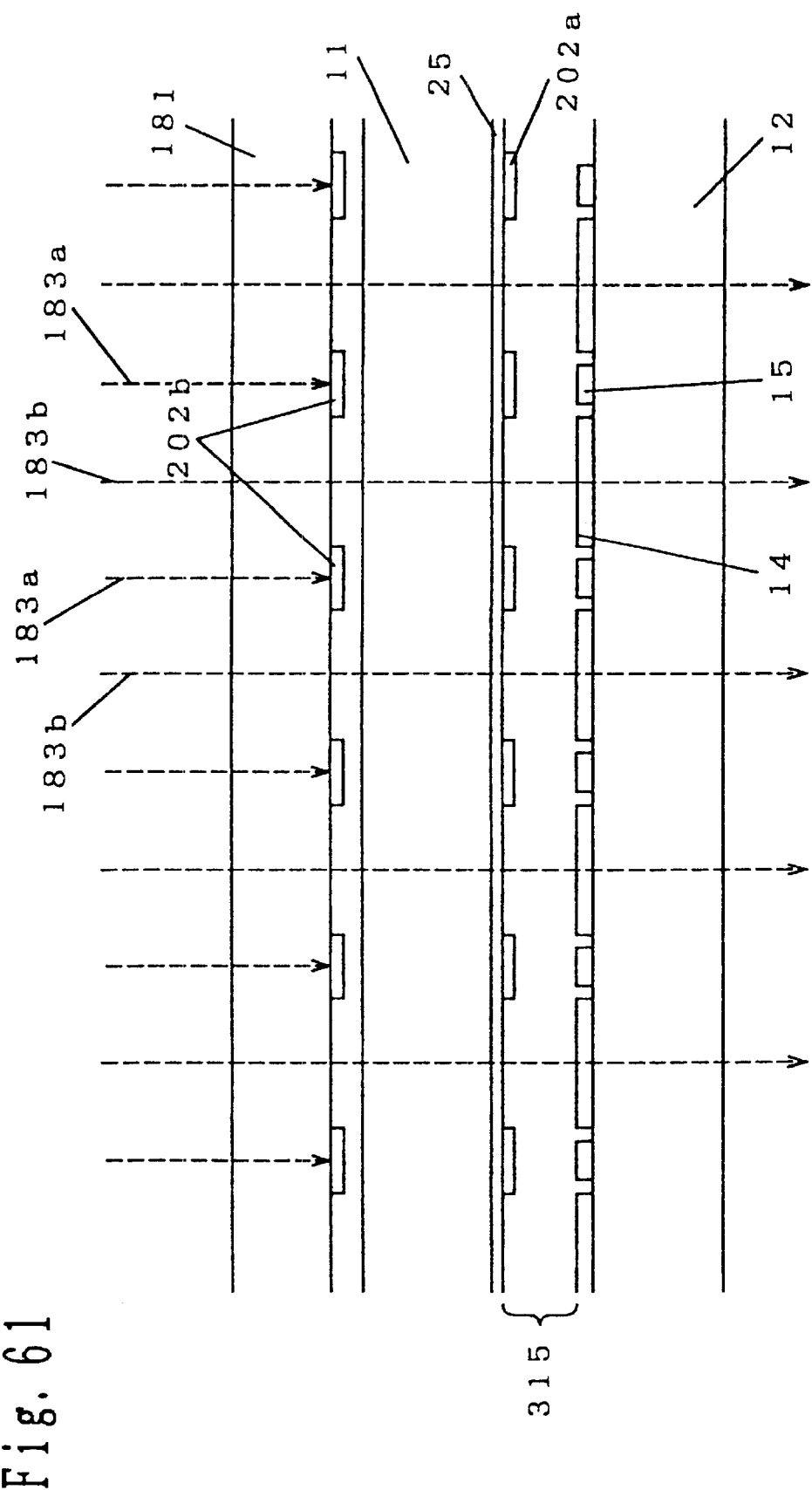
FIG. 61 is an explanatory diagram of the fabrication method of the liquid crystal display panel of the present invention.

As described above, if ultraviolet rays are radiated on the mixed solution 315 by employing the mask 181 shown in FIG. 61, the PD liquid crystal layer 21 can be satisfactorily formed even if the light shielding film 202 has been formed on the display panel.

In the aforementioned embodiment, the light shielding film (light shielding pattern) 202b has the same shape as the light shielding film 202a. However, in the case where ultraviolet rays are radiated through the mask 181 from the side of the array substrate 12, it is a matter of course that the light shielding pattern of the mask 181 is made equal to the shape pattern of the source signal line 15, gate signal line, and the TFT 155.

Figure 62:
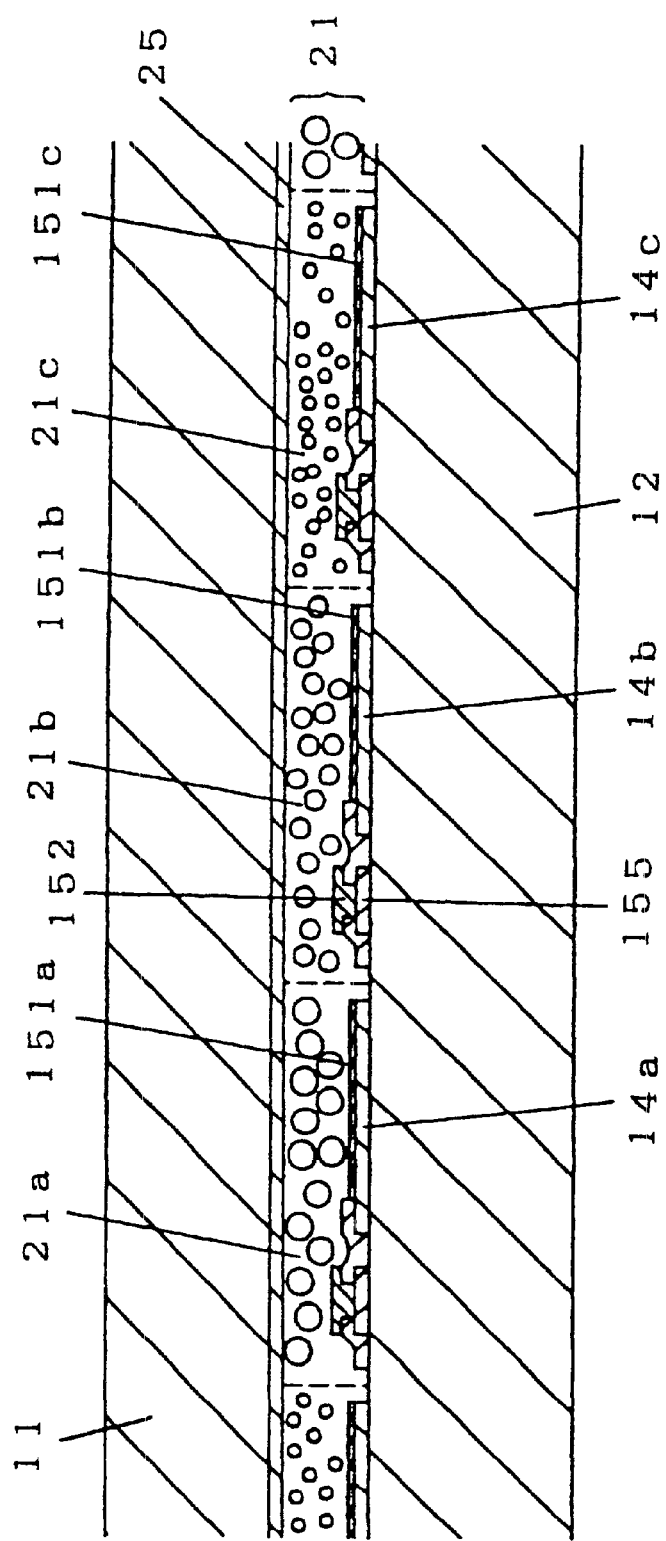
FIG. 62 is a sectional view of the liquid crystal display panel of the present invention.

In a display panel 22 shown in FIG. 62, a color filter 151 is formed on a pixel electrode 14. A red (R) color filter 151a is formed on a pixel electrode 14a. A green (G) color filter 151b is formed on a pixel electrode 14b. A blue (B) color filter 151c is formed on a pixel electrode 14c. In addition, the relation between the average diameter a of the PD liquid crystal 21a on the pixel electrode 14a, the average diameter b of the PD liquid crystal 21b on the pixel electrode 14b, and the average diameter c of the PD liquid crystal 21c on the pixel electrode 14c is made so as to be $a > b \geq c$.

The reason is that the average diameters which can optimally modulate the wavelength of light are correlated with each other. If the wavelength of light becomes longer, there is a need to make the average diameter larger. In other words, the average diameter of the PD liquid crystal layer 21 which modulates B light is made smaller than that of the PD liquid crystal layer 21 which modulates R light.

Figure 63:
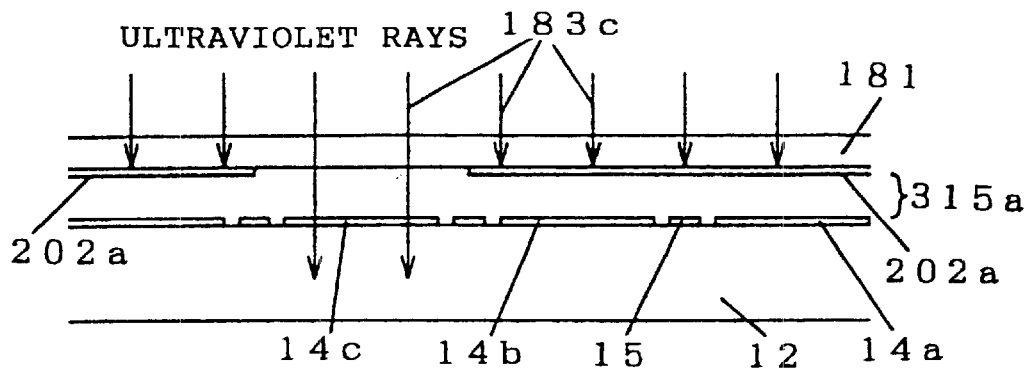
FIG. 63 is an explanatory diagram of the fabrication method of the liquid crystal display panel of the present invention shown in FIG. 62.
Figure 63:
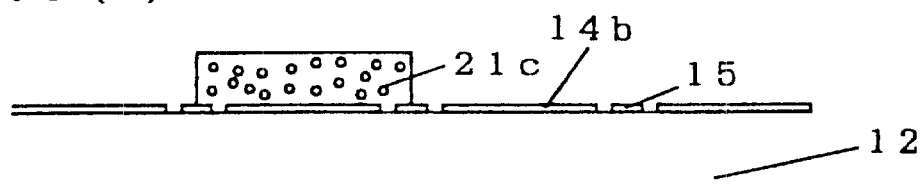
Figure 63:
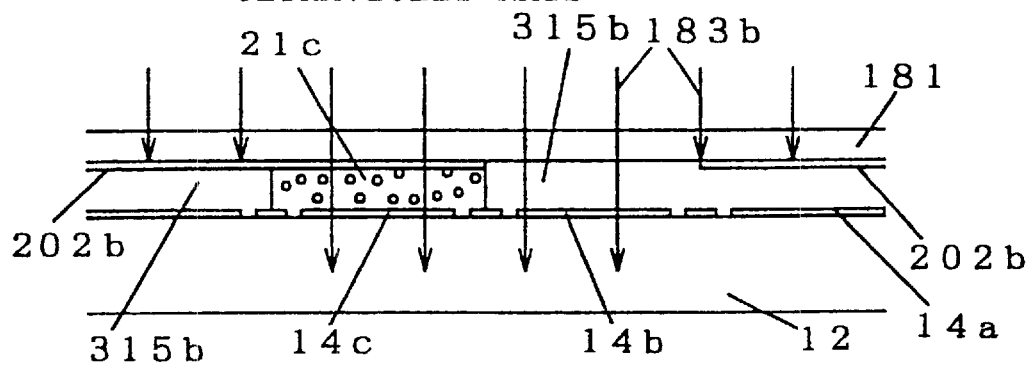
Figure 63:
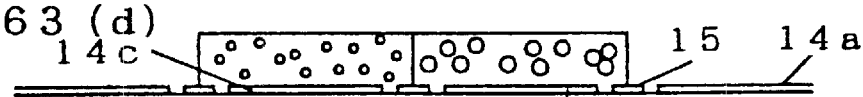
Figure 63:
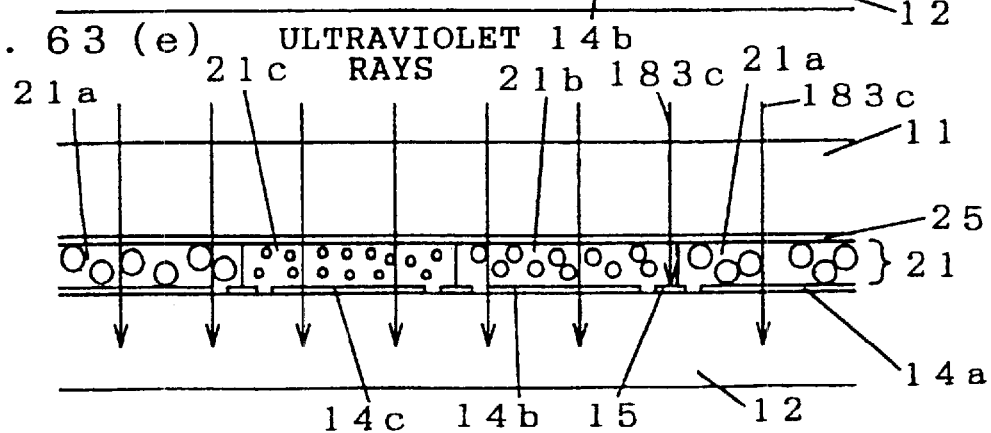

FIG. 63 is an explanatory diagram of the fabrication method of the display panel of the present invention shown in FIG. 62. As shown in FIG. 63(a), the mask 181 is formed with an opening over the pixel electrode 14c which modulates B light. Then, a first mixed solution 315a is held between the mask 181 having the light shielding film (light shielding pattern) 202a formed thereon and the array substrate 12. Thereafter, ultraviolet rays 183c with a strength of c are radiated, thereby phase-separating the mixed solution 315a present under the opening of the mask 181. Thereafter, the mask 181 is removed, and unpolymerized mixed solution 315a is washed off as shown in FIG. 63(b).

Then, the aforementioned mask 181 is moved so that the opening thereof is positioned over the pixel electrode 14b which modulates G light. Likewise, a mixed solution 315b is held between the mask 181 and the array substrate 12, and ultraviolet rays 183b with a strength of b are radiated. Thereafter, the mask 181 is removed, and unpolymerized mixed solution 315b is washed off as shown in FIG. 63(d).

Then, the counter substrate 11 having the counter electrode 25 formed thereon and the array substrate 12 are pasted together, and between both substrates the mixed solution 315c is held. Thereafter, ultraviolet rays 183c with a strength of a are radiated, whereby the mixed solution 315c on the pixel electrode 14a which modulates R light is phase-separated.

The strength of the ultraviolet ray is made so as to be strength c < strength b < strength a. The average diameter changes nearly in proportion to the energy strength of ultraviolet rays per unit time. As the strength becomes stronger, the average diameter becomes smaller. Also, if the ratio between the liquid crystal component and the resin component of the mixed solution 315 is changed, the average diameter will change. Usually, as the content ratio of the liquid crystal component is increased, the average diameter becomes larger. As previously described, if the strength of the ultraviolet rays 183 and the ratio between the liquid crystal component and the resin component are changed by employing the mask 181, the average diameter can be made so as to be optimum for the wavelength of each incident light which is modulated.

Figure 64:
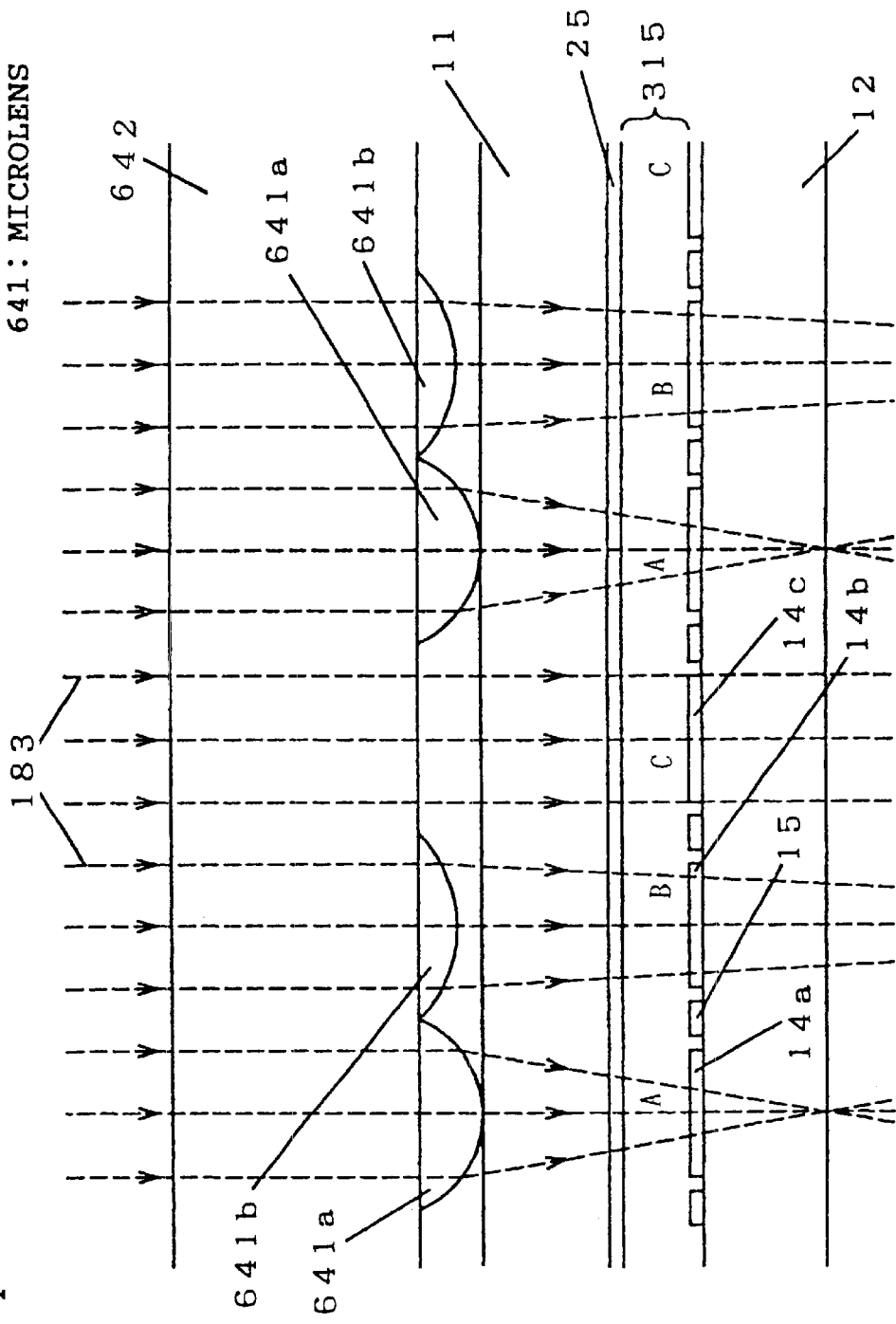
FIG. 64 is an explanatory diagram of the fabrication method of the liquid crystal display panel in another embodiment of the present invention.
Figure 65:
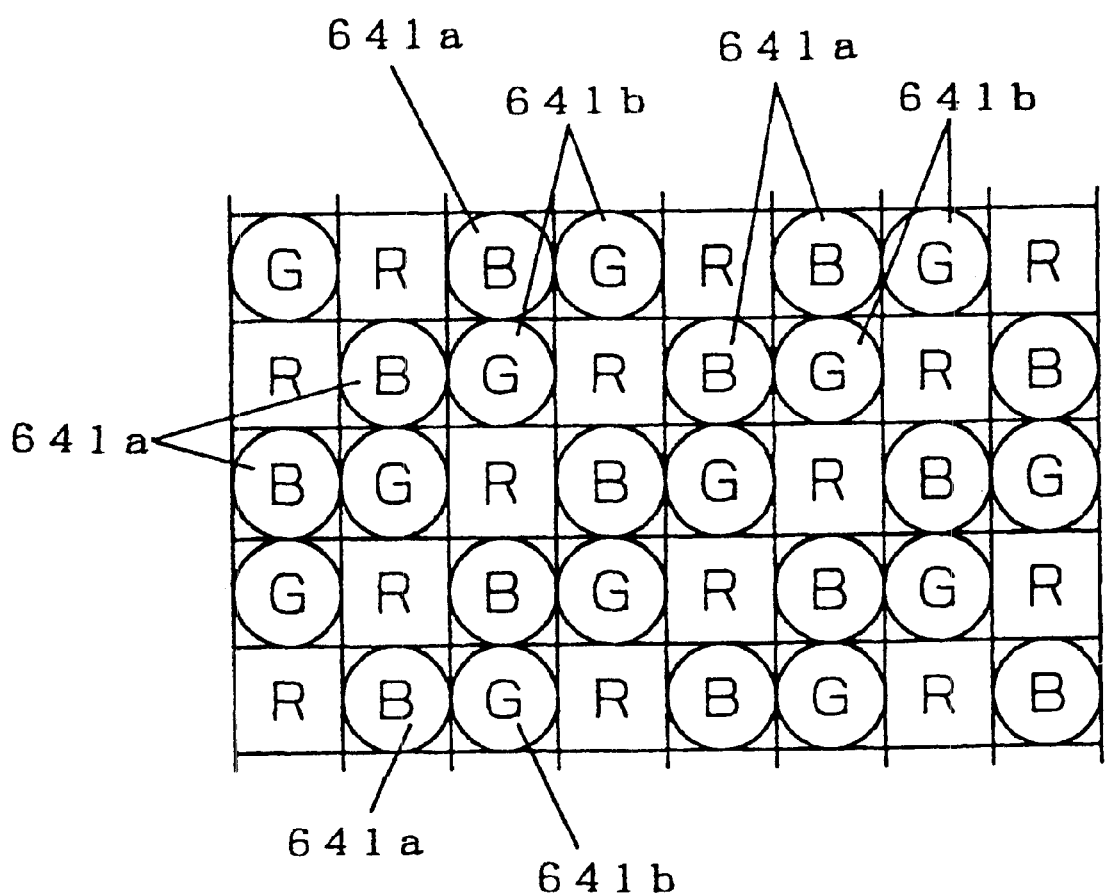
FIG. 65 is an explanatory diagram of the substrate 181 in FIG. 64.

In FIG. 64 a transparent substrate 642, formed with microlenses 641 as the mask 181, is employed. On the transparent substrate 642 microlenses 641a and 641b are formed. The microlens 641a corresponds to a B pixel, and ultraviolet rays are incident on the A portion of the mixed solution 315. The microlens 641b corresponds to a G pixel, and ultraviolet rays are incident on the B portion of the mixed solution 315. The portion not formed with the microlenses 641 corresponds to a R pixel, and ultraviolet rays are incident on the C portion of the mixed solution 315. In a plan view of the transparent substrate 642, the microlenses 641 are arranged as shown in FIG. 65.

Ultraviolet rays 183 are radiated on the mixed solution 315 through the transparent substrate 642. With the operation of the microlens 641a, the A portion of the mixed solution 315 becomes strongest in strength of ultraviolet rays. The microlens 641b is longer in focal distance than the microlens 641a. For this reason the strength of ultraviolet rays 183 of the B portion of the mixed solution 315 becomes weaker than that of the A portion. The C portion of the mixed solution 315 becomes weakest, because there is no microlens and ultraviolet rays 183 are not collected.

The reason that although light is collected in the mixed solution 315 by the microlenses 641, the mixed solution 315 on the pixel electrode 14 can be perfectly phase-separated is that the opening ratio of the pixel is low as about 50%. If incident light can be perfectly collected by the microlenses 641 and also the opening ratio of the pixel is 50%, the A portion can double the ultraviolet ray strength per unit area. In other words, if it is assumed that the strength of the ultraviolet ray of the C portion is 1, the mixed solution 315 on the pixel electrode 14 can be perfectly phase-separated even if the strength of the ultraviolet ray of the A portion is doubled.

If the strength of the ultraviolet ray per unit area is changed, the average diameter will change. If the strength of the ultraviolet ray per unit area becomes strong, the average diameter will become small. From the aforementioned principles, if the curvature of the microlens 641 is changed to change light collecting efficiency, in the mixed solution 315 an optimum average diameter can be obtained according to pixels (R, G, and B) which modulate, even if the strengths of ultraviolet rays that are incident in the transparent substrate 642 are even per unit area.

The strength per unit area in the mixed solution 315 can be freely set if the size and focal distance (curvature) of the microlens 641 are changed. Also, the microlens 641 can be easily fabricated, if a metal mold is made and ultraviolet ray setting resin is injected into the metal mold and transferred.

As shown in FIG. 64, in the case where ultraviolet rays are radiated through the microlens 641 from the side of the counter substrate 11, the color filter 151 is formed on each pixel electrode 14. In the case where ultraviolet rays are radiated through the microlens 641 from the side of the array substrate 12, the color filter is formed on the counter electrode 11.

As previously described, if the microlens 641 is employed, a display panel with average diameters optimum for R, G, and B wavelengths can be easily fabricated as shown in FIG. 62.

Figure 66:
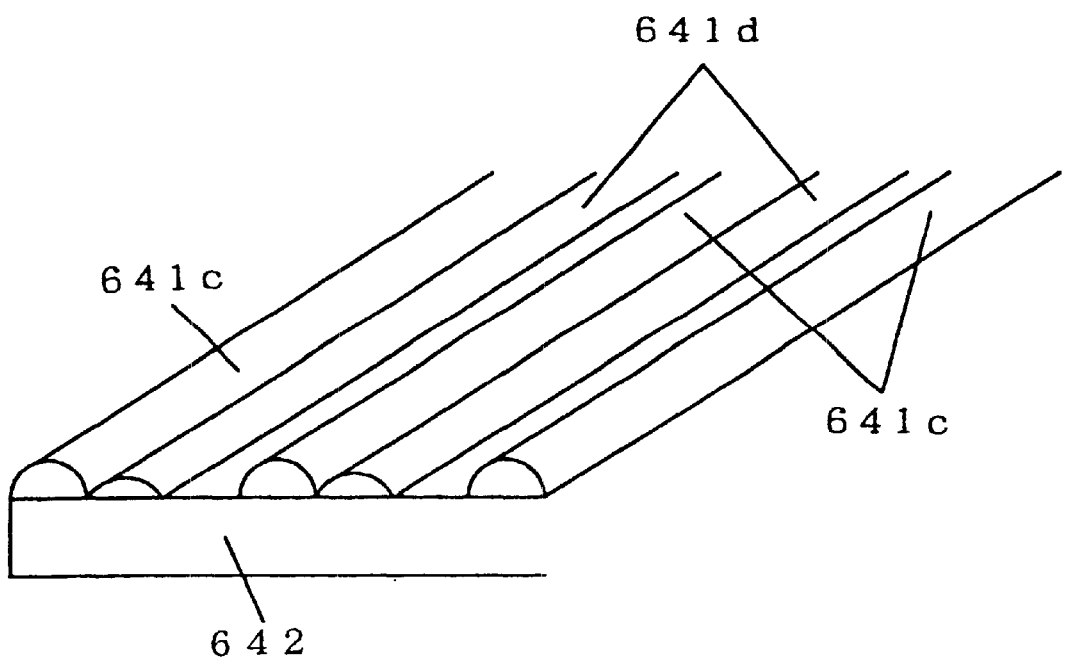
FIG. 66 is an explanatory diagram of the substrate 181 in FIG. 64.

FIG. 64 illustrates the case where color filters 151 are formed in mosaic form as shown in FIG. 65. As shown in FIG. 66(*b*), in the case where color filters 151 are formed in the form of stripes, microlenses 641 in the form of stripes are employed as shown in FIG. 66(*a*). Although depending on focal distance, in FIG. 66 a microlens 641*c* is caused to correspond to a B modulation pixel, a microlens 641*d* to a G modulation pixel, and a portion having no microlens to a R modulation pixel, as an example.

Figure 67:
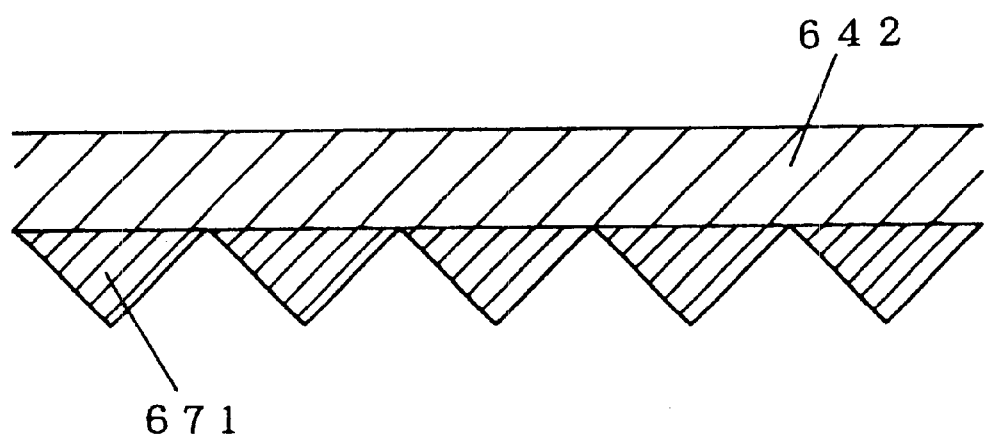
FIG. 67 is an explanatory diagram of the substrate 181 in FIG. 64.
Figure 67:
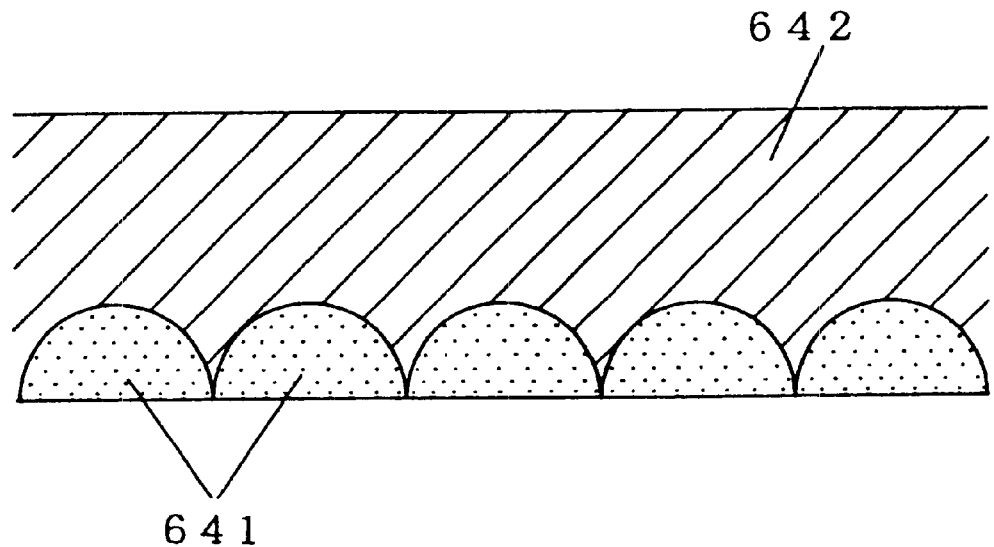
Figure 68:
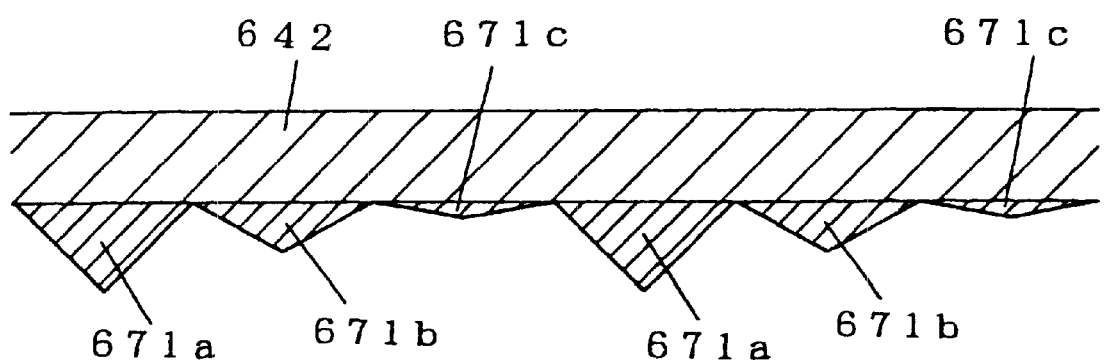
FIG. 68 is an explanatory diagram of the substrate 181 in FIG. 64.
Figure 68:
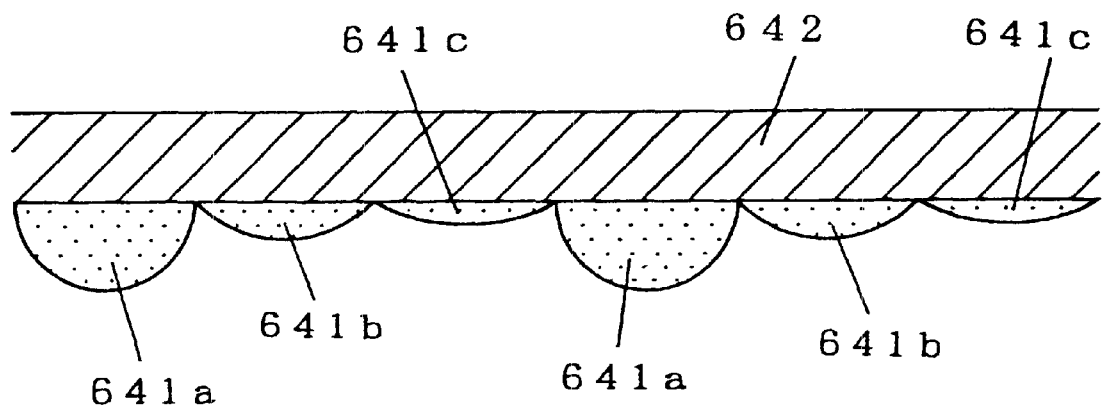

In FIG. 64, although the microlens 641 is not formed on the portion corresponding to a R pixel, microlenses 641*a*, 641*b*, and 641*c* may be formed so that they correspond to R, G, and B pixels, as shown in FIG. 68(*b*). Also, as shown in FIG. 68(*a*), instead of the microlens 641 a fine prism 671 may be formed. In addition, the microlenses 641 are not necessarily formed on the surface of the transparent substrate 642 as irregularities. As shown in FIG. 67(*b*), the microlenses 641 may be formed within the transparent substrate 642, by employing an ion exchange technique. The fabrication method of the microlenses 641 by this technique has been put to practical use by Nippon Sheet Glass.

Figure 69:
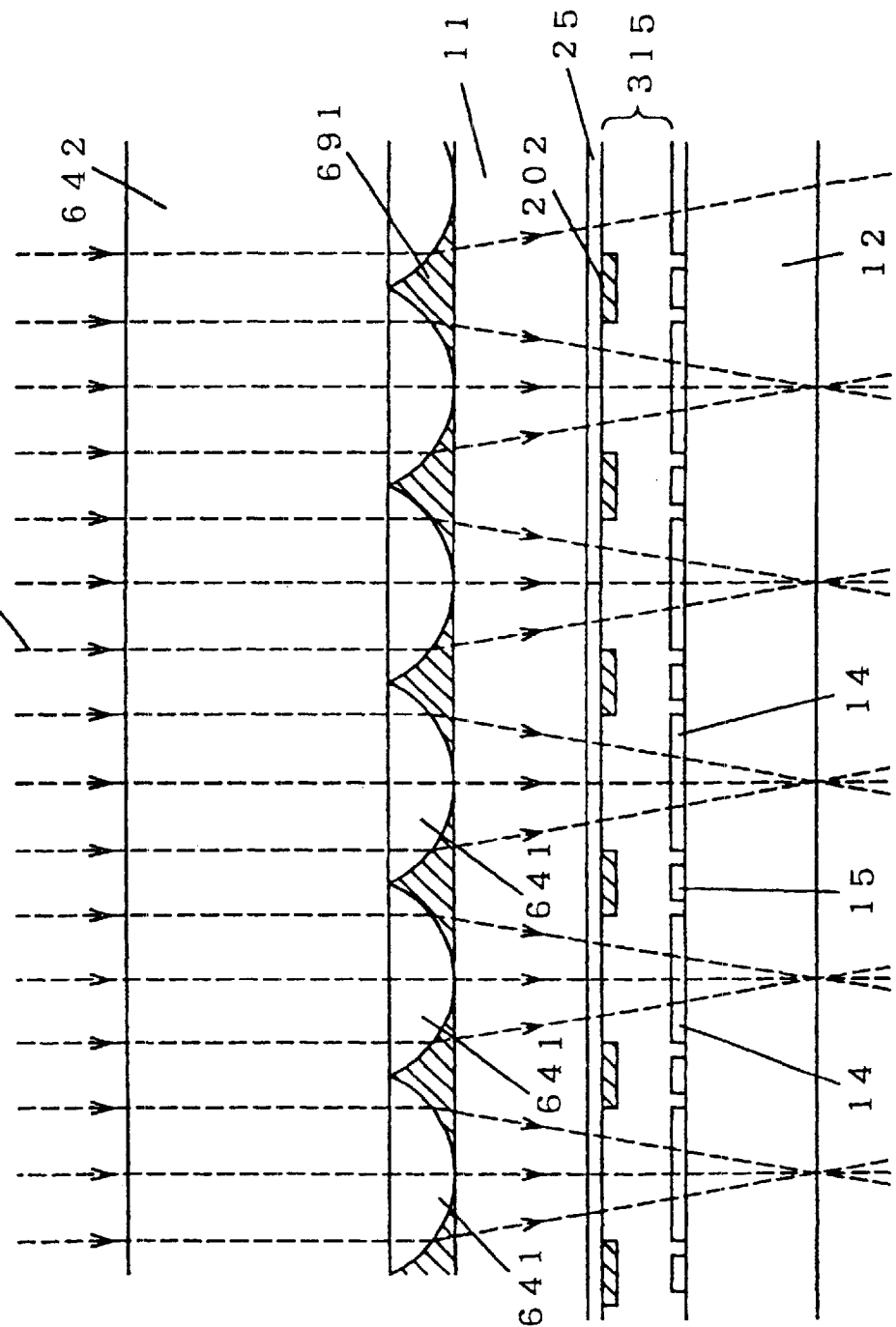
FIG. 69 is an explanatory diagram of the fabrication method of the liquid crystal display panel in another embodiment of the present invention.

In FIG. 61, the phase separation of the mixed solution 315 has been performed by forming the light shielding film (light shielding pattern) 202*b* on the mask 181 so that ultraviolet rays are not radiated on the light shielding film 202*b*. As shown in FIG. 69, even if the microlenses 641 are employed instead of the mask 181, the mixed solution 315 can be phase-separated satisfactorily without radiating ultraviolet rays on the light shielding film 202.

Ultraviolet rays 183 incident on the transparent substrate 642 are collected by the microlenses 641 and therefore the ultraviolet rays are not incident on the light shielding films 202. For this reason the light shielding film 202 does not absorb ultraviolet rays. Therefore, there is no possibility that the average diameter near the light shielding film 202 will be increased so that light can escape.

It is effective that the oblique line portion of FIG. 69 is filled with a Optical coupling agent 691. The Optical coupling agent 691 can employ, for example, acrylic resin, water, alcohol, and ethylene glycol. Particularly, water is a suitable Optical coupling agent because it requires only drying after it is processed. In the case where the microlens 641 is formed with ultraviolet ray setting resin, the refractive index is between 1.45 and 1.50. On the other hand, the refractive index of water is about 0.1 smaller than that of the microlens 641. The thickness of the counter substrate 11 is between 0.8 and 1.1 mm. Therefore, the focal distance of the microlens 641 needs to be between 0.8 and 1.1 mm. However, if the convex portion of the microlens 641 is in contact with air, the difference in refractive index is too large and therefore the focal distance of the microlens 641 becomes extremely short. For this reason the focal point is within the counter substrate 11. In this situation, the strength of an ultraviolet ray cannot be changed in the mixed solution 315. In order to make the focal distance long, there is a need to enlarge the curvature R of the microlens, but there is a limit to manufacturing accuracy. The reason for this is that the curvature R becomes extremely large, the height of the microlens becomes low, and therefore, a required microlens cannot be made. The thickness of the counter substrate 11 is between 0.7 and 1.1 mm. Therefore, if pixel size is between 50 and 300 μm, the microlens 641 needs to have an extremely long focal distance. If the Optical coupling agent 691 is employed, a difference in refractive index will become small, and consequently, it is believed that a microlens with a long focal distance can be easily manufactured.

As shown in FIG. 69, if the oblique line portion is filled with water (Optical coupling agent 691), the difference in refractive index between the microlens and water in contact with the convex portion of the microlens will become small and therefore the focal distance will become long. Therefore, focal distance such that ultraviolet rays can pass just the light shielding film 202 can be easily realized. Also, the occurrence of the halation between the microlens 641 and the counter substrate 11 can be prevented. Since the optical path of incident light is refracted by the microlens 641, the aforementioned halation prevention effect is also effective when the microlens 641 is formed by an ion exchange technique (refer to FIG. 67(*b*)). In addition, in the case of FIG. 64, it is a matter of course that it is effective that the space between the microlens 641 and the substrate is filled with the Optical coupling agent 691 such as water. It is a matter of course that the microlens may be replaced with the prism of FIG. 68(*a*).

In FIG. 69 a description has been made of a method which satisfactorily phase-separates the mixed solution 315 present on the pixel electrode 14 by the microlenses 641. In this method, the time for radiating ultraviolet rays is between about 30 and 90 seconds. Also, ultraviolet rays with a strength which can complete phase separation in the aforementioned radiating time are radiated.

Figure 70:
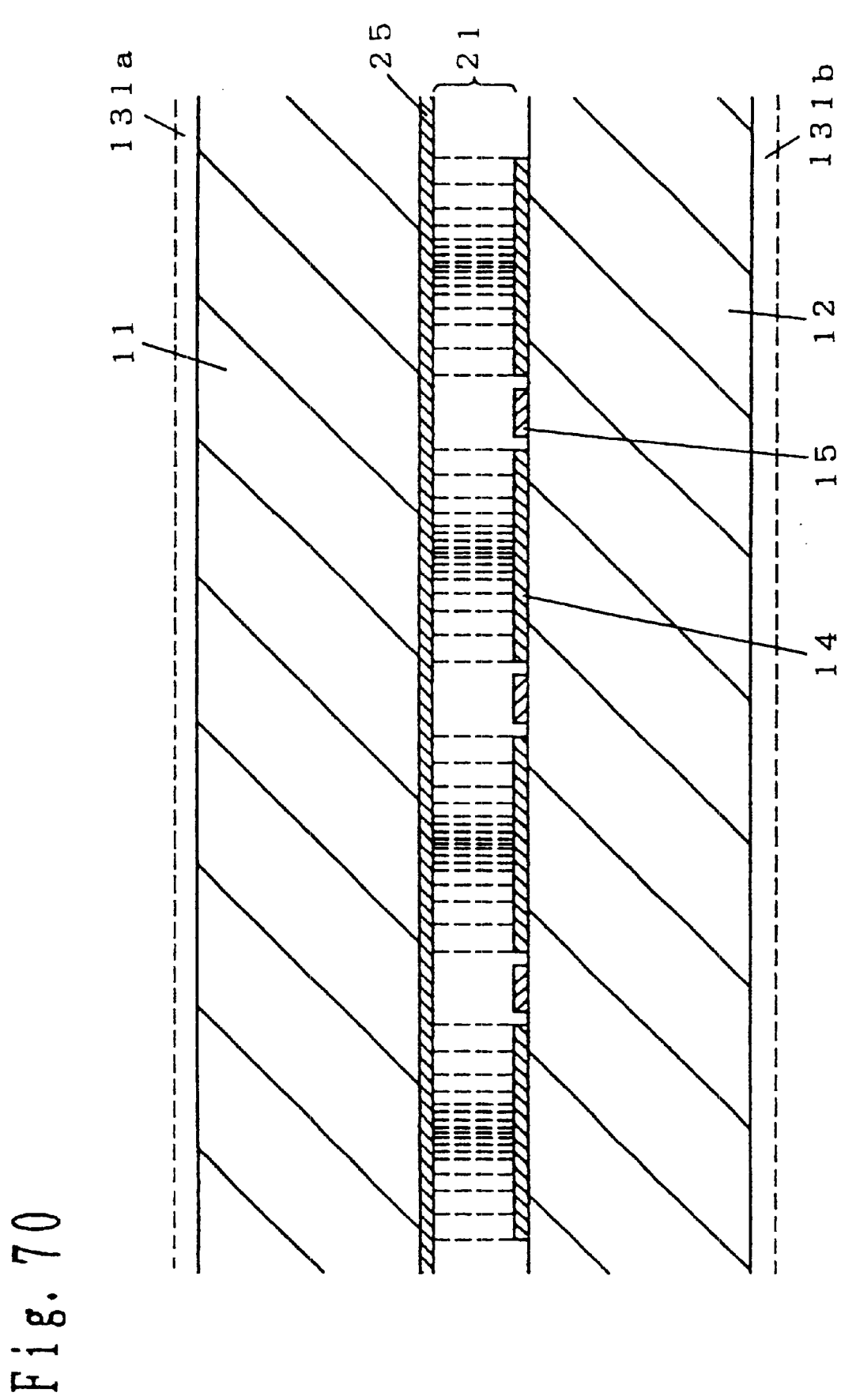
FIG. 70 is a sectional view of the liquid crystal display panel of the present invention.

If the phase separation method of the mixed solution is considered, for example, if the microlenses 641 are employed and also if the strength of ultraviolet rays is made proper and the radiating time for ultraviolet rays is more than 1 minute, then a density distribution between the resin component and the liquid component can be caused to occur on the pixel electrode 14. This state is shown in FIG. 70. The portion of the liquid crystal layer 21 having a great number of dotted lines represents a large amount of resin component. The refractive index of resin is lower than that of a liquid crystal. Therefore, the refractive index of the central portion of the pixel electrode 14 (central portion of the microlens) is low, and the refractive index becomes high toward the peripheral portion of the pixel electrode 14.

If the central portion of the pixel electrode 14 has only a resin component and the peripheral portion has only a liquid crystal component, liquid crystal molecules can be oriented along the resin component. If such a liquid crystal panel is employed alone or together with the polarizing plate 131, a display panel with a wide visual field angle can be obtained.

It is considered that the reason is that since the strength of the ultraviolet ray at the focal portion of the microlens 641 is strong, the resin in the central portion begins to set, and pushes out the liquid crystal component in the central portion to the peripheral portion, pulling the resin component in the peripheral portion to the central portion.

In the aforementioned embodiment, while the distribution shown in FIG. 70 is formed with the employment of the microlens 641, a similar display panel can be fabricated even if the mask 181 shown in FIG. 18 is employed. With the mask, ultraviolet rays are radiated on the central portion of the pixel electrode 14. In addition, if voltage is applied to the pixel electrode 14 at the time of phase separation, orientation of liquid crystal molecules will be easily performed.

Figure 71:
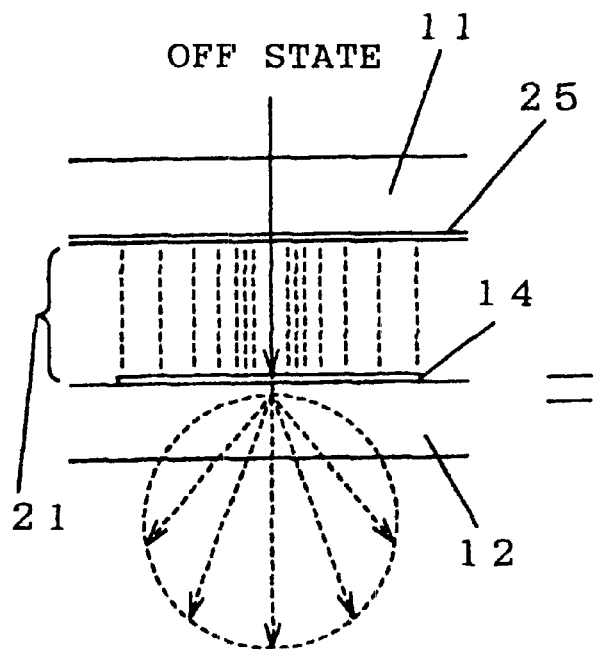
FIG. 71 is an explanatory diagram of the operation of the liquid crystal display panel of the present invention shown in FIG. 70.
Figure 71:
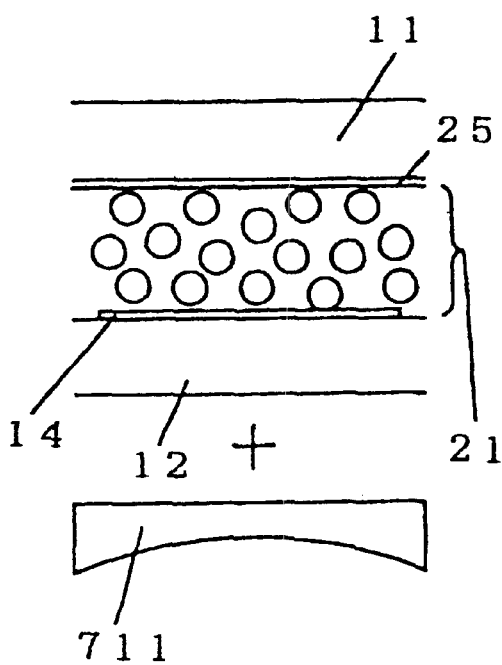
Figure 71:
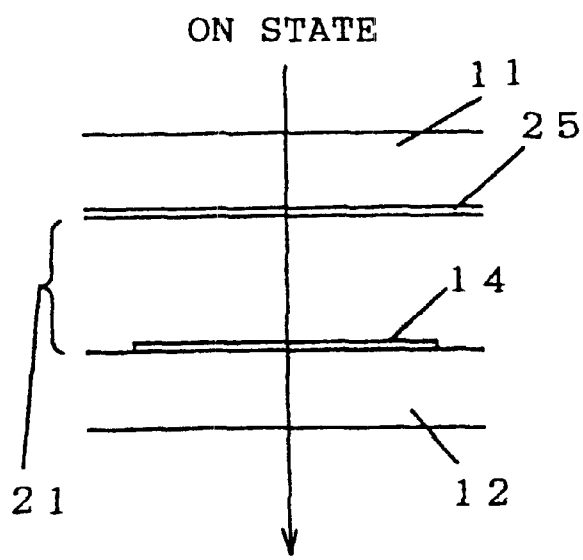
Figure 72:
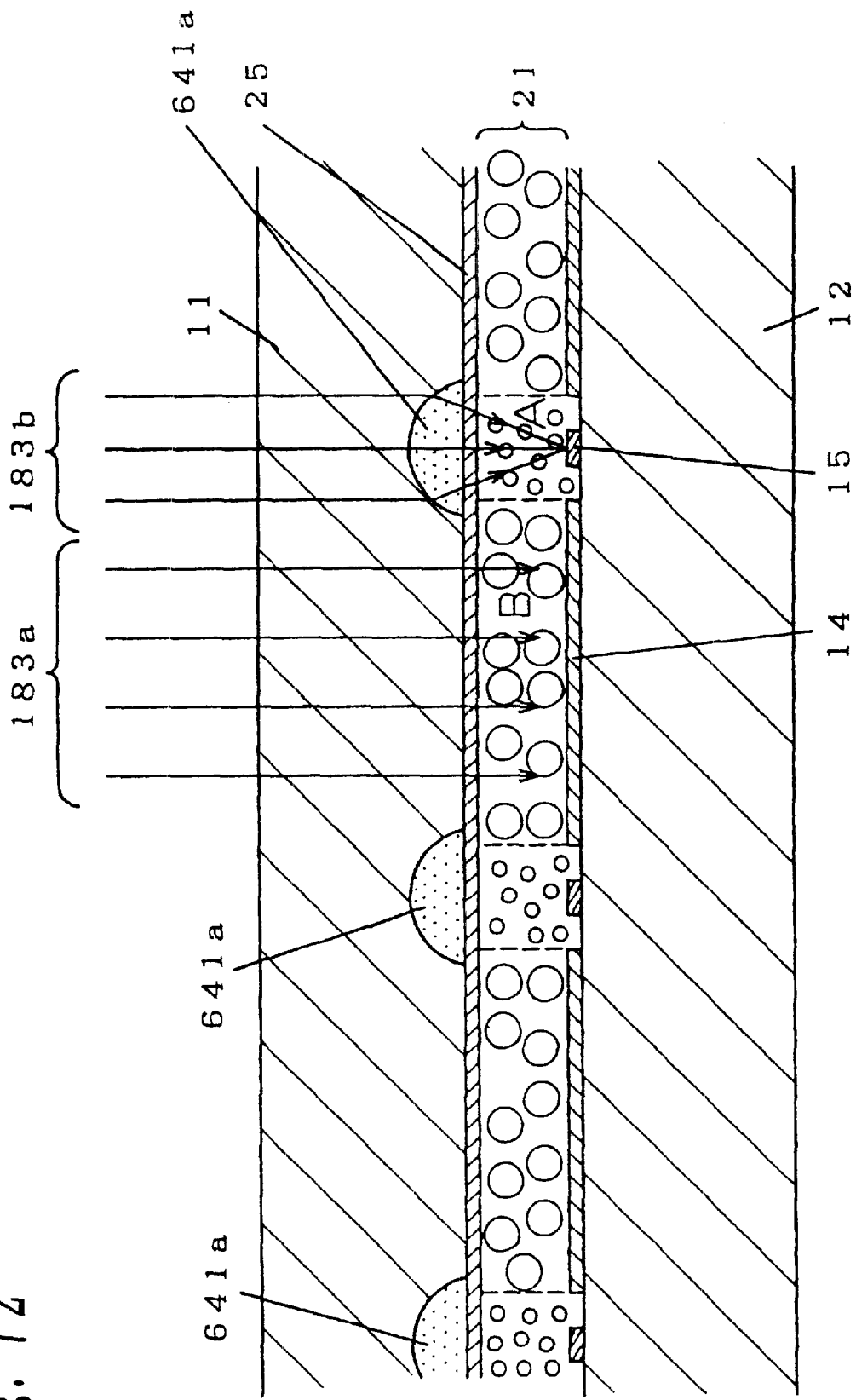
FIG. 72 is a sectional view of the liquid crystal display panel in another embodiment of the present invention.

Therefore, as shown in FIG. 71(*a*), incident light scatters in an "OFF state." It is believed that conceptually the scattering state is obtained by a combination of a concave lens 711 and an ordinary scattering mode, as shown in FIG. 71(*c*). In other words, if a single pixel is observed, the refractive index is low at the central portion and high at the peripheral portion and therefore the pixel functions as the concave lens 711. Incident light is also scattered by a waterdrop-like liquid crystal such as a normal PD liquid crystal layer. For this reason, the scattering characteristic of the "OFF state" is high by the amount of the concave lens effect. In the "ON state" of FIG. 71(*b*), the refractive indexes of the liquid crystal layer 21 become even and therefore the liquid crystal layer 21 goes to a transparent state. Incident light, as it is, emerges from the liquid crystal layer 21. From the aforementioned, the display panel of FIG. 70 can make display contrast high. When the display panel is employed as a direct display panel, it is believed that the effect of the high display contrast is also exhibited as the effect that a visual filed angle is enlarged.

The aforementioned description has been made of the constitution in which the mixed solution 315 is satisfactorily phase-separated by the microlenses 641. However, in the fabrication process, it takes time to align the microlens 641 with the pixel electrode 14. For this reason, the microlens substrate 642 may previously be formed integrally with the counter electrode 11 and/or the array substrate 12. The phase separation of the mixed solution 315 can be satisfactorily performed if light is collected with the microlenses 641. When the display panel is used as a light valve, the light rate of utilization can be made high, because light from a light emitting lamp can emerge from the display panel by the light collecting operation of the microlens 641 without being shut out by the TFT 155 and the light shielding film 202.

It is also effective to form the microlens 641*a* over the signal line 15 as shown in FIG. 73. The ultraviolet ray 183*b* that is incident on the microlens 641*a* is strongly incident on the A portion on the signal line 15. For this reason the average diameter of the liquid crystal layer 21 in the A portion becomes small. As a result, high scattering is obtained and a voltage required to produce a transmitting state is 10 (V) or more. For this reason the A portion is always in a scattering state. Ultraviolet ray 183*a*, as it is, is incident on the pixel electrode 14, whereby the liquid crystal layer 21 on the aforementioned pixel electrode 14 is optimally phase-separated.

Figure 40:
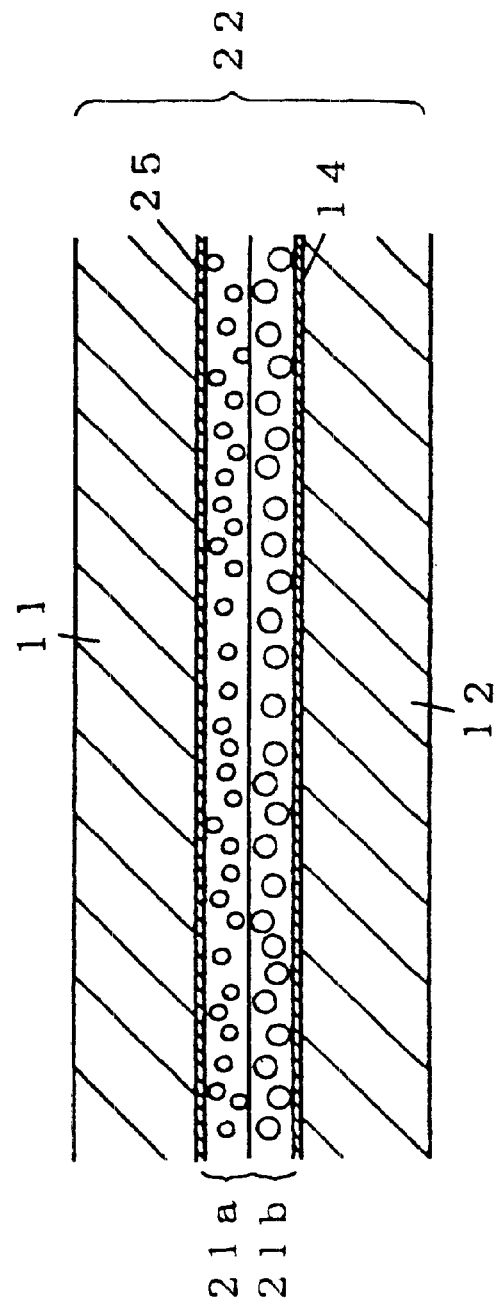
FIG. 40 is an explanatory diagram of the structure of the light modulating layer of the liquid crystal display panel of the present invention.
Figure 41:
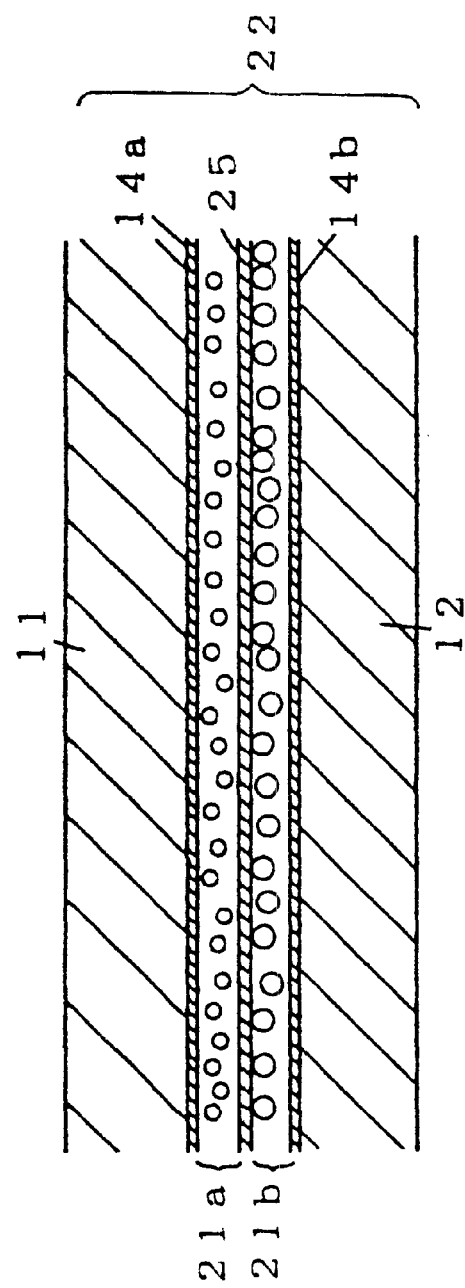
FIG. 41 is an explanatory diagram of the structure of the light modulating layer of the liquid crystal display panel of the present invention.
Figure 42:
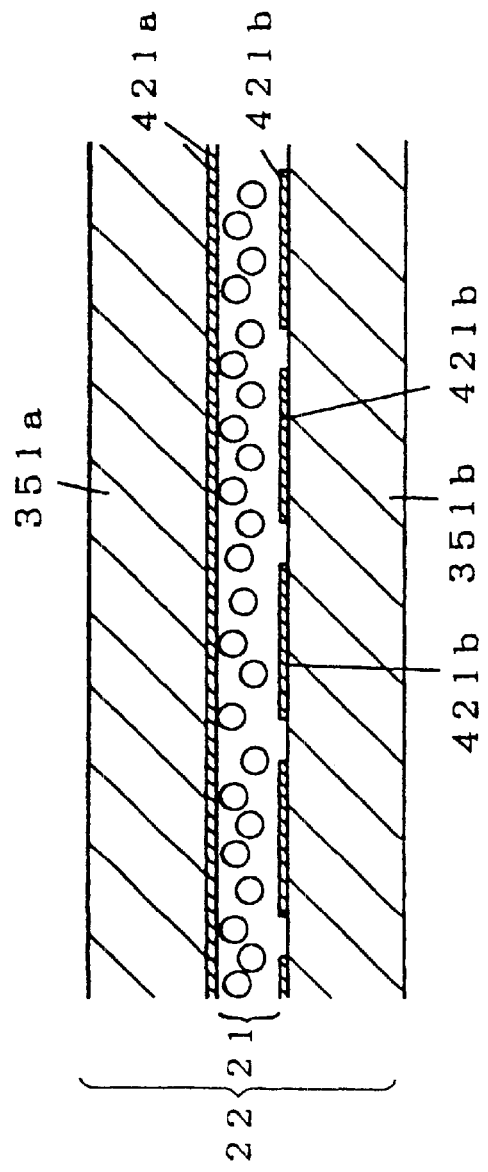
FIG. 42 is an explanatory diagram of the structure of the light modulating layer of the liquid crystal display panel of the present invention.
Figure 43:
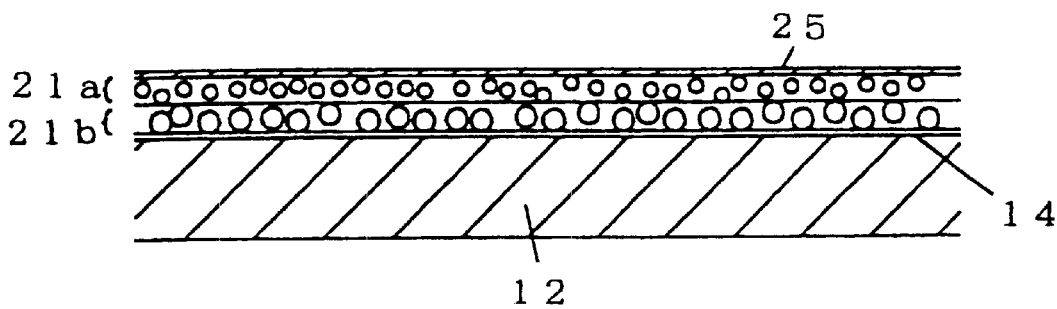
FIG. 43 is an explanatory diagram of the structure of the light modulating layer of the liquid crystal display panel of the present invention.
Figure 44:
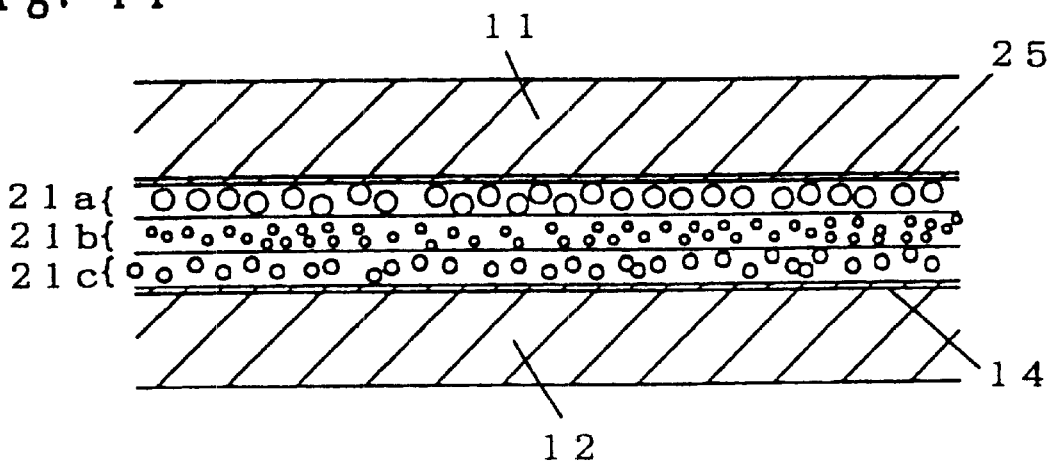
FIG. 44 is an explanatory diagram of the structure of the light modulating layer of the liquid crystal display panel of the present invention.
Figure 45:
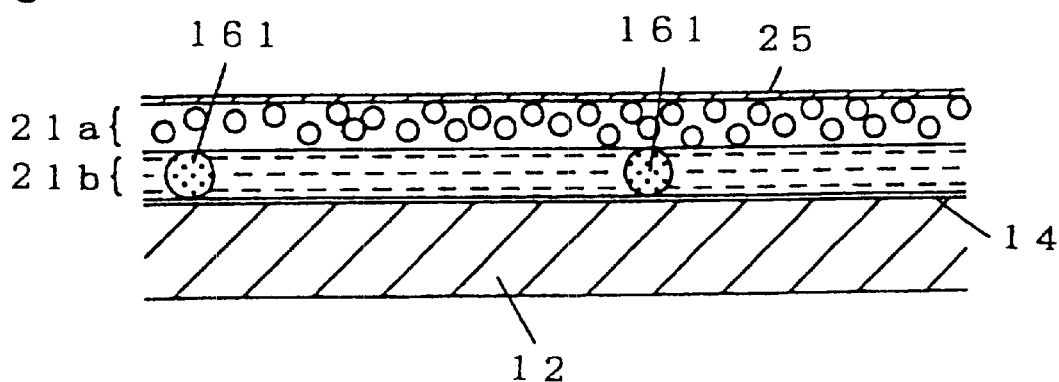
FIG. 45 is an explanatory diagram of the structure of the light modulating layer of the liquid crystal display panel of the present invention.

In the aforementioned display panel of the present invention, while the PD liquid crystal layer 21 has been described as a single layer, the present invention is not limited to a single layer. For example, as shown in FIG. 40, liquid crystal layers 21*a* and 21*b* differing in the average diameter of the PD liquid crystal may be stacked with each other. As shown in FIG. 41, a first PD liquid crystal layer 21*a* may be formed between a first pixel electrode 14*a* and a counter electrode 25, and a second PD liquid crystal layer 21*b* may be formed between a second pixel electrode 14*b* and the counter electrode 25. In addition, the present invention is not limited to an active matrix type display panel in which switching devices 155 are formed on pixel electrodes 14, but may be a simple matrix type display panel in which pixels are formed with electrodes 421 in the form of stripes. As shown in FIG. 43, the invention may be a display panel in which a counter electrode 25 is formed on liquid crystal layers 21*a* and 21*b* stacked with each other and which is not provided with the counter substarte 11. As shown in FIG. 44, it may be a display panel stacked with a liquid crystal layer 21*a* containing a color which modulates Magenta light, a liquid crystal layer 21*b* containing a color which modulates cyanogen light, and a liquid crystal layer 21*c* containing a color which modulates yellow light. As shown in FIG. 45, the present invention may be a display panel in which one layer is a TN liquid crystal layer 21*b* and the other layer is a PD liquid crystal layer 21*a*. In addition, the liquid crystal layer may be a ferroelectric liquid crystal layer, a cholestic liquid crystal layer, an STN liquid crystal layer, and a homeotropic liquid crystal layer.

Furthermore, the technical idea described in this specification of the present invention is also applicable to an optical write type display panel, a laser write type display panel, a heat write type display panel, a plasma display panel (PDP), a plasma address liquid crystal display (PALCD), an inorganic EL display panel, and an organic EL display panel.

Figure 46:
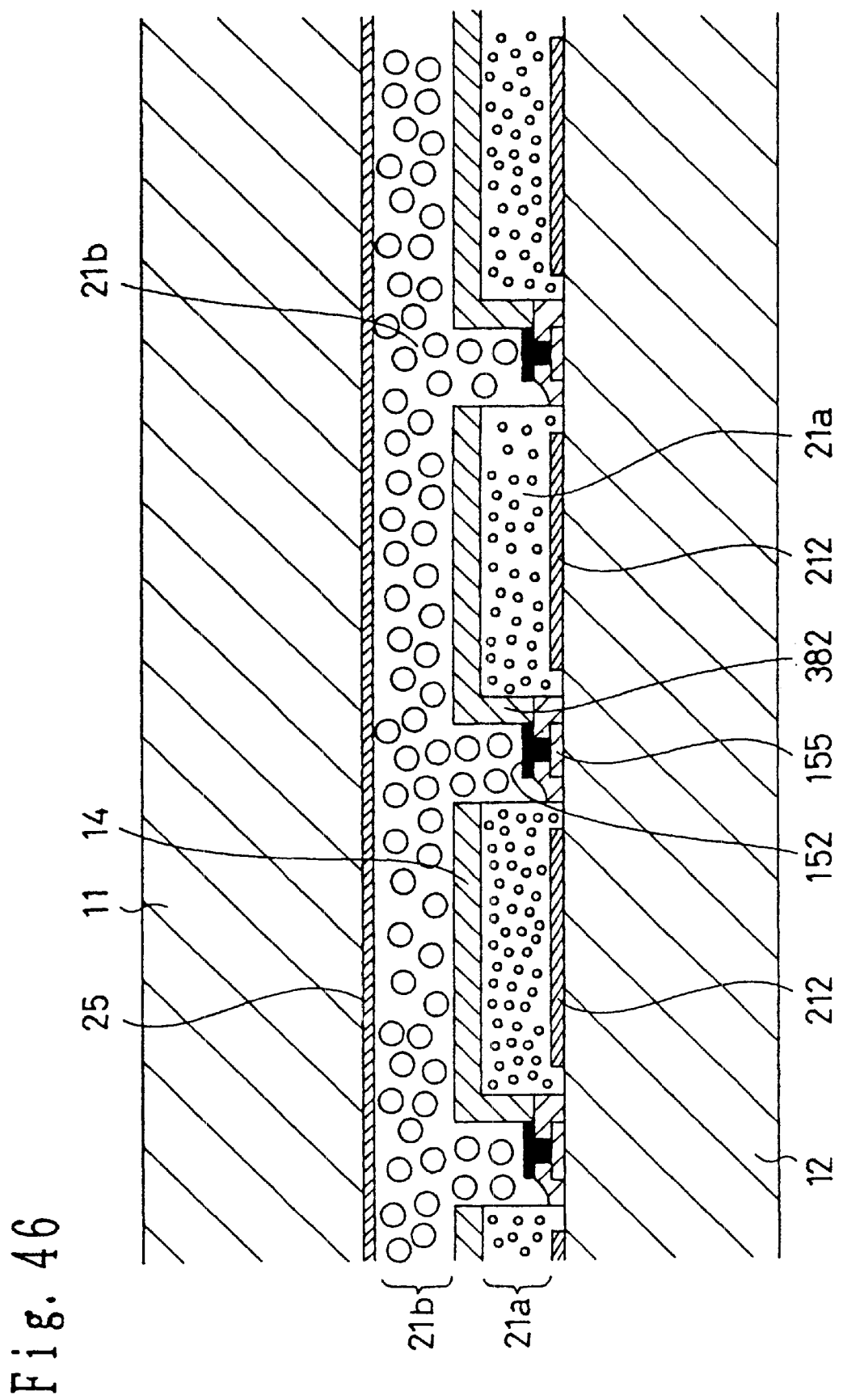
FIG. 46 is a sectional view of the liquid crystal display panel in another embodiment of the present invention.

FIGS. 40 and 41 show display panels in which the liquid crystal layer 21 is constituted by two layers, and the specific constitution is shown in FIG. 46. FIG. 46 is a sectional view of the display panel of the present invention. Between a pixel electrode 14 and a common electrode 212 a first liquid crystal layer 21*a* is held, and between the pixel electrode 14 and a counter electrode 25 a second liquid crystal layer 21*b* is held. On a TFT 155 a light shielding film 152 or 202 is formed to prevent the occurrence of a photoconductor phenomenon. It is a matter of course that the composition and constitution (e.g., average particle diameter) of the liquid crystal layers 21*a* and 21*b* may be changed.

Figure 49:
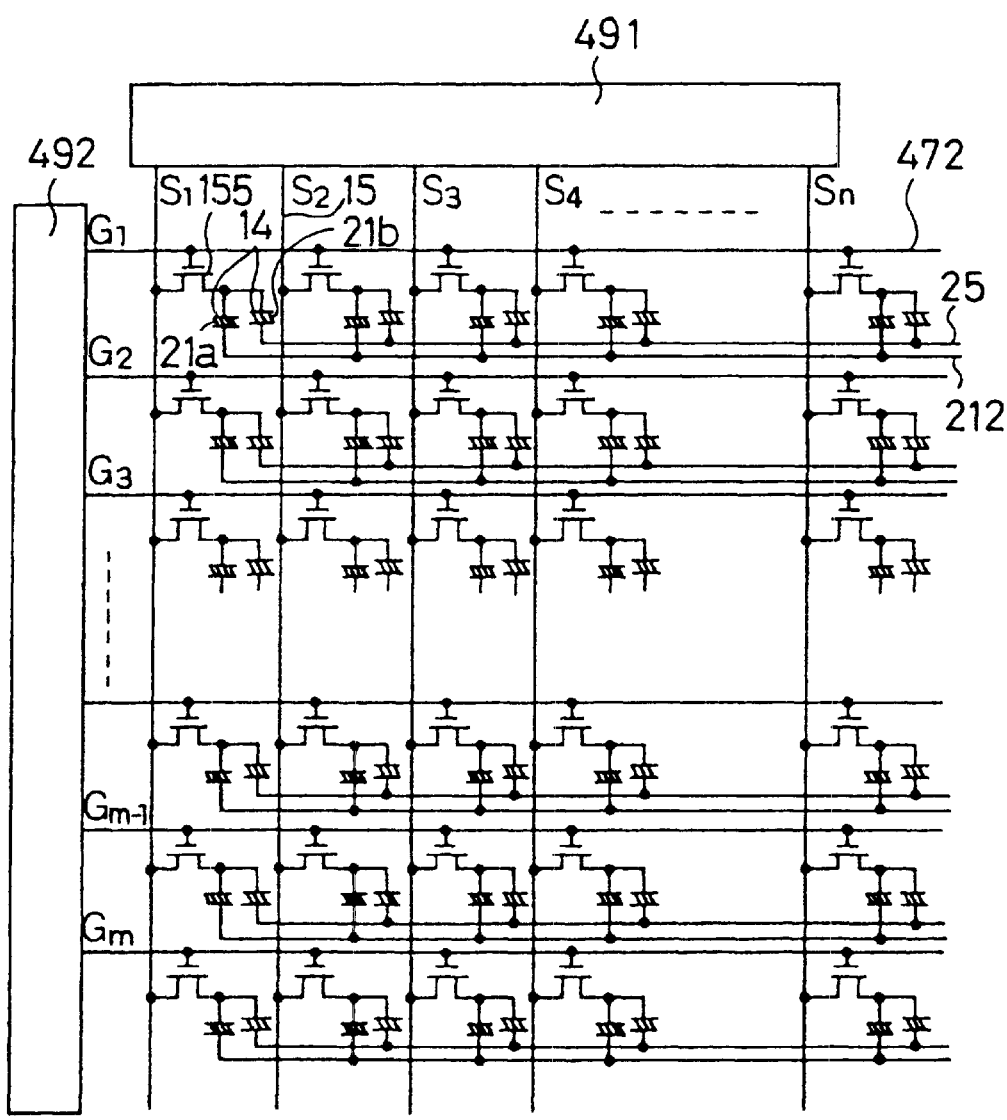
FIG. 49 is an equivalent circuit diagram of the liquid crystal display panel of the present invention shown in FIG. 46.

FIG. 49 is an equivalent circuit diagram of the display panel of FIG. 46. As evident in FIG. 49, the liquid crystal layers 21*a* and 21*b* are arranged with the pixel electrode 14 as a common electrode. The pixel electrode 14 is connected to the drain terminal of a TFT 155 through a connecting portion 382. A common electrode 212 is a stripe-shaped electrode consisting of ITO. Outside the display area of the panel, the common electrode 212 is electrically connected to a counter electrode 25.

Figure 47:
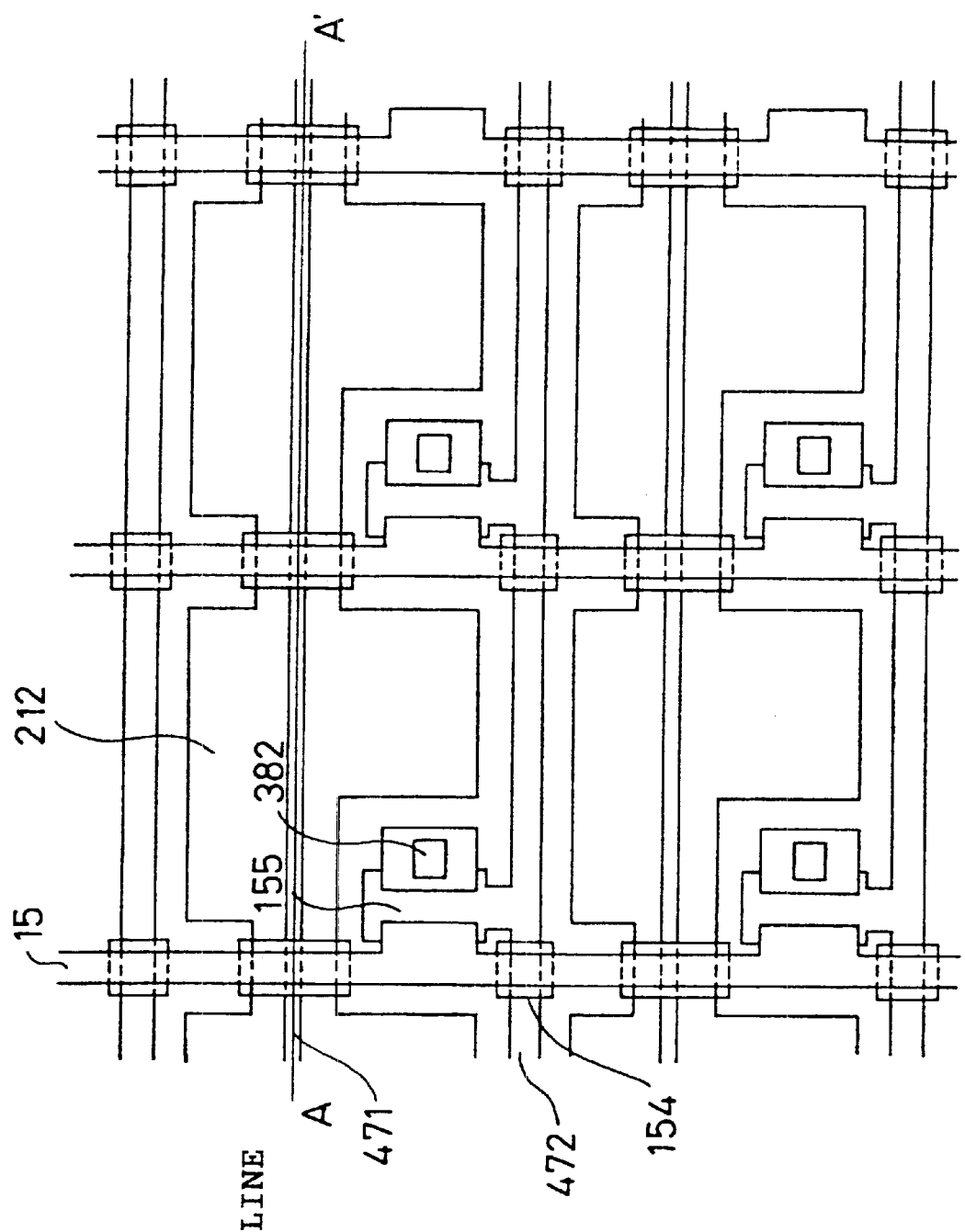
FIG. 47 is an explanatory diagram of the liquid crystal display panel shown in FIG. 46.

FIG. 47 is a plan view of the array substrate 12. The pixel electrodes 14 have been removed to make understanding of the substrate 12 easy. The common electrode 212 is an electrode common to all pixel electrodes 14. It is preferable that the common electrode should be originally a flat face electrode (mat electrode), but, patterning of the common electrode is difficult because it crosses a gate signal line 471. For this reason, in the present invention, an insulating film 154 is employed to maintain insulation between the common electrode and source signal lines 15. The source signal lines 15 extend in the horizontal direction of each pixel and are electrically connected to another common electrode 212 at a point outside the display area. Furthermore, the source signal lines 15 are connected to the counter electrode 25 at a point outside the display area. Note that the counter electrode 25 is a mat electrode consisting of ITO.

The place at which the common electrode 212 crosses the source signal lines 15 narrows the width of the common electrode 212. This is for preventing a short circuit between the common electrode 212 and the source signal lines 15 and also reducing the parasitic capacity of the source signal line 15. It is preferable that the width of the crossed portion should be less than ½ of pixel size. For example, if the vertical length of pixel size is 100 μm, the width of the crossed portion is reduced to less than 50 μm.

However, since the common electrode 212 is formed from ITO, the resistance value reaches 100 KΩ or more, when pixel size is 50 μm and panel size is about 3 inches. For this reason there is the problem that when voltage is written from the TFT 155 to the pixel electrode 14, the electric potential of the common electrode 212 changes at the same time. As a countermeasure, in the present invention, a metal wire 471 consisting of metal material is formed on the common electrode 212. The metal material employs, for example, chrome (Cr).

Figure 48:
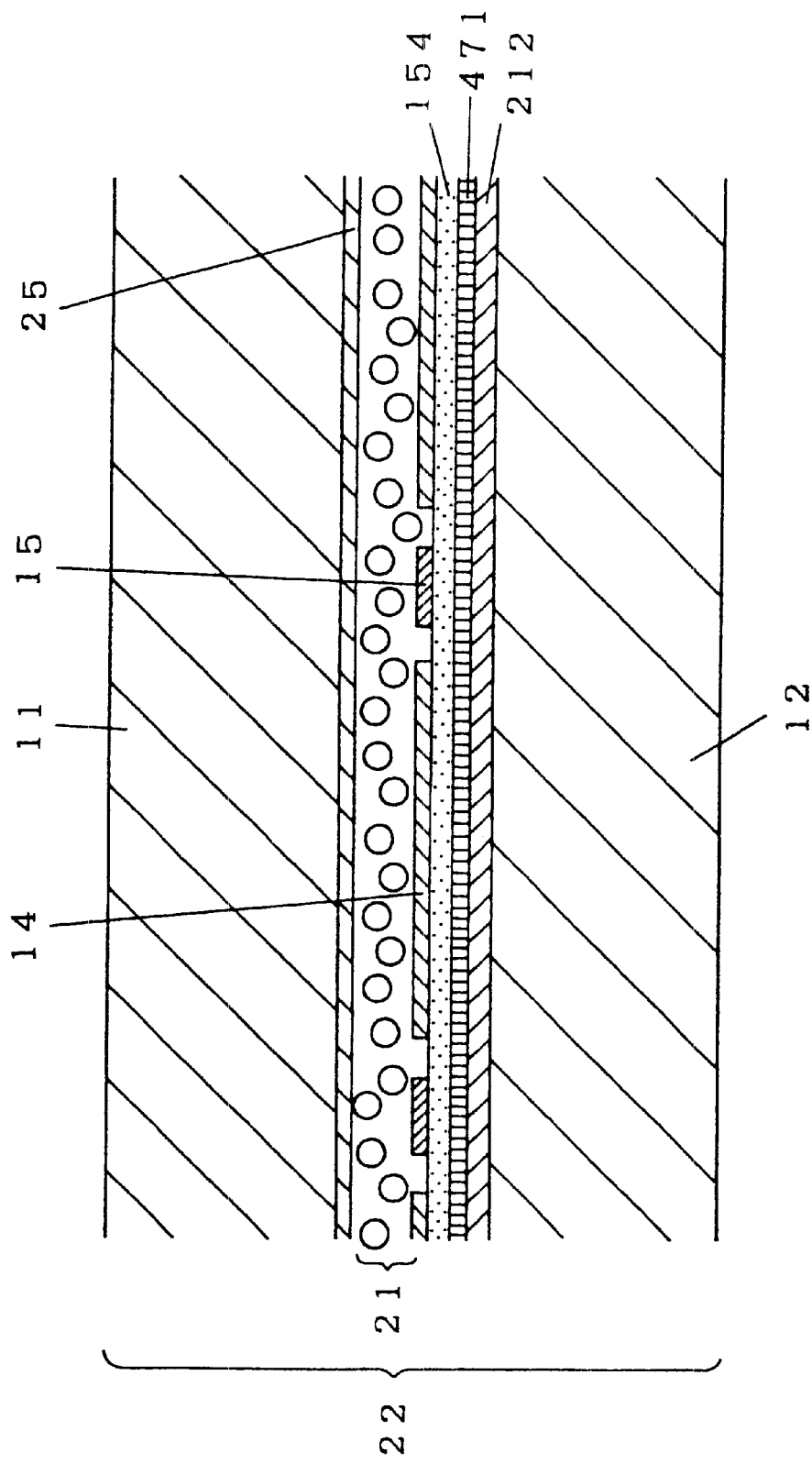
FIG. 48 is an explanatory diagram of the liquid crystal display panel shown in FIG. 46.

A sectional view along line AA' of FIG. 47 is shown in FIG. 48. On the array substrate 12 an SiO$_2$ film (not shown) and the stripe-shaped common electrode 212 consisting of ITO are formed, and on the common electrode 212 the metal wire 471 is formed. 154 denotes an insulating film consisting of SiO$_2$, Ta$_2$O$_3$, TaOx, and SiNx. To prevent pinholes, the insulating film 154 is formed by performing a deposition process a plurality of times.

By forming storage capacitance between the common electrode 212 and the pixel electrode 14, the potential on the pixel electrode 14 can be held for a one frame interval even if the OFF characteristic of the TFT 155 is not satisfactory. Particularly, in the case where the TFT has been formed by a low-temperature polysilicon technique, the OFF state of the TFT is not satisfactory (because leakage of light occurs in the OFF state), so formation of the common electrode 212 shown in FIG. 46 is useful. The constitution in which the common electrodes 212 in the form of stripes are formed from ITO in the row directions of pixels is not only specific to the display panel of FIG. 46 having two PD liquid crystal layers, but it is also useful for other liquid crystal display panels (e.g., a TN liquid crystal display panel, a PD liquid crystal display panel with a single liquid crystal layer, etc.).

In FIG. 46, in the case where the liquid crystal layers 21a and 21b are formed with PD liquid crystals, it is preferable that the average particle diameters of the waterdrop-like liquid crystals or the average particle diameters of polymer networks should be different. It is also preferable that one of the liquid crystals contain a guest-host liquid crystal and also resin be colored. The liquid crystal layers 21a and 21b are not only formed by PD liquid crystals, but they may also be formed by TN liquid crystals as shown in FIG. 45. In addition, it is a matter of course that the contents described in the aforementioned embodiment are applied to the display panel of FIG. 46. For example, dielectric films are stacked on each of the electrodes 25 and 14 to obtain an antireflection effect, and an air coat is formed on an interface which contacts air.

Figure 50:
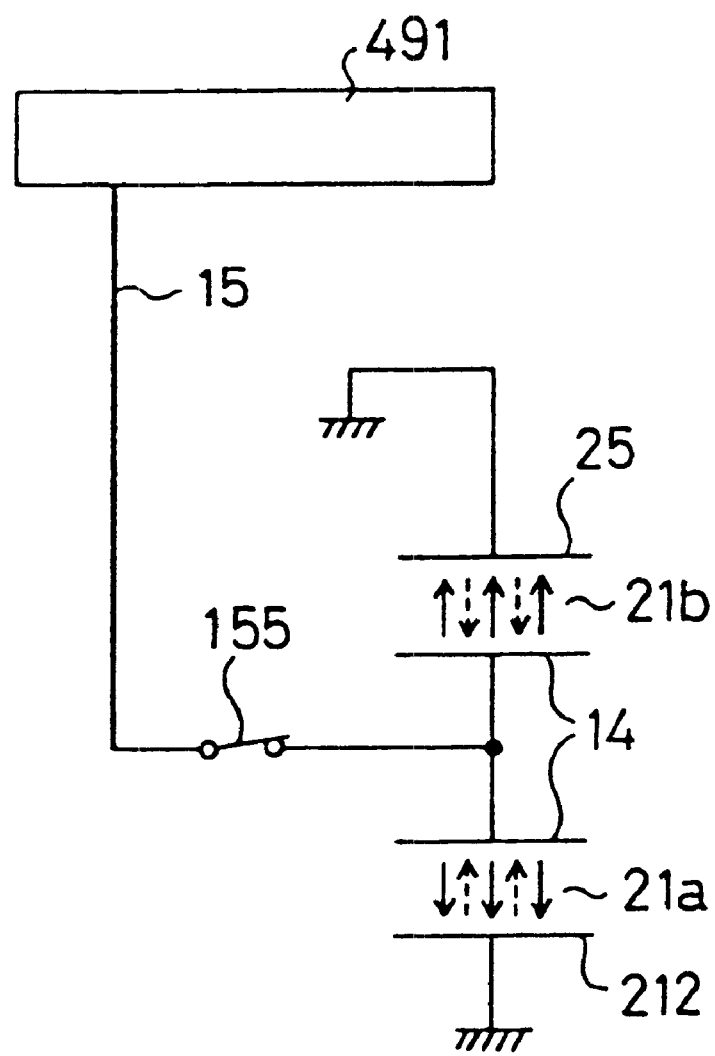
FIG. 50 is an explanatory diagram of the operation of the liquid crystal display panel of the present invention shown in FIG. 46.

FIG. 50 is an explanatory diagram for explaining the drive method of the display panel of FIG. 46. At the first field (frame) a source driver circuit 491 outputs a positive-polarity video signal, and the video signal is passed through the source signal line 15 and the TFT 155 and written to the pixel electrodes 14. On the other hand, the counter electrode 25 and the common electrode 212 are connected to ground.

If the positive-polarity video signal is written to the pixel electrodes 14, electric fields shown by solid lines will be produced in the liquid crystal layers 21a and 21b as shown in FIG. 50.

At the second frame next to the first frame, the driver circuit 491 outputs a negative-polarity video signal, and the video signal is written to the pixel electrodes 14. Therefore, electric fields shown by dotted lines will be produced in the liquid crystal layers 21a and 21b. As described above, voltages different in signal polarity for each frame are written to the pixel, and an AC voltage is applied to the liquid crystal layer 21.

Therefore, if voltage is applied to the pixel electrodes 14, the two liquid crystal layers 21a and 21b will be light-modulated at the same time. In comparison with the conventional constitution in which only a single layer is light-modulated, the drive method is the same, but, if two liquid crystal layers are employed, the display contrast will be considerably enhanced.

Figure 51:
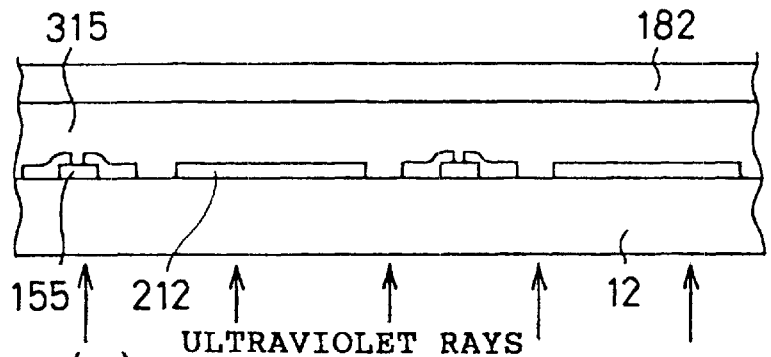
FIG. 51 is an explanatory diagram of the fabrication method of the liquid crystal display panel of the present invention shown in FIG. 46.
Figure 51:
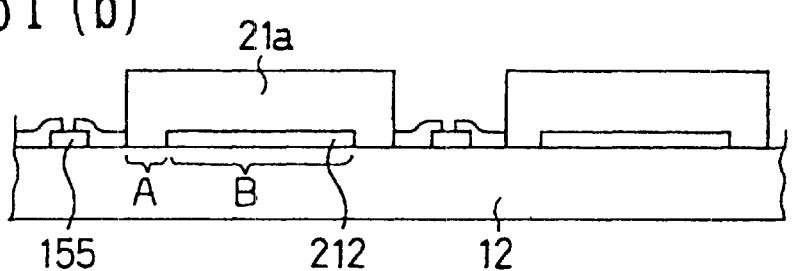
Figure 51:
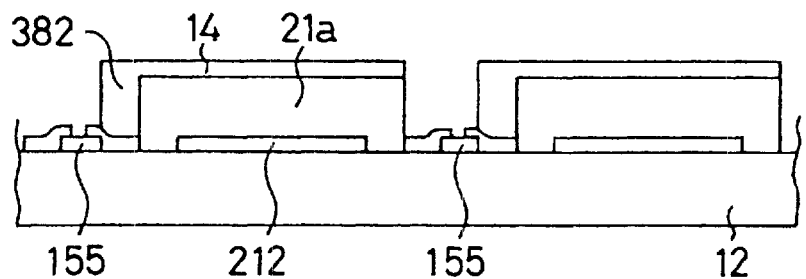
Figure 51:
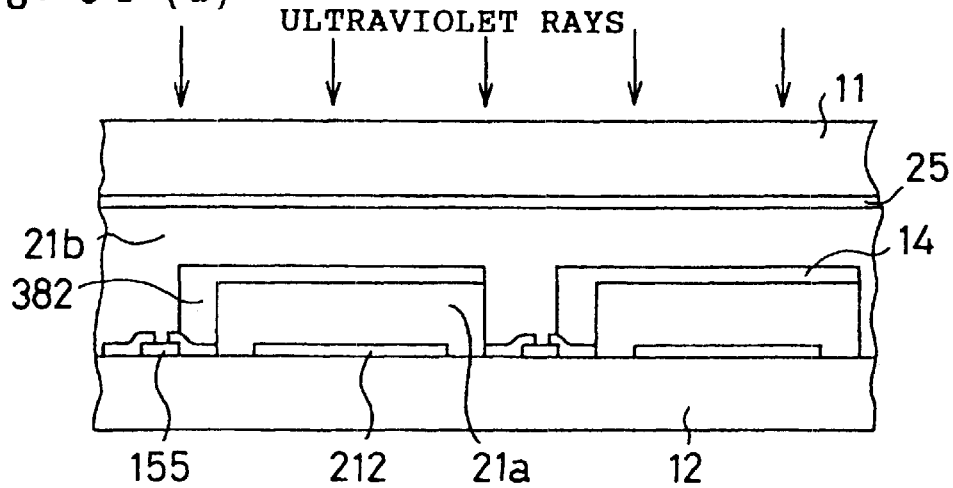

A description will hereinafter be made of the fabrication method of the display panel of the present invention shown in FIG. 46, referring to FIG. 51. In FIG. 51($a$), a mixed solution 315 is coated on an array substrate 12 and held between a separation film 182 and the substrate 12. The coating method employs, for example, a spinner method, a roller coater method, or a drop method. In the case where the mixed solution can be coated even by a spinner, it is obvious that there is no need to employ the separation film 182.

Then, ultraviolet rays are radiated through the back surface of the array substrate 12. The liquid crystal component in the mixed solution easily absorbs light having a wavelength of 370 to 390 nm, so there is the fear that the liquid crystal component will change its quality. Therefore, ultraviolet rays having a wavelength of more than 370 nm should be cut. Ultraviolet ray cut can be easily performed with a ultraviolet ray cut filter.

If ultraviolet rays are radiated through the back surface of the array substrate 12, the ultraviolet rays will set the resin component of the mixed solution 315, thereby phase-separating the liquid crystal component and the resin component from each other. However, the ultraviolet rays incident on the TFT 155 and the gate and source signal lines 15 (not shown) are shut out, so the resin component of the mixed solution 315 on these portions does not set.

Also, the common electrode 212 does not easily transmit ultraviolet rays, because it consists of ITO. For this reason, the mixed solution 315 on the common electrode 212 (indicated by B) shown in FIG. 51($b$) is different in the radiation quantity of the ultraviolet ray from the mixed solution on the portion (indicated by A) not formed with the common electrode 212.

The average diameter of a waterdrop-like liquid crystal is usually small, if the radiation quantity of the ultraviolet ray per unit time is great, and vice versa. If this average diameter becomes small, it will become difficult for a liquid crystal to respond to an applied voltage. In the case where a PD liquid crystal is employed as the light modulating layer of a liquid crystal display panel, there is a need to cause the liquid crystal layer 21 to be in a light transmitting state by a voltage of less than a fixed value, and at the same time, there is a need to make the scattering characteristic highest by a voltage of less than a fixed value. These conditions are obtained by examining process conditions (strength of an ultraviolet ray, temperature of the mixed solution 315, content ratio between the liquid crystal component and the resin component, film thickness of the liquid crystal layer 21, etc.) Therefore, in FIG. 51($a$), the strength of ultraviolet rays is set so that the liquid crystal layer 21 (B range) on the common electrode 212 can make the scattering characteristic highest in a range in which voltage can be applied. On the other hand, since the liquid crystal layer 21 on the A portion receives ultraviolet rays stronger than a proper value, the average diameter of the waterdrop-like liquid crystal becomes smaller than a proper value. However, this is beneficial. Since the liquid crystal layer 21 in the A range is not an effective range for image display, it is preferable that the liquid crystal layer 21 in the A range should not be operated by voltage applied to the pixel electrode 14 or common electrode 212. If the average diameter is small, the liquid crystal layer will not change an oriented state and will perform black display.

After radiation of ultraviolet rays, unpolymerized mixed solution 315 is washed off. Washing is performed with pure water or an alcohol. This washing causes the mixed solution 315 on the drain terminal of the TFT 155 to be washed off. Then, a pixel electrode 14 is formed on the liquid crystal layer 21a. The method of forming the pixel electrode 14 is easy because a PD liquid crystal is resin. The process of forming ITO on a resin color filter is well known in prior art. At the same time as formation of the pixel electrode 14a, the drain terminal of the TFT 155 and the pixel electrode 14 are connected together.

For example, when the liquid crystal layer 21a is thick, there are cases where difference in level occurs between the pixel electrode 14 and the drain terminal of the TFT 155. In such cases, in order to prevent the difference in level, metal or conductive material such as conductive paste is previously formed on the drain terminal of the TFT, and on that, the pixel electrode 14 is formed.

Figure 52:
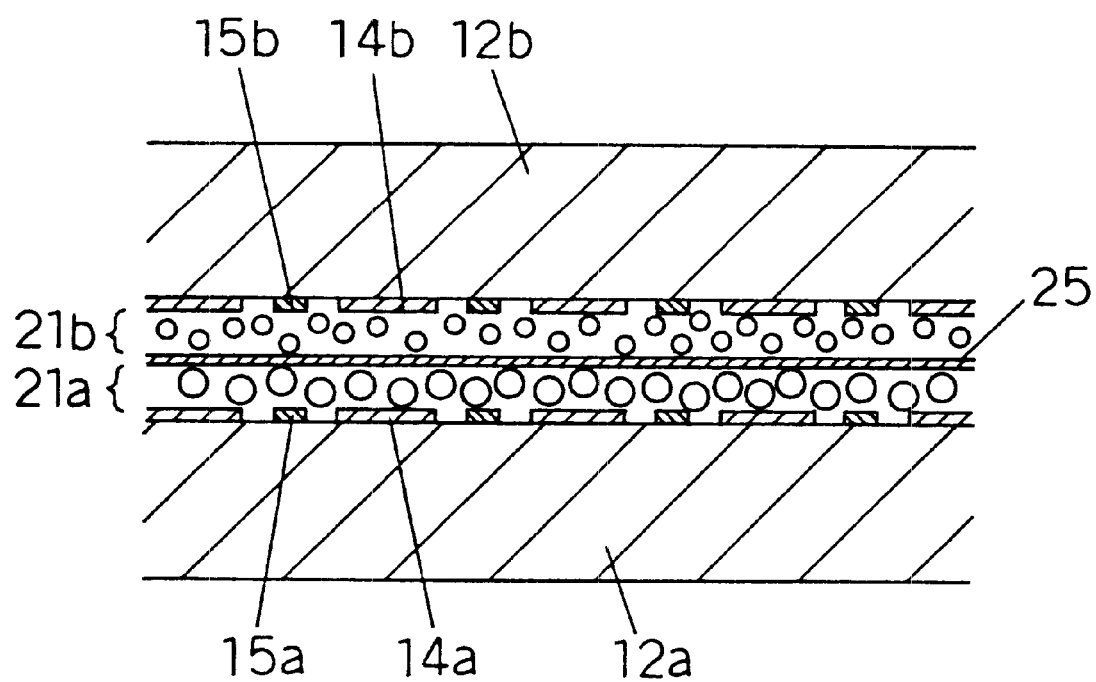
FIG. 52 is a sectional view of the liquid crystal display panel in another embodiment of the present invention.

The constitution in which the liquid crystal layer 21 consists of two layers is also shown in a display panel shown in FIG. 52. In the constitution shown in the FIG. 52, a single counter electrode 25 and two liquid crystal layers 21a and 21b are formed between two array substrates.

As shown in FIG. 52, if two array substrates 12a and 12b are employed, the display panel can enhance display contrast, although it is a transmission type display panel.

In the constitution of FIG. 52, signals which are applied to the pixel electrodes 14a and 14b are controlled so that they have opposite polarities. For example, when a voltage of +6 V is applied to the pixel electrode 14b, a voltage of −6 V is applied to the pixel electrode 14a. In other words, a voltage of 6 V−(−6 V)=12 V can be applied to the liquid crystal layer. After one frame the polarity is reversed and an alternating signal is applied to the liquid crystal 21.

From the aforementioned, the constitution of FIG. 52 can apply voltage which is double a voltage applied to the pixel of a normal liquid crystal display panel. Therefore, since the film thickness of the liquid crystal can be made thick (double), display contrast can be enhanced.

The array substrates 12a and 12b can employ the same material. It is a matter of course that the array substrates 12a and 12b need to have opposite scanning directions of a source driver circuit. The counter electrode 25 may be replaced with the adhesive layer 371. The drive method is the same as the previous description. However, since there is not the counter electrode 25, loss will arise in voltage that is applied to the liquid crystal layer unless the timing at which voltage is applied to the pixel electrode 14a is the same as the pixel electrode 14b.

Figure 53:
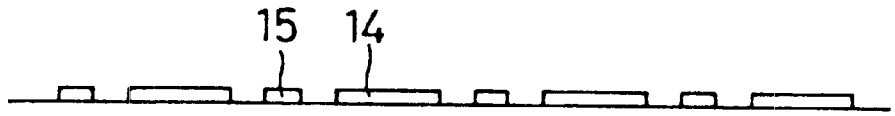
FIG. 53 is an explanatory diagram of the fabrication method of the liquid crystal display panel of the present invention shown in FIG. 52.
Figure 53:
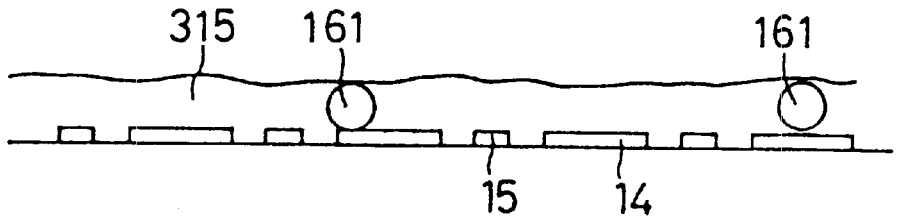

For the fabrication method of the liquid crystal display panel shown in FIG. 52, a description thereof will hereinafter be made with FIG. 53. First, the array substrate 12 and the mixed solution 315 are prepared (see FIG. 53(a)).

The mixed solution 315 is coated on the array substrate 12. As the coating method, there is a roller coater method and a spinner method. When the coating is performed, beads 161 for controlling the film thickness of the liquid crystal layer 21 are scattered previously or coated at the same time as the mixed solution (see FIG. 53(b)).

Figure 53C:
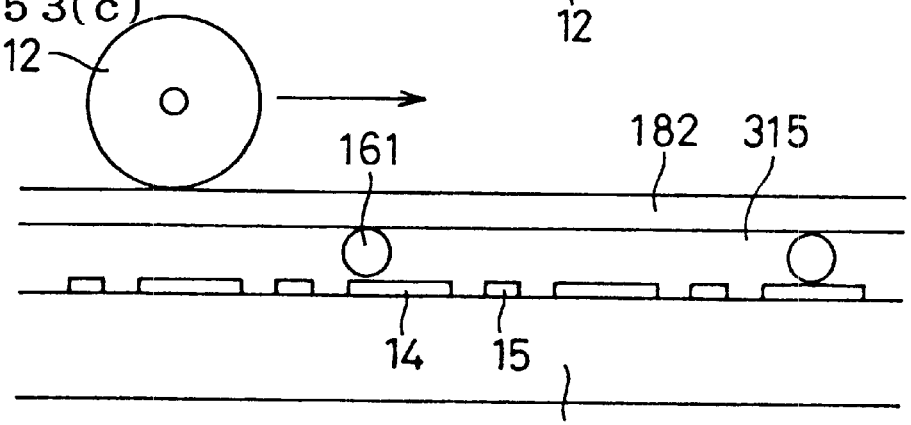
Figure 53:
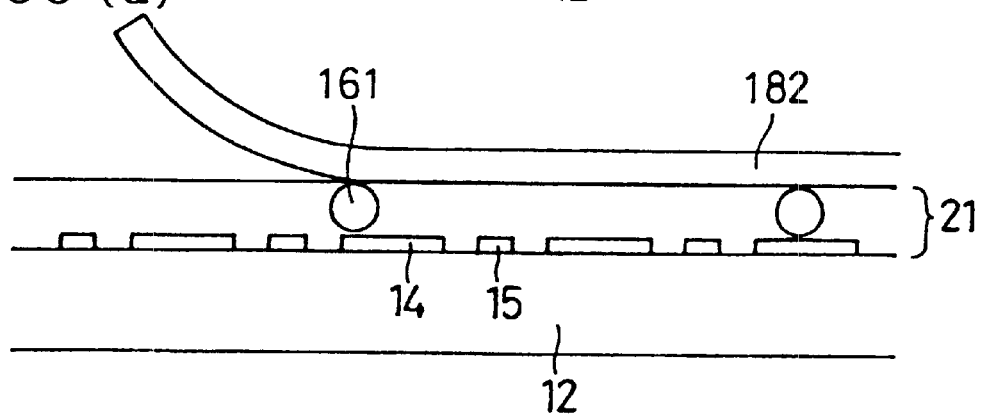

Then, a separation film 182 or a substrate coated with fluororesin is superimposed on the mixed solution 315. At this time, it is superimposed little by little from the end of the array substrate 12 so that air does not enter. The state at that time is shown in FIG. 53(c). Then, pressure is applied on the separation film 182 from above. As the method, pressure is applied from the end of the separation film 182, preferably parallel to the source signal line 15 or gate signal line 472. In other words, pressure is applied along the signal line with a roller 312 or such. An excess of mixed solution 315 is pushed out (see 53(c)).

Then, ultraviolet rays are radiated, thereby polymerizing and setting (or phase-separating) the resin component present in the mixed solution 315. As described above, after resin has been polymerized (polymer 24), the separation film 182, etc. is peeld and removed. Since fluororesin is easily separated (or peeled), the separation film 182 can be easily separated from the liquid crystal layer 21. The state after the aforementioned process is shown in FIG. 53(d).

Another set of array substrate 12 (two array substrates) formed with a liquid crystal in the aforementioned procedure is fabricated. Then, either of the two array substrates is again coated extremely thin with the mixed solution 315. Next, the two array substrates are pasted together. Thereafter, ultraviolet rays are radiated once more. The mixed solution 315 last coated becomes an adhesive layer 371, and the two array substrates 12 is integrally formed into a single liquid crystal panel. Note that the adhesive layer may be an acrylic resin layer or an urethane resin layer.

Light incident on the PD liquid crystal layer 21 is scattered and causes halation. If the light with halation is incident on the driver circuit 541 (driver circuits 491, 492, etc.) of the liquid crystal panel, a photoconductor phenomenon will occur in the transistors constituting the aforementioned driver circuit, causing failure. This phenomenon frequently occurs in the case where the driver circuit is formed with a low-temperature polysilicon or high-temperature polysilicon technique.

Figure 54:
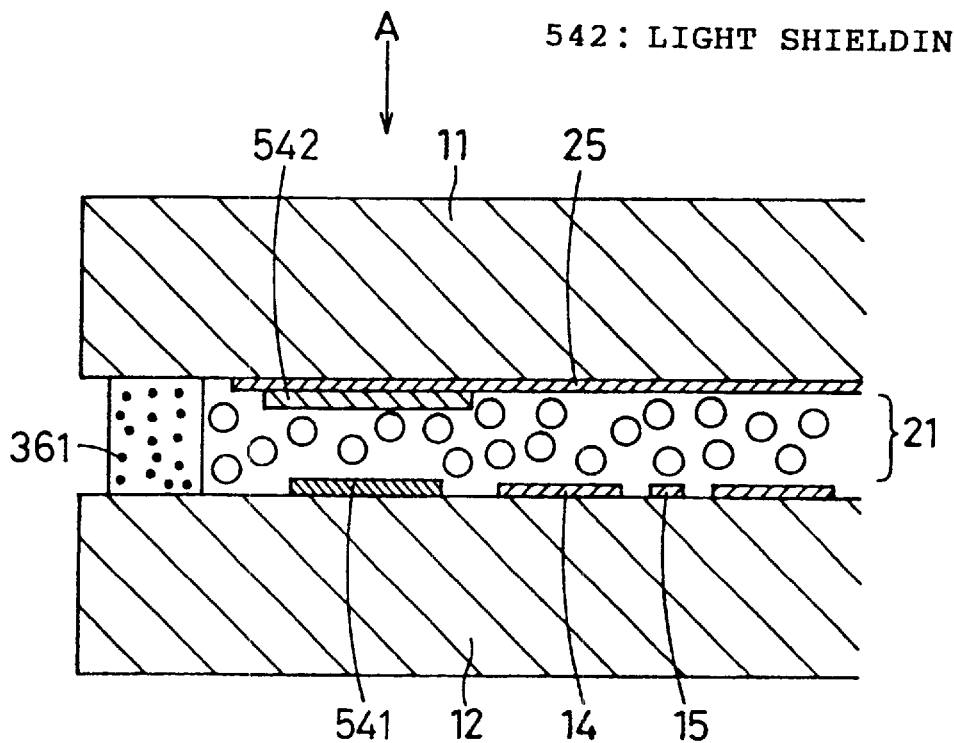
FIG. 54 is a sectional view of the liquid crystal display panel of the present invention forming a light shielding film on the driver circuit.
Figure 55:
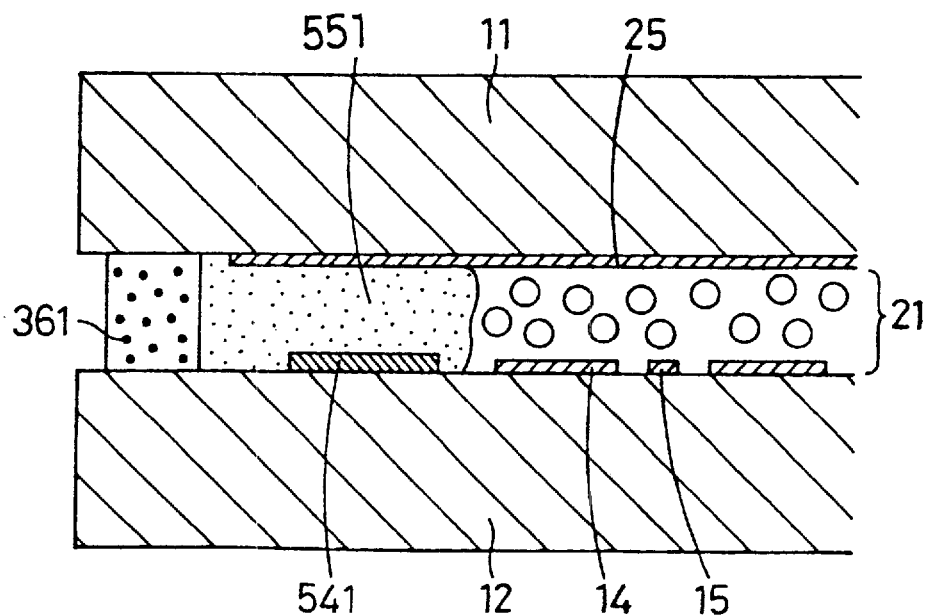
FIG. 55 is a sectional view of the liquid crystal display panel of the present invention forming a light absorbing layer on the driver circuit.
Figure 56:
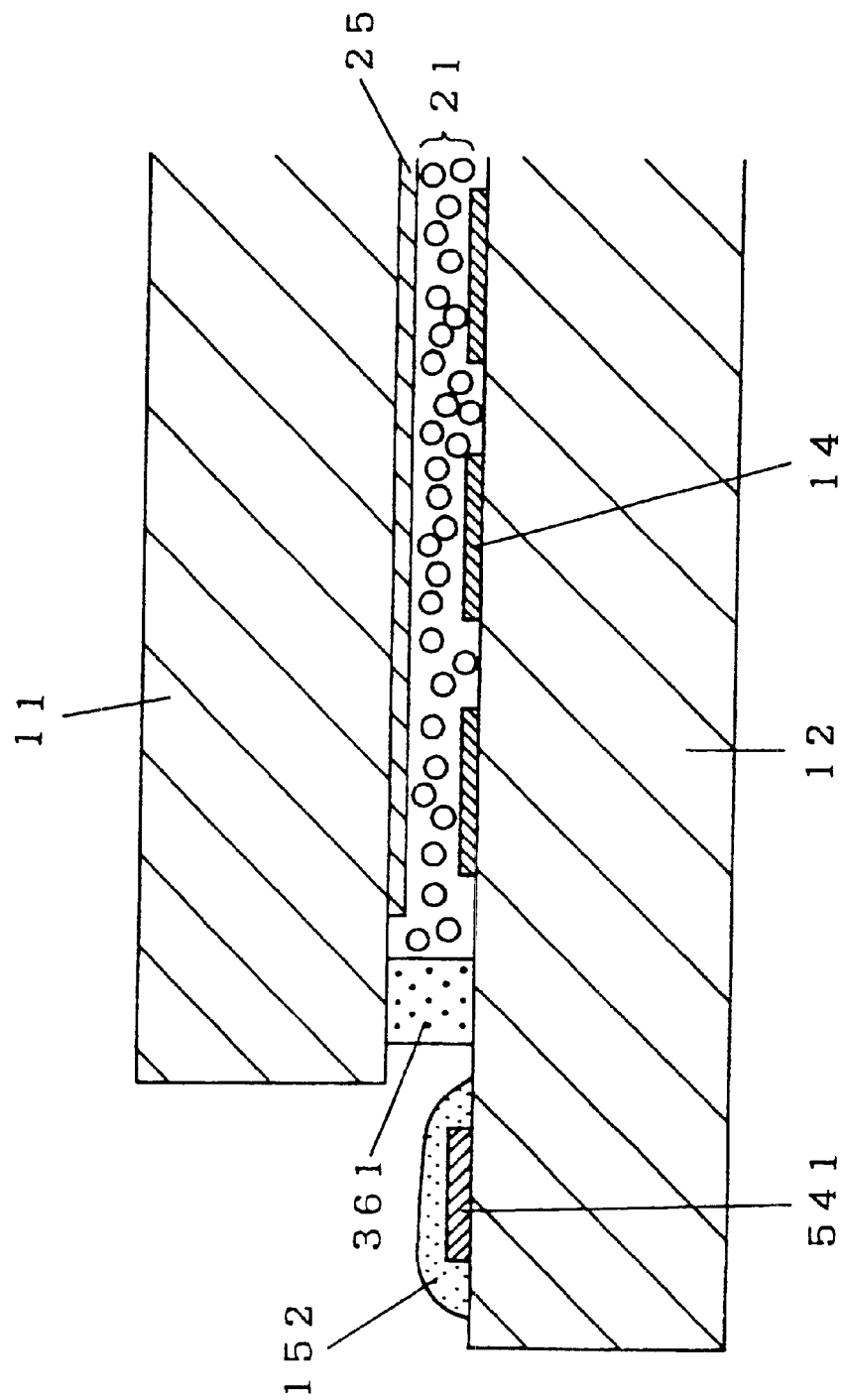
FIG. 56 is a sectional view of the liquid crystal display panel of the present invention forming the light absorbing layer on the driver circuit.

Constitutions for preventing the photoconductor phenomenon of the driver circuit are shown in FIGS. 54, 55, and 56. FIG. 54 shows constitution formed with a light shielding film 542 on a driver circuit 541. The material of the light shielding film 542 may be metal material such as chrome (Cr), tantalum (Ta), and molybdenum (Mo), but, it is preferable that it should be a resin light shielding film which absorbs similar light as the light absorbing film 152. The reason for this is that the liquid crystal layer 21 absorbs irregularly reflected light and thereby can suppress hich is incident on the driver circuit 541. If it is a metallic light shielding film, light in the A direction can be perfectly shut out, but the halation light arising from the liquid crystal layer 21 will be reflected and conversely, it will be incident on the driver circuit 541. Even in a metal film, a composite layer (2-layer chrome) consisting of metal chrome and chrome oxide is low in reflectance and usable. In addition, a dielectric mirror consisting of a dielectric mutilayer film may be employed. The dielectric mirror is suitable because there is no absorption of light and no generation of heat.

It is advantageous to fill the driver circuit 541 and the vicinities with a light absorbing resin 551 as shown in FIG. 55 (resin light shielding film 152 of FIG. 16). Particularly, it is preferable that the light absorbing resin 551 adopt light setting resin. For example, it is ultraviolet ray setting type acrylic resin. When pasting the array substrate 12 and the counter substrate 11 together, the aforementioned light absorbing resin 551 is dropped on the driver circuit 541, and both substrates 11 and 12 are pasted together. Thereafter, the dropped resin is further set by radiating light on the light absorbing resin 551. The light absorbing resin 551 has a function of preventing the incidence of light onto the driver circuit 541 and also sealing resin. Therefore, seal resin 361 of FIG. 55 may be omitted.

As shown in FIG. 56, in the case where a driver circuit 541 is formed on the outer circumference beyond a counter substrate 11, the driver circuit 541 is covered with light absorbing resin 551.

Figure 77:
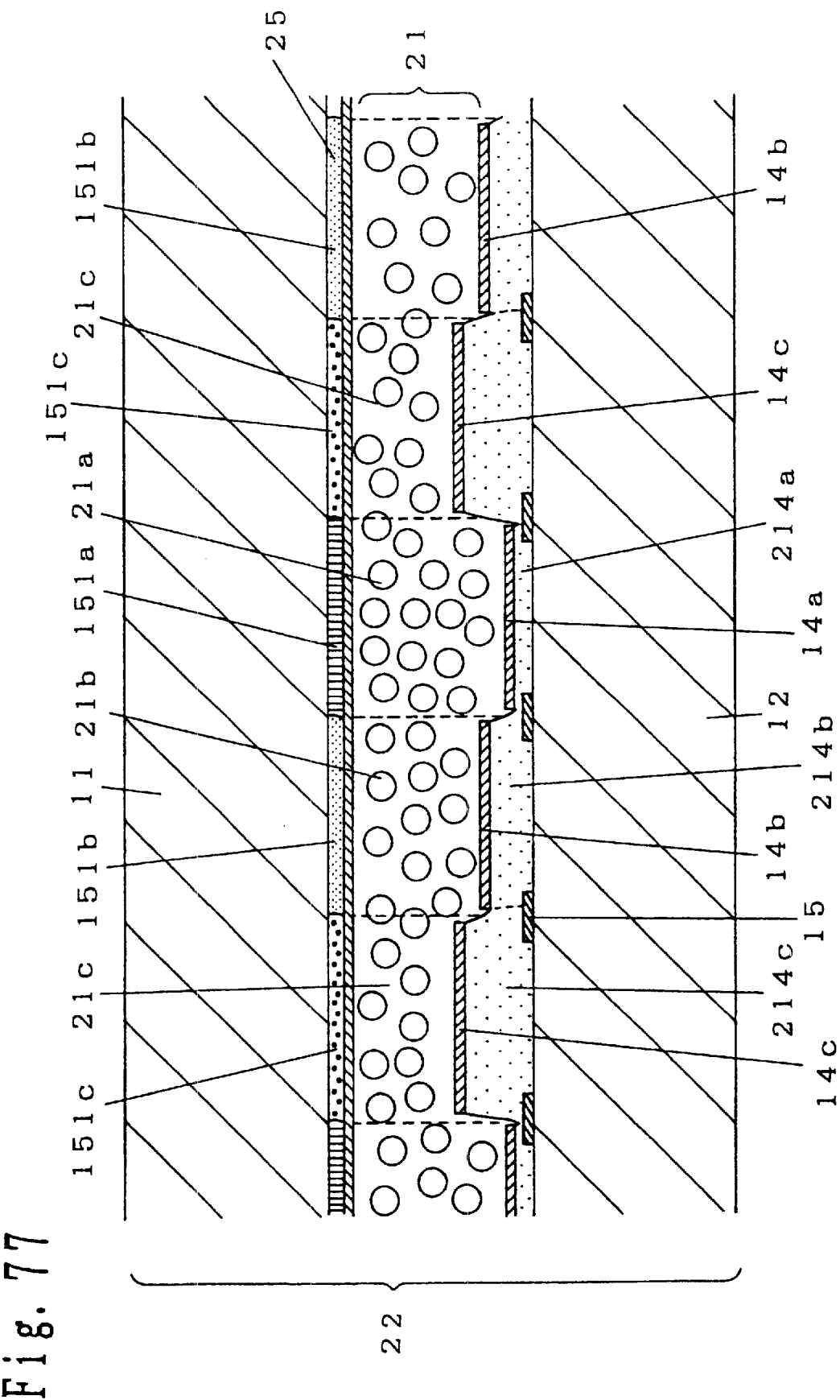
FIG. 77 is a sectional view of the liquid crystal display panel of the present invention.
Figure 78:
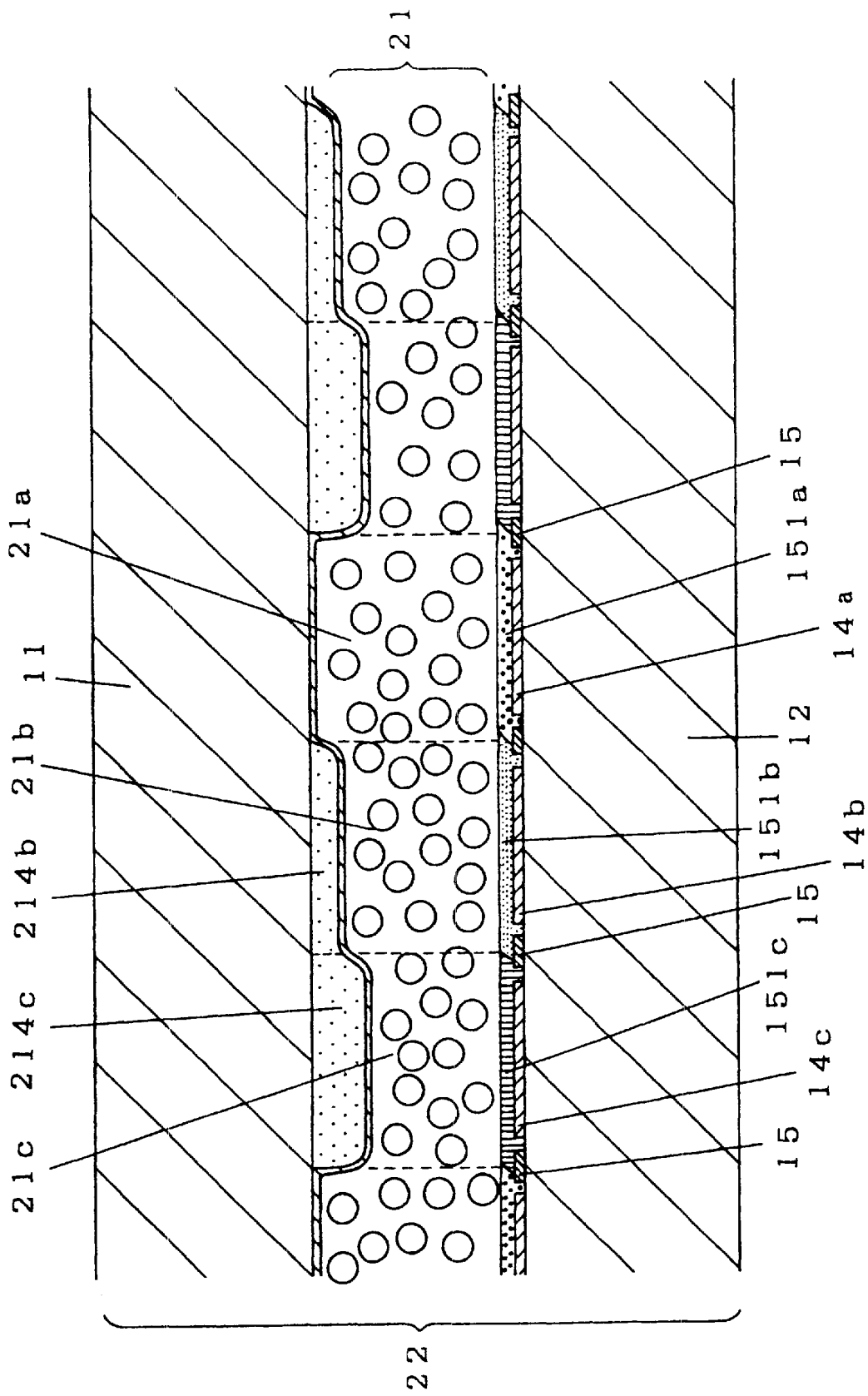
FIG. 78 is a sectional view of the liquid crystal display panel of the present invention.

In the aforementioned display panel of the present invention, while it has been described that the film thickness of the liquid crystal layer 21 is even, the present invention is not limited to this even thickness. For example, as shown in FIGS. 77 and 78, the film thickness of the liquid crystal layer 21 on each pixel electrode 14 may be changed according to the wavelengths of R, G, and B lights which modulate. FIG. 77 shows constitution formed with pixel electrodes 14 on a substrate 12 varying its film thickness, and FIG. 78 shows constitution formed with a counter electrode 25 on a substrate 11 varying its film thickness. As resin 214 varying its film thickness, there is, for example, acrylic resin and urethane resin.

In the case where the PD liquid crystal modulates R light, it is preferable that the average diameter be relatively large (0.8 to 1.2 $\mu$m). When modulating B light, it is preferable that the average diameter be relatively small (0.6 to 1.0 $\mu$m). Also, if the average diameter is large, voltage required for drive will be reduced, and conversely, if it is small, the required voltage for drive will become high (in the case where the film thickness of the liquid crystal layer 21 is the same). In order to make the display contrast as R light is modulated and the display contrast as G or B light is modulated the same, it is necessary that the film thickness of the liquid crystal layer which modulate R light should be thicker than that of G or B light and that the average diameter of the liquid crystal layer which modulate R light should be larger than that of G or B light. If the film thickness of the liquid crystal layer for R light is thick and the average diameter is large, the voltage required to make the transmittance of the liquid crystal for R light equal to those of the liquid crystals for G light and B light will be the same.

From the aforementioned description, the film thickness of the liquid crystal layer 21a on the pixel electrode 14a which modulates R light is made thick and also the average diameter is made large. Conversely, the film thickness of the liquid crystal layers 21b and 21c on the pixel electrodes 14b and 14c which modulate G light and B light is made thin and also the average diameter is made small (compared with the R pixel).

The display panel which varies the film thickness of the color filter 151 in accordance with R, G, and B lights to vary the film thickness of the liquid crystal layer had been put to practical use by a TN liquid crystal display panel having a normally black mode. However, this had corresponded to the fact that the rotary polarization characteristic of a liquid crystal depends on a wavelength. Also, if the film thickness of the color filter is varied, the spectral distribution of light which is transmitted by the color filter will vary and this variation will become a problem. In the present invention, since the film thickness of a liquid crystal is varied by transparent resin 214 and also the counter electrode 25 and pixel electrode 14 are formed on the transparent resin 214, the aforementioned problem will not arise. The color filter 151 is formed on a substrate on which the resin 214 is not formed.

In FIGS. 77 and 78, a liquid crystal layer 21a with thickest film thickness is used for R light. A liquid crystal layer 21c with thinnest film thickness is used for B light. A liquid crystal layer 21b with intermediate film thickness is used for G light. An insulating film 154 such as that shown in FIG. 16 is formed on the interface between a substrate and the liquid crystal layer 21. In addition, a light shielding film 152 consisting of resin is formed on a TFT 155, a signal line 15, etc.

Figure 79:
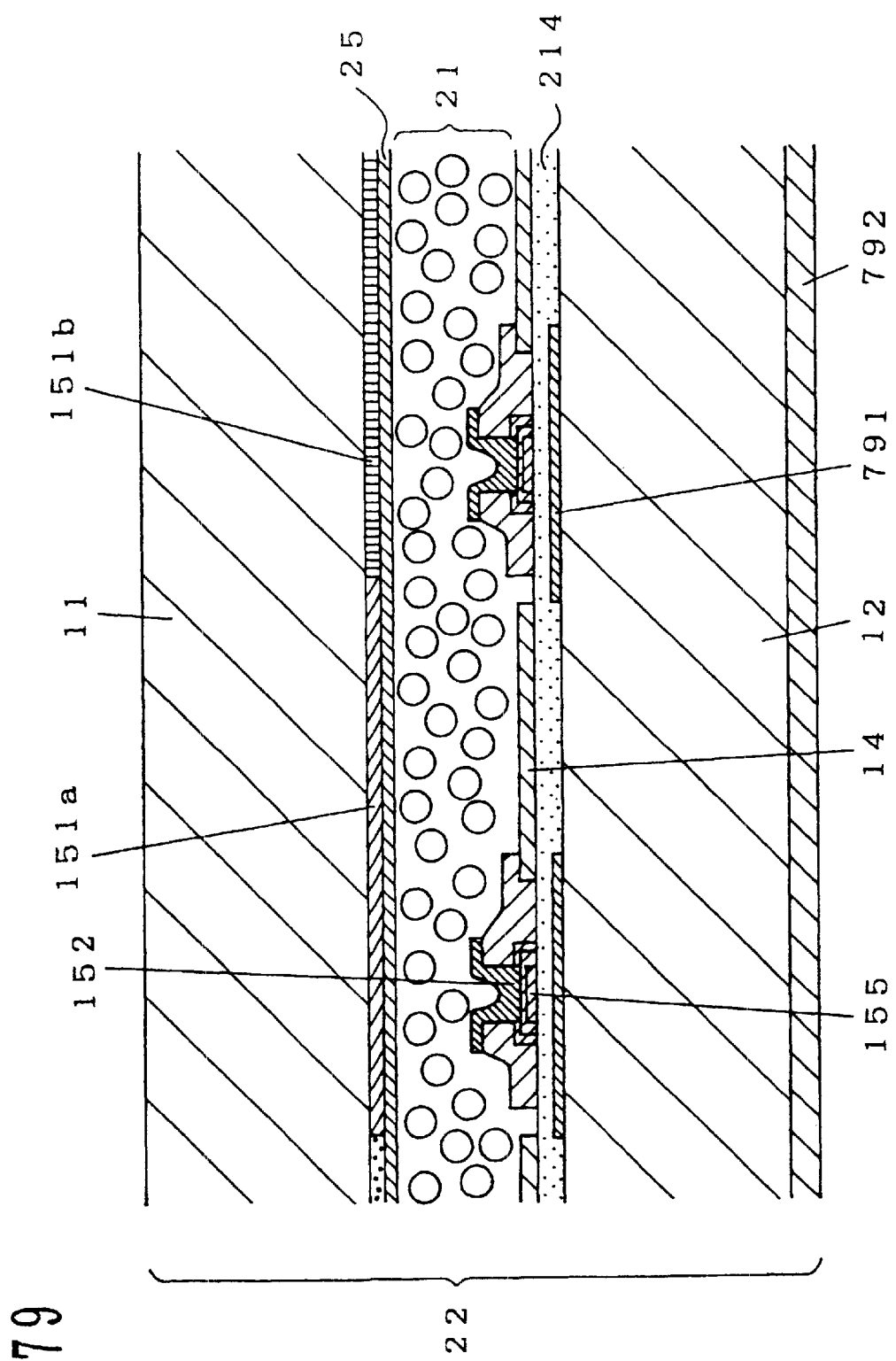
FIG. 79 is a sectional view of the liquid crystal display panel in another embodiment of the present invention.

If a reflecting film 792 is formed on the surface of an array substrate 12 or counter substrate 11, as shown in FIG. 79, the display panel can be made a reflection type. It is preferable that the material of the reflecting film 792 should be aluminum (Al). On the surface of the Al film 792 contacting air, $SiO_2$ (not shown) is formed to prevent oxidation of the Al film. Alternatively, film or such(not shown) is formed so that the Al 792 film does not contact air directly.

Light is incident through the side of the color filter 151. The incident light is reflected by the reflecting film 792, and a portion of the reflected light is incident on the TFT 155. To prevent light which is incident on the TFT 155, a light shielding film 791 is formed on the back surface of the TFT 155.

Figure 80:
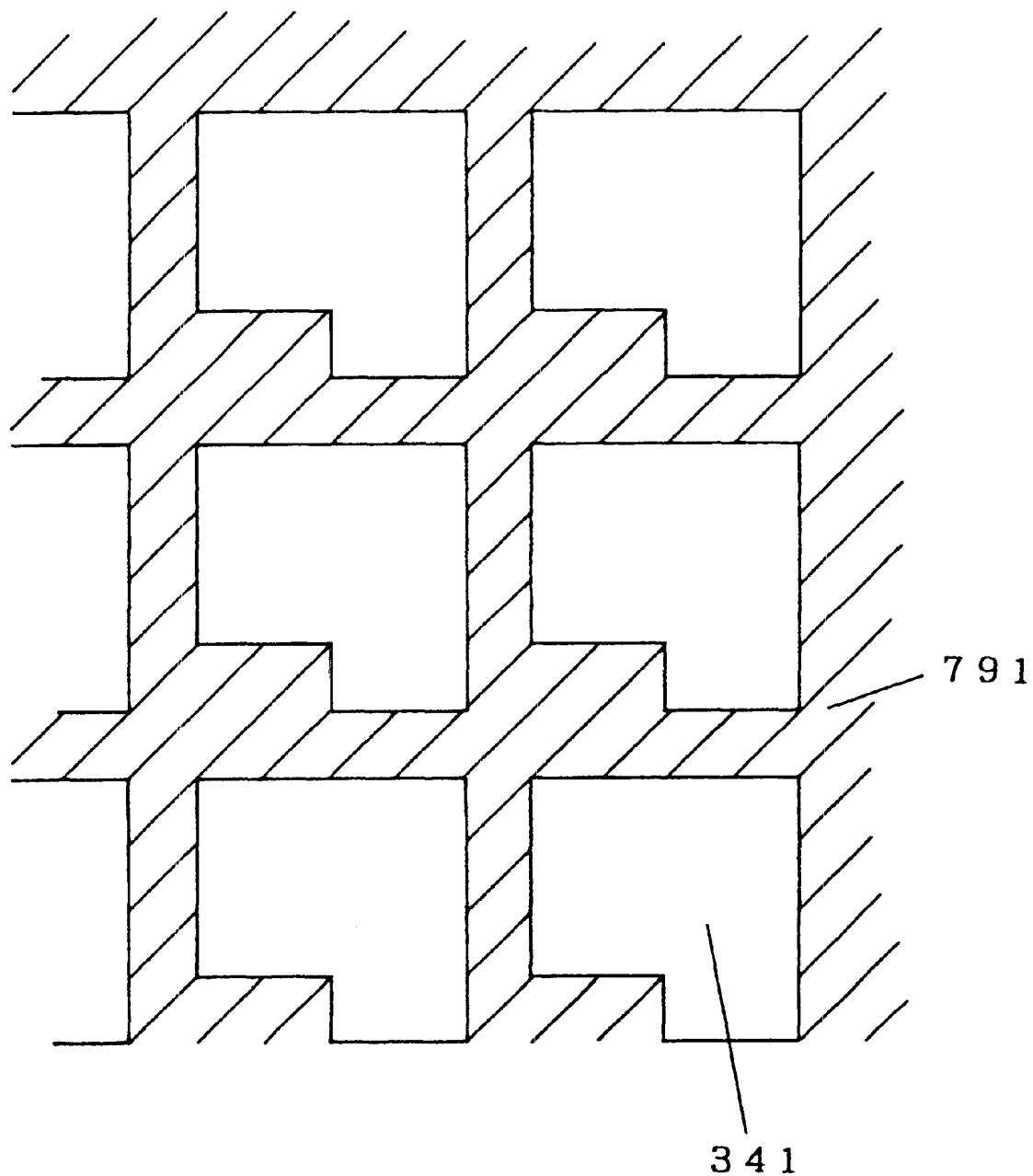
FIG. 80 is an explanatory diagram of the light shielding film of the liquid crystal display panel of FIG. 79.

The light shielding film 791, as shown in FIG. 80, is formed with openings 341 so that they correspond to pixel electrodes 14. In other words, the light shielding film 791 serves as a BM which protects light from the TFT, signal line 15, and the vicinities. The light shielding film is formed from two layers of chrome consisting of chrome metal and chrome oxide. The reason for this is that if the reflectance of the light shielding film is high, a ghost image will occur on a display image. The light shielding film 791 may be formed with resin, but, if it is formed with resin, heat resisting property will become a problem.

Figure 81:
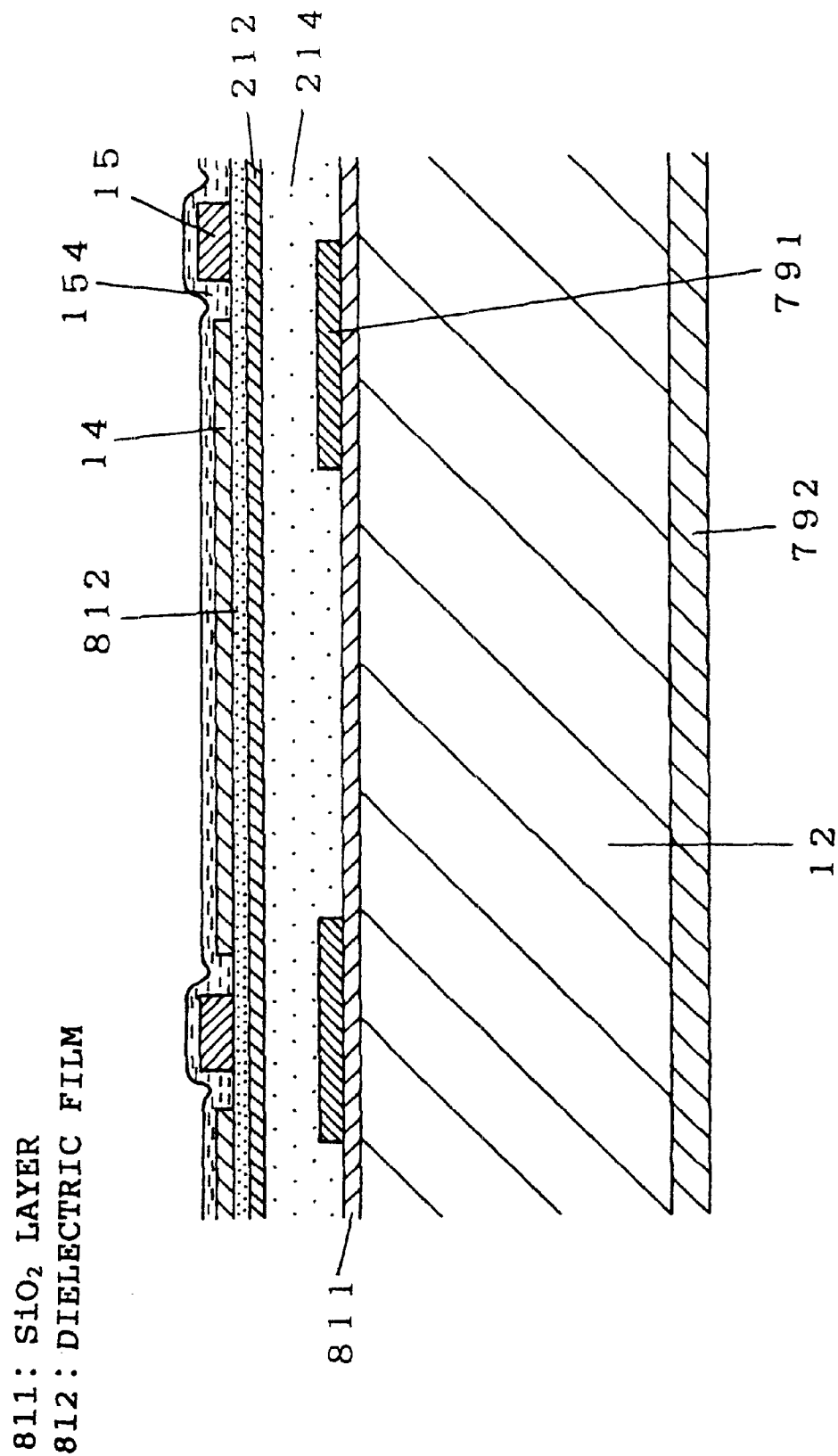
FIG. 81 is a sectional view of the display panel of FIG. 79.

FIG. 81 is a sectional view. An $SiO_2$ layer 811 with a thickness of about 0.1 $\mu$m is formed on an array substrate 12. This is for preventing the dissolution of impurities from the array substrate 12. On the $SiO_2$ layer 811 a light shielding film 791 is formed with chrome (Cr) or such. The film thickness of the light shielding film 791 is 0.1 $\mu$m (1000 angstroms). On the light shielding film 791 an insulating film 214 consisting of $SiO_2$ or SiNx is formed. The process of forming the insulating film 214 is performed a plurality of times to prevent the occurrence of pinholes. On the insulating film 214, common electrodes 212 in the form of stripes (see FIG. 47) are formed, and the common electrode 212 consists of ITO. Between a pixel electrode 14 and the common electrode 212 a dielectric film 812 consisting of $SiO_2$ or such is formed, and storage capacitance is formed with the pixel electrode 14 and the common electrode 212 as electric potential. In addition, on the interface between the pixel electrode 14 and a liquid crystal layer 21 an insulating film 154 consisting of polyimide is formed. This constitution having the light shielding film 791, common electrodes 212 in the form of stripes, and the storage capacitance is also applicable to the other display panels of the present invention.

Note that as a rule, the described contents of the specification of the present invention can be mutually applied to the display panels, units, methods, etc. shown in the drawings. For example, the contents and constitution of FIG. 47 are also applicable to the display panel of FIG. 1.

Also, when a layer for forming an optical image as a change in a light scattering state is employed as the light modulating layer 21 of the display panel of the present invention, for example, when a PD liquid crystal is employed as the light modulating layer, the light modulating layer 21 needs to meet the following equation in a no-voltage applied state (light scattering state).

$$0.5 \leq \frac{\pi B}{E} \leq 3.0 \qquad \text{[expression 23]}$$

where E is the luminance of incident light on a small area of the light modulating layer 21, B is the brightness of the small area measured in a direction normal to the substrate 21, and π is the ratio of the circumference of a circle to its diameter.

In the above equation, if $\pi B/E \leq 0.5$, the scattering performance of the light modulating layer 21 and the display contrast can be made high. However, the drive voltage becomes high and the design of the driver circuit 541 becomes difficult. On the other hand, if $\pi B/E \geq 3.0$, the driver circuit design will become easy but the display contrast will become low. More preferably, the light modulating layer 21 needs to meet the following equation:

$$0.7 \leq \frac{\pi B}{E} \leq 2.0 \qquad \text{[expression 24]}$$

Also, in the case where the PD liquid crystal is employed as a light modulating layer, from the standpoint of improvements in the drive voltage and hysteresis characteristic it is preferable that the liquid crystal component of the PD liquid crystal employ tran fluororesin and the resin component employ a branch monomer. From the standpoint of making the responsibility of a liquid crystal fast, the viscosity C of the liquid crystal component and Δn need the following equations:

$$20(cp) \leq C \leq 50(cp) \qquad \text{[expression 25]}$$

$$0.23 \leq \Delta n \leq 0.3 \qquad \text{[expression 26]}$$

The viscosity of the liquid crystal employed in the PD liquid crystal display panel of the present invention is 27 cp and Δn is 0.27.

Figure 82:
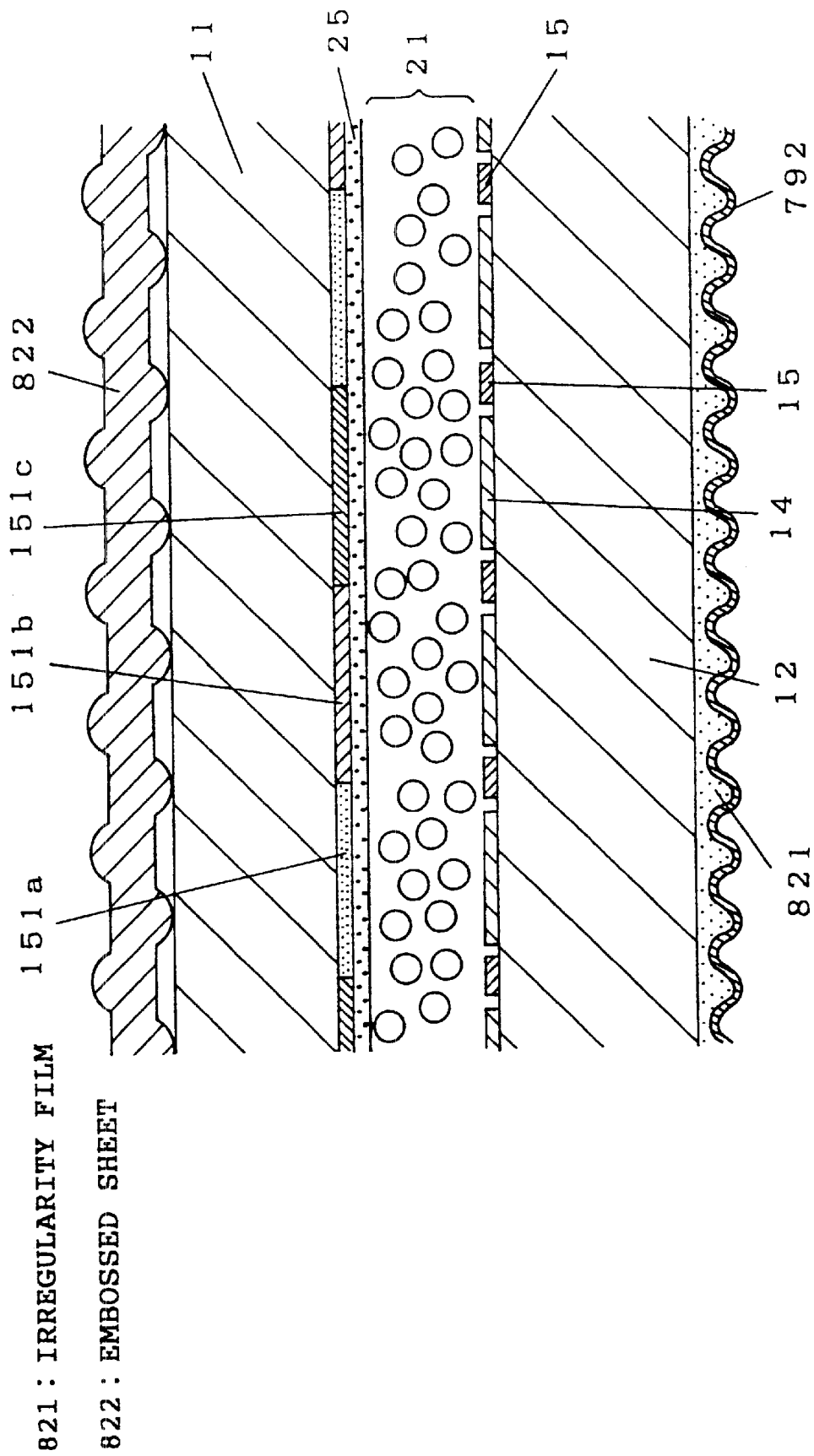
FIG. 82 is a sectional view of the liquid crystal display panel in another embodiment of the present invention.

If the reflecting film 792 is smooth, the visual field angle will become narrow. For this reason it is difficult for the viewer (user) of the display panel 22 to view a display image. To solve this problem, it is preferable that the reflecting film 792 have irregularities on the surface thereof, as shown in FIG. 82. The reflecting film 792 is formed on an irregularity film 821. The irregularity film 821 is formed with light setting type acrylic resin, heat setting resin, polypropylene, polyester, polycarbonate, silicon rubber, etc. An embossed sheet 822 is arranged or bonded to the surface of the display panel 22 to prevent transfer of an outside scene onto the display panel. The embossed sheet 822 employs, for example, embossed polyester film. Note that the irregularity film 821 and the reflecting film 792 may be formed integrally and pasted on the array substrate 12. For example, the reflecting film 792 may be formed on a sheet or substrate embossed on one surface, and stuck to the sheet or substrate 12 (or counter substrate 11) with a Optical coupling layer, adhesive agent, or bonding agent. Also, even if the aforementioned sheet or substrate is only arranged, there will be a sufficient advantage.

FIG. 83 is an explanatory diagram of the fabrication method of the display panel of FIG. 82. The mixed solution 315 is dropped on the array substrate 12 by a drop method (FIG. 83(a)). On the mixed solution 315 the counter substrate 11 formed with the color filter 151 is placed, and the counter substrate 11 and the array substrate 12 are pressed so that the mixed solution 315 has a predetermined thickness.

Then, ultraviolet rays 183 are irradiated through the array substrate 12, thereby phase-separating the mixed solution 315 (FIG. 83(b)). Next, ultraviolet ray setting resin 831 is coated on the array substrate 12. It is desirable that the coating should be performed by screen printing. Thereafter, ultraviolet rays 183 are irradiated, thereby setting the resin 831 (FIG. 83(c)).

After setting, the resin 831 is pressed with a heated roller 312, thereby forming fine irregularities on the resin 831 (FIG. 83(d)). The roller 312 is formed with protrusions for transferring irregularities. Thereafter, the reflecting film 792 is formed by vaper deposition on the irregularity film 821, thereby completing the panel 22.

In the aforementioned fabrication method, although the ultraviolet ray setting resin 831 is coated and irregularities are formed on the coated resin with the roller 312, there are other methods.

For example, there is a method in which a PVA solution diluted with water is coated on the array substrate 12 and irregularities are formed by evaporating water in the PVA solution. If the PVA solution is set, microscopic irregularities will appear on the surface. There is another method which coats paste containing microscopic glass or resin fibers, beads, etc. In the case where the paste has a shinning surface like silver paste, there is no need to form the reflecting film 792. In other words, if the aforementioned paste is coated, the reflecting film 792 can be formed at the same time as the irregularity film 821. Also, there is a method in which inorganic thin film such as $SiO_2$ or such is formed by vapor deposition and is patterned with a mask to form irregularities. Also, there is a similar method in which resist and ultraviolet ray setting resin are coated and then patterned with a mask to form irregularities. In addition, there is a method in which coated resin is chemically etched to form irregularities.

It is preferable that the difference in height between irregularities (difference between a concave portion and a convex portion) should be 0.5 μm or 5 μm or between 0.5 and 5 μm, particularly preferably 1 μm or 3 μm or between 1 μm and 3 μm. Also, it is preferable that the ratio between the flat portion (area with no irregularity) and the irregularity portion (area with irregularities) should be in a range from 1:1 to 1:3. If the height of the irregularities is low, transfer of a viewer's face or outside scene onto the display panel will occur. If the height is too high, the display brightness of the display panel will become low. Also, if the ratio of the irregularity portion is low, similarly the transfer of a viewer's face or outside scene onto the display panel will occur, and if it is high, the display brightness will become low. Thus, the aforementioned ratio is in an optimum range. Note that the aforementioned matters (formation method, constituent material, etc.) related to the irregularity film 821 are also applied to other display panels of the present invention.

Figure 84:
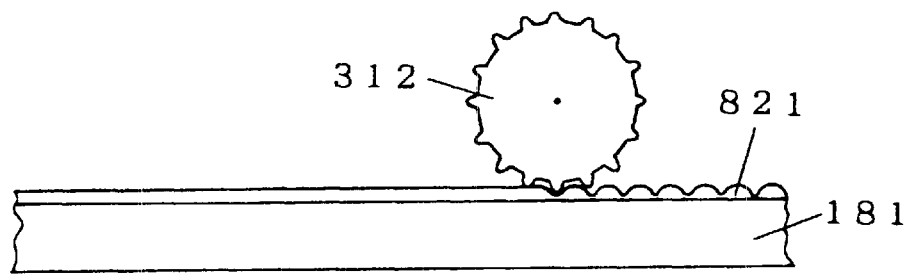
FIG. 84 is an explanatory diagram of the fabrication method of the liquid crystal display panel of the present invention shown in FIG. 82.
Figure 84:
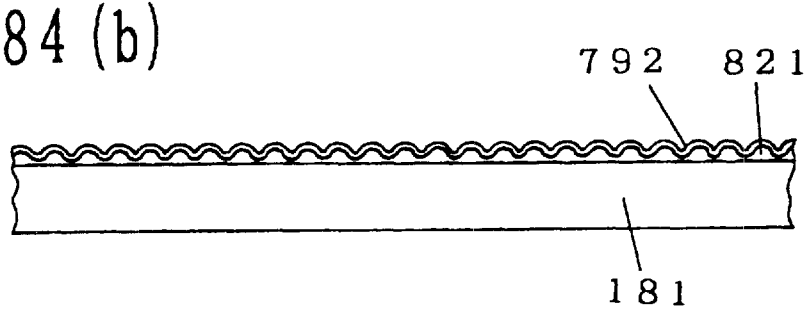
Figure 84:
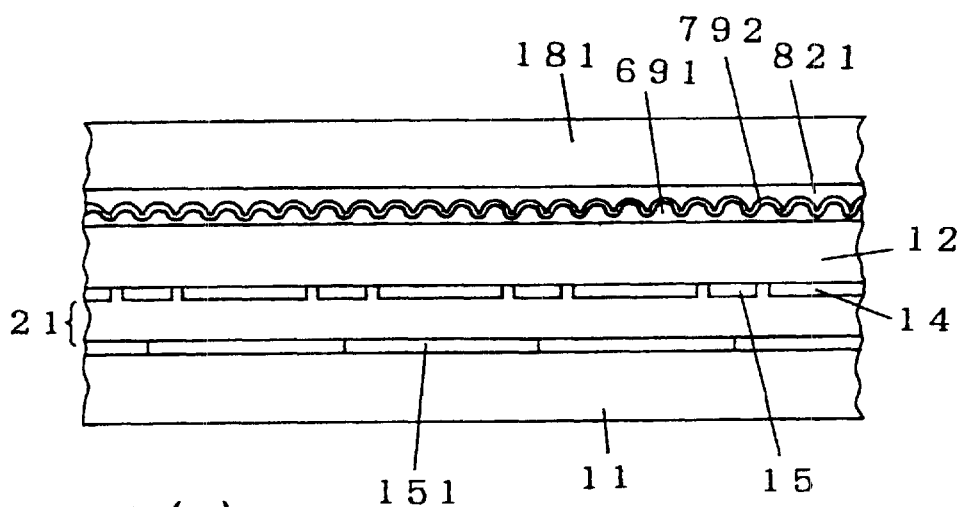
Figure 84:
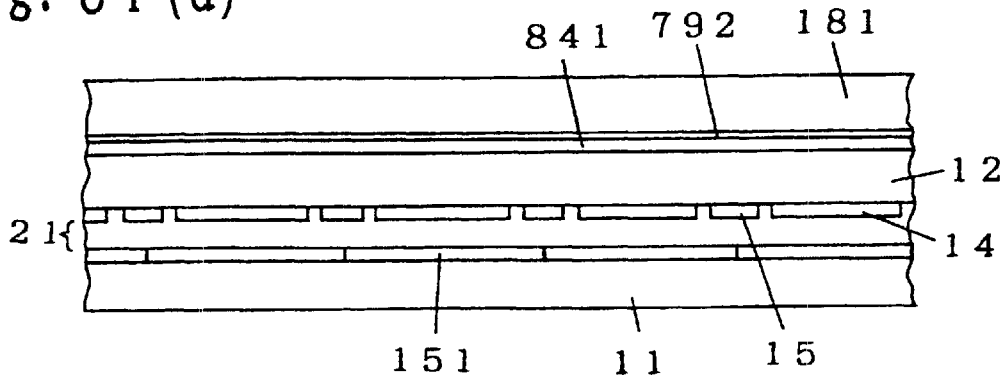

FIG. 84 illustrates another fabrication method of the display panel of the present invention. ultraviolet ray setting resin 831 is coated on a substrate 181, and irregularities are formed on the surface with a heated roller 312. The substrate 181 formed with reflecting film 792 on the irregularity film 182 is pasted on a substrate 12 or 11 with an optical coupling layer 691, as shown in FIG. 84(c). The Optical coupling agent 691 is an acrylic transparent adhesive agent, ethylene glycol.

Note that there is a method which does not form the irregularity film 821. This constitution is shown in FIG. 84(d). On a substrate 181, a reflecting film 792 is formed. The reflecting film 792 and a substrate 12 are pasted together through a light scattering layer 841. The light scattering layer 841 is one in which particles such as titan (Ti) are contained in a bonding agent. As another example, there is a solution or such in which two gel liquids different in refractive index are mixed together. Light incident on the light scattering layer 841 is scattered. For this reason, transfer of a viewer's face, etc. onto the display panel is suppressed.

The scattering characteristic of the light scattering layer 841 needs to meet the following equation:

$$1.0 \leq \frac{\pi B}{E} \leq 30.0 \qquad \text{[expression 27]}$$

where E is the luminance of incident light onto a small area of the light scattering layer 841, B is the brightness of the small area measured in a direction normal to the substrate 181, and π is the ratio of the circumference of a circle to its diameter.

More preferably, the scattering characteristic of the light scattering layer 841 needs to meet the following equation:

$$3.0 \leq \frac{\pi B}{E} < 20.0 \qquad \text{[expression 28]}$$

If a value of πB/E is small, the visual field angle will become wide, but the display brightness of the display panel will become low. If a value of πB/E is great, the display brightness will become high, but the visual field angle will become narrow, and consequently, a display image will become difficult to see.

In FIGS. 82, 84(*d*), etc., although the reflecting film 792 consists of aluminum (Al), it may be a two-layer chrome film consisting of chrome and chrome oxide. It may also be film containing carbon and titan (Ti) in resin. The reflecting film 792 containing carbon and Ti in resin serves as a light absorbing film rather than a reflecting film. In addition, while it has been described that the substrate 181 is pasted on the side of the array substrate 12, the present invention is not limited to this, but it may be pasted on the side of the counter substrate 11.

Figure 85:
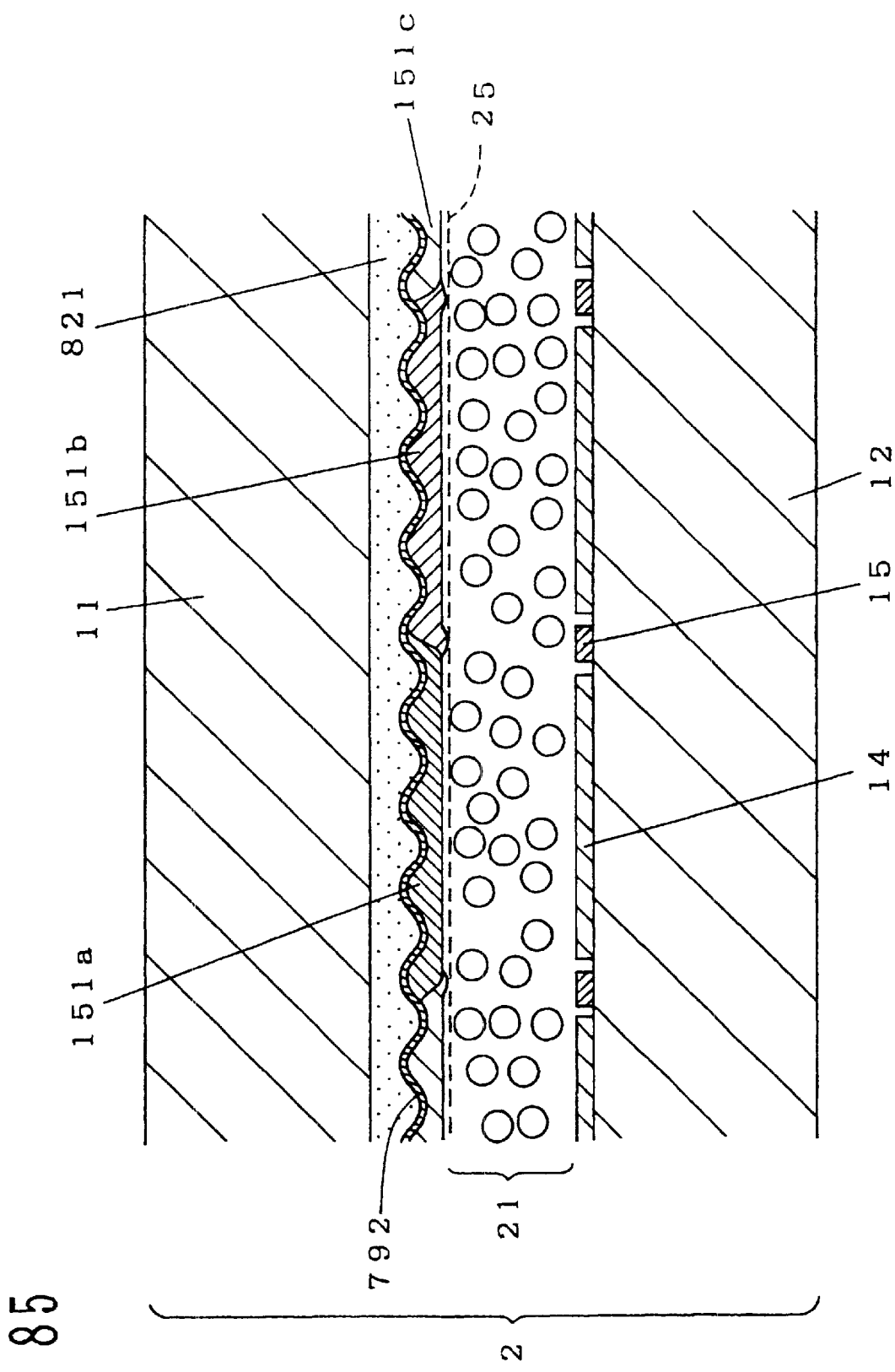
FIG. 85 is a sectional view of the liquid crystal display panel in another embodiment of the present invention.

FIG. 85 is a sectional view of a display panel formed with an irregularity film 821 on a surface which contacts a liquid crystal layer 21. In the case where the irregularity film 821 is formed on a surface which contacts the liquid crystal layer, the height of the irregularity film 821 is 2 μm or less, preferably 1.5 μm or less. The reason for this is that the irregularities on the irregularity film 821 change the thickness of the liquid crystal layer 21 and cause an unevenness in an electric field within the liquid crystal layer 21. The other matters, related to the area between the flat portion having no irregularity and the irregularity portion having irregularities, fabrication method, etc., are similar to the aforementioned embodiments.

Even in the embodiment of FIG. 85 the reflecting film 792 is formed on the irregularity film 821, and the color filter 151 is formed on the reflecting film 792. The reflecting film 792 also serves as a counter electrode. Note that a counter electrode 25 consisting of ITO may be formed on the color filter 151. The color filter 151 smoothes the irregularities on the irregularity film 821 and evens the thickness of the liquid crystal layer 21. The color filter 151 is divided into red, blue, and green, or it is divided into magenta, yellow, and cyanogen.

In FIG. 85, although the irregularity film 821 is formed, for the purpose of widening a visual field angle there is constitution in which a smooth reflecting film 792 is formed and a diffusing agent (glass beads, Ti particles, etc.) is contained in a color filter 151 formed on the reflecting film 792.

Figure 86:
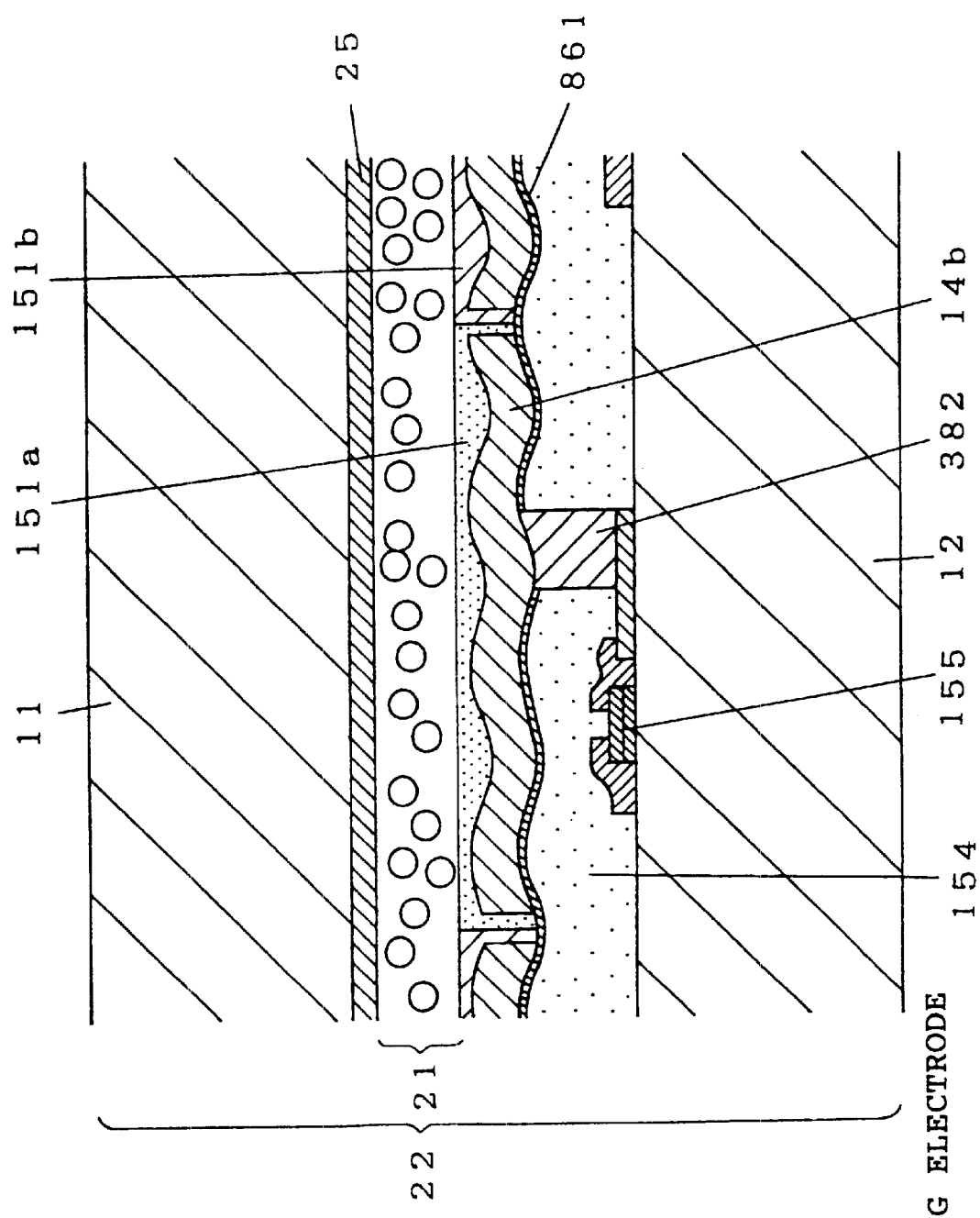
FIG. 86 is a sectional view of the reflection type liquid crystal display panel in another embodiment of the present invention.

FIG. 86 is a sectional view of a display panel 22 with a pixel electrode formed as a reflecting electrode 14*b*. A TFT 155, etc., are formed on an array substrate 12, and an insulating film 154 consisting of photosensitive polyimide is formed on the TFT 155. The polyimide film 154 is bored, and the reflecting electrode 14*b* and the drain terminal of the TFT 155 are connected together through a connecting portion 382. The polyimide film 154 is formed with irregularities on the surface, and a buffering layer 861 is formed between the reflecting electrode 14*b* and the polyimide film 154 to enhance adhesion therebetween. As the buffering layer 861, there is an SiO$_2$ layer or such. The reflecting electrode 14*b* is formed from a composite layer consisting of Ti, Al, and Cr a composite layer consisting of Al and Zr, or such. On the reflecting electrode 14*b*, a color filter 151 with a function of obtaining smoothness and performing color display is formed.

Figure 87:
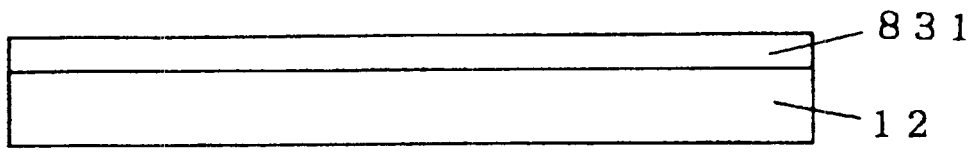
FIG. 87 is an explanatory diagram of the fabrication method of the liquid crystal display panel of the present invention shown in FIG. 86.
Figure 87:
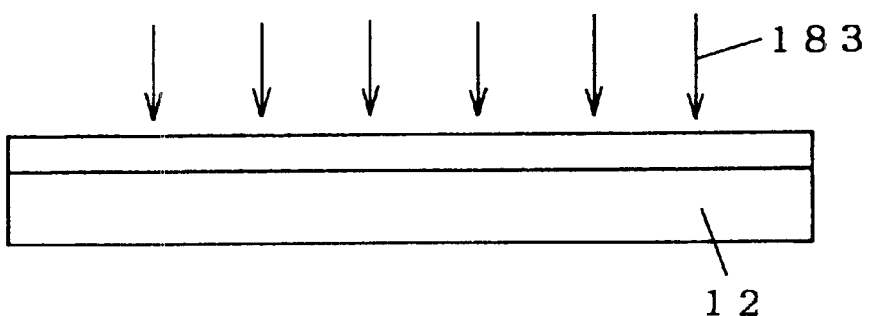
Figure 87:
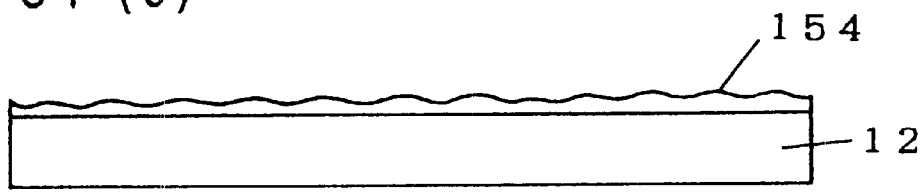
Figure 87:
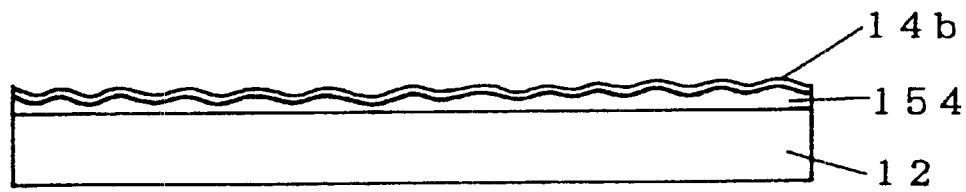
Figure 87:
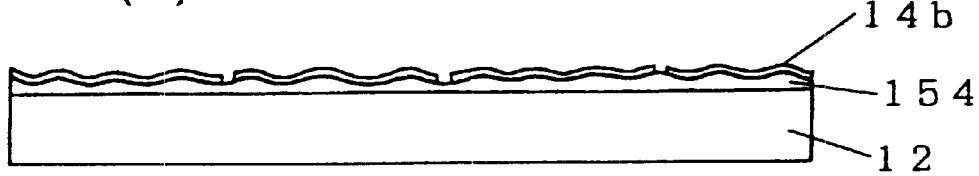

FIG. 87 is an explanatory diagram of the fabrication method of the display panel shown in FIG. 86. The photosensitive polyimide 831 is coated on a substrate 12 formed with TFTs,etc. (FIG. 87(*a*)). Then, light causing a light strength distribution to occur two-dimensionally by an interference effect is irradiated, thereby setting photosensitive polyimide. The polyimide 154 is contracted and irregularities are formed on the surface (FIG. 87(*c*)). Thereafter, the connecting portion 382 is bored and the reflecting film 14*b* is formed.

In FIG. 87, although irregularities are formed by irradiating light and polymerizing photosensitive polyimide, the present invention is not limited to this. For example, irregularities can be easily produced on a surface by performing mesh screen printing.

Figure 88:
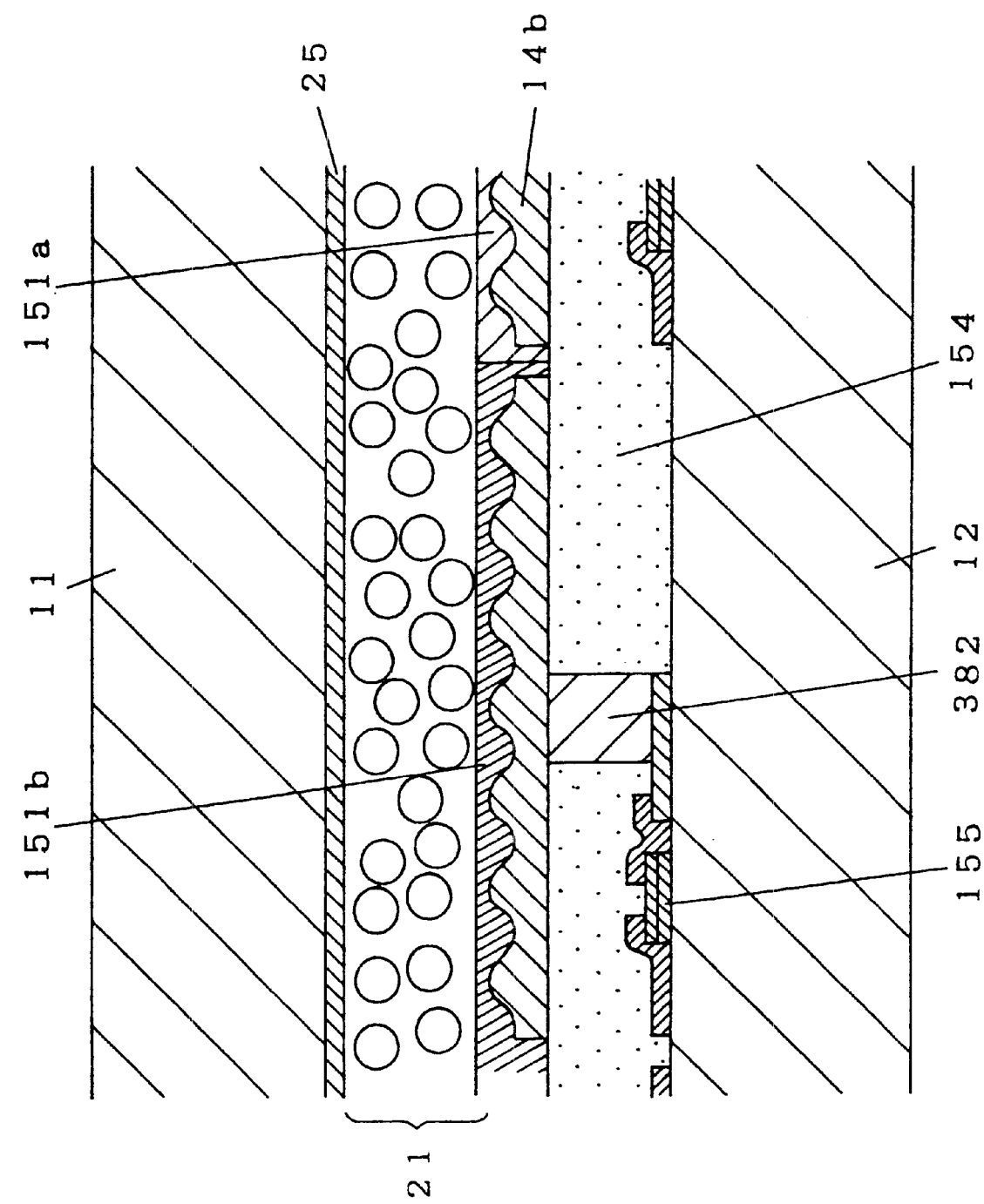
FIG. 88 is a sectional view of the reflection type liquid crystal display panel in another embodiment of the present invention.

FIG. 88 illustrates irregularities formed on the surface of the reflecting electrode 14*b*. As a method of forming irregularities, there are a method which enlarge the particle shape of Al that is deposited, a method in which the crystal particle of Al$_2$O$_3$ is grown during vapor deposition and then the surface is coated with an Al film, etc.

The aforementioned reflection type display panel is one in which the pixel electrode 14 is formed with metal material. The display panel shown in FIG. 89 is one in which reflecting means is formed from a dielectric mirror 891.

Figure 89:
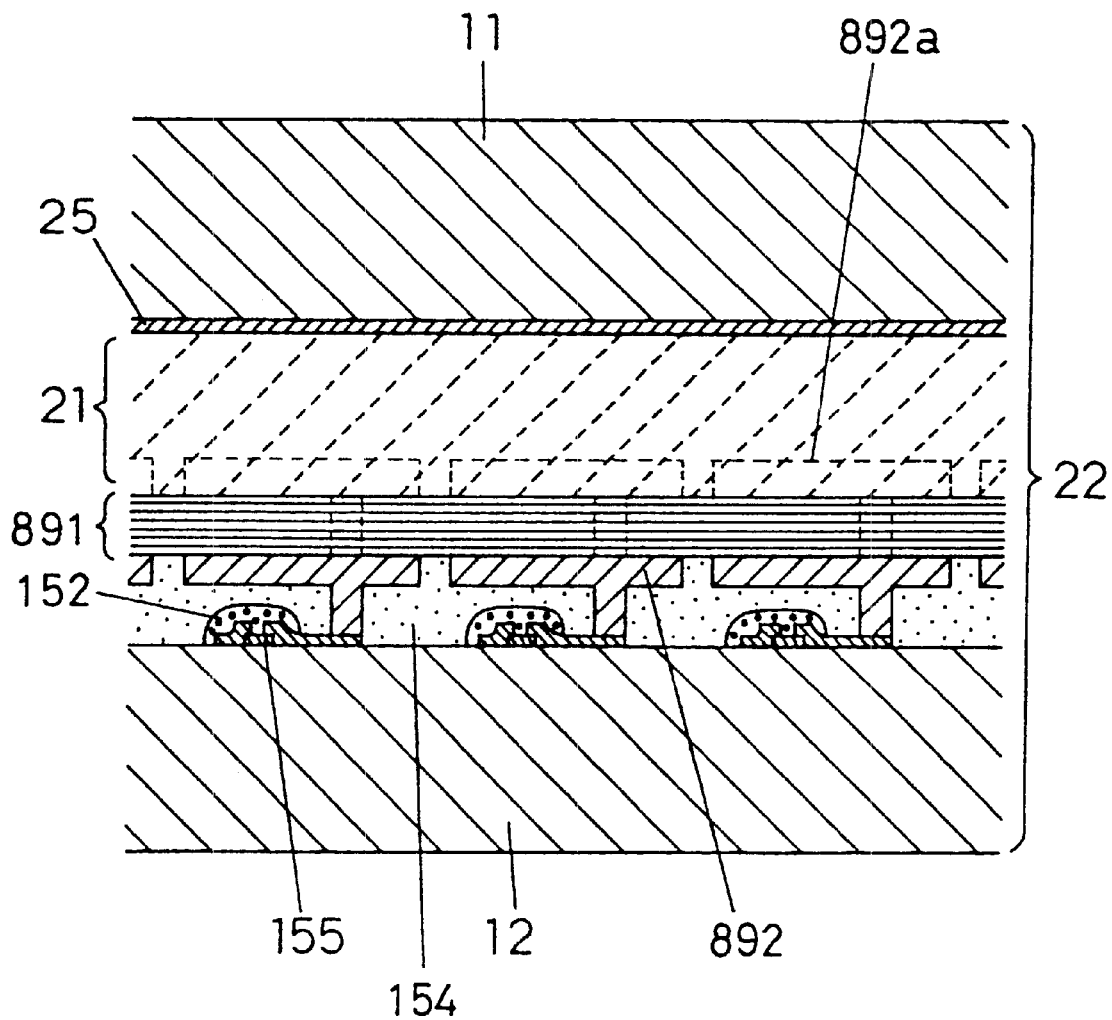
FIG. 89 is a sectional view of the reflection type liquid crystal display panel in another embodiment of the present invention.

As shown in FIG. 89, a TFT 155 is formed on an array substrate 12. On the TFT 155 a light shielding film 152 is formed. The light shielding film 152 is employed to prevent the occurrence of a photoconductor phenomenon which is caused by light transmitted through the dielectric mirror 891.

The drain terminal of the TFT 155 is connected with a pixel electrode 892 consisting of ITO. The pixel electrodes 892 are arranged in the form of a matrix and formed through an insulating film 154 so that they are not electrically connected to a portion other than the drain terminal of the TFT 155. The insulating film 154 is formed with polyimide, SiO$_2$, SiNx, etc. On the ITO pixel electrode 892 a dielectric mirror 891 is formed. The dielectric mirror 891 is stacked regularly with 20 or more layers consisting of a high refractive index film and a low refractive index film. Since the band of light which is reflected by the dielectric mirror is narrow, the present invention employs stacked three dielectric mirrors with three wavelength bands: dielectric mirror for reflecting R light, dielectric mirror for reflecting G light, and dielectric mirror for reflecting B light.

The voltage output from the TFT 155 is transmitted to the pixel electrode 892, and an electric field is produced between the ITO electrode 892 and the counter electrode 25. The liquid crystal layer on the pixel electrode 892 is caused to be in a scattering-transmitting state. Although the pixel electrode 892 consists of ITO, it may be formed from a polysilicon film. The thin polysilicon film is slightly colored light brown and has light transmittance. Particularly, it well transmits light with an infrared wavelength. The pixel electrode 892 may be formed from any material if it has light transmittance with respect to light having any of wavelengths.

Figure 92:
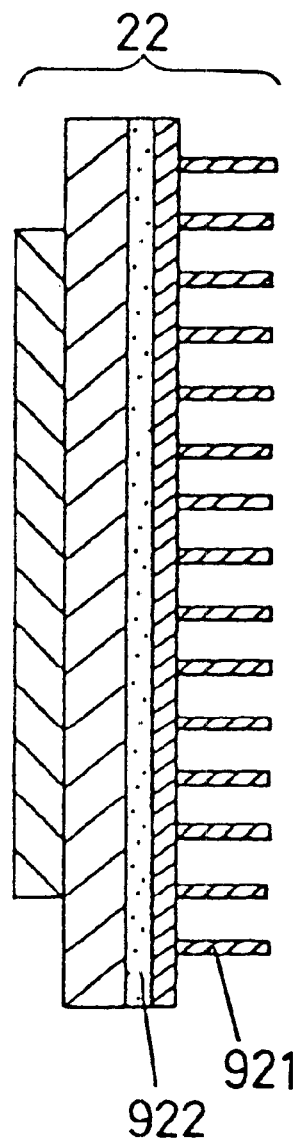
FIG. 92 is a sectional view of the liquid crystal display panel in another embodiment of the present invention.

If the color filter 151 is formed on the dielectric mirror 891 or counter electrode 25, color display can be performed with a single display panel. The reflection type display panel can easily perform a countermeasure to heat radiation, if a radiating fin 921 is attached to the panel back surface with a silicon bonding agent 922 as shown in FIG. 92.

While it has been described that the dielectric mirror 891 is formed on the ITO electrode (pixel electrode) 892, an ITO electrode (pixel electrode) 892a may be formed on the dielectric mirror 891, as shown by a dotted line. In this case the dielectric mirror 891 is bored so that the pixel electrode 892 can be connected to the drain terminal of the TFT 155.

Figure 90:
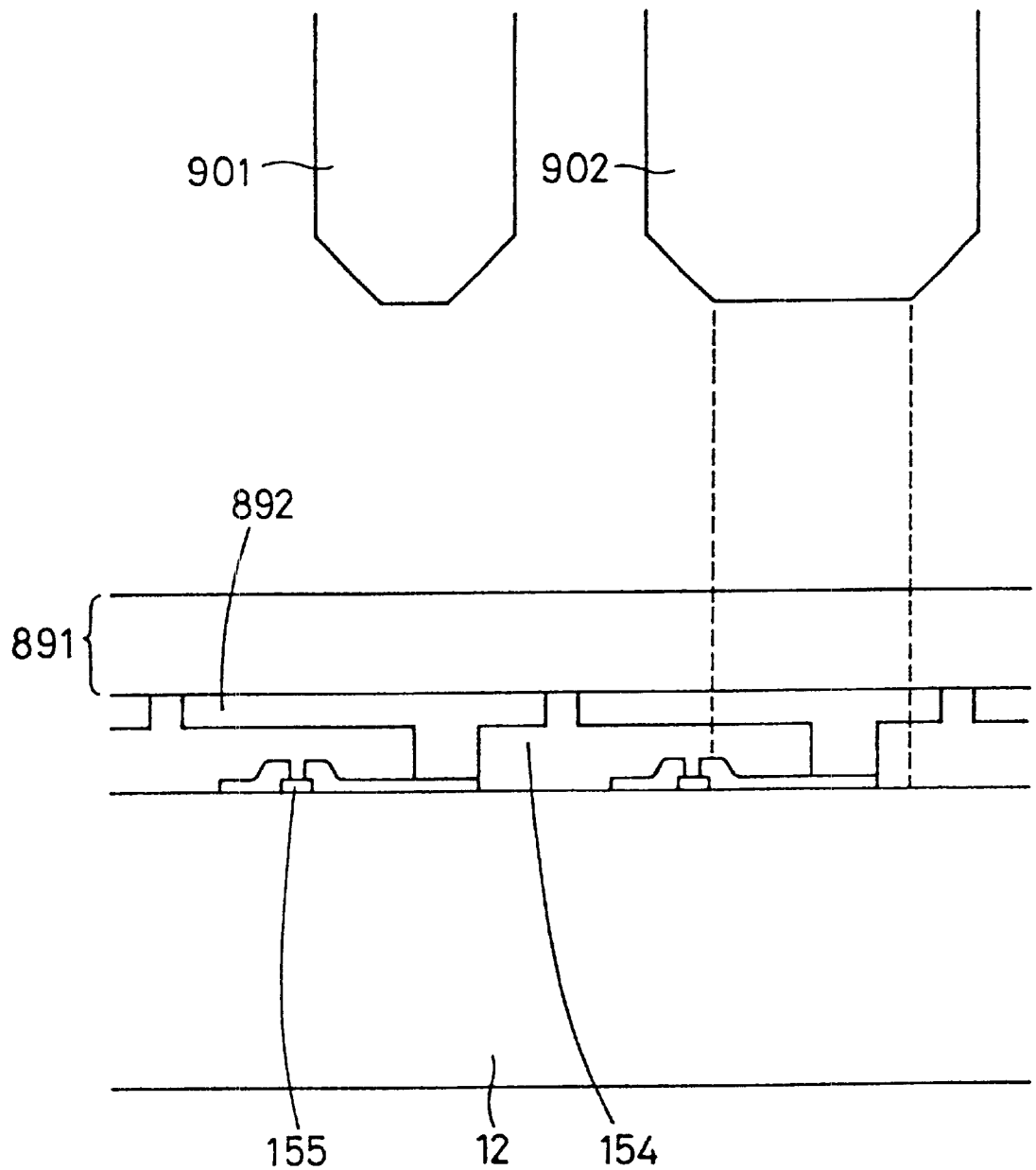
FIG. 90 is an explanatory diagram of the defect correction of the liquid crystal display panel of the present invention.

Now, the defect inspection method, defect correction method, etc., of the display panel of the present invention will be described in sequence. FIG. 90 is an explanatory diagram of the inspection method of the liquid crystal display panel of the present invention shown in FIG. 89. In the case where the liquid crystal display panel shown in FIG. 89 is formed on the silicon substrate 12, the TFT 155, etc., cannot be observed from the side of the substrate 12. For this reason, a defective TFT 155, etc., are observed from the side of the dielectric mirror 891.

The observation is performed with an infrared camera 902. The liquid crystal display panel of FIG. 89 employs the dielectric mirror 891, and the pixel electrode 892 is formed with ITO or polysilicon material having light transmittance. The dielectric mirror 891 has a spectral characteristic which reflects visual light, but has light transmittance with respect to an infrared ray above red. ITO and polysilicon also have sufficient light transmittance with respect to an infrared ray. If the pixel electrode 892 is formed with metal material, then the TFT 155 will not be able to be observed with the infrared camera 901.

Thus, the defect inspection method of the present invention is characterized in that an array substrate is observed with infrared rays. The observation means detection of a defective TFT 155, a short-circuit of the pixel electrode 892, detection of dust, etc. When a short-circuit defect occurs, a short-circuited portion is cut with a laser trimming unit 902. Alternatively, the TFT 155 is destroyed with laser light and regarded as a black pixel defect. A white pixel defect is easy to see visually, while a black pixel defect is difficult to see. Therefore, the primary object of the point defect correction is to correct a white point defect to a black point defect.

As the laser trimming unit 902, a YAG laser is a suitable one. The wavelength of the YAG laser is in an infrared area of 1.06 μm. The YAG laser transmits laser light through the pixel electrode 892 and can perform satisfactory cutting. The YAG laser radiates pulsed laser light. If laser light is irradiated at a time, the material of a cut portion will vaporize suddenly and therefore the dielectric mirror 891 will be destroyed. It is desirable that the frequency of the pulse should be between 100 Hz and 10 KHz, particularly between 200 Hz and 1 KHz. It is desirable that the mesial magnitude of the laser pulse should be between 20 and 500 ns, particularly between 50 and 200 ns. In addition, it is desirable that the number of pulses that are irradiated on a single point should be between 2 and 10, particularly between 3 and 5. These must be obtained by experiment.

Figure 91:
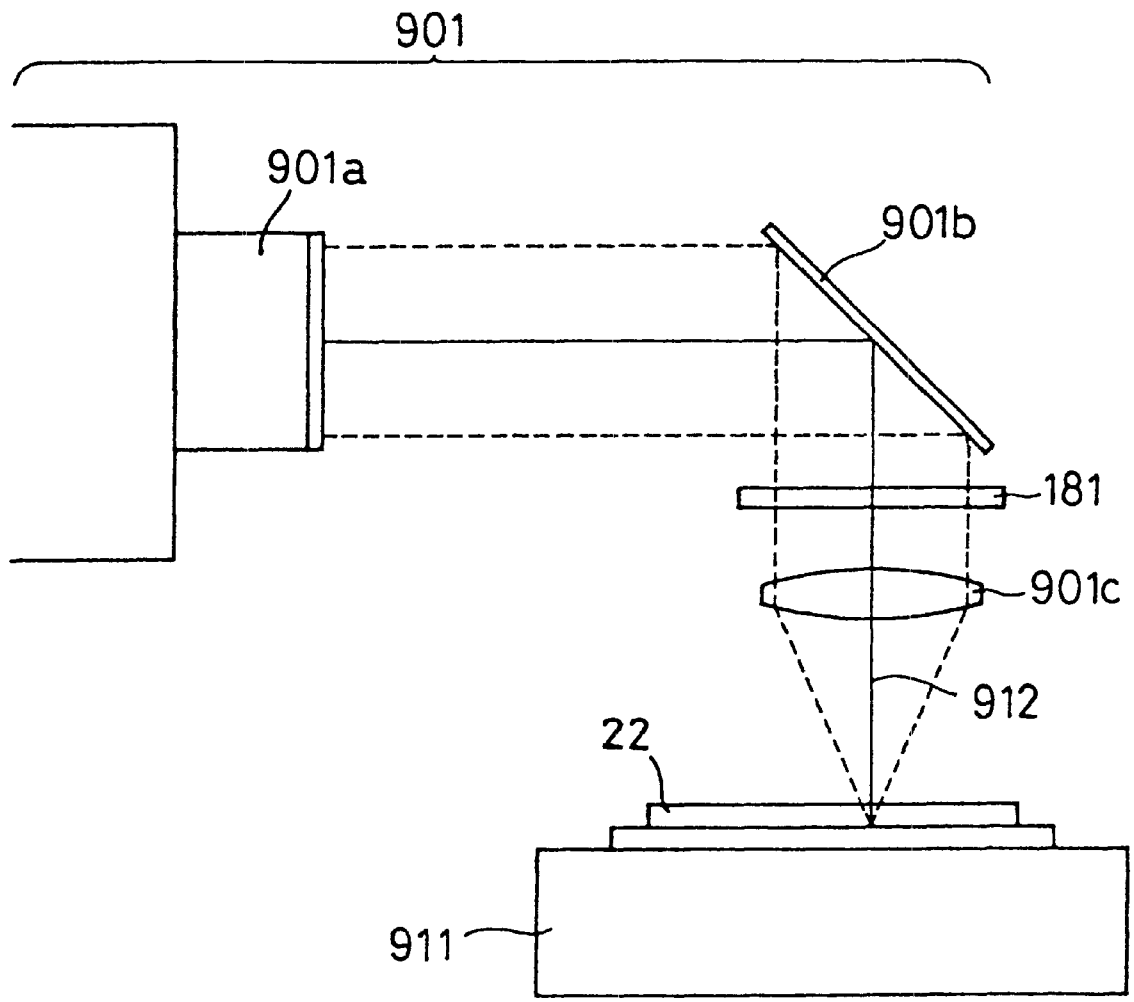
FIG. 91 is an explanatory diagram of the defect correction of the liquid crystal display panel of the present invention.
Figure 93:
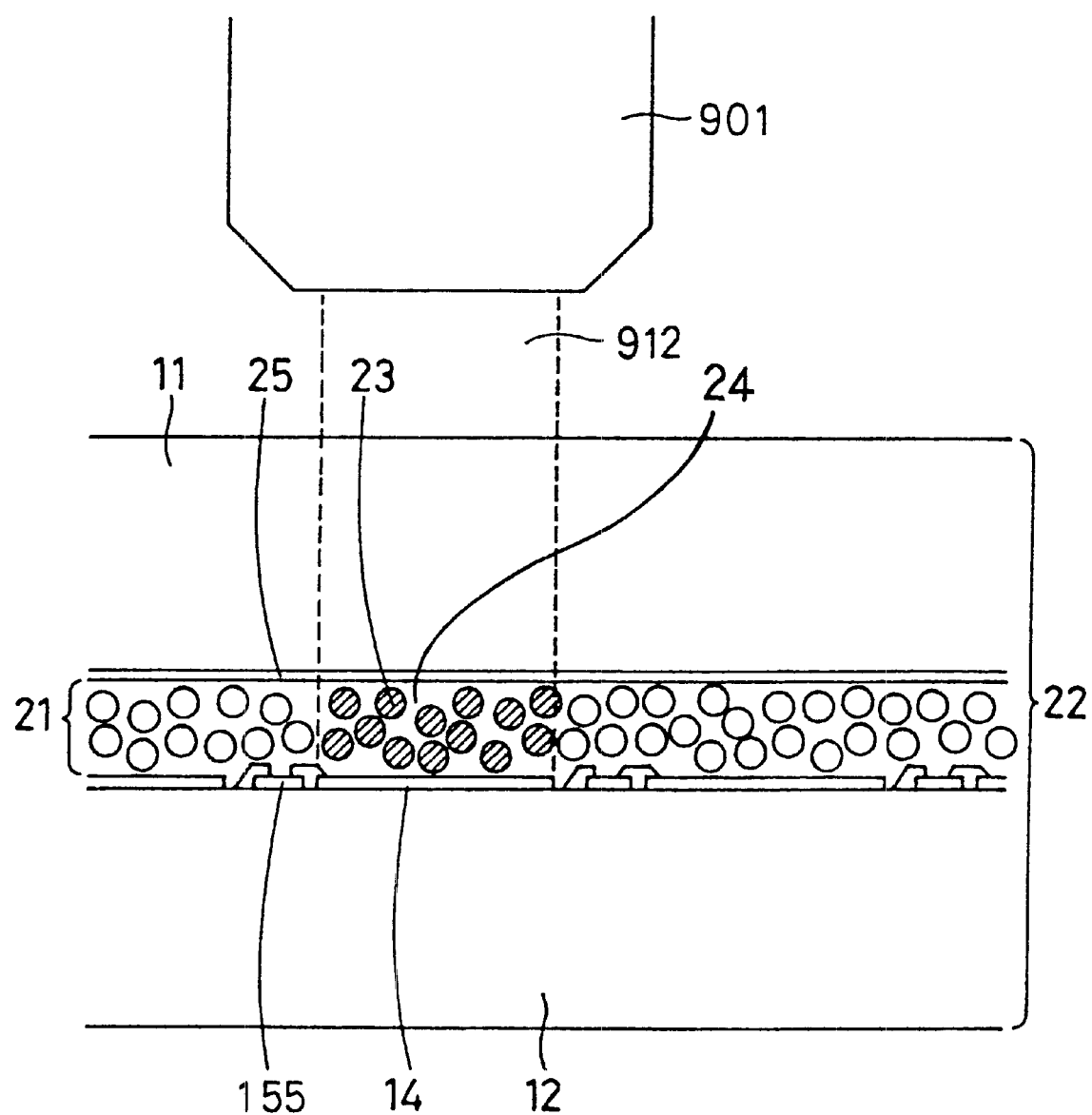
FIG. 93 is an explanatory diagram of the defect correction method of the liquid crystal display panel of the present invention.

The aforementioned description has been made of the defect inspection method and defect correction method of the array substrate 12. In FIGS. 91 and 93, a description is made of the defect correction method and defect correction unit of the PD liquid crystal panel.

As previously described, a white point pixel defect is conspicuous as a pixel defect. In the case of a PD liquid crystal display panel, the white point pixel defect means the state in which voltage is continuously supplied to a pixel electrode. Therefore, if a white point pixel defect is changed to a black point pixel defect, it will become inconspicuous. As the method, there is a method which destroys the TFT 155 and a method in which the oriented state of liquid crystal molecules 20 will not be changed even if voltage is applied to the liquid crystal molecules on the pixel electrode 14. In this embodiment, a description will first be made of a method in which liquid crystal molecules 20 will not operate even if voltage is applied to them.

In this embodiment, an excimer laser is employed as a light source, and an oscillating wavelength of 351 nm which is transmitted by a glass surface is employed as the oscillating wavelength of the excimer laser by using the sealed gas of the laser. First, the defect correction unit in this embodiment will be described.

Figure 94:
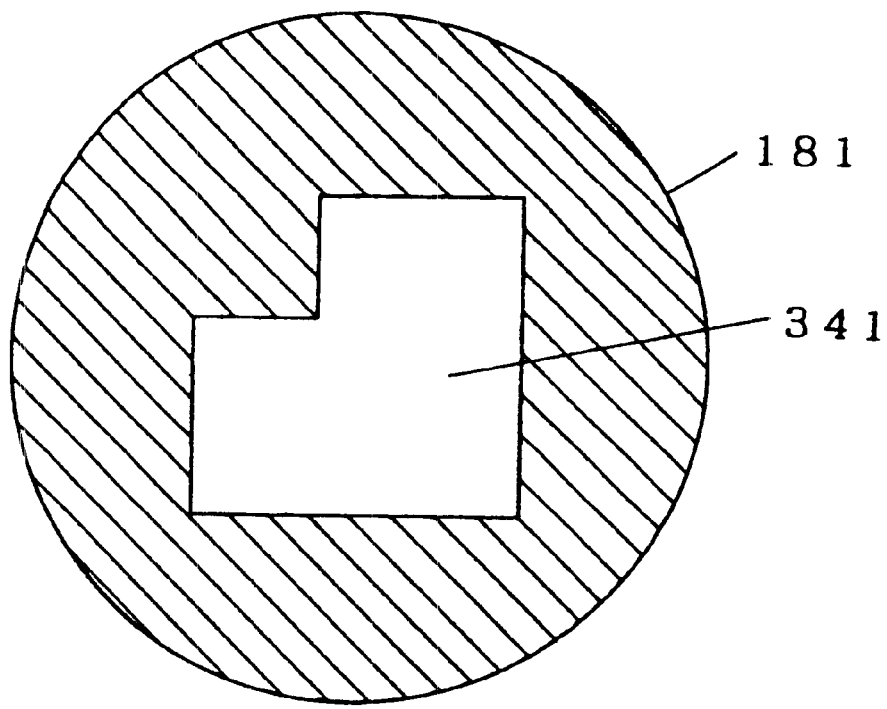
FIG. 94 is an explanatory diagram of a mask employed in the defect correction of the liquid crystal display panel of the present invention.

The defect correction unit is provided with an excimer laser generator 901a, as shown in FIG. 91. An ultraviolet reflecting mirror 901b, a mask 181, a lens 901c, a liquid crystal display panel 22, and an XY stage 911 are arranged on the optical path of a laser beam 912 which is emitted from the excimer laser generator 901a. The mask 181 is formed with a hole corresponding to the shape of a pixel 341, as shown in FIG. 94.

The laser beam 912 radiated from the excimer laser generator 901a is reflected by the ultraviolet reflecting mirror 901b and passes through the slit 341 of the mask 181. The laser beam 912 is focused by the lens 901c to a location on the liquid crystal display panel 22 which is corrected. The mask 181 has a rectangular slit, which corresponds to the pixel size of the liquid crystal display panel. On the other hand, the XY stage 911 can be positioned with a precision of 2 μm or less at the liquid crystal display panel and is positioned so that the focused laser beam 912 is irradiated on a pixel to be corrected. The spot size of the focused laser beam may be smaller than the pixel size. In the case the XY stage 911 is moved so that the laser beam is irradiated on a defect pixel area in sequence.

FIG. 93 is a diagram for explaining the defect correction method. It is desirable that the number of pulses of the laser beam 912 which is radiated from the excimer laser generator 901a should be 2 or 20 or between 2 and 20, particularly 5 or 10 or between 5 and 10. It is desirable that the frequency of the pulse should be 0.1 Hz or 100 Hz or between 0.1 and 100 Hz, particularly 0.5 Hz or 10 Hz or between 0.5 and 10 Hz. It is desirable that the energy density should be 0.2 J/cm$^2$ or 1.5 J/cm$^2$ or between 0.2 and 1.5 J/cm$^2$, particularly 0.5 J/cm$^2$ or 1.0 J/cm$^2$ or between 0.5 and 1.0 J/cm$^2$.

If excimer laser light is irradiated, the liquid crystal molecule 20 will no longer be oriented. In other words, even if voltage is applied to the pixel electrode 14, the liquid crystal will no longer operate and will maintain a normally scattering state (it will become a defective black pixel). The reason for this is that excimer laser light is laser light with a short wavelength and also the liquid crystal molecule 20 absorbs this laser light. In addition, a polymer 24 easily absorbs the laser light. For this reason the liquid crystal molecule 20 and the polymer 24 change, and it is assumed that the liquid crystal layer is caused to be in a normally scattering state. It is also assumed that the heat generated by the laser light makes a contribution to the change.

If the aforementioned operation is performed by irradiating the laser light 912 on a white point pixel defect in sequence, correction of a detect in the liquid crystal display panel will be performed. The white point pixel defect can be detected by applying a signal which does not cause the liquid crystal layer 21 to be in a light transmitting state(for example, the signal is a drive signal which does not apply a video signal to the source signal line and which applies a signal synchronously repeating the ON voltage and OFF voltage of the TFT to the gate signal line alone). The detected white point pixel defect is previously stored in memory, and the XY stage 911 is sequentially controlled so that the defective pixel is in the irradiation range of the laser light. Of course, the XY stage 911 may be moved one point at a time and pulsed laser light may be irradiated, while an observer is sequentially detecting white point pixel defects with the state in which a signal which does not cause the liquid crystal layer to be in a light transmitting state is applied.

In the embodiment of FIGS. 91 and 93, although the laser light generator 901 employs an excimer laser light generator, the present invention is not limited to this excimer laser light generator. For example, it may employ a YAG laser light generator. In the case of YAG laser light, the wavelength is infrared and therefore it is believed that the possibility that the liquid crystal molecule 20 and the polymer 24 are changed by laser light is low. However, they can be changed by heating, and consequently, the liquid crystal on a defective pixel can be caused to be in a normally light scattering state.

In the case of YAG laser light, the pulse frequency exhibits a satisfactory result when it is 1 Hz or 1 KHz or between 1 Hz and 1 KHz, particularly 10 Hz or 100 Hz or between 10 Hz and 100 Hz. It is desirable that the mesial magnitude of the laser light should be 20 ns or 200 ns or between 20 and 200 ns. In addition, it is desirable that the number of pulses that are irradiated on a single pixel should be 1 or 10 or between 1 and 10, particularly 2 or 5 or between 2 and 5. If the irradiation period of the laser light is too long, it will have a thermal influence on the liquid crystal on a pixel adjacent to a defective pixel and therefore the liquid crystal molecule 20 on a normal pixel will no longer operate.

In addition, there is a method which further focuses the YAG laser light to directly destroy the TFT 155 and a method cuts off the TFT 155 and the pixel electrode 14 from each other. It is a matter of course that these methods are effective as a method which changes a white point pixel defect to a black point pixel defect.

In the case where the array substrate 12 consists of a glass substrate, it is also effective that the laser light is incident from the side of the array substrate 12. In this case the TFT 155 and the source signal line 15 serve as masks, and therefore even if the XY stage 911 is not precisely positioned, the liquid crystal layer on the pixel electrode 14 can be changed with reliability. Note that light from a xenon (Xe) lamp can be focused and employed instead of laser light. In addition, white laser, argon-gas laser, and Ne—He laser can be employed.

The aforementioned display panel of the present invention has its exceptions, but basically the color filter 151 is attached to the display panel. However, as shown in FIG. 95, color display can be performed with a single display panel without attaching a color filter to the interior surface or exterior surface of the display panel.

Figure 95:
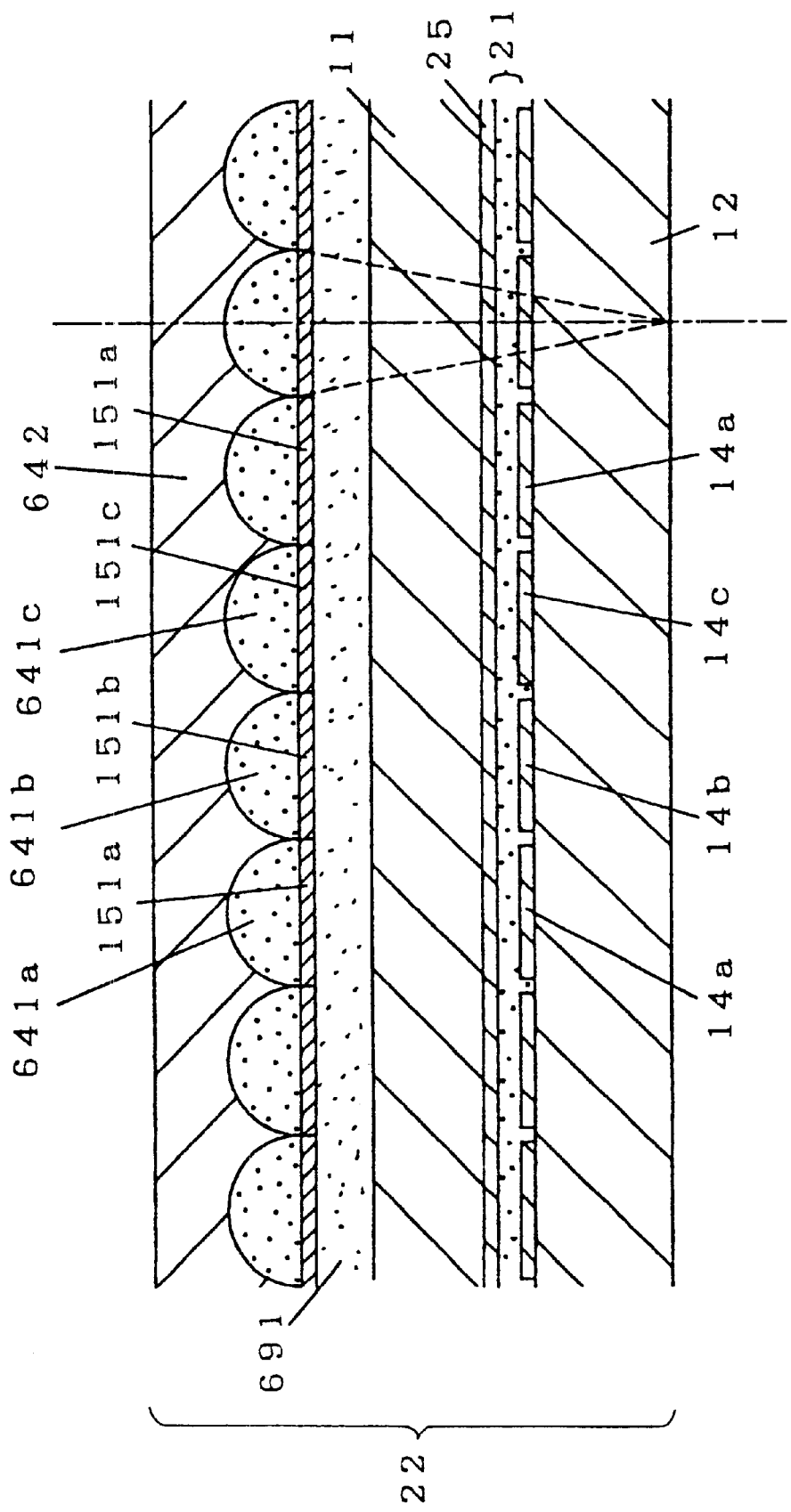
FIG. 95 is a sectional view of the liquid crystal display panel in another embodiment of the present invention.

In the display panel of FIG. 95, a color filter 151 is formed in correspondence with each microlens 641 of a microlens array 641. For example, an R color filter 151a is formed in correspondence with the microlens 641a. A G color filter 151b is formed in correspondence with the microlens 641b. A B color filter 151c is formed in correspondence with the microlens 641c.

The incident light on the microlens 614a is incident on the pixel electrode 14a. At this time, because the incident light is transmitted through the R color filter 151a, R (red) light is incident on the pixel electrode 14a. Similarly, the microlens 641b causes G (green) light to be incident on the pixel electrode 14b, and the microlens 641c causes B (blue) light to be incident on the pixel electrode 14c.

If constituted in the aforementioned manner, the display panel 22 can perform color display (without forming a color filter on the display panel) even if it is a monochromatic display panel. In the aforementioned description, although the microlens array 641 is arranged on the incident side of the display panel 22, the present invention is not limited to this arrangement. It is a matter of course that the microlens array 641 may be arranged on the exit side of the display panel 22. In addition, if a Optical coupling agent 691 is injected into the space between the microlens array 641 and the display panel 22, the positional offset between the microlens 641 and the pixel electrode 14 and the occurrence of halation can be suppressed. Thus, this arrangement is also a suitable one. In addition, in FIG. 95, although the microlens array is formed by ion exchange, it is a matter of course that the microlens array may be formed with a stamper (transfer type) or a metal mold. Also, it may be formed with an etching technique or a printing technique.

Figure 102:
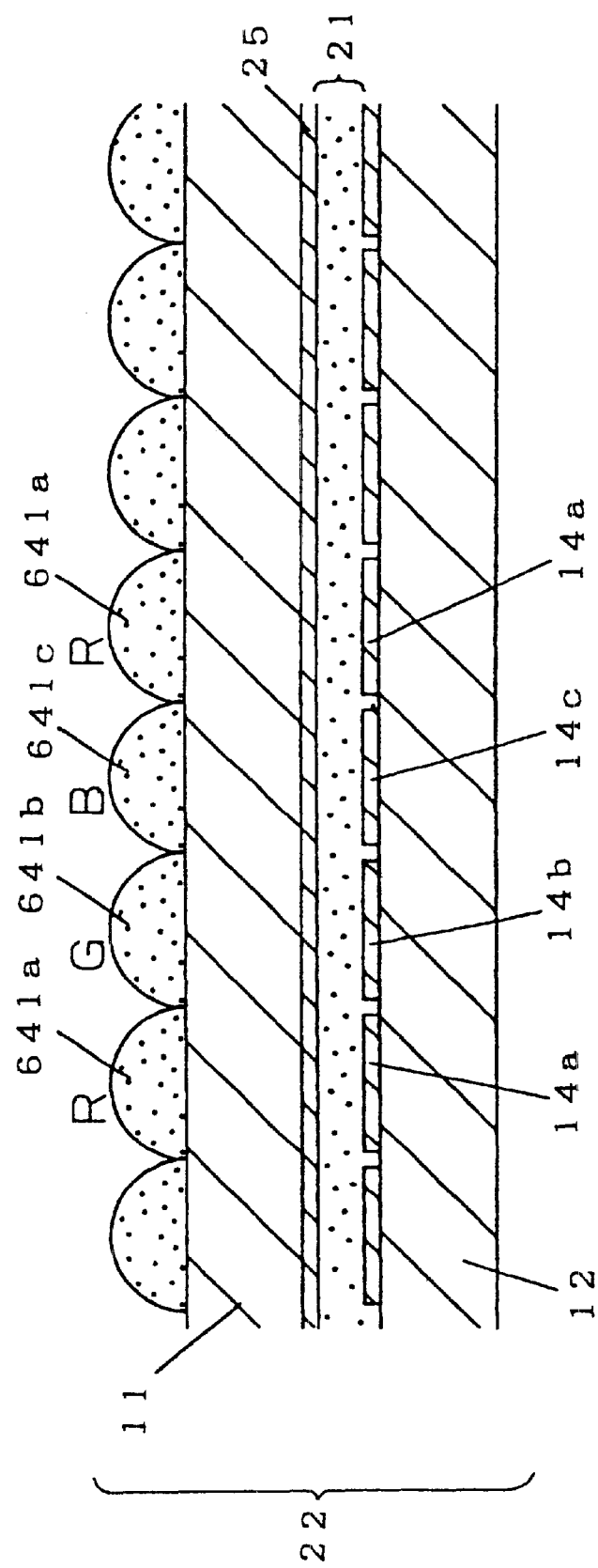
FIG. 102 is a sectional view of the liquid crystal display panel in another embodiment of the present invention.

In FIG. 95, although the microlens 641 is formed on another substrate 642, it may be formed directly on the glass substrate of a display panel 22 as shown in FIG. 102. A microlens 641a colored red is formed at a position corresponding to a pixel electrode 14a. Likewise, a microlens 641b colored green is formed at a position corresponding to a pixel electrode 14b, and a microlens 641c colored blue is formed at a position corresponding to a pixel electrode 14c.

The microlens 641 is formed by containing colors in ultraviolet ray setting resin. A red (R) microlens is first formed with the stamper, and then a green (G) microlens is formed with the stamper. Finally, a blue (B) microlens is formed. If the three processes are performed in this manner, a display panel with R, G, and B microlenses can be fabricated as shown in FIG. 102.

In FIG. 102, although it has been illustrated that the microlens 641 is formed on the counter electrode 11, the present invention is not limited to this. It may be formed on the array substrate 12. In addition, the microlens does not need to be colored, and it is a matter of course that the color filter 151 may be formed on the counter substrate 11 and a colored transparent microlens formed at a position corresponding to the color filter 151.

Figure 103:
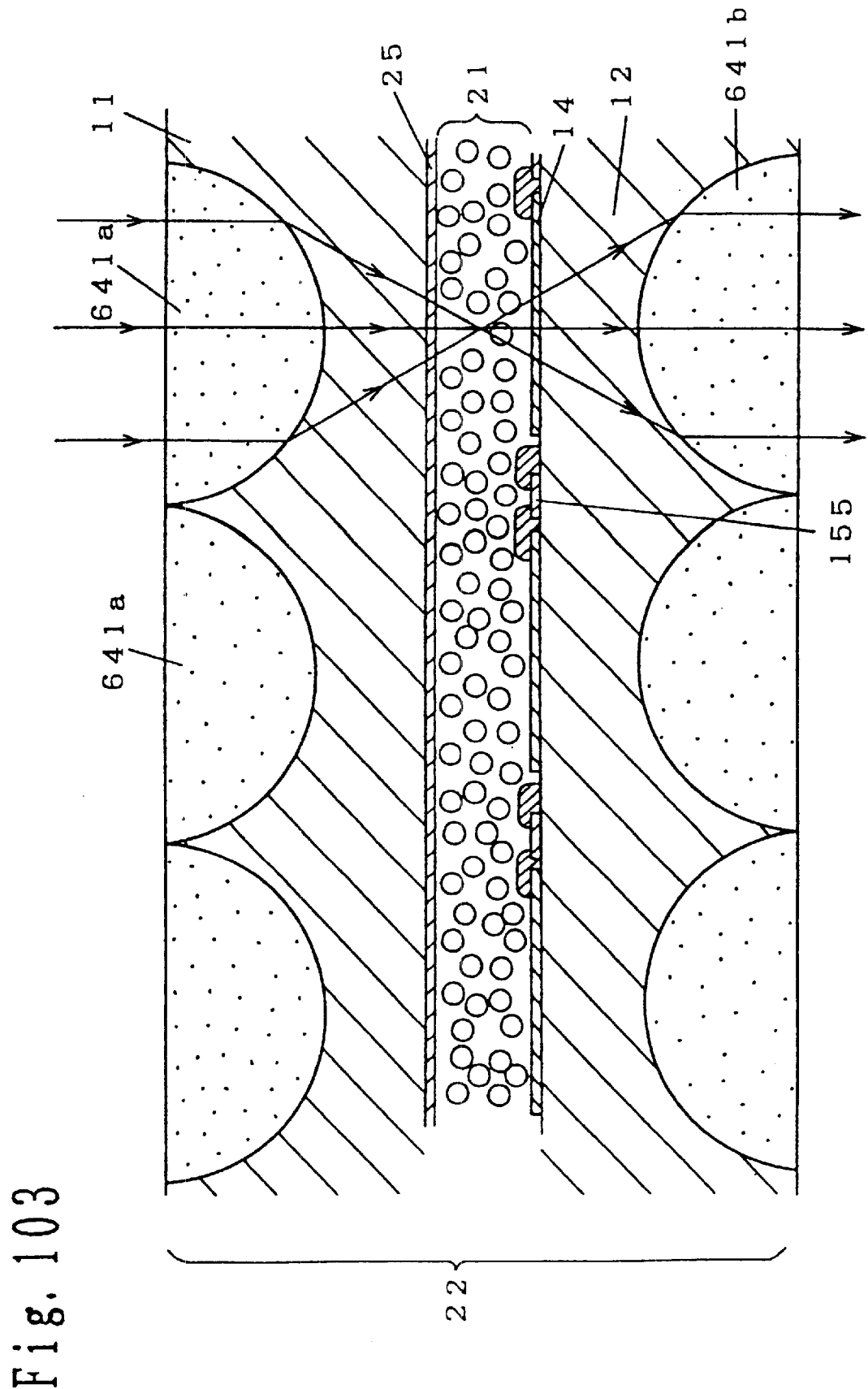
FIG. 103 is a sectional view of the liquid crystal display panel in another embodiment of the present invention.

FIG. 103 shows the substrates 11 and 12 of the display panel into which microlenses 641 are incorporated. In the constitution of FIG. 103, the directivity of light emerging from the display panel is maintained. The color filter 151 is formed on the interface between the substrate 11 (or 12) and air.

Figure 104:
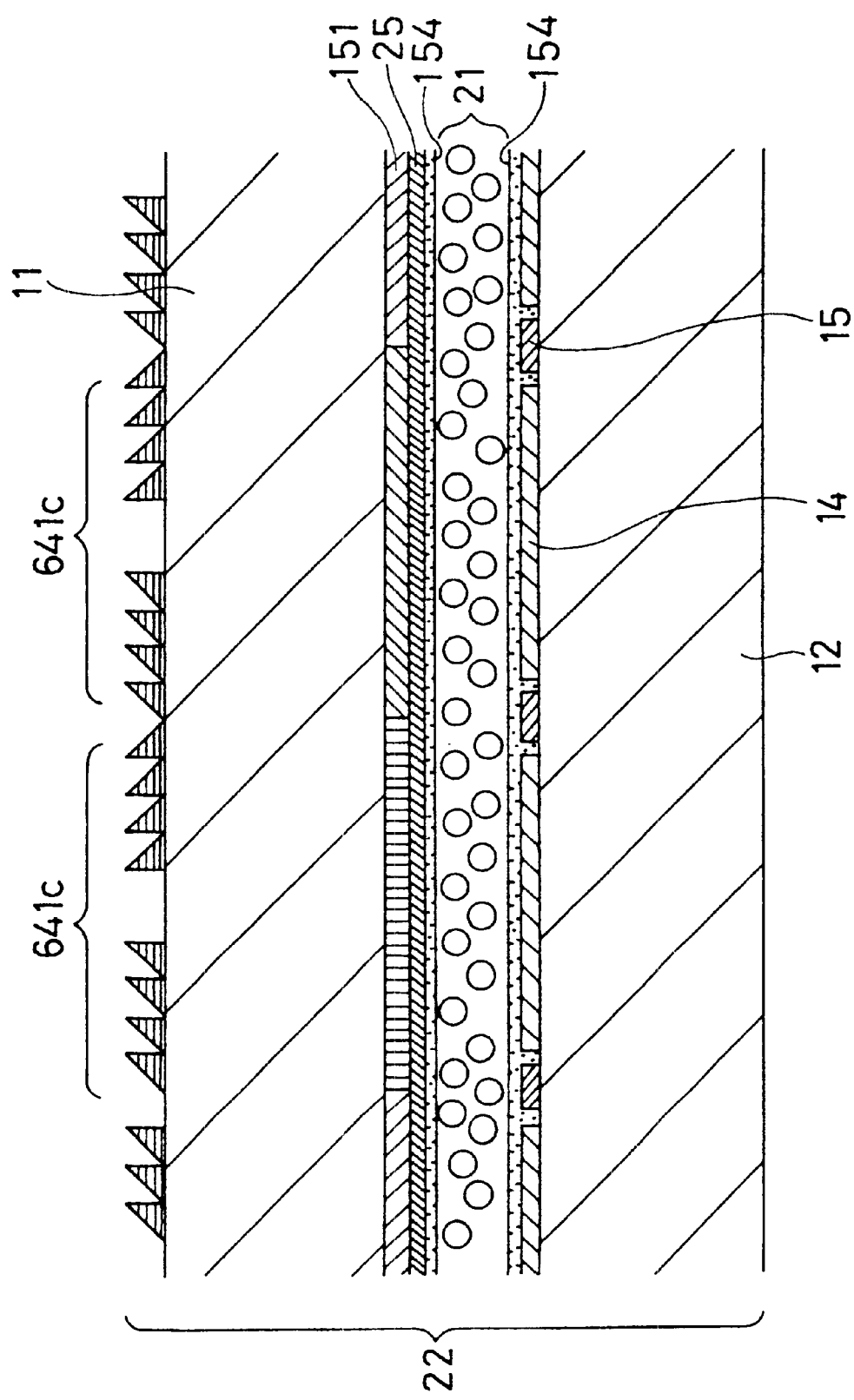
FIG. 104 is a sectional view of the liquid crystal display panel in another embodiment of the present invention.
Figure 105:
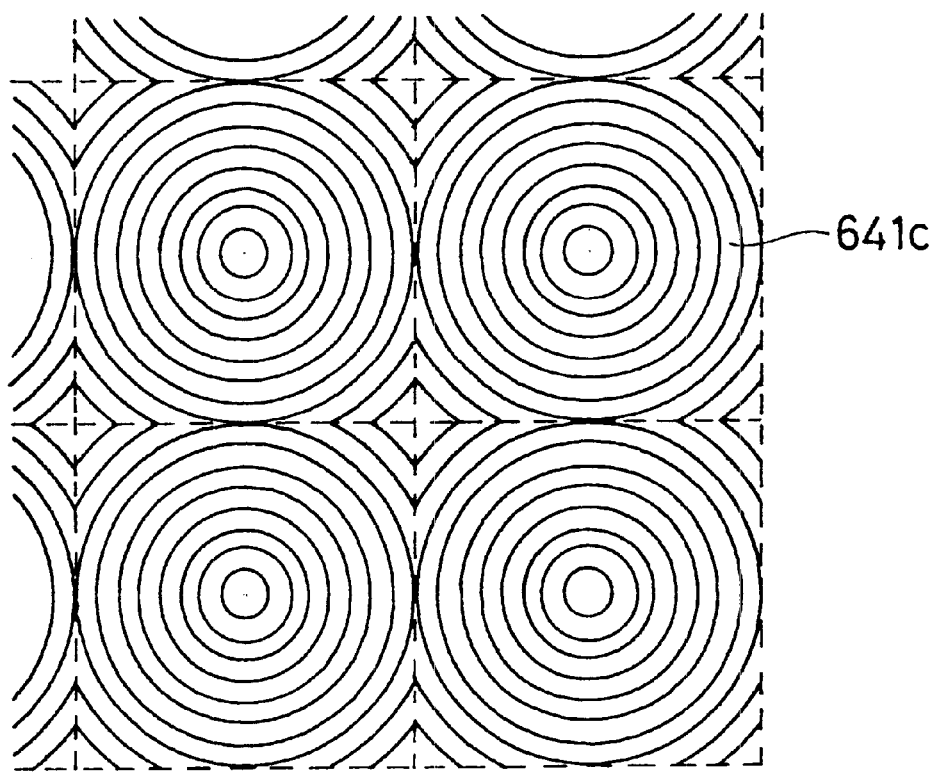
FIG. 105 is a plan view of the microlens section in FIG. 104.

In FIG. 102, although the circular arc-shaped microlens is formed with a stamper (metal mold for transfer), it may be formed as a Fresnel lens 641c, as shown in FIG. 104. The Fresnel lens 641c is formed for each pixel as shown in FIG. 105.

Figure 106:
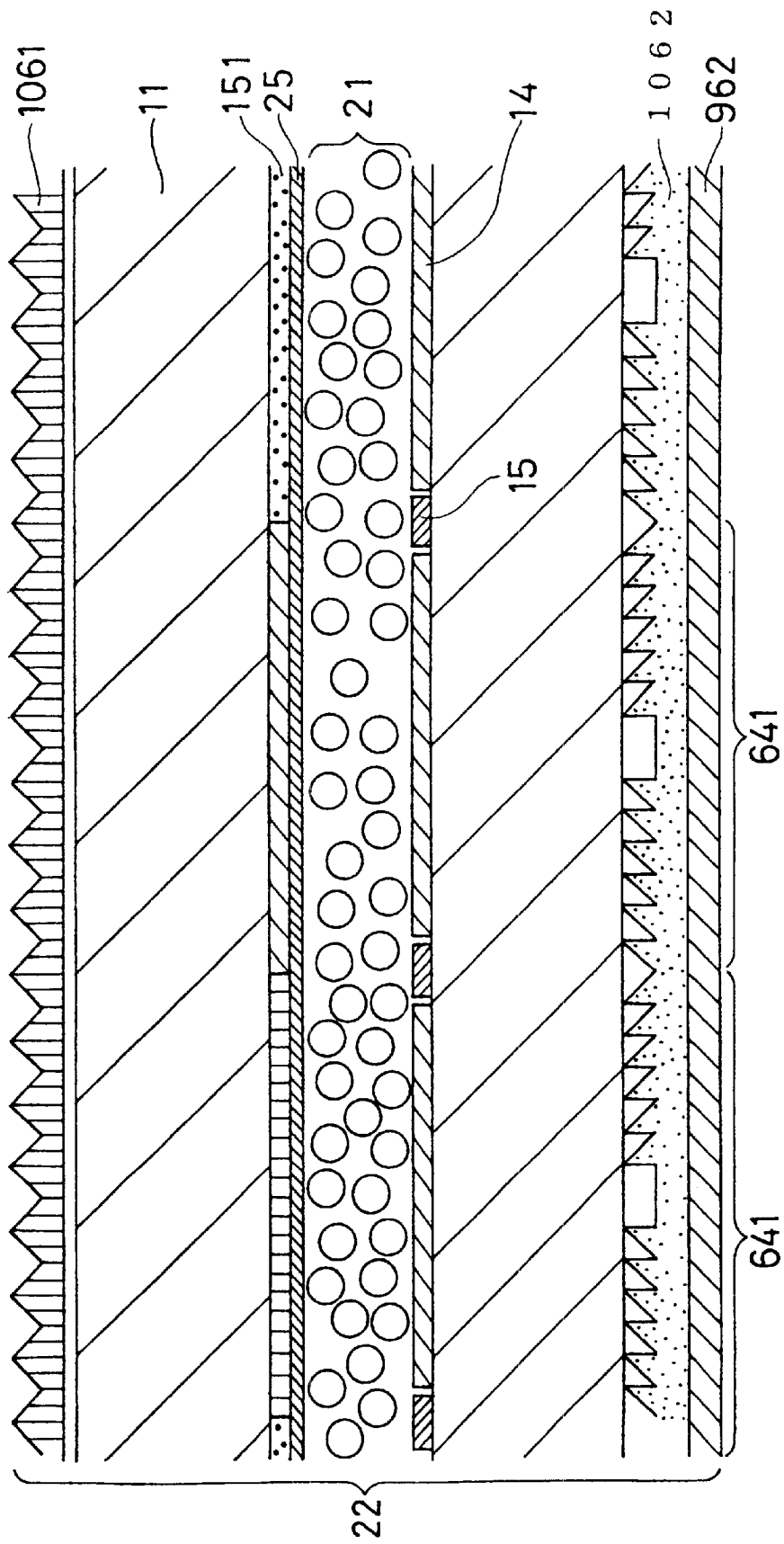
FIG. 106 is a sectional view of the liquid crystal display panel in another embodiment of the present invention.

FIG. 106 shows the constitution in which a reflecting film 962 formed on the back surface of a microlens sheet 1062 is arranged on the back surface of a display panel. Although the microlens sheet 1062 is not in the form of a Fresnel lens, as shown in FIG. 106, it may be either the circular arc shape shown in FIG. 102 or the flat shape shown in FIG. 95. Because the microlens 641 is arranged for the purpose of improving a visual field angle, it does not always need to be formed in correspondence with a single pixel. A single microlens may be arranged for a plurality of pixels.

In FIG. 106, light is incident from the side of the counter substrate 11 and emerges from the pixel electrode 14. The light emerging from the electrode 14 is reflected by a reflecting plate 962, and the directivity is evened by the microlens 641. The light emerges from the counter substrate 11 again.

Figure 107:
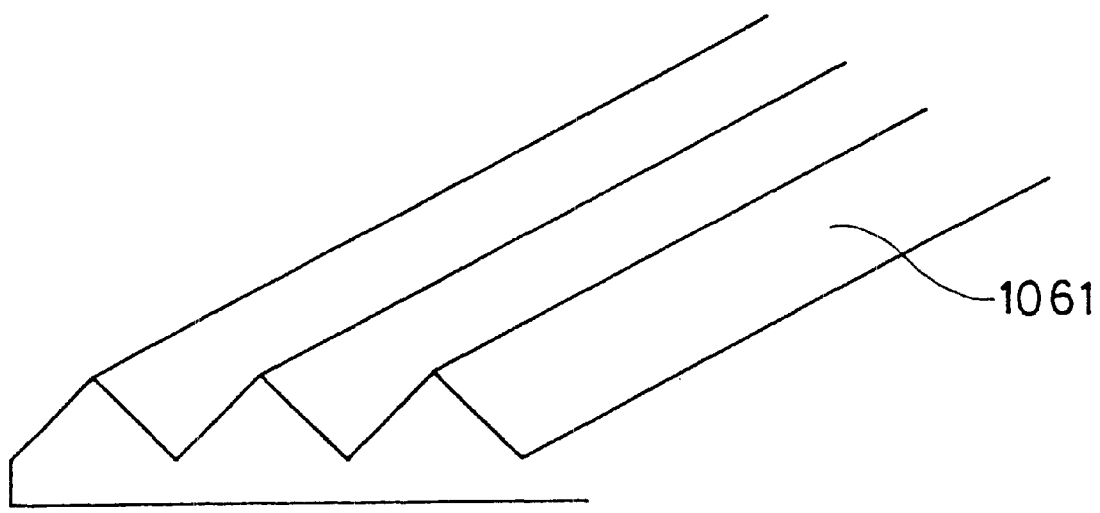
FIG. 107 is a perspective view of a prism sheet.
Figure 108:
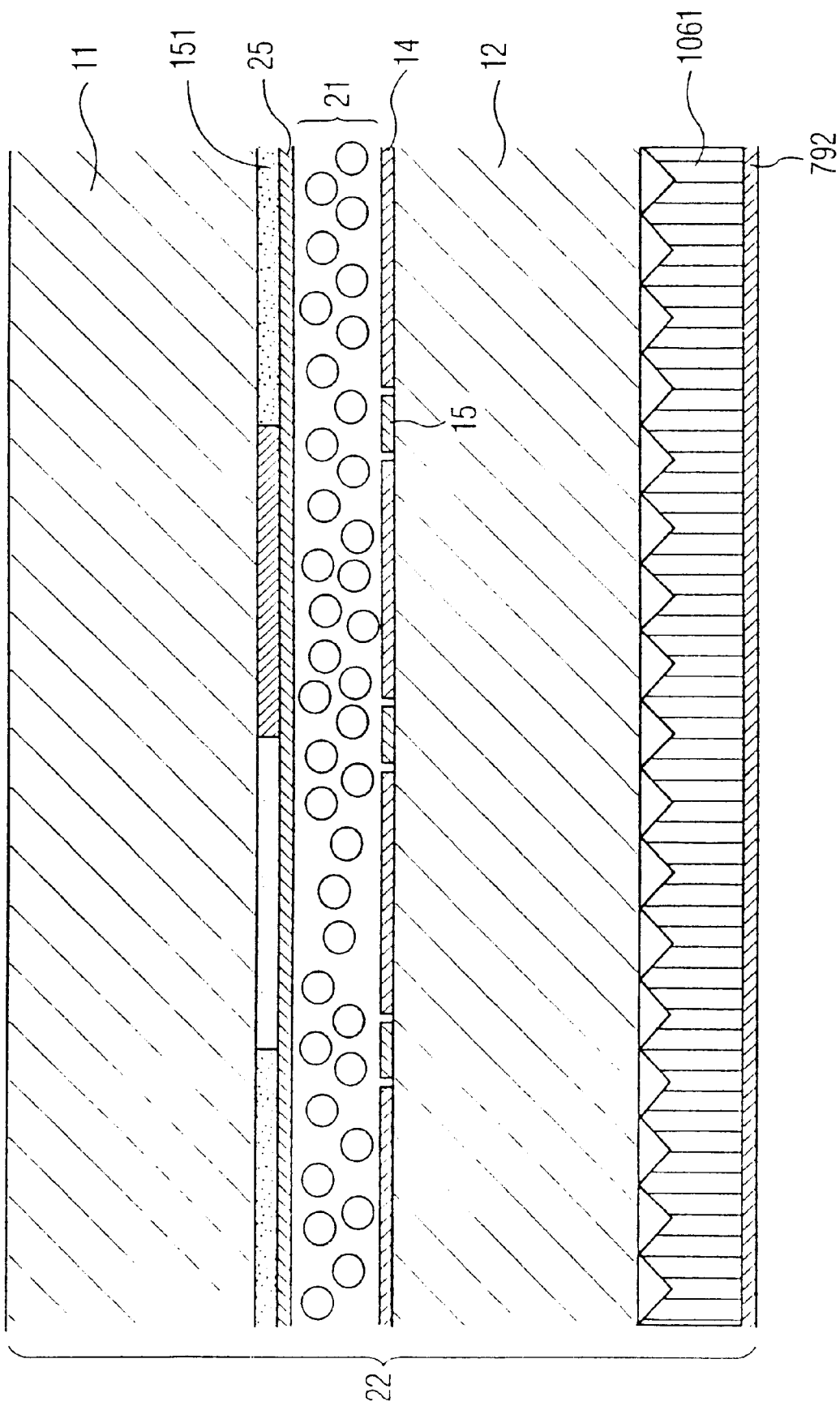
FIG. 108 is a sectional view of the liquid crystal display panel in another embodiment of the present invention.

1061 denotes a prism sheet such as that shown in FIG. 107. A single prism sheet or a plurality of prism sheets is superimposed and used. The prism sheet narrows the directivity of light emerging from the panel surface and is employed so that the display surface can have high brightness. Note that a reflecting film 792 may be formed on the back surface of the prism sheet 1061. As shown in FIG. 108, it may be employed instead of the microlens sheet 1062 shown in FIG. 106. In FIG. 106, if the microlens sheet 1062 is formed by cutting a metal plate, the reflecting film 962 is not needed. The microlens 641 on the microlens sheet 1062 does not always need to be formed in correspondence with a single pixel electrode 14. A single microlens 641 may be arranged for a plurality of pixel electrodes 14.

As previously described, if the microlens sheet 1062 or prism sheet 1061 formed with the reflecting film 962 on one side is arranged or glued on one side of the display panel, a reflection type display panel 22 with a proper visual field angle can be constituted. Furthermore, if the prism sheet 1061 is arranged on the incident surface of the display panel, high brightness display can be realized.

Figure 109:
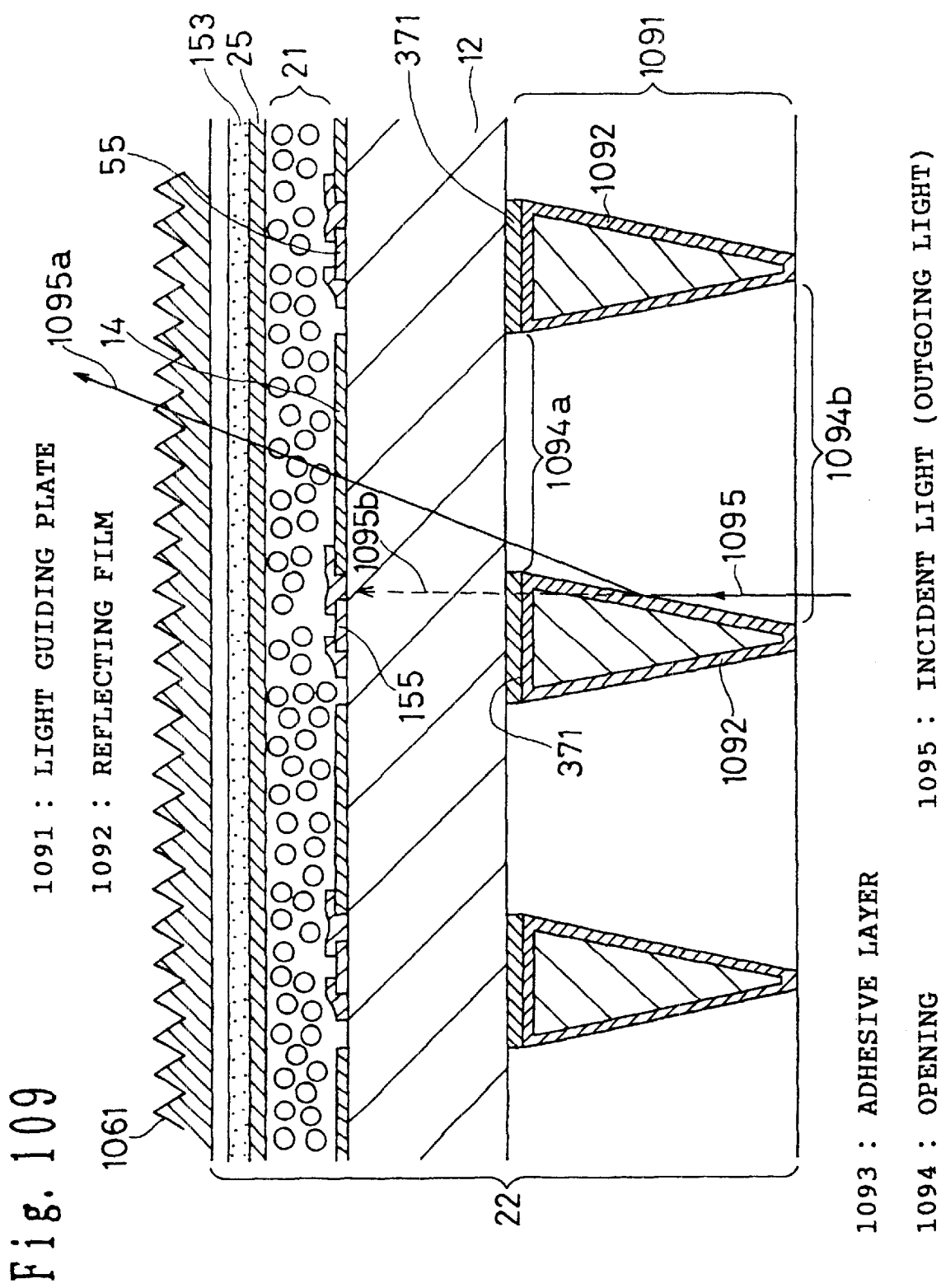
FIG. 109 is a sectional view of the liquid crystal display panel in another embodiment of the present invention.

If the PD liquid crystal layer is employed as a light modulating layer, the light rate of utilization can be enhanced. If the display panel is constituted as shown in FIG. 109, the light rate of utilization can be further enhanced. In the constitution of FIG. 109, a light guiding plate 1091 is stuck on the surface of the panel 22 with an adhesive layer 371. However, the adhesive layer 371 is not required if the positional relation between the light guiding plate 1091 and the array substrate 12 is fixed (for example, mechanically).

As the adhesive layer 371, there are silicon gel, a silicon adhesive agent, an epoxy adhesive agent, ultraviolet ray setting resin, a bonding agent, and heat setting resin. The adhesive agent is selected in view of the thermal stress and contraction ratio between the light guiding plate 1091 and the array substrate 12.

The light guiding plate 1091 is formed with a reflecting film 1092 on the surface thereof. It is desirable that the material of the reflecting film 1092 should be silver (Ag). In addition, gold (Au), aluminum (Al), titan (Ti), and chrome (Cr) can be employed. In the case of Al and Ag, the surface is easily oxidized, so it is desirable that the surface should be formed with a protective film such as $SiO_2$ and $TaO_x$.

As a method of forming the reflecting film 1092, there is a deposition method such as sputtering, an electrolytic plating method, and an electroless plating method. It is preferable that the light guiding plate 1091 should be formed from resin such as acrylic, polycarbonate, engineering plastic, and PVA from the side of cost and processability. In these resins, a hole for light guidance can be easily formed by a molding technique using a metal mold. In the hole for light guidance, an opening 1094b on the incident side is widened and an opening 1094a on the exit side is narrowed. The opening 1094a is made larger than or equal to the pixel electrode 14.

The reflecting film 1092 is formed on the surface of the substrate in which the hole for light guidance is formed. A simplest method is to form it by an electroless plating technique. However, there is the disadvantage that the film is easily peeled.

In FIG. 109, although it has been illustrated that the protective film 153 is formed on the counter electrode 25, the present invention is not limited to this, but the counter substrate 11 may be arranged. In addition, in FIGS. 109 and 15 the protective film 153 may be replaced with a protective sheet such as plastic. In that case, the protective sheet (or a protective substrate) may be placed on the color filter 15 or pasted on it with an adhesive agent. The protective sheet and protective film 153 are generically called a protective layer.

Figure 110:
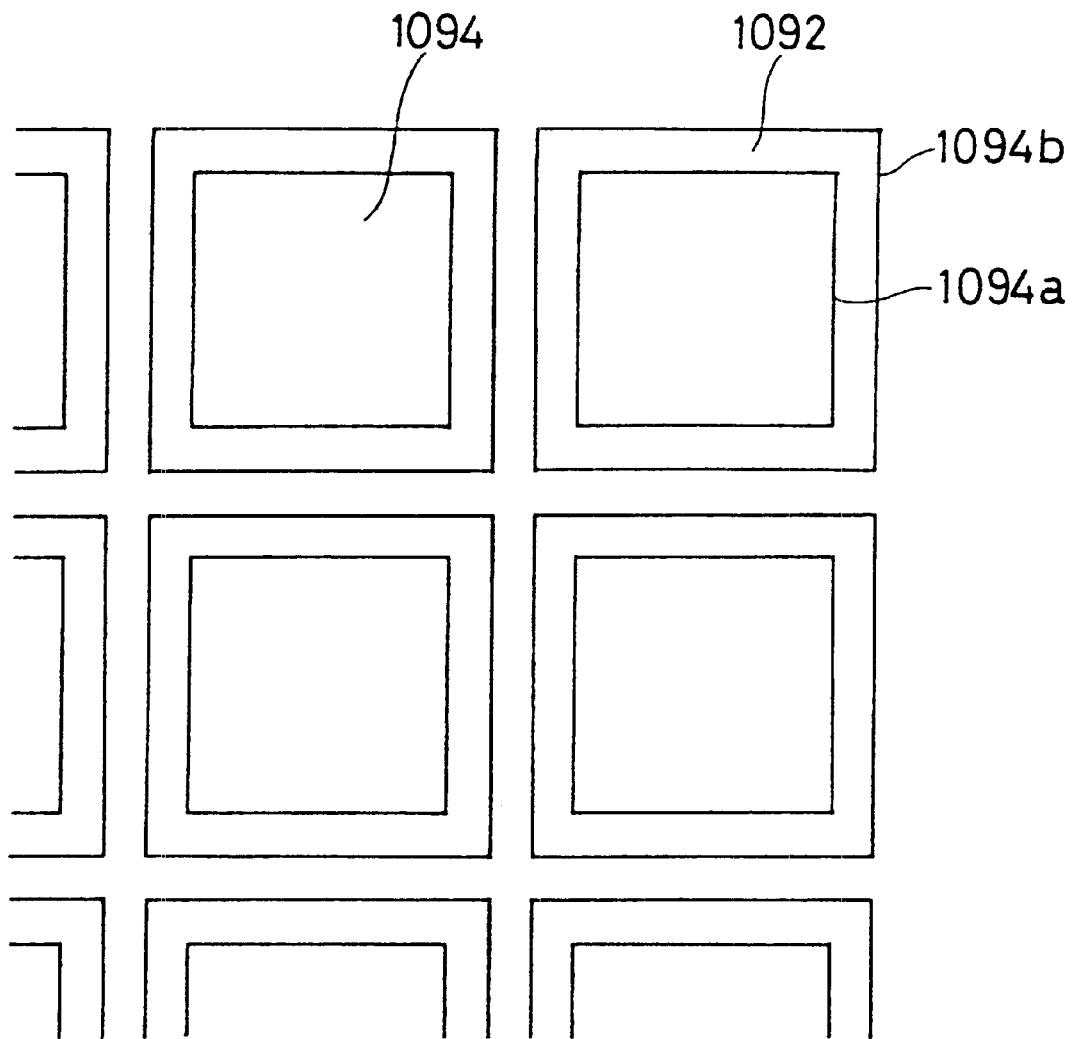
FIG. 110 is a plan view of the liquid crystal display panel of FIG. 109.
Figure 111:
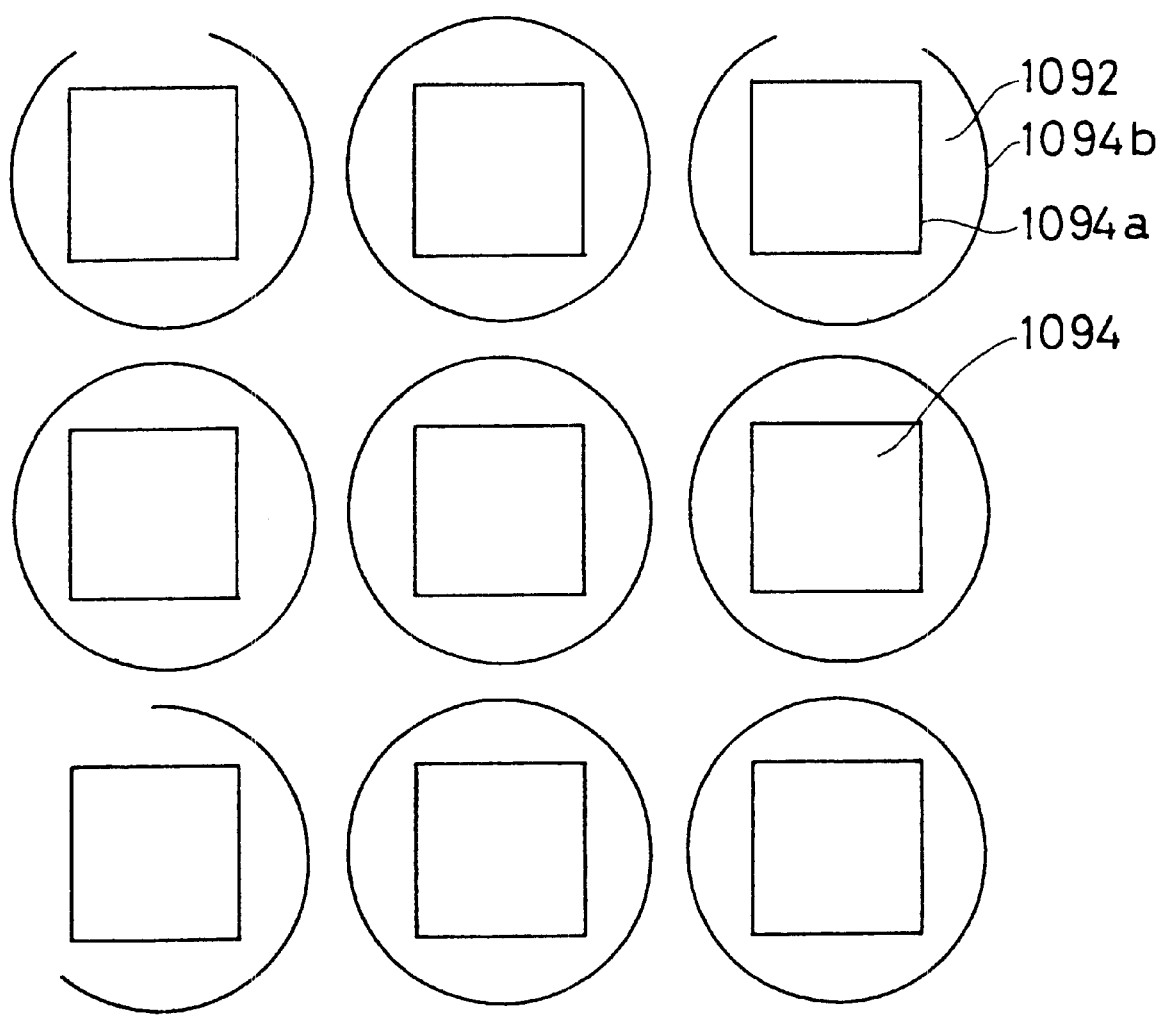
FIG. 111 is a plan view of the liquid crystal display panel of FIG. 109.

FIG. 110 is a plan view seen from the opening 1094b of the light guiding plate 1091. The opening 1094a is the same as the size of the pixel electrode 14. In FIG. 110, although the opening 1094b is rectangular, it may be circular as shown in FIG. 111.

As shown in FIG. 109, incident light 1095 is reflected by the reflecting film 1092. The reflected light 1095a passes through the pixel electrode 14. In other words, the reflected light becomes effective light for display. If the reflecting film 1092 is not present, the incident light 1095 will be light 1095b, and the light 1095b will be incident on the TFT 155. For this reason, incident light does not pass through the pixel electrode 14, so the light efficiency of utilization is reduced.

Thus, light is collected from the opening 1094b toward the opening 1094a and guided to the pixel electrode 14. For this reason the light efficiency of utilization can be enhanced.

Figure 112:
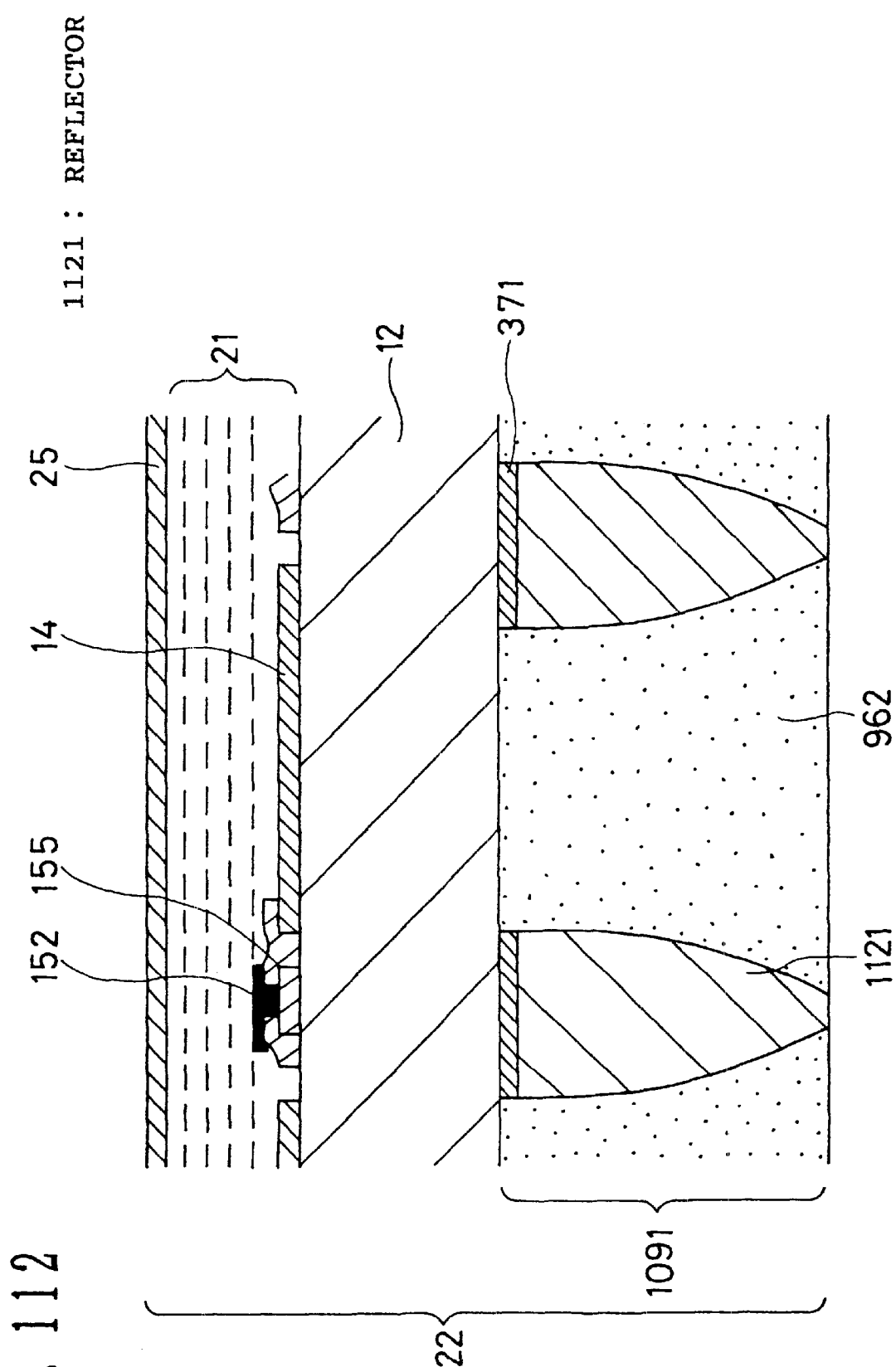
FIG. 112 is a part-sectional view of the liquid crystal display panel in another embodiment of the present invention.

Although the reflecting surface 1092b of FIG. 109 has a triangular cone shape, it may have a circular arc shape as shown in FIG. 112. In addition, the light guiding plate 1091 itself may be formed with a reflecting material. For example, the opening 1094 may be formed in an aluminum plate. As another example, the opening 1094 may be filled with transparent resin 962. The resin 962 employs, for example, silicon gel or ultraviolet ray setting resin. Also, it may be liquid such as ethylene glycol. In the case of liquid, the light reflecting surface of the light guiding plate is sealed, for example, with cover glass so that liquid does not leak.

The microlens 641 is made by a stamper or an ion exchange method, but it is high in cost and cannot be formed over a wide area.

Figure 96:
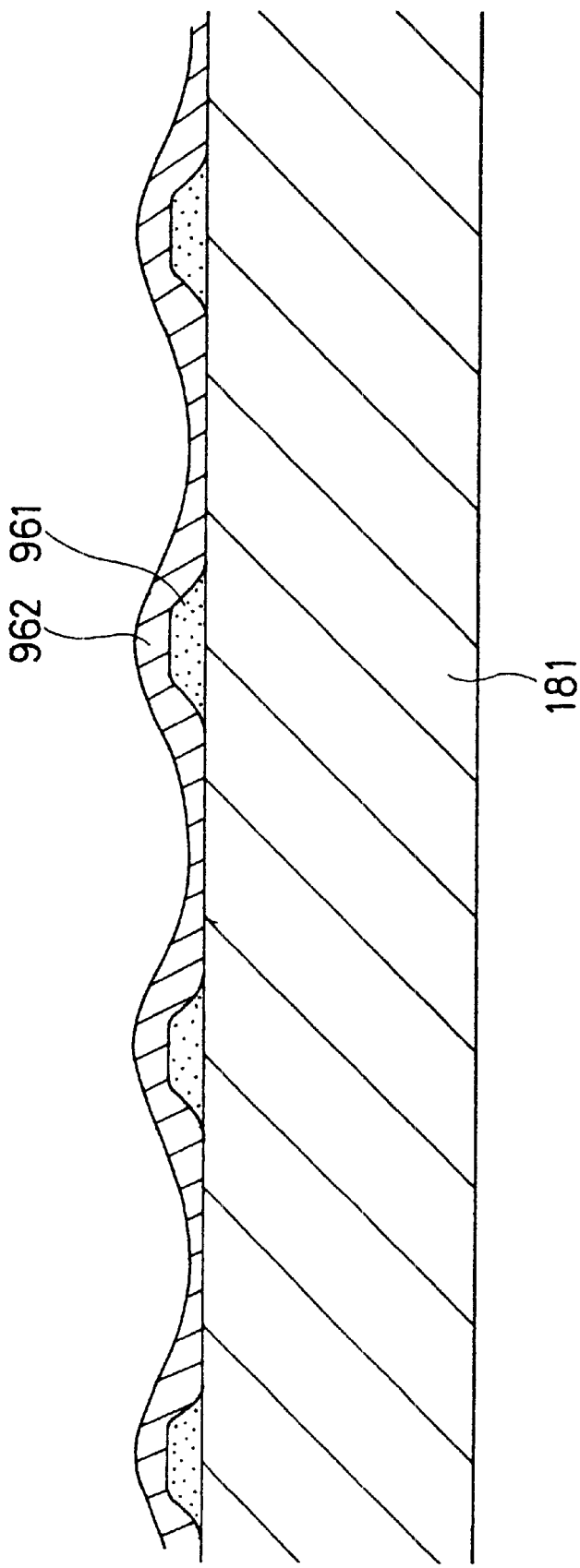
FIG. 96 is a sectional view of the microlens array substrate of the present invention.
Figure 97:
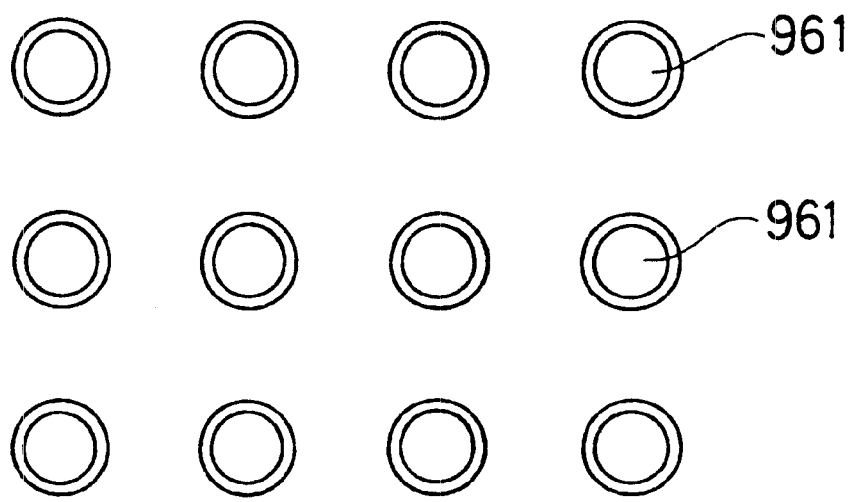
FIG. 97 is an explanatory diagram of the microlens array substrate of the present invention.

FIG. 96 is a sectional view of the microlens of the present invention solving the aforementioned problem. In the microlens array shown in FIG. 96, a protruding portion 961 is formed on film or a substrate 642 so that it corresponds to each pixel. A plan view of the protruding portion 961 is shown in FIG. 97. The protruding portion 961 is formed by depositing inorganic film, exposing photosensitive acrylic resin, and developing. 962 denotes transparent resin film, which is formed by coating transparent resin film on the protruding portion 961 and then setting the coated resin film.

The material of the transparent resin film 962 is a polymeric compound having an acrylic base. An acrylic hard coating agent is exemplified. The resin component is 70 to 80%, and the viscosity is 0.15 to 0.2 Pa*S.

Figure 98:
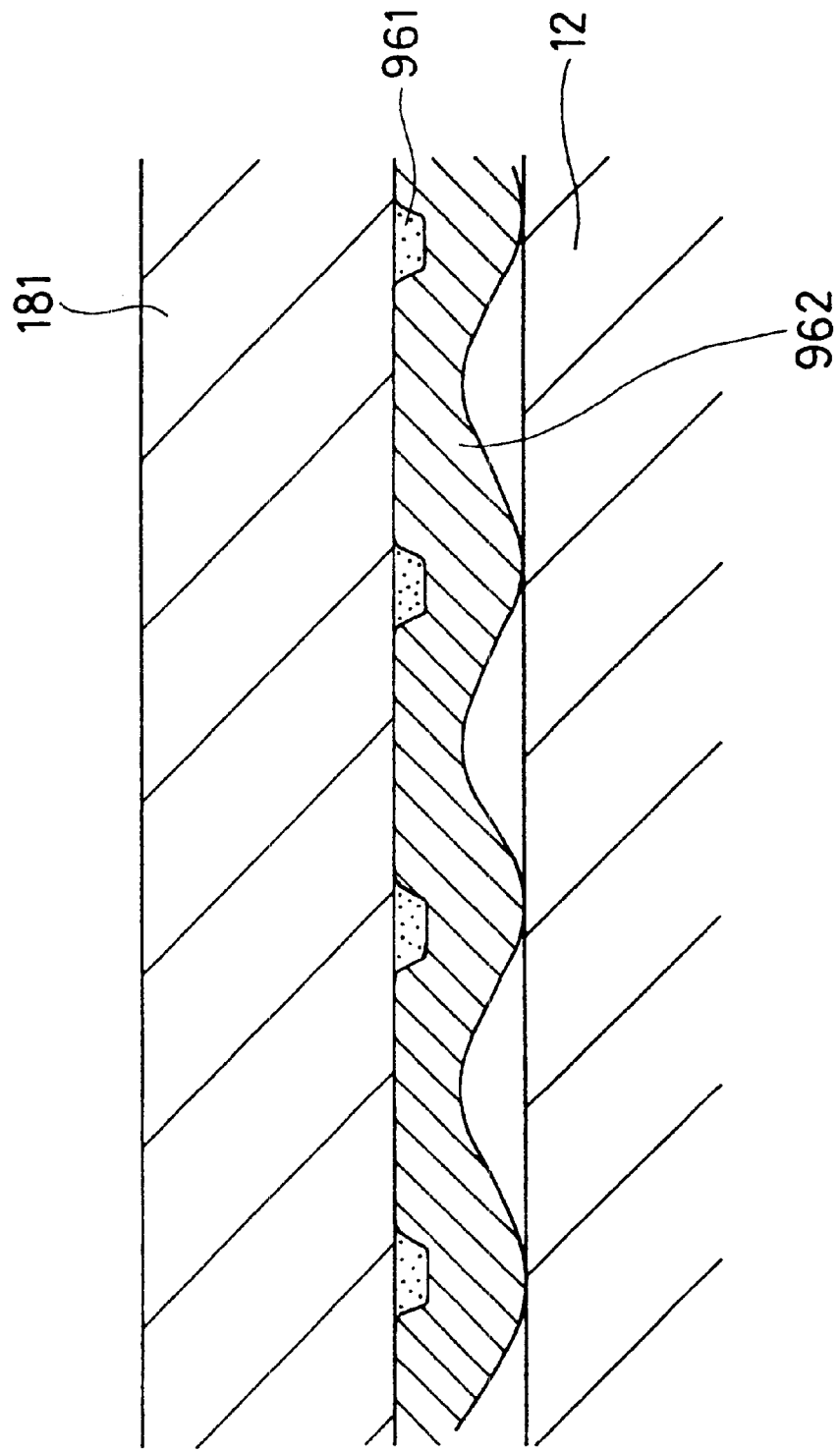
FIG. 98 is a sectional view of the liquid crystal display panel attaching the microlens array substrate of the present invention.
Figure 100:
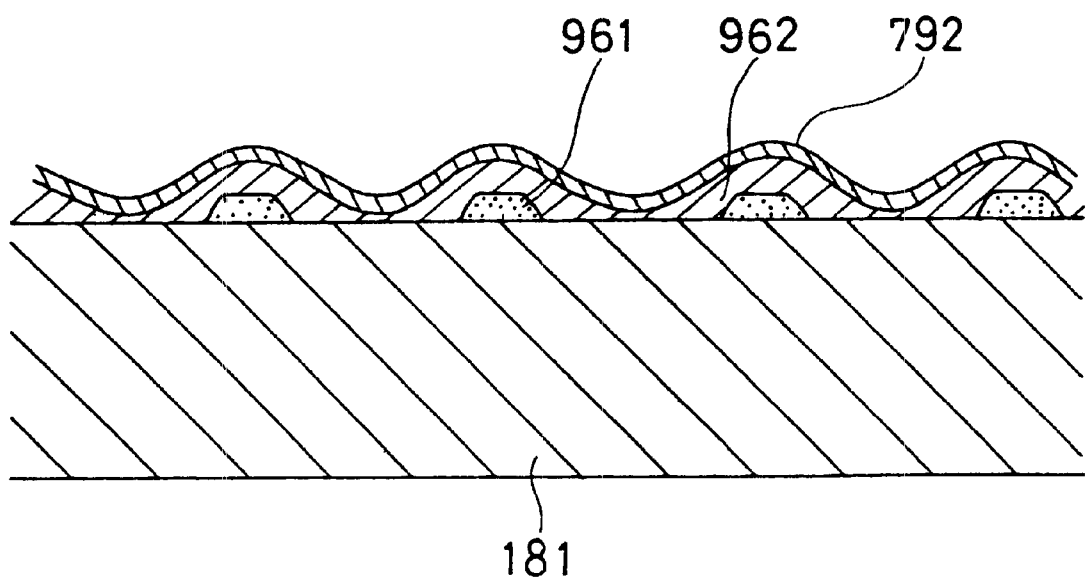
FIG. 100 is a sectional view of the microlens array substrate in another embodiment of the present invention.

The microlens array shown in FIG. 96 is arranged near the array substrate 12 or counter substrate 11 and employed, as shown in FIG. 98. In other words, it is employed in the same way as the aforementioned microlens. If the reflecting film 792 is formed on the protruding portions 961, as shown in FIG. 100, it can be employed as a reflection type microlens. Also, it can be employed as the irregularity film 821 shown in FIG. 82. If the protruding portion 961 is formed in the form of a line, a line microlens substrate such as that shown in FIG. 66 can also be constituted. If the height of the protruding portion 961 is varied, a microlens array with R, G, and B different in height, shown in FIG. 65, can also be constituted. In addition, the irregularity portion 821 such as that shown in FIG. 85 can be formed with a similar technique.

Figure 99:
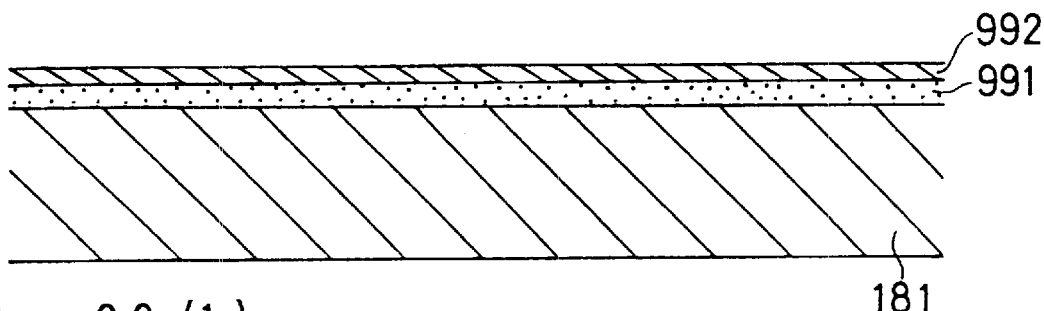
FIG. 99 is an explanatory diagram of the fabrication method of the microlens array substrate of the present invention.
Figure 99:
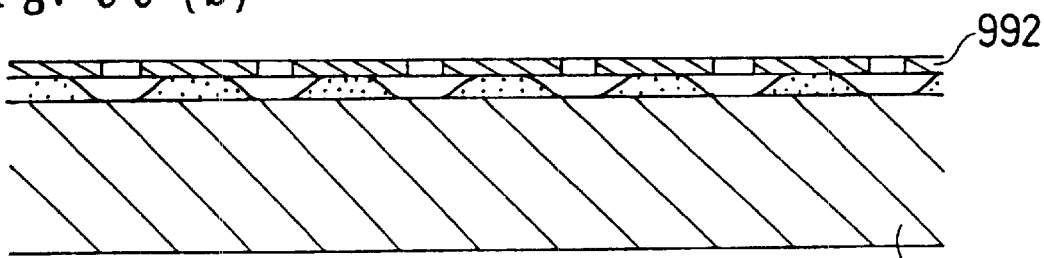
Figure 99:
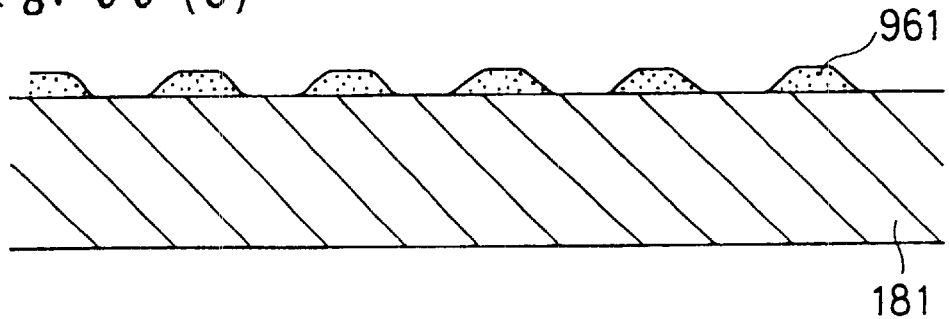
Figure 99:
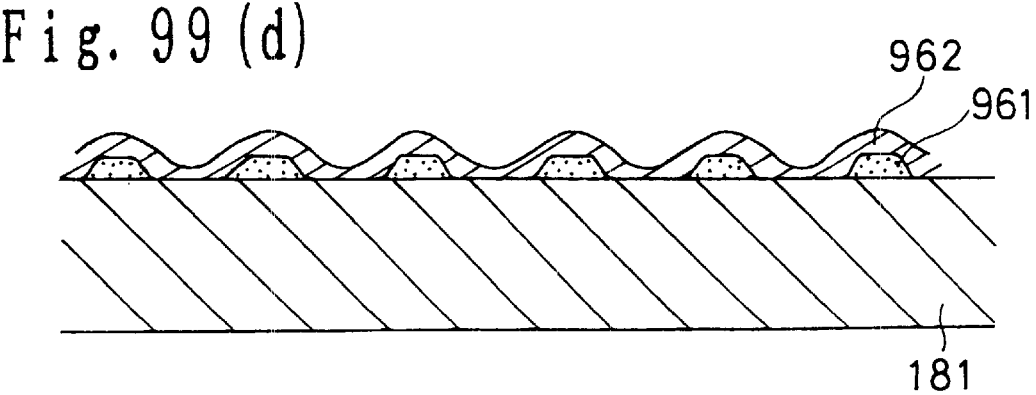

FIG. 99 is an explanatory diagram of the fabrication method of the microlens array of the present invention. Transparent film 991 such as $SiO_2$ is formed on a substrate 181, and on the film 991, metal film 992 which becomes a mask is formed (FIG. 99(a)). The metal film 992 is patterned (FIG. 99(b)) and the film 991 is etched, thereby forming the protruding portions 961 (FIG. 99(c)). Thereafter, acrylic hard coating agent is coated on the protruding portions 961 and dried for 10 min at room temperature. At this time, the coated coating agent is formed into a smooth irregularity shape by the surface tension between it and the protruding portions 961. Then, ultraviolet rays are irradiated on the hard coating agent at a strength of 0.5 $J/cm^2$ with a high-pressure mercury lamp, and the polymeric compound of the hard coating agent is polymerized.

In FIG. 99, although the protruding portions 961 are formed by etching inorganic film, the present invention is not limited to this. The protruding portions 961 may be formed by coating photosensitive acrylic resin on the substrate 181 and then irradiating light through a mask.

Figure 101:
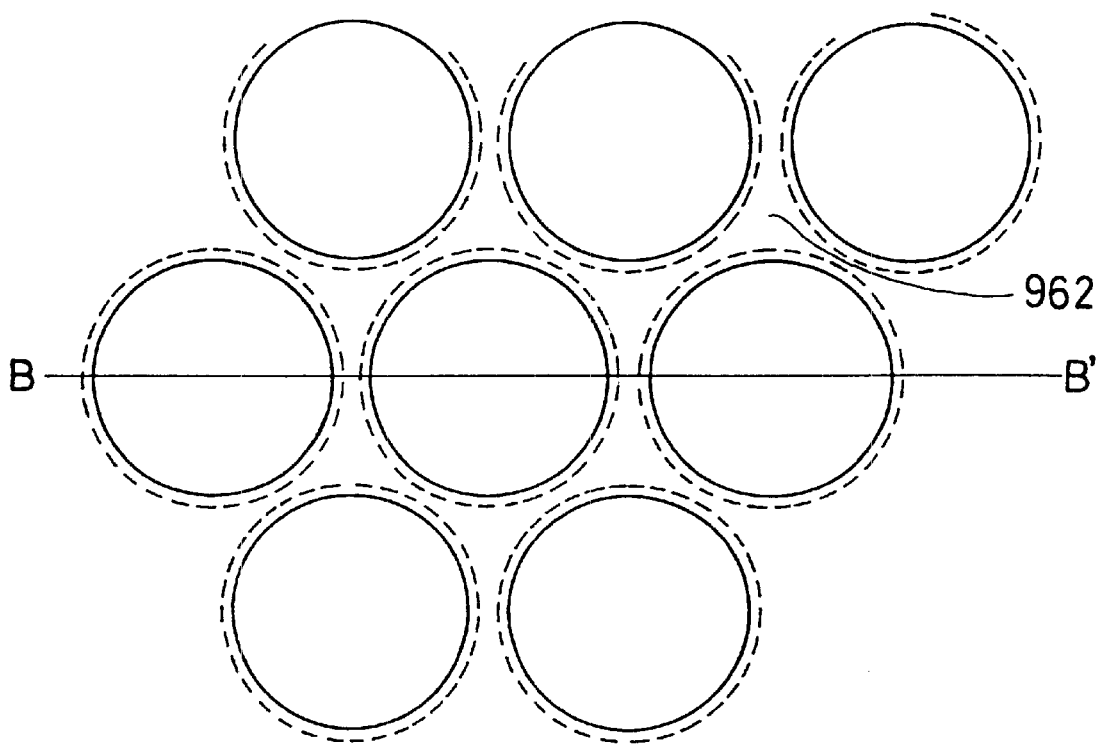
FIG. 101 is a plan view and a sectional view of the microlens array substrate in another embodiment of the present invention.
Figure 101:
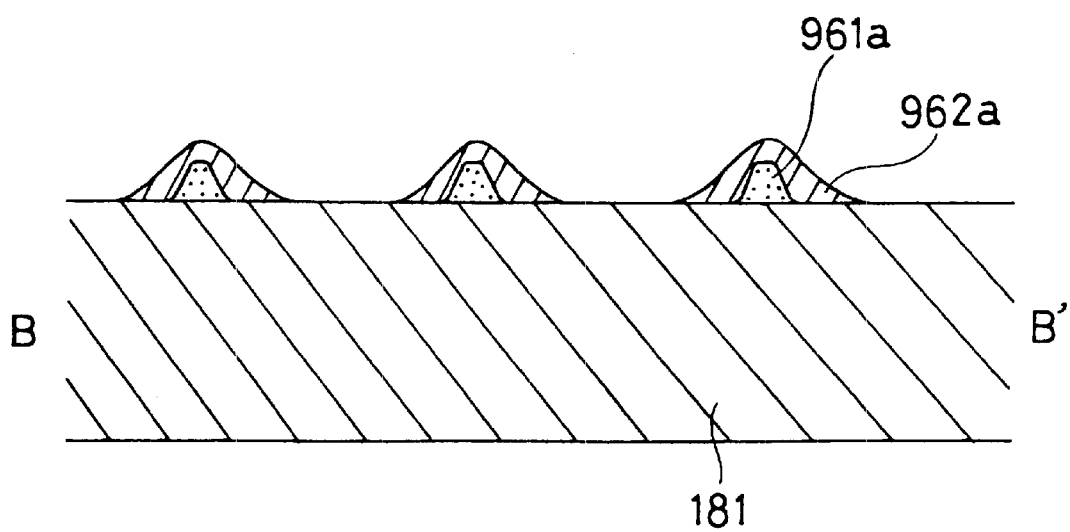

FIG. 96 shows the microlens sheet with convex lenses. As shown in FIG. 101, if protruding portions 961a are formed on the circumferential portion of the lens and then a transparent resin layer 962a is formed on the protruding portions 961a, a concave microlens sheet (substrate) can be fabricated.

While it has been described that the microlenses 641 and 962 are convex microlenses (Fresnel lenses), the present invention is not limited to convex lenses. The microlens or Fresnel lens may be changed to a concave lens, depending on the constitution of a display panel.

Light scattered by the liquid crystal layer 21 is reflected by the interface between the counter substrate 11 (or the array substrate 12) and air and become reflected light 1095a, and the reflected light 1095a returns to the liquid crystal layer 21 again and is scattered (halation). This is called secondary scattered light. The secondary scattered light causes the display contrast of the PD liquid crystal display panel to be considerably reduced.

To prevent the occurrence of this secondary scattered light a transparent substrate 1131 is attached to at least either the array substrate 12 or the counter substrate 11. The attachment of the transparent substrate 1131 is performed by optical coupling through a optical coupling layer 371a. If the transparent substrate 1131 is attached, the aforementioned halation can be absorbed by a light absorbing film 1132 coated on the invalid area (that effective light for image display does not pass through) of the transparent substrate 1131.

As the light absorbing film 1131, there is black paint. The material of the light shielding film 152 can also be employed. Even structure with a polished and exposed surface also has the effect of the light absorbing film 1132. These are believed to be included in the concept of the light absorbing film 1132.

Figure 113A:
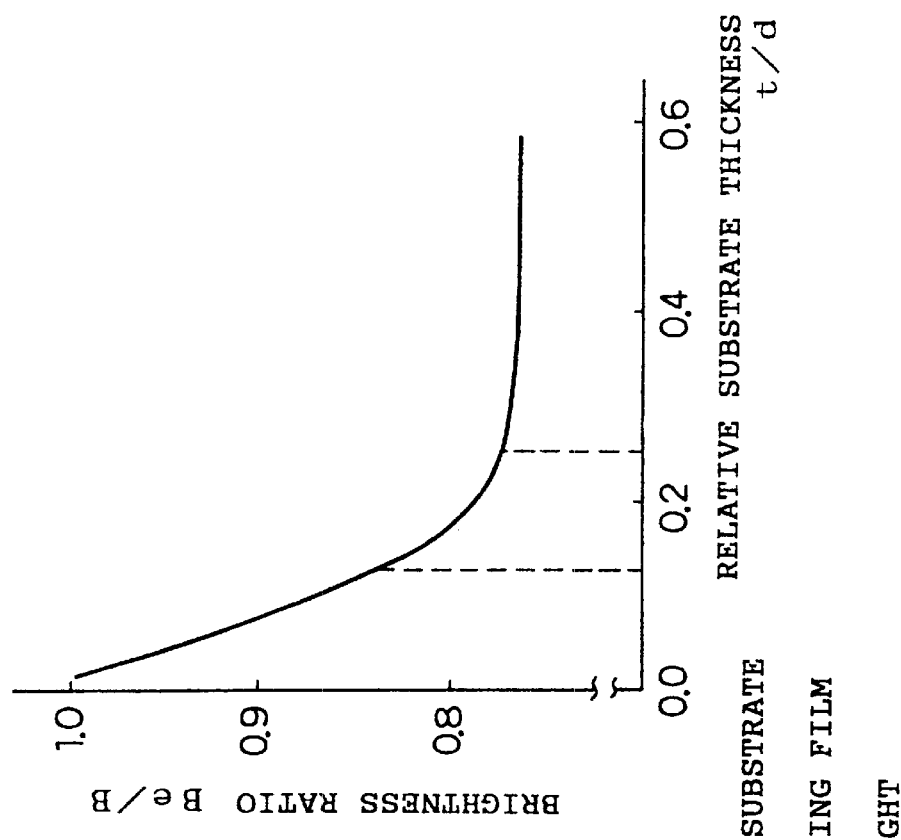
FIG. 113 is an explanatory diagram explaining the characteristic of the liquid crystal display panel of the present invention.

FIG. 113 shows the effect of the transparent substrate 1131. As shown in FIG. 16(a), a panel 22 is irradiated with a collimated beam of light, and the brightness of a light modulating layer 21 is measured from the exit side. The brightness B means brightness measured when the thickness t of a substrate on an exit side, i.e., the thickness of counter substrate+transparent substrate 1131 is extremely thin with respect to the diagonal length of an effective display area and also the light absorbing film 1132 is not present. Specifically, the thickness of a substrate on an exit side is 1 mm (t=1) when d=50 mm.

Figure 113B:
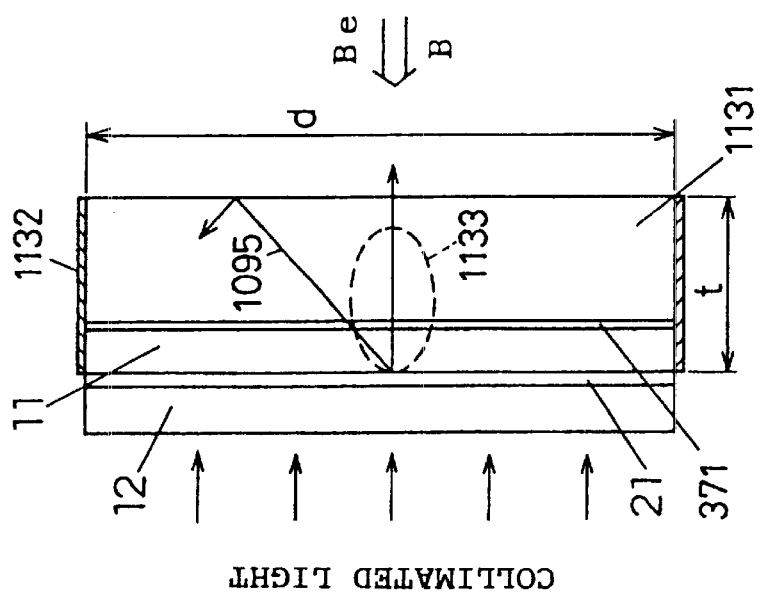

In FIG. 113(b), the axis of ordinate represents brightness ratio (Be/B) and the axis of abscissa represents relative substrate thickness (t/d). From FIG. 113(b) it is found that the brightness ratio (Be/B) becomes constant when t/d=0.3 and also a reduction in the ratio is great when t/d<0.3.

A small brightness ratio means high display contrast. According to FIG. 113(b), it is found that a contrast enhancing effect is sufficient when t/d>0.25 to 0.3 and that the effect is in a practical range even when t/d=0.15 which is ½ of the relative substrate thickness (t/d). Therefore, it is preferable that t/d should be 0.15 or more when refractive index of a substrate n=1.52, particularly (t/d should be) 0.3 or more. The relation between thickness t and diagonal length d, therefore, needs to meet the following equation:

$$t \geq \frac{d}{8}\sqrt{n^2 - 1} \qquad \text{[expression 29]}$$

Note that the transparent substrate 1131 is not limited to a glass substrate. For example, it may be constituted by resin such as acrylic and polycarbonate. Also, if the transparent substrate 1131 is made into a concave lens 1131b, the substrate thickness can be made thin. Furthermore, if the concave lens 1131b is combined with a positive lens 1131a, positive optical power and negative optical power can be cancelled out by the concave lens 1131 and positive lens 1131a, and the combination can be apparently regarded as the transparent substrate 1131. These examples are shown in FIG. 114.

FIG. 54 has illustrated constitution formed with the light shielding film 542 on the counter substrate 11.

Figure 116:
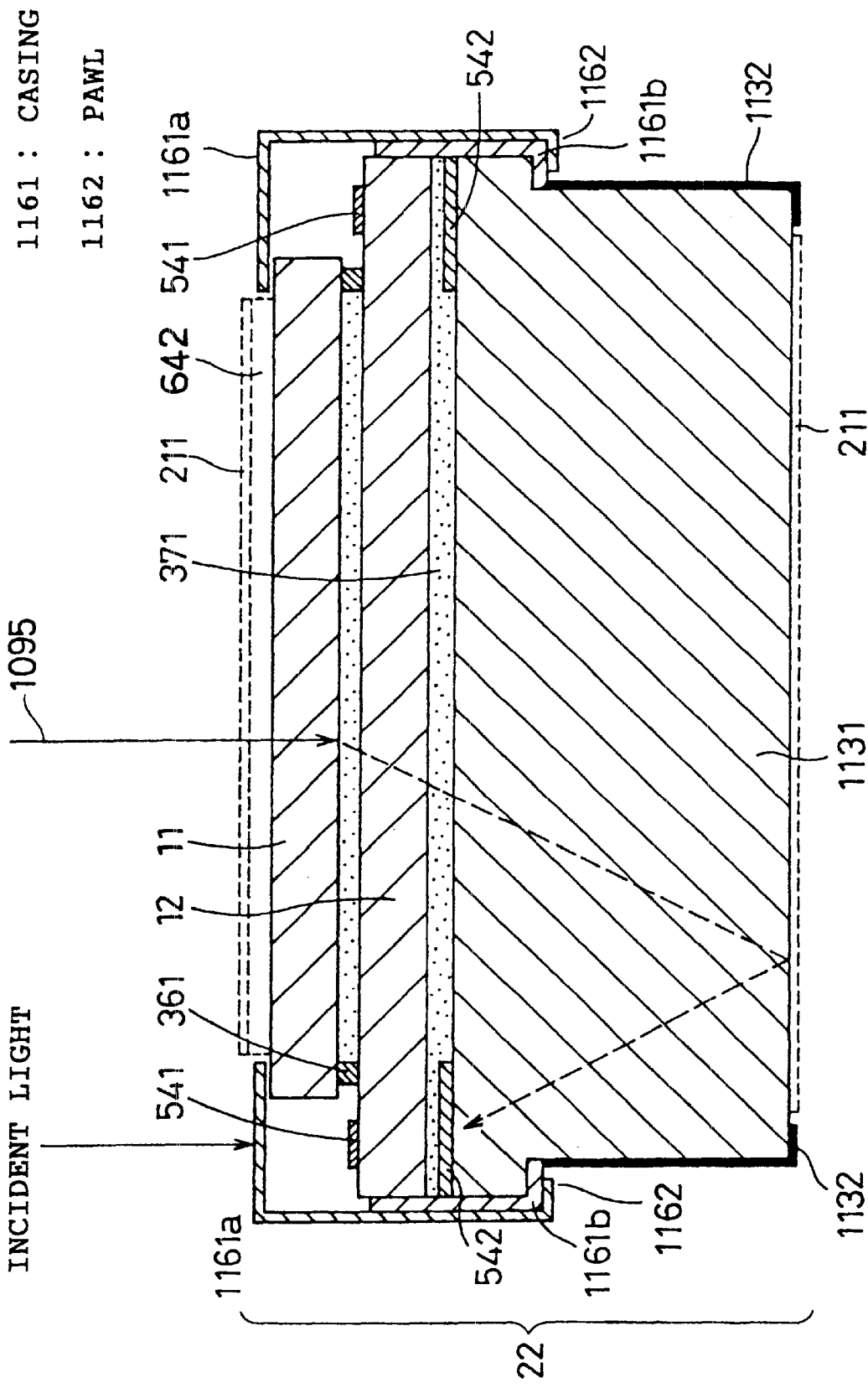
FIG. 116 is a sectional view of the liquid crystal display panel in another embodiment of the present invention.

FIG. 116 illustrates constitution formed with the light shielding film 542 on the back surface of the transparent substrate 1131 (or the concave lens 1131b). A driver circuit 541 is formed on an array substrate 12 at the same time as a TFT 155 by employing a low-temperature polysilicon technique. Alternatively, a silicon chip is mounted on the array substrate 12 by a chip-on glass (COG) technique. On the other hand, the light shielding film 542 is formed or arranged on an invalid surface (that effective light for image display does not pass through) on the back surface of the transparent plate 1131. The "light shielding film 542 is formed" is intended to mean that black resin or metal film is formed directly on the transparent substrate 1131 by a coating technique or a deposition technique. The "light shielding film 542 is arranged" is intended to mean that a metal plate is inserted. For the metal plate, black metal such as chrome oxide and sexivalent chrome is preferable to Al metal having a shinning surface. As the black paint, there is paint, acrylic resin, and resin 154 formed on a transistor.

Direct incident light is shut out by a casing 1161a. Between the driver circuit 541 and the casing 1161a, space is provided for air-cooling heat generated by the driver circuit 541. The casing 1161 is fabricated by a sheeting technique or a plastic molding technique.

The casing 1161b is a lower lid, which is caught on an indent portion of the transparent substrate 1131 and held.

The casing 1161b is formed with a hole through which the transparent substrate 1131 is inserted. The transparent substrate 1131 and the array substrate 12 are stuck together through a Optical coupling layer 371.

When a light valve is assembled, the transparent substrate (or the concave lens) 1131 is first inserted into the lower lid (casing) 1161b. Then, the Optical coupling layer 371, sufficiently given a bubble removing process, is dropped. Thereafter, the liquid crystal display panel 22 is inserted and then stuck on the transparent substrate 1131. Finally, an upper lid (casing) 1161a is fitted on the lower lid 1161b through a flange portion 1162. As occasion demands, a glass substrate 642 formed with an antireflection film 211 is stuck through a Optical coupling layer (not shown). Note that another antireflection film 211 should be formed on a contacted surface between the transparent substrate 1131 and air.

If the transparent substrate 1131 is colored and made into an optical filter, there is an advantage. The colored optical filter is easily realizable by forming the transparent substrate,1131 with acrylic resin and then coloring the acrylic resin with a pigment. If the transparent substrate 1131 is colored, the color purity of light emerging from the liquid crystal display panel 22 can be enhanced and the color reproducibility of a projected image can be made sufficient.

In FIG. 116, although the transparent substrate 1131 is formed with resin or glass, it can also be realized by injecting gel or liquid 1172 into the casing 1161a. On the interior surface or exterior surface of the casing 1161a, a light absorbing film 1132 is formed or arranged. The casing 1161a is fitted on a counter substrate 11, and an adhesive agent 371a is applied to the contacted portion between the casing 1161a and the counter substrate 11 so that liquid 1171 does not leak from the contacted portion. An array substrate 12 is stuck on a casing (lower lid) 1161b with the adhesive agent 371b.

After the adhesive agent 371a has been set, liquid or gel 1172 is injected into the casing 1161a. The liquid or gel 1172 employs, for example, ethylene glycol, methyl salicylate, silicon gel, or epoxy resin. It is desirable that the refractive index should be 1.42 or more. The reason for this is that since the refractive index of a glass substrate such as the counter substrate 11 is 1.52, a difference in refractive index between the gel 1172 and the glass substrate is made within 0.1. If the difference is 0.1 or more, light will be reflected between the counter substrate 11 and the gel 1172. The gel 1172 maybe colored. The reason for this is that the colored gel can reduce the band width of light modulated at the liquid crystal display panel 22 and enhance the color purity of a display image. After the injection of the gel 1172, a glass substrate 1171 is fitted and sealed with an adhesive agent 371c.

Figure 117:
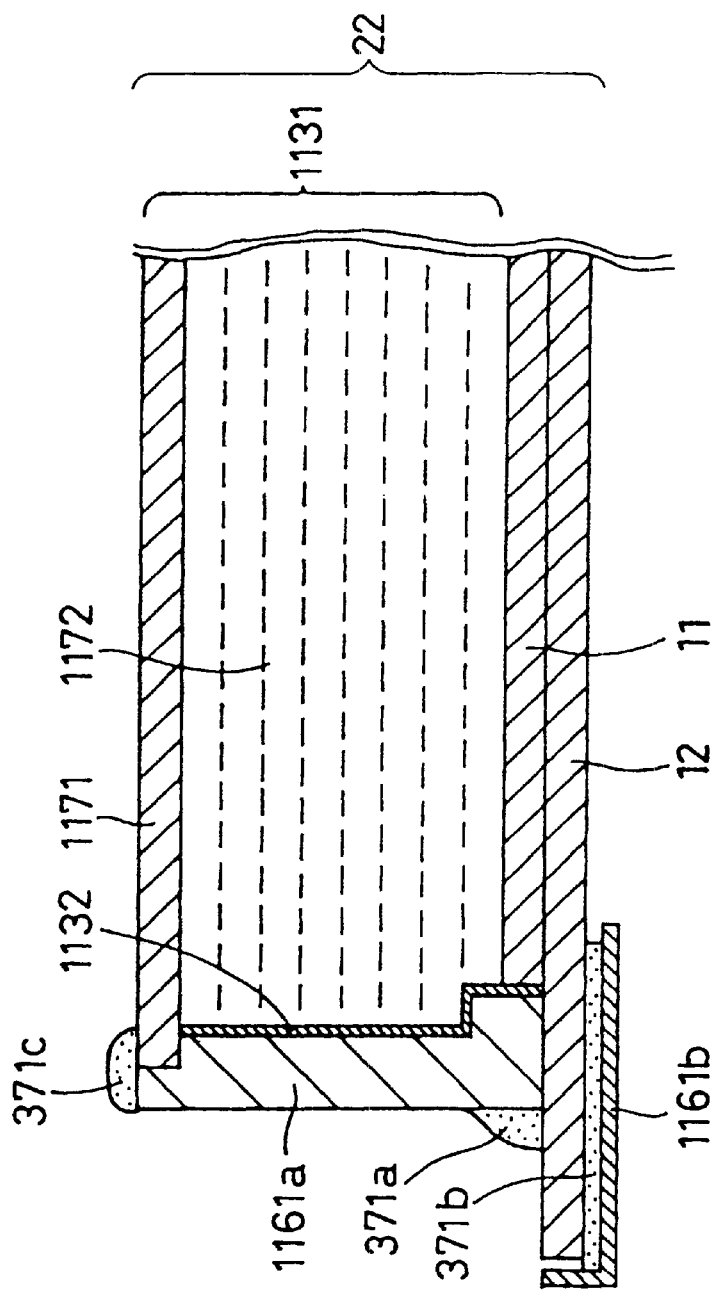
FIG. 117 is a sectional view of the liquid crystal display panel in another embodiment of the present invention.

Since the gel 1172 has fluidity, it is suitable for transfer of heat produced by the liquid crystal display panel 22. In other words, it makes a contribution to the cooling of the liquid crystal display panel 22. In addition, since the gel 1172 is light in weight compared with glass or resin, it makes a contribution to a reduction in the weight of a light valve. In the case of a large light valve, the constitution of FIG. 117 becomes inexpensive compared with the case where the transparent substrate 1131 is formed with glass. In addition, the constitution shown in FIG. 117 can reduce the weight of the light valve.

Figure 115:
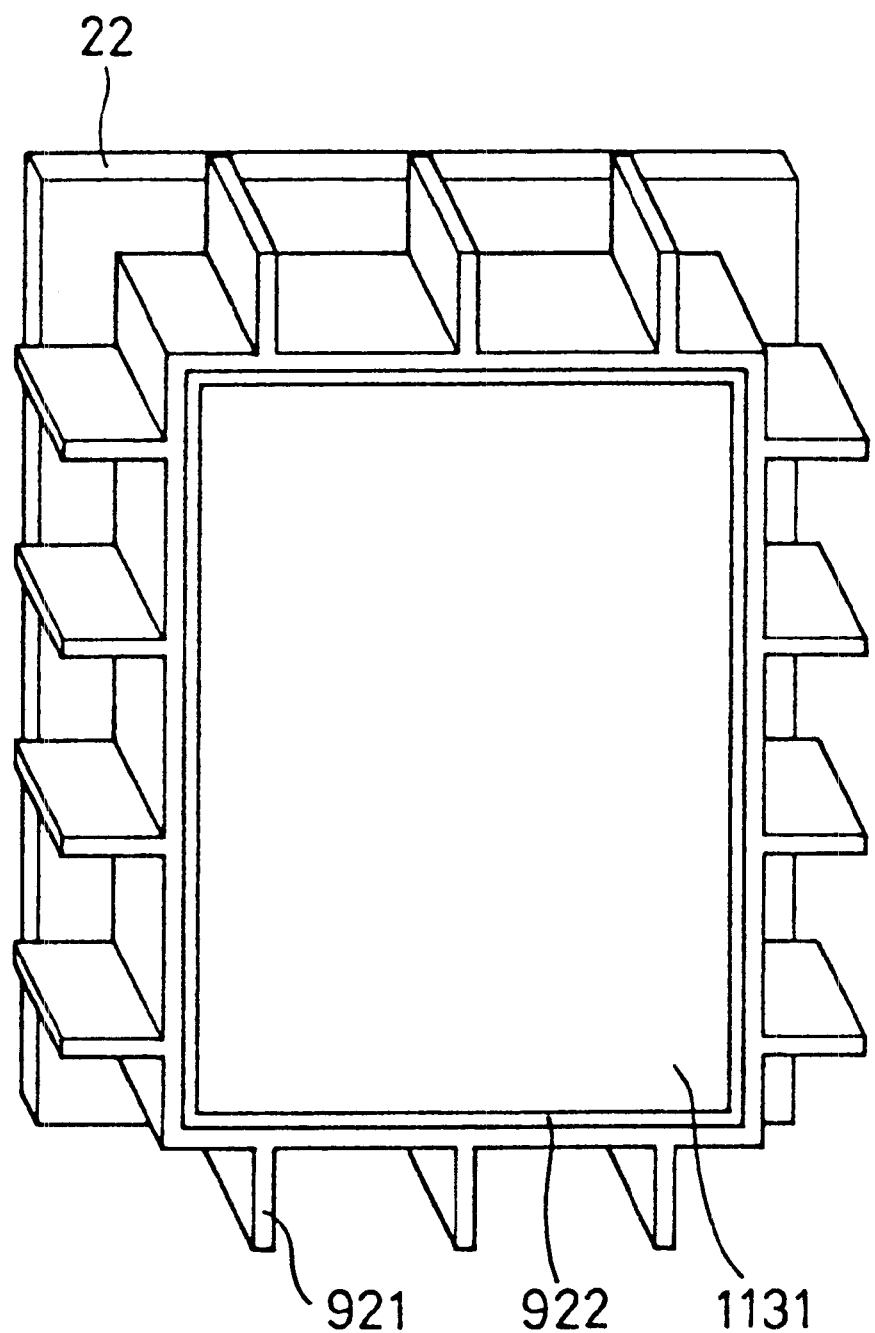
FIG. 115 is a perspective view of the liquid crystal display panel in another embodiment of the present invention.

As shown in FIG. 115, if a radiating fin 921 is attached to an invalid area on a transparent substrate 1131, heat can be effectively radiated from the light absorbing film 1132. The radiating fin 921 is attached to the transparent substrate 1131 with an adhesive agent 922.

Figure 118:
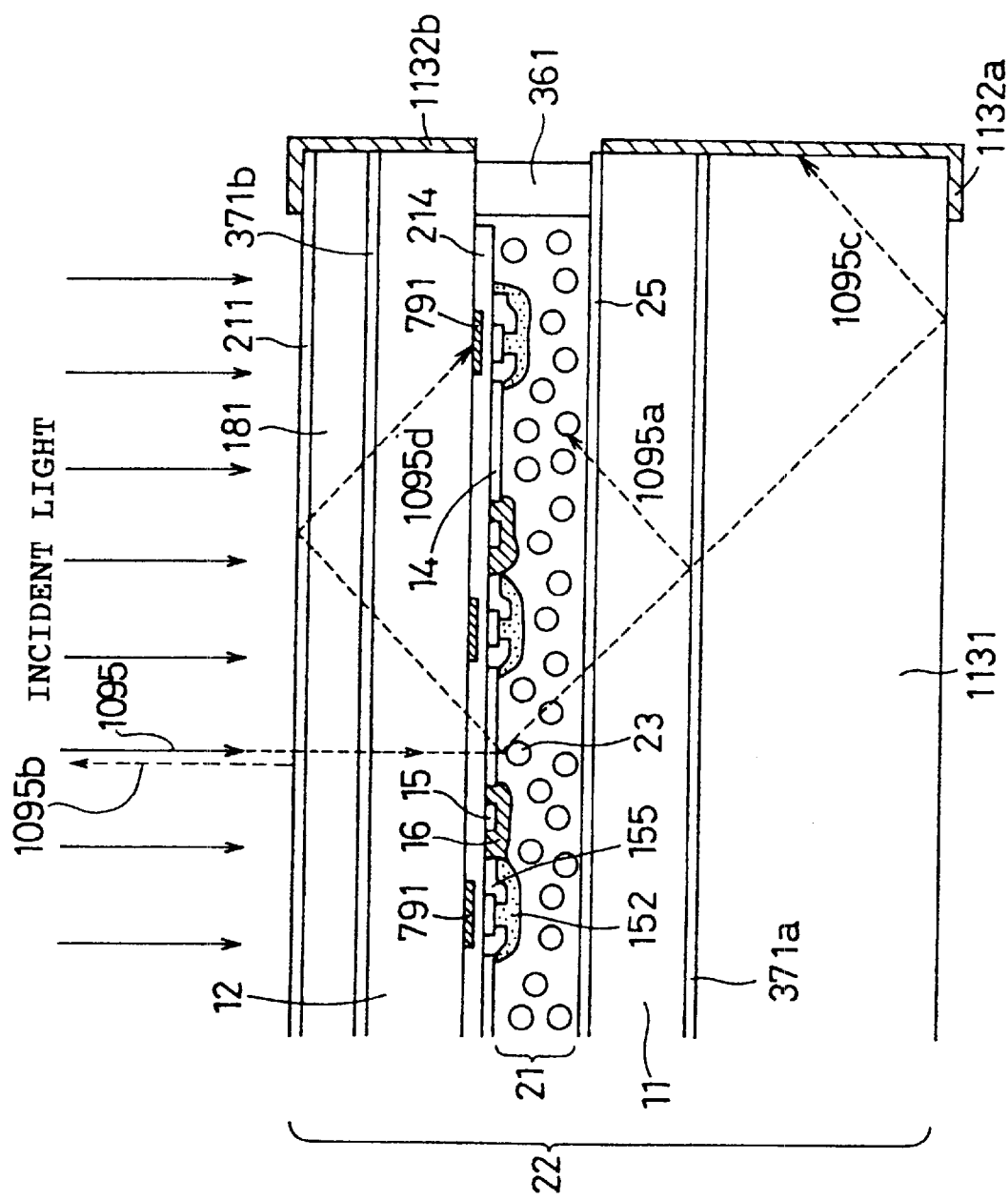
FIG. 118 is an explanatory diagram explaining the operation of the liquid crystal display panel in another embodiment of the present invention.

In the case where the liquid crystal display panel 22 of the present invention is employed as a light valve for a projection type display, it is preferable that light should be incident from the side of the array substrate 12 (see FIG. 118). The light incident on the liquid crystal layer 21 scatters, gives rise to halation, and produces heat. As a consequence, there is the fear that incident light will degrade the liquid crystal display panel 22. The opening ratio of the liquid crystal display panel is usually about 50%, although it depends on panel size and the number of pixels. If light is incident from the side of the array substrate 12, only light corresponding to the amount of the opening ratio will be incident on the liquid crystal layer 21 and the rest light will be reflected by the source signal line 15. For this reason the aforementioned halation is reduced and therefore display contrast is enhanced.

A description will hereinafter be made of the drive method of the driver circuit and display panel of the present invention, but, before that, a description will be made of the fabrication method of the array substrate. First, the glass substrate 12 is given a US washing/washing/MS/rinsing process. Then, the glass substrate is covered with an undercoat of $SiO_2$=200 nm by AP-CVD. Thereafter, a film of chrome (Cr) is deposited to a thickness of 1000 angstroms and patterned, thereby forming a metal light-shielding film 791. In addition to the Cr film, aluminum (Al) and titan (Ti) can also be employed. On the upper layer of this metal light-shielding film 791 a recording film 214 is formed, and a TFT 155 is formed. Also, common electrodes 212 in the form of stripes are formed. The metal light-shielding film 791 serves as a light shielding film for external light. In the case where the liquid crystal display panel of the present invention is employed as a light valve, the metal light-shielding film 791 also serves as a light shielding film for shutting out light which is incident from a metal halide lamp. Furthermore, on the light shielding film an insulating film 791 of $SiO_2$=200 to 300 nm is formed, and thereafter, a film of a-Si:H=85 nm is formed by AP-CVD. Thereafter, an AS process is performed. Silicon is etched with RIE, resist is removed with an $O_2$-asher, and dehydrogenation is performed for 90 min at a temperature of 450° with LP-CVD.

Next, crystallization is performed with an excimer laser. The condition is 290/390 mJ/cm$^2$.

Thereafter, a gate insulating film of $SiO_2$=85 nm is formed by AP-CVD, and a gate metal of Ta=200 nm is formed by M-SP. Thereafter, a doping process, etc. are performed, thereby completing the array substrate 12.

Figure 119:
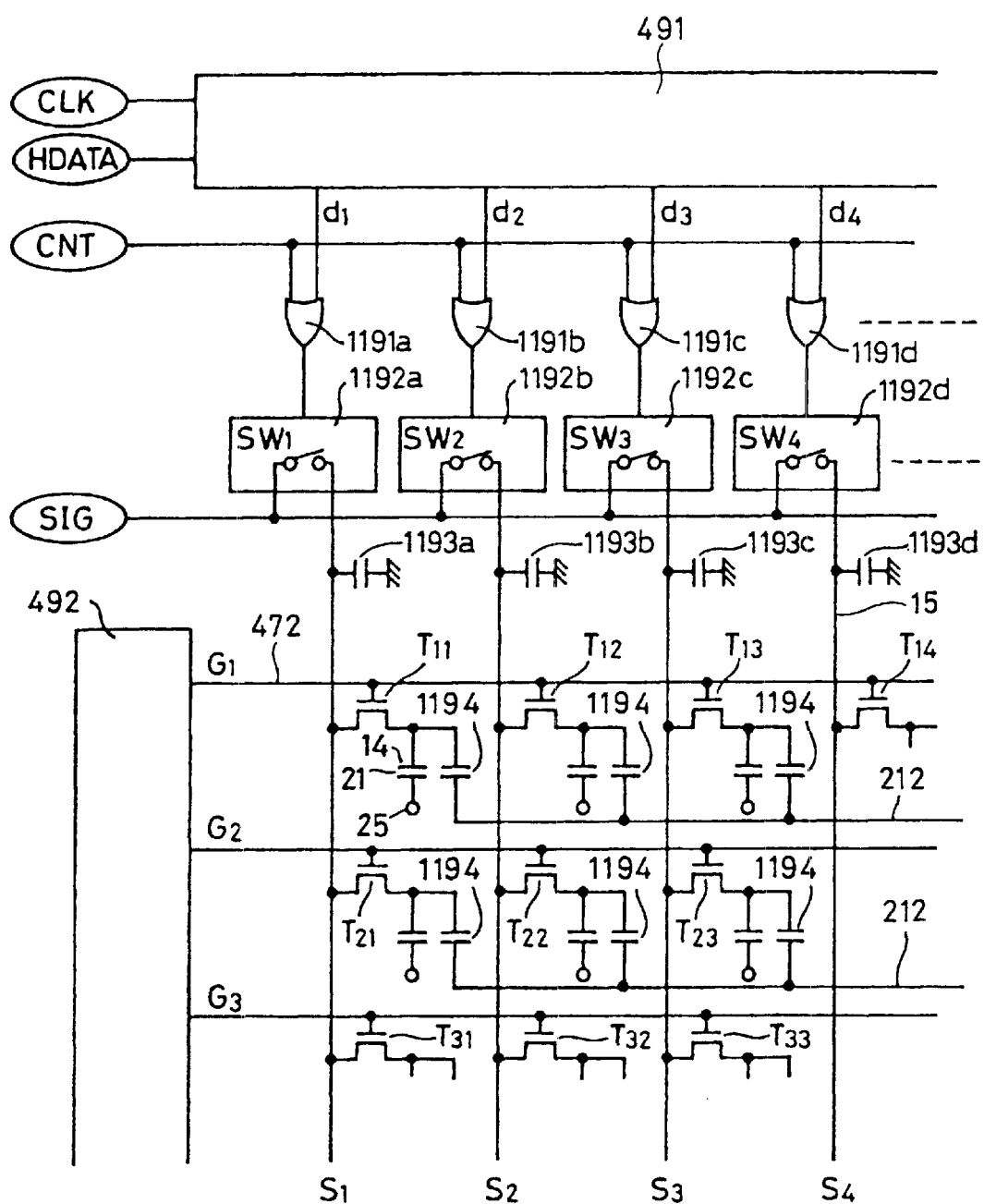
FIG. 119 is an equivalent circuit diagram explaining the drive method of the liquid crystal display panel of the present invention.

FIG. 119 is a constitution diagram of the drive circuit of the liquid crystal display panel of the present invention. A gate driver circuit 492 outputs an ON voltage $V_{on}$, which operates a TFT $T_{ij}$ (where i and j are integers) and an OFF voltage $V_{off}$ which non-operates a TFT $T_{ij}$. On the other hand, a source driver circuit 491 sequentially transfers data applied to a HDATA terminal by a clock signal applied to a CLK terminal. Data is output from a terminal $d_j$ (where j is an integer), which outputs a positive logic signal (high level signal). The high level signal causes the switch $SW_j$ of a switch circuit 1192 to be closed, and a video signal applied to a SIG terminal is applied to a source signal line $S_j$ (where j is an integer). A signal applied to the source signal line $S_j$ is charged in a capacitor 1193 formed on the signal line. The charged capacity is held for one horizontal scanning period (1 H period).

The TFT $T_{ij}$ writes voltage to a liquid crystal layer 21 and an additional capacitor 1194, based on the ON voltage applied to a gate signal line $G_i$ (where i is an integer). One terminal of the liquid crystal layer 21 is a pixel electrode 14, and the other terminal is a counter =electrode 25. One terminal of the additional capacitor 1194 is the pixel electrode 14, and the other terminal is a common electrode 212. A common electrode 354 is an electrode common to all additional capacitors 1194. The common electrode 354 is over the array substrate 12 and formed on the lower layer of the pixel electrode 14. Note that the common electrodes 212 are not limited only to ITO electrodes in the form of stripes. For example, they may be in the form of a mat electrode.

If a logic high signal is applied to a CNT terminal, the outputs of OR circuits 1191 will go to a high level and all switches SW of the switch circuits 1192 will be closed. The voltage applied on the SIG signal terminal is applied to all source signal lines. The signal on the CNT terminal is high only for a predetermined period (one horizontal scanning period).

To describe the drive method of the display panel of the present invention, a description thereof will hereinafter be made employing FIGS. 119 and 120. In FIG. 120 a conventional video signal 1 represents a video signal that is applied to the SIG terminal. The amplitude value of the video signal 1 is previously adjusted with an amplifier or a gamma circuit so that it corresponds to the electro-optical characteristic curve of the liquid crystal layer 21, and the adjusted video signal 1 is input to the SIG terminal. Therefore, when the amplitude of the video signal 1 reaches the maximum value, the transmittance T reaches the maximum value (see FIG. 122).

The CNT signal is a logic signal that is input to the CNT terminal. The CNT signal is in a high level state for a predetermined time corresponding to the back porch portion of a video signal in the blanking period of the video signal. A video signal 2 is one which is input to the SIG terminal of the drive circuit of the liquid crystal display panel of the present invention. As with the video signal 1, the amplitude value of the video signal 2 is adjusted to a predetermined value by an amplifier and a gamma circuit.

The video signal 2 is one in which a pulse having a pulse width longer than that of the CNT signal and also having an amplitude of the height h of the time of the back porch portion in the blanking period is superimposed to the back porch portion. This pulse will hereinafter be referred to as a superimposed pulse. The height h is determined by the value of the video signal within the image display period S in the scanning period.

The timing and width of the superimposed pulse may be the same width and timing as the CNT signal, but it is preferable that the width of the superimposed pulse should be wider than the CNT signal in correspondence with the characteristic speed and operation of the switch SW of the switching circuit 1192. The amplitude value h of the superimposed pulse is written to all source signal lines for the period of the back porch portion by the CNT signal and is charged to signal line capacitors.

It is preferable that the height h of the superimposed pulse should be an average value of amplitude values during image display period S (in which there is video signal data that is image-displayed on a liquid crystal display). The reason for this will be given below. Note that the aforementioned average value is an average value which is obtained in consideration of the T-V characteristic. For example, if an applied voltage is less than the rise voltage of a liquid crystal, the transmittance of the liquid crystal will not change. In consideration of the transmittance of the liquid crystal, the aforementioned average value is an average value of the transmittance.

Now, assume that a voltage of average value h is written to all source signal line $S_j$ during back porch period and also the amplitude value h is 50. Also, the maximum value of the amplitude value within the image display period S is assumed to be 80 and the minimum value is assumed to be 30. In addition, assume that there is a need to write an amplitude of 50 to the source signal line $S_1$, an amplitude of 80 to the source signal line $S_2$, and an amplitude of 30 to the source signal line $S_3$. The video signal applied to the SIG terminal is written to the source signal lines in sequence by the clock signal applied to the source driver circuit 491. A voltage of 50 has already been written to the source signal line $S_1$. In the case where voltage is newly applied, the signal line capacitor 1193a does not need to be again charged, because there is a voltage of 50. Since the source signal line $S_2$ needs to write a voltage of 80, an electric charge of difference (80−50=30) between 80 and the voltage already written is written to the signal line capacitor 1193b. Since the source signal line $S_3$ needs to write a voltage of 30, an electric charge of difference (50−30=20) between 30 and the voltage already written is written to the signal line capacitor 1193c. Note that since the voltages of 30 and 50 are temporarily determined to make a description easy, it is necessary that they should be considered to be originally voltages required for transmittance 30% and transmittance 50%.

From the aforementioned description, an amount of electric charge required to be again charged to the source signal line $S_i$ can be reduced. This is equivalent to lengthening the time for a TFT to write voltage to the pixel electrode 14. Particularly, in a point sequence method shown in FIG. 119 (in which a sample and hold operation is performed in sequence on source signal lines), the reduction in the amount of electric charge is effective because the pixel on the right edge can ensure only the back porch period in the blanking period. Note that all of the present liquid crystal display panels fabricated by high-temperature polysilicon and low-temperature polysilicon techniques employ the point sequence method.

In the case where the CNT terminal of the present invention is not present, the amplitude voltage during the previous one horizontal scanning period has been written to each source signal line. If it is assumed that a voltage of 100 has been written to all source signal lines, the source signal line $S_1$ needs to be charged with an electric charge of 100−50=50. The source signal line $S_2$ needs to be charged with an electric charge of 100−80=20 again, and the source signal line S3 needs to be charged with an electric charge of 100−30 =70 again. In FIG. 120, in the case of 1-field inverting drive (in which the polarity of a signal to be applied to a source signal line is inverted at 1-field intervals) or 1-H inverting drive (in which the polarity of a signal to be applied to a source signal line is inverted at 1-horizontal-scan intervals), the amount of an electric charge to be written is further increased. The reason for this is that a voltage with an opposite polarity has been written before one horizontal scanning period. For example, if it is assumed that a voltage of −100 (which means a negative polarity) has been written to source signal lines, the source signal lines $S_1$, $S_2$, and $S_3$ will need to be again charged with electric charges of 50−(−100)=150, 80−(−100)=180, and 30−(−100)=130, respectively.

The amplitude value h of the superimposed pulse in a video signal is obtained from amplitude data within the next image display period S. Therefore, as shown in FIG. 120, if the amplitude value is small like the (n+1)st line, the height h of the superimposed pulse will become small, and if the amplitude value is great like the (n+2)nd line, the height will become high.

Figure 121:
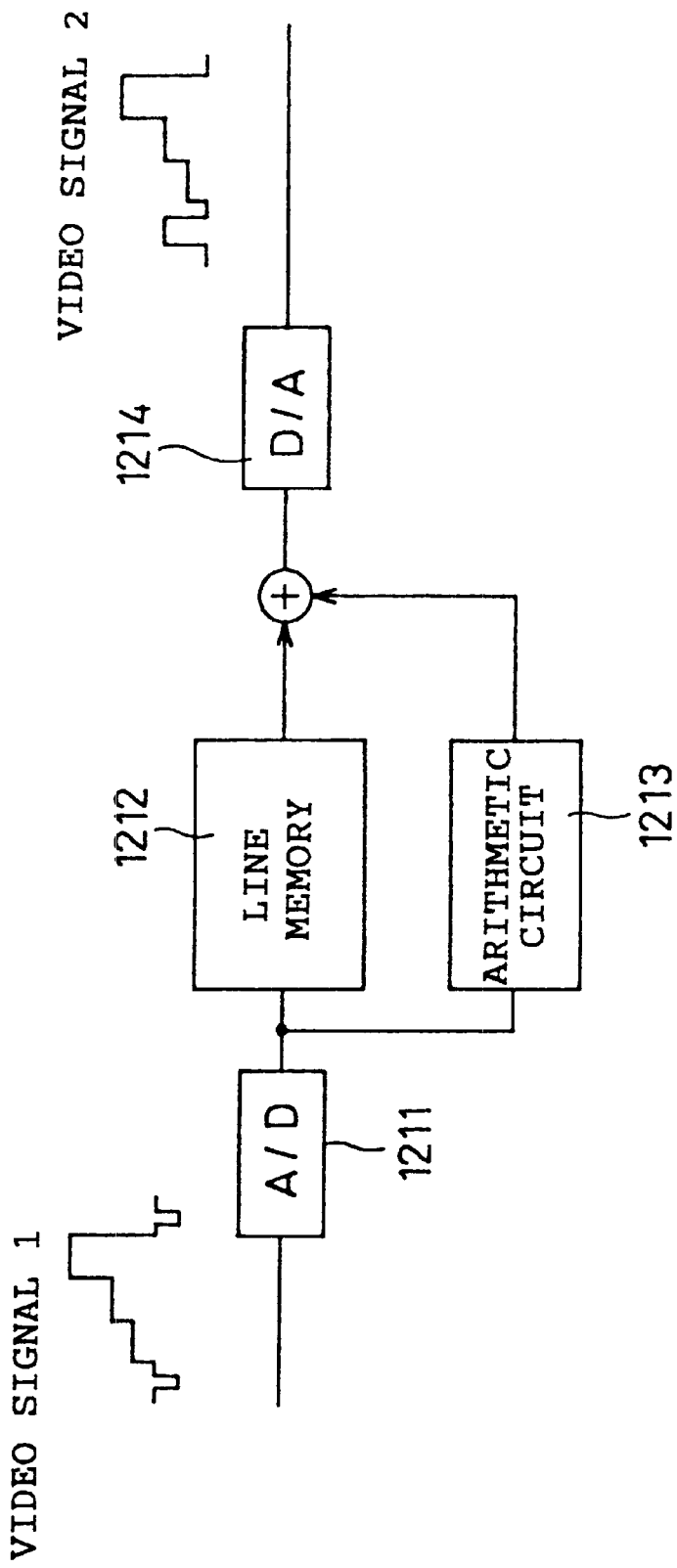

FIG. 121 shows a block diagram of a circuit which computes the height h of the superimposed pulse. The video signal 1 is converted to digital data by an A/D conversion circuit 1211. The digital data is temporarily stored in line memory 1212. Of course, it may be stored in field memory. At the same time, data within the image display period S are added by an arithmetic circuit 1213. After addition, an average value is computed based on the number of sampled data, thereby computing the amplitude data of the superimposed pulse. Then, in consideration of the T-V characteristic of a liquid crystal, the computed amplitude data is added to the data temporarily stored in the line memory. The processed data is converted to the video signal 2 by a D/A conversion circuit 1214.

While it has been described that the amplitude data of the superimposed pulse is digitally computed by the arithmetic circuit 1213, the present invention is not limited to this. The amplitude value of the superimposed pulse may be analogically computed by smoothing the amplitude values present within the image display period S with a capacitor. For example, the video signal 1 is delayed by about 1 horizontal scanning period with a delay line circuit, and this delayed video signal and the amplitude pulse of the superimposed pulse may be added together by an operational amplifier.

In FIG. 120, although the amplitude value h of the superimposed pulse is computed from an average value in the image display period S, it is theoretically computed. In practice, it depends on the output impedance, suction current, and sweep-out current characteristics of the switching circuit 1192, According to experiment, a satisfactory result is obtained when the amplitude value h is greater than the average value. However, if it is too great, floating of a black display level will occur, i.e., the transmittance of a black level will become high. According to experiment, it is preferable that the amplitude value of the superimposed pulse should be about 1.2 to 1.4% times an average value in the image display period S.

Figure 122:
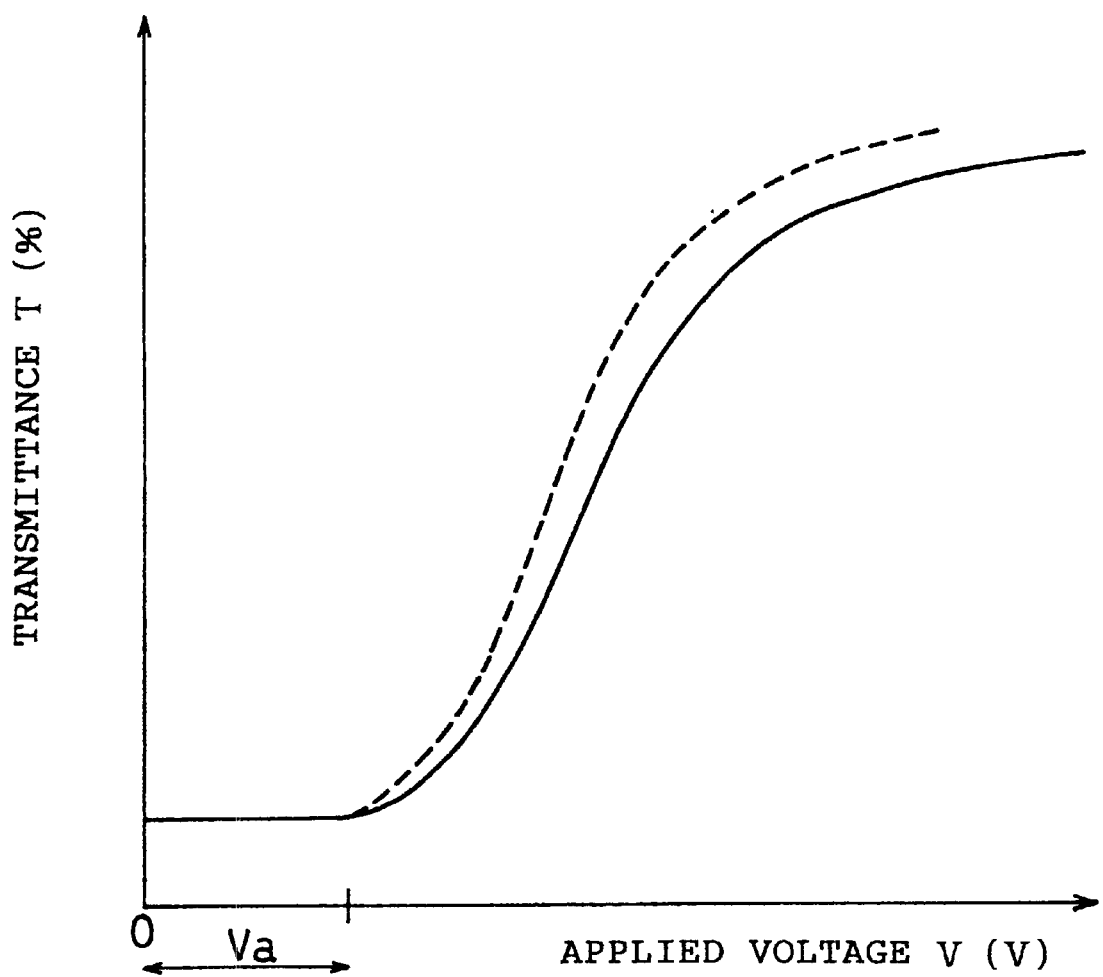

FIG. 122 shows the transmittance-voltage T-V characteristic curve of a liquid crystal. The case where the drive method of the present invention is applied is represented by a dotted line and a conventional case by a solid line. If the drive method of the present invention is carried out, the gradient of the T-V characteristic curve will become great. In other words, even if voltage to be applied to a pixel is small, the transmittance T can be made high. Therefore, since the film thickness of the liquid crystal 21 can be thickened by the amount of reduction, the display contrast is enhanced.

FIG. 123(b) shows the waveform of the video signal 2 at the time of 1-field (1-F) inverting drive, and FIG. 123(c) shows the waveform of the video signal 2 at the time of 1-H inverting drive. The polarity of the superimposed pulse and the characteristic of the video signal are inverted.

The aforementioned description has been made of a normally black (NB) mode in which black display is performed when no voltage is applied to a pixel. In the case of a normally white (NW) mode in which white display is performed when no voltage is applied to a pixel, the display state needs to be inverted. In the NW mode, black display is performed in the state in which voltage is applied to a pixel, and white display is performed in the state of non-application of voltage. Since only the display state is changed, it is a matter of course that the drive method of the present invention is applicable to a liquid crystal display with an NW mode., etc.

In the case of a PD liquid crystal display, if the liquid crystal layer 21 is thickened, the scattering characteristic will become high and therefore the display contrast can be enhanced. However, a drive voltage to be applied to a pixel is also increased. Therefore, in order to enhance display contrast, the driver circuit 541 needs to be constituted so that high voltage can be applied to a pixel.

Figure 124:
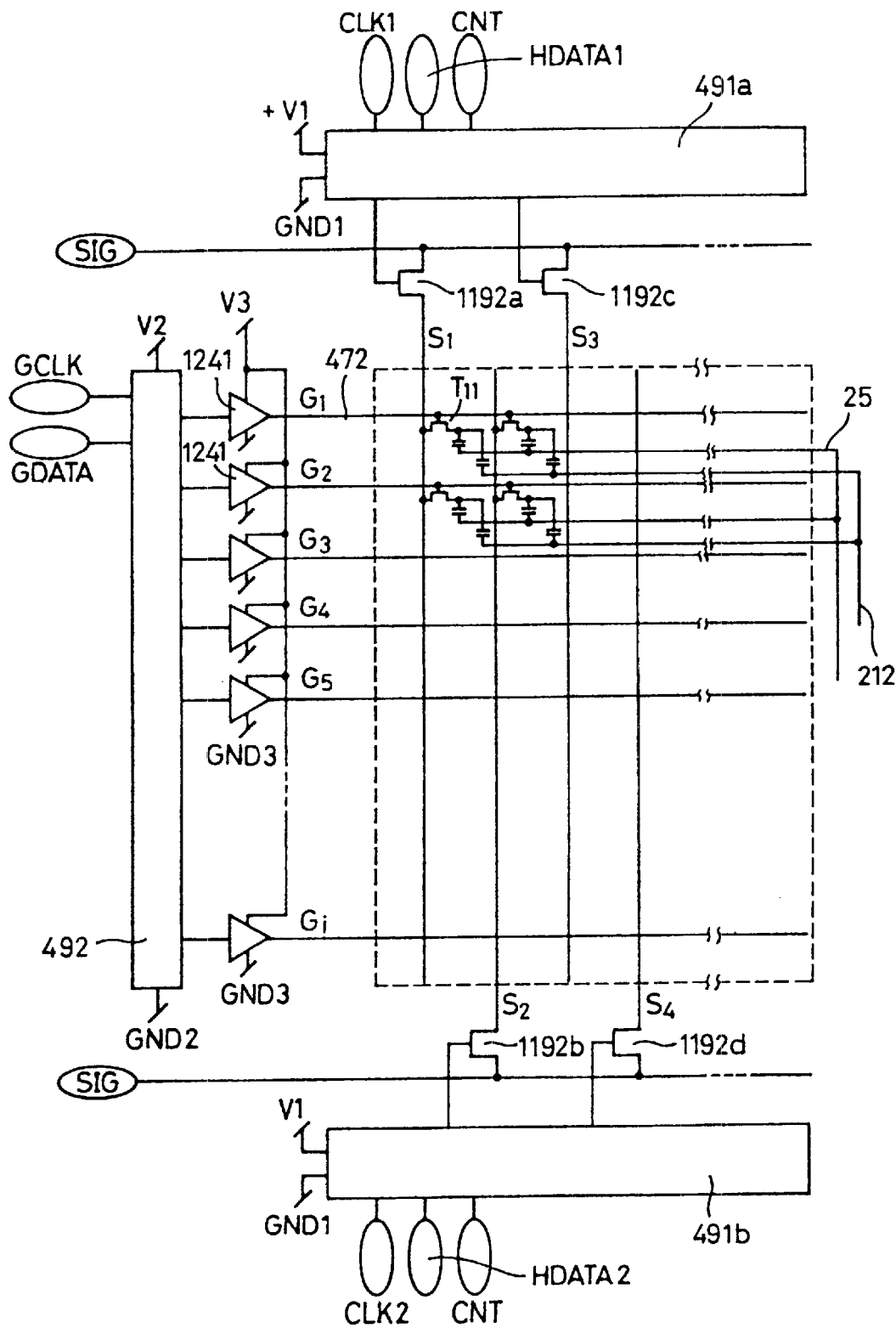
Figure 129:
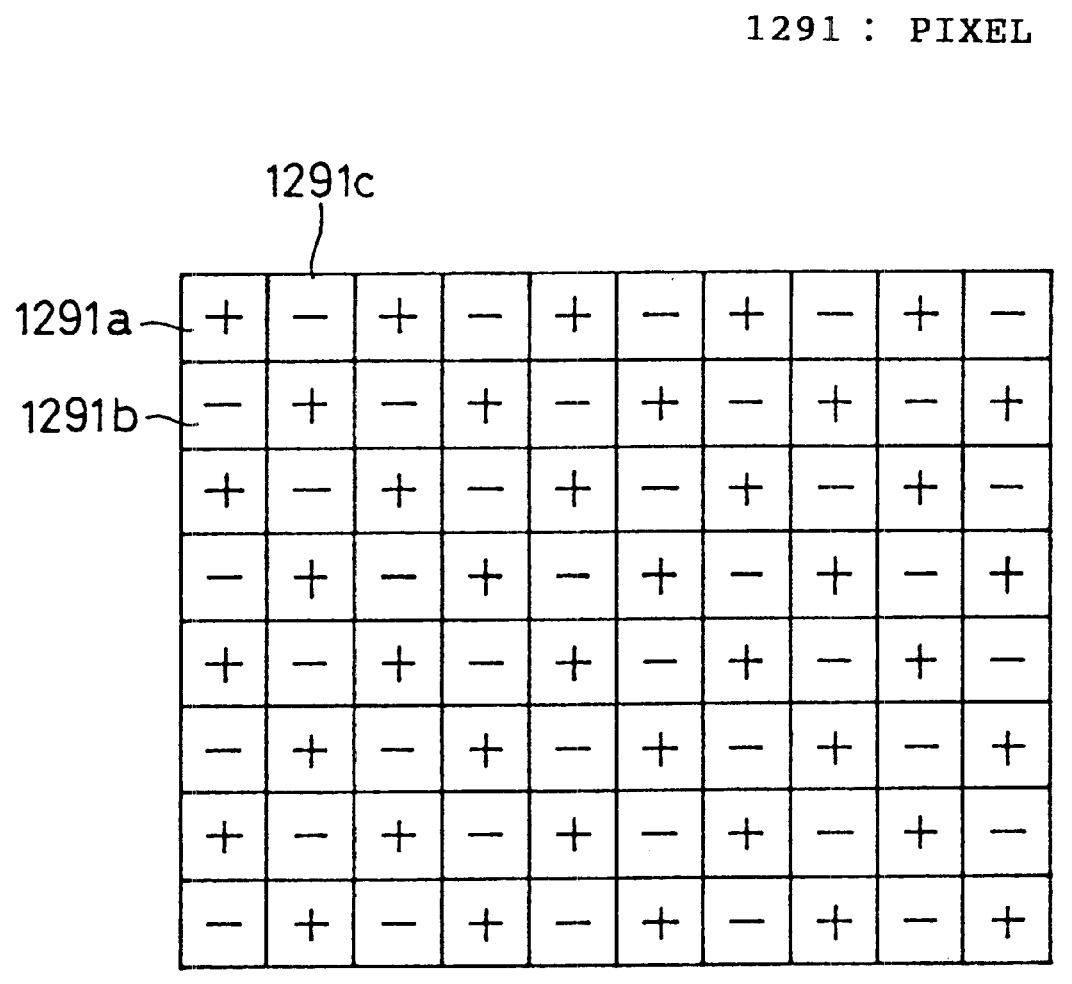

FIG. 124 is a constitution diagram of the liquid crystal display panel of the present invention. The driver circuit is mainly depicted. An odd source signal line is connected to a source driver circuit 491a and an even source signal line to a source driver circuit 491b. The source driver circuits 491a and 491b output video signals to the source signal lines so that the polarities are opposite to each other. Now, suppose that a positive polarity image signal is represented by "+" and a negative polarity image signal by "−". In addition, the source driver circuit 491 switches the polarity of a video signal at 1-H intervals. If done in this manner, the image display state will be obtained as shown in FIG. 129. An image signal with a polarity opposite to adjacent pixels is written to a pixel 1291a. If done in the aforementioned manner, the parasitic capacity between the pixel electrode 14 and the source signal line 15 will be reduced and satisfactory image display with less occurrence of flickers can be realized.

In order to raise voltage which is applied to the pixel electrode 14, there is a need to raise a drive voltage (source voltage) for each of the drivers 491 to 492. However, if voltage to be applied is too high, blockage will occur in data transfer which is performed by the shift register of each driver, or reliability will be reduced by generation of heat.

Now, assume that the amplitude values of a video signal which is applied to the pixel electrode 14 are +V and −V (0 V is the electric potential of the counter electrode). The power source +V1 for the source driver circuit 491 needs to be +V, and the GND1 needs to be −V. Also, the voltage $V_{on}$ which is applied to the gate signal line $G_i$ needs to be +V +1 (V), and $V_{off}$ needs to be −V −3 (V). 1 (V) is the ON operation margin of the TFT 155, and −3 (V) is the OFF operation margin of the TFT 155. Therefore, the voltage V3 for the buffer circuit 1241 of the gate driver 492 needs to be $V_{on}$, and the GND3 needs to be $V_{off}$. It is preferable that the voltage on the gate driver circuit 492 be made as low as possible. V2 is taken to be V1, and GND2 is taken to be GND1. Note that there is a need to anticipate that V1, V2, V3, GND1, and GND2 will have a small margin of 0.5 to 1.5 (V).

The characteristic of the present invention resides in the gate driver 492. In other words, the present invention is characterized in that the power source mainly employed for the shift registers of the gate driver 492 is separated from the power source for the gate buffer circuit 1241. The absolute value of the voltage on the gate buffer circuit 1241 is greater than that of the shift register of the gate driver. Therefore, the characteristic of the present invention resides in that heat, which is generated by the shift register of the gate driver 492 which operates at high speeds, is reduced and also the voltage of the gate buffer 1241 is raised so that high voltage can be applied to the gate signal line $G_i$. Note that even if the GND3 of the gate buffer 1241 and the GND2 of the gate driver circuit 492 are shared with each other, practically there will be no problem.

The present invention is also characterized in that the number of operational clocks of the source driver circuit 491 is reduced to ½ by alternately pulling out source signal lines in opposite directions, like as cross-stitch, with the two source drivers 491a and 491b. If done in this way, satisfactory image display with no flicker can be realized as shown in FIG. 129. Note that the buffer 1192 has a function of increasing a write current which is applied to the source signal line 15.

In order to further raise voltage which is applied to the pixel electrode 14, a signal which is applied to the counter electrode 25 is inverted at 1-H intervals. In this case, the polarities of the output signals of the source drivers 491a and 492a are made the same, and also the polarity of a video signal is inverted at 1-H intervals.

Figure 131:
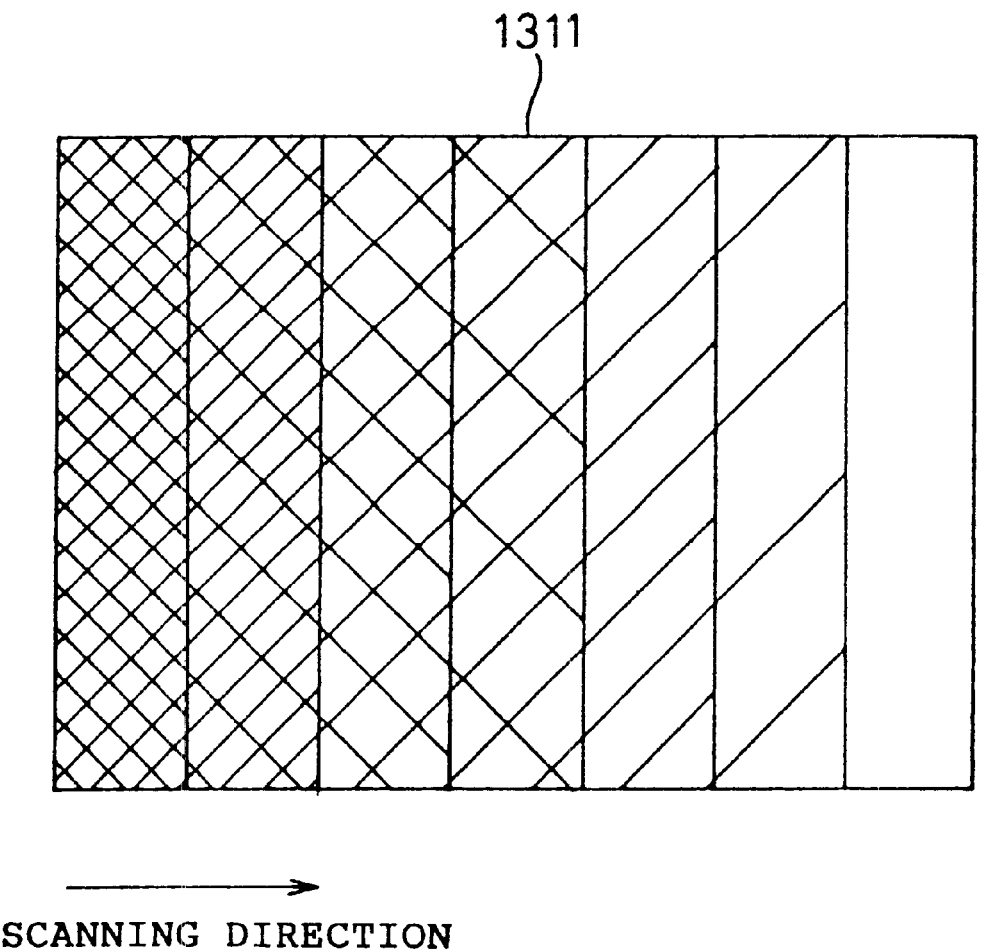

The drive method of the display panel of the present invention will hereinafter be described referring to FIGS. 132 and 133. In FIG. 132, a one-dotted line represents an applied signal to the counter electrode 25. A solid line represents an input signal to the source driver circuit 491, and a dotted line represents the signal center of the input signal to the source driver circuit 491. The display image 1311 on the display panel is shown in FIG. 131. That is, the image is constituted by step display which is black display on the left side and white display on the right side. The display mode is an NB mode. The polarities of signals to pixels are shown in FIG. 129. After 1 field (1 frame) the signal polarity of each pixel 1291 is inverted.

As evident in FIG. 132, a rectangular waveform is applied to the counter electrode 25 and inverted at 1-H intervals. The input waveform to the source driver circuit 491 is also inverted at 1-H intervals. At this time, the polarity of the signal to the counter electrode 25 and the polarity of the video signal (solid line) are opposite polarities. In other words, when the signal polarity of the counter electrode is "+", the polarity of the video signal is "−", and when the signal polarity of the counter electrode is "−", the polarity of the video signal is "+". The maximum value $V_o$ of an applied signal to the counter electrode 25 from the signal center (strictly speaking, pedestal level of the video signal) needs to be less than a rise voltage of $V_a$. If $V_o \geq V_a$, black display cannot be performed.

If the aforementioned operation is shown with an equivalent circuit, it will be as shown in FIG. 128. Assume that rectangular waveforms (e.g., +4 (V) and −4 (V)are output. i.e., $V_a$=4(V)) are output from a signal generating circuit 1281 to a common electrode 212 and a counter electrode 25. On other hand, the source driver circuit 491 outputs video signals (e.g., −6 (V) and +6 (V)).

During 1H period shown in FIG. 128(a), +4 (V) is applied to the counter electrode 25, etc. and the video signal 6 (V) from the source driver circuit 491 is applied to the pixel electrode 14 through the TFT 155. Therefore, a voltage of 6 (V)−(−4 (V))=10 (V) is applied to the liquid crystal layer 21. During the next 1H period shown in FIG. 128(b), −4 (V) is applied to the counter electrode 25, etc. and 6 (V) is applied to the pixel electrode 14. Therefore, a voltage of −4 (V)−(6 (V))=−10 (V) is applied to the liquid crystal layer 21. If the during is performed in this manner, the effective value of voltage which can be applied to the liquid crystal layer 21 can be raised and the film thickness of the liquid crystal layer 21 may be thickened correspondingly. Therefore, the display contrast can be enhanced.

However, there is a little problem. In FIG. 132, although it has been described that $V_o$ needs to be less than a rise voltage of $V_a$, the transmittance of the PD liquid crystal display panel is gradually increased between 0 (V) and $V_a$. Therefore, in the vicinity $V_a$, satisfactory black display cannot be realized.

Hence, as shown in FIG. 133, when an applied signal waveform to the counter electrode is high (+), an input signal waveform to the source driver circuit is also raised in a direction of +. The voltage that is applied to the liquid crystal layer 21 is a difference in electric potential between the counter electrode 25 and the pixel electrode 14. If the applied signal waveform (voltage) to the counter electrode is +4 (V) and also the input signal waveform to the source driver circuit (i.e., voltage that is applied to the pixel electrode 14) is +4 (V), no voltage will be applied to the liquid crystal layer 21 and the pixel will become black. Conversely, if the voltage to the counter electrode is +4 (V) and also the voltage to the pixel electrode 14 is 0 (V), a voltage of +4 (V)−0 (V)=4 (V) will be applied to the liquid crystal layer.

FIG. 133 realizes the aforementioned drive method. At the same time a rectangular waveform being inverted at 1-H intervals is applied to the counter electrode, the voltage (signal) that is applied to the pixel electrode 14 is output to source signal lines by the source driver circuit 491 with the voltage applied to the counter electrode 25 as reference. In the drive method of FIG. 132, the polarity of an applied voltage to the counter electrode 25 and the polarity of an applied voltage to the pixel electrode 14 are opposite polarities with respect to a signal center represented by a dotted line. In the drive method of FIG. 133, the case of the same polarity takes place.

The drive method of FIG. 133 is a drive method which includes the case where voltage is applied to the pixel electrode 14 with the electric potential of the counter electrode 25 as reference (0 V),and also the voltage polarity of the counter electrode 25 and the voltage polarity of the pixel electrode 14 are the same polarity voltage with respect to the center (indicated by a dotted line) of an applied waveform to the counter electrode 25.

The advantage of the drive method of FIG. 133 will be easily understandable if the amplitude value of an video signal that is output from the source driver 491 to the source signal line 15 is compared.

In FIG. 132 the amplitude value is $V_{s1}$, while in FIG. 133 it is $V_{s2}$. Since there is a relation of $V_{s1} > V_{s2}$, adopting the drive method of FIG. 133 is more advantageous than adopting the drive method of FIG. 132, because the power source voltage for the source driver circuit 491 can be reduced low.

A circuit for realizing the drive method of FIG. 133 is conceptually shown in FIG. 134. An image signal is supplied to the base of a transistor $Q_1$. The negative polarity image signal is output to the collector of the transistor, and the positive polarity image signal is output to the emitter. The DC components of the two positive and negative image signals are cut by capacitors C. On the other hand, a DC voltage that is supplied (clamped) from an analog switch 1341b to one end of each capacitor C is produced by a variable resistor, and the absolute values of the positive and negative polarity clamp voltages are the same. If this clamp voltage is produced with the electric potential of the counter electrode 25 as reference, the waveform of FIG. 133 can be easily produced. The positive and negative polarities of the image signal is inverted at 1H intervals by the analog switch 1341a and is output to a source signal line 15.

Where a projection type display is constituted by three liquid crystal display panels fabricated with a high-temperature or low-temperature polysilicon technique, there is one problem. The reason for this is that the scanning direction of the source driver circuit 491 or gate drive circuit 492 of one liquid crystal display panel needs to be opposite to the other liquid crystal display panels.

For example, as shown in FIG. 137, the scanning direction of gate drive circuit 492 of the liquid crystal display panel 22b needs to be opposite to the scanning directions of the gate driver circuits 492 of the other liquid crystal display panels in FIG. 180. This is because an image is inverted upside down by a dichroic mirror (DM) 1161. In order to superimpose the projected images of three liquid crystal display panels with each other on the screen, the image of one liquid crystal display panel needs to be inverted. The constitution of FIG. 180 is referred to as a vertical developed constitution. On the other hand, in another constitution (horizontal developed constitution), as shown in FIG. 136, the scanning direction of the source drive circuit 491 of the liquid crystal display panel 22b needs to be opposite to the scanning directions of the other liquid crystal display panels.

However, in the liquid crystal display panel fabricated with a high-temperature or low-temperature polysilicon technique, since the driver circuit needs to be formed on a single substrate at the same time as pixels and TFTS, it is difficult to form a complicated driver circuit which has a horizontally inverting function or a vertically inverting function. In addition, because the mobility of transistors is low as 100 or less, an inverting circuit is structurally complicated.

The present invention previously forms at least either one or the other of the source driver circuits 491a and 491b differing in the scanning direction from each other and at least either one or the other of the gate driver circuits 492a and 492b differing in the scanning direction from each other, as shown in FIG. 135. For example, in the horizontal developed constitution, the liquid crystal display panel 22b cuts off the gate driver circuit 492b from the gate signal lines at line d–d' and also cuts off the source driver circuit 491a from the source signal lines at line a–a'. This can be easily realized by employing a laser trimming technique or an etching technique. In the horizontal developed constitution, since the scanning directions of the gate driver circuits of three liquid crystal display panels 22 are the same, it is a matter of course that there is no need to form the gate driver circuit 492b from the beginning. In the other liquid crystal display panels 22a and 22c, the gate driver circuit 492a is cut off from the gate signal lines at line c–c' and also the source driver circuit 491b is cut off from the source signal lines at line b–b'.

In the vertical developed constitution, the source driver circuit 491a of each of three liquid crystal display panels 22 is cut off from the source signal lines at line a–a', and the gate driver circuit 492b of the liquid crystal display panels is cut off from the gate signal lines at line c–c'. In the other liquid crystal display panels 22a and 22c, the gate driver circuit 492b is cut off from the gate signal lines at line d–d'.

As described above, the gate driver circuits 492 or source driver circuits 491 whose scanning directions are different from each other are formed on the liquid crystal display panels, and one gate driver circuit and one source driver circuit are cut off. Therefore, if one kind of liquid crystal display panel is fabricated, a projection type display with the constitution of FIG. 180 can be easily constituted.

Figure 130:
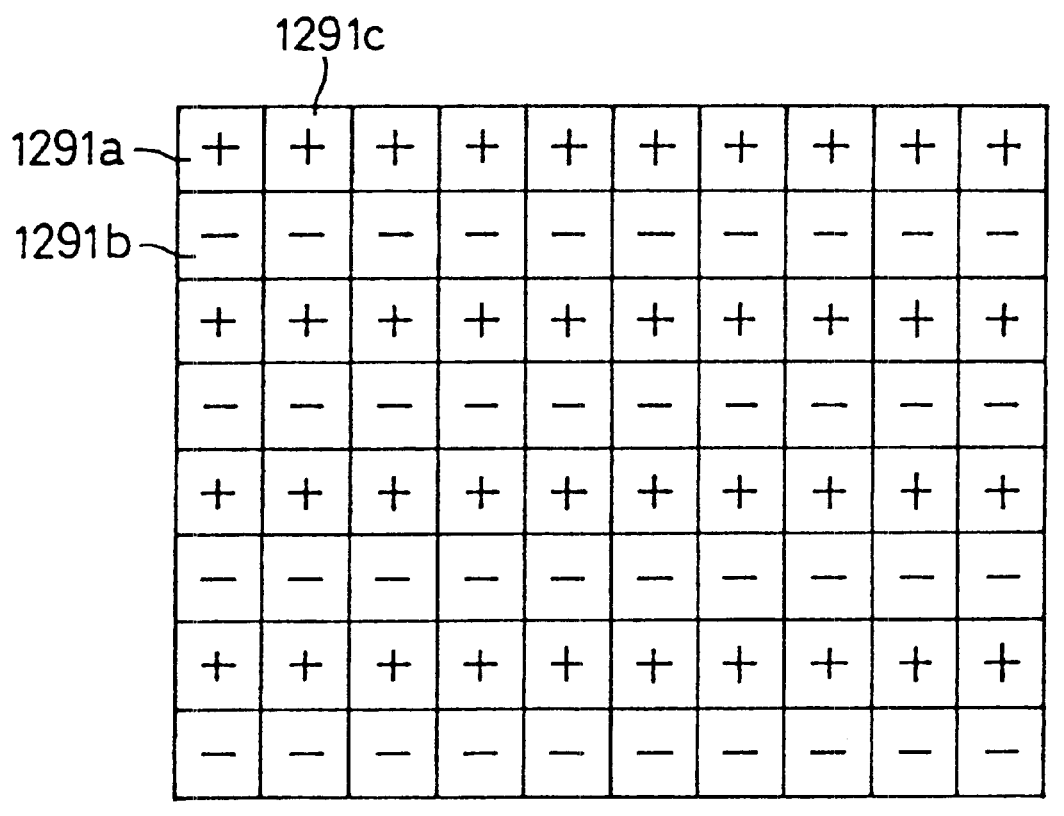

A liquid crystal display panel usually has three color pixels:R, G, and B(or alternatively, cyanogen, magenta, red, blue, or yellow). As shown in FIGS. 129 and 130, voltages differing in polarity from each other are applied to adjacent pixels for flicker reduction.

A display panel of FIG. 138 has pixels having brightness (W) in addition to R, G, and B pixels. The W pixel performs black-and-white brightness display. A composite image signal is divided into Y and C signals, and this Y signal is employed as brightness (W). On the other hand, R, G, and B are applied to pixels by the C signal.

A display panel employing a PD liquid crystal can realize high-brightness display, but even higher brightness display is desired. On the other hand, an image with high brightness shows a tendency to reduce human's color discriminating ability.

The display panel of the present invention of FIG. 138 employs a PD liquid crystal in the liquid crystal layer. The display panel also has R, G, and B pixels having color filters and W pixels having no filter(Of course, the W pixel may have a transparent resin filter in order to make the film thickness of the liquid crystal 21 equal to the film thickness of the other pixels (R, G, and B)). When performing high brightness display, the W pixel is caused to be in a light transmitting state, and when performing low brightness display, the W pixel is caused to be in an OFF state.

The output of the source driver circuit 491 causes transfer gates (TG) 1192, an analog switch, to be in an ON state in sequence. First, TG 1192R1, 1192G1, 1192B1, and 1192W1 are turned on at the same time. Then, the aforementioned TG go to an OFF state and also transfer gates 1192R2, 1192G2, 1192B2, and 1192W2 go to an ON state. In the next step, the aforementioned TG go to an OFF state and also TG 1192R3, 1192G3, 1192B3, and 1192W3 go to an ON state. In this manner, a group of 47 TG is sequentially turned.

The operating clock of the source driver circuit 491 needs to perform high-speed operation because it is a horizontal operating clock. In addition, the wiring resistance of the signal lines (SIG-W, SIG-R, SIG-G, and SIG-B) formed within the display panel is high. For this reason, the polarities of image signals that are applied to the display panel during 1H period are caused to be the same. Inverting signal polarity during 1-H period is impossible from the relation of time constants.

However, in liquid crystal display panels there is a need to invert the polarities of adjacent pixels from the standpoint of flicker reduction. In the present invention, there are four kinds of pixels: R, G, B, and W, and four signal lines SIG-R, SIG-G, SIG-B, and SIG-W are provided in correspondence with the four pixels. Now, suppose that for the polarities of image signals that are applied to signal lines during a certain horizontal period (1H period), SIG-R is –polarity, SIG-G is +polarity, SIG-B is –polarity , and SIG-W is +polarity. In the next 1H period, +polarity is applied to SIG-R, –polarity to SIG-G, and +polarity to SIG-B, and this operation is repeated.

If the appling to the pixels is performed in the aforementioned manner, polarities can be applied to pixels so that they differ from each other between adjacent pixels, like as –+–+–+, at the first row, as shown in FIG. 139(b). Although pixels 1291a and 1291e have the same polarity voltage, voltages alternately differing in polarity can be applied like as –+–+–+ . . . At the second row, +–+–+– . . . can be applied. If the display panel is driven in this manner, there will be no flicker and the influence of the parasitic capacitance between the pixel electrode 14 and the signal line 15 can be reduced. Therefore, the liquid crystal layer 21 with high transmittance can be obtained with low voltage.

If pixels are constituted by three color R, G, and B and signal lines are constituted by three signal lines SIG-R, SIG-G, and SIG-B corresponding to the pixels, pixel polarities will be +–++–++–++– . . . as shown in FIG. 139(a) and therefore polarities cannot be applied so that they differ from each other between adjacent pixels.

In the present invention, since the pixcels are constituted by four color R, G, B and W and four signal lines corresponding to the four color pixels, the polarity of voltage that is applied to pixel electrodes 14 adjacent in a horizontal direction can be inverted as shown in FIG. 139(b). For this reason, parasitic capacitance can be reduced, the transmittance of the liquid crystal layer can be enhanced, and furthermore, the occurrence of a flicker can be eliminated. Note that if the number of color pixels is even, polarities can be alternately inverted. For example, there is the case where pixels are constituted by two colors, R and G and the case where pixels are constituted by 6 colors, R, G, B, W, cyanogen, and yellow. In addition, there is the case where pixels are constituted by three colors R, G, and B, R is divided into two parts, and there are two signal lines corresponding to the two parts (in other words, there are four signal lines in total). This case also corresponds to the drive method and constitution of the present invention.

In the drive method of FIG. 139(a), voltage polarity is applied in the row direction along "++−++−++−." In the next frame (field), voltage polarity is applied along "−−+−−+−−+." Also, opposite polarities are applied for each line (e.g., at the first row, voltage polarity are applied along "++−++−++−," and at the second row, the opposite voltage polarity is applied along "−−+−−+−−+.") In FIG. 139(a), the colors of the color filters are three colors (odd), R, G, and B. However, if opposite signal polarities are applied for each row in the aforementioned manner, the occurrence of a flicker can be reduced. Thus, a drive method which applies signal polarity along "−++−++" at a certain pixel row and also applies the opposite signal polarity along "+−−+−−" at the previous row is also an important invention. In other words, the polarities of two adjacent pixels are the same. The opposite polarity signal is applied to a pixel adjacent to the two adjacent pixels, and opposite polarities are applied for each field. This drive method can considerably reduce the occurrence of a flicker. In addition, the colors of pixels may be three primary colors (R, G, and B). Therefore, the drive method shown in FIG. 139 is also an effective method for flicker reduction. This method also reduce the gradient of brightness.

Although it has been described that pixel colors are R, G, B, and W, black or magenta may be employed instead of W. In addition, the color arrangement of the pixels may be arrangement shown in FIGS. 140(a) and 140(b).

The color arrangedment of the pixels of FIG. 138 are arranged in the form of stripes. In the present invention, it is clear that even pixel arrangement shown in FIGS. 140(a) and 140(b) can exhibit similar advantages.

Figure 125:
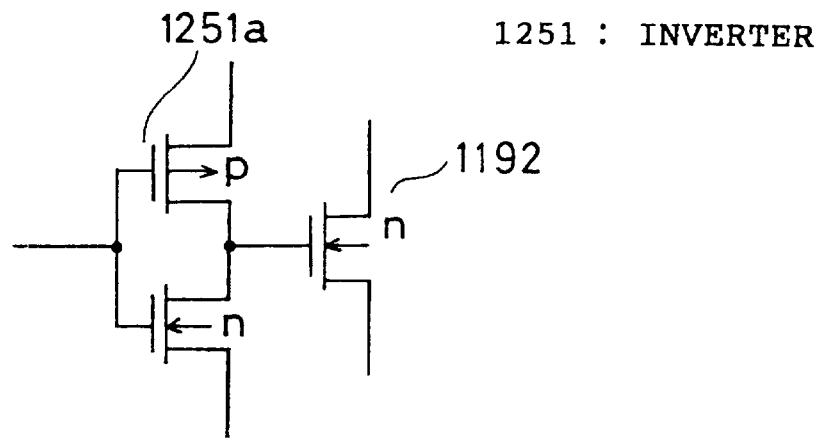

In FIG. 124 it has been illustrated that the output of the source driver 491 is connected directly to the gate of the analog switch 1192. In practice, as shown in FIG. 125, the output of the shift register of the source driver 491 is connected to inverters 1251 of multiple stages, and the outputs of the inverters 1251 of the final stage are connected to the gate of the analog switch 1192.

Figure 126:
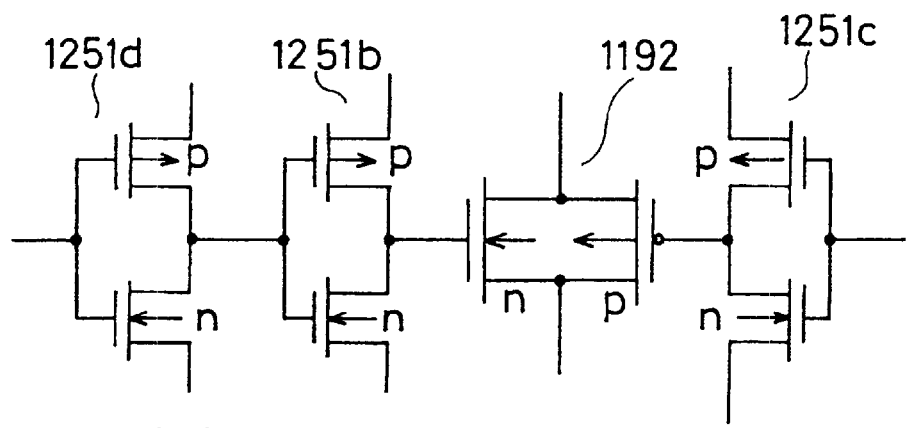
Figure 126:
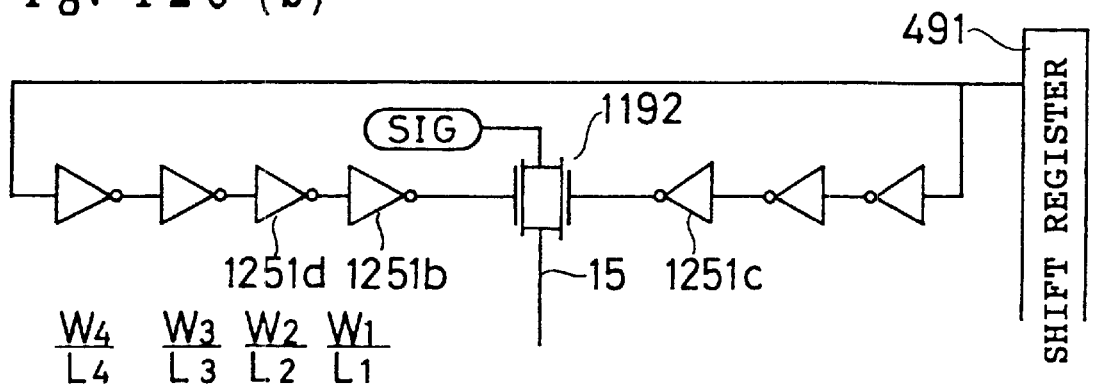
Figure 127:
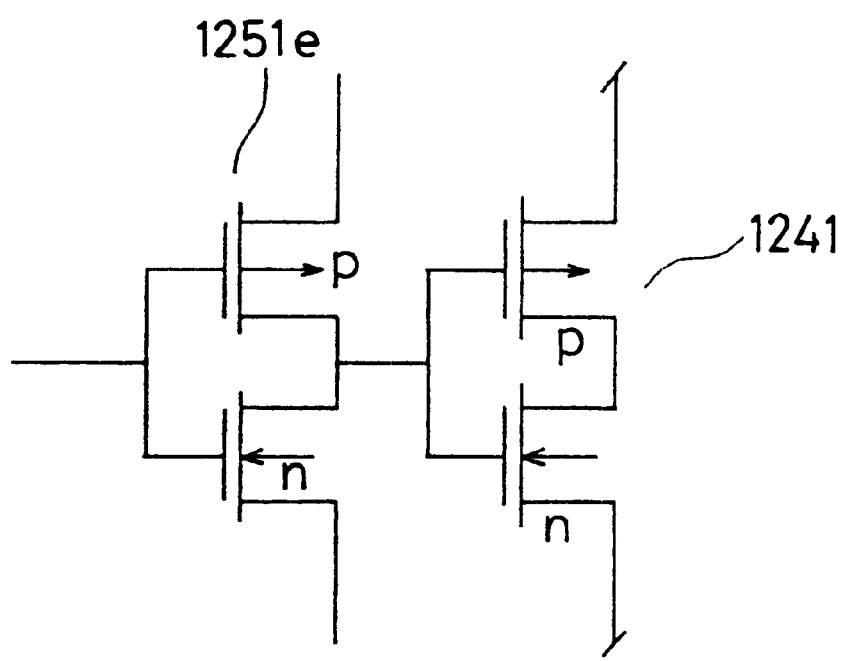

The inverter is constituted by a p-channel MOS transistor and an n-channel MOS transistor. When the analog switch 1192 is constituted by a single n-channel MOS transistor, there are cases where it is constituted by n-channel and p-channel MOS transistors as shown in FIG. 126. Particularly, the analog switch 1192 of FIG. 126 is called a transfer gate (TG).

The design of the ability of the analog switch 1192 which writes a signal to a source signal line is important. If the writing ability is insufficient, the transmittance of the liquid crystal layer will be unsatisfactory. Conversely, if the size of the analog switch 1192 is too large, the size of the driver circuit will become large and the dissipation power will be increased. Also, the fabrication yield of the driver circuit is reduced.

As a result of examination, there is a need to meet the following relation:

$$10D \le \frac{W}{L} \le 50D \qquad \text{[expression 30]}$$

where D (inch) is the diagonal length of the effective display area on the liquid crystal display panel, L ($\mu$m) is the length of the gate of the p-channel transistor of the transfer gate 1192, and W ($\mu$m) is the width of the gate.

Preferably, the design is made so as to meet the following equation:

$$15D \le \frac{W}{L} \le 40D \qquad \text{[expression 31]}$$

When the mobility of the p-channel transistor is expressed by "$\mu$p (cm$^2$/V*sec)," there is a need to meet the following relation. The mobility $\mu$p (cm$^2$/V*sec) assumes, for example, 50 or 30.

$$\frac{200D}{\mu p} \le \frac{W}{L} \le \frac{1200D}{\mu p} \qquad \text{[expression 32]}$$

Preferably, there is a need to meet the following relation:

$$\frac{300D}{\mu p} \le \frac{W}{L} \le \frac{1000D}{\mu p} \qquad \text{[expression 33]}$$

It is preferable that a value of W should be 100 ($\mu$m) or more.

As previously described, the output terminal of the shift register circuit of the driver circuit 491 is connected to the inverters 1251 of multiple stages, and the outputs of the inverters 1251b and 1251c of the final stage are connected to TG 1192 (see FIG. 126(b)). If there are a number of inverter stages, a characteristic difference between inverters 1251 will be cumulated (or accumulated) and difference will occur in the transfer time from the shift register to TG (fluctuation in delayed time). For example, in an extreme case, TG 1292R1 in FIG. 138 is turned on after 1.0 $\mu$sec (since a pulse was output from the shift register), while TG 1292G1 is turned on after 1.5 $\mu$sec. Therefore, it is preferable that the number of inverters between the shift register and TG should be small, but the width (W) of TG is very large and it is impossible for the inverter (NAND) constituting the shift register to directly drive TG. For this reason a number of inverter stages are required. However, for example, if the ratio between the magnitude of $W_2/L_2$ of the inverter 1251d of FIG. 126(b) and the magnitude of $W_1/L_1$ of the inverter 1251b, the delayed time will become long and the inverter characteristic will undergo a great fluctuation.

FIG. 228 shows the relation between delayed time fluctuation (represented by a dotted line) and delayed time ratio (represented by a solid line). The axis of abscissa represents $(W_{n-1}/L_{n-1})/(W_n/L_n)$. For example, if the L of the inverters 1251b and 1251d of FIG. 126(b) are the same and $2W_2=W_1$, $(W_1/L_1)/(W_2/L_2)=0.5$. In FIG. 228, delayed time ratio is 1 when $(W_{n-1}/L_{n-1})/(W_n/L_n)=0.5$. Similarly, delayed time fluctuation is 1 when $(W_{n-1}/L_{n-1})/(W_n/L_n)=0.5$.

In FIG. 228, an increase in $(W_{n-1}/L_{n-1})/(W_n/L_n)$ shows that the number of the connected stages of the inverters 1251 is increased and delayed time fluctuation becomes great. A reduction in $(W_{n-1}/L_{n-1})/(W_n/L_n)$ shows that the delayed time between the inverters 1251 of two adjacent stages becomes long. For this graph it is desirable that the delayed time ratio and the delayed time fluctuation be within 2.

Therefore, there is a need to meet the following condition:

$$0.25 \leq \frac{\frac{W_{n-1}}{L_{n-1}}}{\frac{W_n}{L_n}} \leq 0.75 \qquad \text{[expression 34]}$$

In addition, the ratio between the magnitude of W/L ($W_p/L_p$) of the p-channel of each inverter 1251 and the magnitude of W/L ($W_s/L_s$) of the n-channel needs to meet the following relation:

$$0.4 \leq \frac{\frac{W_3}{L_3}}{\frac{W_p}{L_p}} \leq 0.8 \qquad \text{[expression 35]}$$

Furthermore, if the number of stages m of the inverter 1251 between the output terminal of the shift register and TG 1192 meets the following equation, the fluctuation in the delayed time will be reduced.

$$3 \leq m \leq 8 \qquad \text{[expression 36]}$$

There is a problem with mobility $\mu$. If the mobility $\mu_n$ of an n-channel transistor is small, the sizes of a TG and an inverter will become large and the dissipation power will be increased. Also, an area on which a driver circuit is formed is enlarged. For this reason the panel size is enlarged. If the mobility $\mu_n$ is great, characteristic degradation in a transistor will be easily caused. Therefore, it is preferable that mobility $\mu_n$ meet the following range:

$$50 \leq \mu_n \leq 150 \qquad \text{[expression 37]}$$

In addition, the throughrate of a clock signal within the shift register 491 is set to less than 500 V/$\mu$sec. If the throughrate is high, an n-channel transistor will undergo severe degradation.

In FIG. 126, while it has been described that the output of the shift register is connected to the inverters 1251 of multiple stages, the inverters may be replaced with NAND circuits. The aforementioned ratio W/L is also true in this case. It is desirable that the transistor adopt a low doping drain (LDD) structure. In addition, it is preferable that the matters relating to the design values of W and L, described in this specification, should be applied to display panels fabricated with a low-temperature polysilicon technique.

A description will hereinafter be made of an embodiment of a projection type display of the present invention in reference to the drawings. The constitution of a projection type display in a first embodiment of the present invention is shown in FIG. 141. 1411 is a light source as light generation means, 1412 a color purity enhancement filter, and 1415 a projection lens as projection means.

The light source 1411 is constituted by a discharge lamp 1411a, a concave mirror 1411b, an ultraviolet-ray and infrared-ray (UVIR) cut filter 1411c. The discharge lamp 1411a is constituted by a metal halide lamp, and dysprosium (Dy) and neodymium (Nd) are enclosed within the light emitting tube. The emission spectrum is shown in FIG. 147. As evident in FIG. 147, in the spectral distribution of light emitted by the metal halide lamp, a great number of continuous emission spectra by dysprosium (Dy) and neodymium (Nd) and a bright line spectrum by mercury are present together. The concave mirror 1411b is formed with glass or ceramic material, and a dielectric film for reflecting visual light and also transmitting infrared light is deposited on the reflecting surface. The visual light, contained in light emitted from the lamp 1411a, is reflected by the reflecting surface of the concave mirror 1411b, and the reflected light becomes a nearly collimated light. The nearly collimated light from the concave mirror 1141b is passed through the UVIR filter 1411c, and consequently, infrared light and ultraviolet light are removed.

The discharge lamp 1411a means a lamp having a discharge phenomenon, such as an ultrahigh pressure (UHP) mercury lamp, a high pressure mercury lamp, a metal halide (MH) lamp, a sodium lamp, a halogen lamp, and a xenon (Xe) lamp. In a wide sense, it also means a krypton lamp, an LED lamp, and a tungsten lamp. It is preferable that the projection type display of the present invention employ a UHP lamp or an MH lamp.

In UHP lamps or metal halide lamps, arc length means the distance between electrodes which generate an arc. In halogen lamps, arc length means an effective filament length, particularly the length of an area of more than 20% of the maximum brightness. In xenon lamps, arc length means the diameter of a light emitting valve of more than 20% of the maximum brightness, preferably the diameter of a light emitting valve of more than 50%. Where a UHP lamp and a metal halide lamp are of a DC lamp type, there is a preferable case where about 60 to 80% of the distance between electrodes which generate an arc is regarded as arc length.

In a projection type display employing a PD liquid crystal display panel as a light valve, the lamp 1411a is selected so that a relation of D/L>1 be met. In the relation of D/L, D is the arc length of the discharge lamp and L is the diagonal length of the display area of the display panel. It is preferably that a relation of D/L>1.6 be met. As the value of D/L becomes greater, light collecting efficiency becomes higher and high brightness display can be realized. However, if the value is too great, panel size will become large compared with lamp size and system size will be too large. Therefore, it is preferable that D/L be 2.5 or less.

In FIG. 141, although the color filter 151 is arranged on the side of the light source, the present invention is not limited to this arrangement. For example, it is a matter of course that the color filter may be arranged on the side of a screen (not shown). If the color filter 151 is arranged on the screen side, a degradation in the color filter can be reduced, because there is no possibility that it will directly absorb light emitted from the light source. Particularly, this arrangement should be applied to the case where the color filter is formed with resin such as gelatin. Where the color filter consists of an optical interference film, there is almost no possibility that the interference film will absorb light, and it reflects unnecessary light. For this reason, in the case where the color filter 151 is formed with an optical interference film, it is preferable that the color filter 151 be arranged on the side of a light source. The reason for this is as follows: Since there is no possibility that unnecessary light will enter the liquid crystal layer 21, there is no possibility that the liquid crystal display panel 22 will be heated. Therefore, halation is difficult to occur within the liquid crystal layer 21 and display contrast is enhanced.

A description will hereinafter be made of the color purity enhancement filter 1412 employed in the projection type display of the present invention. FIG. 142 shows an enlarged model diagram of the color purity enhancement filter 1412 of the first embodiment. 1422 is a first dielectric multilayer film and 1423 a second dielectric multilayer film.

The first dielectric multilayer film 1422 and the second dielectric multilayer film 1423 are formed on both sides of a glass substrate 642. The first dielectric multilayer film 1422 is constituted by 12 layers of alternations of low refractive index (1.46) $SiO_2$ layers 1424a to 1424f and high refractive index (2.30) $TiO_2$ layers 1425a to 1425f. The optical film thickness of the $SiO_2$ layer 1424a is 0.188 $\lambda_Y$ ($\lambda_Y$=577 nm). The optical film thickness of the $SiO_2$ layers 1424b to 1424f is 0.375 $\lambda_Y$. The optical film thickness of the $TiO_2$ layers 1425a to 1425f is 1.125 $\lambda_Y$. Similarly, the second dielectric multilayer film 1423 is constituted by 12 layers of alternations of low refractive index $SiO_2$ layers 1424g to 1424l and high refractive index $TiO_2$ layers 1425g to 1425f. The optical film thickness of the $SiO_2$ layer 1424 is 0.313 $\lambda_C$ ($\lambda_C$=490 nm). The optical film thickness of the $SiO_2$ layers 1424g to 1424k is 0.625 $\lambda_C$. The optical film thickness of the $TiO_2$ layers 1425g to 1425l is 1.875 $\lambda_C$.

FIG. 144 shows the spectral transmittance of the color purity enhancement filter 1412. The first dielectric multilayer film 1422 reflects 90% or more of yellow light (half value width: about 550 to 600 nm) at a peak wavelength. The second dielectric multilayer film 1423 reflects 90% or more of cyanogen light (half value width: about 475 to 505 nm) at a peak wavelength. Only three primary colors, red, green, and blue show high transmittance.

Note that if the difference in refractive index between a high refractive index layer and a low refractive index layer is made small, the half value width of a reflection wavelength area can be further narrowed.

FIG. 143 shows an enlarged model diagram of the color purity enhancement filter 1412 of a second embodiment. 1432 is a first dielectric multilayer film and 1433 a second dielectric multilayer film.

The first dielectric multilayer film 1432 and the second dielectric multilayer film 1433 are formed on both sides of a glass substrate 181. The first dielectric multilayer film 1432 is constituted by 16 layers of alternations of low refractive index (1.62) $Al_2O_3$ layers 1434a to 1434h and high refractive index (2.30) $TiO_2$ layers 1435a to 1435h. The optical film thickness of the $Al_2O_3$ layer 1434a is 0.188 $\lambda_Y$ ($\lambda_Y$=577 nm). The optical film thickness of the $Al_2O_3$ layers 1434b to 1434h is 0.375 $\lambda_Y$. The optical film thickness of the $TiO_2$ layers 1435a to 1435h is 1.125 $\lambda_Y$. Likewise, the second dielectric multilayer film 1433 is constituted by 16 layers of alternations of low refractive index $Al_2O_3$ layers 1434i to 1434p and high refractive index $TiO_2$ layers 1435i to 1435p. The optical film thickness of the $Al_2O_3$ layer 1434p is 0.313 $\lambda_C$ ($\lambda_C$=490 nm). The optical film thickness of the $Al_2O_3$ layers 1434i to 1434o is 0.625 $\lambda_C$. The optical film thickness of the $TiO_2$ layers 1435i to 1435p is 1.875 $\lambda_C$.

FIG. 145 shows the spectral transmittance of the color purity enhancement filter 1412. The first dielectric multilayer film 1432 reflects 90% or more of yellow light (half value width: about 555 to 595 nm) at a peak wavelength. The second dielectric multilayer film 1433 reflects 90% or more of cyanogen light (half value width: about 480 to 500 nm) at a peak wavelength. Only three primary colors, red, green, and blue show high transmittance.

In the first and second embodiments shown in FIGS. 142 and 143, the first and second dielectric multilayer films are formed on both sides of a glass substrate, respectively. However, even if two kinds of dielectric multilayer films are superimposed and formed on one side of the glass substrate, similar performance will be obtained. However, there are a great number of continuous layers on one side, and consequently, when there is the fear that a crack will occur in the dielectric multilayer film surface due to internal stress produced in the multilayer film, it is preferable that a great number of layers be formed on both sides of a glass substrate.

Even if the film thicknesses of the high refractive index layer and the low refractive index layer are thicker than 1.875 $\lambda_C$ and 0.625 $\lambda_C$ employed in the aforementioned embodiments where cyanogen light is reflected, high reflectance will be periodically obtained. In practice, this case is unsuitable because if film thickness per one layer becomes thicker than the film thickness employed in the aforementioned embodiments, there will be the danger that a crack will occur.

Also, the absolute value of the reflectance at a peak wavelength can be made high if the number of dielectric multilayer films is increased.

In the aforementioned embodiments, although $SiO_2$ or $Al_2O_3$ is employed as a low refractive index layer and $TiO_2$ as a high refractive index layer, $MgF_2$ may be employed as a low refractive index layer and $ZnS$, $CeO_2$, $ZrTiO_4$, $HfO_2$, $Ta_2O_5$, and $ZrO_2$ as a high refractive index layer.

Furthermore, as in the second embodiment, in the case where the difference in refractive index between a high refractive index layer and a low refractive index layer is small, if the absolute value of reflectance at a peak wavelength is attempted to be made high, there will be a need to increase the number of dielectric multilayer films, and depending on the number of films, there will be the fear that a crack will occur. In this case, the high refractive index layer can be constituted by a combination of $TiO_2$ and $ZnS$ whose refractive indexes are nearly the same and which has the property that the directions of internal stresses cancel out each other. The refractive indexes of the $TiO_2$ and $ZnS$ layers are nearly 2.30. In the $TiO_2$ layer, tensile stress is produced, and in the $ZnS$ layer, compression stress is produced. Therefore, for example, if the layers in the high refractive index multilayer film are respectively constituted by three layers consisting of $TiO_2$, $ZnS$, and $TiO_2$ and also the film thickness is divided into three parts, the internal stress in the entire multilayer film can be alleviated.

As evident in the aforementioned description, in the dielectric multilayer film constitution where an optical film thickness per one layer is $\lambda/4$ ($\lambda$: reflection peak wavelength), as shown in FIG. 146, a color filter in which a half value width is narrow (50 nm or less) in a high reflection area is unrealizable.

On the other hand, if the optical film thickness ratio between the low refractive index film and high refractive index film of a multilayer film is 1: X (X>1) and also X is increased, the half value width can be slightly narrowed. However, as the film thickness ratio becomes greater, a balance of stress is lost between the low refractive index film and the high refractive index film by the internal stresses produced in the films, and consequently, there is the fear that a crack will occur in the multilayer film surface. Hence, it is desirable that the optical film thickness ratio between the low refractive index film and the high refractive index film should be 1:3 or less. However, in this condition alone, the half value width is insufficient to reflect only yellow light or cyanogen light.

This kind of interference filter has the spectral performance that in addition to reflection peak at wavelength $\lambda$, reflection peaks appear periodically on a shorter wavelength side than wavelength $\lambda$. The interference filter further has the characteristic that the half value width is narrowed if cycles superimpose each other. Hence, these periodic reflection peaks with a narrow half-value width are utilized, and they are shifted to the center wavelength of yellow light or cyanogen light. Specifically, the thickness of the aforementioned alternate multilayer film, in which the optical film thickness ratio between the low refractive index film and the high refractive index film is 1:3, is relatively thickened. It is desirable that the second cycle be shifted to realize less than half value width 50 nm corresponding to yellow light. Also, it is desirable that the third cycle be shifted to realize less than half value width 40 nm corresponding to cyanogen light.

In the case of yellow light reflection, the optical film thickness of a multilayer film is relatively increased by approximately 1.5 times, the thickness of the low refractive index layer is $0.375\lambda$, and the thickness of the high refractive index layer is $1.125\lambda$. In the case of cyanogen light reflection, the optical film thickness of a multilayer film is relatively increased by approximately 2.5 times, the thickness of the low refractive index layer is $0.625\lambda$, and the thickness of the high refractive index layer is $1.875\lambda$.

The reflection peaks are also present in the fourth cycle and the cycles thereafter, but, since the thickness of the multilayer film becomes considerably thick, it is unsuitable from the viewpoint of reliability.

Attention given here is that in the color purity enhancement filter 1412, $\lambda_Y=577$ nm. The metal halide lamp shown in FIG. 147 shows a strong emission spectrum at a wavelength of 577 nm. This spectrum is caused by a mercury atom. The wavelength of 577 nm corresponds to the band of yellow light. Therefore, if light with a wavelength of 577 nm cannot be cut sufficiently, the hue of an image projected on a screen cannot be made satisfactorily.

The emission spectrum at a wavelength of 490 nm is caused by neodymium (Nd). Although the spectral characteristic of FIG. 147 does not show a strong peak value at a wavelength of 490 nm, a strong emission spectrum occurs depending on an amount of addition of neodymium (Nd). A metal halide lamp containing dysprosium (Dy) and neodymium (Nd) is satisfactory in spectral characteristic and long in life. However, the emission spectra of yellow light and cyanogen light are strong.

The color purity enhancement filter 1412 of the present invention is characterized in that the emission spectra at wavelengths of 490 nm and 577 nm can be cut sufficiently and also the half value widths at the cut bands are narrow as about 50 nm. In this sense, when the color purity enhancement filter 1412 is combined with a metal halide lamp and employed, there is a synergistic effect.

Nearly collimated light from the light source 1411a is incident on the color purity enhancement filter 1412. The color purity enhancement filter 1412 transmits only three primary light components whose purity is high in accordance with the spectral characteristic shown in FIG. 144 or 145. The light, transmitted through the color purity enhancement filter 1412, is transmitted through a field lens 1413 and incident on a display panel 22 of the present invention. The field lens 1413 is employed to direct the light being transmitted through the circumferential portion of the liquid crystal display panel 22 to a projection lens 1415. The light incident on the display panel 22 modulates incident light as a change in transmittance in accordance with a video signal, and a color image is formed on a screen (not shown). The focusing adjustment of a projected image is performed by moving the projection lens 1415 along an optical axis 1416.

For the projected images of red, green, and blue pixels on the screen, the spectral characteristics are shown in FIGS. 149(a), (b), and (c). A dotted line represents a spectral characteristic obtained only by the color filter 151, and a solid line represents a spectral characteristic improved by the color purity enhancement filter 1412 added to the optical path. It is found that the use of the color purity enhancement filter 1412 reduces the light band component which is believed to be causative of color purity degradation. It is also found that all red, green, blue components have become narrow compared with the light transmittance band of the color filter 151. FIG. 148 shows a spectral characteristic distribution obtained when light components transmitted through the R, G, and B color filters 151 are synthesized. Since cyanogen light and yellow light are cut by the color purity enhancement filter 1412, the spectral characteristic distribution of the metal halide lamp 1411a shown in FIG. 147 becomes a spectral characteristic distribution of FIG. 148.

FIG. 150 shows the color reproducibility (solid line) of the projection type display of the present invention arranging the color purity enhancement filter 1412 in the optical path 1416. It is found that the color reproduction range of the present invention has been widened compared with conventional constitution having only the color filter 151 (dotted line).

If the color purity enhancement filter 1412 removes unnecessary light components from light emitted from the light source 1411, a quantity of light which is absorbed by the color filter 151 formed within the liquid crystal display panel 22 can be reduced. Therefore, the amount of heat that is generated by unnecessary light absorbed by the color filter 151 can be reduced, whereby a degradation in the color filter 151 can be suppressed.

FIG. 151 shows the constitution of a projection type display in another embodiment of the present invention. Light emerging from a lamp 1411a is focused by a concave mirror 1411b, and ultraviolet light and infrared light are removed by a UVIR cut filter 1411c. The emitted light from the light source 1411 is transmitted through a color purity enhancement filter 1412, a field lens 1413, a display panel 22 of the present invention, and a transparent plate 1131 in the recited order and is incident on a projection lens 1415. The color purity enhancement filter 1412 removes the light component in a band which is believed to be causative of color purity degradation in accordance with the spectral characteristic distribution shown in FIG. 144 or 145. The transparent plate 1131 is optically coupled to the exit side of the PD liquid crystal display panel 22 by a Optical coupling agent 371. An ineffective area of the transparent plate 1131 is coated with black paint 1132. 211 denotes an antireflection film (air coat) for preventing the reflection of light emerging from the exit side of the display panel 22.

The pupil of the projection lens 1415 is sized so that when a pixel on the screen center of the liquid crystal display panel 22 is in a transparent state, about 90% of a light quantity emitted from that pixel in all directions can be incident. The field lens 1413 is employed so that the circumferential portion of a projected image does not become dark, by refracting light being transmitted through the circumferential portion of the display area of the liquid crystal display panel 22 inwardly and then directing the refracted light to the pupil of the projection lens 1415. The focusing adjustment of the projected image is performed by moving the projection lens 1415 along an optical axis 1416.

On the liquid crystal display panel 22 an optical image is formed as the change of a light scattering state in accordance with a video signal. Among the light emitted from the pixels, the projection lens 1415 receives the light contained in a certain solid angle. If the scattering state of the light emitted from the pixels changes, the light quantity contained in the solid angle will change. Therefore, the optical image, formed as the change of a light scattering state on the liquid crystal display panel 22, is converted to the change of illuminance on a screen 1501. In this manner, the optical image formed on the liquid crystal display panel 22 is enlarged and projected on the screen 1501 by the projection lens 1415. This embodiment can also improve color reproducibility by the same operation as the aforementioned embodiment with the use of the color purity enhancement filter 142. The matters, related to the determination of the reflection light band of the color purity enhancement filter 142 based on the spectral characteristic distribution of the metal halide lamp 1419a, are the same as or similar to the aforementioned embodiments.

FIG. 152 shows a variation of FIG. 151. The variation is the same constitution as FIG. 151 except for a flat-concave lens 1131b arranged on the exit side of the liquid crystal display panel 22.

In the state in which the projection lens 1415 is combined with the flat-concave lens 1131b, the optical image on the liquid crystal layer 21 is projected onto the screen 1501. Since the light emerging from the concave surface of the flat-concave lens 1131b needs to be incident on the projection lens 1415, converged light needs to be incident on the liquid crystal display panel 22. The focusing adjustment of the projected image is performed by moving the projection lens 1415 along an optical axis 1416.

Light emitted from a light source 1411 is incident on the PD liquid crystal display panel 22 through a color purity enhancement filter 1412 and a field lens 1413. Black paint 1132 coated on the side surface of the flat-concave lens 1131b and an antireflection film 211 deposited on the concave surface of the flat-concave lens 1131b show the same operation as the aforementioned embodiment and enhance the contrast of the projected image.

Color display is realizable by employing the projection type display shown in FIG. 141 or 151. However, since the overall length of the projection type display is long, it is unhandy to carry. FIGS. 153 and 154 are explanatory diagrams of a projection type display which has solved the aforementioned problem. FIG. 153 is an explanatory diagram of the state when it is used. FIG. 154 is an explanatory diagram of the state when it is carried. The reason why the overall length can be shortened as shown in FIG. 154 is that large space is provided between a projection lens 1415 and a panel 22 and between the panel 22 and a light emitting lamp 1411a.

A casing 1535 is constituted by three casing portions: a casing portion 1535c mounted with the projection lens 1415, a casing portion 1535b mounted with the panel 22, and a casing portion 1535a mounted with a lamp. When the display is carried, the overall length can be shortened by housing the casing portions 1535a and 1535c into the casing portion 1535b as shown in FIG. 154.

Field lenses 1413b and 1413c are arranged before and after the panel 22, and these are mounted in a mounting portion 1537. 1534b is a fan for cooling the panel. 1536 is a portion on which a printed board, such a circuit for converting a composite signal to R, G, and B component signals and a circuit for generating a pulse to control the panel, is arranged. The panel 22 is arranged so that it is slightly slanted at an angle of 2° to 8°. The reason for this is that when an image is projected onto an upper screen obliquely provided with respect to the panel, the image is formed satisfactorily (trapezoidal strain correction).

The projection lens 1415 is a zoom lens, and the focusing adjustment of the lens 1415 is performed by a lens drive portion 1536. 1533 is a control button, and a video input switching button, a picture/contrast adjustment switch, a zoom/focus adjustment switch, and a power on-off switch are arranged on the control box. The control button 1533 can be removed from the casing portion 1535c and used as a remote control button.

The control button 1533 includes a movement control button for moving the lamp 1411a. The lamp 1411a is mounted on a position adjustment table 1531 that can be moved in X and Y directions. If the movement control button is operated, the lamp 1411a will be moved longitudinally and laterally. The reason that such a movement control button is arranged is that since the casing 1535 of the projection type display of the present invention is divided into three portions, the lamp 1411a is easily offset from the optical axis between the lamp 1411a and the projection lens 1415. To cope with the optical axis offset, the position of the lamp 1411a is aligned with the optical axis by the position adjustment table 1531.

When a PD liquid crystal display panel is employed as the display panel 22, the effective F number of the projection lens 1415 is between 7 and 10. Also, the F number of an illuminating light beam and the F number of the projection lens are nearly the same. Between the projection lens 1415 and the display panel 22 a color purity enhancement filter 1412 is arranged.

1532 is a power source for the lamp 1411a. The lamp 1411a employs an ultrahigh-pressure (UHP) mercury lamp. The lamp power is between 100 and 150 W. 1534a is a lamp cooling fan.

The cooling fan 1534b suctions the air inside the casing 1535, and the cooling fan 1534a exhausts air outside the casing 1535. Thus, the casing 1535 is constructed so that air cools the panel 22, then cools the lamp, and is exhausted outside.

In the state in which the casing is contracted as shown in FIG. 154, the switch for turning on the power source is not operated. The reason for this is that if the lamp 1411a is lit in the state of FIG. 154, an air path for the cooling fans cannot be formed and therefore the display panel 22 will be damaged. To detect whether or not the power source can be turned on (whether or not the casing has been contracted), switches 1539 are provided for detecting contact between the casing portions 1535a and 1535b and contact between the casing portions 1535c and 1535b. With these switches 1539, it is detected whether or not the casing is in the state of FIG. 153.

In the projection type display of FIG. 154, the detection of whether or not the casing portions 1535a and 1535c have been moved from the casing portion 1535b to predetermined positions (at which projection can be performed) is performed by mechanical relay switches, push switches, conductive rubber switches, light detecting switches, or Hall elements. The outputs from these switches 1539 (1539a to 1539d in FIG. 154) are processed by a microcomputer. The microcomputer controls the power source switch, based on a result of processing.

Until the light output of the lamp 1411a assumes a sufficient value after it has been lit, a video signal is not applied to the display panel 22, and a voice signal is not output either. The reason for this is that noise is easily contained in the voice signal during the brightness rise time of the lamp 1411a and is easily contained in the video signal as well. For this reason, after the lamp has been lit, the microcomputer operates a timer, and the voice signal is output after a predetermined period.

In the aforementioned description, the screen 1501 and the projector are separated from each other. If the aforementioned projection type display is arranged as an optical block 1551 within a cabinet 1535, as shown in FIG. 155, a rear type projector can be constituted. The rear type projector is one in which the screen 1501 and a projection portion (projection type display) are integrally formed with each other, and it is called a projection TV.

Light emitted from the projection type display (optical block 1551) is reflected by mirrors 1552a and 1552b and is directed to the screen 1501. The screen 1501 is a transmission type screen, and a Fresnel lens and a lenticular lens are pasted together.

As shown in FIG. 156, if a mirror 1552 is arranged within a projection lens 1415 and also an optical block 1551 is horizontally arranged, the depth can be shortened. Therefore, a compact rear type projector can be constituted. The constitution where a mirror is arranged within an integrally formed projection lens 1415 and also an optical path is bent at an angle of 90° is effective particularly in rear projectors.

In the aforementioned embodiments, the liquid crystal display panel is of a transmission type.

Therefore, the projection type display panel is also of a transmission type. It is also easy to constitute a reflection type display. The light valve which is employed in the reflection type display employs a reflection type liquid crystal display. As an example of the reflection type display, the pixel electrode 14 shown in FIG. 19 is formed from aluminum (Al) as a reflecting electrode. In the case of reflection type display panels, light is incident through the counter electrode 25 and again emerges from the counter electrode 25. Therefore, the transparent plate 1131a is optically connected to the side of the substrate 11.

A description will hereinafter be made of the reflection type projection display. FIG. 157 shows a constitution diagram of the reflection type projection display.

A projection lens 1415 is constituted by a first lens group 1415a on the side of a liquid crystal display panel 22 and a second lens group 1415b on the side of a screen 1501. Between the first lens group 1415a and the second lens group 1415b a piano mirror 1552 is arranged. Scattered light emerging from a pixel on the screen center of the liquid crystal display panel 22 is transmitted through the first lens group 1415a. Then, about 50% of the transmitted light is incident on the piano mirror 1552, and the remaining light is incident on the second lens group 1415b. The normal line of the reflecting surface of the piano mirror 1552 is inclined at an angle of 45° to the optical axis 1416 of the projection lens 1415. For the light from the light source 1411, cyanogen light and yellow light are cut by a color purity enhancement filter 1412. Then, the aforementioned light is reflected by the plano mirror 1552 and is transmitted through the first lens group 1415a.

The transmitted light is reflected by the liquid crystal display panel 22 and arrives at the screen 1501 through the first lens group 1415a and the second lens group 1415b. The projection lens 1415 is constituted by a telecentric lens so that light emerging from the center of the lens aperture toward the liquid crystal display panel 22 is nearly perpendicularly incident on the liquid crystal layer 21.

FIG. 158 is a constitution diagram of a projection type display employing a polarization beam splitter (hereinafter referred to as a PBS). Light emitted from a light source 1411 is reflected by a color purity enhancement filter 1412. At this time, the light component other than cyanogen and yellow bands is reflected. The reflected light is incident on the PBS 1581 and S-polarized light is reflected at a light separating surface 1582. The reflected light is incident on a reflection type liquid crystal display panel 22. The panel 22 modulates the incident light, based on a video signal. The modulated light is transmitted through the PBS 1581 and a projection lens 1415. The transmitted light is reflected by a plano mirror 1552 and is projected onto a screen 1501.

In the aforementioned embodiments, the color purity of a projected image is improved by the color purity enhancement filter 1412. In FIG. 159 the color purity is improved by a dichroic prism 1591.

Light emitted from a light source 1411 is separated into three primary light components (R, G, and B) by the interfaces 1582a and 1582b of a dichroic prism 1591a. The separated light components are reflected by mirrors 1552a and 1552b and are transmitted trough a lens 1592. The transmitted light components are again synthesized by the interfaces 1582c and 1582d of a dichroic mirror 1591b. The synthesized light is transmitted through a lens 1413b. The transmitted light is modulated by a display panel 22 and is projected onto a projection lens 1415.

Since cyanogen light and yellow light from a light emitting lamp 1411a are cut, band cut filters 1594a and 1594b are arranged in an optical path. The band cut filters are of a light absorption type, and absorbed light is converted to heat. However, since the band cut filter does not reflect light as in a dielectric mirror, it does not cause halation. For this reason there is no occurrence of a ghost image. Since the band cut filter 1594 cuts unnecessary band light, the light incident on the display panel 22 becomes three satisfactory primary colors. For this reason the color purity of a projected image can be enhanced.

A lens plate 1592 is made by forming a plurality of Fresnel lenses 1593 on a single acrylic plate. The Fresnel lenses 1593a and 1593c function as relay lenses. A plurality of lenses 1593 are formed on the single lens plate 1592, and this lens plate 1592 is arranged in a plurality of optical paths (e.g., optical paths of R, G, and B). The distance between lenses 1593 (e.g., distance between lenses 1593a and 1593b) on the lens plate 1592 is precisely made. In a conventional projection type display, separate relay lenses are arranged in a plurality of optical paths (optical paths of R, G, and B), respectively. For this reason, the individual lenses need to be positioned respectively and therefore it takes time for positioning. In the present invention, since a plurality of lenses 1593 are formed on a single lens plate 1592, a plurality of lenses in optical paths can be positioned at the same time by positioning the lens plate 1592.

The lens plate 1592 can be easily fabricated by stamping transparent resin such as acrylic and polycarbonate.

As shown in FIG. 160, the lens 1593 may be a circular arc lens (1593a, 1593b, and 1593c). Also, as shown in FIG. 160, instead of the band cut filter 1594 the mirrors 1552a and 1552b may be employed as dichroic mirrors 1611a and 1611b. The dichroic mirror 1611 transmits unnecessary light (cyanogen light and yellow light) and reflects necessary light path at an angle of 90°.

FIG. 161 shows an embodiment in which two lenses 1593a and 1593b are formed on a lens plate 1592. The lens 1593a is arranged in a first optical path and the lens 1593b is arranged in a second optical path. The dichroic mirror 1611a reflects light in the range of R light, as shown in FIG. 162(a). The dichroic mirror 1611b reflects light in the range of G light and G light, as shown in FIG. 162(b). Therefore, since yellow light in the range of a band k shown in FIG. 162 is cut, the color purity of a projected image can be improved.

In the aforementioned embodiment, a sheet of display panel is employed and the color filter 151 is formed on the display panel 22, thereby performing color display. The method of the present invention, which constitutes a projection type display by forming a plurality of lenses 1593 on a single lens plate 1592 and then arranging the lenses 1593 in different optical paths, is also applicable to a projection type display having a plurality of display panels.

FIG. 163 is a constitution diagram showing a lens plate 1592 arranged on a projection type display employing a display panel 22 which has three R, G, and B display areas.

Light emitted from a light emitting lamp 1411a is separated into R, G, and B light components by dichroic mirrors 1611a and 1611b. The separated light components are transmitted trough the lenses 1593 of a lens plate 1592 and incident on the display areas 1631a, 1631b, and 1631c of the display panel 22. The light modulated by the display area 1631 is transmitted through the dichroic mirrors 1611a and 1611b. At this time, unnecessary light is cut and the color purity is enhanced. The transmitted light components are synthesized to a single optical path by the dichroic mirrors 1611c and 1611d. The synthesized light is projected onto a projection lens 1415.

In FIG. 163, the optical paths of R light and B light differ in optical path length from the optical path of G light. In other words, the optical path lengths of R light and B light are longer than that of G light. For this reason the focal distances of the lenses 1593a and 1593c are different from that of the lens 1593b.

FIG. 163 is a constitution diagram showing a display panel having three display areas for modulating R light, G light, and B light, the display panel being employed as a light valve. However, as shown in FIG. 164, it is a matter of course that the technical idea of the lens plate 1592 of the present invention is also applicable to a projection type display having three panels, a display panel 22a for modulating R light, a display panel 22b for modulating G light, and a display panel 22c for modulating B light.

In projection type displays (liquid crystal projectors), a growing high-brightness display tendency has been seen in recent years. For this reason the output of the lamp 1411a is increasing. Therefore, a great quantity of light is incident on the display panel 22a, and the display panel and polarizing plate are heated and degraded. To cool the polarizing plate and display panel 22, air cooling is presently being performed by cooling fans. However, there is a limit to the cooling power of the cooling fan. If the speed of the cooling fan is increased to enhance the cooling power, the rotational sound will be increased.

The present invention performs hydrogen cooling on a display panel 22, as shown in FIG. 165. As an example, the range of a dotted line shown in FIG. 164 is enclosed by a casing 1651, and within the casing 1651, a display panel 22, a polarizing plate (not shown), and a dichroic prism (dichroic mirror) 1591 are disposed. The casing 1651 is filled with hydrogen. The casing is formed from transparent resin or glass. The area that light is transmitted through is formed with an air coat 211 for preventing interface reflection.

The heat transfer rate and surface heat transfer rate of hydrogen are 6.69 times and 1.35 times those of air and are thus great. For this reason, since the cooling effect of hydrogen is great, it can sufficiently cool the display panel 22. In addition, because the density of hydrogen is 7% of air and thus light, loss of wind is reduced and efficiency is enhanced. Therefore, the sound of the cooling fan can be reduced. Furthermore, hydrogen is inactive compared with air, so the occurrence of display panel degradation is low.

If the display panel 22 is arranged within the casing 1651 and also the casing 1651 is sealed, there will be no possibility that dust will adhere to the surface of the display panel. In addition, if the cooling fan 1534 is arranged within the casing 1651, there will be no possibility that the sound of the cooling fan will leak outside. Note that FIG. 166 is a top view of the casing 1651.

At least the display panel 22 is arranged within the casing 1651. The cooling fan 1534 blows wind to a radiating plate 921. Heat generated within the casing 1534 is radiated outside the casing 1651 by the radiating plate 921. The cooling fan constantly circulates hydrogen within the casing 1651, and the circulated hydrogen cools the display panel 22. For this reason a temperature distribution will not occur in the display panel 22.

In FIG. 165(a), although the cooling fan 1534 is arranged within the casing 1651, it is also effective to arrange a Peltier device (electronic cooling device) as shown in FIG. 165(b). The Peltier device can easily perform the temperature control of the casing by controlling an amount of current which flows through the device. Also, if current is caused to flow through the Peltier device in the opposite direction, air (hydrogen) within the casing can be warmed. Furthermore, the casing can be easily sealed because there is no moving portion. The heat removed from the casing by the Peltier device is transferred directly to the radiating plate 921 and exhausted outside the casing 1651. The Peltier device 1652 does not require a cooling fan and there is no occurrence of noise. If air is blown to the radiating plate 921 extending outside the casing 1651 by a cooling fan, the cooling power can be further enhanced.

In FIG. 164, while it has been illustrated that the display panel portion is enclosed by he casing 1651 and cooled, the present invention is not limited to this arrangement. It is effective that the lamp 1411 is enclosed with the casing 1651 and cooled. In addition, it is effective that the entire projection type display is sealed and cooled with hydrogen.

In FIGS. 164 and 165(a), (b), although the casing 1651 is filled with hydrogen to cool the display panel 22, sulfur hexafluoride ($SF_6$) and helium may be employed.

The display panel 22 may be a reflection type display panel. As a reflection type display panel, there is a digital micromirror device (DMD) developed by Texas Instrument (TI). The display panel is cooled from the back surface with a Peltier device (electronic cooling device) and also hydrogen is circulated between the prism 1591 and the display panel 22 to cool the display panel. Also, the entire display panel may be cooled with hydrogen. In addition, the display panel may be an organic EL display panel, an inorganic EL display panel, a TN display panel, a guest-host liquid crystal display panel, an STN display panel, a homeotropic mode type display panel, a heat write type display panel, an LED display panel, an optical write type display panel, a laser write type display panel, or a ferroelectric liquid crystal display panel.

Hydrogen cooling is also effective in the case of the cooling of the rotary filter 1414. Particularly, hydrogen cooling is effective in the case where a polarizing plate is formed in the rotary filter 1414 and the case where a light absorption type filter (e.g., color filters for R light, G light, and B light) is formed. The reason for this is that the rotary filter 1414 absorbs light from a lamp and generates heat. If the rotary filter 1414 is cooled with hydrogen, heat can be efficiently radiated from the rotary filter 1414.

The prism 1591 may be a prism for a CCD (see FIG. 201). It may also be replaced with a dichroic mirror. In addition, the entire casing 1535 of FIG. 153 may be filled with hydrogen and cooled without employing the casing 1651.

In FIGS. 165(a) and (b), the display panel is cooled with hydrogen. Instead of hydrogen, silicon oil, water, or freon fluid may be employed. This method is shown in FIGS. 167 and 168. As shown in FIG. 168, a display panel 22 is arranged within a casing 1651a, which is in turn filled with cooling liquid 1682 such as ethylene glycol and silicon oil. The cooling liquid 1682 absorbs heat from the display panel 22 and cools it. The casing 1651a is arranged so as to surround a prism 1591.

The casing 1651a is connected to a casing 1651b, and the casings are filled with nitrogen gas 1681 on the upper surface of the cooling liquid 1682 to prevent oxidation of the cooling liquid 1682. The reason that there is space in the upper portion of the cooling liquid 1682 is that the cooling liquid 1682 varies in volume, depending on temperature. The casing 1651b is divided into two chambers B and C, which are filled with silicon oil. The liquid in the chambers B and C differs from the cooling liquid in the chamber A of the casing 1651a and serves as seal liquid 1683 which prevents contact between the air and the cooling liquid in the chamber A. Thus, the seal liquid 1683 and the nitrogen gas 1681 prevent the oxidization of the cooling liquid 1682 and the occurrence of slag(impurities). FIG. 167 is a sectional view taken along line A–A' of FIG. 168.

In FIG. 168 the casing 1651b is filled with the seal liquid 1683, but, if the upper portion of the cooling liquid 1682 is formed with a conservator film, the casing 1651b is not required. Also, if a moisture absorbent such as active alumina is put into the cooling liquid 1682, it will absorb moisture from the cooling liquid 1682 and can prevent degradation of the cooling liquid 1682. In addition, if the cooling liquid is circulated by a pump, the cooling power can be further enhanced.

A display panel employing a PD liquid crystal layer as a light modulating layer can realize high brightness display, but there is a problem with the PD liquid crystal display panel. The problem is that a hysteresis characteristic occurs at low temperature. If hysteresis occurs, image baking will arise. The hysteresis occurs easily when panel temperature is less than 10° C.

When the display panel 22 is employed as the light valve of a projection type display, it is heated in a short time after a lamp is lit. For this reason the temperature of the panel 22 rises and no hysteresis will occur. However, when room temperature is low (less than 10° C.) and immediately after a lamp is lit, there is the problem that hysteresis will occur.

FIG. 169 is an explanatory diagram of a display panel of the present invention carrying out a measure to counter hysteresis. A counter substrate 11 is mounted on an array substrate 12 so that it is offset from the array substrate 12. On the counter substrate 11 a wire 1693 is formed. The wire 1693 is formed as the same time as formation of a chrome (Cr) film which becomes a light shielding film (BM). It may be formed from silver paste. At this time, the wire 1693 is formed so that the resistance thereof is lower than the sheet resistance of ITO of a counter electrode 25.

On one end of the wire 1693 a connecting point 1694 is formed from paste. A lead wire 1695 extends from the connecting point 1694. The lead wire 1695 is connected to an AC power supply 1691. If a switch 1692 is closed, current will flow between wires 1693a and 1693b.

On the other hand, the array substrate 12 is formed with a source drive circuit 491 and a gate drive circuit 492. The aforementioned wire 1693 and the drive circuits are formed at positions where they do not contact each other. Also, the wire 1693 is formed outside seal resin 361.

If the switch 1692 is closed, current will flow between wires 1693a and 1693b. The current flows through ITO serving the counter electrode 25. The ITO has a relatively high resistance value, so if current flows through the ITO, Joule heat will be generated. The generated heat causes the temperature of the liquid crystal layer 21 to rise. Since the PD liquid crystal layer 21 is heated to more than 10° C., no hysteresis will occur.

The switch 1692 interlocks with a power switch for the projection type display, a temperature sensor 745 (see FIG. 74) for detecting the temperature of the display panel, and a microcomputer (timer) for counting time that has passed since the power switch is turned on. When the power switch is turned on and also the temperature of the display panel 22 shows a predetermined value (e.g., less than 10° C.), the switch 1692 is closed and current flows through the counter electrode 25. However, even if the liquid crystal layer 21 reaches more than a predetermined temperature (e.g., 10° C.), the temperature of the display panel will not rise at once. In that case, the timer of the microcomputer judges that the liquid crystal layer 21 has already reached more than a predetermined value, thereby opening the switch 1692.

When current is flowing through the counter electrode 25, there are cases where the display image on the display panel becomes unstable (e.g., brightness inclination appears or there is a large amount of noise). Therefore, when current is flowing through the counter electrode 25, image display is not performed. The period is short and usually about 10 sec.

If a lamp 1411a is lit, the panel 22 is already heated by light from the lamp and there is no possibility that hysteresis occurs again. Conversely, the cooling fan needs to be turned on to cool the display panel.

Thus, if current flows directly through the counter electrode 25, the PD liquid crystal layer 21 can be directly heated. For this reason a measure to counter hysteresis can be performed quickly. It is desirable that current which flows through the wire 1693 can be adjusted according to the output of the temperature sensor 745. For example, if the output of the temperature sensor 745 is −10° C., a current of 3 A will flow through the wire 1693. If it is +10° C., a current of 1 A will flow.

As an example of the temperature sensor 745, there is a thermoelectric thermometer employing a thermocouple, a resistance thermometer utilizing the fact that the resistance rate of a semiconductor depends on temperature, a radiation thermometer, an optical altimeter, a bimetal thermometer, and a photoelectric pyrometer.

In FIG. 169, a measure to counter hysteresis is carried out with the panel 22. FIG. 170 is an explanatory diagram of the case where a measure to counter hysteresis is carried out with an optical system. It is a matter of course that both countermeasures shown in FIGS. 169 and 170 may be carried out at the same time.

On the exit side of a lamp 1411 an ultraviolet-ray and infrared-ray (UVIR) cut filter is usually arranged. The UVIR cut filter is usually constituted by a single cut filter. The arrangement shown in FIG. 170 is provided with a single ultraviolet-ray (UV) cut filter 1701 and a single infrared-ray (IR) cut filter 1702.

When the lamp 1411a is lit, the IR cut filter 1702 has been removed from an optical path 1416 (i.e., it is held at a position of 1702a). At this time, the display panel 22 is heated by the radiation heat of infrared light emitted from the lamp 1411a. For this reason the display panel 22 is warmed at once and reaches more than 10° C., so there is no occurrence of hysteresis. If the display panel 22 is heated to a predetermined temperature, the IR cut filter 1702 is inserted in the optical path 1416 (at a position of 1702b). The timing at which the cut filter is inserted in the optical path is detected with the temperature sensor 745. The IR cut filter 1702 may be forcibly inserted in the optical path after a predetermined time that has passed since the lamp is lit.

However, in the case where the output of the temperature sensor 745 is higher than a predetermined temperature (e.g., 30° C.) when power is turned on, the IR cut filter 1702 is inserted in the optical path 1416 immediately after the lamp is lit. The reason f or this is that the display panel 22 is overheated and degraded.

It is effective that as occasion demands, an infrared-ray absorption filter 1703 is attached to the incident side or exit side of the display panel 22. The reason for this is that the filter 1703 absorbs infrared light emitted from the lamp 1411*a* and heats the display panel 22 quickly to the temperature where hysteresis does not occur.

Structure such as that shown in FIG. 171 can facilitate the aforementioned insertion and removal of the IR cut filter 1702 for the optical path. The IR cut filter 1702 is attached to a motor 1711 which rotates through 90°. Immediately after a lamp 1411*a* is lit, the IR cut filter 1702 is held at a position indicated by a dotted line. If a predetermined time has passed after the lamp 1411*a* is lit, or if the display panel 22 reaches a predetermined temperature, the motor 1711 is rotated through 90° so that the IR cut filter 1702 is inserted in an optical path 1416 (solid line position). At this time, the IR cut filter 1702 is stopped by a damper 1712 for preventing overshoot. If constituted in the aforementioned manner, a measure to counter hysteresis can be easily performed.

Although the aforementioned projection type display of the present invention employs a single display panel 22, two display panels 22 may be employed. The constitution diagram is shown in FIG. 172.

White light emitted from a light source 1411 is transmitted through a color purity enhancement filter 1412. At this time, cyanogen light and yellow light are cut. The light from the filter 1412 is separated into P-polarized light and S-polarized light by a polarization beam splitter (PBS) 1581*a*. The S-polarized light is reflected by the PBS 1581*a* and is turned at an angle of 90° by a mirror 1552*b*. The S-polarized light is transmitted through a field lens 1413*b* and incident on a liquid crystal display panel 22*b*. The P-polarized light transmitted through the PBS 1581*a* is likewise turned at an angle of 90° by a mirror 1552*a*. The P-polarized light is transmitted through a field lens 1413*a* and incident on a liquid crystal display panel 22*a*. The liquid crystal display panels 22*a* and 22*b* modulate the P-polarized light and the S-polarized light, respectively. The P-polarized light and the S-polarized light are synthesized together by a PBS 1581*b*. The synthesized light is projected on an enlarged scale onto a screen (not shown) by a projection lens 1415.

As shown in FIG. 173, the projection type display may have two light sources 1411. In this case the PBS 1581*a* of FIG. 172 is not required.

A further description will hereinafter be made of the projection type display of the present invention. First, a supplementary description will be made of the liquid crystal display panels 22 having the transverse electric field wire 17 shown in FIG. 1. These display panels are characterized in that they have satisfactory scattering performance with respect to predetermined polarized light. As shown in FIG. 3(*b*), if the liquid crystal molecule 20 is oriented by the electric field 19, the refractive index of the liquid crystal molecule 20 will be $n_e$ with respect to polarized light in a direction of aa'. For this reason a strong refractive index mismatch between the liquid crystal molecule 20 and the resin component 24 occurs and therefore the liquid crystal layer scatters strongly. Therefore, if the polarized light in the direction of aa' is incident on the liquid crystal display panel of the present invention, the display contrast can be enhanced.

Figure 14:
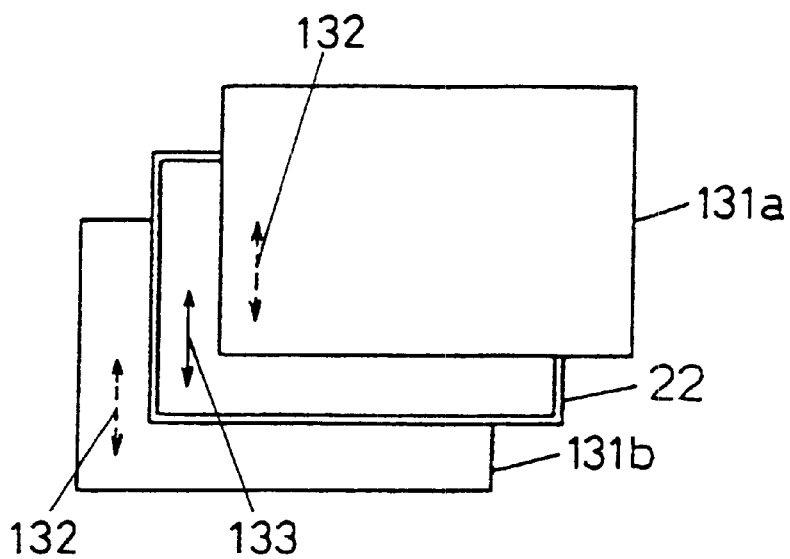
FIG. 14 is an explanatory diagram as polarizing plates are arranged in the light incidence and emergence of the display panel of the present invention.
Figure 14:
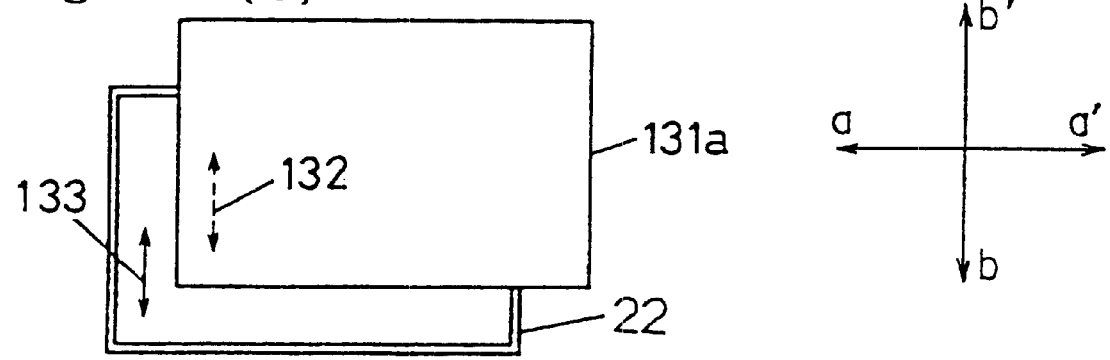
Figure 14:
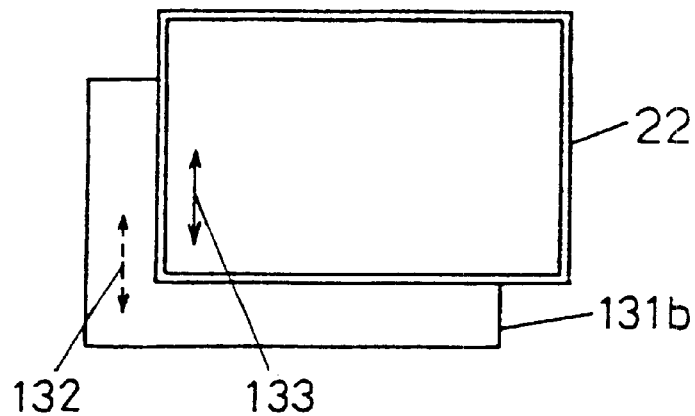

As an example of the arrangement of the polarizing plate (polarization axis), there is constitution shown in FIGS. 13 and 14. Basically, the transverse electric field generation direction 133 and the polarization axis 132 are aligned with each other. In FIGS. 13(*a*) and 14(*a*), polarization means (e.g., the polarizing plate 131, the polarization beam splitter (PBS), etc.) are arranged on the incident side and exit side of the liquid crystal display panel 22. In FIGS. 13(*b*), 13(*c*), 14(*b*), and 14(*c*), polarization means is arranged on either one or the other of the incident and exit sides of the liquid crystal display panel 22.

FIG. 174 is a constitution diagram of a projection type display of the present invention. Unnecessary parts for explanation are not given. The curvature of a concave mirror 1411*b* is designed to a proper value in accordance with the arc length of a lamp 1411*a* and a projection lens 1415. In a projection type display employing the PD liquid crystal display panel 22 as a light valve, since the F number of the projection lens 1415 is large, it is preferable that the concave mirror be constituted by an elliptical mirror. A dichroic mirror 1611*a* reflects red (R) light (RDM) and a dichroic mirror 1611*b* reflects green (G) light (GDM).

Light emitted from the light emitting lamp 1411*a* is transmitted through an ultraviolet-ray and infrared-ray (UVIR) cut filter 1411*c*. At this time, ultraviolet light and infrared light are cut. The light from the filter 1411*c* is incident on a polarization beam splitter (PBS) 1581. The polarization axis 132 of light (P-polarized light or S-polarized light) which passes through the light separating surface 1582 of the PBS 1581 is aligned with the transverse electric field generation direction 133 of the display panel 22. The light reflected by the light separating surface 1582 is reflected by a mirror 1552*a*. Then, the polarization axis B2 is rotated 90° by a half-wave plate 1741 and is emitted from the half-wave plate 1741. On the incident side of the projection lens 1415, polarization means (polarizing plate 131 or PBS) is arranged. The polarization axis 132 of the polarization means is nearly aligned with the polarization axis 132 emitted from the half-wave plate 1741.

The light emitted from the PBS 1581 is divided into R, G, and B light by dichroic mirrors 1611*a* and 1611*b*. The R light, G light, and B light are modulated by display panels 22 respectively arranged in the optical paths of R, G, and B light. The modulated R light, G light, and B light are synthesized by dichroic mirrors 1611*c* and 1611*d*. The synthesized light is projected on an enlarged scale onto a screen (not shown) by a projection lens 1415.

Thus, in the projection type display of the present invention, if the display panel 22 of the present invention is employed and also polarized light is incident on the display panel 22, satisfactory display contrast can be realized. Note that practical display contrast is sufficiently realizable without the polarizing plate 131.

FIG. 175 is a constitution diagram of a projection type display in another embodiment of the present invention. Light emitted from alight emitting lamp 1411*a* is separated into P-polarized light and S-polarized light by a polarization beam splitter (PBS) 1581. Now, suppose that the light transmitted through the light separating surface 1582 of the PBS is P-polarized light and the reflected light is S-polarized light. The P-polarized light is transmitted through an R filter 1751*a*, and only R light passes through the filter. On the other hand, the S-polarized light adjusts the optical path lengths of the liquid crystal display panels 22*a* and 22*b* by a relay lens 1413. The S-polarized light is reflected by a mirror 1552*a*, and only B light is transmitted through a B filter 1751*b*. The R light is incident on a liquid crystal display panel 22a, and the B light is incident on a liquid crystal display panel 22b. In the case where the half-wave plate 1741 is arranged on the exit side of the PBS 1581, the transverse electric field generation directions 133 of the liquid crystal display panels 22a and 22b may be the same. However, in the case where there is no half-wave plate, the transverse electric field generation directions 133 are different 90° from each other. For example, in the liquid crystal display panel 22a, the transverse electric field wire 17 is formed parallel to the gate signal line, and in the liquid crystal display panel 22b, the transverse electric field wire 17 is formed parallel to the source signal line 15. Also, in the constitution of FIG. 10, even if the polarization directions of incident light components are different from each other, the same display contrast can be maintained high.

The light modulated by the display panel 22 is reflected by a mirror 1522 and is incident on a reflection type prism 1752. As an example of the reflection type prism 1752, a reflecting mirror is formed on an isosceles triangular prism. The light reflected by the prism 1752 is incident on the polarizing plate 131 and is projected on an enlarged scale onto a screen 1501 by a projection lens 1415.

The display panel 22a modulates red light, and the image is projected onto the screen 1501. On the other hand, the display panel 22b modulates blue light, and the image is projected onto the screen 1501. Therefore, the two red and blue images are displayed on the screen 1501. If these images are viewed with eyeglasses having a red filter on one lens and a blue filter on the other, three-dimensional display can be viewed. Of course, it is necessary that a video input to the display panel 22a and a video input to the display panel 22b should be set so that a three-dimensional image is obtained when photographed with a camera.

In the case where the filter 1751 is not present, a color filter may be mounted on the liquid crystal display panel 22. In the case where the half-wave plate 1741 is not present, three-dimensional color display can be observed with eyeglasses in which polarization axes are different 90° between the right and left lenses.

In the aforementioned projection type display, polarization means is arranged on the incident side of the liquid crystal display panel 22 so that polarized light is incident on the panel 22. However, it is a matter of course that practical image display is sufficiently realizable without the polarization means. These embodiments will hereinafter be described in sequence.

FIG. 176 is a constitution diagram of a projection type display of the present invention. 1611a is a dichroic mirror (BDM) for reflecting B light, 1611b is a dichroic mirror (GDM) for reflecting G light, and 1611c is a dichroic mirror (RDM) for reflecting R light. The arrangement of the dichroic mirrors 1611a to 1611c is not limited to the order shown in FIG. 176. It is a matter of course that the last RDM 1611c may be replaced with a total reflection mirror.

The film thickness of the liquid crystal layer 21 of the liquid crystal display panel 22c for modulating R light is constituted so that it is thicker than the film thicknesses of the liquid crystal layers 21 of the liquid crystal display panels 22a and 22b for modulating G light and B light. Also, depending on the wavelength of light to be modulated, the average particle diameter of the waterdrop-like liquid crystal or the average hole diameter of the polymer network is varied. If the wavelength of light to be modulated becomes longer, the aforementioned average particle diameter or average hole diameter is enlarged. The reason for this is that a longer wavelength shows the tendency that a scattering characteristic is reduced and therefore contrast becomes low. This should hold in the aforementioned embodiments. 1415 is a projection lens and 1762 is an aperture as a lens aperture. The aperture 1762 is illustrated to explain the operation of the projection type display. Since the aperture 1762 prescribes the focused angle of the optical projection system, it is considered to be included in the function of the optical projection system. In other words, if the F value of the optical projection system is great, the diameter of the aperture 1762 can be considered to be small. To obtain high contrast display, it is preferable that the F value of the optical projection system be great. However, if it becomes great, the brightness of white display will be reduced. Specifically, the aperture is not employed, but the function of the aperture 1762 is included in the function of the projection lens 1415.

FIG. 177 shows a perspective view of the arrangement shown in FIG. 176. 1771 is a field lens. Unnecessary parts for explanation, such as relay lens 1761, are not given. If the optical system of FIG. 177 is arranged as an optical block 1551 in the cabinet 1535 shown in FIG. 155, a projection TV can be constituted.

A description will hereinafter be described of the operation of the projection type display of the present invention. Since modulation systems for R, G, and B light are nearly the same, a description will be made of the modulation system for B light.

White light is emitted from the light source 1411, and the B light component of the white light is reflected by the BDM 1611a. This B light is incident on the liquid crystal display panel 22a. The light scattered by the liquid crystal display panel 22a is shut out by the aperture 1762a. Conversely, collimated light, or light within a predetermined angle is passed through the aperture 1762a. Modulated light is projected on an enlarged scale onto the screen 1501 by the projection lens 1415a. In the aforementioned manner, the B light component of an image is displayed on the screen 1501. Similarly, the liquid crystal display panel 22b modulates the G light component, and the liquid crystal display panel 22c modulates the R light component, whereby a color image is displayed on the screen 1501.

In FIG. 176, three liquid crystal display panels 22 are employed. As shown in FIG. 163 or 178, if a single liquid crystal display panel with three display areas is employed, the projection type display can be made structurally simple.

The liquid crystal display panel 22 shown in FIG. 163 or 178 has three display areas (B, G, and R) on a single array substrate 12. In other words, it has three display areas formed with pixel electrodes in the form of a matrix. As shown in FIG. 178, three counter substrates 11 may be employed. Alternatively, a single counter substrate 11 may be employed with respect to three display areas. Gate source drive circuits 492 are formed or arranged on the left side of the display area B and on the right side of the display area R. Source drive circuits 491 are formed or arranged with respect to the display areas, respectively.

The gate drive circuit 492a is connected to an odd-numbered gate signal line, and an even-numbered gate signal line is connected to the gate drive circuit 492b. The gate signal lines 492 connected in this manner can prevent a horizontal brightness fluctuation in a display image which is caused by the delay of signals to the gate signal lines 492. The horizontal brightness fluctuation occurs because the voltage near the output of the gate drive circuit 492 and the voltage on the signal line end differ from each other due to the resistance of the gate signal line when viewed at a certain time. In the arrangement of FIG. 178, although there is the possibility that brightness fluctuation in the form of a comb will occur in the R and B display areas, there is no possibility that the brightness fluctuation is visually recognized.

FIG. 179 is a constitution diagram of a projection type display employing the liquid crystal display panel of FIG. 178 as a light valve. This constitution can shorten the distance k between the display areas shown in FIG. 178 and reduce the size of the optical block. In addition, since three display areas can be positioned at the same time, focusing adjustment can be performed at high speeds.

Although FIGS. 176 and 179 show a method of enlarging and projecting an image on the screen 1501 by three projection lens 1415. There is a method of enlarging and projecting an image on the screen 1501 by a single projection lens 1415. The constitution diagram is shown in FIG. 180.

For making explanation easy, 22b denotes a liquid crystal display panel which displays an image of G light. 22a denoted a liquid crystal display panel which displays an image of R light, and 22c denotes a liquid crystal display panel which displays an image of B light. A light source 1411 and the position in which a display panel 22 is disposed are separated by a separation wall 1801. This is for preventing the degradation of the display panel due to heat generated by the light source 1411. A dichroic mirror 1611a reflects R light and transmits G light and B light. A dichroic mirror 1611b reflects G light and B light. A dichroic mirror 1611c transmits R light and reflects G light. A dichroic mirror 1611d transmits R light and G light and reflects B light.

Light emitted from light generation means 1411a is reflected by a total reflection mirror 1552a and is varied in direction. The optical path of the reflected light is separated into three optical paths of R.G.B lights by the dichroic mirrors 1611a and 1611b. R light is incident on a field lens 1771a, G light is incident on a field lens 1771b, and B light is incident on a field lens 1771c. Each field lens 1771 focuses each light and directs the focused light to each liquid crystal display panel. The liquid crystal display panel 22 varies the orientation of the liquid crystal 21 in accordance with a video signal, thereby modulating light. The thus modulated R light, G light, and B light are synthesized by dichroic mirrors 1611c and 1611d and are enlarged and projected onto a screen 1501 by a projection lens 1415.

FIG. 181 is a constitution diagram of an embodiment of a reflection type projection display. To make explanation easy, a liquid crystal display panel for modulating R light is represented by 22a, a liquid crystal display panel for modulating G light by 22b, and a liquid crystal display panel for modulating B light is represented by 22c.

In FIG. 181 a dichroic mirror 1611 serves as a color synthesizing system and a color separating system. White light emitted from a light source is turned by a plano mirror 1552 and is incident on the first group 1415b of a projection lens 1415. The half value of the band of an ultraviolet-ray and infrared-ray (UVIR) cut filter 1411c is 430 to 690 nm. The band of light will hereinafter be expressed by a half value. A dichroic mirror 1611a reflects R light and transmits B light and G light. The reflected R light is band limited by a dichroic mirror 1611c and is incident on the liquid crystal display panel 22a. The band of the incident R light is assumed to be 600 to 690 nm. On the other hand, a dichroic mirror 1611b reflects B light and transmits G light. The reflected B light is incident on the liquid crystal display panel 22b, and the R light is incident on the liquid crystal display panel 22a. The band of the incident B light is 430 to 490 nm. The band of the incident G light is 510 to 570 nm. These light bands are also true of other projection type displays of the present invention. Each liquid crystal display panel 22 forms an optical image as the change of the scattering state in accordance with a video signal. The optical images formed by the liquid crystal display panels 22a, 22b, and 22c are color synthesized by the dichroic mirrors 1611. The synthesized image is incident on the projection lens 1415 and projected on an enlarged scale onto a screen 1501.

The dichroic mirror 1611 functions a filter which reflects (or transmits) light of a specific wavelength. For example, the dichroic mirror 1611b reflects light of a specific wavelength when light from the light source 1411 is incident on the liquid crystal display panel 22b, and also reflects light of a specific wavelength when light reflected by the liquid crystal display panel 22b is incident on the projection lens 1415.

A single dichroic mirror 1611 reflects light twice when it is incident on and emerges from the liquid crystal display panel 22. In the constitution of FIG. 181, the wavelength band of light is limited twice by a single dichroic mirror 1611. In other words, the dichroic mirror 1611 serves as a secondary filter. As compared with the dichroic mirror 1611 of FIG. 180, the cut-off characteristic of limiting the band of light is conspicuous. For this reason, there is no overlap in the bands of light incident on the liquid crystal display panel 22. Therefore, color reproducibility becomes satisfactory and high-quality image display can be realized.

In addition, since the dichroic mirror 1611 has both a color separating function and a color synthesizing function, a reduction in the size of the projection type display can be realized.

In the reflection type projection display panel of the present invention shown in FIG. 181, attention must be given to the direction of light incident on the light separating surface and the direction of light emerging from the light separating surface. Specifically, the constitution of FIG. 181 needs to be arranged as shown in FIG. 182. In other words, the constitution of FIG. 181 is merely shown for making illustration and explanation easy. The reason why the constitution of FIGS. 181 should be arranged as shown in FIG. 182 is as follows:

In the case of the constitution shown in FIG. 181, the optical axis 1811a of the light arriving from the light source 1411 at the liquid crystal display panel 22 differs in the angle of light incident on the dichroic mirror 1611 from the optical axis 1811b of the light going from the liquid crystal display panel 22 to the screen 1501 through the projection lens 1415. The dichroic mirror 1611 is formed by depositing a dielectric multilayer film on a glass substrate and transmits or reflects light having a specific wavelength band. This type of dichroic mirror 1611 has the property that the spectral characteristic is shifted due to incident light angle dependency. Therefore, as shown in FIG. 181, when the optical axis 1811a and the optical axis 1811b are incident at different angles, the spectral characteristic for color separation and the spectral characteristic for color synthesis differs from each other, it is difficult to obtain a projected image with a desired color purity.

In the case of the constitution of FIG. 182, the optical axis 1811a of the light going from the light source 1411 and the optical axis 1811b of the light going from the Liquid crystal display panel 22 to the projection lens 1415 are symmetrical with respect to a plane including both the center normal line of the liquid crystal display panel 22 and the center normal line of the light separating surface of the dichroic mirror 1611. Therefore, the incident angles to the light separating surface can be made equal to each other. Therefore, since the spectral characteristic after color separation and the spectral characteristic after color synthesis are the same, a projection image displayed on the screen 1501 can obtain a desired color purity.

As evident in the aforementioned description, the advantage of the projection type display of FIG. 182 is that color purity is satisfactory when a reflection type liquid crystal display panel utilizing natural light is employed and that display of a projected image can be easily realized with excellent color evenness.

The dichroic mirrors 1611a and 1611b are formed by depositing a dielectric multilayer film on a glass substrate, the dielectric multilayer film consisting of low refractive index layers and high refractive index layers alternately stacked with one another. Both the color separating surface and the color synthesizing surface are arranged at an angle of 45° to the light modulating layers 21 of the liquid crystal display panels 22a, 22b, and 22c.

Light emitted from a lamp 1411a is reflected by a cold mirror 1552a and a mirror 1552 and is incident on dichroic mirrors 1611a and 1611b in sequence. The light incident on the dichroic mirrors 1611a and 1611b is separated into three primary color light: R, G, and B light. The R light, G light, and B light are incident on three corresponding liquid crystal display panels 22a, 22b, and 22c. The reflected light is again incident on the dichroic mirrors 1611a and 1611b. The R light, G light, and B light are synthesized by the dichroic mirrors 1611a and 1611b. The synthesized light is transmitted through an aperture and then is projected on an enlarged scale onto the screen 1501 by the projection lens 1415.

In the light incident on the liquid crystal display panels 22a, 22b, and 22c, the light incident on a pixel being in a scattering state is scattered. The greater part of the scattered light is shut out by the aperture of the projection lens 1415 or the interior wall of a lens barrel (not shown) and is obtained as black display. On the other hand, light incident on a pixel being in a non-scattering state is regularly reflected. The regularly reflected light is transmitted through the aperture of the projection lens 1415 and a lens group constituting the projection lens 1415 and arrives at the screen 1501 as white display. In this manner, the optical images, modulated as a scattering mode and a non-scattering mode on the liquid crystal display panels 22a, 22b, and 22c, are displayed onto the screen 1501 as a projected image.

In the constitution of FIG. 182, the plane including both the optical axis 1811a of the light emitted from the light source 1415 and the optical axis 1811b of the light reflected by the liquid crystal display panel 22 is arranged perpendicular to the plane including both the center normal line of the liquid crystal display panel 22 and the center normal lines of the dichroic mirrors 1611a and 1611b. Therefore, the plane including the optical axis 1811a and the optical axis 1811b forms an angle of 45° with the color separating and synthesizing surfaces of the dichroic mirrors 1611a and 1611b. Therefore, both the light emitted from the light source and the light reflected by the liquid crystal display panel are incident on the dichroic mirrors 1611a and 1611b at angle of 45°.

The spectral transmittances of the dichroic mirrors 1611a and 1611b are shown in FIGS. 183(a) and (b). FIG. 183(a) shows spectral transmittance in the case where light is incident on the dichroic mirror 1611a at an angle of 45°. The dichroic mirror 1611a is of the type which reflects R light and transmits G and B light. FIG. 183(b) shows spectral transmittance in the case where light is incident on the dichroic mirror 1611b at an angle of 45°. The dichroic mirror 1611b is of the type which reflects B light and transmits G light.

According to this embodiment, the spectral characteristic for color separation and the spectral characteristic for color synthesis are the same. Therefore, the spectral characteristics shown in FIGS. 183(a) and (b), as they are, can be reflected on a projected image.

For comparison, a description will hereinafter be made of the case where a display is constituted as shown in FIG. 183 by employing the same dichroic mirror as the embodiment of FIG. 183. If it is assumed that the optical axis 1811a of the light going from the light source to the liquid crystal display panel 22 (hereinafter referred to as illumination light) is incident on the liquid crystal display panel 22 at an angle of 5°, the optical axis 1811a of the illumination light and the optical axis 1811b of the light going from the liquid crystal panel 22 to the screen (hereinafter referred to as projection light) form an angle of 10°. The incident angle of the illumination light to the dichroic mirrors 1611a and 1611b is 40°, and the incident angle of the projection light to the dichroic mirrors 1611a and 1611b is 50°. The spectral transmittance in the case of incident angle 40° and the spectral transmittance in the case of incident angle 50° are shown in FIGS. 184(a) and (b). FIG. 184(a) shows the spectral transmittance of the dichroic mirror 1611a and FIG. 184(b) the spectral transmittance of the dichroic mirror 1611b. In the figures, a solid line represents the case where the incident angle of light is 40° and a dotted line the case where the incident angle of light is 50°. From FIGS. 184(a) and (b) it is found that the spectral characteristic of the illumination light and the spectral characteristic of the projection light differ considerably from each other due to incident angle dependency and therefore it is difficult to obtain a desired color purity without reducing light efficiency of utilization.

Similarly, the technical idea that the incident angles of the projection light and illumination light to the dichroic mirror 1611 are taken into consideration, as it is, is applicable to other reflection type projection displays. It is a matter of course that the technical idea is also applicable in the case where a dichroic prism to be described later is employed.

FIG. 185 is a block diagram of a projection type display which performs color separation and color synthesis by employing a dichroic prism 1591. The dichroic prism 1591 has two light separating surfaces 1582a and 1582b. The light separating surfaces 1582 separate white light into R, G, and B light. Liquid crystal display panels 22 are mounted on the dichroic prism 1591 through optical coupling layers 371. In other words, the liquid crystal display panel 22 is optically coupled to the dichroic prism 1591 by the optical coupling layer 371. The ineffective area of the prism 1591 (that effective light for image display does not pass through) is coated with a light absorbing film 1132.

Assume in FIG. 185 that a liquid crystal display panel 22c modulates R light and a light separating surface 1852a reflects R light. Incident light is reflected at the light reflecting surface 1582a and is incident on the light modulating layer 21 of a liquid crystal display panel 22a. The light incident on the light modulating layer 21 is scattered according to the magnitude of voltage applied to a pixel electrode 14. The light not scattered is again reflected at the light separating surface 1852a and becomes outgoing light. The greater part of the scattered light is incident on a light absorbing film 1132 formed on the ineffective area of the prism 1591 and is absorbed. In this manner, the greater part of light scattered at the liquid crystal layer 21 is absorbed by the light absorbing film 1132. Therefore, there is no possibility that scattered light becomes outgoing light. Since the operations of the liquid crystal display panels 22c and 22b are the same as the liquid crystal display panel 22a, a description thereof is not given.

Note that the light absorbing film 1132 is formed with the same material as the light shielding film 152 formed on the TFT 155. Also, a black pigment, or a pigment and dyes in the relation of a complementary color to the light modulated by the liquid crystal display panel 22 may be coated. Also, the ineffective area may be roughened so that it is in a slightly opaque state. In addition, a black plate may be pasted.

The constitution, in which the liquid crystal display panel 22 is optically coupled to the prism 1591 and also a light absorbing film is formed or arranged on the ineffective area of the prism 1591, is also applicable to constitution of FIG. 71.

FIG. 187 shows the constitution in which liquid crystal display panels 22a and 22b are optically coupled to a prism 1591a and also a liquid crystal display panel 22c is optically coupled to a triangular prism 1591c.

If a dichroic mirror is employed in an image forming system, it is difficult to position the dichroic mirror in a case because the dichroic mirror 1611 is flat in shape. A slight inclination in the dichroic mirror 1611 causes the positional offset between three optical images formed on the display panels 22 to occur on a screen. Also, a change with the passage of time (warp, etc.) will easily come to occur. In addition, the positional offset between three images formed on display panels 22 will easily come to occur. In the constitution of FIG. 187, a change with the passage of time is difficult to occur and the position of a formed image can be easily adjusted. If the light scattered at the liquid crystal display panel 22 is absorbed by the light absorbing film 1132 formed on the surface of prism 1591, the return of light to the liquid crystal layer 21 and the occurrence of secondary scattered light can be prevented. This effect is the same as FIG. 185 and therefore a description thereof is not given. It is a matter of course that if the display panel 22 and the prism 1591 is constituted as a single optical component, an adjustment process can be considerably shortened without adjusting the position of the liquid crystal display panel 22.

The illumination system of FIGS. 187 and 188 is constituted with a relay lens 1871. Also, a concave mirror 1411b employs an elliptical mirror. If done in this way, the F value of illumination light can be raised =and display contrast can be enhanced.

In FIG. 188, three liquid crystal display panels 22 are attached to an L-shaped prism 1591. In comparison with the constitution of FIG. 187, only a single prism is required. In addition, adjustment of a formed image is easy and the position adjustment of the liquid crystal display panel 22 is entirely unnecessary. Since the light absorbing film 1132 can be formed over a wide range, the occurrence of secondary scattered light is low and extremely satisfactory display contract can be realized.

A description will next be made of a method which further enhances display contrast, while maintaining high brightness display in a projection type display. FIG. 189 shows a first embodiment for realizing the aforementioned method. A projection lens 1415 is constituted by a front lens group 1891b and a rear lens group 1891a. An output lens 1897 and the rear lens group 1891b cause lens apertures 1896 and 1898 to be conjugate with each other.

An input lens array 1894 is constituted by disposing a plurality of input lenses 1899 in two-dimensional form. An example of the constitution is shown in FIG. 190. Ten input lenses 1899 with a rectangular opening are disposed so as to be inscribed in a true circle. The ten input lenses 1899 are flat-convex lenses with the same opening shape, and the ratio between the long side and short side of the rectangular opening is 4:3.

Similarly, a central lens array 1895 is constituted by disposing a plurality of central lenses 1900 in two-dimensional form. The central lenses 1900 correspond in number to the input lenses 1899 and have the same opening as the input lens 1899. The central lenses 1900 are disposed in the same way as the input lens array 1894.

The illumination procedure in the projection type display will be described. Light emitted from the illuminant 1892 of a metal halide lamp 1411a is reflected by a parabolic mirror 1411b. The reflected light goes nearly parallel to an optical axis 1416 and is incident on the input lens array 1894. Since the sectional form of light emitted from the parabolic mirror 1411b generally forms a true circle, the input lens array 1894 is constituted so that the total sum of openings of the input lenses 1899 are inscribed in the true circle. The light transmitted through the input lens array 1894 is divided into partial light beams corresponding in number to the input lenses 1899. The partial light beams illuminate the display area of a PD liquid crystal display panel 22.

The light transmitted through the input lens 1899 is guided to the corresponding central lens 1900 and collected. The opening of each central lens 1900 is provided with a secondary illuminant (e.g., 1901A and 1901B shown in FIG. 189). A plurality of secondary illuminants 1901 formed on the central lens array 1895 is schematically shown in FIG. 191 by way of an example. Each central lens 1900 effectively transmits its corresponding light to the display area of the PD liquid crystal display panel 22. Specifically, the real image 1893 of an object (e.g., 1902A and 1902B shown in FIG. 189) on the principal plane of a corresponding input lens 1899 is formed near the display area of the liquid crystal display panel 22. In this case, the central lenses 1900 are suitably eccentric to each other so that a plurality of images are superimposed and form a single real image 1893.

According to the aforementioned constitution, the display area of the PD liquid crystal display panel 22 and the opening of each input lens 1899 nealy are conjugate with each other. Therefore, if the opening of the input lens 1899 is formed into a shape similar to the display area of the PD liquid crystal display panel 22, the section of illumination light will be adjusted to the display area, whereby loss of light can be suppressed. Therefore, it is preferable that the input lens array 1894 shown in FIG. 190 be combined with the PD liquid crystal display panel 22 which displays an image having an aspect ratio of 4:3 corresponding to NTSC.

Light, emitted from a concave mirror such as a parabolic mirror, generally has a relatively great brightness fluctuation. If light with a great brightness fluctuation, as it is, is transmitted and illuminates the PD liquid crystal display panel 22, an evenness in the brightness of a projected image will be reduced. If only an area with relatively even brightness is illuminated, light not utilized will be increased and therefore light efficiency of utilization will be reduced. On the other hand, the projection type display of the present invention has the advantage that high light efficiency of utilization can be obtained and also a projected image with an excellent evenness in brightness can be obtained. The reasons will hereinafter be described.

The input lens array 1894 divides light having a great brightness fluctuation into a plurality of partial light beams. The brightness fluctuation of each partial light beam on the opening of the input lens 1899 is small compared with the brightness of the section of a light beam before division. The central lenses 1895 enlarge partial light beams having less brightness fluctuation to a suitable size. The enlarged partial light beams are superimposed on the PD liquid crystal display panel 22. Therefore, satisfactory illumination with even brightness can be realized.

Since the total sum of openings of the input lenses 1899 are inscribed in the cross section of an incident light beam, the loss of light at the input lens array 1894 is small. In addition, since the opening of each central lens 1900 is sufficiently larger than the secondary illuminant 1901, the loss of light at the central lens array 1895 is small. Furthermore, because the section of light incident on the PD liquid crystal display panel 22 is adjusted to the shape of the display area, the loss of light at the PD liquid crystal display panel 22 is small. Therefore, the greater part of light emitted from the illuminant 1892 is reflected by the parabolic mirror 1411*b* and arrives at the projection lens 1415 through the input lens array 1894, central lens array 1895, output lens 1897, and the PD liquid crystal display panel 22. Therefore, if the loss of light at the projection lens 1415 is suppressed, high light efficiency of utilization can be realized and a projected image with an excellent evenness and the brightness can be obtained.

Incidentally, since a plurality of secondary illuminants 1901 are dispersedly formed on the central lens array 1895, the effective F number of illumination light in this case needs to be determined from an angle of irradiation converted equivalently from the total area of the secondary illuminants 1901. On the other hand, the converging angle of light, emitted from the liquid crystal display panel 22 at the greatest angle to the optical axis 1416, becomes a value greater than this equivalent angle of irradiation. Therefore, in order to suppress loss of light, the effective F number of the projection lens 1415 needs to be made smaller than the effective F number of illumination light. Because this reduces the contrast of a projected image in the case of a PD liquid crystal display panel, there is a problem.

On the other hand, in the projection type display of this embodiment, the opening on the side of illumination light and the opening on the side of the projection lens 1415 can be made in a necessary and minimum size without increasing loss of light by the lens apertures 1896 and 1898, and consequently, contrast reduction can be suppressed. Specifically, the lens aperture 1896 on the side of illumination light is formed into a shape such as that shown in FIG. 192 in accordance with the effective areas of the secondary illuminants 1901 dispersedly formed. A broken line represents the opening of each central lens 1900 of FIG. 191. Also, since the real image of the secondary illuminant 1901 is formed on the opening of the lens aperture 1898 present on the side of the projection lens 1415, the shape of the opening of the lens aperture 1898 is made equal to that of the lens aperture 1896. Therefore, since light transmitted through the lens aperture 1896 passes through the lens aperture 1898, high light efficiency of utilization can be realized. At the same time, the projection lens 1415 provides a necessary and minimum opening necessary for illumination light, so a display image with high contrast can be realized. As a consequence, a projected image with brightness and high quality can be provided, so great advantages are obtainable.

In the projection type display of the present invention, the input lens array 1894, the central lens array 1895, the lens aperture 1896, and the lens aperture 1898 are even better if they are constituted as follows: FIG. 193 shows the constitution of the central lens array 1895 in this case. In general, the size of the secondary illuminant 1901 will become larger if the position of the input lens 1899 approaches the optical axis. Therefore, the openings of the central lenses 1900 do not always need to be the same. It will be sufficient if the opening of the central lens 1900 has a necessary and sufficient size with respect to the secondary illuminant 1901. If the central lens array 1895 is constituted so that a plurality of central lenses 1900 with openings effectively different from each other are condensed and disposed, there is an advantage of reducing the total sum of the opening areas. The input lens array 1895 which is combined with the central lens array 1899 is constituted in the same manner as that shown in FIG. 192. The input lenses 1899 are suitably eccentric to each other, and the secondary illuminant 1901 is formed in the opening center of the corresponding central lens 1900.

In this case, a lens aperture 1898 with an opening shape shown in FIG. 194 is employed instead of the lens aperture 1896 provided on the illumination light side. Likewise, the lens aperture with an opening shape shown in FIG. 194 is employed instead of the lens aperture 1898 provided on the projection lens side. This arrangement has the advantages that there is no loss of light, also the aperture diameter of the central lens array 1895 can be reduced, and the lens diameter of the projection lens 1415 can be reduced.

As previously described, the projection type display of this embodiment has even greater advantages in the case where a plurality of secondary illuminants are dispersedly formed to illuminate the display panel 22. Even if the projection lens 1415 whose maximum converging angle is great is employed, a necessary and minimum opening with respect to light emerging from the display panel 22 can be provided, because a plurality of openings are dispersedly formed in a lens aperture. As a result, this embodiment can obtain a projected image having brightness and high contrast.

FIG. 199 shows a modification of the projection type display shown in FIG. 189 and is a constitution diagram of a projection type display which performs full color display with three PD liquid crystal display panels 22. For the following embodiment, a difference with the first embodiment will mainly be described. In FIG. 198, three PD liquid crystal display panels 22 corresponding to three primary colors are employed. A parabolic mirror 1411*b*, an input lens array 1894, a central lens array 1895, and an output lens 1897 are the same as those shown in FIG. 189. The display areas of the PD liquid crystal display panels 22*a*, 22*b*, and 22*c* are illuminated in the same procedure as FIG. 189. In this embodiment, illumination light is divided into three primary color light components by a dichroic mirror 1611*a*, a dichroic mirror 1611*b*, and a piano mirror 1552*b*. The three primary color light components are guided to the corresponding PD liquid crystal display panels 22.

In accordance with an external video signal, optical images corresponding to three primary colors are formed on the display areas of the PD liquid crystal display panels 22, respectively. A projection lens 1415 is constituted by a front lens group 1891*b* and a rear lens group 1891*a* and projects, on an enlarged scale, the optical images of three primary colors onto a screen 1501. The optical paths of the optical images are synthesized to a single optical path by a dichroic mirror 1611*c*, a dichroic mirror 1611*d*, and a plano mirror 1552*c*. As a result, a projected image with full colors is obtained.

A lens aperture 1896 on the illumination light side and a lens aperture 1898 on the projection lens side are the same as those shown in FIG. 189 and employed for the same purpose. The output lens 1897 and the rear lens 1891*b* are positioned so the lens apertures 1896 and 1898 are conjugate with each other. Since the operation is the same as the aforementioned description, a description thereof is not given.

A flat-concave lens 1311*b* is coupled by a transparent adhesive agent to the exit side of the PD liquid crystal display panel 22 with the concave surface directed to the exit side. A light absorbing film 1132 is coated on the side surface of the flat-concave lens 1311*b*, and an antireflection film is deposited on the concave surface. The flat-concave lens 1311*b* is formed from acrylic resin by a molding process. In the molding process, since the same lens can be made with a metal mold, better productivity is obtained.

A positive lens 1311*a* is arranged in close proximity to the exit side of the concave lens 1311*b*. The radius of curvature of the convex surface of the positive lens 1311*a* is equal to that of the concave surface of the concave lens 1311*b*. A thin air gap is equiped between the convex surfaces of both lens. Both surfaces of the positive lens 1311*a* are deposited with an antireflection film as in the flat-concave lens 1311*b*. With a combination of the concave lens 1311*b* and the positive lens 1311*a*, an optical image on the liquid crystal layer 21 is projected onto the screen 1501 by the projection lens 1415. The focusing adjustment of a projected image is performed by moving the projection lens 1415 along an optical axis 1416.

The optical characteristic of the PD liquid crystal display panel 22 does not strongly depend on the incident angle of light as compared with a TN liquid crystal display, but, in the case where the incident angle is too great, the optical path length of light being passed through the liquid crystal layer 21 becomes longer and therefore the scattering characteristic varies. In other words, if the incident angle of light to the PD liquid crystal display panel 22 varies depending on a place on the panel 22, the image quality of a projected image will become uneven. On the other hand, if the radius of curvature of the concave surface of the concave lens 1311*b* is attempted to be reduced, it is necessary that converging light with a great converging angle should be incident on the PD liquid crystal display panel 22 or the effective diameter of the projection lens 1415 should be increased. The former has the disadvantage that a projected image becomes uneven in quality, because image quality is not even depending on a place on the PD liquid crystal display panel 22. The latter has the disadvantage that an increase in the size of the projection lens 1415 results in high cost. In the case where the scattering characteristic of the PD liquid crystal display panel 22 is strongly dependent on an incident angle, if the concave lens 1311*b* and the positive lens 1311*a* are combined together as shown in FIGS. 198 and 199, nearly collimated light can be incident on the PD liquid crystal display panel 22 without increasing the size of the projection lens 1415, and consequently, an evenness in the image quality of a projected image is easily assured.

In FIGS. 198 and 199, the transparent type liquid crystal display panel 22 is employed as a light valve. The technical idea of enhancing display contrast with the lens aperture 1896 of FIG. 189 is also applicable to a reflection type projection display. An example thereof is shown in FIG. 200.

FIG. 200 shows an embodiment in which a reflection type PD liquid crystal display panel is applied as a light valve. Note that the concave lens 1311*b* is not limited to the shape of a concave lens. For example, it may be flat in shape.

In the reflection type projection display, a lens aperture 1898 is arranged so as to correspond to the upper half portion of a projection lens 1415. The lower half portion of the projection lens 1415 is employed for the optical path of incident light. The rest constitution has already been described in the aforementioned embodiments and therefore a description thereof is not given.

FIG. 201 shows the constitution where a prism 2011 is employed in an optical system for color separation and color synthesis. Since the constitution of the prism of FIG. 201 has been adopted in the CCD portion of a business video camera, a description thereof is omitted. Although the display panel 22 employs a PD liquid crystal display panel, it may be a digital micromirror device (DMD) developed by Texas Instrument.

A further description will be made of a projection type display having the lens arrays 1894, 1895, 1896, and 1898 of FIGS. 189, 198, and 200. A projection type display such as this is called a discrete opening display.

FIG. 195 is a graph showing the relation between a scattering gain G with a PD liquid crystal display panel and a drive voltage V for maintaining transmittance to more than 90%. The scattering gain G is expressed by the following equation:

$$G = \frac{\pi B}{E} \qquad \text{[expression 38]}$$

where E is the illuminance of the light incidence surface of the light modulating layer 21 obtained when light is irradiated on the PD liquid crystal display panel, B is the brightness of the light modulating layer measured from the light exit surface (or light incidence surface) in the normal direction of the light modulating layer, and π is the ratio of the circumference of a circle to its diameter.

A smaller scattering gain G shows a better scattering characteristic, and high contrast display can be performed. However, as shown in FIG. 195, the drive voltage also becomes high. Conversely, if the scattering gain G is great, the drive voltage (V) will become low, but display contrast will also become low. The drive voltage (V) considerably relates to the design of the driver circuit 541, particularly the source driver circuit 491. The maximum value of the drive voltage (absolute value of voltage applied to the pixel electrode 14) is believed to be 10 (V) considering the withstand voltage of the driver circuit. When the drive voltage is 10 (V), the scattering gain G is 0.7 to 0.8. If the scattering gain G is low, the drive voltage will become low and a problem with the driver design will be eliminated. However, display contrast becomes considerably worse. As described later, the scattering gain G needs to be 3 or less. Therefore, the scattering gain of the PD liquid crystal display panel needs to meet the following equation:

$$0.5 \leq G \leq 3.0 \qquad \text{[expression 39]}$$

It is preferable that the scattering gain G meet the following equation:

$$0.7 \leq G \leq 2.0 \qquad \text{[expression 40]}$$

In a discrete opening display, when the diagonal length of the display area of the display panel 22 is represented by D (inch) and the arc length of the light emitting lamp 1411*a* by L (mm), the relation of the effective F number of an optimum projection lens is shown in FIG. 196. This F number is a value when the rate of utilization of the pupil of a projection lens becomes maximum (optimum). In other words, it is a value when the projected light beam on a screen begins to reduce, while the arc length of a certain lamp and the F number of a projection lens are gradually raised. As shown in FIG. 196, as a value of D/L is increased, the F number of a projection lens becomes great. As the F number becomes small, display contrast is reduced. On the other hand, if the F number becomes great, optical path length will become long and the projection type display will become too large. As one standard, F number should be between 5 and 12.

FIG. 197 shows the relation between D/L and display contrast. Scattering gain G as a variable is 0.7, 1, 2, and 3.

In the case of a projection television, the display contrast needs to be 150 or more. To obtain a contrast of 150, in a graph of FIG. 197, D/L is 1.0 when scattering gain G=0.7 to 0.9. The F number at that time is 5 in a graph of FIG. 196. When the scattering gain is low (G=2 to 3), D/L is 2.0 in a graph of FIG. 197. The F number at that time is 12 in a graph of FIG. 196.

In other words, considering the drive voltage of the liquid crystal layer 21, the design of the driver 491, the design of the projection lens, and the system size, in a discrete opening display the F number needs to meet the following condition:

$$5 \leq F \leq 12 \quad \text{[expression 41]}$$

Considering the effective diagonal length D (inch) and the effective arc length L (mm), the F number needs to meet the following condition:

$$1.0 \leq \frac{D}{L} \leq 2.0 \quad \text{[expression 42]}$$

As shown in FIG. 197, display contrast is a function of scattering gain. Considering the scattering gain G, an necessary relation with F number needs to meet the following equation:

$$\frac{3DG}{2L} \leq F \leq \frac{4DG}{L} \quad \text{[expression 43]}$$

If the aforementioned relations are met, a discrete opening display can realize satisfactory image display.

If a projected image is displayed in a bright room by a projection type display, the contrast will be reduced by external light. In that case it will be sufficient if a polarization screen 2031 is employed in a screen 1501. The polarization screen 1501 is formed by pasting a reflecting sheet to the back surface of a polarizing plate.

In order to perform satisfactory image display by the polarization screen, the polarization axis 132 of the polarization screen 2031 needs to be aligned with the polarization axis 132 of light to be projected.

Hence, as shown in FIG. 141, in the projection type display of the present invention, a polarizing plate is arranged between the screen 2031 (object onto which light is projected) and the display panel 22. In FIG. 141, the polarizing plate is indicated by a dotted line 1414a or 1414b. This polarization means is provisionally called a rotary filter 1414.

FIG. 202 shows a plan view of the rotary filter 1414. The rotary filter 1414 is constituted so that it is rotatable on a center of rotation 2023, and a range of about ¼ is cut away. On the surface a polarizing plate 131 is pasted. The polarization axis 132 of the polarizing plate 131 has a direction shown in FIG. 202. A dotted line represents a range that light emitted from the display panel 22 passes through the projection lens 1415. This range is called a light transmission range.

The direction of the polarization axis 132b of the polarization screen 2031 is not always constant. There are cases where the direction varies depending on products. For example, as shown in FIG. 203, there are cases where the polarization axis 132b is arranged in a vertical direction. As shown in FIG. 204, there are cases where the polarization axis 132b is arranged in a horizontal direction. As shown in FIG. 205, there are cases where the polarization axis 132b is arranged in an oblique direction.

As shown in FIG. 203, when the polarization axis 132b of the polarization screen 2031a is arranged in a vertical direction, the rotary filter 1414 is rotated so that the polarization axis 132a of the light transmission range 2022 is in the vertical direction. The rotary filter 1414 may be rotated manually,, or automatically with a motor. As shown in FIG. 204, when the polarization axis 132b of the polarization screen 2031a is arranged in a horizontal direction, the rotary filter 1414 is rotated so that the polarization axis 132a of the light transmission range 2022 is in the horizontal direction. As shown in FIG. 205, when the polarization axis 132b of the polarization screen 2031a is arranged in an oblique direction, the rotary filter 1414 is rotated so that the polarization axis 132a of the light transmission range 2022 is in the oblique direction.

Thus, in the projection type display of the present invention, if the rotary filter 1414 is rotated, the polarization axis 132a of the light transmission range 2022 can be aligned with the polarization axes 132b of all polarization screens 2031. As shown in FIG. 206, when a screen 1501 is not a polarization screen (when it has no polarization axis), or when contrast is not required but bright image display is required, the cutout of the rotary filter 1414 not formed with a polarizing plate is employed as a light transmission range 2022. Since the light transmittance of the polarizing plate is about 40%, more than twice high-brightness display can be performed, by arranging the rotary filter 1414 as shown in FIG. 206.

FIG. 207 shows another embodiment of the rotary filter 1414. In the rotary filter 1414 shown in FIG. 207, the half portion has a polarizing plate pasted thereon, the ¼ portion has no polarizing plate, and the remaining ¼ portion has a correction filter 2072 pasted thereon.

The correction filter 2072 is inserted in an optical path in accordance with the color of light emitted from a lamp 1411a. When a metal halide lamp is employed as the light emitting lamp 1411a of a projection type display, the correction filter 2072 is employed as a correction filter for reducing G light. In other words, it is employed as a correction filter for narrowing the band of G light. When a projection type display is employed as a data projector, color reproducibility does not matter but brightness is required. However, when a video image is displayed, color reproducibility becomes a problem. Hence, when displaying a video image, the correction filter 2072 is inserted and arranged in an optical path.

The metal halide lamp 1411a usually has a great rate of G light, as shown in a spectral distribution of FIG. 147. In the case where it is employed as a data projector, there will be no problem even if an image is greenish. However, in the case of a video image, there is a need to reduce G light. The correction filter 2072 is employed as a filter for reducing G light. The correction filter 2072 can be easily fabricated with resin or glass containing a color. It may also be formed from a dielectric multilayer film. While the color purity of a display image can also be corrected by a video signal which is applied to the display panel 22, circuit cost is increased. If it can be changed by the correction filter 2072, the change can be easily performed and cost will also become cheap.

If the light transmission range 2022 is in a C area, the polarization axis 132 is in a vertical direction. If it is in a D area, the polarization axis 132 is in a horizontal direction. Also, if the light transmission range 2022 is in a B area, a bright image suitable for a data projector can be displayed. If the light transmission range 2022 is in an A area, color is corrected and optimum color reproducibility suitable for a video image is obtained. While the rotary filter 1414 is rotated on the rotational center 2023, it does not necessarily need to be rotated. For example, a polarizing plate or a correction filter may be constituted so that it can be inserted at the position 1414a or 1414b of FIG. 141 indicated by a dot line. In other words, a polarizing plate or correction filter 2072 may be constituted so that it can be inserted in the optical axis 1416 as needed. In the case where the light emitting lamp 1411a consists of a halogen lamp, it is a matter of course that the correction filter 2072 shown in FIG. 207 is employed as a filter for reducing red light, because there is a great rate of red light.

FIG. 208(a) shows a plan view of a rotary filter 1414 according to another embodiment, and FIG. 280(b) is a sectional view of the rotary filter 1414. The rotary filter 1414 consists of four areas A, B, C, and D having a polarizing sheet 131 pasted thereon and an area E formed with a light shielding film 2081.

The light shielding film 2081 is formed on a transparent substrate 2082. As the light shielding film 2081, there is a black color, a metal sheet, or a thin metal film. The aforementioned polarizing sheet 131 is pasted onto the light shielding film 2081. Note that the light shielding film 2081 and the light polarizing sheet 131 may be arranged in reverse order.

The rotary filter 1414 rotates through 90° at an interval of one field (one frame). In other words, the polarization axis 132 of the light transmission range 2022 is changed 90° in synchronization with one field (one frame). FIG. 209 shows an explanatory diagram of the operation of the projection type display of the present invention. An observer views an image present on the screen 1501 with polarization eyeglasses 2091 where the polarization axes of the left and right lenses are different 90°. Note that the screen 1501 is not a polarization screen.

As shown in FIG. 209(a), if the rotary filter 1414 is rotated and the polarization axis 132 is caused to be in a vertical direction at the first field (first frame), then a display image on the screen 1501 will be seen only on the right eye. At this time, the display panel 22 displays a display image for the right eye. At the second field (frame) next to the first field (frame), the rotary filter 1414 is rotated as shown in FIG. 209(b), and if the polarization axis 132 is caused to be in a horizontal direction, then a display image on the screen 1501 will be seen only on the left eye. At this time, the display panel 22 displays a display image for the left eye.

As described above, if the rotation of the rotary filer 1414 is synchronized with the display image of the display panel 22, the eyes of an observer will see a display image, switching the left eye and the right eye. If the display image is a three-dimensional image, the observer can perform stereoscopic vision.

Note that a light shielding film 2081 is employed to hide an image when the left eye and the right eye are switched. When no obstacle occurs in display, of course the light shielding film 2081 does not need to be formed.

It is specific to the PD liquid crystal display panel 22 that the direction of the polarization axis 132 can be varied by rotation of the rotary filer 1414 in the aforementioned manner. The reason for this is that the PD liquid crystal display panel 22 is a display panel which modulates natural light. In the case of a TN liquid crystal display panel, the polarizing sheet 131 is indispensable for light modulation, so there is no possibility that the polarization axis 132 on the polarizing sheet 131 on the exit side is rotated.

In the aforementioned embodiment, the rotary filter 1414 is arranged between the screen (onto which light is projected) and the display panel 22. However, the rotary filter 1414 may be arranged on the incident side of the display panel 22. The reason for this is that if the liquid crystal layer 21 of the display panel is in a light transmitting state when polarized light is incident on the display panel 22, the state of polarization is maintained. However, in the scattering state, since a polarization state is not maintained, sometimes there is effect reduction, but there is no practical problem. The reason for this is that a pixel performs black display in a scattering state. In white display, a polarization state is maintained, so an image with high display contrast can be displayed on the polarization screen 2031. Satisfactory three-dimensional display can also be performed. Therefore, the rotary filter (means of rotating a polarization axis) is arranged between the exit end of the lamp 1411b and the screen.

In FIG. 208, although the rotary filter 1414 is rotated on the rotational center 2023 and also the light transmission range 2022 is arranged above the rotational center 2023, the present invention is not limited to this arrangement. As shown in FIG. 222, it is a matter of course that the light transmission range 2022 may be arranged with the rotational center 2023 as center. As the rotary filter 1414 is rotated 90°, the direction of the polarization axis 132 is changed 90°. In this case, although the light shielding film 2081 can not be formed as shown in FIG. 208, the size of the rotary filter 1414 is reduced, whereby saving of space can be realized.

In FIGS. 203 and 208, while the rotary filter 1414 is employed to vary the direction of the polarization axis 132 which is incident on the screen, the present invention is not limited to this arrangement. As shown in FIG. 227, it may be replaced with a TN liquid crystal display panel 22a. A polarizing sheet or a polarization beam splitter is arranged on the exit side of the display panel 22a so that polarized light is incident on the TN liquid crystal display panel 22a. The TN liquid crystal display panel 22a rotates the polarization axis through 90° by applying voltage. Therefore, if the TN liquid crystal display panel 22a is switched between a voltage applied state and a no-voltage applied state, the polarization axis can be varied 90°. As described above, if the direction of the polarization axis of the TN liquid crystal display panel 22a is automatically or manually switched at one field (frame), it can be aligned with the direction of the polarization axis 132 of the polarization screen 2031. In addition, three-dimensional display can be realized. The TN liquid crystal display panel 22a of FIG. 227 does not need to form pixel electrodes. It will suffice if a TN liquid crystal is interposed between two electrodes. The TN liquid crystal display panel 22 may be replaced with a PLZT display panel.

In the aforementioned embodiment, while a description has been made of a projection type display which is employed in a transmission type display panel, the present invention is also applicable to a reflection type. In this case, the rotary filter 1414 is arranged on the incident side of the reflection type display panel.

Furthermore, in the aforementioned embodiment, although the rotary filter 1414 is rotated or the TN liquid crystal display panel 22a is employed to rotate or vary the direction of the polarization axis, it is a matter of course that the same advantage will be obtainable even if the aforementioned device is fixed and also the screen 2031 is rotated.

Also, although it has been described that the rotary filter 1414 is manually rotated, it is a matter of course that it may be rotated with a motor. The rotary filter 1414 does not always need to be rotated on the rotational center 2023. The rotary filter 1414 may be fitted into a rotatable circular frame (not shown).

In addition, it is beneficial if the rotational angle is previously set and the light transmission range 2022 is previously set so that it is caused to be in the state of FIG.

203 if button 1 is depressed, in the state of FIG. 204 if button 2 is depressed, and also in the state of FIG. 206 if button 3 is depressed.

FIG. 223 is a block diagram when a rotary filter 1414 is applied to a view finder. A rotary filter 1414 such as that shown in FIG. 222 is arranged at the A or B position between the eye 2231 of an observer and a display panel 22. As previously described, in the case where a polarization state is maintained, the rotary filter 1414 may be arranged between a light source 2181 and the display panel 22.

Polarizing eyeglasses 2091 (or a polarizing plate) is arranged between the eye 2231 of an observer and the rotary filter 1414. If the rotation of the rotary filter 1414 and the display image of the display panel 22 are synchronized with each other, the observer can view a three-dimensional image.

Although the embodiment of FIG. 223 employs the lamp-shaped light source 2181, a surface light source 2241 may be employed as shown in FIG. 224. The surface light source 2241 emits light from the surface thereof by the principles of fluorescence. It is manufactured, for example, by Sanyo Electric. Also, a bar-shaped fluorescent tube may be arranged within a box and a light scattering plate arranged on the light exit surface. In addition, the rotary filter 1414 may employ that shown in FIG. 202 or 207. If the correction filter 2072 is detachable from an optical axis, the color correction of a display image can also be performed. In that case it will be sufficient if color glass can be inserted in an optical axis instead of the rotary filter 1414 shown in FIG. 202, FIG. 207, or FIG. 222. The color glass employs one sold by HOYA or Shiguma Khoki.

Although the rotary filter 1414 is arranged on the light exit side of the display panel 22, the present invention is not limited to this arrangement. For example, it may be arranged between the light source 1411 and the display panel 22, or directly behind the light source 1411. Since the rotary filter 1414 is employed to narrow the wavelength band of light or polarized light in the optical path 1414, it can exhibit its effect even if it is arranged at any position in the optical path 1416.

In the case where the concave mirror 1411b of the light source 1411 is large in size, if the rotary filter 1414 is arranged directly behind the light source 1411 (e.g. at a position indicated by a dot line 1414c in FIG. 141), there is the advantage that the size of the optical system is reduced. The concave mirror 1411b becomes large in size when the diagonal length of the display area of the display panel 22 is smaller than the diameter of the concave mirror 1411b.

The rotary filter 1414 is relatively large in size (wide in area). When the concave mirror 1411b is large in size, if the rotary filter is arranged directly behind the exit side of the concave mirror 1411b, the rotary filter 1414 will not be a hindrance and therefore the optical system can be made compact. To prevent the rotary filter 1414 from being heated, it is preferable that an infrared-ray cut filter should be arranged on the light incidence side of the rotary filter 1414, or an infrared-ray reflecting film consisting of a dielectric multilayer film should be formed on the back surface of the rotary filter 1414.

The rotary filter 1414 may be coated with three primary colors (R, G, and B) in addition to those shown in FIGS. 202, 207, and 208. If this rotary filter of three primary colors is employed, color display can be realized by driving a single monochromatic display panel in time-division. The RGB filter may be formed with a dielectric multilayer film. Since a dielectric multilayer film does not absorb light, there is no possibility that it will be heated and therefore it is a suitable material. Also, a correction filter 2072 is preferred to be formed with dielectric multilayer.

Note that if the light shield film (BM) 202 of the display panel is likewise formed with a dielectric multilayer film, it will not absorb incident light. For this reason, the case where the display panel is heated is reduced, and consequently, light with even stronger strength is incident on the display panel. As a result, the projection type display of the present invention can realized high brightness display. Also, the color filter consisting of a dielectric multilayer film may be constituted by forming a dielectric multilayer film on a glass substrate for each R, G, and B, cutting into a predetermined shape, and by pasting it on a transparent disc such as polycarbonate.

The rotary filter 1414 can be constituted even if it is of a reflection type. For example, it can be fabricated by coating a circular aluminum disc with a color filter consisting of R, G, and B (or cyanogen, magenta, and yellow).

It is preferable that the surface of the rotary filter 1414 be given an electrostatic prevention process to prevent the occurrence of static electricity. For example, the surface is covered with resin containing a number of hydraphilic groups. Also, the rotary filter 1414 is formed with irregularities on an area that effective light for display does not pass through. This is for reducing friction between the rotary filter 1414 and air. This employs the principle that the flight distance of a golf ball can be extended if the surface of the ball is formed with irregularity.

The display panel of the present invention is not adoptable only in the light valve of a projection type display, but it is also adoptable, for example, in a display employed in a video camera it is called a view finder . A description will hereinafter be made of an embodiment where the display panel 22 of the present invention is adopted as the light valve of a view finder.

FIG. 218 shows a perspective view of the view finder of the present invention. FIG. 219 shows a sectional view of FIG. 218. A condenser lens 2183 and a display panel 22 are arranged interiorly of a body 2186. An eyepiece 2185 is arranged interiorly of an eyepiece ring 2184. 2181 denotes a light source employing a fluorescent tube. Light radiated by the light source (fluorescent tube) 2181 is emitted from the center hole 2189 of an aperture 2182 which is a light shielding plate. Since the body 2186 and the eyepiece ring 2184 absorb unnecessary light, the interior surfaces are painted black or a dark color. The light source 2181 which is a fluorescent tube may employ a light-emitting diode (LED) or a fluorescent device (VFD). Also, it can employ a surface light source. On the incident side or exit side of the display panel 22 a polarizing plate 131 may be arranged.

As an example, the diagonal length D of the display area of the display panel 22 is about 18 mm, the effective diameter of the condenser lens 2183 is 20 mm, and the focal distance is 15 mm. The condenser lens 2183 is a flat-convex lens, and the flat side is directed to the side of the light emitting device 2181. Note that the condenser lens 2183 and the eyepiece 2185 may be replaced with Fresnel lenses. If Fresnel lenses are employed, the view finder can be reduced in volume and weight.

Light radiated at a wide solid angle from the light source (light emitting device) 2181 is converted to nearly collimated light having narrow directivity by the condenser lens 2183 and is incident on the side of the counter substrate of the display panel 22. An observer brings his eyes into close contact with an eyepiece rubber 2187 and views a display image on the display panel 22. In other words, the position of the pupils of the observer is nearly fixed. When it is assumed that all pixels of the display panel 22 cause light to go straight, the condenser lens 2183 is positioned so that the light, radiated from the light source (light emitting device) 2181 and incident on the effective area of the condenser lens 2183, is transmitted through the eyepiece 2185 and incident on the pupils of the observer. In this manner, the observer can zoom and view a small display image on the display panel 22.

In the view finder, since the position of the pupils of the observer is nearly fixed by the eyepiece rubber 2187, the light source arranged on the back side may be narrow in directivity. In a conventional view finder employing a light box which employs a bar-shaped fluorescent tube as a light source, only light traveling from an area of nearly the same size as the display area of the display panel at a small solid angle in a certain direction is utilized and light traveling in the other directions is not utilized. In other words, the light rate of utilization is very low.

The present invention employs a light source whose illuminant is small, and light radiated at a wide solid angle from the illuminant is nearly collimated by the condenser lens 2183. The light emerging from the condenser lens 2183 becomes narrow in directivity. If the visual point of an observer is fixed, even the aforementioned light having narrow directivity can be sufficiently used in the view finder. If the size of the illuminant is small, inevitably the consumption power will be reduced. Thus, the view finder of the present invention makes use of the fact that an observer fixes its visual point and views a display image. Although a direct liquid crystal display panel usually requires a certain visual field angle, a view finder will serve its purpose if a display image can be satisfactory observed in a predetermined direction. Note that the view finder and video camera of the present invention are both fixed to a video camera (not shown) by a mounting bracket 2188.

If the insertion degree of the eyepiece ring 2183 into the body 2186 is adjusted, focusing adjustment can be performed according to the eye sight of an observer. Since the position of the eyes of the observer is fixed by the eyepiece rubber 2187, there is little possibility that the visual point position will be moved during use of the view finder. If the visual point is fixed, the observer can view a satisfactory image even if the directivity of light to the liquid crystal display panel 22 is narrow. To view an even better image, the direction in which light is radiated from the light source (light emitting device) 2181 needs to be moved in an optimum direction.

FIG. 220 is a sectional view of a fluorescent tube according to an embodiment of the light source (light emitting device) 2181 employed in the view finder of the present invention. As shown in FIG. 220, the fluorescent tube has a miniature lamp shape as its exterior appearance. 2201 denotes a casing consisting of glass, and the diameter is 2.4 to 10 mm. 2203 denotes a filament. If a voltage of about 4 to 8 V is applied to the filament 2203, it will be heated. 2204 is an anode, and the applied DC voltage is about 15 to 25 V. The anode voltage accelerates electrons emitted by heating the filament 2203. The casing 2201 has mercury molecules (not shown) enclosed therein, and if the aforementioned accelerated electrons impinge on mercury molecules, ultraviolet rays will be emitted. These ultraviolet rays excite an illuminant 2202, which in turn emits visual light. As such an illuminant (light emitting device) 2181, there is a fluorescent tube (Lunar light 05 series) manufactured by Minipairo Electric. Also, there is a 2.4-mm-diameter light source manufactured by Tohoku Electronics.

The light source is driven by a pulsed signal so that a quantity of light to be radiated can be adjusted. The frequency of the pulsed signal is 30 Hz or more, preferably 60 Hz or more. If a pulsed voltage signal is applied to the anode 2204, the emission quantity can be varied in proportion to the pulse width.

As shown in FIG. 220(b), if a light shielding film 2205 is formed on the casing 2201, the light radiating area of the illuminant 2181 will be reduced. Therefore, this illuminant will not require an aperture (light shielding plate) 2182 such as that shown in FIG. 219.

The lamp 2181 of FIG. 220 is a hot-cathode light emitting tube. For this reason, the brightness will be reduced if outside temperature is low. As a measure to counter brightness reduction, it is preferable that the casing 2201 consist of two layers, an inner casing 2201a and an outer casing 2201b, as shown in FIG. 221. The space between the inner and outer casings 2201a and 2201b forms a layer of air or a vacuum. The lamp is mounted on a substrate 2211 through a rubber connector 2212. The connector 2212 is fitted in a hole formed in the substrate 2211. The terminals of the lamp are soldered to the substrate 2111.

As described above, the view finder of the present invention efficiently focuses the light emitted at a wide solid angle from the light emitting body having a small light source (light emitting device) 2181 by the condenser lens 2183. Therefore, the consumption power of the light source can be considerably reduced in comparison with the case where a back light consisting of a surface light source employing a fluorescent tube is employed.

In FIG. 219, although the display panel 22 of the present invention is applied to a view finder, it is also applicable to a video monitor as shown in FIG. 225. FIG. 225 shows a sectional view of the video monitor.

Light emitted from a light source (light emitting lamp) 2181 is transmitted through an aperture 2182. The transmitted light is reflected by a mirror 1552 and is directed to a display panel 22. The reason why light is reflected by the mirror 1552 is for shortening the depth of the video monitor. The reflected light is incident on a Fresnel lens 2183 which is a condenser lens, and it is nearly collimated by the lens. The nearly collimated light is incident on the display panel 22, which in turn modulates the incident light in accordance with a video signal. The display panel 22 has a transparent substrate 1311 mounted thereon to prevent the occurrence of secondary scattered light, thereby enhancing display contrast.

The display panel of the present invention is also applicable to a direct vision type display. The direct vision type display is shown in FIG. 226. White light radiated from a bar-shaped fluorescent tube 2262 is reflected by a reflecting sheet 2263, or it is incident directly on a light guiding plate 2261. As an example of the reflecting sheet 2263, there is polyester film deposited with silver. The relation between the thickness $d_2$ of the light guiding plate 2261 and the diameter $d_1$ of the fluorescent tube 2262 is $d_2 > 2d_1$ and $3d_2 < 4d_1$. In this range, the quantity of incident light on the light guiding plate 2261 is increased and the light rate of utilization is raised.

The surface of the light guiding plate 2261 is formed with diffusing points. Light incident on the diffusing points is emitted from the light guiding plate 2261. On the light guiding plate 2261 a prism sheet 1061 is arranged. Two prism sheets may be arranged. The prism sheet 1061 has a function of narrowing the directivity of light.

Polarizing plates 131a and 131b are arranged on the incident side and exit side of the display panel 22 so that they cross each other. In other words, the polarization axes 132a and 132b of the polarizing plates 132a and 132b are arranged so as to cross each other. The display panel 22 employs a PD liquid crystal display panel and displays an image in a normally white mode.

A description will next be made of the fact that a dynamic image on a liquid crystal display panel becomes dim while displaying.

As a cause of degrading an image displayed by a liquid crystal projector, there is a phenomenon that a screen becomes dim while displaying a dynamic image. This cause is considered as follows:

1. The response time of a liquid crystal is slow.
2. Memory holds an electric charge on a pixel all during a 1-field (1-frame) period.

For the response time of a liquid crystal in the aforementioned item 1, the rise time+fall time of a TN liquid or a PD liquid crystal is about 30 msec (when panel temperature is 30° C. or more). If a 1-frame period is 1/60=16 msec, the response time of the liquid crystal will follow sufficiently. The aforementioned item 2 becomes a problem. A CRT writes data by an electronic beam and makes peak brightness high, thereby performing display for the remaining time. For this reason, black-and-white display is clear, the responsibility is fast, and there is no problem with high quality display. On the other hand, a liquid crystal hold a certain brightness all during a 1-frame period and displays an image with an average brightness. For this reason the response time is felt to be slow during a display of dynamic image.

FIG. 216 is a block diagram used to explain a circuit which improves response time during dynamic-image display. Conceptually, a black screen is displayed between the display periods of a first image and a second image. The display method is conceptually shown in FIG. 215. Although a letter of F is displayed on a screen for making explanation easy, actually a natural image is displayed.

As shown in FIG. 215(a), an image F is first displayed from the upper portion of a screen 1613. FIG. 215(b) shows the state as the display of the image F is ended. Then, as shown in FIG. 215(c), black display is performed from the upper portion of the screen (display area or display image) 1631. FIG. 215(d) shows the state when the black display is ended. In other words, image display (natural image) and black display are alternately performed. Note that for the method of driving the liquid crystal display panel 22, a 1-H inverting drive method or a 1-column inverting method is a suitable one, because there is no occurrence of cross talk.

If the ratio between a period A for performing image display and a period B for performing black display is 1:1, circuit constitution will become simple and the design of X and Y driver circuits will also become easy. In other words, image signals held in memory are read out at double speed and then they are sequentially written to the liquid crystal display panel 22. The aforementioned ratio is not limited to 1:1. It is a matter of course that the black display period B may be shortened. Also, while black display is performed on the liquid crystal display panel 22 during the black display period, the present invention is not limited to this. For example, dark level (gray color or middle level) display or white display may be performed. Such display will hereinafter be referred to as raster display. In addition, a natural image with a reduced brightness may be displayed.

As shown in FIG. 216, a video signal SIG is converted to digital data by an A/D conversion circuit 2161 and held in the storage means of F memory (field memory or frame memory) 2162. On the other hand, a raster-display setting circuit 2163 sets the display brightness level of the black display period B. The raster-display setting circuit 2163 outputs a natural image as needed. A double-speed read circuit 2164 reads out data from the F memory 2162 at the first half (image display period A) of the first frame (field) period and then writes an image to the liquid crystal display panel 22 at double speed. Based on a value set by the raster-display setting circuit 2163, raster display is performed on the liquid crystal display panel 22 at the second half (black display period B) of the first frame period.

In FIG. 215, although natural image display and black display are alternately performed, natural images and black images may be displayed one by one, or a plurality of horizontal lines at a time. A single horizontal line or a set of a plurality of horizontal lines will hereinafter be referred to as a display line set. For example, in FIG. 217(a), raster display is performed. That is, natural images are displayed from the upper portion of the screen by display line sets and also black images are displayed by display line sets indicated by oblique lines. This display line set will be referred to as a black line set. FIG. 217(b) shows the state when writing of one screen is ended. In FIG. 217(c), a black line set is written from the upper portion of the screen and then natural images are written to a display line set. This operation is performed in sequence, and writing of one screen is ended in FIG. 217(d).

Even in the aforementioned drive method of FIG. 217, black display (raster display) is performed in the frame (field) next to a natural image and therefore the responsibility of a dynamic image is improved. Particularly, in interlace scanning display (e.g., NTSC), if a display line set is regarded as a single horizontal line, the drive method of FIG. 217 can be easily realized. In other words, a signal supplied in an interlace scanning fashion is written at double speed to the display panel and then black display is written at a line next to natural image display. This operation is repeatedly performed.

The drive method and drive circuit shown in FIGS. 215 through 217 have been described with regard to the liquid crystal display panel 22. However, the present invention is not limited to the panel 22 but is applicable to all dot matrix display panels. The dot matrix display panel holds the brightness of a pixel during a constant period (frame or field period). Of course, this holding includes holding in a constant state as in the liquid crystal display panel 22. In addition, holding a certain brightness on a pixel by average pulse modulation (e.g., PWM modulation) during a 1-frame or 1-field period is believed to be included in the technical idea of the present invention. The reason for this is that the holding method performs a predetermined display by a combination of pulses and differs a CRT method in which display is performed by peak brightness. Since a predetermined brightness is displayed during a 1-frame period by pulse drive (e.g., PWM modulation), it is believed that an electric charge is held on a pixel.

Therefore, the drive method of the present invention is technically applicable to a reflection type digital micromirror device (DMD and DLP) developed by Texas Instrument and a plasma display (PDP). In addition, it is applicable to an organic EL display, an LED display, an inorganic EL display, a fluorescent tube, and a FED. If these dot matrix displays (other than a CRT method employing an electric gun) employ the drive method of the present invention, the response time during dynamic-image display is improved. Furthermore, the technique of the present invention is also applicable to a flat CRT (CFP) developed by Matsushita Electronic.

The aforementioned dynamic-image dimming is also improved by the constitution shown in FIG. 210. 2101 denotes a drum-shaped(cylindrieal) object. Within the drum 2101 a display panel 22 is arranged. The drum 2101 rotates on a rotational center 2023 in a direction of arrow. The drum 2101 is formed with light shielding portions 2102 and light transmitting portions 2103, which are alternately arranged. Incident light travels along an optical axis 1416 and is modulated by the display panel 22. The modulated light is projected onto a screen by a projection lens 1415. Lenses 1413 are arranged so that a display image on the display panel 22 is projected onto the screen.

FIG. 211 shows the drum 2101 viewed from the side of the projection lens 1415. As the drum 2101 is rotated, the light shielding portion 2102 of the drum 2101 shuts out a display image (screen) 1631. FIG. 211(a) shows the state as the upper portion of the display image 1631 is shut out by the light shielding portion 2102. FIG. 211(b) shows the state as almost all of the screen 1631 is shut out by the light shielding portion 2102.

A further description will be made in reference to FIG. 212. It is assumed for simplicity that a letter of "F" is displayed at the first frame and a letter of "A" is displayed at the next frame. Assume that in FIG. 212(a) a letter of "F" has completely been displayed and then it has been projected on the screen by the projection lens 1415. In other words, light is passing through the light transmitting portion 2103 of the drum 2101. As the drum 2101 is rotated, the screen 1631 is shut out by the light shielding portion 2102 from the upper portion as shown in FIG. 212(b). At this time, a letter of "A" is written to the display panel 22 from the upper portion of the screen. In other word, the next frame is displayed on the display panel in synchronization with the speed at which the light shielding portion 2102 is rotated. In the state of FIG. 212(d), the screen is completely shut out by the light shielding portion 2102 and also a letter of "A" is displayed. Then, as the light shielding portion 2102 is rotated, the letter "A" is displayed.

From the aforementioned description, 1 frame (field) is displayed by a set of the light shielding portion 2102 and the light transmitting portion 2103. Therefore, if the area of the light shielding portion 2102 is the same as the light transmitting portion 2103, an image will be displayed for half a 1-field period. Note that the area ratio between the light shielding portion 2102 and the light transmitting portion 2103 does not need to be 1:1. If the area of the light shielding portion is reduced, the brightness of a projected image will be raised. However, dynamic-image dimming becomes difficult to be improved.

The brightness of point B on the screen in FIG. 212 is indicated by a dotted line in FIG. 213. In other words, it becomes dark in the light shielding portion and becomes light in the light transmitting portion. That is, brightness of the point B repeats light-darkness-light-darkness. If the drum 2101 is not present, constant brightness will be obtained as shown by a solid line.

If light and darkness are repeated in the aforementioned manner, peak brightness display can be falsely expressed as in a CRT and therefore it is believed that dynamic-picture dimming is improved.

It is a matter of course that this embodiment, as with the embodiment of FIG. 216, is also applicable to other display panels.

The method of shutting out an image from the upper portion of a screen and also displaying an image from the upper portion one after another can be realized by a display panel shown in FIG. 214.

The display panel of FIG. 214 is constituted by liquid crystal layers 21a and 21b. The liquid crystal layer 21a is interposed between a pixel electrode 14 and a counter electrode. The liquid crystal layer 21b is interposed between the counter electrode and electrodes 421 in the form of stripes. Each of the stripes-shaped electrode 421 corresponds to one line of pixel electrodes 14. The liquid crystal layer 21a displays a natural image by active matrix drive, while the liquid crystal layer 21b performs simple matrix drive. If voltage is applied to the stripes-shaped electrodes 421, the PD liquid crystal layer 21 will be caused to be in a light transmitting state. If no voltage is applied, the PD liquid crystal layer 21 will be caused to be in a scattering state and will perform black display. When an image on the liquid crystal layer 21a is displayed, the liquid crystal layer 21b is caused to be in a scattering state. If the stripe-shaped electrodes 421 are scanned, it is clear that the image shown in FIG. 212 can be displayed. Therefore, dynamic-picture dimming can be improved.

In FIG. 214, although the liquid crystal layer 21b for performing a light shielding operation and the liquid crystal layer 21a for performing image display are formed on a single liquid crystal panel, the present invention is not limited to this arrangement. For example, a display panel 22a having a liquid crystal layer 21 for performing a light shielding operation and a display panel 22b having a liquid crystal layer 21 for performing image display are fabricated, and the two display panels 22a and 22b are pasted together or arranged in close proximity to each other. In this manner, the image display method of FIG. 212 can be realized.

FIG. 214 shows the liquid crystal panel 22 which has a plurality of liquid crystal layers 21 consisting of a PD liquid crystal layer 21b and another liquid crystal layer 21a (e.g., a TN liquid crystal layer). Note that the liquid crystal layer 21a may be a PD liquid crystal layer. Although this display panel is effective as a light valve, the present invention is not limited to the light valve. The liquid crystal panel can also be employed as a direct vision display panel.

The display panel 22 of FIG. 214 is a display panel which has two liquid crystal layers, an active matrix display panel (liquid crystal layer 21a) and a simple matrix display panel (liquid crystal layer 21b). The simple matrix display panel is a display panel provided with electrodes in the form of stripes and displays an 8-segment number and a simple symbol such as ○ and x.

In FIG. 214, while only the counter electrode 25 is formed between the liquid crystal layers 21a and 21b, the present invention is not limited to this arrangement. The counter electrode 25 may be formed on a substrate formed from glass or resin. In the display panel of the present invention, the liquid crystal layers 21a and 21b are arranged between the array substrate 11, the substrate 25 formed with a counter electrode, and the substrate 12.

When voltage is applied to pixels arranged in the form of a matrix, the liquid crystal layer 21a displays an image. The liquid crystal layer 21b displays numbers and symbols. When the liquid crystal layer is in a scattering state, the numbers and symbols are displayed white. Also, if voltage is applied, the upper liquid crystal layer will become transparent and the image on the lower liquid crystal layer 21a will be directly seen. In other words, in the display panel of FIG. 214, superimposed images can be seen by the two liquid crystal layers. For example, a TV dynamic image displayed on the liquid crystal 21a is covered with smoke by the liquid crystal layer 21b. 8 segments can be employed to display time white (of course, time may be colored). In addition, mosaic display can be performed on a portion of display.

It is a matter of course that the drive methods shown in FIGS. 120, 215, 217, and 216 are applicable to the projection type display, direct vision display panel (device), and view finder of the present invention. If they are applied, dynamic-image responsibility will be improved and high-quality image display can be performed.

As described above, the matters described in the specification of the present invention are applied mutually. For example, the display panels of FIGS. 1 and 15 are combined together. The constitution of FIG. 112 is applied to FIG. 1. The fabrication methods of FIGS. 74 and 76 are applied as a method of fabricating the display panels of FIGS. 1 and 15. The display panel of the present invention is applied to the projection type display of the present invention. The driver circuits described in FIGS. 124, 125, and 126 are applied to the display panels of FIGS. 1, 15, 27, and 28. The matters related to the arrangement of the polarizing plate of FIG. 13 are applied to the displays of FIGS. 153, 164, 219, and 226. The display panel of the present invention is employed in the display of FIG. 226. The display panel of the present invention is applied to a view finder.

In FIG. 84(d) the light scattering layer 841 may contain material which absorbs black or light, such as paints, pigments, and dyes. If these are contained, black in a display image will sink and therefore high quality display will be obtained.

Also, instead of containing paints, pigments, and dyes, these may be coated or deposited on the surface of the substrate 642 or 12. Chrome oxide such as sexivalent chrome may be deposited. The substrate surface may be chemically processed to form irregularities on the surface. These constitutions can also enlarge a visual field angle. In addition, black in a display image can be displayed more black, and high-quality display can be realized.

Similarly, even if the irregularity film 821 of FIG. 82 and the transparent resin film 962 of FIG. 112 contain titan powder or contain the aforementioned dyes and pigments, the same advantages will be obtainable.

Also, if the microlens 641, prism 671, or optical coupling agent 691, shown in FIGS. 68 and 69, is colored with dyes or pigments, the band of incident light onto the mixed solution 315 can be limited and therefore satisfactory phase separation can be performed.

In the microlens arrays of FIGS. 96, 100 and 101, the transparent resin film 962 may employ polyvinyl alcohol (PVA). In addition, it may employ thermosetting type epoxy resin, 2-solution setting type resin (resin for a principal agent and a setting initiator), and silicon resin. Among these resins, the transparent resin film 962 employs resin whose transmittance is high and whose contraction ratio is relatively high during setting.

The microlens substrate 642 (e.g., FIG. 95) may be arranged on the exit side of the display panel.

In the Fresnel lenses 641c and 641 and prism sheet 1061 shown in FIGS. 105 and 106, a single Fresnel lens 641c or 641 may be arranged for a plurality of pixels. To improve a visual field angle, a single Fresnel lens 641c or 641 may be arranged over the entire display area of the display panel 22. If the direction of incident light onto the display panel is suitably aligned with the position of the eyes of an observer, an image on the display panel 22 can be satisfactorily observed. Although the microlens substrate 642 and Fresnel lenses 641c and 641 differ in shape, they have the same function.

In the Fresnel lenses 641c and 641 and prism sheet 1061 shown in FIGS. 106 and 108, it is preferable that the flat side be directed to the display panel. The reflectance of incident light onto the aforementioned lenses is reduced, and irregular reflection of light is suppressed. As a result, high-quality display can be realized. Also, it is preferable that the surface of the aforementioned substrate 642, microlens, or prism should be formed with an antireflection film.

As an example, the antireflection film is constituted by a low refractive index layer, the layer being stacked with fluorine-contained polymer particles whose average particle diameter is in a range of 5 to 200 nm and also being formed with microvoids between particles. Also, there is a photo-setting resin whose refractive index is 1.35 to 1.45. In addition, the antireflection film may be formed from a dielectric multilayer film.

While it has been described that the PD liquid crystal is mainly employed as the liquid crystal layer 21 of the transmission display panel or reflection display panel of the present invention, the invention is not limited to this. It may be an STN liquid crystal, a TN liquid crystal, a guest-host liquid crystal, a ferroelectric liquid crystal, a homeotropic liquid crystal, a liquid crystal which has comb electrode constitution and performs light modulation by varying the angle of orientation of a liquid crystal molecule in a horizontal direction (fabricated by Hitachi), and a plasma address liquid crystal (fabricated by Sony). Also, depending on the constitution of a display panel, the PD liquid crystal is applicable to an organic EL display panel, an inorganic EL display panel, a plasma display panel, and an LED display panel. The same may be said of the projection type display, the view finder, the direct vision display, the fabrication method, the drive method, and the drive unit.

The Fresnel lens (or a microlens) 641 may be a concave lens or a convex lens. The lens is set so that it is suitable to the position at which an observer sees. Also, the Fresnel lens 641 of FIG. 106 may be a reflection type Fresnel lens. The reflection type Fresnel lens is formed by processing a metal plate.

In FIG. 95, although the color filter 151 is arranged on the exit side of the microlens 641, it may arranged on the incident side. In other words, light emitted from the color filter 151 is transmitted through the microlens 641 and incident on the liquid crystal display panel. The microlens 641 may be of a semicylindrical type. A colored microlens 641 and the color filter 151 may be formed integrally with each other.

In the specification of the present invention, in consideration of a display panel having no pixel electrode, a pixel electrode itself has been described, for example, as a pixel electrode 14, and a pixel in a wide sense, including a type having no pixel electrode, has been described, for example, as a pixel 14.

As evident in the aforementioned description, the present invention has the advantage that display contrast can be even further enhanced in comparison with prior art.

In the display panel of the present invention, since the color filter is formed after the phase separation of the liquid crystal layer, the phase separation of the PD liquid crystal layer can be performed under an optimum condition, and satisfactory display contrast can be realized. Since the color filter is formed under the pixel electrode 14, ultraviolet rays can be irradiated through the counter electrode 25 and therefore the PD liquid crystal layer can be phase-separated satisfactorily.

Since space is formed between the pixel electrodes 14, electromagnetic coupling can be prevented between the signal line 15 and the pixel electrode 14 and there is no occurrence of light escape from the peripheral portion of the pixel electrode. As a result, satisfactory display contract can be realized.

Since the phase separation of the PD liquid crystal layer is performed with a microlens or a mask, a PD liquid crystal layer with an average diameter optimum to the wavelengths of R, G, and B light to be modulated can be formed in the unit of a pixel.

In the projection type display of the present invention, since the display panel of the present invention is employed as a light valve, high display contrast can be realized. Also, since the liquid crystal layer is heated when temperature is low, there is no occurrence of hysteresis. In addition, since the rotary filter is rotated in synchronization with a video signal, three-dimensional display can be realized.

As evident in the aforementioned description, the present invention has the advantage that display contrast can be even further enhanced in comparison with prior art.

The display panel of the present invention also has the advantage that satisfactory display contrast can be realized. Furthermore, the present invention has the advantage that the phase separation of the PD liquid crystal layer can be satisfactorily performed.

The present invention has the advantage that a PD liquid crystal layer with an average diameter optimum to the wavelengths of R, G, and B light to be modulated can be formed in the unit of a pixel.

The projection type display of the present invention has the advantage that high display contrast can be realized. The present invention has the advantage that there is no occurrence of hysteresis. The present =invention has the advantage that three-dimensional display can be realized. Finally, the present invention has the advantage that high brightness display can be realized.

What is claimed is:

1. A display panel comprising:

a first substrate formed with pixels in the form of a matrix;

a second substrate formed with a counter electrode; and a color filter formed or arranged on a surface of at least either said first substrate or said second substrate, the surface contacting air;

wherein the following relation is met:

$$20d \geq t$$

where t is the thickness of the substrate formed with said color filter and d is the diagonal length of said pixel.

2. A display panel comprising:

a first electrode substrate;

a second electrode substrate;

a PD liquid crystal layer interposed between said first and second electrode substrates;

a third substrate or sheet having a light reflecting function; and a light scattering layer;

wherein said third substrate or sheet is arranged through said second electrode substrate and said light scattering layer, and the following condition is met:

$$3 \leq \frac{\pi B}{E} \leq 20$$

where E is the luminance of a small area of said light scattering layer on which light is incident, B is brightness measured in a normal direction of said light scattering layer, and π is the ratio of the circumference of a circle to its diameter.

* * * * *